US005642304A

United States Patent [19]

Simpson

[11] Patent Number: 5,642,304

[45] Date of Patent: Jun. 24, 1997

[54] APPARATUS FOR HIGH-SPEED SOLUTION OF ARBITRARY MATHEMATICAL EXPRESSIONS WITH LOGIC CODE GENERATOR AND PROGRAMMABLE LOGIC CIRCUIT

[76] Inventor: John Richard Simpson, 3 Applecrest Rd., Weston, Mass. 02193

[21] Appl. No.: 320,128

[22] Filed: Oct. 7, 1994

Related U.S. Application Data

[63] Continuation of Ser. No. 746,461, Aug. 16, 1991, abandoned.

[51] Int. Cl.[6] .......... G06F 7/38

[52] U.S. Cl. .......... 364/735; 364/718; 364/725; 364/716; 395/701

[58] Field of Search .......... 395/700, 800; 364/735, 710.11, 718, 725, 757, 764, 769, 784, 736, 716, 489, 490, 491

[56] References Cited

U.S. PATENT DOCUMENTS

| | | | |
|---|---|---|---|
| 4,717,844 | 1/1988 | Shima et al. | 307/465 |
| 4,792,909 | 12/1988 | Serlet | 364/491 |
| 5,128,871 | 7/1992 | Schmitz | 364/490 |
| 5,140,526 | 8/1992 | McDermith et al. | 364/488 |

*Primary Examiner*—Kevin A. Kriess
*Attorney, Agent, or Firm*—Bookstein & Kudirka, P.C.

[57] ABSTRACT

Apparatus is provided for performing logical operations and synthesizing logical equations and a programmable close lookup table coprocessor is provided for logical operations and solving the synthesized logical equations. The apparatus includes boolean term ANDing, boolean term merging, boolean term removal from another boolean term, and reduction of boolean terms in a logical equation in a known type of close boolean minimization format. Critical to the operation of the apparatus is the new definition of input lists for independent variables and the new definition of input lists for numbers. The apparatus includes a priority OR or POR search subsystem for receiving a plurality of binary input signals. A priority OR means that one binary code word will exist on the output bus giving the address of the highest numbered input of all the possible binary signal inputs that are asserted. The POR search subsystem includes an addressable storage system for supplying input control words for testing for different input signal conditions that identify the address of usually where the boolean term to be operated upon next exists in memory. The apparatus also includes a read and write array subsystem for producing a plurality of binary output signals. This read array subsystem includes an addressable storage array for supplying output signal control words. The results of the tests performed by the search subsystem are used to select which ones of the output signal control words are allowed to establish or change the read/write array output signals.

44 Claims, 52 Drawing Sheets

| Cube Parts: | LaIW | LbIW | Rule |
|---|---|---|---|
| Lists | | | |
| LaIL | I | X | I |
| LbIL | X | I | I |
| LcIL | I | I | |

96

| Cube Parts: Lists | La2W | Lb2W | Rule |
|---|---|---|---|
| La2L | X | X | 2 |
| Lb2L | X | I | I |
| Lc2L | X | I | |

FIG. 10 Prior Art - Multiplier

FIG. 11 Prior Art - 7482 - 2 Bit Full Adder

APPARATUS FOR HIGH-SPEED SOLUTION OF ARBITRARY MATHEMATICAL EXPRESSIONS WITH LOGIC CODE GENERATOR AND PROGRAMMABLE LOGIC CIRCUIT

This is a continuation of Ser. No. 746,461, filed Aug. 16, 1991, now abandoned.

TECHNICAL FIELD

This invention relates generally to both an apparatus for solving mathematical expressions and logical expressions and generating a set of lists of input numbers per jointly mathematical and logical expression and a group of programmable logic circuits to be programmed with the set of lists of input numbers for high-speed processing of the jointly mathematical and logical expression and specifically to both a logic code generator which operates in conjunction with a digital computer to both solve arbitrary expressions and generate a set of lists of input numbers per jointly mathematical and logical expression and a group of programmable logic circuits to be programmed with the set of lists of input numbers for high-speed processing of the arbitrary expressions.

BACKGROUND AND PRIOR ART

Digital computers have long been used for solving various logical relationships and providing various manufacturing and process control functions. Typically, such computers approach the solution serially by sequentially performing various mathematical operations on numerical inputs. However, solution by direct computations on numerical inputs is inherently slow. For complicated mathematical functions with large number of inputs, direct calculation time becomes prohibitive.

Accordingly, various forms of special mathematical processors are known which can be used in conjunction with a standard digital computer to increase overall computational speed. Four well-known types of special processors include coprocessors, array processors, look-up tables and specialized programmable logical arrays, and an integrated system of a combination of ROMs, RAMs, programmable logical arrays, and logical circuitry.

A coprocessor, such as the Intel 8087, is a digital computer which operates in parallel with and under control of the main computer. The coprocessor can be programmed to perform floating point computational operations, such as addition, subtraction, multiplication and division, and selected trigonometric functions on two floating point binary numbers. The coprocessor generally performs only numerical calculations and overall computational speed is increased because complicated and time-consuming numerical computations can be performed simultaneously with other operations. However, within the coprocessor, the solution of complicated logical and numerical relationships are generally performed in the same manner as in the main computer—by serial calculations. Consequently, numerical computation speed for solving complicated logical and numerial relationships is still very slow.

Array processors are similar to coprocessors in that they operate in parallel with and under control of the main computer. However, unlike coprocessors, array processors are specifically designed to perform selected mathematical and some simple algebraic operations at high speed. Therefore, for simple calculations, array processors can operate much faster. However, for complicated calculations, the array processor must still perform time-consuming serial calculations.

Accordingly, attempts have been made to use look-up tables. A look-up table accepts a numerical input and uses that input to locate the desired result in a table. Since no serial calculations are performed, look-up tables operate at high-speed. Look-up tables are generally implemented in high-speed memories including ROMs, PROMs, EPROMs, EEPROMs and RAMs. The memory locations are first pre-programmed with the desired outputs of a function. During actual operation, the function inputs are provided to the address inputs of the memory. In the case of a ROM, application of an input pattern causes an output pattern to appear on the memory outputs. In the case of a RAM, the desired output is retrieved from the selected memory location and applied to the outputs.

A ROM for read only memory can be permanently programmed with a particular bit pattern, which is retained even after power is removed. Typically, a ROM includes input row lines connected by programmable connections to output column lines, with all of this structure being fabricated on a single integrated circuit chip. The ROM is programmed by selectively connecting input rows to output columns by opening or closing each connection point in a desired pattern. In general, any combinational truth table could be programmed into a ROM. Various forms of ROMs are presently known, according to their method of programming.

For example, mask-programming ROMs have the connection points and the resulting bit pattern built in at the time of manufacture. The obvious disadvantage with such devices is that, once programmed, the masked ROM can be used to solve only a fixed number of relationships and these relationships cannot be changed. Also, the masked ROM cannot be programmed by the user.

Programmable ROMs (PROMs) can be programmed by the user; once programmed, their pattern is permanent. This type of ROM is constructed with "fuse-links" at the internal connection points. The device is commonly programmed by electrically pulsing the ROM with current pulses. The current pulses selectively burn out not-wanted fuse-links to program the desired pattern into the ROM. PROMs suffer from the same disadvantage as masked ROMs in that once programmed, the PROM can be used to solve only a fixed number of relationships and these relationships cannot be thereafter changed.

Erasable programmable ROMs (EPROMs) are PROMs can be semi-permanently programmed in order to retain a desired bit pattern without the continuous application of power. However, such devices can be erased in order to re-program the memory at a later time. One type of EPROM uses transistors with insulted gates at the internal connection points. This type of EPROM can be programmed by selectively charging the insulated gates. The charge is retained for long periods of time and enables the associated transistor to close a connection at the associated connection point. The memory can be erased, if necessary, by exposing the memory chip to intense ultraviolet light thru a transparent quartz window covering the chip. The intense ultraviolet light causes the charge stored on the insulated gates to leak off, thereby opening all of the connections. Other types of EPROMs called electrically erasable programmable ROMs (EEPROMs) can be programmed and erased electrically, while connected in the circuit.

A typical RAM memory includes a plurality of row lines and a plurality of column lines. A multiple-bit register is connected at each intersection of the row lines and column lines with all of this structure being fabricated on a single integrated circuit chip. Each multiple-bit register is accessed by the coincidence of a row select signal and a column select signal. The row and column select signals are generated by decoding the applied address inputs and the contents of a selected register are applied to the device outputs. Two basic types of RAM memories include static RAMs and dynamic RAMs. A static RAM uses flip-flop devices to construct the multiple-bit registers, consequently, the data written into a static RAM remains until rewritten, unless the memory power is turned off. A dynamic RAM uses capacitors to construct the multiple-bit registers. Once charged, the capacitors discharge continuously and the stored data quickly disappears. Consequently, the charges on the capacitors must be continually refreshed or recharged by special memory refresh circuitry.

ROMs and RAMs are useful in many applications because they can operate at relatively high-speeds. Since no complicated calculations need to be carried out serially in order to generate an output in response to an arbitrary input, the solution speed is much faster than available from coprocessors and array processors. However, these devices have two basic drawbacks. First, they must be pre-programmed with a bit pattern that will generate the desired functional relationship between the inputs and outputs. The programming generally is not straightforward and requires a complete knowledge of memory construction and operation. Often special equipment is also required. Consequently, these devices are not suitable for general purpose use and are mainly suited for specialized applications where trained personnel are available for programming. Secondly, since each state or output of a function must be programmed as a memory location, for complicated functions or for simple functions with many inputs, the required number of memory locations becomes very large. In order to insure that the memories will operate properly, it is necessary to operatively test each memory location during manufacture. As the number of required memory locations grows, so does the testing time. For all but the simplest functions with small numbers of inputs, the memory test time quickly becomes prohibitive.

For example, these ROMs and RAMs have an unreasonable test time of 300+years for a 64 bit address. Each memory contains $2^{+\textit{number of address bits}}$ data locations, which are accessed and tested one location at a time within one clock period. A ROM, RAM, programmable logic array, or gate array could could not reasonably be tested for all stored numbers with 64 address bits having $2^{+64}$ or about $10^{+19.2}$ data locations. Calculation: $2^{+64}$ equals $10^{+log}10^{2\times 64}$ or $10^{+0.3010\times 64}$ or $10^{+19.2}$. These $10^{+19.2}$ data locations would require 300+ years to test with a 1 GHz clock rate. Calculation for the 300+ years is: $2^{64}$ nanoseconds×(1 second/$10^{+9}$ ns)×(1 hour/3600 seconds)×(1 day/24 hours)×(1 year/365 days)=300+ years. This 300+ year test time is unreasonable. Testing of all address states is needed during manufacture to insure that the memory IC will operate correctly at a customer's location.

PLAs are similar to ROMs in that they operate at near look-up-table speed. Various forms of programmable logic arrays or PLAs are presently known. Typically, a PLA includes an input AND array connected by a substantial number of product or word lines to an output OR array, with all of this structure being fabricated on a single integrated circuit chip. Two known types of PLA's are mask programmable logic arrays (MPAs) and field programmable logic arrays (FPLAs). Mask programmable logic arrays are programmabled or personalized to perform a desired logic function only by altering the metalization mask used to fabricate the PLA integrated circuit chip. The making of such masks and the fabrication of the integrated circuit chips is a relatively expensive and time consuming process.

Field programmable logic arrays (FPLAs), on the other hand, are integrated circuit chips which contain complete sets of logic circuits, each of which is operatively connected to the array structure. Each such elemental logic circuit, however, includes a fuse link which can be electrically blown or burned out so as to disable that particular circuit. The user buys the chip with the complete array of circuits on it and then plugs it in to a special machine which he or she has programmed to burn out the fuseable links for the undesired circuits.

While useful in various applications, these field programmable logic arrays have various drawbacks. For example, these FPLAs are somewhat more expensive because of the need to provide the special fuseable links. Also, in order to make changes in the logic, a changed circuit requires a new chip and to burn in a completely new pattern. The old previously programmable chip or module cannot be used.

The disadvantage of the PLA or FPLA is that since the PLA can only be tested with input addresses as binary numbers, the test time of PLA with 64 input bits is $2^{+64}$ clock periods or 300+ years with a 1 GHz clock. This 300+ year test time is unreasonable. Typical test times are shown in Table 1.

TABLE 1

| Present Invention | | |
|---|---|---|
| Title: Test times for functions of various number of input parts. | | |
| Clock is 1 GHz equal to $10^{+9}$ Hz. | | |
| Input Parts | Address States | Test Time |
| 20 | $2^{+20} = 10^{+6.02}$ | 1- millisec. |
| 32 | $2^{+32} = 10^{+9.632}$ | 4.3 seconds |
| 64 | $2^{+64} = 10^{+19.264}$ | 300+ years |
| 128 | $2^{+128} = 10^{+38.528}$ | 3+ billion trillion years |

Another disadvantage of using PLAs or FPLAs with many inputs per each is the well known long time to reduce the number of boolean terms performed on sequencial computers, such as the long time of hours, days, weeks, and sometimes longer to process boolean terms of 32 parts or more.

A conventional computer, such as a mainframe vax 8600, will take too long to generate a set of lists. For example, the inventor of this invention ran a simple program to manipulate lists performing AND, OR, and list invert, which required 66 cpu hours or almost 3 days to run on a mainfram vax 8600 computer. At a commercal rate of $2,000 per cpu hour, 66 cpu hours would cost $132,000. By avoiding the exploration of pipelining, and generally unavailable parallel computers and supercomputers to convert mathematical functions and flowcharts to lists of boolean terms, this invention provides a design of a hardware logic code generator with needed mathematical concepts to allow rapid generation of sets of boolean lists.

A programmable gate array (PGA), such as the existing Xilinx gate array is programmed as a logic schematic or logic equations, and can operate about as fast as a ROM or RAM. The main limitations of PGAs are input/output test times are prohibitive for wide buses and the available computer-aided engineering (CAE) software to connect one or more PGAs in a circuit for arbitrary mathematical expressions does not exist. The basic purpose of PGAs is to replace small logic circuits, such as a simple floating point multiplier.

A Xilinx gate array is a programmable gate array of a propriety Logic Cell Array architecture. The Logic Cell Array (LCA) with an internal matrix of logic blocks and a surrounding ring of input/output interface blocks. Interconnect resources occupy the channels between the rows and columns of logic blocks, and between the logic blocks.

The core of the LCA is a matrix of identical Configurable Logic Blocks (CLBs). Each CLB contains programmable combinational logic and storage registers. The combinatorial logic section of the block is capable of implementing any Boolean function of 5 input variables. The registers can be loaded from the combinatorial logic or directly from a CLB input. The register outputs can be inputs to the combinatorial logic via an internal feedback path.

The periphery of the LCA is made up of user programmable input/Output Blocks (IOBs). Each block can be programmed independently to be an input, an output, or a bidirectional pin with three state control. Inputs can be programmed to recognize either TTL or CMOS electrical thresholds. Each IOB also includes flip-flops that can be used to buffer inputs and outputs.

The flexibility of the LCA is sue to resources that permit program control of the interconnection of any two points on the chip. Like other gate arrays, the LCA's interconnection resources include a two layer metal network of lines that run horizontally and vertically in the rows and columns between the CLBs to nearby metal lines. Crosspoint switches and interchanges at the intersections of rows and columns allow signals to be switched from one path to another. Long lines run the entire length or breadth of the chip, bypassing interchanges to provide distribution of critical signals with minimum delay or skew.

A serial configuration PROM is a necessary companion device that provides permanent storage of LCA configuration programs, usually activates after system power turn on.

A Xilinx gate array is a PGA that upon electrical power turn on is unprogrammed. A digital computer will activate the serial configuration PROM to send a code into the PGA to internal registers for logic circuit activation. The PGA can be reprogrammed with a new serial configuration code. When the power supply is removed, the PGA is unprogrammed. The serial configuration code was created in a CAE software product for only a certain size Xilinx PGA.

Design of a logic schematic of various circuits to operate as a arbitrary mathematical function is a labor intensive design engineering task by a skilled electronic engineer. Although CAE software can be used to create a small logic schematics, such as by Synopsys' CAE software, no means exists to automatically create a digital code to be programmed into one or more logic circuits to operate as an arbitrary mathematical function, such as 'output=$\log_{(a+b-c)}([c/b]-a)$', with output,a,b and c as buses of 32 floating point bits.

The PGA contains less gates than the first type or PROM, EPROM, EEPROM, RAM and second type or PLA, FPLA, but the PGA is usually slower due to more gate delays in series from input to output than the 3 to 8 gate delay of near look-up-table speed in the programmable IC circuits in this invention. The test time of the PGA is calculated the same as the ROM and is 300+ years for 64 input pins, unless internal macrocell outputs are accessable.

The design engineer programs a PGA only if the sub circuits or macrocells can each be tested by accessing the outputs of the utilized macrocells. Small PGAs are tested in small pieces and are usually 100% tested in a reasonable time.

Another disadvantage of existing gate arrays is that the PGA lacks high-speed in 3 to 8 gate delays.

An integrated system of a combination of ROMs, RAMs, PGAs, and logic circuitry, which operates as a group of sub circuits, can both process and be tested for 64 and any number of bit inputs. A test for a 64 bit by 64 bit floating point multiplier would be inputting 8 or 16 bits to a small part of the overall circuit and accessing an immediate output of the subcircuit.

The disadvantages of the integrated system are:

(1) a great many subcircuit outputs need to be accessed for even a two number operation on 64 bit binary numbers, and (2) the testing of all these subcircuits is quite complicated, due to the great many sub circuit outputs to be accessed.

(3) the considerable number of gate delays from input to output.

The prior art, consisting of the four well-known types of special processors include coprocessors, array processors, look-up tables and specialized programmable logic arrays, and an integrated system of a combination of ROMs, RAMs, programmable logic arrays, and logic circuitry, has disadvantages, which are:

(1) no means exists to synthesize logic equations from arbitrary mathematical functions without using time consuming and usually unreasonable truth tables for programming into either mask or programmable circuitry.

(2) no means exists to test all states for a complete circuit in a reasonable time, such as $10^{+19.2}$ data locations for 64 bit address or input, and (3) no means exists to process a spreadsheet at about 1 box per clock period, such as 10,000 boxes with each box to process a flow chart up to perhaps 10 trillion steps with many constraints for an arbitrary mathematical function with up to perhaps 25 variables of 32 bit resolution per variable, in a perhaps 100×100 box spread sheet as in Lotus 123.

OBJECTS

An object of the logic code generator is to synthesize one or more sets of independent variables in the form of boolean terms for an arbitrary mathematical expression or process or flow chart or equations or function with or without constraints for each bit of resolution of one or more dependent variables.

An object of the coprocessor, having of one or more special programmable integrated circuits, is to solve one or more logical equations in the form of a well known boolean minimization in parallel at high-speed of a few gate delays.

An object of any special programmable integrated circuit is to have all boolean terms tested in less than a second or in a realistically reasonable test time during the manufacting process after putting boolean terms in the special programmable integrated circuit.

An object of the logic code generator with the coprocessor is to free up a log of RAM memory and also at the same time vastly speed up the processing time of a computer program, such as a financial spread sheet on a computer, such as an IBM PC operating with each of the many algebraic financial equations in each box of the spread sheet at near look-up-table speed of perhaps 8 nanoseconds per box.

SUMMARY OF INVENTION

The foregoing problems are solved and the foregoing objects are achieved in one embodiment of the invention in which a logic code generator receives an arbitrary mathematical function expressed in symbolic form as an input and generates a set of lists of boolean terms which represent an output of the arbitrary function. The number of terms in the list is minimized in accordance with known minimization techniques. The lists are in a form which can be directly used to program a set of special programmable logic circuits. The special programmable logic circuits can subsquently be used as a look-up-table to generate function outputs in response to arbitrary inputs at high speed.

More specifically, the logic code generator is an integrated system of logical manipulation and minimization routines preprogrammed into hardware circuitry which perform logical operations on lists of boolean input states, representing both variables and numbers. The logic code generator can receive, line by line, high level instructions in a standard computer language, such as C or Fortran. These instructions represent the sequential mathematical or logical operations which are performed to generate the specified function. A group of these instructions is converted by the logic code generator to a format to instruct the logic code generator controller to generate digital code which can be used to control special programmable logic circuits.

The digital code, created by the logic code generator, consists of a set of one or more lists of binary numbers. The binary number lists, expressed in boolean terms, represent close to the minimum number of terms necessary to represent the chosen function and can be used as the input bus inputs to the special programmable logic circuits. A set of special programmable logic circuits constitutes a "coprocessor" which can generate function outputs in response to inputs at "close to look-up-table speed", thereby vastly speeding up any mathematical process that usually is processed with a computer program with many lines of computer code.

It is also possible to use the inventive apparatus to provide direct computer solutions to arbitrary mathematical expressions. In this latter operation, communication between a computer and the logic code generator is accomplished by means of a handshake computer program which is loaded into the computer. The handshake program takes a sequence of codes in binary computer code of the computer and sends a sequence of codes to the logic code generator. The logic code generator would perform various procedures and then send solution-ready code and data back to the connected computer. This handshake program would recognize the returning code and data from the logic code generator.

For a better understanding of the present invention, together with other and further advantages and features thereof, reference is made to the following description taken in connection with the accompanying drawings, a group of Fortran computer programs, the scope of the invention being pointed out in the appended claims.

BRIEF DESCRIPTION OF THE DRAWINGS

Referring to the drawings:

Note: The logic code generator 2 is shown separated in FIGS. 16 and 17, where

FIG. 16 shows the top section of a logic code generator 2;

Note: The CINV circuit 580 is shown separated in FIGS. 24, 25 and 26, where

FIG. 24 shows the left section of a CINV circuit 580;

FIG. 25 shows the middle section of a CINV circuit 580;

FIG. 26 shows the right section of a CINV circuit 580;

Note: The disjoint sharp circuit 758 of 2 input AND gates for N part cubes, located in a CINV circuit 580, is shown separated in FIGS. 27 and 28, where

FIG. 27 shows the top section of disjoint sharp circuit of 2 input AND gates for N part cubes, located in a CINV circuit 580;

FIG. 28 shows the bottom section of a disjoint sharp circuit of 2 input AND gates for N part cubes, located in a CINV circuit 580;

Note: The memory circuit, located in a CINV circuit, is shown separated in FIGS. 31, 32 and 33, where

FIG. 31 shows the top section of a memory circuit, located in a CINV circuit;

FIG. 32 shows the middle section of a memory circuit, located in a CINV circuit;

FIG. 33 shows the bottom section of a memory circuit, located in a CINV circuit;

Note: The merge mechanism, located in a memory circuit, in turn located in a CINV circuit, is shown separated in FIGS. 35 and 36, where

FIG. 35 shows the top section of a merge mechanism located in a memory circuit, located in a CINV circuit;

FIG. 36 shows the bottom section of a merge mechanism located in a memory circuit, located in a CINV circuit;

Note.

FIG. 44 shows a prior art jth 1 bit adder, representing a ½ 7482 TTL adder as a basic 1 bit adder for cascading into a N bit adder;

Note: The detailed logic circuit to process a flow chart is shown separated in FIGS. 49 and 50, where

FIG. 49 shows the top section of a detailed logic circuit to process a flow chart;

FIG. 50 shows the bottom section of a detailed logic circuit to process a flow chart;

Note: The detailed programmable IC is shown separated in FIGS. 54 and 55, where

FIG. 54 shows the left section of a detailed programmable IC;

FIG. 55 shows the right section of a detailed programmable IC;

LIST OF TABLES

Table Number Title

Figure 1:
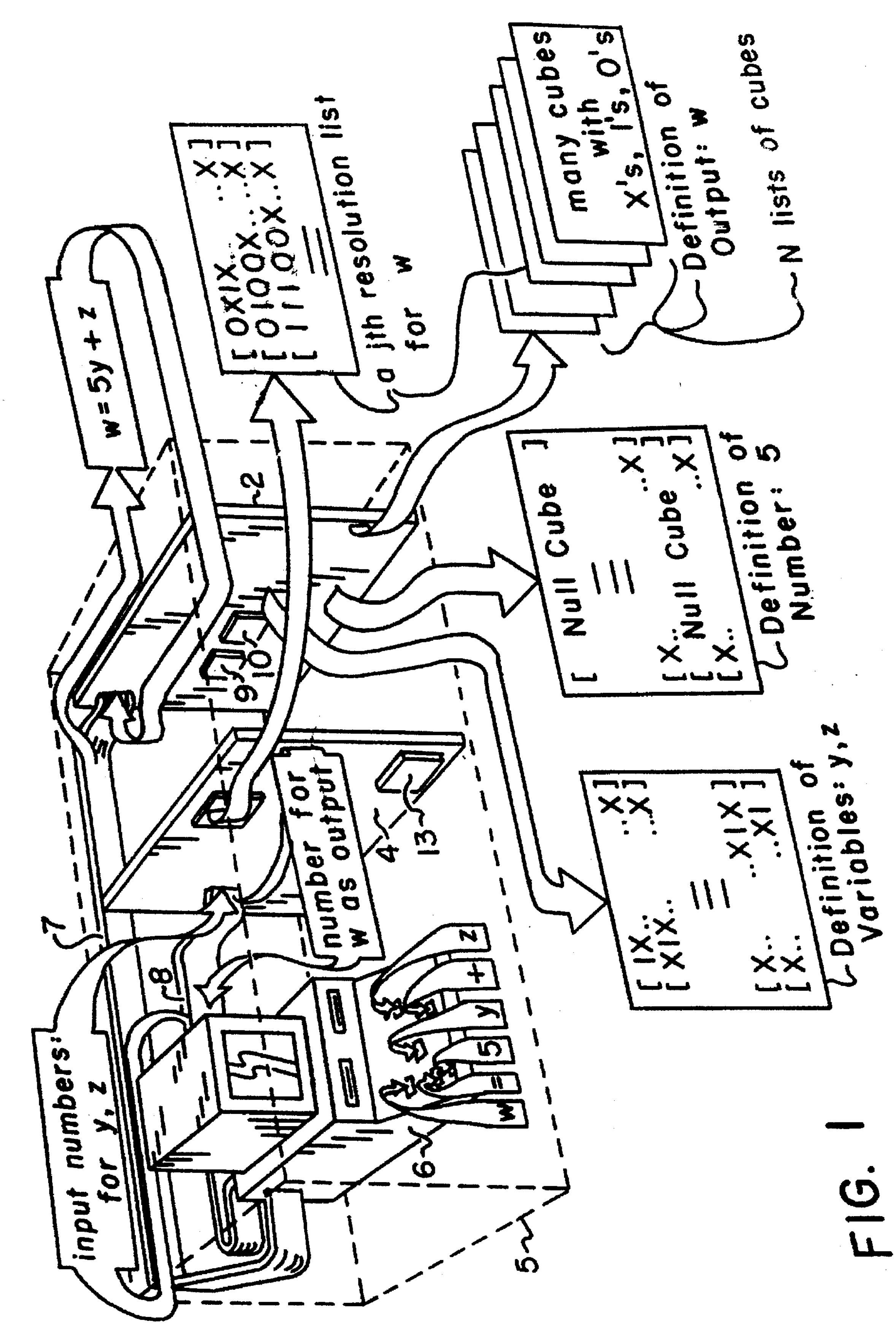
FIG. 1 shows a typical application of the coprocessor and the logic code generator.

1. Test Times for Functions Of 2 & 4 Independent Variables
2. The following example depicts the meaning of the usual cube notation
3. Part Characters In Bits
4. The following example depicts the meaning of the usual cube notation in machine representation of encoded cubes.
5. Generation Of Cubes In A Disjoint Sharp Operation
6. Single Cube Lists
7. Calculation of equation (10) involving the AND of two cubes, being cube L2 and cube L3.
8. Removal of cube [11X] from the universe.
9. Removal of cube [XX1] from the list of [0XX]+[10X] from Table 8 above.
10. Input Lists For A Two Variable Function
11. Input Lists For A Two Variable Function
12. Input Lists For A One Variable Function
13. Input Lists For A Three Variable Function
14. Input Lists For A Two Variable/One Number Function
15. Input Lists For A Three Variable Function
16. Number Of Coprocessor Criterias
17. Four Lists For Output Pins
18. 64 Part Cubes In Halfs To Be Written Into Coprocessor
19. Comparison Of Characters Per Part And Bits Per Part
20. The Three Lists For A Two Bit Integer Adder
21. Hand Operations Of The Three List Operations: (#), .AND. and .OR., needed to logically perform the operation of the circuit Li1 210, are presented, below.
22. Resultant List Appearance
23. Resultant List Appearance
24. Cube Instruction Per List Equation
25. RAM Information Of List Addresses
26. RAM Information Of Cubes In Lists
27. Procedure List For FIG. 21 Mechanism
28. List Calculation For LNEWA And LNEW1
29. LF Set & Li Set To Be Used In Description Of P-21 Procedure For Generation Of A Set Of LNEW Lists
30. Operations On Lists A And B
31. Derivation Of Flowchart
32. Number Of Detailed Detection Operations Of Memory j
33. Functions Per Control Word For Function Detector
34. Merge Operation Truth Table
35. Logical Operation Of Part_N Merge Detector
36. Relationship Of 'N,P,J,j'
37. Both True And False Input Lists For Binary Integer Adders
38. Hypothetical Cube Instructions Created Representating Output Pins Of First Adder With Connected Input Bus $ABC_1$ Of Three Buses: A, B, And Single Wire $C_1$
39. Hypothetical Cube Instructions Created From First Adder By A 64 Part Shifting Of First Adder With Connected Input Bus $ABC_1$ Of Three Buses: A, B, And Single Wire $C_1$
40. Set Of Lists for +B In Accordance with To Rule 1.
41. Set Of Lists for +B In Accordance with To Rule 1.
42. Set Of Lists for +B In Accordance with To Rule 2.
43. Set Of Lists for +B In Accordance with To Rule 6.
44. Set Of Lists for +B In Accordance with To Rule 1.
45. Set Of Lists for +B In Accordance with To Rule 6.
46. Set Of Lists for +B In Accordance with To Rule 6.
47. Set Of Lists for +B In Accordance with To Rule 1.
48. Resolution Lists For f As A Signed Integer
49. Truth Table For 'f=x−y'
50. Close Boolean Minimization For List For $f_1$ or $Lf_1$ 51. Close Boolean Minimization For List For $f_2$ or $Lf_2$
52. Close Boolean Minimization For List For LSign
53. Manual Calculation Of A Close Boolean Minimization For list For NOT(Lf2)
54. Manual Calculation Of A Close Boolean Minimization For list For NOT(Lf1)
55. Manual Calculation Of A Close Boolean Minimization For List(f=00), when (f=00) means (f=zero).
56. Manual Calculation Of A Close Boolean Minimization For List(NOT(Lf2)), when NOT(f=00) means (f does not equal zero).
57. Manual Calculation Of A Close Boolean Minimization For List(NOT(f>00)), when (f>00) means (f>zero).
58. Manual Calculation Of A Close Boolean Minimization For List(NOT(f>00)), when NOT(f>00) means (f is not greater than zero).
59. Lists Of Signed Integer Variable 'f(x,y)'
60. Simple Flow Chart Application And Operations Of The Logic code generator
61. Truth Table for 'f=x−(y=2)'
62. Manual Creation Of A Close Boolean Minimization For List For $f_1$ or $Lf_1$.
63. Manual Creation Of A Close Boolean Minimization For List For $f_2$ or $Lf_2$.
64. Manual Creation Of A Close Boolean Minimization For List For $f_{LSign}$ or $Lf_{LSign}$.
65. Manual Creation Of A Close Boolean Minimization For List For NOT($f_2$) or NOT $Lf_2$.
66. Manual Creation Of A Close Boolean Minimization For List For NOT($f_1$) or NOT $Lf_1$.
67. Manual Creation Of A Close Boolean Minimization For List(f=00) or Lf=00.
68. Manual Creation Of A Close Boolean Minimization For List(NOT(f=00)) or LNOT(f=00).
69. Manual Creation Of A Close Boolean Minimization For List (f>00) or Lf>00.
70. Manual Creation Of A Close Boolean Minimization For List(NOT(f>00)) or LNOT(f>00).
71. Comparison Of Input Lists For One & Two Variable Functions
72. Comparison Of Input Lists for One & Two Variable Functions
73. Lists For Five Variable Functions —Application Notes Section—

85. Instruction Lists of f(w,g) For N Resolution Bits Of f(w,g)
86. A 2 variable multiplier set of close boolean minimizations
87. Set LF
88. One Of N Lists For Variable gw
89. A 2 variable multiplier set of close boolean minimizations
90. Set LF
91. One Of N lists For Variable gw
92. Set $LF_{N+1}$ to $LF_{2N}$ For Set Of Lists For Number 17 Or Binary Number 0 . . . 010001
93. The List For $LA_1$
94. One Of The Lists for the resolution bits of the output or output (g,w) with cubes of 2N parts
95. A 2 variable multiplier set of close boolean minimizations
96. Set Of The Lists for variable w and call this set of N lists as set LF
97. One Of The N lists for variable gw
98. Set Of The N lists as set $LF_{N+1}$ to $LF_{2N}$ For Number 20 Or Binary Number 0 . . . 010100
99. Set Of N lists as set $LF_1$ to $LF_N$
100. One Of N lists for variable 20w
101. List, described in Table 90, Without Don't Care Parts 2N to N+1
102. Set Of N lists as set $LF_1$ to $LF_N$
103. One Of N lists for variable c
104. Instruction List of f(w,g) For N Resolution Bits Of f(w,g)
105. Instruction List of c(w,g) For N Resolution Bits Of c(w,g)
106. Instruction List of c(w,g) For N Resolution Bits Of c(w,g)
107. Instruction Lists of c(w,g) For N Resolution Bits Of c(w,g)
108. The resultant list of the ANDing of the three constraints Flow Chart Constraints are redefined, below.
    (1) g−20s>0.
    (2) w>0
    (3) g>0
109. Set Of N lists as set $LF_{N+1}$ to $LF_{2N}$
110. Set Of N lists as set $LF_1$ to $LF_N$
111. One Of N lists for variable fA
112. Set Of N lists as set $LF_1$ to $LF_N$ For Set Of Lists For Number 10 Or Binary Number 0 . . . 01010
113. The resultant list set for variable f will be 2N parts
114. One Of N lists for variable f
115. Instruction Lists For N Resolution Bits Of f(w,g=2)
116. Resultant List Format Of First Cube Of Function In Equation (271), or $List_{NEW}$(f(w,g)>0.
117. $List_{NEW}$(NOT(f(w,g)>0))
118. A Set Of 2 variable multiplier set of close boolean minimizations
119. Set Of N lists as set LF
120. One Of N lists for variable gw
121. List format for list ($zA_j$)
122. Set Of N lists as set $LF_{N+1}$ to $LF_{2N}$ For The Number 17 Or A Binary 0 . . . 010001
123. List format for list($zC_j$)
124. List format for list($zD_j$)
125. Listing Of Real 'y' values or format, the list $L_{z=0}$
126. An Instruction List For N Resolution Bits Of f(w,g=2), From Condition 1
127. $List_j$ of group of the three variables $y_1$, $y_2$, and $y_3$
128. One Of The Lists for the resolution bits of w or w($y_1$,$y_2$)
129. The List format for list($zA_1$)
130. One Of Lists for the resolution bits of zA or zA($y_1$,$y_2$, $y_3$)
131. List(Output)
132. Listing Of Real 'x' values in the cube format
133. Set Of 2N lists as set $LF_{N+1}$ to $LF_N$
134. Set Of Lists $LF_1$ to $LF_N$
135. One Of The lists for the resolution bits of w or w($y_1$,$y_2$)
136. Set Of N lists as set $LF_{N+1}$ to $LF_{2N}$
137. Set Of N lists as set $LF_1$ to $LF_N$
138. One Of The lists for the resolution bits of zA or zA($y_1$,$y_2$,$y_3$)
139. Set Of Lists as set $LF_{N+1}$ to $LF_{2N}$
140. Set Of N lists as set $LF_1$ to $LF_N$
141. The list for the resolution bits of f or f($y_2$,$y_3$)
142. Instruction Lists For N Resolution Bits Of f($y_2$,$y_3$)>0.
143. List for 'f>0' or 'NOT(f>0)'
144. Set Of Lists $LzB_j$ For A Binary Integer Of 0 . . . 010001
145. One Of The $List_j$ of groups of the three variables $y_1$, $y_2$, and $y_3$
146. One Of The lists for the resolution bits of zA or zA($y_1$,$y_2$,$y_3$
147. Set Of N lists as set $LF_{N+1}$ to $LF_{2N}$ For Set Of Lists For Number D Of 160 Digits In A Binary Number Representation, Such As 0 . . . 010100 For '20'

148. Format Of List $Lz_j$
149. List(C==0)
150. Cube Width Increase From k Parts Per Set Of Lists $L_1$ To A cube Width Of (k+5) Parts Per Single List $L_5$, $L_5$ is illustrated in Table 141.
151. Cube Width Of (k+5) Parts Per Single Lists $L_5$
152. Sequence_number Lists Per Pair_$_j$
153. System Cubes As 0-cubes
154. Typical System Cubes
155. System Cube Format
156. Set Of Lists Of L_Number_j & L_Address_$_j$
157. Set Of Lists Of L_Address_j
158. Truth Table For Image Or Painting
169. Truth Table For Audio In A Movie
160. Truth Table For Color In A Movie
161. Truth Table For Audio And Color In A Movie
162. The List Format For One Of 30 output bits.

DETAILED DESCRIPTION OF PREFERRED EMBODIMENTS

Critical Background Logic Theory Needed For This Invention

The background art theory needed to understand the mathematical format of this present invention is cubical complex theory, also called cover theory, as mentioned in the technical paper reference called MINI. Cover theory involves lists of numbers in a compressed format of cubes.

The definition of a cube is a boolean term in which each coordinate represents a variable of two values. The universe of n Boolean variables can be thought of as an n-dimensional space in which each coordinate represents a variable of two values, 0 or 1. Each lattice point, called a vertex, in this n-dimensional space represents a minterm, and a special collection of these minterms form an implicant, which is seen as a cube of vertices. The usual definition of a cube is an n-tuple vector of 0, 1 and X, where 0 means the complement value of the variable, 1 represents the true value, and X denotes either 0 or 1 or both values of the variable. A list of cubes represents the union of the vertices covered by each cube and is called a cubical cover of the vertices, or simply a cover.

The following example in Table 2 depicts the meaning of the usual cube notation.

TABLE 2

Prior Art

Title: The following example depicts the meaning of the usual cube notation.
Example 1a
Consider a four-variable universe of varaibales: A, B C, and D.

| Implicant | Cube notation | Meaning |
|---|---|---|
| $\bar{A}\bar{B}\bar{C}\bar{D}$ | 0 0 1 0 | Minterm with A = B = D =0, C = 1 |
| A $\bar{C}$ | 1 X 0 X | Minterms with A = 1, B = 0 or 1, C = 0, D = 0 or 1 |
| U = universe | X X X X | Minterms with A = 0 or 1, B = 0 or 1, C = 0 or 1, D = 0 or 1 |
| N = null | N | No minterms |

A more convenient machine representation of 0, 1, and X in the cube is to denote them as binary pairs, i.e., to code 0 as 10, to code 1 as 01, and to code X as 11. This representation has the further meaning that 10 is the first of the two values (0) of the variable, 01 is the second value (1), and 11 is the first or the second or both values. Naturally, the code 00 represents no value of the variable and, hence, any cube containing a 00 for any variable position depicts a null cube, as defined in rule b below.

If a null cube exists in a list containing other cubes, then this null cube is discarded, as defined in rule a below. If a null cube is the only cube in a list, then this null cube is not discarded.

Null rules (a) to (b) are believed to be assumed common sense rules for the handling of cubes, such as needed to read the technical paper reference, called MINI.

RULE a: An input cube of all null values in a list of more than one cube shall be erased from existence after the number of cubes in the list is decreased by one.

RULE b: A cube with a null in any part is the same as a null cube.

Each part of a cube can have one of four values, which are: 1 for a true state, 0 for a false state, X for both a true state and a false state, and N for a null state of not a true state nor a false state.

The prior art table showing a part binary representation of a null or N, a 0, a 1, and a X is shown in Table 3.

TABLE 3

Prior Art

Title: Part Characters In Bits
1 Character Per Part

| Character | Part Definition: 2 Bits/ Part Bit 0 | Bit 1 |
|---|---|---|
| N | 0 | 0 |
| 0 | 1 | 0 |
| 1 | 0 | 1 |
| X | 1 | 1 |

An X is a value of both a 1 and a value of a 0.

TABLE 4

Prior Art

Title: The following example depicts the meaning of the usual cube notation in machine representation of encoded cubes.
Example 1c
Consider the encoded cube notation of Example 1a in Table 2.

| Implicant | Cube notation 4 Parts 1 2 3 4 | Encoded cubes 4 Parts: 2 bits per part 1 2 3 4 |
|---|---|---|
| $\bar{A}\bar{B}\bar{C}\bar{D}$ | [0 0 1 0] | [10 10 01 10] Minterm with A = B = D =0, C = 1 |
| A $\bar{C}$ | [1 X 0 X] | [01 11 10 11] Minterms with A = 1, B = 0 or 1, C = 0, D = 0 or 1 |
| U = universe | [X X X X] | [11 11 11 11] Minterms with A = 0 or 1, B = 0 or 1, C = 0 or 1, D = 0 or 1 |
| N = null | [N N N N] | [10 00 11 01] No minterms |

( The 00 entry, shown in the second part from the left side of the above null cube, can be in any variable position. The other values are immaterial, in accordance to null cube rules (a) and (b), as defined after Table 2.)

A cube, containing no X's or zero X's, is called a 0-cube and is commonly called a number. A cube, containing one X, is called a 1-cube, and a cube, containing r X's, is called an r-cube. A r-cube contains $2^{number\_of\_x's}$ or $2^r$ 0-cubes. A n-cube, which has an X in n parts, is called a universe cube and contains all the 0-cubes possible, consisting of $2^n$ in number. A universe cube, having 64 parts, would have $2^{+64}$ 0-cubes or roughly $10^{+(0.3\times 64)}$ or $10^{+19.2}$ or about ten billion billion 0-cubes.

A universe cube, for a kn part input bus for a k variable function with n parts per variable, contains $2^{kn}$ 0-cubes. For example, a universe cube for a five variable function with 32 parts per variable as for 32 bit floating point number format, will contain $2^{5\times 32}$ or $2^{160}$ 0-cubes. The value of $2^{160}$ 0-cubes is approximately $10^{0.3\times 160}$ or $10^{48}$ 0-cubes or a trillion trillion trillion trillion 0-cubes. A 0-cube for a five variable function would be effectively a set of five numbers, one number per variable.

The disjoint sharp is a cube removal process of a list of one or more cubes from another list of one or more cubes. The resultant list of cubes contains cubes, which do not overlap each other or thus contain one or more of the same 0-cubes. The non overlapping cubes each contain one unique group of states or 0-cubes per cube. The disjoint sharp is incorporated in the technical paper reference, called MINI, and is described and illustrated in Table 5, as shown below.

TABLE 5

Prior Art

Title: Generation Of Cubes In A Disjoint Sharp Operation

| | N Parts | | | | | |
|---|---|---|---|---|---|---|
| | 1 | 2 | 3 | | N−1 | N |
| cube A = | [ $a_1$ | $a_2$ | $a_3$ | ..................... | $a_{N-1}$ | $a_N$ ] |
| cube B = | [ $b_1$ | $b_2$ | $b_3$ | ..................... | $b_{N-1}$ | $b_N$ ] |
| Disjoint Sharp Operation: | | | | | | |
| A (#) B = [ $a_1$ $a_2$ $a_3$ ... $a_{N-1}$ $a_N$ ] (#) [ $b_1$ $b_2$ $b_3$ ..$b_{N-1}$ $b_N$ ] | | | | | | |
| N New Output Cubes | | | | | | |
| cube $C_1$ = | [ $a_1\overline{b_1}$ | $a_2$ | $a_3$ | ................... | $a_{N-1}$ | $a_N$ ] |
| cube $C_2$ = | [ $a_1b_1$ | $a_2\overline{b_2}$ | $a_3$ | ................... | $a_{N-1}$ | $a_N$ ] |
| | | | — | | | |
| | | | — | | | |
| cube $C_j$ = | [ $a_1b_1$ | ... | $a_{j-1}b_{j-1}$ | $a_j\overline{b_j}$ $a_{j+1}$ | ...... | $a_N$ ] |
| | | | — | | | |
| | | | — | | | |
| cube $C_{N-1}$ = | [ $a_1b_1$ | ............... | $a_{N-2}b_{N-2}$ | | $a_{N-1}\overline{b_{N-1}}$ | $a_N$ ] |
| cube $C_N$ = | [ $a_1b_1$ | ......................... | | | $a_{N-1}b_{N-1}$ | $a_N\overline{b_N}$ ] |

The removal of an r-cube from a universe cube or thus a n-cube of n parts will result in (n-r) on overlapping cubes, as shown in Table 5. For example, the removal of 0-cube [000] from a universe cube of 3 parts will result in (3 minus 0) or 3 non overlapping cubes, which can be list one, with cube [$b_1$ $b_2$ $b_3$] equal to cube [000] removed from cube [$a_1$ $a_2$ $a_3$] equal to cube [XXX]:

cube [1XX] from part operations–[($a_1\overline{b_1}$) $a_2$ $a_3$], cube [01X] from the part operations–[($a_1b_1$) ($a_2\overline{b_2}$) $a_3$], and cube [001] from the part operations–[($a_1b_1$) ($a_2b_2$) ($a_3\overline{b_3}$)].

The other two disjoint lists of n total disjoint lists would be list two, with cube [$b_1$ $b_2$ $b_3$] equal to cube [000] removed from cube [$a_1$ $a_2$ $a_3$] equal to cube [XXX]:

cube [X1X] from the part operations–[$a_1$ ($a_2\overline{b_2}$) $a_3$], cube [X01] from the part operations–[$a_1$ ($a_2b_2$) ($a_3\overline{b_3}$)], and cube [100] from the part operations–[($a_1\overline{b_1}$) ($a_2b_2$) ($a_3b_3$)]; and list three, with cube [$b_1$ $b_2$ $b_3$] equal to cube [000] removed from cube [$a_1$ $a_2$ $a_3$] equal to cube [XXX]:

cube [XX1] from the part operations–[$a_1$ $a_2$ ($a_3\overline{b_3}$) ], cube [1X0] from the part operations–[($a_1\overline{b_1}$) $a_2$ ($a_3b_3$)], and cube [010] from the part operations–[($a_1b_1$) ($a_2\overline{b_2}$) ($a_3b_3$)].

The above list one is proven below to contain non overlapping cubes or thus disjoint cubes.

If the left most part is the most significant part, then the numbers in cube [1XX] are:

4 for cube [100], 5 for cube [101], 6 for cube [110], 7 for cube [111].

If the left most part is the most significant part, then the numbers in cube [01X] are:

3 for cube [011], and 2 for cube [010].

If the left most part is the most significant part, then the number in cube [001] is 1.

An example of a disjoint sharp of removing a 2-cube [0XX], containing $2^{number\_of\_x's\_or\_2}$ or 4 0-cubes or thus 4 numbers, from the universe cube [XXX], containing $2^{number\_of\_x's\_or\_3}$ or 8 cubes will result in (3 minus 2) cubes or cube [1XX], containing the remaining ($2^{n=3}$ or 8 minus 4) 0-cubes or 4 0-cubes.

An example of a disjoint sharp of removing a 2-cube [X0X], containing $2^{number\_of\_x's\_or\_2}$ or 4 0-cubes or thus 4 numbers, from a lower order cube or [0X0] will result in only the 0-cubes common to the 0-cubes in 1-cube [0X0] or 0-cube [000]. The resultant 0-cube [010] was not common with both non 0-cubes: [X0X] and [0X0].

Cubes, which are common to both lists, are determined from the ANDing of one list with the other list. Cubes remaining or thus the resultant list of cubes are determined by ANDing one list with the NOT of the other list, such as (list A).AND.(NOTlist B) or A.AND.(NOT B) or A$\overline{\text{B}}$. Note: the NOT of a list is the same as the disjoint sharp of the list.

In the directly above example, the removed list, consisting of cube [000], equals one list of cube [X0X] ANDed with the other list of cube [0X0] or thus [X0X].AND.[0X0]=[000].

This logic code generator can not realistically be put into software to run on conventional computers, since the logic schematic synthesis Fortran computer programs took 66 cpu hours on a Vax 8600. A Vax 8600 is considered a high speed mainframe computer. This logic schematic synthesis software, which performed the same list operations as the logic code generator in this invention, was used to create a set of sixteen logic schematics for a 8×8 bit integer multiplier. Any existing large computer is expected to be just as slow as the Vax 8600 computer.

End Of Critical Background Logic Theory Needed For This Invention

Referring to FIG. 1, an embodiment of a logic code generator 2 and a coprocessor 4 are shown in a typical end user computer set up 5, denoted in dotted lines. The typical end user computer set up 5 contains also a typical workstation 6, connected with both: (1) connecting_cable_A 7 connecting to the logic code generator 2 and (2) connecting_cable_B 8 connecting to the coprocessor 4. The logic code generator 2 could contain two types of ICs, such as one the IC1 9, and many ICs, each such as the IC2 10. The IC1 9 contains basically the processor circuitry of the logic code generator 2. The IC2 10 contains basically the memory circuitry for cube storage and cube retrieval in the logic code generator 2. The number of IC2's, such as the IC2 10, per the IC1 9 may be a ratio of 8:1 for a coprocessor function that is processing all input numbers on a 16 wire bus or 16 resolution bits or 16 parts. For number and variable resolution higher than 16 resolution bits or 16 parts, the ratio of IC2 10 per IC1 9 would probably be much greater than a ratio of 8:1. The coprocessor 4 for a function of 64 bit resolution will likely contain circuitry of 64 ICs each containing circuitry of a programmable IC 13.

The typical end user computer set up 5 illustrates how an arbitrary mathematical equation 'w=5y+z' is first entered into the keyboard of the typical workstation 6. The typical workstation 6 then sends the arbitrary mathematical equation 'w=5y+z' in a coded format onto connecting_cable_A 7 to the logic code generator 2. Inside the logic code generator 2, the various controllers, which are described later, take the arbitrary mathematical equation 'w=5y+z' and then generate a set of lists of cubes which are shown both with the words 'Definition of Output: w' and 'N lists of Cubes'. During this set of lists generation, the logic code generator 2 inserts a preformed list of cubes, called 'Definition of Variables: y,z', for each input variable. This inserted preformed list of cubes is shown beginning with the top cube [1X . . . X]. Also during this set of lists generation, the logic code generator 2 inserts a list of null cubes and universe cubes or cube [X . . . X] in a format for a list to represent a number, shown with the words 'Definition of Number: 5'. The list generation, which is processed in logic code generator 2, is described in detail later. Each of the list of cubes, such as the list with the words 'a jth resolution list for w', in the set of lists for 'Definition of output: w' is sent from logic code generator 2 onto the connecting_cable_A 7 to the typical workstation 6 and then onto the connecting_cable_B 8 to coprocessor 4 under control of the typical workstation 6.

Each selected programmable_IC, such as programmable_IC 13, on coprocessor 4 is programmed one cube at a time from data sent from typical workstation 6 onto the connecting_cable_B 8.

The coprocessor 4 processes numbers for variables y and z, which originate from typical workstation 6 and are sent on connecting_cable_B 8 as shown in the words 'input numbers: y, z'. The coprocessor 4 consists of basically one programmable_IC, such as programmable_IC 13, per output resolution bit of variable w. If variable w is defined as 64 bits floating point, then 64 programmable_ICs will exist. However, the circuitry of a number of programmable_ICs could be placed in one IC, or more than one IC may be required to contain the circuitry of one programmable_IC. A few gate delays later, the coprocessor 4 creates an output number and sends this number for output w, shown as the words 'number for w as output' on connecting_cable_B 8 to the typical workstation 6.

Communication of digital information of the typical workstation 6 to communicate instructions, receive instructions, and data with the logic code generator 2 is expected to be in the form of a special computer program. This special computer program will be loaded into the typical workstation 6. Development of this special computer program can be accomplished be well known programming techniques.

It is also possible to replace the microprocessor circuitry which is not shown but is inside the typical workstation 6 with the logic code generator 2. Addition of a coprocessor 4 into logic code generator 2 would speed up the some processing.

Mathematical instructions and data, such as sets of lists of cubes, is transferred on connecting_cable_A 7 between the logic code generator 2 and the typical workstation 6 under control of both the controller which is described later for the logic code generator 2 and under control of the typical workstation 6. A typical list of cubes might look like the jth resolution list for w as shown in FIG. 1 with the top cube shown as [0X1X . . . X]. A set of lists to represent w is shown as N lists of cubes in FIG. 1 with the words 'Definition output: w'. The typical workstation 6 contains software to know how to send and program lists of cubes to the coprocessor 4 on connecting_cable_B 8. The logic code generator 2 and/or the coprocessor 4 can be on one or more workstation plug-in boards of the typical workstation 6.

The digital mathematical instructions, representing 'w=5y+x', would be to command the logic code generator 2 to select a two variable multiplier list generator routine for perhaps 64 bit resolution for first generating the set of lists for 5y or 5 times y and then to select a two variable adder list generator routine for perhaps 64 bit resolution for next generating the set of lists for 5y plus z. The 64 bit resolution could be either 64 bit integer, similar to the number 273, or the usual 64 bit floating point of mantissa and exponent, similar to the number $0.273\times10^{+3}$.

In response to the digital mathematical instructions, the logic code generator 2 generates digital code in the form of a list of one or more cubes for each programmable_IC, such as the programmable_IC 13, by operating on cubes and lists of cubes, normally originating from the logic code generator 2 in response to digital mathematical instructions, such as 'w=5y+z', sent from the typical workstation 6.

The logic code generator 2 processes mainly variables with logical constraints in the form of lists of cubes and logical expressions. The logic code generator 2 can process numbers also. A number is a single value and can be represented by a 0-cube, while a variable can be many many numbers. Since a list per resolution bit contains many numbers, a set of lists is one or more variables. The coprocessor 4, containing a programmable_IC per resolution bit, such as the programmable IC 13, processes only numbers, and does not process variables.

A set of lists, such as needed for the eventual multiplying of two numbers for 5y or 5 times y, means one list in the set of lists represents one bit of resolution for the output of 'v=5y' or perhaps the 56th resolution bit of the 64 bit variable v or bit variable $v_{56}$. One or more cubes in the list representing bit variable $v_{56}$ contain one or usually more states, commonly known as input numbers, which if present on the input '5 bus' and the 'y bus' of the 5y function coprocessor, such as the coprocessor 4, to process the 5y function will cause the output IC pin, represented by bit variable $v_{56}$ to go to logic true or usually +5 volts. A cube containing an input x value and a input y value to the xy function for 3 bit number resolution might be [101_101] or (3_3) or 3 times 3. Another cube of only two numbers or values might be [111_101] or (7_3) or 7 times 3. These two cubes: [101_101] and [111_101] can be combined into a single cube [1X1_101]. This new cube still contains the same information as the first two cubes of [101_101] and [111_101].

The reason why these 0cubes could be combined into a 1-cube is the two 0-cubes were exactly the same except for the second bit from the left side or part 2. Part 1 is at the left side of single cube [1X1_101] and part 6 is on the right side.

Rule 1 and Rule 2 are described later. A Rule 1 list of cubes is the list called in FIG. 1 as 'Definition of Variables: y,z'. A example of a Rule 2 list of cubes is the list called in FIG. 1 as 'Definition of Number: 5'.

In the generation of the set of lists for perhaps the multiplication function 5y or 5 times y, the logic code generator 2 will select a Rule 1 set of lists to represent the variable y and a Rule 2 set of lists to represent the number 5 to be logically solved, such as a Rule 1 list and a Rule 2 list would be ANDed together to represent the output list of a 2 input AND gate which could be expected at the input of the logic of a binary multiplier logic circuit. A Rule 1 list will consist of one (2n−1)-cube, containing 2n−1 X's in a 2n part cube for a 2n wire or 2n part input bus of one number and one variable y with n parts per number and n parts per variable.

Figure 2:
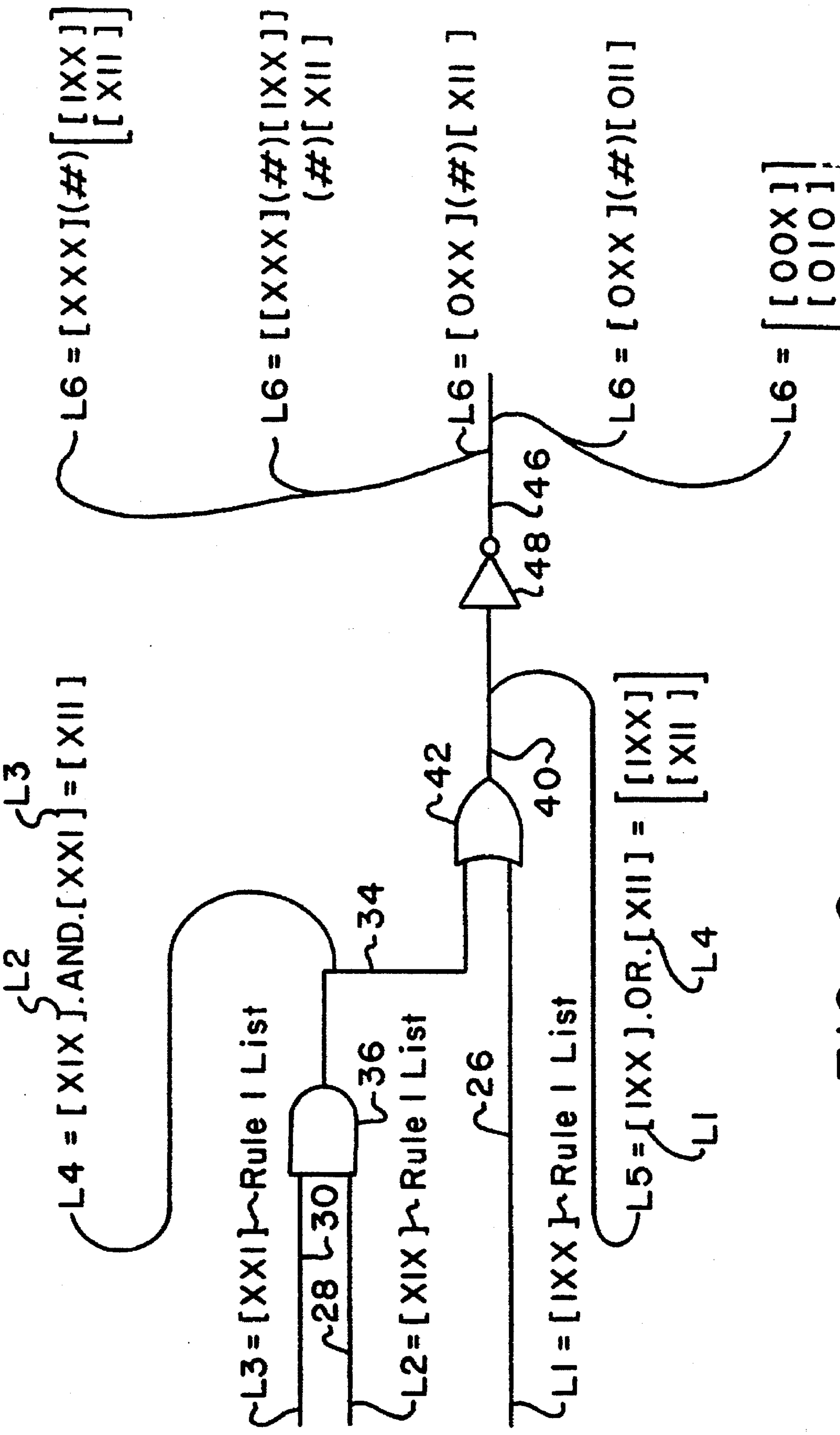
FIG. 2 shows a 1 variable application of Rule 1 Input Lists For A logic circuit composed of an AND gate followed by a OR gate followed by an inverter gate.

As shown in FIG. 2, input lists, such as list Li, list L2, and list L3, are inputs to the FIG. 2 prior art circuit. Each of these lists, such as the list L1, is composed of one cube, as shown in Table 6, of three parts, denoted with symbols: Part 1, Part 2, Part 3. Each part can have one of four values, which are: 1 for a true state, 0 for a false state, X for both a true state and a false state, and N for a null state of not a true state nor a false state. If any part in a cube of a list of more than one cube is a N, the cube is removed and erased from existence and the number of cubes in the list is decreased by one count.

TABLE 6

Prior Art

Title: Single Cube Lists

| Lists | Representation | Part 1 | Part 2 | Part 3 |
|---|---|---|---|---|
| | 1 Cube / List | | | |
| L1 | 1 Character/Part | 1 | X | X |
| L1 | 2 Bits/Part | 01 | 11 | 11 |
| L2 | 1 Character/Part | X | 1 | X |
| L2 | 2 Bits/Part | 11 | 01 | 11 |
| L3 | 1 Character/Part | X | X | 1 |
| L3 | 2 Bits/Part | 11 | 11 | 01 |

The logic code generator 2 generates lists of cubes in accordance to six rules, described below. Lists of cubes can not be created without rules 1 & 2, which were empirically derived in this invention. Rules 1 & 2 must be understood to comprehend how lists of cubes are generated in the logic code generator 2. The list generation is absolutely not generated from truth tables; however, a list of cubes is usually a compressed truth table. Also a list of cubes could possibly be generated very inefficiently however from a truth table. List generation is started from Rules 1 & 2 lists, which are lists with only one cube.

Each Rule 1 list, which is a (n−1)-cube with n parts, has n−1 X's and a 1. Each Rule 2 list, which is a cube with n parts, is either a universe cube of all X's or a null cube.

Since a variable, such as x or y, is represented by a set of Rule 1 lists, a set of Rule 1 lists is called a variable. Since a number, such as 273 or $0.273\times10^3$ is represented by a set of Rule 2 lists, a set of Rule 2 lists can be called a number.

Rules 3 to 6 are assumed to be prior art common sense rules to handle lists of cubes.

Since the logic code generator 2 generates the digital code for each programmable IC 13 by operating on cubes and lists of cubes, the digital mathematics will need to be described. In the prior art section including FIG. 2 and FIG. 3 and FIG. 7, the basic use of lists and cube operations are described.

To understand the construction of the logic code generator 2, the Rules of lists must be understood first. The Rules are the key or critical mathematical knowledge needed for the logic code generator 2 to create the lists to be programmed into each programmable IC 13 from mathematical descriptions. Rules 1 and 2, which are believed to be new knowledge, are described with applications. The Rules 3 to 6 are considered prior art as common sense to handling cubes, such as the needed common sense to the reading of reference: MINI.

Present Invention RULES

A cube, consisting of parts, is defined by the following rules:

RULE 1. A input cube for a variable bus of one part per bus wire, being the only cube in a list, shall have a 1 in the jth part for the jth signal line connected to the jth bus wire and an X in all the other parts, such as cube [XXXX1X] for the j=2 part of a cube of six parts or in other words for the j=2 signal line.

The Rule 1 list on the signal wires from a 2 part variable bus of wires can only be cube [X1] or cube [1X], and can not be cube [X0] or [0X]. The 1 in cube [X1] or cube [1X] means the signal wire is logically true independent of the logical state of the other signal wire.

The input cubes of list L1, list L2, and the list L3 on part 1 signal line A 26, part 2 signal line B 28, and part 3 signal line C 30, respectively are listed in the TABLE 6.

List L4 on signal line output A 34 of a 2 input AND gate A 36 is generated by equation (4).

L4=L2.AND.L3 (4)

The symbol L4 is represented with one manipulated list operation and is represented with one resultant list, as shown in FIG. 2.

The .AND. denotes the logical AND.

From TABLE 6:

L2=[X1X] (6)

L3=[XX1] (8)

The '[' usually denotes the start of a cube at the lowest resolution part side in this invention, such as least significant bit or LSB side, while the ']' usually denotes the end of a cube at the highest resolution side, such as the most significant bit or MSB side.

Equation (4) can be rewritten as follows in equation (10).

L4=[X1X].AND.[XX1] (10)

The AND operation, described in equation (10) results in a single cube with the part ANDing of:

(1) the left part X of cube [X1X] and the left part 1 of cube [XX1] to result in a left part X, (2) the center part 1 of cube [X1X] and the center part X of cube [XX1] to result in a center part 1, and (3) the right part X of cube [X1X] and the right part X of cube [XX1] to result in a right part 1.

Equation (10) is also calculated as shown in table 7, below.

TABLE 7

Prior Art

Title: Calculation of equation (10) involving the AND .of two cubes, being cube L2 and cube L3.

Parts: 1 2 3
Cube L2: [X 1 X ]
Cube L3: [X X 1 ]
Part 1 of cube L2 = X
Part 1 of cube L3 = X
Part 1 of cube L4 = X.AND.X
Part 1 of cube L4 = X
Part 2 of cube L2 = 1
Part 2 of cube L3 = X
Part 2 of cube L4 = 1.AND.X
Part 2 of cube L4 = 1
Part 3 of cube L2 = X
Part 3 of cube L3 = 1

TABLE 7-continued

| |
|---|
| Part 3 of cube L4 = X.AND.1 |
| Part 3 of cube L4 = 1 |
| Thus cube L4 is [X11]. |

The resultant cube [X11] is shown in equation (12).

L4=[X11] (12)

List L5, on signal line output B 40 of a 2 input OR gate A 42 is generated by the equation below, as follows:

L5=L4 .OR. Li (14)

The symbol L5 is represented with one manipulated list operation and is represented with one resultant list, as shown in FIG. 2.

The .OR. denotes the logical OR.

From the equation (12):

L4=[X11] (16)

From TABLE 6:

L1=[1XX] (18)

Equation (14) can be rewritten twice as follows:

L5=[X11].OR.[1XX] (20)

L5=[X11]$\vee$[1XX] (22)

The symbols $\vee$ or .OR. denotes the logical OR.

List L6 on signal line output C 46 of an inverter gate A 48 is generated by:

L6=.NOT. L5 (24)

L6=U (#) L5 (26)

The symbol U in the equation (26) denotes the universe cube of all states, such as [0 . . . 0]$\vee$[0 . . . 01]$\vee$[0 . . . 010]$\vee$. . . $\vee$[1 . . . 1].

The symbol (#) denotes the disjoint sharp operation, where the cubes in list L6 will contain one unique group of states per cube; thus a state will be found in only one cube.

The symbol L6 is represented with four manipulated list operations and is represented with one resultant list, as shown in FIG. 2.

The equation (26) can be rewritten, as follows:

L6=[[XXX](#) [X11 ]](#) [1XX] (27)

As described in equation (27), the removal of two cubes, being cube [X11] and cube [1XX] from the universe is shown in first table 8 for removal of only cube [X11]; then, second in table 9 for the removal of cube [1XX] from the list of {[X0X]+[X01]} from table 8.

TABLE 8

Prior Art

Title: Removal of cube [X11] from the universe
L6 = [ [XXX] (#) [X11] ] (#) [1XX]
Calculation of [ X X X ] (#) [ X 1 1 ]
or [ $a_1$ $a_2$ $a_3$ ] (#) [ $b_1$ $b_2$ $b_3$ ] is:

| | | | | | |
|---|---|---|---|---|---|
| first cube = | [ | $a_1\overline{b_1}$ | $a_2$ | $a_3$ | ] or |
| | [ | X.AND.N | X | X | ] or |
| | [ | N | X | X | ] or |
| | [NNN] | | | | |

According to rule a, null cube [NNN] is to be discarded.

| | | | | | |
|---|---|---|---|---|---|
| second cube = | [ | $a_1b_1$ | $a_2\overline{b_2}$ | $a_3$ | ] or |
| | [ | X.AND.X | A.AND.0 | X | ] or |
| | [ | X | 0 | X | ] or |
| | [XOX] | | | | |
| third cube = | [ | $a_1b_1$ | $a_2b_2$ | $a_3\overline{b_3}$ | ] or |
| | [ | X.AND.X | X.AND.1 | A.AND.0 | ] or |
| | [ | X | 1 | 0 | ] or |
| | [ X 1 0 ] or | | | | |
| | [X10] | | | | |

Thus list { [XXX] (#) [X11] } = disjoint list of [X0X] + [X10].

Removal of cube [1XX] from the resultant list from Table 8 is performed in Table 9.

TABLE 9

Prior Art

Title: Removal of cube [XX1] from the list of [X0X] + [X10] from Table 8 above.
L6 = [ [X0X] + [X10] ] (#) [1XX] or
L6 = [ [X0X] (#) [1XX] ] + [ [X10] (#) [1XX] ] or
L6 = LA + LB,
where LA and LB are calculated below.
LA = [ X 0 X ] (#) [ 1 X X ]
or [ $a_1$ $a_2$ $a_3$ ] (#) [ $b_1$ $b_2$ $b_3$ ] is:

| | | | | | |
|---|---|---|---|---|---|
| first cube = | [ | $a_1\overline{b_1}$ | $a_2$ | $a_3$ | ] or |
| | [ | X.AND.0 | 0 | X | ] or |
| | [ | 0 | 0 | X | ] or |
| | [00X] | | | | |
| second cube = | [ | $a_1b_1$ | $a_2\overline{b_2}$ | $a_3$ | ] or |
| | [ | X.AND.1 | 0.AND.N | X | ] or |
| | [ | 1 | N | X | ] or |
| | [ 1 N X ] or | | | | |
| | [NNN] | | | | |

Accroding to rule a, null cube [NNN] is to be discarded.

| | | | | | |
|---|---|---|---|---|---|
| third cube = | [ | $a_1b_1$ | $a_2b_2$ | $a_3\overline{b_3}$ | ] or |
| | [ | X.AND.1 | 0.AND.X | X.AND.N | ] or |
| | [ | 1 | 0 | N | ] or |
| | [NNN] | | | | |

Accroding to rule a, null cube [NNN] is to be discarded.
Thus cube [00X] is list A.
LB = [ X 1 0 ] (#) [ 1 X X ] is:
or [ $a_1$ $a_2$ $a_3$ ] (#) [$b_1$ $b_2$ $b_3$ ]

| | | | | | |
|---|---|---|---|---|---|
| first cube = | [ | $a_1\overline{b_1}$ | $a_2$ | $a_3$ | ] or |
| | [ | X.AND.0 | 1 | 0 | ] or |
| | [ | 0 | 1 | 0 | ] or |
| | [010] | | | | |
| second cube = | [ | $a_1b_1$ | $a_2\overline{b_2}$ | $a_3$ | ] or |
| | [ | X.AND.1 | 1.AND.X | 0 | ] or |
| | [ | 1 | N | 0 | ] or |
| | [NNN] | | | | |

According to rule a, null cube [NNN] is to be discarded.

| | | | | | |
|---|---|---|---|---|---|
| third cube = | [ | $a_1b_1$ | $a_2b_2$ | $a_3\overline{b_3}$ | ] or |
| | [ | X.AND.1 | 1.AND.X | 0.AND.N | ] or |
| | [ | 1 | 1 | N | ] or |
| | [NNN] | | | | |

Accroding to rule a, null cube [NNN] is to be discarded.
Thus cube [010] is list LB.
The resultant list L6 = { [00X] + [010] }

Resulting in equation (28) from cube [X11] being removed:

L6=[[X0X]+[X10]](#) [1XX] (28)

Resulting in equation (30) from cube [1XX] being removed:

L6 =[00X]$\vee$[010] (30)

Definition of one or more input variables to a logic circuit is illustrated in Table 10 with two variables at 64 bits of resolution per variable.

TABLE 10

Present Invention

Title: Input Lists For A Two Variable Function
Example: The first list Lx1 of 128 parts contains only one cube, which is a 127-cube or [1X..X_X..X] with 127 X's. this 127-cube contains $2^{127}$ O-cubes or about $10^{0.3 \times 127}$ or $10^{+38.1}$ O-cubes.

| Parts: | RULE 1 variable 'x' LSB ... MSB $x_1\ x_2\ x_3$ ......$x_{62}\ x_{63}\ x_{64}$ | RULE 1 variable 'y' LSB ... MSB $y_1\ y_2\ y_3$ ... ..$y_{63}\ y_{64}$ |
|---|---|---|
| Lists | | |
| Lx1: | [1 X..................X | X..................X] |
| Lx2: | [X 1 X...............X | X..................X] |
| Lx3: | [X X 1 X.............X | X..................X] |
| | — | — |
| | — | — |
| | — | — |
| Lx63: | [X.............. X 1 X | X..................X] |
| Lx64: | [X.................X 1 | X..................X] |
| Ly1: | [X.....................X | 1 X...............X] |
| Ly2: | [X.....................X | X 1 X............X] |
| Ly3: | [X.....................X | X X 1 X.........X] |
| | — | — |
| | — | — |
| | — | — |
| Ly63: | [X.....................X | X............X 1 X] |
| Ly64: | [X.....................X | X...............X 1] |

TABLE 11

Present Invention

Title: Input Lists For A Two Variable Function
Example of Rules 1 & 2 for a 6 part input bus, consisting of two 3 bit resolution variables.

| Part/Separate Bus Bus Parts | Rule 1 variable x $x_1\ x_2\ x_3$ $b_1\ b_2\ b_3$ | Rule 1 variable y $y_1\ y_2\ y_3$ $b_4\ b_5\ b_6$ |
|---|---|---|
| Lists | | |
| Lx1 | [1 X X | X X X] |
| Lx2 | [X 1 X | X X X] |
| Lx3 | [X X 1 | X X X] |
| Ly1 | [X X X | 1 X X] |
| Ly2 | [X X X | X 1 X] |
| Ly3 | [X X X | X X 1] |
| Lb1 | [1 X X | X X X] |
| Lb2 | [X 1 X | X X X] |
| Lb3 | [X X 1 | X X X] |
| Lb4 | [X X X | 1 X X] |
| Lb5 | [X X X | X 1 X] |
| Lb6 | [X X X | X X 1] |

Figure 3:
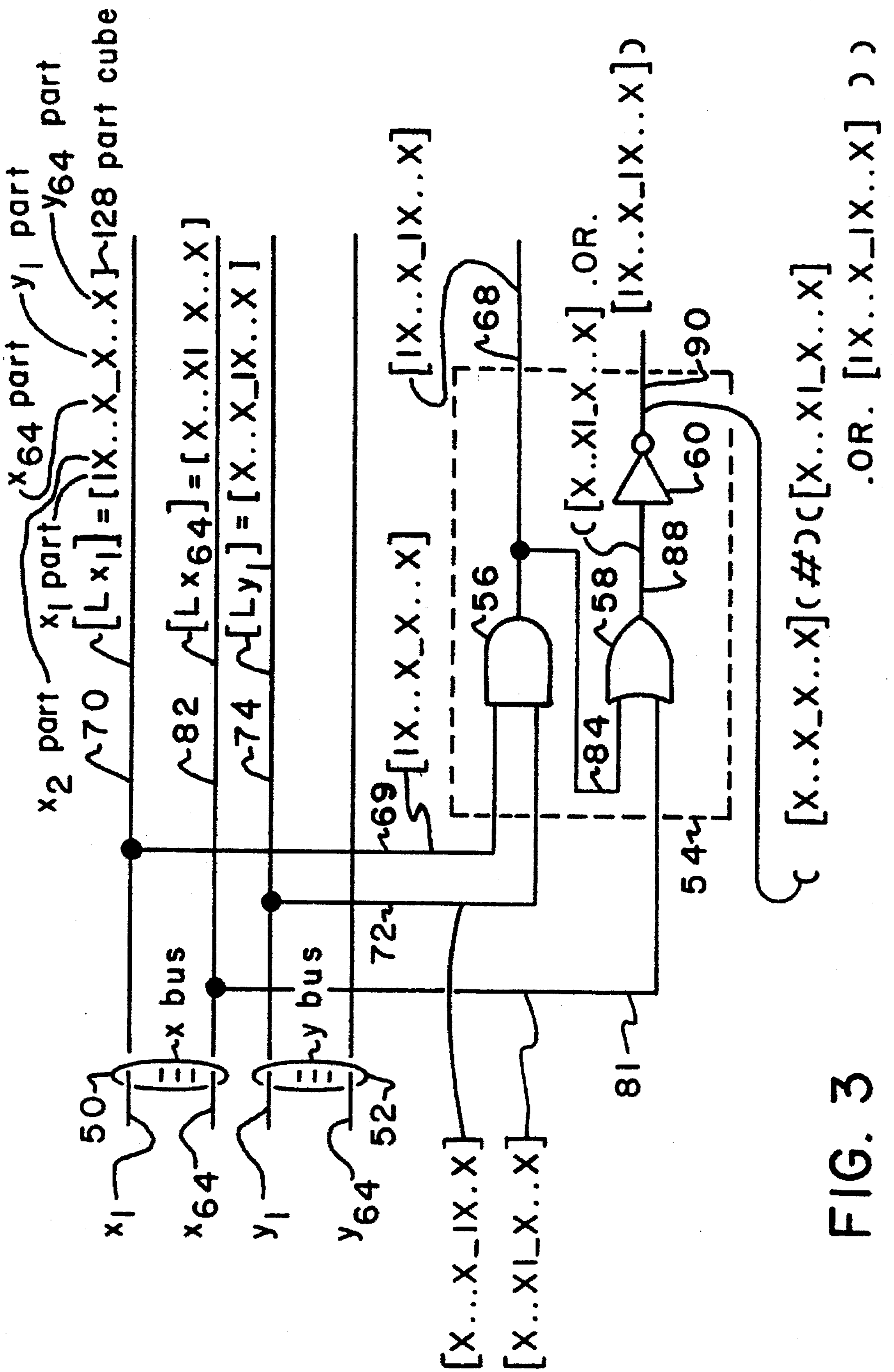
FIG. 3 shows an 2 variable example Using Rule 1 Input Lists for A Logic Circuit.

As shown in FIG. 3, the variable x bus 50, consisting of 64 wires, and the variable y bus 52, consisting of 64 wires, are operated upon by logic circuit A 54, denoted by dotted lines. Inside the logic circuit A 54 are the three basic logic gates: a 2 in AND gate B 56, a 2 in OR gate B 58, and an inverter gate B 60. Rule 1 input lists, representing the wires of the x bus 50, and the y bus 52, such as list Lx1 and list Ly1 both from the TABLE 10, re shown being manipulated by the logic gates in a typical logical-mathematical operation, such as the 2 in AND gate B 56 ANDing list Lx1 and list Ly1, generating output AND gate cube [1X . . . X_1X . . . X], and representing AND gate B output B 68 of the 2 in AND gate B 56. The inputs to the 2 in AND gate B 56 are AND gate B input A 69 connected to bus wire $x_1$ 70, and the 2 input AND gate B input B 72 connected to bus wire $y_1$ 74. The AND gate B input A 69 is represented with list [1X . . . X X . . . X] or list Lx1, and the 2 input AND gate B input B 72 is represented with list [X . . . X 1X . . . X] or list $Ly_1$.

The 2 in OR gate B 58 performs a merge operation of the list [X . . . 1X_X . . . X] or list Lx64 from TABLE 10 representing OR gate B input wire A 81 connected to bus wire $x_{64}$ 82 and output AND gate B cube 66 or [1X . . . X_1X . . . X], representing OR gate B input wire A 84 connected to the AND gate B output B 68.

The inverter gate B 60 performs a list removal operation from the universe cube or [X . . . X_X . . . X] by using the disjoint sharp operation on the OR gate output list, consisting of ORing 2 cubes:

cube list [X . . . X1_X . . . X] and cube list [1X . . . X_1X . . . X], representing the OR gate B output B 88 of the 2 in OR gate B 58. This disjoint sharp list operation is:

cube [X . . . X] (#) cube list [X . . . X1_X . . . X] v cube [1X . . . X_1X . . . X], or

[X . . . X_X . . . X] (#) [[X . . . X](#)[[X . . . X1_X . . . X] v [1X . . . X_1X . . . X]]], and represents the inverter gate B output 90 of the inverter gate B 60, and is shown in FIG. 3.

RULE 2. An input cube for a bus wire on a variable bus having a fixed value, such as 000100 for a fixed number of four shall be a cube of either all nulls or all Xs. With a fixed value on the variable bus of 0001000, the cube for all bus wires having a 0 is null null null null null null and for the third wire having a 1 is XXXXXX. A wire with a forever 1 value means that any state exists where the bus wire will have a 1 value; thus, the list of cubes for this wire will be a single universe cube or a cube of an X in every part. Any state is the same condition as all states resulting in a universe cube of all Xs. If the jth signal line is connected to the j=1st, 2nd, 4th, 5th, 6th bus wire, the 0 means the jth signal line consists of all nulls or all Ns. A wire with a forever 0 value means that no state exists or a null list exists where the wire will have a 1 value. No state is the null universe resulting in a null cube of all nulls or Ns.

A variable bus with a fixed value, or number, is defined in accordance with Rule 2; thus, a bus line at logic true or state 1 has a universe cube or cube [XX . . . XX] and a bus line at logic false or state 0 has a null cube. Note: a null cube can only be handled with more than 1 bit per part, such as 00 for a null 1 part cube.

Rule 2 is believed to be a difficult concept to grasp initially. The lists on the signal wires from a 2 part bus connected to true logic and/or false logic wires can only be a universe cube, such as a 2 part cube XX or a null cube. If a wire is grounded (false logic state) or connected to a '+0 volt' wire of a bus, which must have a number, the null cube for the wire means there are no states when the wire would be logically true or '+5 volts'. A voltmeter, connected to ground, will never record '+5 volts'. Never or no states means the inverse of all states; thus never means a null cube. If a wire is connected to '+5 volts' or connected to a '+5 volt' wire of a bus, which must have a number, the universe cube for the wire means the wire will always independently be logically true. A voltmeter, connected to '+5 volts', will always record '+5 volts'. Always means the inverse of the null cube; thus always means a universe cube.

Input lists for a bus, containing variables and numbers, are shown in TABLE 12. Any input list for a part, such as a resolution bit, at:

(I) a '1' or true logic state, is a universe cube or [X . . . X], such as list Lnk or (II) a '0' or false logic state, is a null cube or [N . . . N], such as list Lnj.

A null cube with 2 bits per part is [00 00 00 . . . 00 00].

TABLE 12

| Present Invention | | |
|---|---|---|
| Title: Input Lists For A One Variable Function | | |
| | RULE 1<br>variable 'x'<br>LSB MSB | RULE 2<br>'number'<br>LSB MSB |
| Parts: | $x_1$ $x_2$ $x_3$ ... ...$x_{62}$ $x_{63}$ $x_{64}$ | $n_1$ $n_2$ $n_3$ ... ...$n_{63}$ $n_{64}$ |
| Lists | | |
| Lx1: | [1 X....................X | X.................X] |
| Lx2: | [X 1 X.................X | X.................X] |
| Lx3: | [X X 1 X..............X | X.................X] |
| | — | — |
| | — | — |
| | — | — |
| Lx63: | [X................ X 1 X | X.................X] |
| Lx64: | [X...................X 1 | X.................X] |
| Lnj:<br>( jth part at '0') | [N..................................................N] | |
| Lnk:<br>( kth part at '1') | [X..................................................X] | |

TABLE 13

| Present Invention | | |
|---|---|---|
| Title: Input Lists For A One Variable/One Number Function<br>Example of Rules 1 & 2 for a 6 part input bus, consisting of a 3 bit resolution variable and a 3 bit resolution number. | | |
| | Rule 1<br>variable x | Rule 2<br>number = 5 or thus 101 |
| Part/Separate Bus | $x_1$ $x_2$ $x_3$ | $n_1$ $n_2$ $n_3$ |
| Bus Parts | $b_1$ $b_2$ $b_3$ | $b_4$ $b_5$ $b_6$ |
| Lists | | |
| Lx1 | [1 X X | X X X] |
| Lx2 | [X 1 X | X X X] |
| Lx3 | [X X 1 | X X X] |
| Ln1 | [X X X | X X X] |
| Ln2 | [N N N | N N N] |
| Ln3 | [X X X | X X X] |
| Lb1 | [1 X X | X X X] |
| Lb2 | [X 1 X | X X X] |
| Lb3 | [X X 1 | X X X] |
| Lb4 | [X X X | X X X] |
| Lb5 | [N N N | N N N] |
| Lb6 | [X X X | X X X] |

Figure 4:
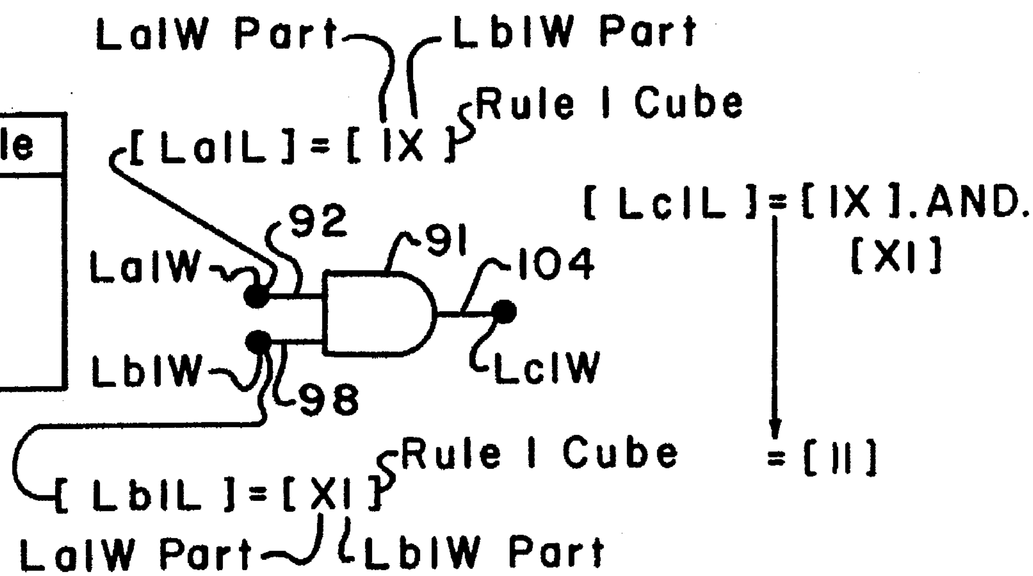
FIG. 4 shows an 1 variable example using Rule 1 and Rule 2.
Figure 5:
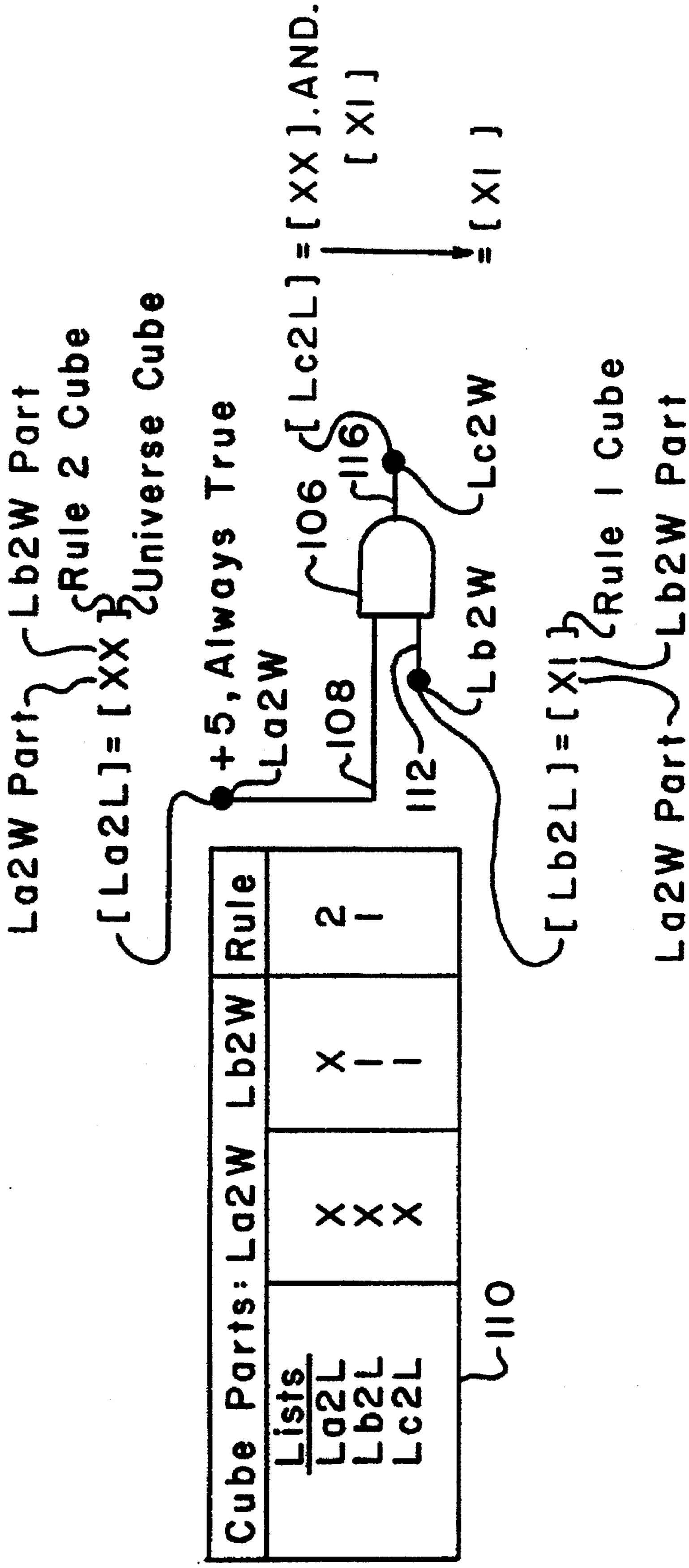
FIG. 5 shows an supply voltage example using Rule 1 and Rule 2.
Figure 6:
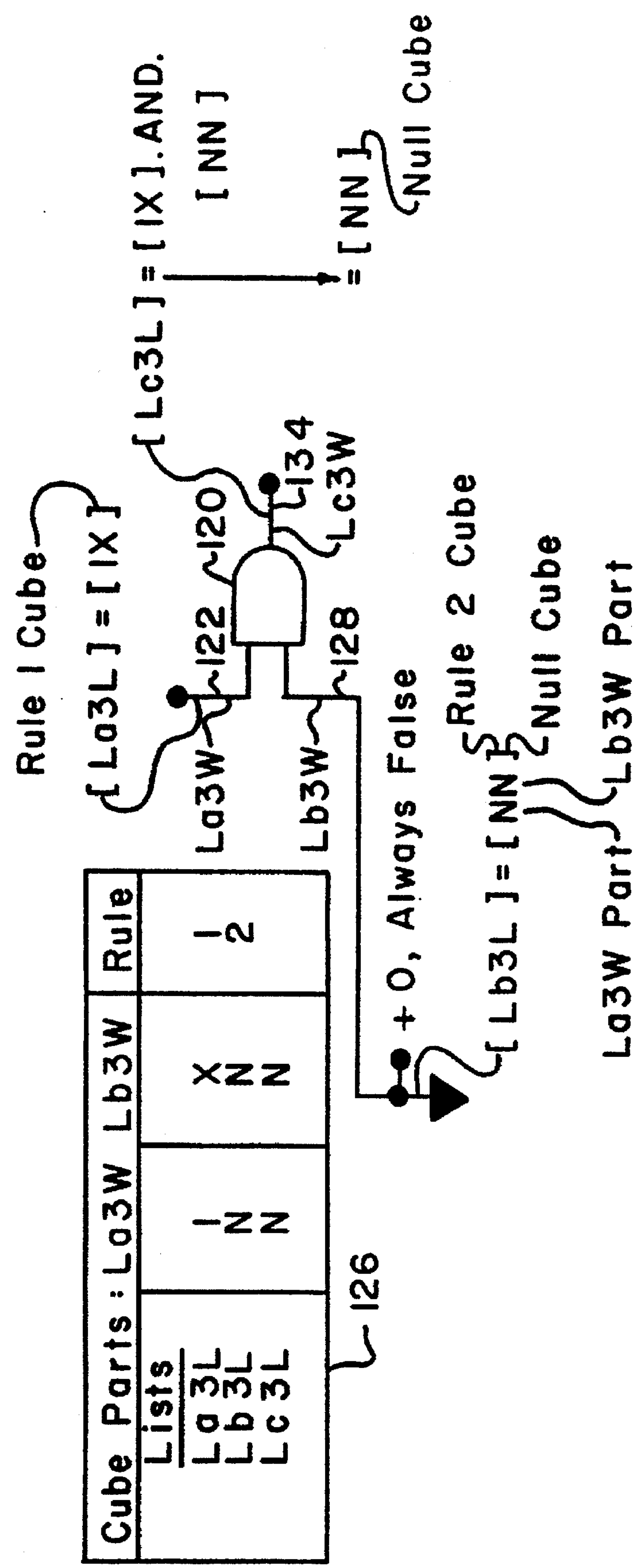
FIG. 6 shows an false voltage or ground voltage example using Rule 1 and Rule 2.

Examples of using Rules 1 and 2 can be shown in FIG. 4, FIG. 5, and FIG. 6. As shown in FIG. 4, a 2_input_AND_gate_C 91 is inputted with wire La1W 92, represented by Rule 1 input list La1L, being cube [1X] in tablet A 96 and with wire Lb1W 98, represented by Rule 1 input list Lb1L, being cube [X1] in the table A 96. The output list Lc1L in the tablet A 96 is the condition for wire Lc1W 104 to be true or '1' if input list La1L and input list Lb1L, when ANDed together create output list Lc1L with a 1 or X in part Lb1W. A condition is a list of numbers or states.

The symbol Lc1L is represented with one manipulated list or cube operation and a resultant cube, as shown in FIG. 4.

As shown in FIG. 5, a 2 in AND gate D 106 in inputted with wire La2W 108, represented by Rule 2 input list La2L, being cube [XX] in table B 110 and with wire Lb2W 112, represented by Rule 1 input list Lb2L, being cube [X1] in the table B 110. Since the wire La2W 108 is always at logic true, list La2L must be a universe cube or [XX] as shown in the tablet B 110. The output list Lc2L, in the tablet B 110 is the condition for wire Lc2W 116 to be true or '1' if input list La2L and input list Lb2L are ANDed together to create output list Lc2L with a 1 or X in part Lb2W.

The symbol Lc2L is represented with one manipulated list or cube operation and a resultant cube, as shown in FIG. 5.

As shown in FIG. 6, a 2 in AND gate E 120 is inputted with wire La3W 122, represented by Rule 1 input list La3L, being cube [1X] in tablet C 126 and with the wire Lb3W 122, represented by Rule 2 input list Lb3L, being cube [NN] in the tablet three 128. The wire Lb3W is at logic false or '0'.

Since the wire Lb3W 122 is always logic false, list Lb3L must be cube [NN] or a null cube. Since the AND of two lists, one of which is a null cube, results in a null cube, then the output list Lc3L in the tablet C 126 will be a null cube for wire Lc3W 134.

The symbol Lc3L is represented with one manipulated list or cube operation and a resultant cube, as shown in FIG. 6.

Figure 7:
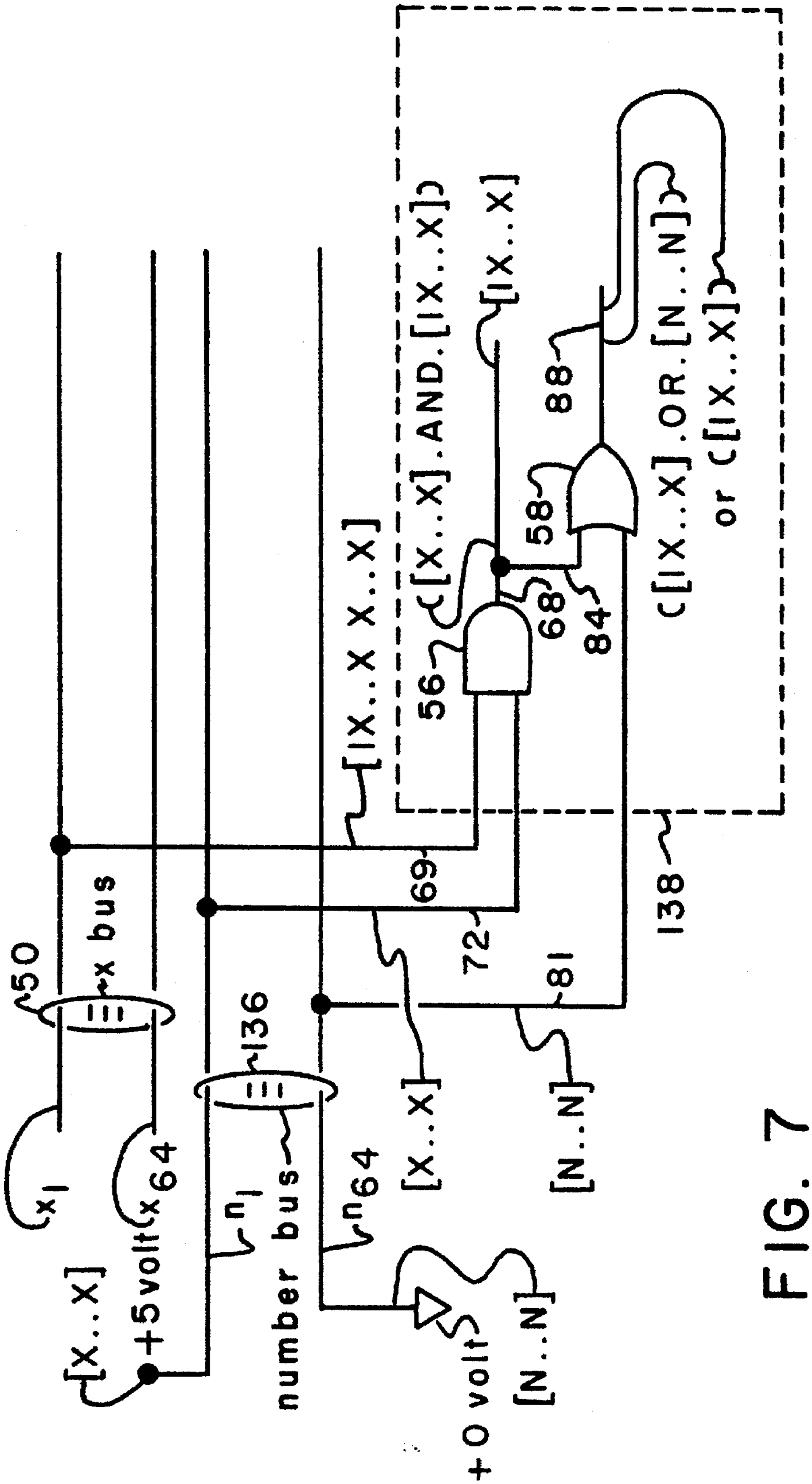
FIG. 7 shows an 2 gate example using Rule 1 and Rule 2 input lists for a logic circuit.

As shown in FIG. 7, the variable x bus 50 consisting of 64 wires, and a number bus 136 consisting of 64 wires, are operated upon by logic circuit B 138, denoted by dotted lines, which is part of the logic circuit A 54. Inside the logic circuit B 138 are the two basic logic gates: the 2 in AND gate B 56, and the 2 in OR gate B 58 from the FIG. 3. A Rule 1 input list, representing a wire connected to the x bus 50, such as list Lx1 from the Table 10 or the list [1X . . . X X . . . X], representing the AND gate B input A 69 and a Rule 2 input list, such as universe list Ln1 or [X . . . X] from the Table 12, representing the 2_input_AND_gate_B_input B 72, connected to bus wire $n_1$ 142 are ANDed together by the 2_input_AND_gate_B 56 to create ((list [X . . . X]).AND.(list [1X . . . X])). The 2_input_AND_gate_B output B 68 is connected to the OR gate B input wire A 84. The OR gate B input wire B 84, represented by list [1X . . . X] and the OR gate B input wire A 81, represented with Rule 2 input list [N . . . N], are merged by the 2 in OR gate B 58. The OR gate B output B 88 is denoted with both (a) [[1X . . . X].OR.[N . . . N]] and (b) [1X . . . X]. cube [1X . . . X] is the result of the cube operation ([1X . . . X] . OR. [N . . . N]). any wire, such as the bus wire $n_1$ 142, if connected to a '1' or +5 volt, is represented by a universe cube or [X . . . X]. Any wire, such as the bus wire $n_1$ 142, if connected to a '0' or +0 volt, is represented by a null cube or [N . . . N].

Rules 3 to 4 are believed to be assumed common sense rules for the handling of cubes, such as needed to read the technical paper reference, called MINI.

RULE 3. An input cube of all null values in a list of more than one cube shall be erased from existence after the number of cubes in the list is decreased by one. Rule 3 is the prior art null rule a, as defined in Background Art Theory section.

RULE 4. A cube with a null in any part is the same as a null cube. Rule 4 is the prior art null rule b, as defined in Background Art Theory section.

RULE 5. The resolution of each input variable must be of the same resolution of the maximum resolution of any input variable bus, which may contain a variable or a number.

RULE 6. The input cube width in parts to any function equals the number of variable buses, which may contain variables and/or numbers, times the maximum resolution of any bus.

Example 1 For Rule 6. A function of k variables of n parts of resolution per variable bus would require all input cubes of all input lists to have a width of kn parts. If this function were w=x+y+z, then k=3, and the input cubes of all wires in the k buses would be as given in Table 13, below.

TABLE 13

Present Invention

Title: Input Lists For A Three Variable Function
Each Cube Consists Of 3n Parts.
Input Cubes For Function Of: w = x + y + z,
k = 3 variables, n parts/variable bus
Set Of Lists: 1 Cube Per Input List According To Rule 1

| Lists | x-bus Parts | y-bus Parts | z-bus Parts | |
|---|---|---|---|---|
| 1 | n n + 1 | 2n 2n + 1 | 3n | Input |
| [1 X . . . | X X . . . | X X . . . | X] | $-x_1$ |
| [X 1 X . . . | X X . . . | X X . . . | X] | $-x_2$ |
| — | — | — | | |
| — | — | — | | |
| — | — | — | | |
| [X . . . | X 1 X X . . . | X X . . . | X] | $-x_{n-1}$ |
| [X . . . | X 1 X . . . | X X . . . | X] | $-x_n$ |
| [X . . . | X 1 X . . . | X X . . . | X] | $-y_1$ |
| [X . . . | X X 1 X . . . | X X . . . | X] | $-y_2$ |
| — | — | — | | |
| — | — | — | | |
| — | — | — | | |
| [X . . . | X X . . . | X 1 X X . . . | X] | $-y_{n-1}$ |
| [X . . . | X X . . . | X 1 X . . . | X] | $-y_n$ |
| [X . . . | X X . . . | X 1 X . . . | X] | $-z_1$ |
| [X . . . | X X . . . | X X 1 X . . . | X] | $-z_2$ |
| — | — | — | | |
| — | — | — | | |
| — | — | — | | |
| [X . . . | X X . . . | X X . . . | X 1 X] | $-z_{n-1}$ |
| [X . . . | X X . . . | X X . . . | X 1] | $-z_n$ |

TABLE 14

Present Invention

Title: Input Lists For A Two Variable/One Number Function
Example of Rules 1 & 2 for a 9 part input bus, consisting of a two 3 bit resolution variables and a 3 bit resolution number.

| | Rule 1 variable x | | | Rule 2 number = 101 | | | Rule 1 variable y | | |
|---|---|---|---|---|---|---|---|---|---|
| Part/Separate Bus Bus Parts | $x_1$ $b_1$ | $x_2$ $b_2$ | $x_3$ $b_3$ | $n_1$ $b_4$ | $n_2$ $b_5$ | $n_3$ $b_6$ | $y_1$ $b_7$ | $y_2$ $b_8$ | $y_3$ $b_9$ |
| lists | | | | | | | | | |
| Lx1 | [1 | X | X | X | X | X | X | X | X] |
| Lx2 | [X | 1 | X | X | X | X | X | X | X] |
| Lx3 | [X | X | 1 | X | X | X | X | X | X] |
| Ln1 | [X | X | X | X | X | X | X | X | X] |
| Ln2 | [N | N | N | N | N | N | N | N | N] |
| Ln3 | [X | X | X | X | X | X | X | X | X] |
| Ly1 | [X | X | X | X | X | X | 1 | X | X] |
| Ly2 | [X | X | X | X | X | X | X | 1 | X] |
| Ly3 | [X | X | X | X | X | X | X | X | 1] |
| Lb1 | [1 | X | X | X | X | X | X | X | X] |
| Lb2 | [X | 1 | X | X | X | X | X | X | X] |
| Lb3 | [X | X | 1 | X | X | X | X | X | X] |
| Lb4 | [X | X | X | X | X | X | X | X | X] |
| Lb5 | [N | N | N | N | N | N | N | N | N] |
| Lb6 | [X | X | X | X | X | X | X | X | X] |
| Lb7 | [X | X | X | X | X | X | 1 | X | X] |
| Lb8 | [X | X | X | X | X | X | X | 1 | X] |
| Lb9 | [X | X | X | X | X | X | X | X | 1] |

TABLE 15

Present Invention

Title: Input Lists For A Three Variable Function
Example of Rules 1 for a 9 part input bus, consisting of a three 3 bit resolution variables

| | Rule 1 variable x | | | Rule 1 variable w | | | Rule 1 variable y | | |
|---|---|---|---|---|---|---|---|---|---|
| Part/Separate Bus Bus Parts | $x_1$ $b_1$ | $x_2$ $b_2$ | $x_3$ $b_3$ | $w_1$ $b_4$ | $w_2$ $b_5$ | $w_3$ $b_6$ | $y_1$ $b_7$ | $y_2$ $b_8$ | $y_3$ $b_9$ |
| lists | | | | | | | | | |
| Lx1 | [1 | X | X | X | X | X | X | X | X] |
| Lx2 | [X | 1 | X | X | X | X | X | X | X] |
| Lx3 | [X | X | 1 | X | X | X | X | X | X] |
| Ln1 | [X | X | X | 1 | X | X | X | X | X] |
| Ln2 | [X | X | X | X | 1 | X | X | X | X] |
| Ln3 | [X | X | X | X | X | 1 | X | X | X] |
| Ly1 | [X | X | X | X | X | X | 1 | X | X] |
| Ly2 | [X | X | X | X | X | X | X | 1 | X] |
| Ly3 | [X | X | X | X | X | X | X | X | 1] |
| Lb1 | [1 | X | X | X | X | X | X | X | X] |
| Lb2 | [X | 1 | X | X | X | X | X | X | X] |
| Lb3 | [X | X | 1 | X | X | X | X | X | X] |
| Lb4 | [X | X | X | 1 | X | X | X | X | X] |
| Lb5 | [X | X | X | X | 1 | X | X | X | X] |
| Lb6 | [X | X | X | X | X | 1 | X | X | X] |
| Lb7 | [X | X | X | X | X | X | 1 | X | X] |
| Lb8 | [X | X | X | X | X | X | X | 1 | X] |
| Lb9 | [X | X | X | X | X | X | X | X | 1] |

Before any set of lists or a list are generated for a mathematical function or expression, the set of lists for the four basic mathematical operations, such as add, subtract, multiply, and divide, must be generated. Before sets of lists for the floating point operations are created, the set of lists for the integer operations must be created.

Figure 8:
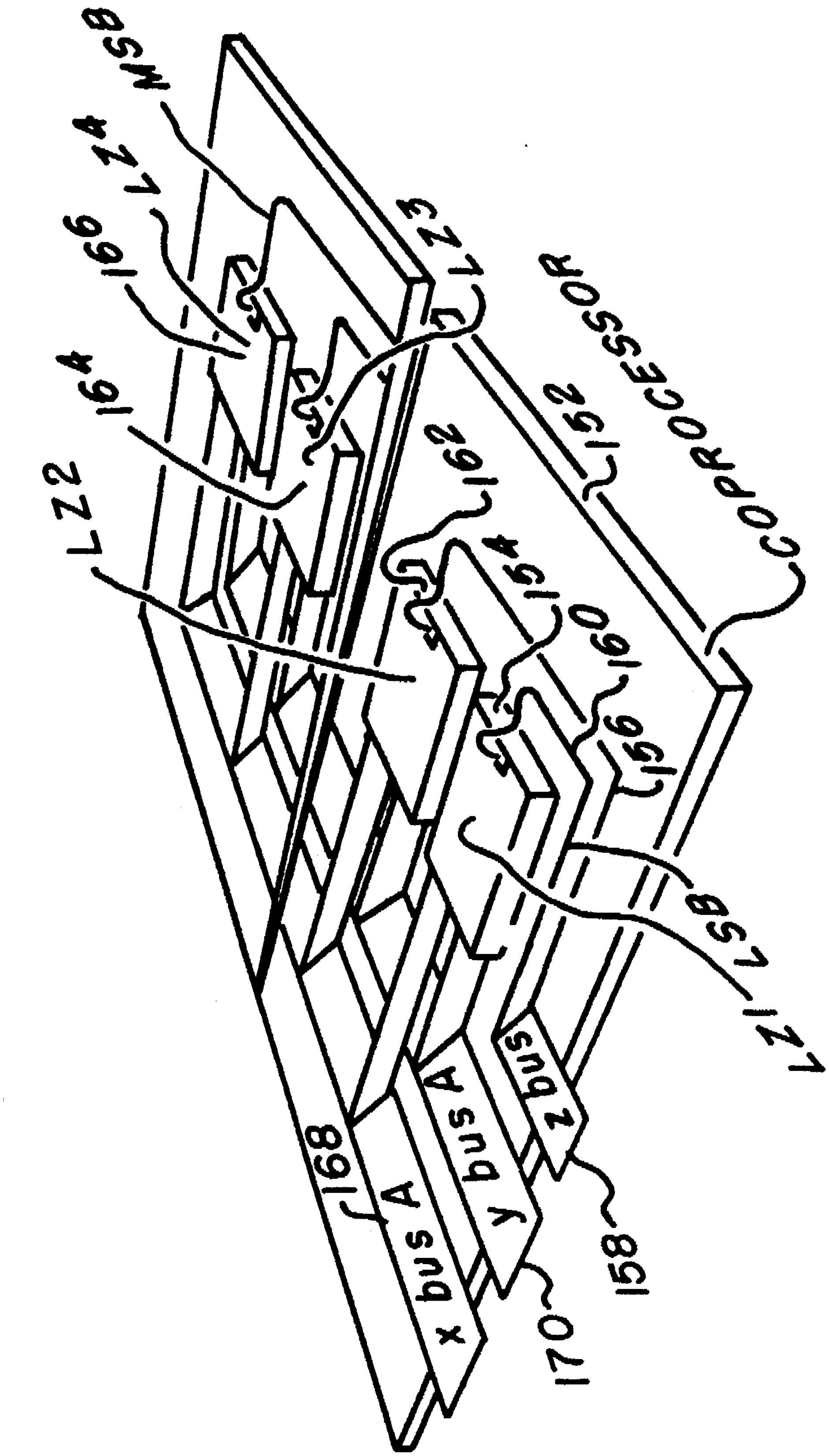
FIG. 8 shows a simplified coprocessor block diagram in a perspective drawing.

As shown in FIG. 8, a simplified coprocessor 152, includes a Lz1 programmable IC 154, denoted with symbol Lz1, and a Lz2 programmable IC 156, denoted with symbol Lz2. The Lz1 programmable IC 154 processes the least significant bit or LSB of a variable z for the z bus 158. This LSB bit of the z bus 158 represents the Lz1 programmable IC output 160, while the other bit of the z bus 158 is the Lz2 programmable IC output 162. The z bus 158 is the 2 bit lower resolution output of the simplified coprocessor 152. The other 2 bit programmable ICs, being Lz3 programmable IC 164, denoted with symbol Lz3, and Lz4 programmable IC 166, denoted with symbol Lz4, of the output of the simplified coprocessor 152 are discarded because the z bus 158 is designated to contain only 2 bits.

The criteria of the simplified coprocessor 152 is as given in Table 16. the simplified coprocessor 152 is to process the

TABLE 16

| Present Invention |
|---|
| Title: Number Of Coprocessor Criterias<br>Item Criteria For The Simplified Coprocessor 152 |
| 1. Resolution for every number and variable: 2 bits |
| 2. Number of input pins of one programmable IC: 2 times 4 = 8 |
| 3. Number of output pins = 1 per programmable IC |
| 4. Number of programmable ICs = 2 |
| 5. The 'z' bus contains parts with 1 bit/part. |
| 6. The 'z' bus will never contain X's or don't care's and will never contain null's. The z bus is effectively a data bus, like in conventional computers. |
| 7. The z bus is limited to a resolution of 2 bits; thus the programmable ICs for the higher binary resolution lists are discarded. |
| 8. The 'x' bus contains 2 bits/part to carry a 1 or a 0 or a X in any part. A resolution of 2 bits means 'x' contains 2 parts. The 'x' bus must have 4 wires for 2 bits/part times 2 parts. |
| 9. The 'y' bus must have 4 wires, because it is the same type of bus as the 'x' bus. |
| 10. The coprocessor processes 'z = f(x,y)' in about 8 nanoseconds, where z is any arbitrary function or 2 variable flowchart. |

algebraic function of equation (32).

$$z=(xy)+1 \quad (32)$$

The 1st part of the equation (32) is equation (34), which is the first logic code generator operation of the logic code generator 2, and is transferred $$w=xy \quad (34)$$

to the logic code generator 2 thru a handshake circuit or prelogic solving apparatus, such as a microcomputer, not shown. The logic code generator 2 will recognize the 'x' in the equation (34) is to be multiplied by 'y' by instructions sent from the prelogic solving apparatus and thus will call from a memory the set of binary integer multiplication lists for n=2 resolution bits. This set is unidentified and probably stored on ROM or hard disk. The set of lists for a 2 bit variable integer multiplier with n set at 2 parts is shown in Table 17. List LF1 or LSB contains $2^{+number\ of\ x's}$ number pairs of x and y; thus, cube [X1X1] for list LSB contains four cubes: (1) 0-order cube or 0-cube [0101] or number 0101 or x=a binary 1 times y=a binary 1 or x=1 times y=1, (2) 0-cube [0111] or number 0111 or x=a binary 1 times y=a binary 3 or x=1 and y=3, (3) 0cube [1101] or number 1101 or x=a binary 3 times y=a binary 1 or x=3 and y=1, and (4) 0-cube [1111] or number 1111 or x=a binary 3 times y=a binary 3 or x=3 and y=3. List MSB of [1111] says ((x=3) .AND.(y=3)) for list MSB to be true.

The set of lists for the equation (32), such as the list LF1 in the Table 17, can only be created by first generating the set of multiplier lists for the equation (34) and then generating the addition set of lists for the equation (32). The equation (32) consists of adding the equation (34) to the value of the number one.

As shown in FIG. 8, two variables: variable x on x bus A 168, and variable y on y bus A 170 are the two inputs to the four programmable ICs:

(1) the Lz1 programmable IC 154,
(2) the Lz2 programmable IC 156,
(3) the Lz3 programmable IC 164, and
(4) the Lz4 programmable IC 166, which together process the equation (32). The x bus A 168 and the y bus A 170, each consist of four wires, since each bus contains 2 parts with 2 wires per part and the x bus A 168 and the y bus A 170 carry numbers and variables, where list Lj is the list of cubes to cover all the states of x and y variables or pairs of x and y numbers or 0-cubes for resolution bit j. Normally, since the programmable ICs, such as the Lz1 programmable IC 154, would process only 0-cubes of states or pairs of x and y numbers or pairs of numbers, the x bus A 168 and the y bus A 170 would consist of 2 parts with 1 wire per part or just 2 wires, and the any order cubes in programming the lists, such as list Lz1 representing the Lz1 programmable IC 154, would be programmed with half cubes. Each half cube would be of the width of the x bus A 168 and the y bus A 170. The number of pins per each Lzj programmable IC, such as the Lz1 programmable IC 154, of the simplified coprocessor 152, would equal the number of parts in both the x bus A 68 and the y bus A 170. Since each part of any cube of any width in general contains 2 bits, half a cube would consist of the first bit of every part and the other half cube would consist of the second bit of every part. The two halves of a hypothetical 64 part cube are shown in Table 18.

TABLE 17

Present Invention

Title: Four Lists For Output Pins
2 Bit By 2 Bit Integer Multiplier Set Of Lists

| Two Variables/2 Parts Per | x' | | y' | |
|---|---|---|---|---|
| Variable | MSB | LSB | MSB | LSB |
| Utilized Lists: LF1 & LF2 | | | | |
| list LF1 or list LSB | | | | |
| cube 1 | [X | 1 | X | 1] |
| list LF2 | | | | |
| cube 1 | [0 | 1 | 1 | X] |
| cube 2 | [1 | 0 | X | 1] |
| cube 3 | [1 | 1 | 1 | 0] |
| cube 4 | [1 | 1 | 0 | 1] |
| Discarded Lists: LD3 & LD4 | | | | |
| list LD3 | | | | |
| cube 1 | [1 | 0 | 1 | X] |
| cube 1 | [1 | 1 | 1 | 0] |
| list LD4 or list MSB | | | | |
| cube 1 | [1 | 1 | 1 | 1] |

Note:
The numbers coming out of a 2 bit by 2 bit integer multiplier can only be: 9, 6, 4, 3, 2, 1, and 0.

TABLE 18

| Present Invention | | | | | | |
|---|---|---|---|---|---|---|
| Title: 64 Part Cubes In Halfs To Be Written Into Coprocessor | 64 Part 'y' Bus: 2 Bits Per Part | | | | | |
| 64 Part Cube: | $y_1$ | $y_2$ | $y_3$ . . . | $y_{62}$ | $y_{63}$ | $y_{64}$ |
| 1 Character Per Part: | 1 | 0 | X . . . | X | X | 1 |
| 2 Bits/Part, 64 Part Cube: | 01 | 10 | 11 . . . | 11 | 11 | 01 |
| First Half of 64 Part Cube: | 0 | 1 | 1 . . . | 1 | 1 | 0 |
| Second Half of 64 Part Cube: . | 1 | 0 | 1 . . . | 1 | 1 | 1 |

The simplified coprocessor 152 contains:

(1) the input bus, such as x bus A 168, (2) the output bus, such as the z bus 158, and (3) the programmable ICs, such as the Lz1 programmable IC 154.

Figure 9:
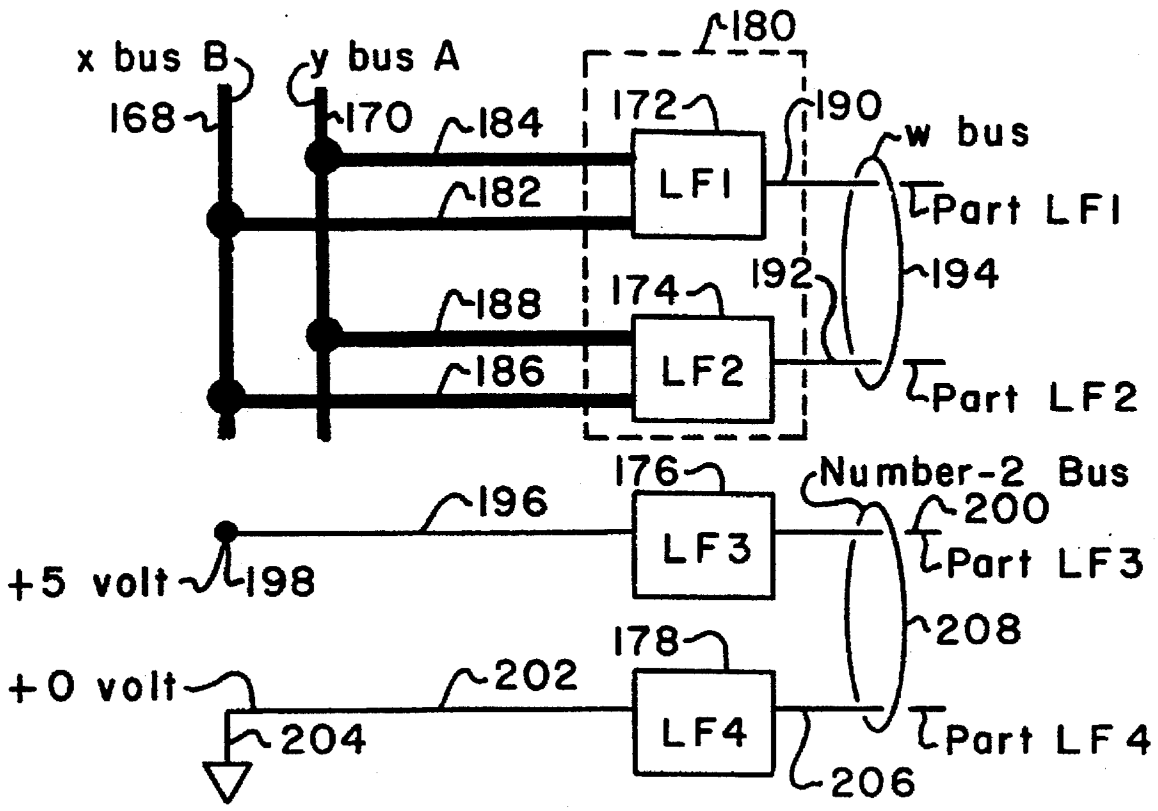
FIG. 9 shows a block diagram of 2 part 'w' bus and 2 part 'number' bus to prepare to input a 2 bit adder.

As shown in FIG. 9, a set of LFj programmable ICs, such as:

(a) LF1 programmable IC 172, denoted with symbol LF1, (b) LF2 programmable IC 174, denoted with symbol LF2, and (c) LF3 programmable IC 176, denoted with symbol LF3, (d) LF4 programmable IC 178, denoted with symbol LF4, are represented with list LF1 and list LF2 in the TABLE 17, and as list LF3 and list LF4 in TABLE 19, respectively. The LF1

TABLE 19

| Present Invention | | | | | |
|---|---|---|---|---|---|
| Title: Comparison Of Characters Per Part And Bits Per Part | Rule 2 Lists | | | | |
| Bus Name: | 'number bus' | | | 'number bus' | |
| Significant Parts: | MSB | LSB = | MSB | LSB | |
| Part Names: | Part LF4 | Part LF3 = | Part LF4 | Part LF3 | |
| Number Of Parts: | 2 Parts | = | 1 Part | 1 Part | |
| Bits: | | Bit 1 | Bit 2 | Bit 1 | Bit |
| 2 | | | | | |
| List LF3: | | | | | |
| cube 1 | | | | | |
| 1 Character/Part: | [X | X] or | | | |
| 2 Bits/Part: | | [1 | 1 | 1 | 1] |
| List LF4: | | | | | |
| cube 1 | | | | | |
| 1 Character/Part: | [N | N] or | | | |
| 2 Bits/Part: | | [0 | 0 | 0 | 0] |

Note:
Cubes in the logic code generator, such as the logic code generator 2, must always be with LSB on left and MSB on right or in this sequence usually from left to right: part 1, part 2, part 3, and part 4. A four part cube, containing two 2 bit resolution number pairs, with MSB on left and LSB on right has the sequence: part 2, part 1, part 4, and part 3. The Rule 2 cubes, with MSB on left and LSB on right are only shown due to conventional number representation.

programmable IC 172, denoted with symbol LF1, and the LF2 programmable IC 174, denoted with symbol LF2, comprise a multiplier coprocessor 180, denoted in dotted lines, which processes the equation (34). An LF1–x input bus 182 and a LF1–y input bus 184, each denoted as 2 Part, connect to the x bus A 168 and the y bus A 170, respectively, denoted as 2 Part and are inputted to the LF1 programmable IC 172, denoted with symbol LF1. An LF2–x input bus 186 and a LF2–y input bus 188, each denoted as 2 Part, connect to the x bus A 168 and the y bus A 170, respectively, denoted as 2 Part and are inputted to the LF2 programmable IC 174, denoted with symbol LF2. An LF1 output wire 190, denoted with symbol Part LF1, is the output of the LF1 programmable IC 172, denoted with symbol LF1. An LF2 output wire 192, denoted with symbol Part LF2, is the output of the LF2 programmable IC 174. The LF1 output wire 190 and the LF2 output wire 192 comprise the w-bus 194, denoted with symbol 'w' Bus, which transmits the results of the equation (34).

An LF3 input wire 196, connects to +5 volt 198, denoted with symbol +5 volt. An LF3 output wire 200, denoted with symbol Part LF3, is represented as a universe cube or a X for Part LF3 with a X for Part LF4, in accordance with Rule 2.

An LF4 input wire 202, connects to +0 volt 204, denoted with symbol +0 volt. An LF4 output wire 206, denoted with symbol Part LF4, is represented as a null cube or a N for Part LF3 with a N for Part LF4, in accordance with Rule 2.

The LF3 input wire 196 and LF4 input wire 202 comprise a number-1 bus 207.

The LF3 output wire 200, denoted with symbol Part LF3, and the LF4 output wire 206, denoted with symbol Part LF4, comprise number-2 bus 208, which contains the number '1', in the equation (32).

The set of lists for the logic code generator-generated variable 'w', where 'w' is defined as (xy) in the equation (34), are: list LF1, list LF2, list LD3, list LD4. However, since the variables and numbers in this example can not be greater than 2 bits, lists LD3 and LD4 are discarded.

The basic set of lists come from two locations, as described below.

Location 1. A logic code generator user can obtain sets of lists stored in a ROM or any other memory, such as a floppy disk.

Location 2. A logic code generator user should create the set of lists at a time period prior to needing the sets of lists. These lists can be stored in conventional memory.

—Basic Four Function Binary Integer Set Generation—

By using the software Fortrix-C, the present Fortran programs should probably be converted to C, since C is believed to utilize less computer memory than Fortran. Fortrix-C is software to transform Fortran to C, from Rapitech Systems, Suffern, New York at telephone number 1-800-FORTRIX.

Figure 10:
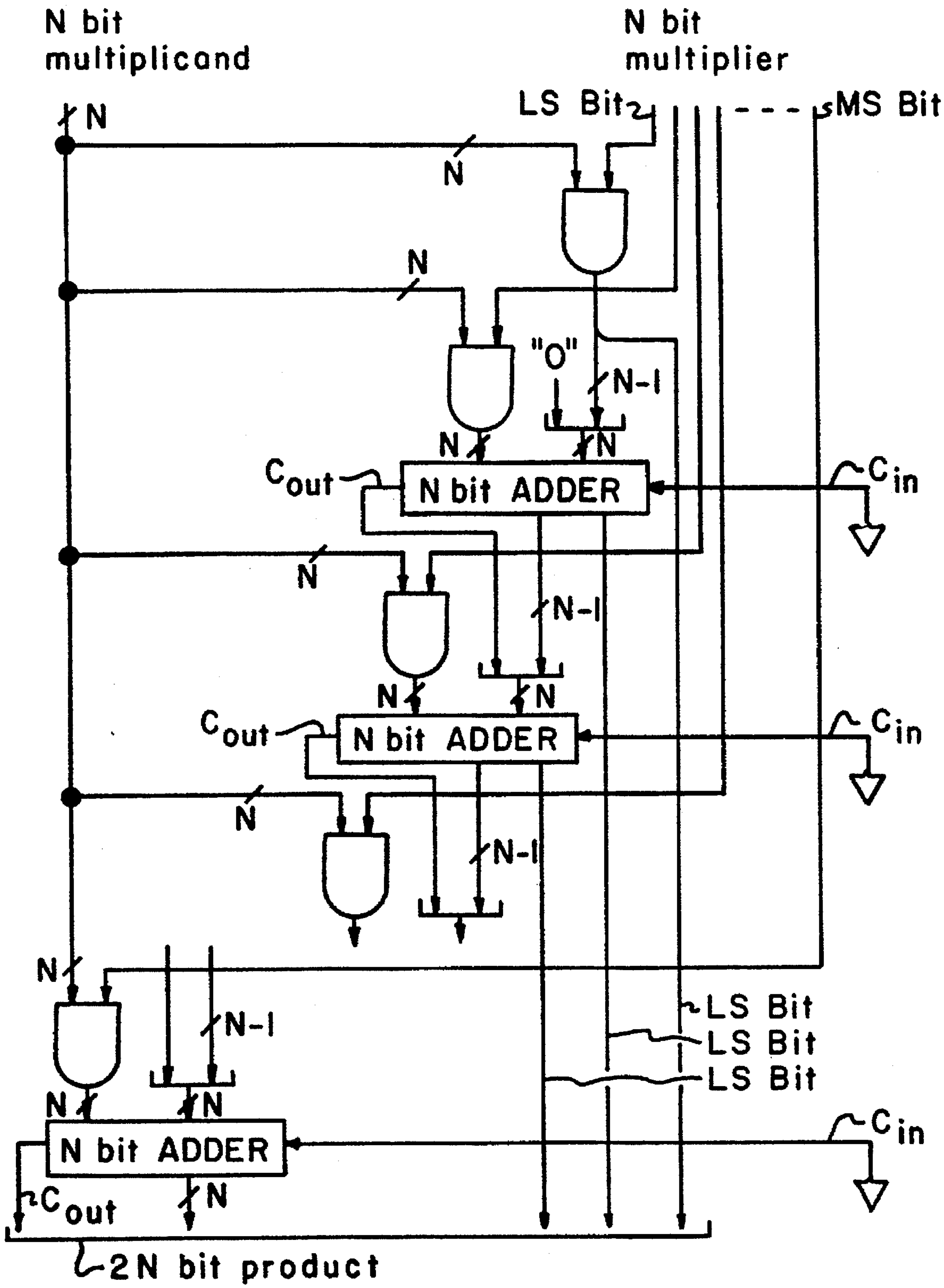
FIG. 10 shows a prior art digital multiplier.
Figure 11:
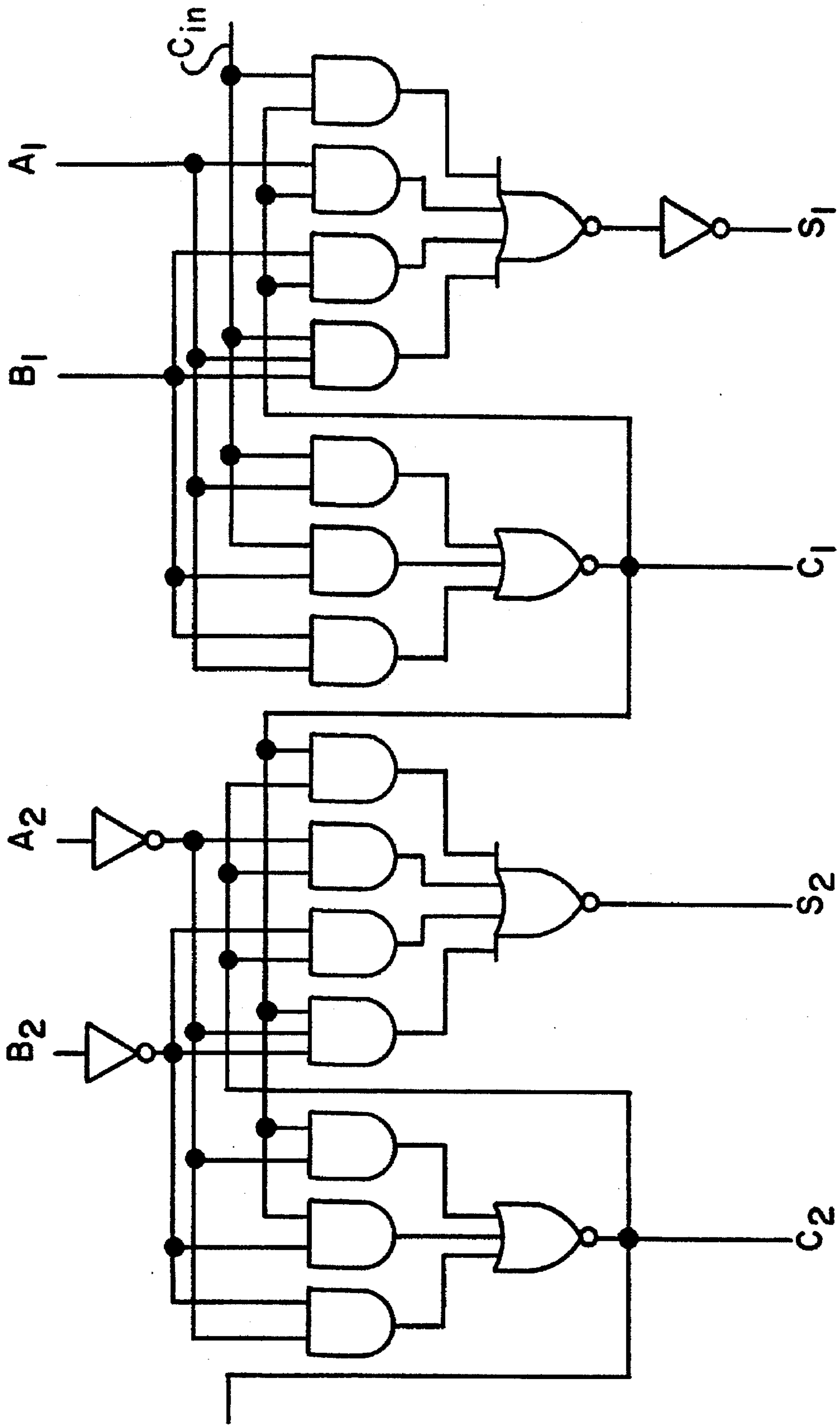
FIG. 11 shows a prior art 2 bit full adder (7482)

Multiplier Set Of Lists Generator Program: The logic code generator 2 will use the microcomputer Fortran computer program M.FOR as shown in Computer Program Listing Number 1 in the Appendix at the end of the description, which has been written by the inventor of this patent. The Computer Program Listing Number 1 was constructed by writing the boolean equations to process lists on the prior art integer array multiplier circuit as shown in FIG. 10. The FIG. 10 multiplier mechanism uses the prior art integer binary adder comprising a cascading circuit of prior art half bit adders (½7482). A prior art full bit adder (7482) is shown in FIG. 11. A 7482 is a full adder, called a 2 bit full adder. Note: See Note 1 in Computer Program Listing Number 1 for status of the multiplier Fortran programs after the main routine common block.

Adder Set Of Lists Generator Program: The logic code generator 2 will use the microcomputer fortran computer program A.FOR as shown in Computer Program Listing Number 2 in the Appendix at the end of the description at the end of the description to generate the set of lists for a k bit cascading integer binary adder. This computer Program Listing Number 2 is incorporated into the above Computer Program Listing Number 1 multiplier program for generating a set of lists for a k bit integer binary adder. This Computer Program Listing Number 2 is also incorporated into all other algebraic computer programs to generate sets of lists. See Note 1 for status in Computer Program Listing Number 2. This Computer Program Listing Number 2 was constructed by writing the boolean equations on the prior art integer half adder (½7482) to handle lists.

Figure 13:
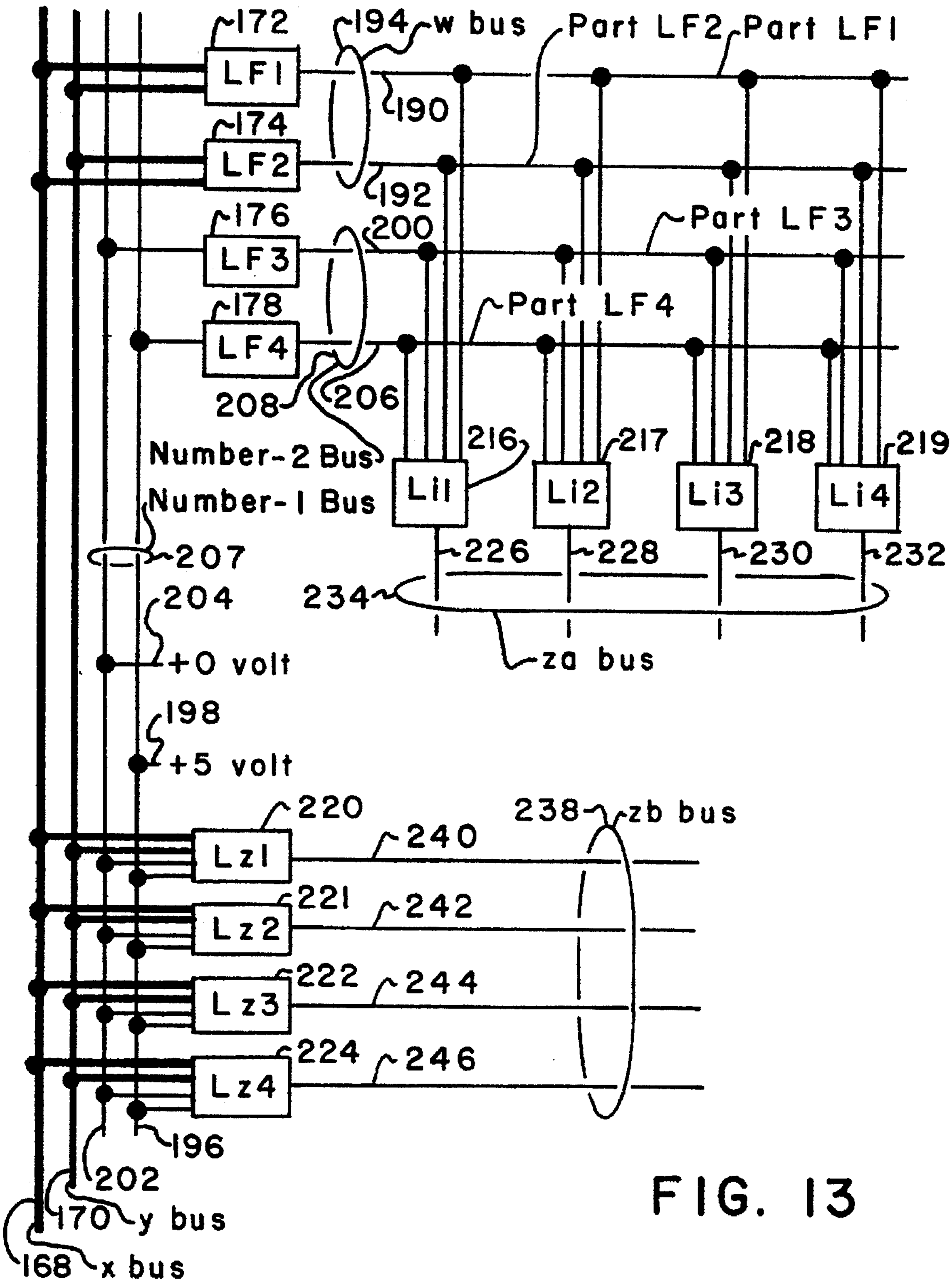
FIG. 13 shows a block diagram of a LF set to be inputted into Li set of lists.

In any of these Fortran programs, such as the adder set of lists generation in A.FOR of FIG. 13 Computer Program Listing Number 2, the basic subroutines are:

RLABEL, LISAND, LISOR, NEGLIS, ADCUBE, SJ, CARRY, DJOINT. The subroutine RLABEL relabels the list in preparation to calling LISAND, LISOR, NEGLIS. The subroutine LISAND takes two lists of cubes and ANDs these two lists. The subroutine LISOR takes two lists of cubes and ORs these two lists. The subroutine NEGLIS takes one list of cubes and removes this list from the universe. The subroutine ADCUBE takes two sum input lists of cubes and a carry input list and generates a sum output list and a carry output list. The subroutine SJ takes two sum input lists of cubes and a carry input list and generates a sum output list. The subroutine CARRY takes two sum input lists of cubes and a carry input list and generates a carry output list. The subroutine NWD removes null cubes from a list and creates an ordering of cubes with the cubes with the most X's as the heaviest cube. The heaviest cubes are listed before the lighter cubes. The subroutine NULL removes null cubes. The DJOINT performs a close boolean minimization on a list.

The circuitry of the logic code generator 2 performs the same operation much faster than subroutines, such as NEGLIS, perform. The various arithmetric programs will direct the cubes of lists to the various circuits within the logic code generator 2.

Signed Subtraction Set Of Lists Generator Program: The logic code generator 2 will use the Fortran computer program in the microcomputer. This program is shown in Computer Program Listing Number 3 in the Appendix at the end of the description at the end of the description and was created using the Computer Program Listing Number 2 twice and a computer routine making up a 'two's complement operation', denoted by symbols in Computer Program Listing Number 3. See Note 1 in Computer Program Listing Number 1 for computer program status in main routine after common block.

Division Set Of Lists Generator Program has not been attempted to date, but it is expected to be very similar to multiplier Computer Program Listing Number 1.

See Note 1 in any program for status.

Floating Point Multiplier Set Of Lists Generator Program: This program, as shown in Computer Program Listing Number 4 in the Appendix at the end of the description at the end of the description, is unbugged. This is the only floating point set generation program attempted.

All these microcomputer set generation programs can be converted to run with the coprocessor, using the technology in this patent.

Figure 12:
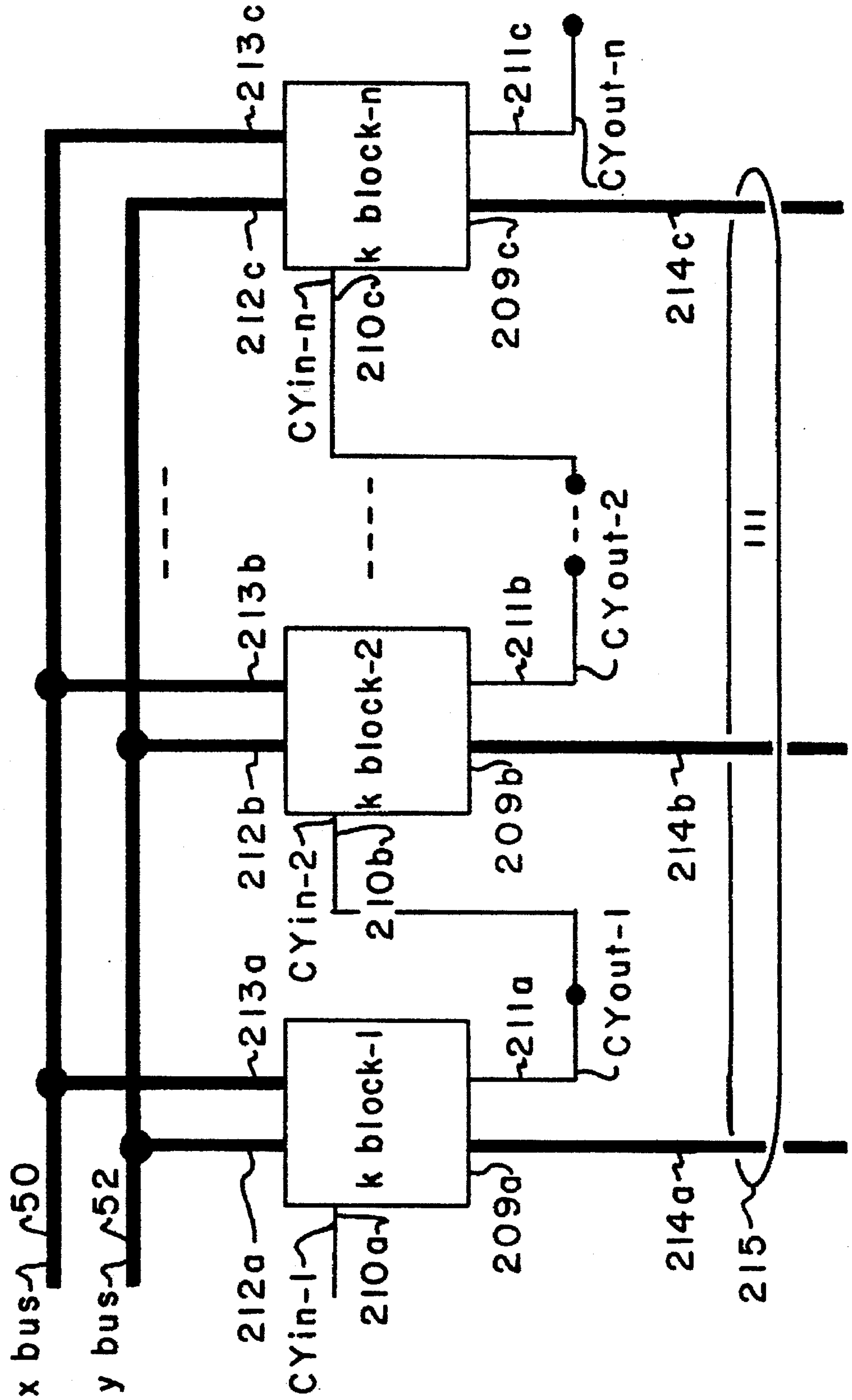
FIG. 12 shows a general cascading of k bit blocks.

Note: 1: Since the carry in to the Computer Program Listing Number 2 integer adder Fortran computer program has been eliminated due to this author's great difficulty in grasping his invented concept of using a null cube for an input list for an electrically grounded carry in pin, the first stage for all programs will need to be repaired to handle the carry in for general cascading of k bit blocks as shown in FIG. 12. Any person, who understands Rules 1 and 2, can easily repair all programs in a few days, if this person is given access to a computer with a Fortran compiler.

All computer programs generate cubes with the LSB of input variables on the left. This format is set in the index 'DO LOOP' for printing lists of the: Computer Program Listings Numbers 1,2,3, and 4.

Input lists are set as Rule 1 type lists. These programs will need a slight repair to input either numbers (Rule 2 lists) or variables (Rule 1 lists). Normally, the logic code generator 2 will generate a set of lists of perhaps a_user_defined_number_of_bits of resolution per variable. The logic code generator 2 will cascade these sets of lists, in accordance with Rule 6, as shown in FIG. 12, for many high resolution input buses.

As shown in FIG. 12, three k bit binary adders are connected to illustrate a nk bit binary adder, consisting of n k bit binary adders, such as the three illustrated k bit blocks:

k_bit_block_1 209*a*, denoted with symbol k_block_1,
k_bit_block_2 209*b*, denoted with symbol k_block_2,
k_bit_block_n 209*c*, denoted with symbol k_block_n, Each k bit block, such as $k_{_1\ bit}$_block_1 209*a*, denoted with symbol k_block_1, has a carry input, such as:

carry_input_1 210*a*, denoted with symbol CYin–1, of the k_bit_block_1 209*a*, denoted with symbol k_block_1,
carry_input_2 210*b*, denoted with symbol CYin–2, of the k_bit_block_2 209*b*, denoted with symbol k_block_2,
carry_input_n 210*c*, denoted with symbol CYin–n, of the k_bit_block_1 209*c*, denoted with symbol k_block_n, Each k bit block, such as k_bit_block_1 209*a*, denoted with symbol k_block_1, has a carry output, such as:

carry_output_1 211*a*, denoted with symbol CYout–1, of the k_bit_block_1 209*a*, denoted with symbol k_block_1,
carry_output_2 211*b*, denoted with symbol CYout–2, of the k_bit_block_2 209*b*, denoted with symbol k_block_2,
carry_output_n 211*c*, denoted with symbol CYout–n, of the k_bit_block_n 209*c*, denoted with symbol k_block_n, Each k bit block receives two number, each on two separate k bit buses, such as:

(bus 1) the k_bit_bus$_{_ya\ 212}$*a*, which is connected to the y_bus 52, denoted with symbol y and denoted with symbol nk, and
(bus 2) the k_bit_bus_xa 213*a*, which is connected to the x_bus 50, denoted with symbol x and denoted with symbol nk.

In turn, the other k bit blocks receive two numbers, each on two separate k bit buses, such as:

(bus 1) the k_bit_bus_yb 212*b*, which is connected to the y_bus 52, denoted with symbol y and denoted with symbol nk, and
(bus 2) the k_bit_bus_xb 213*b*, which is connected to the x_bus 50, denoted with symbol x and denoted with symbol nk.

The designation of nk on each input number bus could be for n equal to 16 and k equal to 4 for an nk value of 64 bits of resolution. Each k bit block generates a k bit sum, such as:

(1) the k_bit_block_1 209*a*, denoted with symbol k_block_1, generates a k bit sum on k_bit_sum_bus_1 214*a*, denoted with symbol k, for input variable parts: 1 to k and output variable parts: 1 to k,
(2) the k_bit_block_2 209*b*, denoted with symbol k_block_2, generates a k bit sum on k_bit_sum_bus_2 214*b*, denoted with symbol k, for input variable parts: k+1 to 2k and output variable parts: k+1 to 2k,
(3) the k_bit_block_n 209*c*, denoted with symbol k_block_n, generates a k bit sum on k_bit_sum_ bus_n 214*c*, denoted with symbol k, for input variable parts: (n−1)k to nk and output variable parts: (n−1)k to nk.

The placement of all k bit sum buses, such as: the k_bit_sum_bus_1 214*a* to range to the k_bit_sum_bus_n 214*c*, will produce an nk_resolution_output 215, denoted with symbol nk lines.

The logic code generator 2 considers each input line, such as the carry_input_1 210*a*, denoted with symbol CYin−1, as a list of cubes. Each cube consists of states of (x,y) number pairs that cause the input line to be at a true logic state. For example, if the carry input, such as the carry_input_1 210*a*, noted with symbol CYin-1, to the first stage k bit adder, such as the k_bit_block_1 209*a*, denoted with symbol k block_1, is permanently connected to ground or a false logic voltage, then no (x,y) number pairs exist to cause the carry input to have a true logic state voltage. Thus, the logic code generator 2 considers the list of any grounded line or false logic state line to be represented with a null cube.

The boolean equations used for the adder of the FIG. 11 are equations (86), (88), (90), and (92).

—Back to Describing the LF Set of Lists—

The block diagram of the LFj set, such as the LF1 programmable IC 172, denoted with symbol LF1, with outputs to be inputted into the Li set of circuits as shown in FIG. 13.

Note: The F in LF means function set of lists. The i in Li means instruction. Set Li is a set of lists containing instruction cubes in each list. An instruction cube looks exactly like a cube, but is a cube that tells the logic code generator how to operate on the LF set of lists to create the mapped function ($f_1(f_2(\ldots))$) set or LNEW set of lists. The Li set of lists, which are for the equation (32), are standard lists for a binary adder and are shown in Table 20. the Li set were generated from the Computer Program Listing Number 2 with both n and k equal to 2 bits.

TABLE 20

Present Invention

Title: The Three Lists For A Two Bit Integer Adder
2 Bit By 2 Bit Integer Binary Adder

| Two Variables/2 Parts Per | 'w' | | 'number' | |
|---|---|---|---|---|
| Variable | MSB | LSB | MSB | LSB |
| Li1 or LSB list | | | | |
| cube 1 | [X | 0 | X | 1] |
| cube 2 | [X | 1 | X | 0] |
| Li2 list | | | | |
| cube 1 | [0 | 0 | 1 | X] |
| cube 2 | [1 | 0 | 0 | X] |
| cube 3 | [0 | 1 | 1 | 0] |
| cube 4 | [1 | 1 | 1 | 1] |
| cube 5 | [0 | 1 | 0 | 1] |
| cube 6 | [1 | 1 | 0 | 0] |
| Li3 or MSB list | | | | |
| cube 1 | [1 | 0 | 1 | X] |
| cube 2 | [1 | 1 | X | 1] |
| cube 3 | [1 | 1 | 1 | 0] |
| cube 4 | [0 | 1 | 1 | 1] |

Note:
The numbers coming out of a 2 bit plus 2 bit integer adder can only be: 6, 5, 4, 3, 2, 1, and 0.

Figure 18:
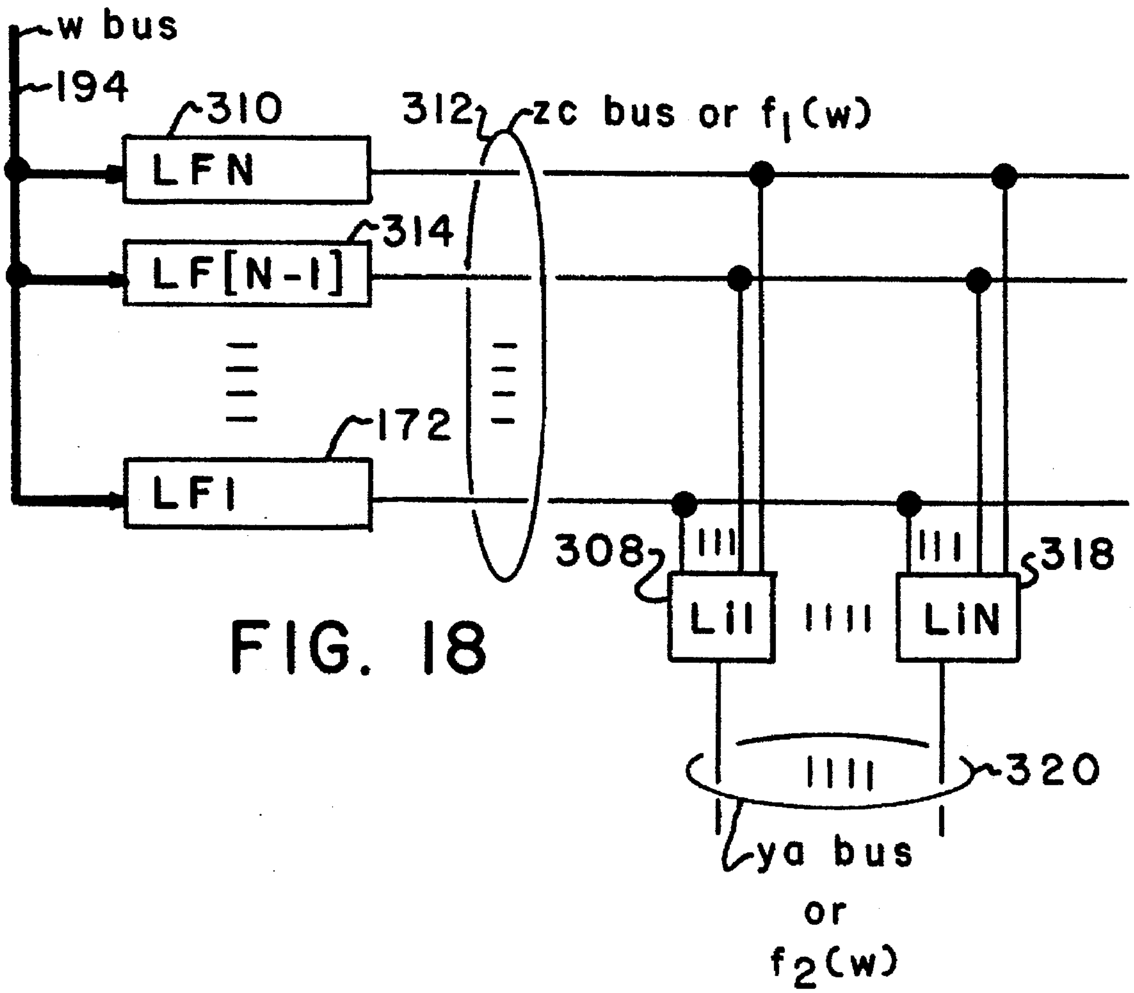
FIG. 18 shows a block circuit of set LF and set Li.

As shown in FIG. 18, a set of equivalent AND/OR circuits, which are:

(1) circuit Li1 216, represented by list Li1, (2) circuit Li2 217, represented by list Li2, (3) circuit Li3 218, represented by list Li3, and:

(4) circuit Li4 219, represented by list Li4, perform the same logic that a set of equivalent AND/OR circuits, which are:

(a) circuit Lz1 220, represented by list Lz1, (b) circuit Lz2 221, represented by list Lz2, (c) circuit Lz3 222, represented by list Lz3, and:

(d) circuit Lz4 224, represented by list Lz4, perform on and are connected to (1) the x bus A 168, (2) the y bus A 170, and (3) the LF3 input wire 196 and (4) the LF4 input wire 202.

The respective output wires of the set of equivalent AND/OR circuits, such as the circuit Li1 216, are:

(1) output wire Li1 226 of the circuit Li1 216, denoted with symbol Li1, (2) output wire Li2 228 of the circuit Li1 217, denoted with symbol Li2, (3) output wire Li3 230 of the circuit Li3 218, denoted with symbol Li3, (4) output wire Li4 232 of the circuit Li1 219, denoted with symbol Li4, respectively, and comprise the za bus 234. The za bus 234 is also equivalent to zb bus 238, consisting of respective output wires of the set of equivalent AND/OR circuits, such as the circuit Lz1 220. The zb bus 238 has output wires of:

(1) output wire Lz1 240 of the circuit Lz1 220, (2) output wire Lz2 242 of the circuit Lz3 221, (3) output wire Lz3 244 of the circuit Lz3 222, and (4) output wire Lz4 246 of the circuit Lz4 224, respectively.

Figure 14:
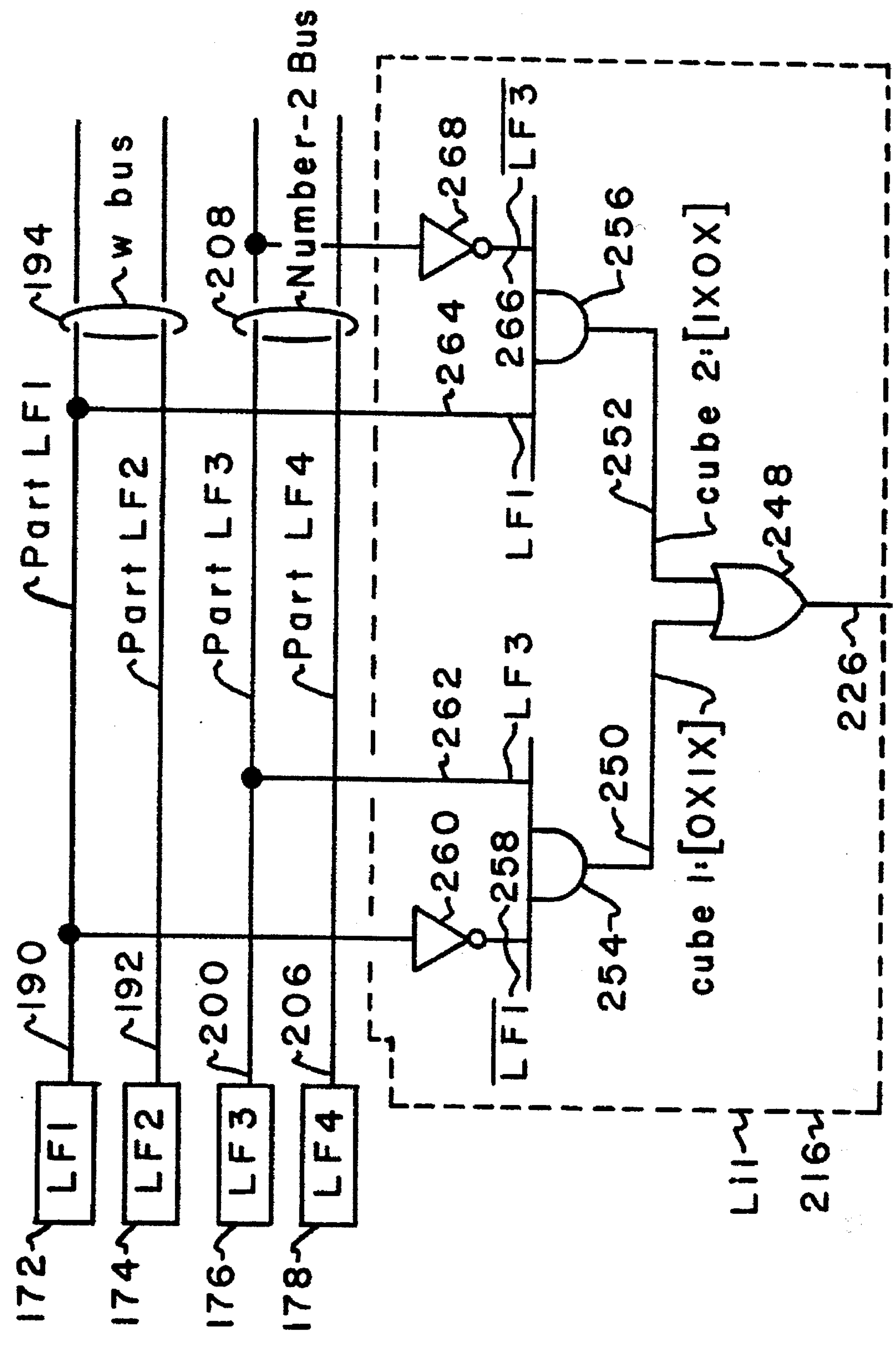
FIG. 14 shows a logic diagram showing only Li1 as a 2 cube PLA and with the Lf set.

From Table 20 and shown in FIG. 14, the circuit Li1 216 can be presented as a PLA containing 2 AND gates or cubes. The cubes are shown in FIG. 14 with the LSB on the left of the cube and in increasing order of 1, 2, 3, and 4 to the right of the cube for the cube parts.

As shown in FIG. 14, the circuit Li1 216 consists of a 2 in OR gate C 248 inputted by the 2_input_AND_gate_F_output 250 and 2_input_AND_gate_G_output 252, denoted with symbol cube 2: [1X0X] of 2_input_AND_gate_F 254 and 2_input_AND_gate_G 256, respectively. The 2_input_AND_gate_F 254, represented by cube 1 or [0X1X] and denoted with symbol cube 1: [0X1X], is inputted by the inverter_gate_C_output 258, denoted with symbol LF1, of inverter_gate_C 260 and a wire A 262, denoted with symbol LF3, connected to the LF3 output wire 200. The cube instruction of cube 1 or [0X1X], denoted with symbol cube 1 or [0X1X], represented the 2_in_AND_gate_F 254, and is to AND the NOT of the list LF1, representing the NOT of the LF1 programmable IC 172, with the list LF3, representing the LF3 programmable IC 176. The other cube instruction of the circuit Li1 210, denotted in dotted lines, is cube 2 or [1X0X], denoted with symbol cube 2 or [1X0X], which represents the 2_in_AND_gate_F 256. The 2_in_AND_gate_F 256 is inputted by a LF1 wire 264, denoted with symbol LF1, connected to the LF1 output wire 190 and is inputted by the inverter gate D output 266, denoted with symbol LF3, of inverter gate D 268, which inverts the LF3 output wire 200. The cube instruction of cube 2, represents the 2_in_AND_gate_F 256, and is to AND the list LF1, representing the LF1 programmable IC 172 with the NOT of the list LF3, representing NOT the LF3 programmable IC 176.

Note: Cubes in the logic code generator, such as the logic code generator 2, must always be with LSB on left and MSB on right or in this sequence: part 1, part 2, part 3, and part 4. A four part cube, containing two 2 bit resolution number pairs, with MSB on left and LSB on right has the sequence; part 2, part 1, part 4, and part 3. The Rule 2 cubes, with MSB on left and LSB on right are only shown due to conventional number representation.

As shown in Table 21, three sets of lists are used in hand operations to generate the list of cubes to represent the states of the 'x' bus 50 of FIG. 3, the 'y' bus 52 of FIG. 3, and the 'number' bus 136 of FIG. 7 for the output wire Li1 226 or the output wire Lz1 240 to be logically true. In Table 21, the first number operation with list LNEW1 represents the output wire Li1 226. The 24th number operation in Table 21 shows the two cubes for list LNEW1, representing the output wire Li1 226, to be true. The cube [0XXX] contains $2^{number\ of\ x's}$ or $2^3$ or 8 states and the cube [1X0X] contains $2^{number\ of\ x's}$ or $2^4$ or 4 states. For list LNEW1 to be true, the number of states of x and y number pairs is 8+4 or 12 x and y number pairs.

One purpose of the logic code generator 2 is to map the set of lists LFj thru the set of lists Lij to create a new set of lists Lzj or set LNEWj.

TABLE 21

Present Invention

Title: Hand Operations Of The Three List Operations: (#) and .AND. and .OR., needed to logically perform the operation of the circuit Li1 210, are presented below.

| Number | List Operation Equation |
|---|---|
| 1 | LNEW1 = (LF1.AND.LF3).OR.(LF1.AND.LF3) |
| 2 | or LNEW1 = LNEW11 .OR. LNEW12 |
| 3 | LF1 = [1X1X] |
| 4 | LF1 = [XXXX] (#) [1X1X] |
| 5 | LF1 = [0XXX] |
| | V [1X0X] |
| 6 | LF3 = [XXXX] |
| 7 | LNEW11 = ([0XXX] |
| | V [1X0X]) .AND. [XXXX] |
| 8 | LNEW11 = [0XXX] |
| | V [1X0X] |
| 9 | LF3 = [XXXX] (#) [XXXX] |
| 10 | LF3 = [null] |
| 11 | LNEW12 = [1X1X].AND.[null] |
| 12 | LNEW12 = [null] |
| 13 | Rule 3 says to discard LNEW12, since LNEW12 is a null cube. |
| 14 | LNEW1 = [0XXX] |
| | V [1X0X] |

Mapping of one function thru another or '$f_{out}=f_{map}(f_{input})$' is described below.

Figure 15:
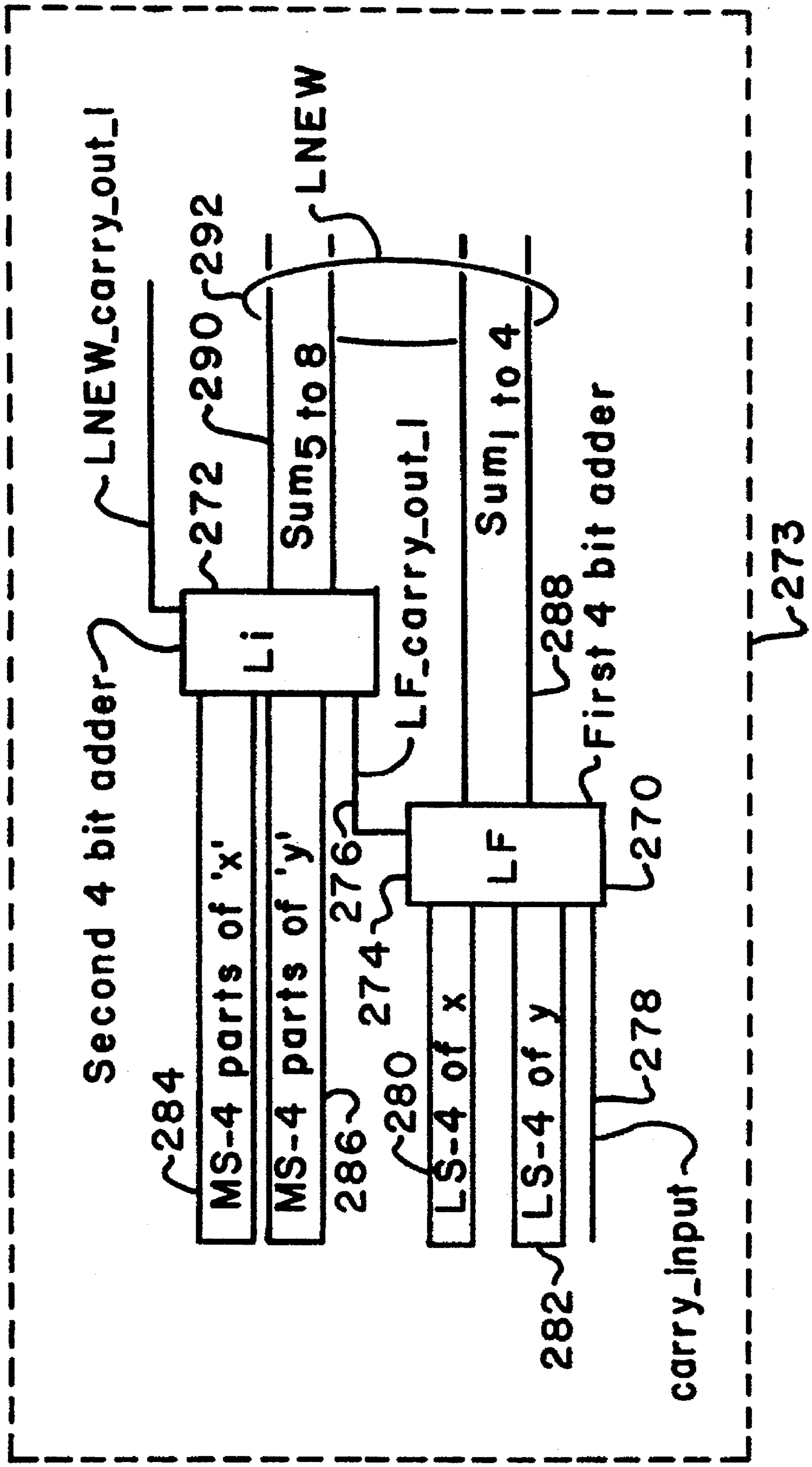
FIG. 15 shows a circuit of blocks LF & Li & Carry for two 4 bit adders.

Illustrated with LF, Li, and LNEW in FIG. 15

(a) LF represents function $f_{input}$ (b) Li represents function $f_{map}$ (c) LNEW represents function $f_{out}$ The set of lists Li or set of lists of cubes, which are used as instructions, map set LF into set LNEW.

A cube instruction is an ANDing of true and false lists of the set LF.

Example: let cube instruction=[01X] and be one of many cube instructions in the jth list Lij in set Li. Let set of lists LF consist of: LF1, LF2, LF3 Cube instruction 01X means to create a list in list $LNEW_j$, such as list LNEW1 of 'LF1.AND.LF2', in accordance with equation (36).

$$LNEW1=LF1.AND.LF2 \tag{36}$$

This list, created from cube instruction [01X], is one list in a set of other lists, each created by a cube instruction, and is ORed or merged to these other lists to become the jth output list $LNEW_j$.

The '0' in the first position of cube instruction '[01X]' means taking the inverted or disjoint sharp of list LF1 and ANDing with the next list at the next position. The '1' in cube instruction '[01X]' means the next list is the true list LF2. Since no more 0's or 1's exist in this cube instruction, the first list group or portion of list $LNEW_j$ is LF1.AND.LF2. Example of adder circuit illustrating LNEW or Sum is a mapping of set LF thru set Li: As shown in FIG. 15, the generation of k bit functions, such as two 4 bit integer adders, LF 4 bit adder 270 and Li 4 bit adder 272 to form an 8 bit integer adder 273, denoted in dotted lines. The first adder carry output 274 is denoted with symbol LF_carry_out_1 and represented by list LF_carry_out_1, which is inputted to the Li_4_bit_carry_input 276 to the second 4 bit adder or the Li_4_bit_adder 272. The first adder or the LF_4_bit_adder 270, denoted with symbol LF and denoted with symbol First 4 bit adder is represented by set of lists LF, while the second adder or the Li_4_bit_adder 272, denoted with symbol Li and second 4 bit adder, is represented by the set of lists Li. The first adder or the LF_4_bit_adder 270, denoted with symbol LF and denoted with symbol First 4 bit adder, is inputted by first adder carry input 278, denoted with symbol carry_input, and the least significant parts of the x variable or LS-4 of x 280 and the least significant parts of the y variable or LS-4 of y 282. The second 4 bit adder 272, denoted with symbol Li and denoted with symbol Second 4 bit adder, is inputted by the Li_4_bit_carry_input 276 and the most significant parts of the x variable or MS-4 of x 284 and the most significant parts of the y variable or MS-4 of y 286.

The LF_4_bit_adder_bus 288, denoted as $sum_{1\ to\ 4}$ and represented by sum lists of LF of the first adder LF_4_bit_adder 270, denoted with symbol LF and First 4 bit adder, and the Li_4_bit_adder_output_bus 290, denoted of $sum_{5\ to\ 8}$ of the second adder or the Li_4_bit_adder 272, denoted with symbol Li and denoted with symbol Second 4 bit adder, comprise the 8 bit adder output bus 292, denoted with symbol LNEW, of the 8 bit adder 273, denoted in dotted lines.

The FIG. 15 circuit can be explained with Table 22 and Table 23.

TABLE 22

Present Invention

Title: Resultant List Appearance
LNEWj & Carry Out
Set Definition: if carry input or CYIN is false and thus represented with a Rule 2 input list of a null cube, then list LNEWj is for list LS $sum_{1-4}$ and MS $sum_{5-8}$ and LF Carry Out. The CYIN part could be arbitrarily set with 0 instead of X with all input Rule 1 and Rule 2 lists set with CYIN part set with a 0 instead of an X. '(Valid)' means a portion of a cube contains valid parts.

| Part Names: | Carry Input | LS-4 | MS-4 | LS-4 | MS-4 |
|---|---|---|---|---|---|
| Parts: | CYIN | $x_1 \ldots x_4$ | $x_5 \ldots x_8$ | $y_1 \cdots y_4$ | $y_5 \cdots y_8$ |
| Lists For: $Sum_{1-4}$ & LF Carry Out | | | | | |
| $Sum_1$: | [0 | (Valid) | (X . . . X) | (Valid) | (X . . . X)] |
| $Sum_2$: | [– | — | — | — | —] |
| $Sum_3$: | [– | — | — | — | —] |
| $Sum_4$: | [– | — | — | — | —] |
| LF Carry Out | [0 | (Valid) | (X . . . X) | (Valid) | (X . . . X)] |
| Lists For: $Sum_{5-8}$ & LNEWj with j = Carry Out | | | | | |
| $Sum_5$: | [0 | (Valid) | (Valid) | (Valid) | (Valid)] |
| $Sum_6$: | [– | — | — | — | —] |
| $Sum_7$: | [– | — | — | — | —] |
| $Sum_8$: | [– | — | — | — | —] |
| LNEWj: | [0 | (Valid) | (Valid) | (Valid) | (Valid)] |

j = Carry Out

TABLE 23

Present Invention

Title: Resultant List Appearance
LNEWj & Carry Out
Sit Definition: if carry input or CYIN is false and thus represented with a Rule 2 input list of a null cube, then list LNEWj is for list LS $sum_{1-4}$ and MS $sum_{5-8}$ and LF Carry Out. The CYIN part could be arbitrarily set with 0 instead of X with all input Rule 1 and Rule 2 lists set with CYIN part set with a 0 instead of an X. '(Valid)' means a portion of a cube contains valid parts.

| Part Names: | Carry Input | LS-4 | MS-4 | LS-4 | MS-4 |
|---|---|---|---|---|---|
| Parts: | CYIN | $x_1 \ldots x_4$ | $x_5 \ldots x_8$ | $y_1 \cdots y_4$ | $y_5 \cdots y_8$ |
| Set Definition: if carry input is represented as a Rule 1 List, then list LNEWj is LS $sum_{1-4}$ and MS $sum_{5-8}$ and LF Carry Out, as shown below. | | | | | |
| Lists For: $Sum_{1-4}$ & LNEWj with j = Carry Out | | | | | |
| $Sum_1$: | [(Valid) | (Valid) | (X . . . X) | (Valid) | (X . . . X)] |
| $Sum_2$: | [– | — | — | — | —] |
| $Sum_3$: | [– | — | — | — | —] |
| $Sum_4$: | [– | — | — | — | —] |
| LF Carry Out: | [(Valid) | (Valid) | (X . . . X) | (Valid) | (X . . . X] |
| Lists For: $Sum_{5-8}$ & LNEWj with j = Carry Out | | | | | |
| $Sum_5$: | [(Valid) | (Valid) | (Valid) | (Valid) | (Valid)] |
| $Sum_6$: | [– | — | — | — | —] |
| $Sum_7$: | [– | — | — | — | —] |
| $Sum_8$: | [– | — | — | — | —] |
| LNEWj: | [(Valid) | (Valid) | (Valid) | (Valid) | (Valid)] |

j = Carry Out

The use of sets: LF, Li, and LNEW will be further utilized for general applications of a logic code generator circuit.

As shown in Table 25 and Table 26, the logic code generator 2 stores the 3 sets: LF, Li, and LNEW.

Logic code generator Description And Operation

Note: The logic code generator 2 is shown separated in FIGS. 16 and 17, where FIG. 16 is the top section of the logic code generator 2, and FIG. 17 is the bottom section of the logic code generator 2.

Figure 16:
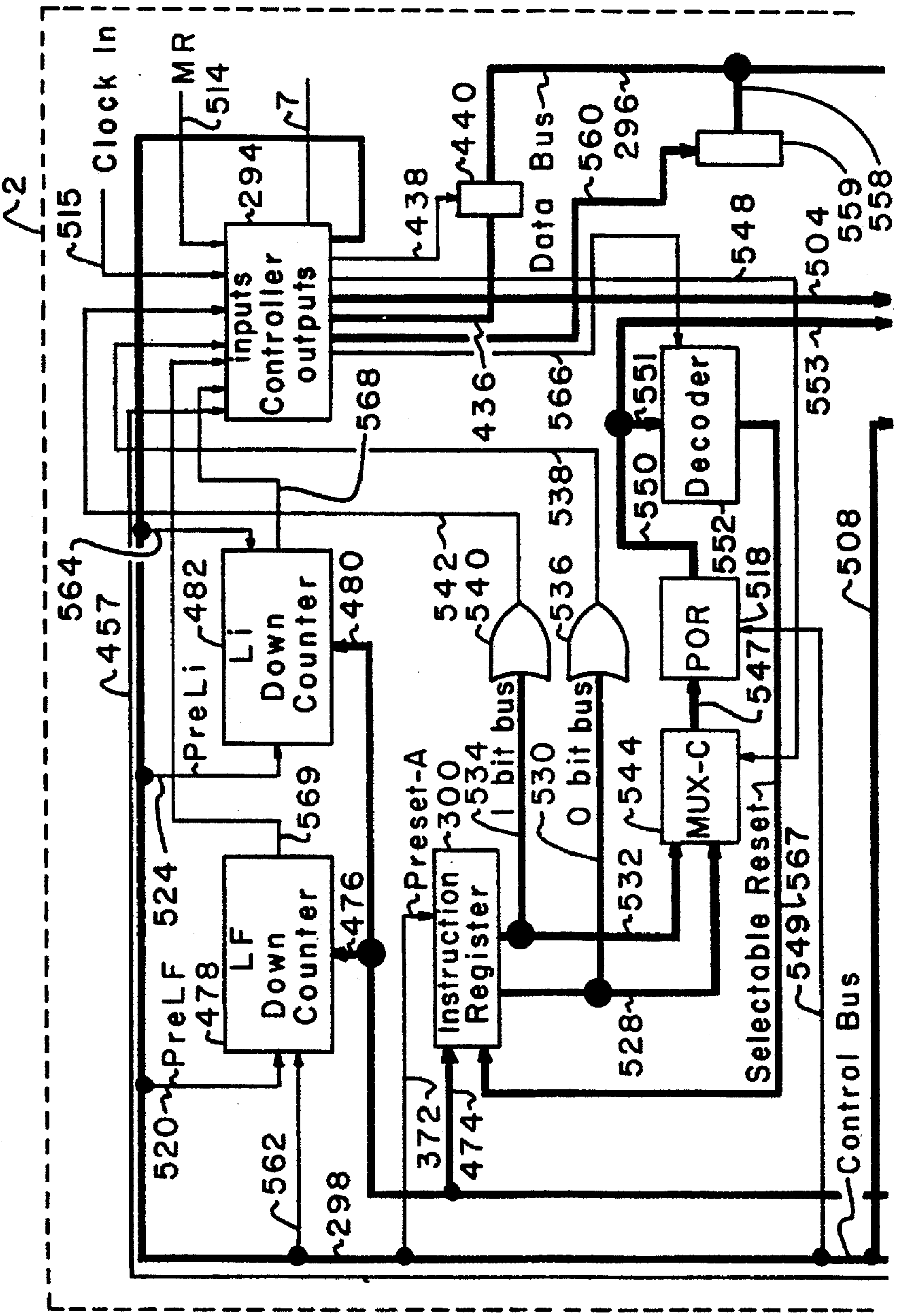
FIG. 16 is the top section of the logic code generator 2.
Figure 17:
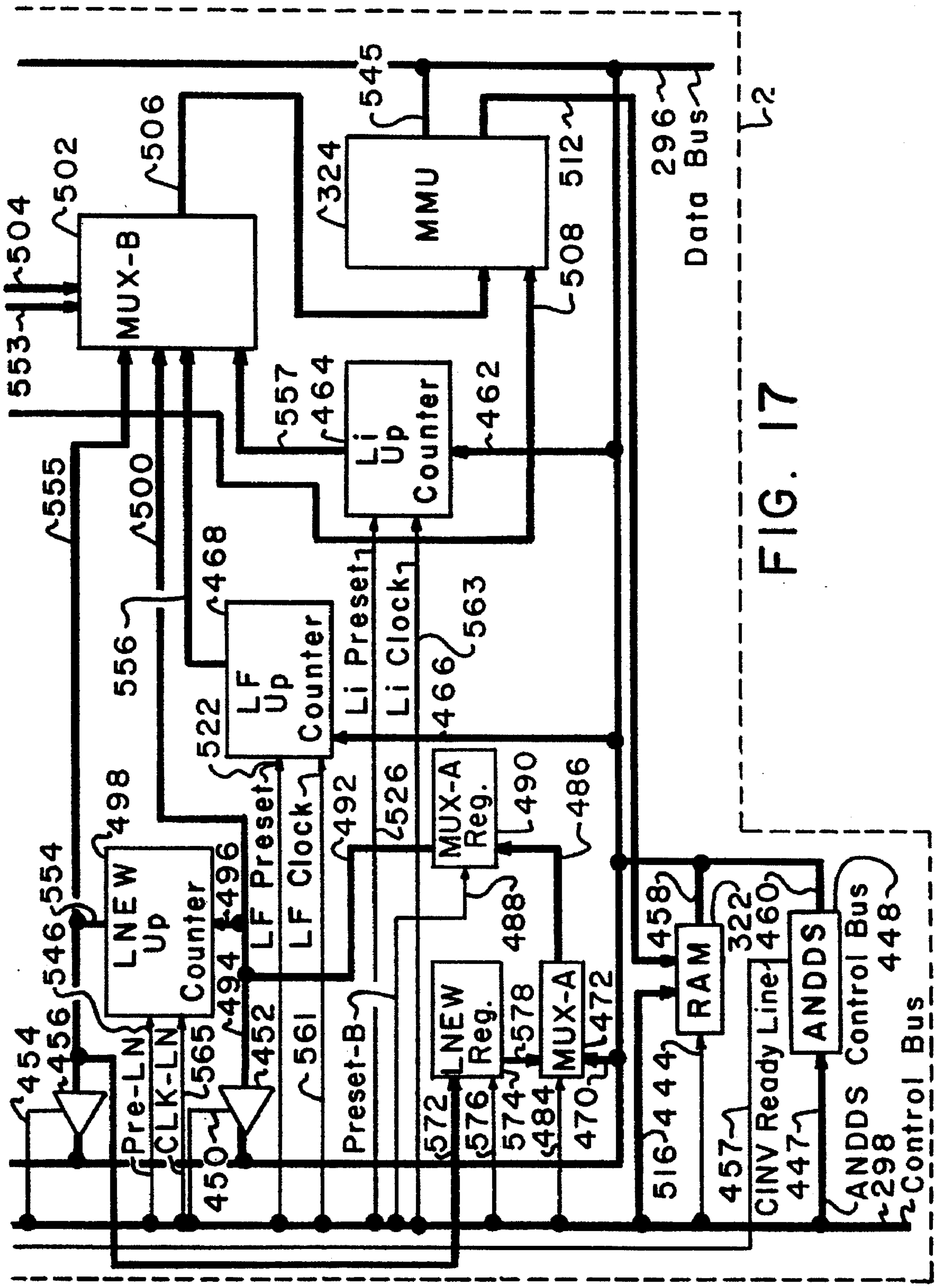
FIG. 17 is the bottom section of the logic code generator 2.

As shown in FIGS. 16 and 17, a controller 294, which could be basically a feedback PLA with clocked registers or microcomputer, puts information, such as cubes, onto a data bus 296. The controller 294 controls the mechanism, as shown in FIGS. 16 and 17, by putting control information on a control bus 298.

The utility and operation of the logic code generator 2, denoted in dotted lines, can best be presented by starting with the instruction register 300, in the northeast part of FIGS. 16 and 17.

Example 1. Instruction Register Purpose

A cube, such as cube [01X . . . X], sent to the instruction register 300 instructs the logic code generator 2 to AND the NOT of the list of bit N with the list of bit N–1. Bit N is the left most part of a cube, such as the 0 in the cube [01X . . . X]. Bit N–1 is the part of the cube to the right of the bit N. Effectively, the instruction register 300 having a cube, such as above cube [01X . . . X], acts as an AND gate.

—End Of Example 1—

Each new list generated from the cube stored in the instruction register 300 is ORed into a final list called LNEWj for part j, as illustrated in example 2 below.

Example 2. Function of a function

Given $f_1(w)$ and $f_2(z)$, where z is defined as $f_1(w)$ and y is defined as $f_2(z)$, find y for y is defined as f3(w). The given mathematical functions $f_1(w)$ and $f_2(z)$ and the to be generated function $f_3(w)$ are each generally arbitrary flowcharts with constraints. Each of these three functions or $f_1(w)$, $f_2(w)$, $f_3(w)$ can be described as a set of lists.

Figure 19:
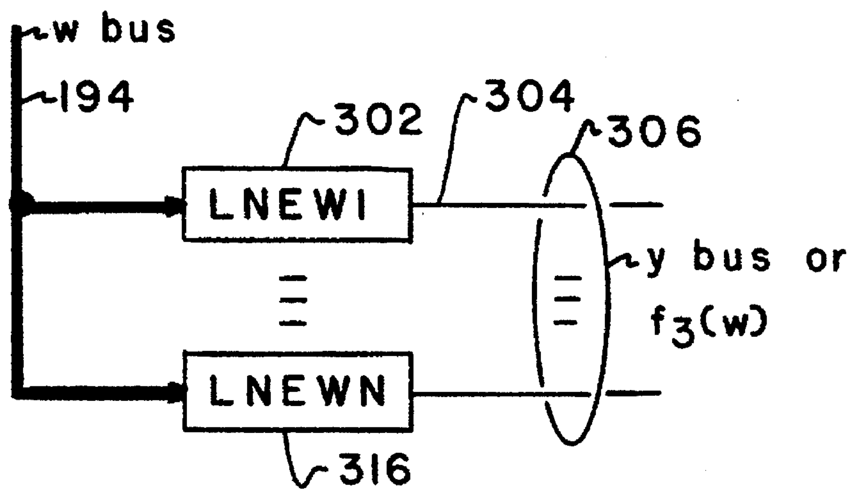
FIG. 19 shows a block circuit of set LNEW.

A circuit of these two given lists, $f_1(w)$ and $f_2(z)$, is shown in FIG. 18, and a circuit of the generated list $f_3(w)$ is shown in FIG. 19. Note: the FIGS. 18 and 19 contain mechanisms almost the same as in the FIG. 13. The only difference is the symbols and item identification numbers used. In FIG. 19, the generated list LNEWj, such as list LNEW1, representing LNEW1 programmable IC 302, denoted with symbol LNEW1, for the part 1 line 304 of the y–$f_3$(w) bus 306, denoted with symbol y bus or $f_3(w)$, is generated by using list Li1, representing Li1 circuit 308, denoted with symbol Li1, in FIG. 18 as a list of instruction cubes to operate upon the set of lists LFj, representing the LF1 programmable IC 172, denoted with symbol LF1, to circuit LFN programmable IC 310, denoted with symbol LFN, for zc bus 312, denoted with symbol zc bus or $f_1(w)$ in FIG. 18. The letter i in the name of the list Li1, representing the Li1 circuit 308, denoted with symbol Li1, signifies instruction. If the list Li1, representing the Li1 circuit 308, denoted with symbol Li1, contained two cubes, which were [01X . . . X] for cube 1 and [1X . . . X] for cube 2, then the list LNEWj, such as the list LNEW1, representing the LNEW1 programmable IC 302, denoted with symbol LNEW1, shown in FIG. 19, would contain a list generated using both (a) list LNF, representing the LFN programmable IC 310, denoted with symbol LFN, and (b) list LF[N–1], representing the LF[N–1] programmable IC 314, denoted with symbol LF[N–1], shown in FIG. 18, according to equation (37), below.

*LNEW1=[[.NOT.LFN].AND.[LF[N–1]]].OR. LFN* (37)

The cube [01X . . . X] provides the instruction [[NOT LFN].AND. [LF[N–1]]], while the cube [1X . . . X] provides the instruction [LFN]. The 0 in part N in cube [01X . . . X] mean NOT of the list LFj with j equal to N. The 1 in part N–1 in cube [01X . . . X] means the true of LFj or LFj with j equal to N–1. Other hypothetical cube instructions are shown in Table 24, with the list equation to be performed per cube instruction. Each cube in the Li1 circuit 308, represented by list Li1, denoted with symbol Li1, provides a cube instruction to the logic code generator 2, as shown in FIGS. 16 and 17, to perform an AND operation on all the lists in the set of lists LFj, representing the LF1 programmable IC 172, denoted with symbol LF1, to the LFN programmable IC 310, denoted with symbol LFN, in FIG. 18. If the jth part of a cube instruction is X, no AND operation is undertaken for the jth part. As shown in FIG. 19, the remaining lists, such as list LNEWN, representing LNEWN programmable IC 316, denoted with symbol LNEWN, and represented by the y–$f_3$(w) bus 306, denoted with symbol y bus or $f_3(w)$, are generated in a similar way by using LiN programmable IC 318, represented by list LiN that the LNEW1 programmable IC 302, represented by list LNEW1 is generated. As shown in the FIG. 19, the y–$f_3$(w) bus 306, denoted with symbol y bus or $f_3(w)$, is the same bus as ya bus 320 or $f_2(w)$, as shown in FIG. 18; thus, $f_2(w)$ in FIG. 18 is mathematically equivalent to y–$f_3$(w) 306, denoted with symbol y bus or $f_3(w)$, as shown in FIG. 19.

TABLE 24

Present Invention

Title: Cube Instruction Per List Equation

| Cube Number Parts: | Cube Instruction N N-1 . . . 1 | | List Equation |
|---|---|---|---|
| 1 | 0 1 | X . . . X | [.NOT.$LF_N$.]AND.$LF_{N-1}$ |
| 2 | 1 0 | X X . . . X | $LF_N$.AND.[.NOT.$LF_{N-1}$] |
| 3 | X X | 1 X . . . X | $LF_{N-2}$ |
| 4 | X . . . | . . . X 1 | $LF_1$ |
| 5 | X . . . | . . . X 0 | [.NOT.$LF_1$] |

End of Example 2

The time of generating the set of lists LNEWj, represented by the LNEW1 programmable IC 302 to the LNEWN programmable IC 316, is directly dependent on the number of cubes in both (a) the set of lists LFj, representing the circuit LF1 172 to the circuit LFN 310 and (b) the sets of lists Lij, representing the circuit Li1 308 to the LiN programmable IC 318.

The controller 294 controls the logic code generator 2, as shown in FIGS. 16 and 17, to perform the AND operation of the list at each part in a cube instruction, containing a 0 for a NOTed list and a 1 for a true list, in the cube instruction register 300. A NOTed or false list is created by performing a disjoint sharp of the true list as in equation (38), below.

.NOT.List=[U or universe or X . . . X] (#) [List] (38)

Although the sharp operation of a list will produce a false or NOTed list, this patent will only mention the disjoint sharp operation. One advantage of the disjoint sharp over the sharp is the cubes are disjoint to each other and the number of cubes in the list are believed to be less than the number of cubes in the sharp list as discovered by authors of the reference: MINI. A true list is another name for list. Another advantage is the speed of the disjoint sharp in the removal of 0-cubes. For example, in the 0-cube removal from a disjoint list of perhaps 10,000 cubes in a close boolean minimization, a 0-cube can only be removed from one cube since no cubes overlap. A sharp generated list will have overlapping cubes; thus a 0-cube may need to be removed from perhaps unknown thousands of overlapping cubes.

The lists for instruction cubes and the input function are stored and retrieved in a RAM 322. Storage locations in the RAM 322 are identified in Table 25 and Table 26. This Table 25 is only an example of how information may be stored; I do not want to be limited to this storage means.

TABLE 25

Present Invention

Title: RAM Information Of List Addresses

| Address | Data (2N Bits Wide) First N bits | Second N bits |
|---|---|---|
| Basic-address of LF1 | Number of cubes | 1st Address of List |
| — | — | — |
| Basic-address of LFN | Number of cubes | 1st Address of List |
| Basic-address of Li1 | Number of cubes | 1st Address of List |
| — | — | — |
| Basic-address of LiN | Number of cubes | 1st Address of List |
| Basic-address of NOTLF1 | Number of cubes | 1st Address of List |
| — | — | — |
| Basic-address of NOTLFN | Number of cubes | 1st Address of List |
| Basic-address of NOTLi1 | Number of cubes | 1st Address of List |
| — | — | — |
| Basic-address of NOTLiN | Number of cubes | 1st Address of List |
| Basic-address of LNEW1 | Number of cubes | 1st Address of List |
| — | — | — |
| Basic-address of LNEWN | Number of cubes | 1st Address of List |

TABLE 26

Present Invention

Title: RAM Information Of Cubes in Lists

| Address | Data (2N Bits Wide) |
|---|---|
| 1st address of LFj | 1st cube of LFj of 2N bits |
| — | — |
| last address of LFj | last cube of LFj of 2N bits |
| 1st address of Lij | 1st cube of Lij of 2N bits |
| — | — |
| last address of Lij | last cube of Lij of 2N bits |
| 1st address of NOTLFj | 1st cube of LFj of 2N bits |
| — | — |
| last address of NOTLFj | last cube of LFj of 2N bits |
| 1st address of NOTLij | 1st cube of Lij of 2N bits |
| — | — |
| last address of NOTLij | last cube of Lij of 2N bits |
| — | — |
| 1st address of LNEWj | 1st cube of list of 2N bits |
| — | — |
| last address of LNEWj | last cube of list of 2N bits |

The RAM 322, denoted with symbol RAM, can be managed by a memory management circuit or MMU 324, denoted with symbol MMU, such as an available known segmented memory management circuitry, for the purpose to save data locations or addresses and used to mainly contain cubes in the logic code generator 2.

Figure 20:
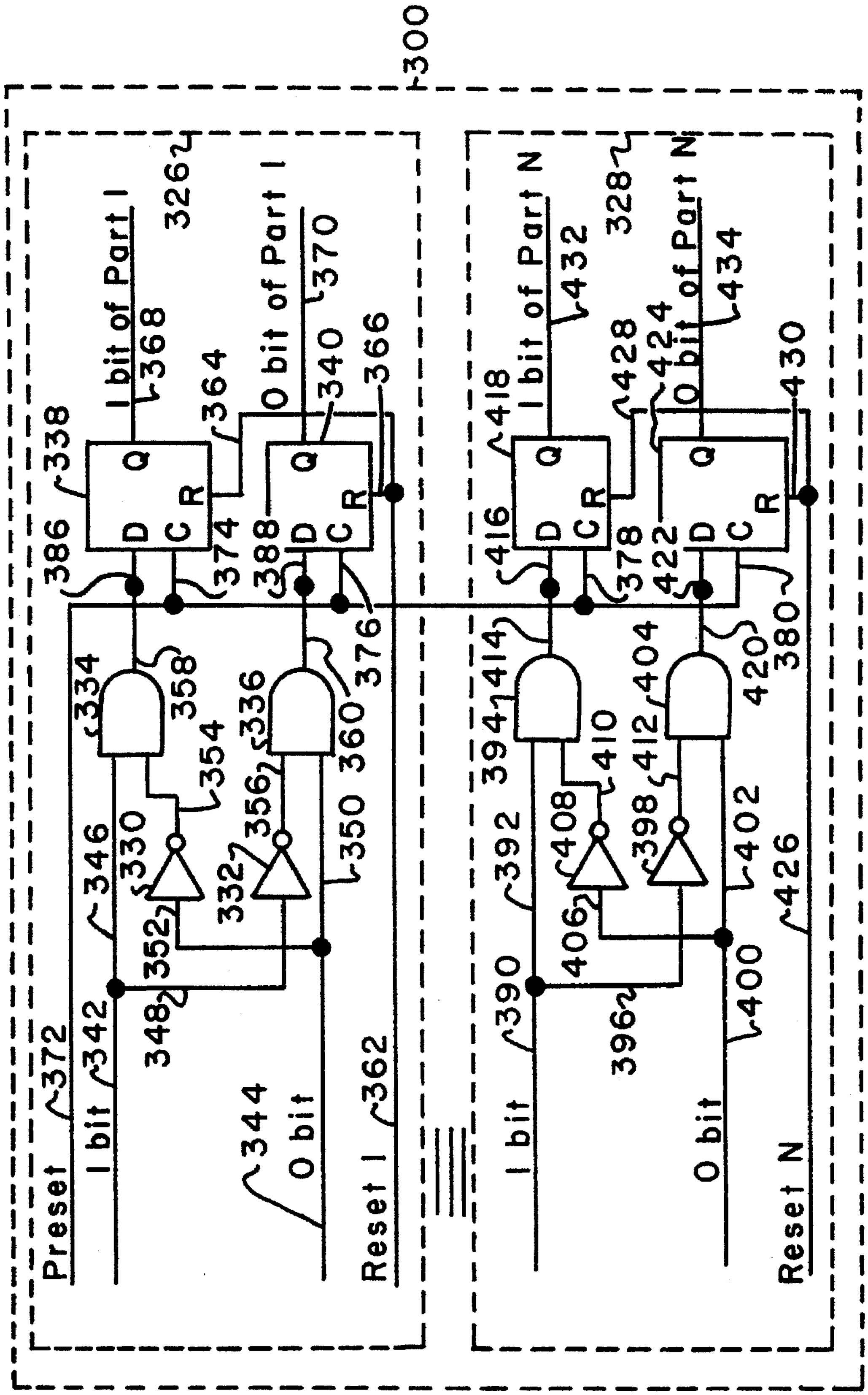
FIG. 20 shows an instruction register circuit.

As shown in FIG. 20, the instruction register 300, denoted with symbol instruction register, contains pairs of selectable resettable register circuits, such as register 1 circuit 326, denoted in dotted lines, for part 1, to range to register N circuit 328, denoted in dotted lines for part N. Within the register 1 circuit 326, inverter gate E 330 and inverter gate F 332 are inputted respectively to 2 in AND gate G 334 and 2 in AND gate H 336 to prevent an X in part 1 of any instruction cube from being clocked into either the 1 bit register 338 or the 0 bit register 340.

The below example is to show that an X in part 1 can not be stored in either the 1 bit register 338 nor the 0 bit register 340.

Example: an X in part 1 would means, a 1 or true voltage would exist on input 1 bit line 342, denoted with symbol 1 bit, and a 1 or true voltage would exist on input 0 bit line 344, denoted with symbol 0 bit. This input 1 bit line 342 connects to both 2 in AND gate H input 346 of the 2 in AND gate G 334 and the inverter gate F input 348 of the inverter gate F 332. The input 0 bit line 344 connects to both 2 and AND gate 1 input 350 of the 2 in AND gate H 336 and the inverter gate E input 352 of the inverter gate E 330. A 0 or false voltage would exist at the inverter gate E output 354 of the inverter gate E 330 and the inverter gate F output 356 of the inverter gate F 332. Since the inverter gate E output 354 and the inverter gate F output 356 with 0 or false voltage each are also respectively, inputs to the 2 in AND gate G 334 and the 2 in AND gate H 336, then the 2 in AND gate output G 358 of the 2 in AND gate G 334 and 2 in AND gate H output 360 of the 2 in AND gate H 336 will each contain a 0 or false voltage to present to the D inputs of the 1 bit register 338 and 0 bit register 340, respectively. A 1 or true voltage pulse on reset 1 line 362, which connects to R input A 364 of the 1 bit register 338 and to R input B 366 of the 0 bit register 340, will reset both the 1 bit register 338 and the 0 bit register 340 to produce a 0 or false voltage on the Q output A line 368, denoted with symbol 1 bit of Part 1, of the 1 bit register 338, and on the Q output B line 370, denoted with symbol 0 bit of Part 1, of the 0 bit register 340. If preset A line 372, denoted with symbol Preset, which connects to C input A line 374 of the 1 bit register 338, and connects to C input B line 376 of the 0 bit register 340 and connects to the C inputs of higher part register pairs, such as C input NA line 378 of N part 1 bit register 418 and C input NB line 280 of N part 0 bit register 424 contained a1 or true voltage pulse, then all the Q output lines, such as the Q output NA line 432, denoted with symbol 1 bit of Part N, would remain at a 0 or false voltage. Thus an X in any part, presented to 1 bit and 0 bit input lines, such as the input 1 bit line 342, denoted with symbol 1 bit, and the input 0 bit line 344, denoted with symbol 0 bit, can not be stored in the instruction register 300, denoted in dotted lines.

—Storing A 1 In Part 1—

A 1 in part 1 is stored as described, as follows. A 1 input means a 0 or false voltage on the input 0 bit line 344, denoted with symbol 0 bit, and a 1 or true voltage on the 1 bit line 342, denoted with symbol 1 bit.

With a 0 or false voltage on the 0 bit line 344, the inverter gate E output 354 will input a 1 or true voltage to the 2 in AND gate G 334, which will present a 1 or true voltage on the 2 in AND gate G output 358 to the connected D input A line 386, of the 1 bit register 338. Thus with rising positive slope of a 1 or true voltage pulse on the preset line 372, denoted with symbol Preset, connected C input 374 of the 1 bit register 338 will transfer the 1 or true voltage from the D input A line 386 or the 2 in AND gate G output 358 to the Q output A line 368, denoted with symbol 1 bit of Part 1.

With a 1 or true voltage on the 1 bit line 342, the inverter gate F output 356 will input a 0 or false voltage to the 2 in AND gate H 336, which will present a 0 or false voltage on the 2 in AND gate H output 360 to the connected D input of B line 388 of the 0 bit register 340. Thus with a rising positive slope of a 1 or true voltage pulse on the preset line 372, connected C input 376 of the 0 bit register 340 will transfer the 0 or false voltage from the D input B line 388 of the 0 bit register 340 to the Q output B line 370, denoted with symbol 0 bit of Part 1. Thus, the storing of a 1 in part 1 has been described.

—Storing A 0 In Part 1—

A 0 in part 1 is stored as described, as follows. A 0 input means a 1 or true voltage on the bit line 344 and a 0 or false voltage on the 1 bit line 342.

With a 1 or true voltage on the 0 bit line 344, the inverter gate E output 354 will input a 0 or false voltage to the 2 in AND gate G 334, which will present a 0 or false voltage on the 2 in AND gate G output 358 to the connected D input A line 386 of the 1 bit register 338. Thus, with a rising or positive slope of a 1 or true voltage pulse on the preset line 372 denoted with symbol Preset, connected C input A line 374 of the 1 bit register 338 will transfer the 0 or false voltage from the D input A line 386 or the 2 in AND gate G output 358 to the Q output A line 368, denoted with symbol 1 bit of Part 1.

With a 0 or false voltage on the 1 bit line 342, the inverter gate F output line 356 will input a 1 or true voltage to the 2 in AND gate H 336, which will present a 1 or true voltage on the 2 in AND gate H output 360 to the connected D input B line 388 of the 0 bit register 340. Thus, with a rising or positive slope of a 1 or true voltage pulse on the preset line 372, connected C input B line 376 of the 0 bit register 340 will transfer the 1 or true voltage from the D input B line 388 or the 2 in AND gate H output 360 to the Q output B line 370, denoted with symbol 0 bit of Part 1. Thus, the storing of a 0 in part 1 has been described.

As shown in FIG. 20, the register N circuit 328, denoted in dotted lines, contains an exact copy of the register 1 circuit 326, denoted in dotted lines, except that the preset line 372, need only be an input in the register 1 circuit 326, denoted in dotted lines.

Within the register N circuit 328, denoted in dotted lines, is a input 1 bit line 390, denoted with symbol 1 bit, connected to 2 in AND gate J input 293 of 2 in AND gate J 394 and inverter gate G input 396 of inverter gate G 398. 0 bit line 400, denoted with symbol 0 bit, connects to 2 in AND gate K input 402 of 2 in AND gate K 404 and inverter gate H input 406 of inverter gate H 408. The inverter gate H output 410 ofthe inverter gate H 408 and the 2 in AND gate J input 392 are the 2 inputs of the 2 in AND gate J 394. The inverter gate G output 412 of the inverter gate G 398 and the 2 in AND gate K input 402 are the 2 inputs of the 2 in AND gate K 404. A 2 in AND gate J output 414 of the 2 in AND gate J 394 is the D input NA line 316 of the N part 1 bit register 418, while 2 in AND gate K output 420 of the 2 in AND gate K 404 is connected to the D input NB line 422 of the N part 0 bit register 424. A reset N line 426, connects to the R input NA 428 of the N part 1 bit register 418 and to the r input NB 430 of the N part 0 bit register 424. The Q output NA line 432, denoted with symbol 1 bit of Part N, of the 1 bit register 418 and the Q output NB line 434, denoted with symbol 0 bit of Part N, of the 0 bit register 424 are the outputs of the register N circuit 328, denoted in dotted lines.

The description and operations of the logic code generator 2, as listed in Table 27, are as follows:

TABLE 27

Present Invention

Title: Procedure List For The Logic Code Generator 2. These procedures are routines to perform some basic list operations on cubes.

| | |
|---|---|
| P-1 | Sending Data From Controller To The Data Bus |
| P-2 | Sending Address To RAM |
| P-3 | Sending Data From RAM To Data Bus |
| P-4 | Preset LF Down Counter & LF Up Counter |
| P-5 | Preset Li Down Counter & Li Up Counter |
| P-6 | Loading The Instruction Register |
| P-7 | Instruction Register Operation |
| P-8 | Preset LNEW UP Counter |

TABLE 27-continued

Present Invention

Title: Procedure List For The Logic Code Generator 2. These procedures are routines to perform some basic list operations on cubes.

| | |
|---|---|
| P-9 | POR Code To MUX/MMU To RAM |
| P-10 | LNEW Up Counter Output To MUX/MMU To RAM Address |
| P-11 | MUX-A To MUX/MMU To RAM Address |
| P-12 | LF Up Counter Output To MUX/MMU To RAM Address |
| P-13 | Li Up Counter Output To MUX/MMU To RAM Address |
| P-14 | Data From Data Bus To Temporary Register |
| P-15 | Data From Temporary Register To Data Bus |
| P-16 | Data Bus To RAM |
| P-17 | Increment LF presettable LF counter and LF presettable down counter |
| P-18 | Increment Li presettable up counter and Li presettable down counter |
| P-19 | Increment LNEW presettable up counter |
| P-20 | Selectable Reset To Encoder For jth Part Register In The Instruction Register |
| P-21 | Generation Of A Set Of LNEW Lists |

The description and operations of the logic code generator 2 are as follows:

P-1 Procedure: Sending Data From Controller To The Data Bus—

Figure 21:
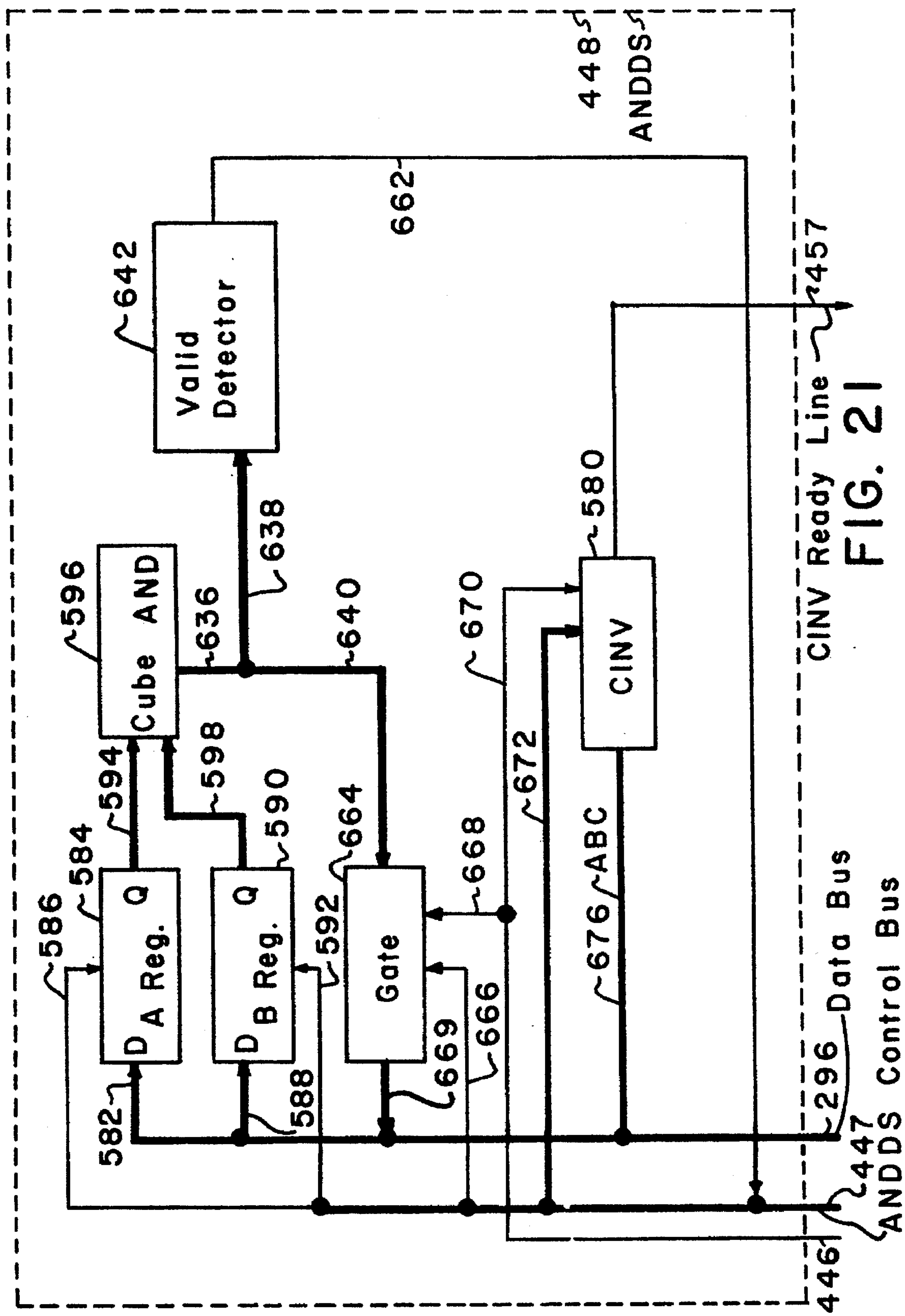
FIG. 21 shows an ANDDS circuit.

From the controller 294, a cube of N parts of 2N bits, or an address of N bits, is first put onto controller output A bus 436. With a 1 or true voltage put on a line in tristate output control bus A 438 of tristate bidirectional A gate 440 from the controller 294, the cube or address will pass to the data bus 296, which is at the output of the tristate bidirectional A gate 440. The control bus 298, as shown in the lower left section of FIG. 17, which is connected to the controller 294, consists of various control lines and various tristate control lines, such as a:

(1) tristate output control line B 444 of the RAM 322, (2) tristate output control line C 446, as shown in FIG. 21 within the ANDDS Control Bus 447 in FIG. 17, of ANDDS 448, (3) ANDDS Control Bus 447, to control the ANDDS 448, (4) tristate output control line D 450 of tristate B gate 452, and (5) tristate output control line E 454 of tristate C gate 456.

A CINV Ready line 457, denoted with symbol CINV Ready Line, carrying output information from the ANDDS 448, to the controller 294, could be combined into the control bus 298.

The data bus 296, is the output or load side of:

(1) the RAM 322, (2) the ANDDS 448, (3) the tristate bidirectional A gate 440, (4) the tristate B gate 452, and (5) the tristate C gate 456.

The data bus 296, is the input or source side of various buses, such as:

(1) RAM data bus 458 of the RAM, (2) a ANDDS data bus 460 of the ANDDS 448, (3) Li up counter input data bus 462 of Li up counter 464, (4) LF up counter input data bus 466 of LF up counter 468, (5) MUX-A input data bus 470 of MUX-A 472, (6) instruction register input data bus 474 of the instruction register 300, (7) LF down counter input data bus 476 of LF down counter 478, denoted with symbol LF down counter, (8) Li down counter input data bus 480 of Li down counter 482, denoted with symbol Li down counter.

End of P-1 Procedure

P-2 Procedure: Sending Address From Data Bus to RAM—

An address, such as 0 . . . 01 of N bits, is sent on the data bus 296, to the MUX-A input data bus A 470 of the MUX-A 472, with a 1 on MUX-A switch control line 484 from the control bus 298, denoted with symbol Control Bus, onto MUX-A output bus 486. With a 1 or true voltage pulse on preset MUX-A register line 488, denoted with symbol Preset-B, of MUX-A register 490, denoted with symbol MUX-A Reg., the address is stored in the MUX-A register 490, and exists on MUX-A register output bus 492, which connects to:

(a) tristate input bus 494 of the tristate B gate 452, (b) LNEW input bus 496 of LNEW up counter 498, and (c) MUX-B input-2 bus 500 of MUX-B 502, denoted with symbol MUX-B.

The signal code sent from the controller 294 on the MUX-B control bus 504 to the MUX-B 502, will switch the address on the MUX-B input-2 bus 500 onto MUX-B output bus 506. The signal code sent on the MMU control bus 508 of the control bus 298 from the controller 294 to the MMU 324 will direct the address from the MUX output bus 506 thru the MMU 324 to RAM input address bus 512 of the RAM 322. The signal code sent on RAM control bus 516 enables the address on the RAM input address bus 512 into the RAM 322, to prepare to send the RAM stored data at the RAM data location of the address to the RAM data bus 458.

The controller 294 controls the MUX-B 502 by signals on the MUX-B control bus 504. The MMU 324 manages by readdressing the RAM address on the MUX-B output bus 506. The final physical RAM location for cubes in a list will probably be in several far apart RAM sectors as managed by the MMU 324.

End Of P-2 Procedure

The address, such as 0 . . . 01 of N bits, sent from the controller 294 could be any of 2N addresses for the two sets of lists LFj and Lij. For example: one N bit address of perhaps 0 . . . 01 could be the basic-address of list LF1. The data, at the LF1 address, such as 2N bits wide, would contain the number of cubes in list LF1 in the first N bits and the first address in RAM of the first cube in list LF1 in the second N bits.

The first N basic-addresses in the RAM 322 should be reserved for the addresses of the set of lists LFj, containing data of the number of cues in a list of set LFj in the first N bits of data and address of the first cube in that respective list of set LFj in the second N bits of data. By reserving the first N addresses for the addresses of set LFj, the priority OR register or POR 518, as shown in FIG. 16, can point or directly address the addresses of set LFj without additional circuitry or special shift circuitry to compensate for address shift to address set LFj in the RAM 322.

P-3 Procedure: Data From Ram To Data Bus

From the controller 294, the RAM data at a RAM address, such as 0 . . . 01, is put onto the RAM data bus 458, with a 1 or true voltage on the tristate output control line B 444 of the RAM 322, and with a 0 or false voltage on the various other lines of the control bus 298, which are:

(a) the tristate output control line D 450 of the tristate B gate 452, (b) the tristate output control line E 454 of the tristate C gate 456, (c) the tristate output control line C 446, as shown in FIG. 21 within the ANDDS Control Bus 447 in FIG. 17, of the ANDDS 448, and (d) the tristate output control bus A 438 of the tristate bidirectional A gate 440.

The RAM data bus 458 is connected to the data bus 296.

End Of Procedure P-3

P-4 Procedure: Preset LF Down Counter & LF Up Counter

The data, such as the data at basic-address 0 . . . 01 for list LF1, as shown in Table 25, consisting of the number of cubes in list LF1 in the first N bits of MSB half side of the 2N bits in the data and the first address of list LF1 in the second N bits or LSB half side of the 2N bits in the data, is put onto the data bus 296, in accordance with procedure P-3. The first N bits of 2N bits, being the number of cubes in list LF1 on the data bus 296, are to be sent to the LF down counter 478, and the second N bits of 2N bits, being the first address of list LF1, are to be sent to the Li down counter 482. With the 2N bit data on the data bus 296, the first N bits of data connected to the LF down counter input data bus 476, consisting of N lines, is stored in the LF down counter 478, by a 1 or true voltage pulse on LF down counter preset line 520, denoted with symbol Pre LF. The second N bits of data, connected to the LF up counter input data bus 466, consisting of N lines, is stored in the LF up counter 468, by a 1 or true voltage pulse on LF up counter preset line 522.

End of Procedure P-4

P-5 Procedure: Preset Li Down Counter & Li Up Counter

This P-5 procedure is similar to the P-4 procedure with basically Li in P-5 procedure replacing LF in P-4 procedure. The data, such as data at the address for list Li1, is put onto the data bus 296, in accordance with procedure P-3. The P-5 procedure is used to address a list of set Lij, at a basic-address, such as list Li1, from the controller 294, with data of first N bits of the 2N bits of data in the RAM 322, containing the number of cubes in a list in set Lij, such as list Li1, to be sent to the Li down counter 482, and with data of the second N bits in the RAM 322, containing the address of the first cube in a list of set Lij, such as list Li1, to be sent to the Li up counter 464. With the 2N bit data on the data bus 296, the first N bits of data, connected to the Li down counter input data bus 480, consisting of N lines, is stored in the Li down counter 482 by a 1 or true voltage pulse on Li down counter preset line 524, denoted with symbol PreLi. The second N bits of data, on connected the Li up counter input data bus 462, are latched into the Li up counter 464 by a 1 or true voltage pulse on Li up counter preset line 526.

End Of Procedure P-5

P-6 Procedure: Loading The Instruction Register

A cube, such as the first cube, in the set of lists Lij, such as list Li1, is to be sent from the RAM 322, to the cube instruction register 300. The data, such as data at the address for list Li1, is put onto the data bus 296, in accordance with procedure P-3. The address of the cube instruction is stored in the Li up counter 464. The number of cubes, which is the number of cube instructions, is stored in the Li down counter 482. With the 2N bit data on the data bus 296, the 2N bits of data, connected to the instruction register input data bus 474, consisting of 2N lines, is stored in the instruction register 300, by a 1 or true voltage pulse on the preset line A 372.

End Of P-6 Procedure

P-7 Procedure: Instruction Register Operation

A 0 bit output bus 528 in FIG. 16 consists of N wires or lines, ranging from the 0 bit of part 1 370, in FIG. 20 to the 0 bit of part N 434 in FIG. 20, and connects to a N line 0 bit bus 530, in FIG. 16. A 1 bit output bus 532 in FIG. 16, consists of N lines, ranging from the 1 bit of part 1 368 to the 1 bit of part N 432 in FIG. 20, and connects to a N line 1 bit bus 534, denoted with symbol 1 bit bus, in FIG. 16. The 0 bit bus 530, is inputted to a N input OR gate A 536, which generates a 1 or true voltage on 0 bit OR gate output line 538 to input to the controller 294, if a stored cube instruction contains at least a 0 in any part. The 1 bit bus 534 is inputted to a N input OR gate B 540, which generates a 1 or true voltage on 1 bit OR gate output line 542 to input to the controller 294, if a stored cube instruction contains at least a 1 in any part. If the 0 bit OR gate output line 538, inputting to the controller 294, has a 1 or true voltage, then the controller 294, knows at least a future disjoint sharp operation or a false list is required on a list in set LFj, such as list LF1. If the 1 bit OR gate output line 542, inputting to the controller 294, has a 1 or true voltage, then the controller 294, knows at least a future list LFj, such as list LF1, is to be ANDed.

To avoid repeatable NOTed list or disjoint sharp operations in processing cube instructions, NOTed LFj lists for j=1 to j=N should be created and stored in the RAM 322, and either the controller 294 or the MMU 324 will have the basic addresses of these NOTed LF lists —End Of P-7 Procedure—

—P-7 Procedure Notes—

Examples of Operations Per Hypothetical Cube Instruction:

Example A: Suppose the first cube in list Li1 in the instruction register 300 was cube [1X . . . X] with part 1 on the left side, then the first cube in list LNEW1 or partial list or accumulator list LNEWA would be generated by equation (40).

$$\text{LNEWA=LF1} \tag{40}$$

Example B: Suppose the first cube in list Li1 in the instruction register 300 was [01X . . . X], then the first cube in list LNEW1 or partial list or accumulator list LNEWA would be generated by equation (42). The equation (42) would probably start as first $$\text{LNEWA=(.NOT.(LF1)).AND.LF2} \tag{42}$$

equation (44) and then follow with equation (46). If the equation (46) were the last list operation, then equation (48) would define list LNEWj, such as list LNEW1.

$$\text{LNEWA=LF2} \tag{44}$$

$$\text{LNEWA=(.NOT.(LF1)).AND.LNEWA} \tag{46}$$

$$\text{LNEW1=LNEWA} \tag{48}$$

Example C: Suppose the two cubes in list Li1 to be put into the instruction register 300, were [1X . . . X]0 and then [01X . . . ], then the cubes in list LNEW1 or partial list or accumulator list LNEWA would be generated from equation (50).

$$\text{LNEWA=LF1.OR.((.NOT.(LF1)).AND.LF2)} \tag{50}$$

An accumulator list, designated as LNEWA and representing the output after each part operation per cube instruction, is defined in equation (52) if the jth part in the cube is a 1, $$\text{LNEWA=[LFj].AND.[LNEWA]} \tag{52}$$

and if the jth part in the cube is a 0, the equation (52) is replaced with equation (54).

$$\text{LNEWA=[.NOT.LFj].AND.[LNEWA]} \tag{54}$$

Review Example 1: One Cube Per Li1 And Both Lists LF1 & LF2

In view, if list LF1 consists of one cube [001] and if list LF2 consists of one cube [100] and list Li1 consists of cube [01X], then accumulator list LNEWA and resultant list LNEW1 are calculated in Table 28.

TABLE 28

Present Invention

Title: List Calculation For LNEWA And LNEW1

| | |
|---|---|
| Review Example | |
| Given: | list LF1 consists of cube [001] |
| | list LF2 consists of cube [100] |
| | list Li1 consists of cube [01X] |
| Created list is (.NOT.(LF1)) or | cube [1XX] |
| | V cube [01X] |
| | V cube [000] |
| Resultant list LNEW1 = | (.NOT.(LF1)).AND.LF2 |
| LNEW1 = | ([1XX].AND.[100]) |
| | V ([01X].AND.[100]) |
| | V ([000].AND.[100]) |

List Operations To Be Counted:

1. LNEWA = ([1XX].AND.[100])
2. LNEWA = ([01X].AND.[100]) V (LNEWA as calculated in 1. or [100])
3. LNEWA = ([000]).AND.[100]) V (LNEWA as calculated in 2. or [NNN] V [100])
4. LNEW1 = (LNEWA as calculated in 3. or [NNN] V [NNN] V [100])
5. LNEW1 = [100]

If the first LNEWA cube were cube [0XX], then LNEWA would be set equal to the false list of LF1 or NOT(LF1).

If the first LNEWA cube were cube [X1X], then LNEWA would be set equal to list LF2.

If the first LNEWA cube were cube [XOX], then LNEWA would be set equal to the false list of LF2 or NOT(LF2).

If the first LNEWA cube were cube [110], then LNEWA would be set equal to the list of (LF1.AND.LF2.AND.(NOT (LF1) )).

If the first LNEWA cube were cube [XX0], then LNEWA would be set equal to the false list of LF3 or NOT(LF3).

End Of P-7 Procedure Notes

P-8 Procedure: Preseting LNEW Presettable Up Counter

The MMU 324, decides the addresses of the resultant new or generated set LNEW. Starting with an N bit address, such as 16 bit address 1000 000 000 000, put onto the data bus 296 from MMU I/O data bus 545 by the MMU 324, this 16 bit address is sent: (first) from the MUX-A input data bus A 470 thru the MUX-A 472 onto the MUX-a output bus 486 by a 1 or true voltage on the MUX-A switch control line 484, (second) thru the MUX-A register 490 onto the MUX-A register output bus 492 and connected the LNEW input bus 496, by a 1 or true voltage pulse on the MUX-A register line 488, (third) into the LNEW up counter 498 by putting a 1 or true voltage pulse on LNEW up counter preset line 546, denoted with symbol Pre LN, from the controller 294.

—End Of P-8 Procedure—

P-9 Procedure: POR Code to MUX/MMU to RAM Address

The 0 bit output bus 528 and the 1 bit output bus 532 are switched in MUX-C 544, onto MUX-C output bus 547 to input the POR 518 by MUX-C control line 548 from the controller 294. The POR 518, being a priority OR encoder by logic circuitry, selects a list, such as the list LF1. The POR selection address is latched into the POR 518 by pulsing POR latch line 549 from the controller 294.

A POR output bus 550 connects to decoder input bus 551 of decoder 552, and connects to priority part instruction output bus 553. The POR output address on the POR output bus 550 is sent to the RAM 322, as a basic-address of list LFj, such as list LF1.

The MUX-B 502 switches the POR output address from the priority part instruction output bus 553 to the MUX-B output bus 506 by signals on the MUX-B control bus 504 from the controller 294. The POR output address is sent thru the MMU 324, to the MMU output bus 512 by signals on the MMU control bus 508. The MMU output bus 512 carries the POR output address to the RAM 322, by signals on the RAM control bus 516. This POR output address is a RAM basic-address of a LFj list, such as the address of list LF1.

With the MUX-C 544 switched by the controller 294 to transmit the 1 of part 1 in list Li1 cube [1XX], which exits on the 1 bit output bus 532, the LFj on the priority part instruction output bus 553 address from the POR 518 will be the LF1 RAM address. The controller 294 will switch the MUX-B 502 to transmit the POR RAM address on the priority part instruction output bus 553 on the MUX-B output bus 506 to the MMU 324. The reason that the controller 294 knows that the MUX-C 544 should be switched to transmit the 1 bit output bus 532 is due to a '1' existing on the 1 bit OR gate output line 542 and a '0' existing on the 0 bit OR gate output line 538.

P-10 Procedure: LNEW Up Counter Output to MUX/MMU to RAM Address

A LNEW presettable up counter output address on LNEW presettable up counter output bus 554, which connects with LNEW MUX-B input bus 555, is switched thru the MUX-B 502 to the MUX-B output bus 506 by control signals on the MUX-B control bus 504 from the controller 294. From the MUX-B output bus 506, the LNEW presettable up counter output address inputs to the MMU 324 to be transformed by the MMU 324 and then passed onto the RAM input address bus 512 to the RAM 322.

P-11 Procedure: MUX-A to MUX/MMU to RAM Address

An address stored in the MUX-A Register 490 exists on the MUX-A register output bus 492, which connects with:

(1) the tristate B gate input bus 494, (2) the LNEW input bus 496 of the LNEW programmable up counter 498, and (3) MUX-B input −2 bus 500 of the MUX-B 502. From the MUX-B output bus 506, the MUX-A address inputs to the MMU 324 to be transformed by the MMU 324 and then passed onto the RAM input address bus 512 to the RAM 322.

P-12 Procedure: LF Up Counter Output to MUX/MMU to RAM Address

A LF up counter output address on LF up counter output bus 556 is switched thru the MUX-B 502 to the MUX-B output bus 506 by control signals on the MUX-B control bus 504 from the controller 294. From the MUX-B output bus 506, the LNEW up counter output address inputs to the MMU 324 to be transformed by the MMU 324 and then passed onto the RAM input address bus 512 to the RAM 322.

P-13 Procedure: Li Up Counter Output to MUX/MMU to RAM Address

A Li up counter output address on LF up counter output bus 557 is switched thru the MUX-B 502 to the MUX-B output bus 506 by control signals on the MUX-B control bus 504 from the controller 294. From the MUX-B output bus 506, the LNEW up counter output address inputs to the MMU 324 to be transformed by the MMU 324 and then passed onto the RAM input address bus 512 to the RAM 322.

P-14 Procedure: Sending Data from Data Bus to Temporary Register

Data on the data bus 296, which connects with temporary register I/O bus 558, is stored in temporary register 559 by control signals on temporary register control bus 560 from the controller 294.

P-15 Procedure: Temporary Register to Data Bus

Data stored in the temporary register 559 is switched onto the temporary register I/O bus 558, which connects to the data bus 296 by control signals on the temporary register control bus 560 from the controller 294.

P-16 Data Bus to RAM

Data on the data bus 296, which connects with the RAM data bus 458, is switched into the RAM 322 by control signals on the RAM control bus 516.

P-17 Increment LF Presettable Up Counter and LF Presettable Down Counter

The controller 294 will put a '1' pulse on the LF presettable up counter clock line 561 to step to the next instruction cube address originating from the Li presettable up counter 464 and will put a '1' pulse on LF presettable down counter clock line 562 to down count one count.

P-18 Increment Li Presettable Up Counter and Li Presettable Down Counter

The controller 294 will put a '1' pulse on the Li presettable up counter clock line 563 to step to the next instruction cube address originating from the Li presettable up counter 464 and will put a '1' pulse on Li presettable down counter clock line 564 to down count one count.

P-19 Increment LNEW Presettable Up Counter

A 1 or true voltage pulse is put on LNEW presettable up counter clock line 565, denoted with symbol CLK LN. The preset counter value is the LNEW basic-address containing the address of the first cube in the first N bits and the number of cubes in the second N bits. Normally, the first cube will be in the data location addressed by one plus the preset LNEW counter value with the other cubes of LNEW1 following in address sequence. The number of cubes in the resultant list LNEWj, such as resultant list LNEW1, is the difference between the final counter value in the LNEW up counter 498, and the preset counter value.

P-20 Procedure: Selectable Reset to Encoder for ith Part Register

In The Instruction Register

The decoder 552, is enabled by putting a 1 or true voltage pulse on decoder enable line 566 from the controller 294, to put a 1 or true voltage pulse on only 1 line of an N line decoder output selectable reset bus 567, which will reset the respective register, such as perhaps the 1 bit register 338, in the instruction register 300 that the POR 518 generated a POR address from. For example, if the instruction cube were [1XX], then the 1 bit register to be reset is the register for part 1. A line in the N line decoder output selectable reset bus 562, in FIG. 16, would range between the reset 1 line 362, to the reset N line 426, as shown in FIG. 20.

P-21 Procedure: Generation of a Set of LNEW Lists

The LF/Li operation can best be described in a simplified example. This example will be with set LF to consist of 2 lists and each LF list to consist of 2 cubes and set Li to consist of 2 lists and each Li list to consist of 2 cubes as shown in Table 29. This procedure is described in a 47 step non-structured flowchart.

TABLE 29

| Present Invention | |
|---|---|
| Title: LF Set & Li Set To Be Used In Description Of P-21 Procedure For Generation Of A Set Of LNEW Lists Typical Application: LF/Li Set Operations are used to generate a set for 'w' in the algebraic relationship of 'w = f(g($y_1$, . . . $y_k$))'. | |
| LF1: | LF2: |
| cube 1: [1X0]<br>cube 2: [01X] | cube 1: [X10]<br>cube 2: [0X1] |
| Li1: | Li2: |
| cube 1: [1XX]<br>cube 2: [01X] | cube 1: [101]<br>cube 2: [010] |

46 Steps of the P-21 Procedure

Step_1: Loop to create NOT($LF_j$), j=1, N

Note: The NOT of $LF_j$ for j equals 1 to N is created in the disjoint sharp circuitry in the circuitry of FIG. 21.

With assistance from the MMU 324, the controller 294 sends commands on the ANDDS Control Bus 447, after a '1' exists on the CINV Ready Line 457, to send the NOT($LF_j$) set of lists as shown in Tables 25 & 26 onto the connected the data bus 296, then onto the connected data bus 458, then into the RAM 322.

Step_2: P-8 Procedure: Preset LNEW up counter

Step_3: P-5 Procedure: Preset Li Down Counter & Li Up Counter

Step_4: P-6 Procedure: Loading the Instruction Register

The first instruction cube [1XX] in Li1 in the instruction register 300 of list Li1 originated from the RAM location addressed by the Li up counter output bus 557 of the Li up counter 464.

Flowchart for Lij Instruction

Step_A: A part j of a Li1 cube with a 1, such as part 1 in cube [1XX], means the RAM data location for list LNEWA will contain all the cubes in list $LF_j$. A part j of a Li1 cube with a 0, such as part 0 in cube [0XX], means the RAM data location for list LNEWA will contain all the cubes in list NOT($LF_j$).

Step_B: After a $LF_j$ cube, such as cube 1 or [1X0] of LF1 is put into cube 1 of LNEWA, the LNEW presettable up counter 498 receives a pulse on LNEW presettable up counter clock line 565 from the controller 294. The controller 294 will also send a pulse to both the LF presettable up counter clock line 561 and LF presettable down counter clock line 562.

Step_C: Operation:

If the value in the Li presettable down counter 482 equals zero, then a pulse is sent on Li presettable down counter output line 568, else, the LF1 cube 2 [01X] is sent to LNEWA, in accordance to equation (58).

Endif

Step _5: P-7 Procedure: Instruction Register Operation

In accordance with the previously described P-7 procedure of the instruction register operation, the controller 294 is to begin to perform equation (56). The equation (56) is rewritten as equation (58).

$$LNEWA=LF1 \qquad (56)$$

$$LNEWA=(\text{cube 1 of } LF1 \text{ or } [1X0] \vee \text{cube 2 of } LF1 \text{ or } [01X]) \qquad (58)$$

$$\text{cube } j \text{ of } LNEWA=\text{cube 1 of } LF1 \qquad (60)$$

Step _6: P-10 Procedure: POR Code to MUX/MMU To RAM Address

Step _7: P-3 Procedure: Sending Data From RAM To Data Bus— for P-14 Procedure: Sending Data From Data Bus To Temporary Register Step _8: P-4 Procedure, Preset LF presettable down counter and LF presettable up counter Step _9: P-12 Procedure: LF presettable up counter output to MUX/MMU to RAM address.

Step _10: P-3 Procedure: Data in RAM to data bus

Step _11: P-15 Procedure: Data From Temporary Register To Data Bus

Step _12: P-10 Procedure: LNEW presettable up counter output to MUX/MMU To RAM address Step _13: P-15 Procedure: temporary register to Data Bus P-16 Data Bus To RAM Step _14: P-19 Procedure: increment LNEW presettable up counter & P-17 Procedure: both LF presettable down counter and LF presettable up counter.

Step _15: If no pulses appear on the LF presettable down counter output line 569 to the controller 294, Step _16 then more cubes remain in list; thus need to jump back to Step_6.

Step _17 Endif

Step _18: P-20 Procedure: Selectable Reset To Encoder For jth Part Register In The Instruction Register Step _19: If either the 0 bit OR gate output line 538 or the 1 bit OR gate output line 542 equal 1, Step_19 Explanation Cube instruction per Lij list is terminated when a register, such as the 1 bit register 338, does not contain a 1. If the 0 bit OR gate output line 538 and the 1 bit OR gate output line 542 are both 0, then the controller 294, will stop further cube instructions and will proceed to P-5.

Step _20: then the present cube in the instruction register 300 contain more parts to perform instructions to temporary list LNEWA and jump to Step_6.

Step _21: Else

Step _22: P-18 Procedure: Increment Li presettable up counter and Li presettable down counter Step _23: If no pulses come from the Li presettable down counter, Step _24: then more cubes remain in list; thus need to jump back to Step_3.

Step _25: Endif

Step _26: Endif

Step _27: P-10 Procedure: POR Code To MUX/MMU To RAM Address

Step _28: P-3 Procedure: Sending Data From RAM To Data Bus—P-14 Procedure: Sending Data From Data Bus To Temporary Register Step _29: P-4 procedure, Preset LF presettable down counter and LF presettable up counter Step _30: P-12 Procedure: LF presettable up counter output to MUX/MMU to RAM address.

Step _31: P-3 Procedure: Data in RAM to data bus

Step _32: P-15 Procedure: Data From Temporary Register To Data Bus

Step _33: P-10 Procedure: LNEW presettable up counter output to MUX/MMU To RAM address Step _34: P-15 Procedure: temporary register to Data Bus P-16 Data Bus To RAM Step _35: P-19 Procedure: increment LNEW presettable up counter & P-17 Procedure: both LF presettable down counter and LF presettable up counter.

Step _36: If no pulses appear on the LF presettable down counter output line 569 to the controller 294, Step _37: then more cubes remain in list; thus need to jump back to Step_6.

Step _38: Endif

Step _39: P-20 Procedure: Selectable Reset To Encoder For jth Part Register In The Instruction Register Step _40: If either the 0 bit OR gate output line 538 or the 1 bit OR gate output line 542 equal 1.

Step_19 Explanation

Cube instruction per Lij list is terminated when a register, such as the 1 bit register 338, does not contain a 1. If the 0 bit OR gate output line 538 and the 1 bit OR gate output line 542 are both 0, then the controller 294, will stop further cube instructions and will proceed to P-5.

Step _41: then the present cube in the instruction register 300 contain more parts to perform instructions to temporary list LNEWA and jump to Step_6.

Step _42: Else

Step _43: P-18 Procedure: Increment Li presettable up counter and Li presettable down counter Step _43: If no pulses come from the Li presettable down counter, Step _44 then more cubes remain in list; thus need to jump back to Step_3.

Step _45 Endif

Step _46 Endif

After each of the list operations, such as the three list operations in Table 21, a 1 or true voltage pulse is put on the LNEW presettable up counter clock line 565. The number of cubes in the resultant list LNEWj, such as resultant list LNEW1, is the difference between the final counter value in the LNEW presettable up counter 498, and the value preset into the LNEW presettable up counter 498. This value preset into the LNEW presettable up counter 498 is the LNEW basic-address containing the address of the first cube in the first N bits and the number of cubes in the second N bits. Normally, the first cube will be in the data location addressed by one plus the value preset into the LNEW presettable up counter 498 with the other cubes of LNEW1 following in address sequence.

The final counter value of the LNEW presettable up counter 498 is sent to the MMU 324, by:

(1) existing on the LNEW presettable up counter output bus 554, (2) connecting from the LNEW presettable up counter output bus 554 to LNEW MUX-B input bus 555, and (3) being switched thru the MUX-B 502, by signals on the MUX-B control bus 504 onto the MUX-B output bus, which inputs the MMU 324.

A LNEW register input bus 572, connected from the LNEW MUX-B input bus 555, is to be used to take the LNEW counter value of the LNEW up counter 498, to be stored in a LNEW register 574, by putting a 1 or true voltage pulse on LNEW preset line 576 from the controller 294. The output bus of the LNEW register 574 is the MUX-A input data bus B 578 to the MUX-A 472.

When all the cubes of list LNEWi, such as list LNEW1, are loaded into the RAM 322, the list LNEWi, such as list LNEW1, is not a disjoint list and is not a close boolean minimization. In order to convert the list LNEWi, such as list LNEW1, into a disjoint close boolean minimization, the list LNEWi, such as list LNEW1, must be passed twice thru the CINV 580, which exists within the ANDDS 448. The term CINV stands for cube inversion or NOTing a cube or list. The CINV 580 can perform a single disjoint sharp operation on any list, regardless of whether or not the cubes in the list are disjoint. In the event that most of data storage locations in the RAM 322, are occupied with several LNEWi lists, the controller 294, could stop processing cube instructions for the ith LNEWi list and then convert all or several LNEWj lists, for $1 \leqq j \leqq i$, to LNEWDMj lists. These LNEWDMj lists would be disjoint cube lists and be close boolean minimizations, and be created by the CINV 580 in the ANDDS 448.

Figure 22:
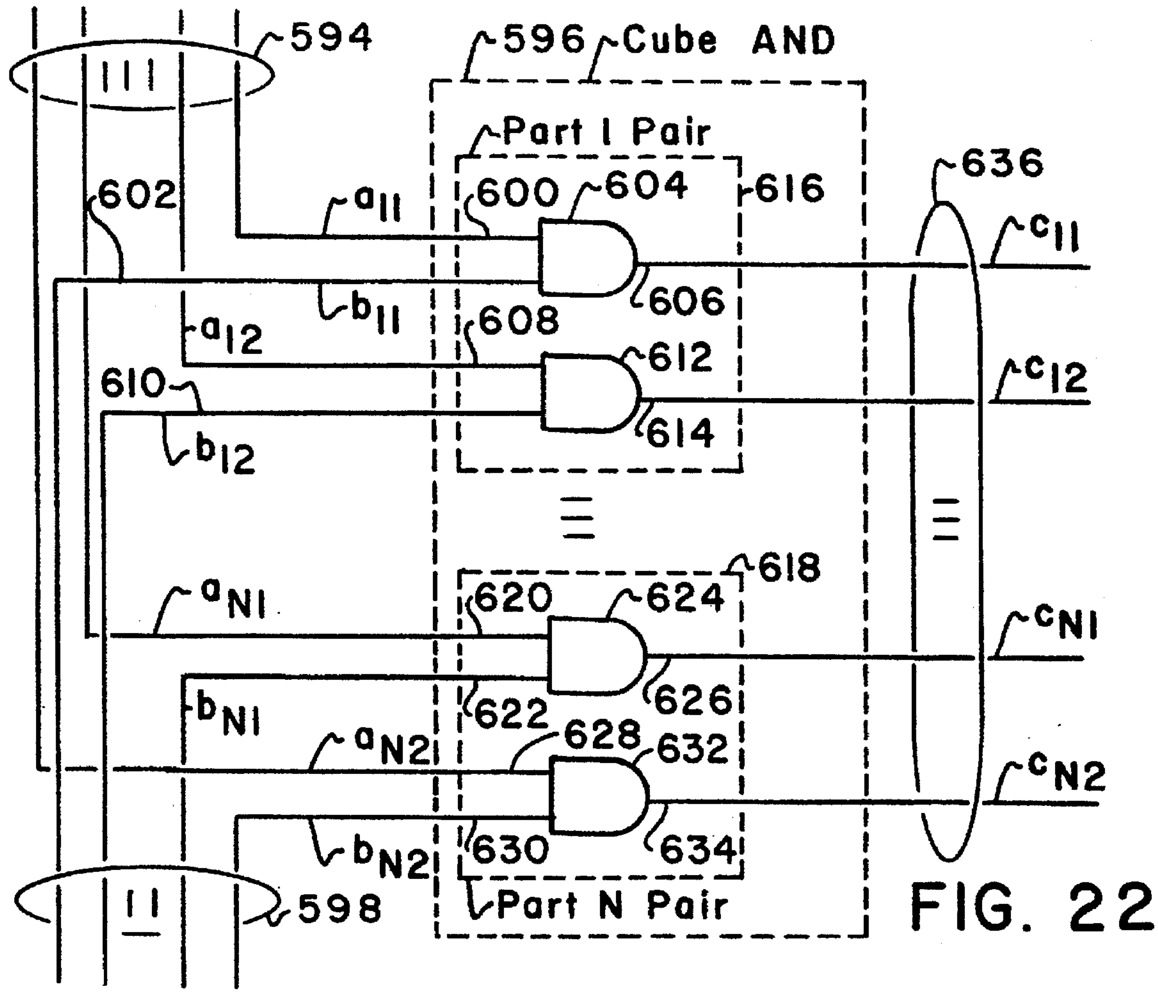
FIG. 22 shows a cube AND circuit.

Equations, which involve AND operations on lists, such as the equation (36), and NOT operations on lists, such as the disjoint sharp in the equation (38), are mainly performed within the ANDDS 448. To perform the ANDing of two lists, each cube, one at a time is ANDed with each cube of the other list, such as shown in the Table 25. As shown in FIG. 21, in preparation to ANDing two cubes, the cube of one list existing on cube AND register A input bus 582, connected to the data bus 296, is latched into cube AND register A 584, denoted with symbol A Reg., by pulsing latch A line 586 with a 1 or true voltage pulse from the controller 294, and the cube of the other list existing on cube AND register B input bus 588, connected to the data bus 296, is latched into cube AND register B 590, denoted with symbol B Reg., by pulsing latch line B 592 with a 1 or true voltage pulse from the controller 294. A cube stored in the cube AND register A 584 and thus existing on cube AND register A output bus 594 is the cube A input to a cube AND circuit 596. A cube stored in the cube AND register B 590 and thus existing on cube AND register B output bus 598 is the cube B input to a cube AND circuit 596. As shown in FIG. 22, the cube AND circuit 596, performs the AND operation of cube A with cube B by feeding the 0 bit of part j of cube A, such as a curve_AND_gate_L_input $a_{11}$ line 600, denoted with symbol $a_{11}$, from the cube AND register A output bus 594 with the 0 bit of part j of cube B, such as cube_AND_gate_L_input $b_{11}$ line 602, denoted with symbol $b_{11}$ from the cube AND register B output bus 598 into a 2 in AND gate, such as 2 in AND gate L 604 with a 0 bit output L line $c_{11}$ 606, denoted with symbol $c_{11}$, for bit 0, and by feeding the 1 bit of part j of cube A, such as cube_AND_gate_M_input $a_{12}$ line 608, denoted with symbol $a_{12}$, from the cube AND register A output bus 594, and feeding the 2 bit of part j of cube A, with the 1 bit of part j of cube B, such as cube_AND_gate_M_input $b_{12}$ line 610, denoted with symbol $b_{12}$, from the cube and register B output bus 598, into a 2 in AND gate, such as 2 in AND gate M 612 with 1 bit output L $c_{12}$ line 614, denoted with symbol $c_{12}$, for bit 1. A part 1 pair of bit AND gates, such as part_1_AND_gate_L_M_pair 616, denoted with dotted lines and denoted with symbol Part 1 Pair, are needed for all cube parts up to part_N_AND_gate_N_O_pair 618, denoted with symbol dotted lines and Part N Pair, where as shown in FIG. 22, the cube AND circuit 596, performs the AND operation of cube A with cube B by feeding the 0 bit of part j of cube A, such as cube_AND_gate_N_input $a_{N1}$ line 620, denoted with symbol $a_{N1}$, from the cube AND register A output bus 594 with the 0 bit of part j of cube B, such as cube_AND_gate_N_input $b_{N1}$ line 622, denoted with symbol $b_{N1}$ from the cube AND register B output bus 598 into a 2 in AND gate, such as 2 in AND gate N 624 with a 0 bit output L $c_{N1}$ line 626, denoted with symbol $c_{N1}$, for bit 0, and by feeding the 1 bit of part j of cube A, such as cube_AND_gate_O_input $a_{N2}$ line 628, denoted with symbol $a_{N2}$, from the cube AND register A output bus 594, and feeding the 1 bit of part j of cube A, with the 1 bit of part j of cube B, such as cube_AND_gate_O_input $b_{N2}$ line 630, denoted with symbol $b_{N2}$, from the cube AND register B output bus 598, into a 2 in AND gate, such as 2 in AND gate O 632 with 0 bit output L $c_{N2}$ line 634, denoted with symbol $c_{N2}$, for bit 1. All the 0 bit output K lines, such as the 0 bit output K line $c_{11}$ 606, denoted with symbol $c_{11}$, to range to the 0 bit output K line $c_{N1}$ 626, denoted with symbol $C_{N1}$, and all the 1 bit output K lines, such as the 1 bit output K line $c_{12}$ 614, denoted with symbol $c_{12}$, to range to the N bit output K $c_{N2}$ line 634, denoted with symbol $c_{N2}$, comprise cube_AND_gate_L_M_N_O_output bus 636. As shown in FIG. 21, a valid detector input bus 638, connected to the cube_AND_gate_L_M_N_O_output bus 636, which connects to cube AND gate input bus 640. Since the resultant cube on the valid detector input bus 638 may or may not be a valid cube, a valid detector 642, denoted with symbol Valid Detector, looks at the cube on the valid detector input bus 638 by checking that every part contains at least a 1, or a 0, or an X by inputting both a 0 bit valid detector input $C_{11}$ line 644, denoted with symbol VD-$C_{11}$, and 1 bit valid detector input $C_{12}$ line 646, denoted with symbol VD-$C_{12}$, into a 2 in OR gate for every part, such as 2 in OR gate D 648 for part 1 with a 2 in OR gate D output 650 to range to inputting both a 0 bit valid detector input $C_{N1}$ line 652, denoted with symbol VD-$C_{N1}$, and 1 bit valid detector input $C_{N2}$ line 654, denoted with symbol VD-$C_{N2}$, into a 2 in OR gate for every part, such as 2 in OR gate E 656 for part 1 with a 2 in OR gate E output 658 and outputs of these 2 in OR gates are inputted into an N input AND gate A 660 to provide an output of 1 on N input AND gate A output line 662 for a valid cube. A valid cube contains a 1 in the 0 bit location and/or a 1 in the 1 bit location of every part. A non valid cube is discarded by the controller 294. A list of valid cubes is the resultant of the ANDing of two lists and being verified as valid by a valid detector.

As shown in FIG. 21, a valid cube on the cube AND gate input bus 640 is sent thru a cube AND gate 664, denoted with symbol Gate, by a 1 or true voltage put on both:

(1) cube AND gate enable line A 666, and (2) cube AND gate enable line B 668 onto cube AND output bus 669. The tristate output control line C 446 divides into connected:

(1) the cube AND gate enable line B 668 and connected (2) CINV tristate inhibit control line 670.

The CINV 580, has an operation enable bus 672 connected to the ANDDS Control Bus 447, and has a CINV Ready line 457, which is used to inform the controller 294, that the CINV 580, is ready to emit cubes of list 'A.AND.(.NOT.B)' onto CINV ABC bus 676, denoted with symbol ABC. Note: the list 'A.AND.(.NOT.B)' is the result of removing list B from list A. The cubes in list A were each loaded from the data bus 296, onto the CINV ABC bus 676, with signals on the operation enable bus 672 from the ANDDS Control Bus 447. The cubes in list B were each loaded from the data bus 296, onto the CINV ABC bus 676, with signals on the operation enable bus 672 from the ANDDS Control Bus 447. The CINV 580, denoted with symbol CINV, performs the list operation of 'A.AND.(.NOT.B)', which is the removal of cubes of list B from the cubes of list A.

Figure 24:
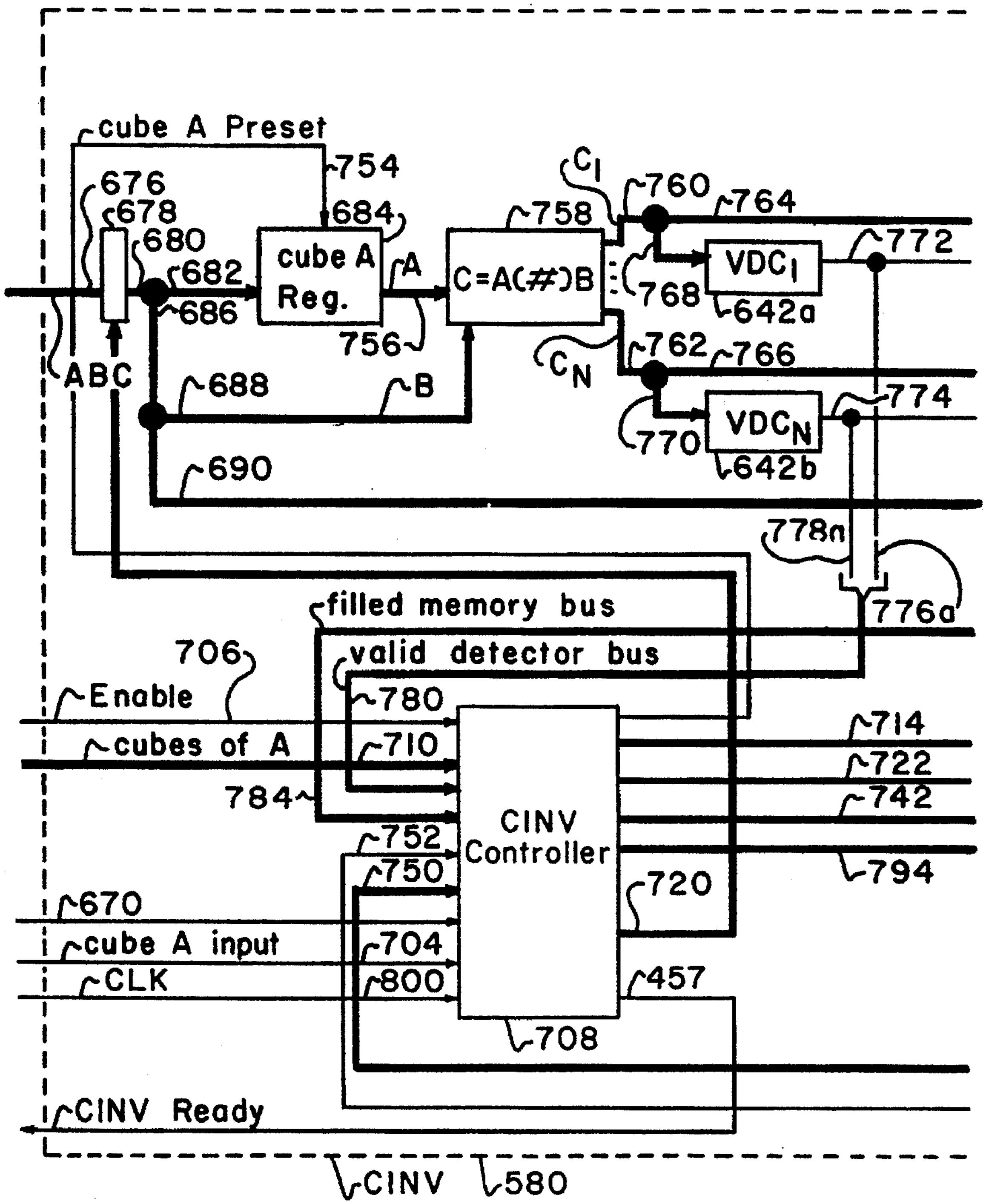
FIG. 24 is the left section of the CINV circuit 580.
Figure 25:
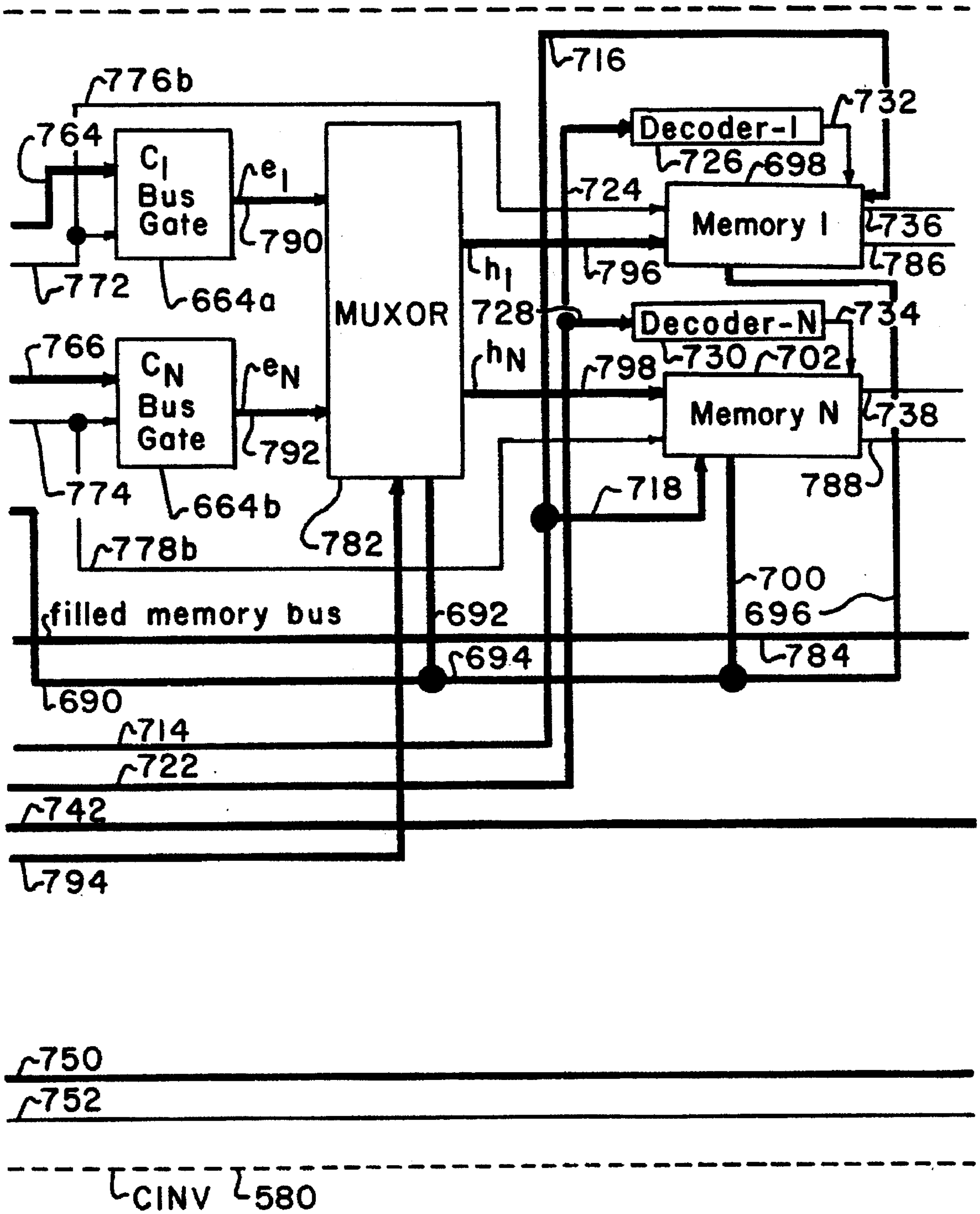
FIG. 25 is the middle section of a CINV circuit 580.
Figure 26:
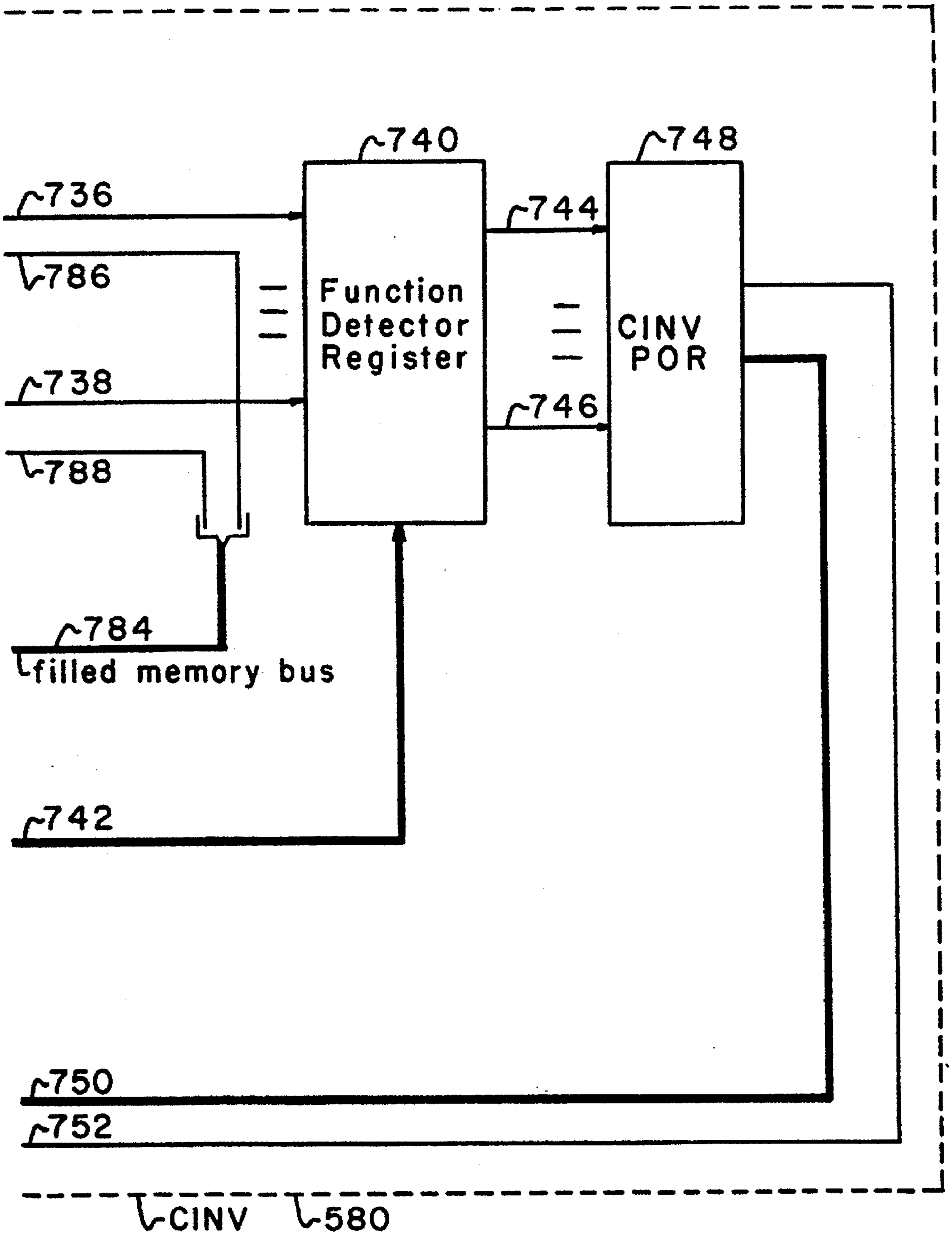
FIG. 26 is the right section of a CINV circuit 580.

The NOT of a list is performed by the CINV 580. Note: The CINV circuit 580 is shown separated in detail in FIGS. 24, 25 and 26, where FIG. 24 is the left section of the CINV 580, FIG. 25 is the middle section of the CINV 580, and FIG. 26 is the right section of the CINV 580.

The CINV 580, can perform operations on lists A and B, as shown in Table 30.

TABLE 30

| Present Invention |
|---|
| Title: Operations an lists A and B: |
| 1. U (#) B or .NOT.B,<br>2. A (#) B or [A.AND.[.NOT.B]],<br>3. merge A with B or [A.OR.B] |

Purpose of CINV

The first purpose of the CINV is to store list A in a number of N memory circuits with each memory circuit having close to the same number of cubes as each other memory circuit.

The second purpose of the CINV is to receive cubes in list B one at a time and examine how each operates with cubes of list A according to Table 31.

The third purpose of the CINV is to remove each cube from list A using a circuit that performs the disjoint sharp operation or '$C_j$=A(#)B', in accordance with Table 5.

The CINV 580 is constructed to perform the above three purposes as rapidly as possible.

Circuit Description of CINV

As shown in FIGS. 24, 25 and 26, the CINV 580, denoted in dotted lines, receives and emits 2N bit cubes on 2N lines on the CINV ABC bus 676, which connects to I/O tristate gate 678, which has I/O CINV side bus A 680. The I/O gate 678, contains the prior art tristate circuitry of a Quadruple Bus Transceiver 74S243 or bidirectional tristate gate. The I/O CINV side bus A bus 660 connects to 2N input register bus 682 of cube A register 684, and to line connect B bus 686. The 2N line connect B bus 686 connects to 2N input cube B bus 688, denoted with symbol B, and to 2N line connect MUXOR bus 690. The 2N line connect MUXOR bus 690 connects to 2N line connect MUXOR bus 690 and connects to 2N line MUXOR bus 692 and 2N line connect memory bus 694. The 2N line connect memory bus 694 connects to 2N line memory 1 bus 696 of memory_1 698, to range to 2N line memory_N bus 700 of memory_N 702.

As shown in FIGS. 24, 25 and 26, the operation enable bus 672, shown intact in FIG. 21, consists of:

(1) cube A input 704, (2) CINV enable line 706, to the CINV controller 708, (3) N line cube number bus 710, denoted with symbol cubes of A, and (4) the CINV ready line 457.

The CINV ready line 457, is an output of the CINV controller 708.

Prior to inputting cubes of a list A, the CINV Controller needs the number on the N line number bus 710, denoted with symbol cubes of A, to calculate how many cubes in each cube group of list A to send to each memory circuit.

After the CINV 580, performs a list operation on list A and list B, such as removal of list B from list A, the CINV controller 708, will put a 1 or true voltage on the CINV ready line 457, to inform the logic code generator 2 that the list operation is complete and the resultant list, such as list C, is ready to be emitted on the I/O CINV side bus 680 thru the I/O tristate gate 678 onto the CINV ABC bus 676.

The CINV tristate inhibit control line 670 with a 0 or false voltage informs the CINV controller 708, not to emit the signals on the I/O CINV side bus 680 thru the I/O tristate gate 678.

Prior to List A Storage

After the CINV controller 708, receives the number of cubes in list A on the N line number bus 710, denoted with symbol cubes of A, the CINV controller 708, will put a tristate inhibit voltage on a line in memory array control bus 714, which connects to memory 1 control bus 716 of the memory 1 698, to range to memory N control bus 718 of the memory N 702. This tristate inhibit voltage on this line will instruct each memory circuit, such as the memory 1 698, not to output a cube onto 2N line memory j bus, such as respectively, 2N line memory 1 bus 696. At the same time, the CINV controller 708, will put a control word on I/O gate control bus 720 to instruct the I/O tristate gate 678 to switch to receive cubes from the CINV ABC bus 676. Again at the same time, the CINV controller 708, will put a 0 or false voltage onto the CINV ready line 457.

List A Storage

A cube, which is put on the CINV ABC bus 676, by the logic code generator 2, passes thru the I/O tristate gate 678 onto:

(first) the I/O CINV side bus A 680, then (second) onto the 2N line connect B bus 686, then (third) onto the 2N line connect MUXOR bus 690, then (fourth) onto the 2N_line_connect_memory_bus 694, then (finally fifth) onto 2N_line_memory_1_bus 696 to range to 2N_line_memory_N_bus 700.

At the same time, the CINV controller 708, will put a memory control word on the memory array control bus 714, which connects to the memory 1 control bus 716 to range to memory N control bus 718. This control word will instruct the memory controller inside the addressed memory j, such as the memory 1 698, by a decode word to load cubes on the cube bus, such as the 2N line memory 1 bus 696. When all the cubes in list A are stored in the CINV 580, the CINV controller 708, will put a 1 or true voltage on the CINV ready line 457 to inform the logic code generator 2 that list A is stored fairly evenly distributed among the memories, such as the memory 1 698.

In general, the cubes in list A will not be evenly divided among N memory circuits. For example, if the number of cubes in list A were 1,023 cubes and N equalled 16 memories, then no memories would contain exactly '1023/16' or 63,9375 cubes, because the number of cubes stored must be an integer. The solution to which memories would store 64 cubes and which memories would store 63 cubes would be determined by decision logic internal of the CINV controller 708, which could be similar to the calculation flowchart of Table 31.

TABLE 31

Present Invention

Title: Derivation Of Flowchart For Distributing Cubes Among N Memories

Example: Given # of cubes = 1,023
Given N of cube parts = 16
Calculation
#/N = 1023/16
#/N = 63.9375
LD = left of decimal or integer part of #/N
LD = 63
All memories contain at least LD cubes.

Number of memories with one more than LD or 'LD + 1' cubes =
= # − (LD × N)
= 1023 − (63 × 16)
= 1023 − 960
= 15

Suggested Steps CINV Logic Flowchart

1. N = 16
2. # = 1023
3. LD = part of #/N, which is integer or left of decimal
4. Q = # − (LD × N)
5. DO LOOP: Set memory address counter to zero or '0 . . . . . . 0'.
6. Increment memory address counter by 1.
7. If memory address counter is not greater than Q, then
8. store 'LD + 1' cubes of list in memory addressed by memory address counter
9. Else if (memory address counter not greater than N), then
10. store LD cubes of list
11. End if
12. END DO for increment loop
13. Put 1 or true voltage on the CINV ready line 457.

The CINV controller 708, puts the binary address number on memory address bus 722, which connects to a memory j address decoder bus, such as memory 1 address decoder bus 724 of memory 1 address decoder 726, denoted with symbol Decoder-1, to range to memory N address decoder bus 728 of memory N address decoder 730, denoted with symbol Decoder-N. A memory address decoder line, such as memory 1 decoder line 732 to range to memory N decoder line 734 of the memory j address decoder, such as the memory 1 address decoder 726, denoted with symbol Decoder-1, to range to the memory N address decoder 730, denoted with symbol Decoder-N, enables the addressed memory, such as the memory 1 698, to range to the memory N 702, to load the addressed memory with cubes of list A.

Examine List B Relative to List A in Accordance with Code 1—the Table 21

Each cube of list B is sent from the CINV ABC bus 676, onto various connected buses to all memory buses, such as the 2N line memory 1 bus 696 to range to the 2N line memory N bus 700. The cube is sent from the CINV ABC bus 676, thru the I/O tristate gate 678 onto the various connected buses:

(1) onto the I/O CINV side bus A 680,
(2) onto connected the 2N line connect B bus 686,
(3) onto the 2N line connect MUXOR bus 690,
(4) onto the 2N line connect memory bus 694,
(5) onto 2N line memory j bus, such as the 2N line memory_1 bus 696 to range to the 2N line memory_N bus 700.

A control word to perform a list examination, in accordance with the Table 32, such as 'determining if list A covers list B', is sent onto the memory array control bus 714 and onto connected memory j control bus, such as the memory 1 control bus 716 to range to the memory N control bus 718. If list examination is positive, then a 1 or true voltage will appear on a function detector output j line, such as function detector output 1 line 736 to range to function detector output N line 738, which inputs to N input function detector register 740. A function detector register control bus 742 to the N input function detector register 740, contains N+1 lines, consisting of one function detector register preset latch line to latch the function detector output j lines, such as the function detector output 1 line 736 to range to the function detector output N line 738, into N respective internal registers and N reset lines to reset each of the N respective internal registers. The function detector register 740, has N output lines, such as function detector register output 1 line 744 to range to function detector register output N line 746, which input to a CINV POR 748, with POR meaning priority OR, having a CINV POR output bus 750 and a CINV POR detector line 752 input to the CINV controller 708. The POR code on the CINV POR bus identifies the memory j, which contains the cube of list A that covers or will operate per control word with the cube of list B.

Removal of List B from List A

When a functional detector output j line, such as the function detector output 1 line 736 to range to function detector output N line 738 appears with a 1 or true voltage, a memory j, such as the memory 1 698, to range to the memory N 702, has a cube of list A, which covers the cube of list B on the respective 2N line memory j bus, such as the 2N line memory 1 bus 696 to range to the 2N line memory N bus 700. If cube A covers cube B, then cube A contains all the states or binary numbers within cube B. To perform the removal of cube B from cube A, cube A will need to be sent to and stored in the curve A register 684.

Before the removal operation, the I/O tristate gate 678 receives a control word on the I/O gate control bus 720 to open the switch in both directions and then the cube A, which is stored in memory_j, such as memory_1 698, is sent by a control word to the memory array control bus 714 with an address on the memory address bus 722 to instruct memory j to put cube A onto 2N line memory_j bus, such as the 2N line memory 1 bus 696 to range to the 2N line memory_N bus 700, to connect the 2N line connect memory bus 694, onto connected the 2N line connect MUXOR bus 690, onto the 2N line connect B bus, onto the 2N input register bus 692. With a 1 or true voltage pulse on a cube A preset line 754, cube A is stored in the cube A register 684, with a 2N cube A register output bus 756, denoted with symbol A. The 2N cube A register output bus 756, denoted with symbol A, inputs to the disjoint sharp operation circuit 758, denoted with symbol C=A(#)B. Now the 2N bit cube B, existing on the CINV ABC bus 676, is switched thru the I/O tristate gate 678, onto the I/O CINV side bus 680, onto the connected 2N line connect B bus 686, onto the 2N input cube B bus 688 of the disjoint sharp operation circuit 758, denoted with symbol C=A(#)B. The exact operation of the disjoint sharp operation circuit 758, denoted with symbol C=A(#)B, is shown in Table 5 in Background Art of this patent, and is prior art as given in MINI, being a reference.

The N output cubes $C_j$, of 2N bits each, appear on N buses of 2N lines per bus from cube $C_1$ bus 760, to range to cube $C_N$ bus 762. Connected to each cube j bus, such as the cube $C_1$ bus 760, to range to the cube $C_N$ bus 762 are:
(1) a 2N line gate $C_j$ bus, such as 2N line gate $C_1$ input bus 764 to range to 2N line gate $C_N$ input bus 766, and
(2) a 2N line valid detector $C_j$ input bus, such as 2N line valid detector $C_1$ input bus 768 to range to 2N line valid detector $C_N$ input bus 770, of $C_j$ valid detector, such as $C_1$ valid detector 642a, denoted with symbol VD1, to range to $C_N$ valid detector 642b, denoted with symbol VDN.

Figure 23:
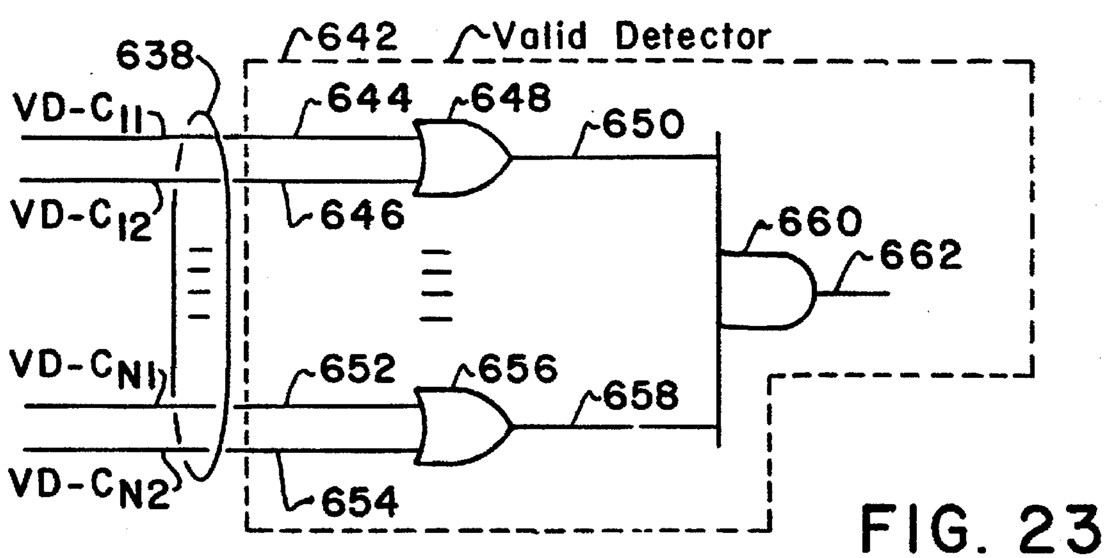
FIG. 23 shows a valid detector circuit to analyze if a cube is a valid cube.

Note, valid detectors, such as the $C_1$ valid detector 642a to range to the $C_N$ valid detector 642b, are the same circuit and shown in detail in the FIG. 23.

The disjoint sharp process, as shown in the Table 5 in Background Art of this patent, usually produces quite a few non valid cubes with a null in at least one part of a cube or perhaps 60% plus on average non valid cube production. Each non valid cube is detected with a valid detector circuit, such as the $C_1$ valid detector 642a, and is not permitted to be switched into a memory j, such as the memory_1 698. A non valid cube must not be stored. If the $C_j$ cubes coming out of the disjoint sharp operation circuit 758 were not examined for validity and were not discarded if non valid, the memory j, such as the memory_1 698, would very rapidly run out of memory storage. Without memory for stage of cubes, the logic code generator 2 would be useless.

A $C_j$ valid detector output line, such as $C_1$ valid detector output line 772 to range to $C_N$ valid detector output line 774, is:
(1) a control input to a $C_j$ cube AND gate, such as respectively $C_1$ cube AND gate 664a, denoted with symbol $C_1$ bus gate to range to $C_N$ cube AND gate 664b, denoted with symbol $C_N$ Bus Gate, and
(2) connected to a valid ja line, such as valid 1a line 776a to range to valid Na line 778a of N line valid detector bus 780, and
(3) to a valid jb line, such as valid 1b line 776b to range to valid Nb line 778b.

The N line valid detector bus 780 inputs to the CINV controller 708 to allow for various decision circuitry to steer valid $C_j$ cubes thru MUXOR switch 782, to the memory j, such as the memory_1 698, to range to the memory_N 702 with the most cube storage available.

The CINV controller 708, will know which memories, such as the memory_1 698, to range to the memory_N 702, are filled up by examining if a 1 or true voltage exists on each line of N line filled memory bus 784, such as filled memory 1 detector line 786 to range to filled memory N detector line 788, of memory_j, such as respectively the memory_1 698, to range to the memory_N 702.

The 2N line $C_j$ output bus, such as 2N line $C_1$ output bus 790, denoted with symbol $e_1$, to range to 2N line $C_N$ output bus 792, denoted with symbol $e_N$, of cube AND gate, such as the C1 cube AND gate 664a to range to the CN cube AND gate 664b, respectively, is the N bus input bus to the MUXOR switch 782, which is controlled by the CINV controller 708 via CINV controller control bus 794. The MUXOR switch 782 can:
(1) switch each Cj output bus, such as the 2N line C1 output bus 790, denoted with symbol $e_1$, to range to the 2N line CN output bus 792, denoted with symbol $e_N$, to each memory j input bus, such as memory 1 input bus 796, denoted with symbol $h_1$, to range to memory 1 input bus 798, denoted with symbol $h_N$, or (2) switch any one $C_j$ output bus, such as the $C_1$ output bus 790, denoted with symbol $e_1$, to only one memory j input bus, such as the memory 1 input bus 796, denoted with symbol $h_1$, or (3) switch any one 2N line $C_j$ output bus, such as the 2N line $C_1$ output bus 790, denoted with symbol $e_1$, to the 2N line MUXOR bus 692.

The CINV controller 708 will put cubes on the 2line MUXOR bus 692 in order to store some cubes in memory external of the CINV 580, in the case that most of the memory locations are presently utilized.

The CINV controller 708, receiving a clock pulse on CINV clock line 800, denoted with symbol CLK, performs several decisions and/or perhaps a priority OR decision based on the number of lines in the N line valid detector bus 780, denoted with symbol valid detector bus, with a 1 or true voltage, signifying a valid cube per 1 or true voltage on each valid j line, such as the valid 1*a* line 776*a*, of the N line valid detector bus 780, and based on the number of lines in the N line filled memory bus 784 wth a 0 or false voltage, signifying memory still is available to hold cubes per 0 or false voltage on each filled memory j detector line, such as the filled memory 1 detector line 786 of the N line filled memory bus 784.

TABLE 32

Present Invention

Title: Number Of Detailed Detection Operations Of Memory j

| Code | Detailed Detection Operation Of Memory j |
|---|---|
| 1 | Cover Detection: if cubes stored in memory j, called list A of memory j, cover cube B, a 1 or a true voltage will be generated. |
| 2 | AND Detection: if cubes stored in memory j, called list A in memory j, contain one or more states or numbers in cube B, a 1 or a true voltage will be generated. |
| 3 | Merge Detection: if any cube stored in memory j, called cube A, can merge or combine together, with cube B to form one new cube, a 1 or a true voltage will be generated. |
| 4 | Null Detection: if memory j contains only null cubes, a 1 or a true voltage will be generated. |
| 5 | Send a cube out onto 2N line memory j bus Note: Operation of code number 5 would be cube in list A.AND.(.NOT.B) |

Figure 27:
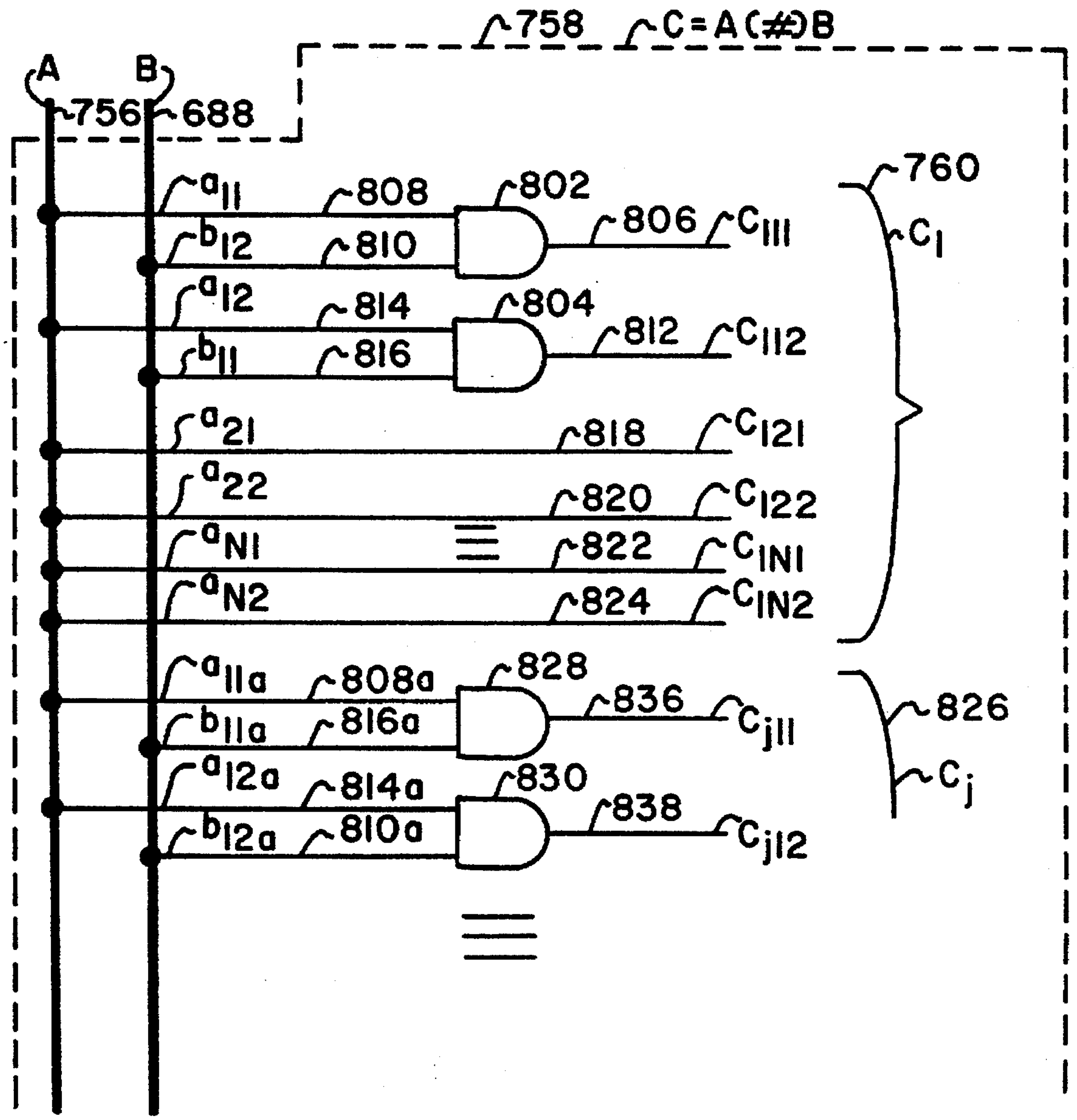
FIG. 27 is the top section of the disjoint sharp circuit 758.
Figure 28:
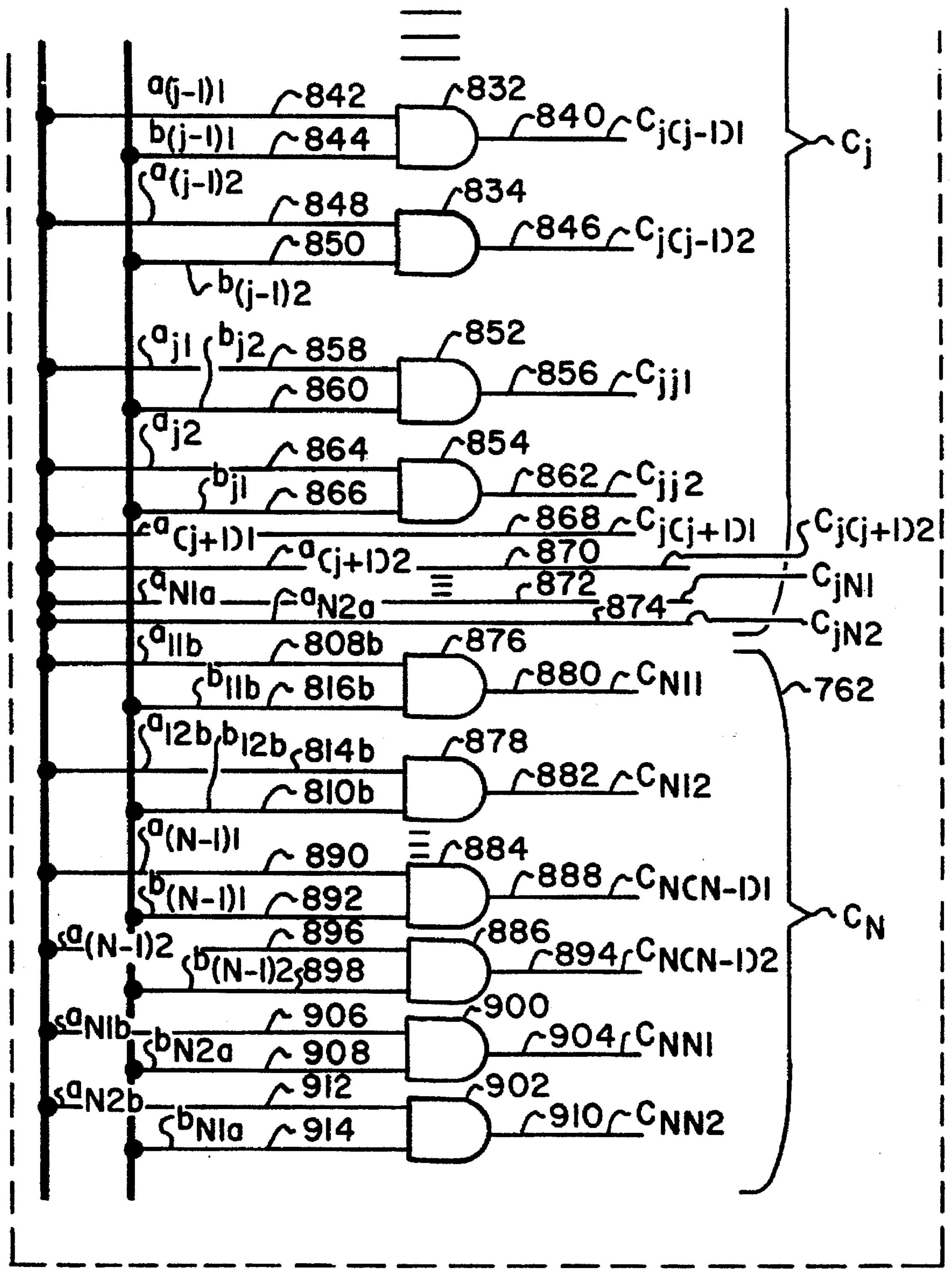
FIG. 28 is the bottom section of the disjoint sharp circuit 758.

The 'C=A(#)B' 758 is shown separated in FIGS. 27 and 28, where FIG. 27 is the top section of the 'C=A(#)B' 580 and FIG. 28 is the bottom section of the 'C=A(#)B' 580.

As shown in FIGS. 27 and 28, the 2N line cube A register output bus 756, denoted with symbol A, and the 2N input cube B bus 688, denoted with symbol B, are inputs to the disjoint sharp operation circuit 758, denoted in dotted lines and denoted with symbol C=A(#)B. The various cubes of C, such as cube $C_1$, which represent the cube $C_1$ bus 760, are shown in the Table 5, with only 1 cross term per part or $a_jb_j$ term, such as $a_1b_1$, and no straight terms per part of $a_jb_j$ terms. To create the $C_1$ cross term of cube $C_1$, a pair of 2 input AND gates are needed as shown in the FIGS. 27 and 28, as 2 input AND gate P 802 and 2 input AND gate Q 804. The first bit of a cross term, such as $C_{111}$ line 806, is generated by using the 2 input AND gate P 802 to AND the first bit of a respective 2 bit part of the 2N line cube A register output bus 756, denoted with symbol A, such as $a_{11}$ line 808, denoted with symbol $a_{11}$, with the second bit of a respective 2 bit part of the 2N input cube B bus 688, denoted with symbol B, such as $b_{12}$ line 810. The second bit of a cross term, such as $C_{112}$ line 812, is generated by using the 2 input AND gate P 804 to AND the second bit of a respective 2 bit part of the 2N line cube A register output bus 756, denoted with symbol A, such as $a_{12}$ line 814, with the first bit of a respective 2 bit part of the 2N input cube B bus 688, denoted with symbol B, such as $b_{11}$ line 816. The remaining cube $C_1$ parts, such as $C_{(cube,part,bit)}$ for parts greater than one, are the same as cube A parts, such as $A_{(part,bit)}$, or bit one $C_{1j1}$ is defined in equation (56) and bit two $C_{1j2}$ is defined in equation (58). As $$C_{1j1}=A_{j1} \text{ for } j>1 \tag{56}$$

$$C_{1j2}=A_{j2} \text{ for } j>1 \tag{58}$$

shown in FIG. 27, $C_{121}$ line 818, denoted with symbol $C_{121}$ on the right end of line and denoted with symbol $a_{21}$ on the left end of line, and $C_{122}$ line 820, denoted with symbol $C_{122}$ on the right end of line and denoted with symbol $a_{22}$ on the left end of line, thru $C_{1N1}$ line 822, denoted with symbol $C_{1N1}$ on the right end of line and denoted with symbol $a_{N1}$ on the left end of line, and $C_{1N2}$ line 824, denoted with symbol $C_{1N2}$ on the right end of line and denoted with symbol $a_{N2}$ on the left end of line, illustrate the equation (56) and the equation (58).

As shown in the Table 30, a generalized bus of C, such as cube $C_j$ bus 826, and represented by cube $C_j$, is shown with j−1 straight terms or $a_{j-1}b_{j-1}$ and one cross term or $a_jb_j$ term. The straight terms are generated with a pair of 2 input AND gates as 2 input AND gate R 828 and 2 input AND gate S 830 for part 1 of $C_{(cube,part,bit)}$ to range to a pair of 2 input AND gates as 2 input AND gate T 832 and 2 input AND gate U 834 for part j−1 of $C_{(cube,part,bit)}$.

In a straight term, the first bit of the first part, such as $C_{j11}$ line 836, is generated by the 2 input AND gate Q 828 to AND the first bit of a respective 2 bit part of the 2N line cube A register output bus 756, denoted with symbol A, such as $a_{11a}$ line 808*a*, with the first bit of a respective 2 bit part of the 2N input cube B bus 688, denoted with symbol B, such as $b_{11a}$ line 816*a*. The $a_{11a}$ line 808*a*, and the $b_{11a}$ line 816*a*, are respectively connected to the $a_{11}$ line 808, and the $b_{11}$ line 816.

In a straight term, the second bit of the first part, such as $C_{j12}$ line 838, is generated by using the AND gate R 830 to AND the second bit of a respective 2 bit part of the 2N line cube A register output bus 756, denoted with symbol A, such as $a_{12a}$ line 814*a*, with the second bit of a respective 2 bit part of the 2N input cube B bus 688, denoted with symbol B, such as $b_{12a}$ line 810*a*. The $a_{12a}$ line 814*a* and the $b_{12a}$ line 810*a* are respectively connected to the $a_{12}$ line 814 and the $b_{12}$ line 810.

In the (j−1)the straight term, the first bit of the first part, such as $C_{j(j-1)1}$ line 840, is generated by the 2 input AND gate T 832 to AND the first bit of a respective 2 bit part of the 2N line cube A register output bus 756, denoted with symbol A, such as $a_{(j-1)1}$ line 842, with the first bit of a respective 2 bit part of the 2N input cube B bus 688, denoted with symbol B, such as $b_{(j-1)1}$ line 844.

In the (j−1)th straight term, the second bit of the first part, such as $C_{j(j-1)2}$ line 846, is generated by using the AND gate U 834 to AND the second bit of a respective 2 bit part of the 2N line cube A register output bus 756, denoted with symbol A, such as $a_{(j-1)2}$ line 848 with the second bit of a respective 2 bit part of the 2N input cube B bus 688, denoted with symbol B, such as $b_{(j-1)2}$ line 850.

To create the one $C_j$ cross term or $a_jB_j$ term of cube $C_j$, a pair of 2 input AND gates are needed as shown in FIG. 28 as 2 input AND gate V 852 and 2 input AND gate W 854. The first bit of the cross term, such as $C_{jj1}$ line 856, is generated by using the 2 input AND gate V 852 to AND the first bit of a respective 2 bit part of the 2N line cube A register output bus 756, denoted with symbol A, such as $a_{j1}$ line 858, with the second bit of a respective 2 bit part of the 2N input cube B bus 688, denoted with symbol B, such as $b_{j2}$ line 860. The second bit of the cross term or $C_{jj2}$ line 862, is generated by using the 2 input AND gate V 854 to AND the second bit of the respective 2 bit part of the 2N line cube A register output bus 756, denoted with symbol A, such as $a_{j2}$ line 864, with the first bit of the respective 2 bit part of the 2N input cube B bus 688, denoted with symbol B, such as $b_{j1}$ line 866. The remaining cube $C_j$ parts, such as $C_{(cube,part,bit)}$ for parts greater than j, are the same as cube A parts, such as $A_{(part,bit)}$, or bit one $C_{jk1}$ is defined in equation (60) and $C_{jN1}$ is defined in equation (62), and bit two $C_{jk2}$ is defined in equation (64) and $C_{jN2}$ is defined in equation (66).

$$C_{1k1}=a_{k1}\ (N-1)\geqq k>j \qquad (60)$$

$$C_{1N1}=a_{N1a} \qquad (62)$$

$$C_{1k2}=a_{k2}(N-1)\geqq k>j \qquad (64)$$

$$C_{1N2}=a_{N2a} \qquad (66)$$

As shown in FIG. 28, $C_{j(j+1)1}$ line 868, denoted with symbol $C_{j(j+1)1}$ on right end of the line and denoted with symbol $a_{(j+1)1}$ on left end of line, and $C_{j(j+1)2}$ line 870, denoted with symbol $C_{j(j+1)2}$ on right end of line and denoted with symbol $a_{(j+1)2}$ on left end of line, thru $C_{jN1}$ line 872, denoted with symbol $C_{jN1}$ on right end of line and denoted with symbol $a_{N1a}$ on left end of line, and $C_{jN2}$ line 874, denoted with symbol $C_{jN2}$ on right end of line and $a_{N2a}$ on left end of line, illustrate the equation (58) and the equation (66).

As shown in the Table 5, the Nth bus of C, such as the cube $C_N$ bus 762 and represented by cube $C_N$, is shown with N−1 straight terms in all parts except the Nth part and one cross term in the Nth part of $a_N b_N$ term. The N−1 straight terms are generated with a pair of 2 input AND gates as 2 input AND gate X 876 and 2 input AND gate Y 878 for part 1 of $C_{(cube,part,bit)}$ to range to a pair of 2 input AND gates as 2 input AND gate Z 884 and 2 input AND gate AA 886 for non N parts of $C_{(cube,part,bit)}$.

In a straight term, the first bit of the first part, such as $C_{N11}$ line 880, is generated by using the 2 input AND gate X 876 to AND the first bit of a respective 2 bit part of the 2N line cube A register output bus 756, denoted with symbol A, such as $a_{11b}$ line **808*b*, with the first bit of a respective 2 bit part of the 2N input cube B bus 688, denoted with symbol B, such as $b_{11b}$ line 816*b*. The $a_{11b}$ line 808*b*, and the $b_{11b}$ line 816*b*, are respectively connected to the $a_{11}$ line 808 and the $b_{11}$ line 816**.

In a straight term, the first bit of the second part, such as $C_{N12}$ line 882 is generated by using the 2 input AND gate X 878 to AND the first bit of a respective 2 bit part of the 2N line cube A register output bus 756, denoted with symbol A, such as $a_{12b}$ line **814*b* with the first bit of a respective 2 bit part of the 2N input cube B bus 688, denoted with symbol B, such as $b_{12b}$ line 810*b*. the $a_{12b}$ line 814*b*, and the $b_{12b}$ line 810*b*, are respectively connected to the $a_{12}$ line 814 and the $b_{12}$ line 810**.

In the (j−1)th straight term, the first bit of the first part, such as $C_{N(N-1)1}$ line 888, is generated by the 2 input AND gate Z 884 to AND the first bit of a respective 2 bit part of the 2N line cube A register output bus 756, denoted with symbol A, such as $a_{(N-1)1}$ line 890, with the first bit of a respective 2 bit part of the 2N input cube B bus 688, denoted with symbol B, such as $b_{(N-1)1}$ line 892.

In the (j−1)th straight term, the second bit of the first part, such as $C_{N(N-1)2}$ line 894, is generated by using the AND gate AA 886 to AND the second bit of a respective 2 bit part of the 2N line cube A register output bus 756, denoted with symbol A, such as $a_{(N-1)2}$ line 896, with the second bit of a respective 2 bit part of the 2N input cube B bus 688, denoted with symbol B, such as $b_{(N-1)2}$ line 898.

To create the one $C_j$ cross term or $a_j b_j$ term of cube $C_j$, a pair of 2 input AND gates are needed as shown in FIG. 28 as 2 input AND gate AB 900 and 2 input AND gate AC 902.

The first bit of the cross term, such as $C_{NN1}$ line 904, is generated by using the 2 input AND gate AB 900 to AND the first bit of a respective 1 bit part of the 2N line cube A register output bus 756, denoted with symbol A, such as $a_{N1b}$ line 906, with the second bit of a respective 2 bit part of the 2N input cube B bus 688, denoted with symbol B, such as $b_{N2a}$ Line 908. The $a_{N1b}$ line 906 is connected to the $a_{N1}$ line, which is the same as $C_{1N1}$ line 822.

The second bit of the cross term or $C_{NN2}$ line 910 is generated by using the 2 input AND gate AB 902 to AND the second bit of the respective 1 bit part of the 2N line cube A register output bus 756, denoted with symbol A, such as $a_{N2b}$ line 912, with the first bit of the respective 2 bit part of the 2N input cube B bus 688, denoted with symbol B, such as $b_{N1a}$ line 914.

The $a_{N2b}$ line 912 is connected to the $a_{N2}$ line, which is the same as $C_{1N2}$ line 824.

Figure 29:
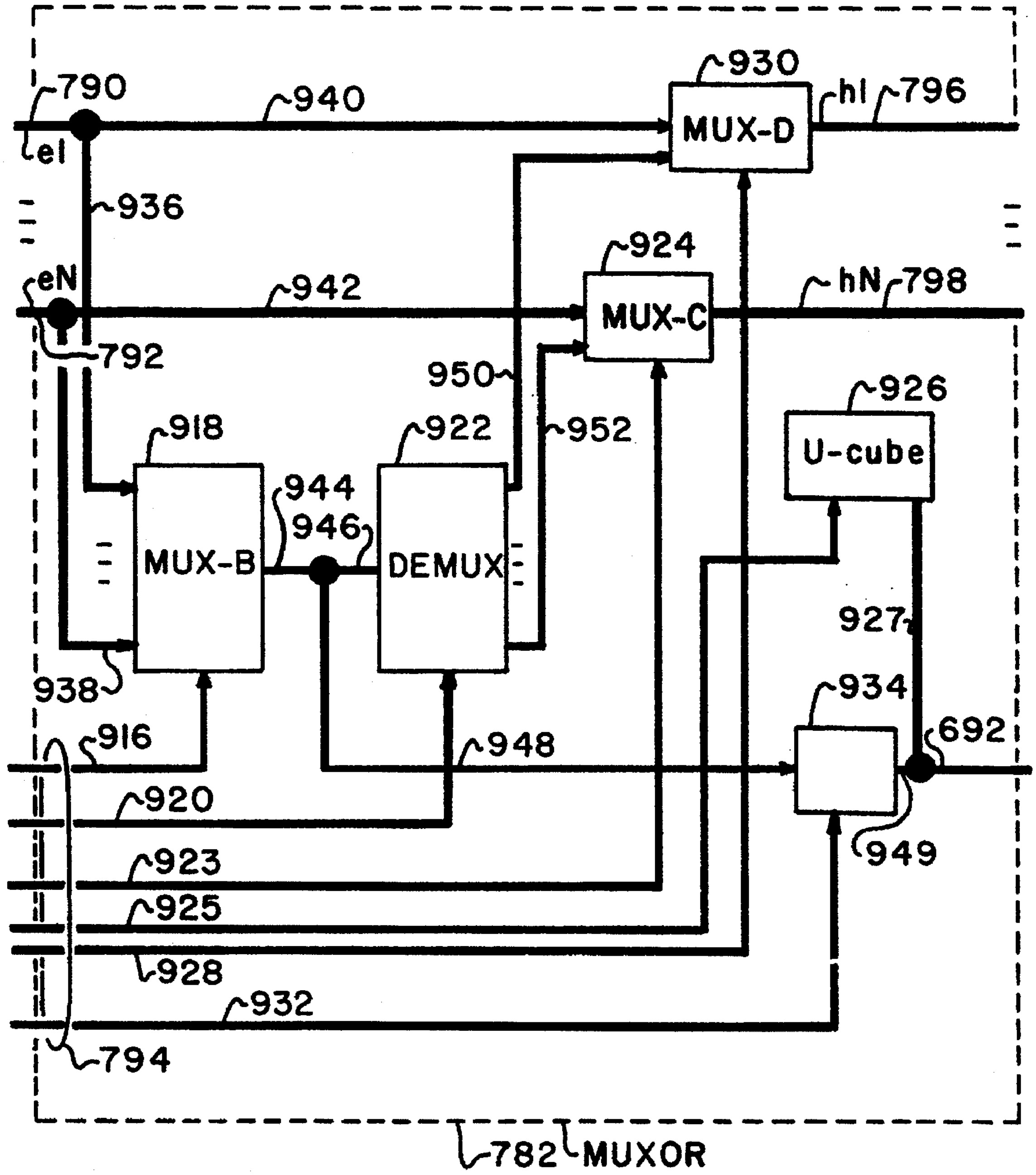
FIG. 29 shows a MUXOR or selectable multibus switch for writing and reading the memories in the CINV circuit.

As shown in FIG. 29, the CINV controller control bus 794, contains five control buses, which are:

(1) control MUXOR-A bus 916 to control MUX-B 918,
(2) control MUXOR-B bus 920 to control DEMUX-A 922,
(3) control MUXOR-C bus 923 to control MUX-C 924, to range to
(4) control MUXOR-D bus 928 to control MUX-D 930,
(5) U-cube gate bus 925 to control U-cube gate 926 with 2N line U-cube gate output bus 927 connected to the 2N line connect memory bus 692, where U means universe, and connected to 2N line tristate gate B output bus 949, and
(6) control MUXOR-E bus 932 to control MUXOR output gate 934.

The N buses, such as the 2N line CN output bus 792, denoted with symbol eN, are connected to 2N line MUX-Bj input buses, such as respectively 2N line MUX-B1 input bus 936 to range to 2N line MUX-BN input bus 938, and are connected to 2N line MUX-hj input buses, such as respectively 2N line MUX-h1 input bus 940 to range to 2N line MUX-hN input bus 942. The MUX-B 918 is inputted by the 2N line MUX-Bj input buses, such as the 2N line MUX-B1 input bus 936 to range to the 2N line MUX-BN input bus 938, and upon a control word received on the control MUXOR A bus 916 will connect any 2N line MUX-Bj input bus, such as the 2N line MUX-B1 input bus 936 to a 2N line MUX-B output bus 944, which connects to 2N line DEMUX input bus 946 and 2N line tristate gate B input bus 948. The DEMUX 922 upon a control word received on the control MUXOR B bus 920 will connect the 2N line DEMUX input bus 946 to any 2N line DEMUX output bus, such as 2N line DEMUX 1 output bus 950 to range to 2N line DEMUX N output bus 952.

The MUXOR output gate 934 will connect the 2N line tristate gate B input bus 948 to 2N line tristate gate B output bus 949 connecting to the 2N line MUXOR bus 692, upon receiving a control signal on the control MUXOR E bus 932.

The U-cube gate 926, upon a control word on the control U-cube gate bus 925 from the CINV controller 708, will be put a universe cube of all 1's or all true voltages on 2N lines of the 2N line U-cube gate output bus 927, which connects to both (1) the 2N line tristate gate B output bus 949 and (2) 2N line MUXOR bus 692. The universe cube is sent to and stored in the cube A register 684, in FIG. 24 for starting the disjoint sharp operation.

Control output MUXes, such as the MUX-D 930 to range to the MUX-C 924 connect either (1) the 2N line MUX-hj input bus or (2) the 2N line DEMUXj output bus to the memory j input bus via control MUXOR buses. The 2N MUX-hj input bus can be one of the 2N line MUX-h1 input bus 940 to range to the 2N line MUX-hN input bus 942. The 2N line DEMUX j output bus can a line of the 2N line DEMUX 1 output bus 950 to range to the 2N line DEMUX N output bus 952. The memory j input bus can a bus in one of the memory 1 input bus 796 to range to the memory N input bus 798. The control MUXOR buses can be one of the control MUXOR D bus 928 to range to the control MUXOR-C bus 923.

The MUXOR 782, denoted with dotted lines, could consist of other internal circuit block to comprise a circuit with at least the same inputs and outputs.

Figure 30:
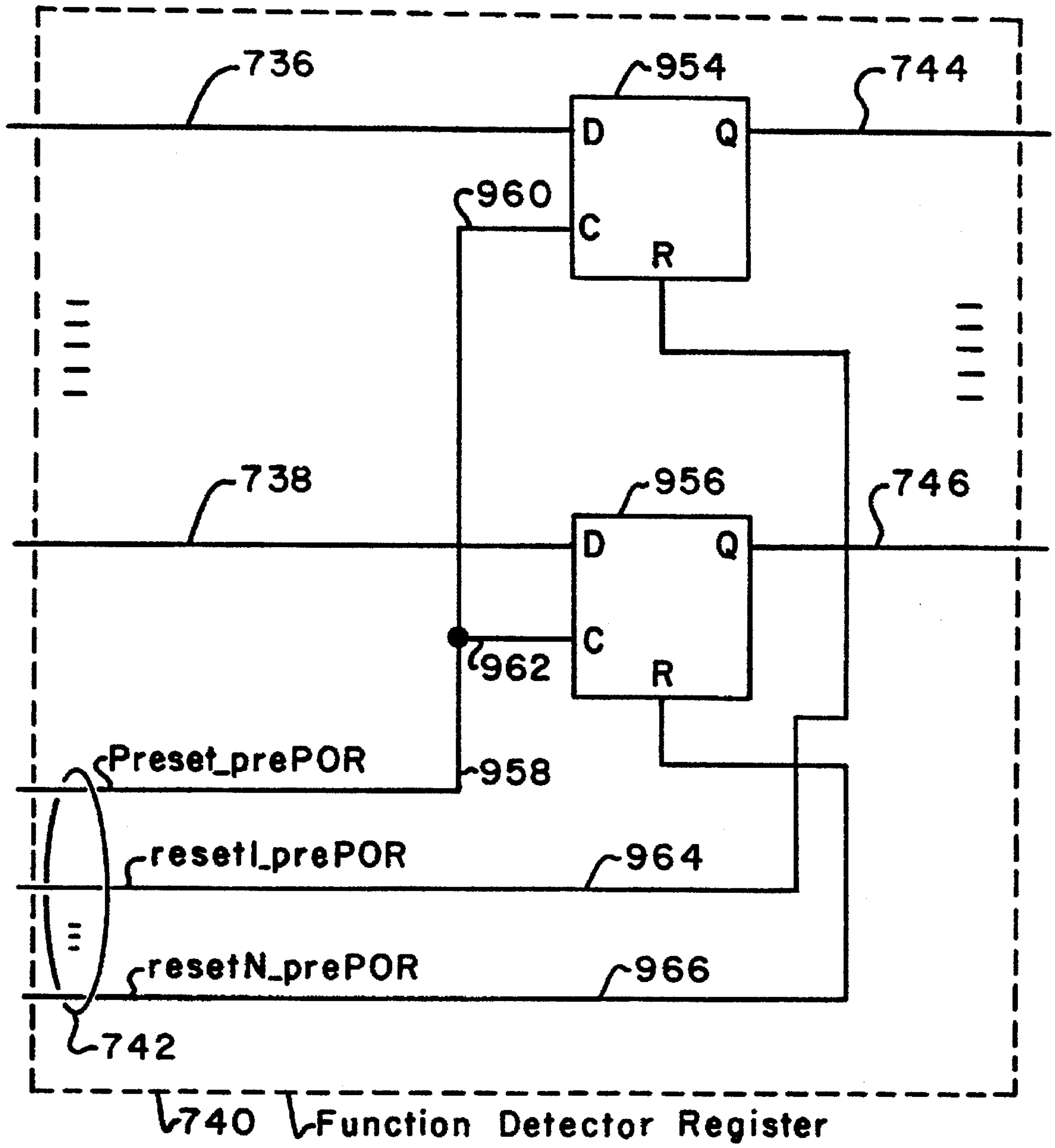
FIG. 30 shows a function detector register, located in a CINV circuit.

As shown in FIG. 30, the N input function detector register 740, denoted with dotted lines, receives functional detector output j line, such as the function detector output 1 line 736 to range to the function detector output N line 738 to be presetted into a register, such as respectively pre_1_POR register 954 to range to pre_N_POR register 956 upon a 1 or true voltage pulse sent on preset line 958, denoted with symbol Preset_pre_POR, which connects to the C inputs of each register, such as pre_POR_1_C input 960 of the pre_1_POR register 954 to range to pre_POR_N_C input 962 of the pre_N_POR_register 956. The function detector register output j line, such as the function detector register output 1 line 744 to range to the function detector register output N line 746, connects to the Q output of the register, such as respectively the pre_1_POR register 954 to range to the pre_POR register 956. The function detector register control bus 742 consists of the preset_pre_POR line 958, and N reset_j_pre_POR lines, such as reset 1_pre_POR line 964, to reset the pre_1_POR register 954 with a 1 or true voltage pulse at the R input to the pre_1_POR register 954 to range to reset_N_pre_POR line 966, to reset the pre_N_POR register 956 with a 1 or true voltage pulse at the R input to the pre_N_POR register 956.

Figure 31:
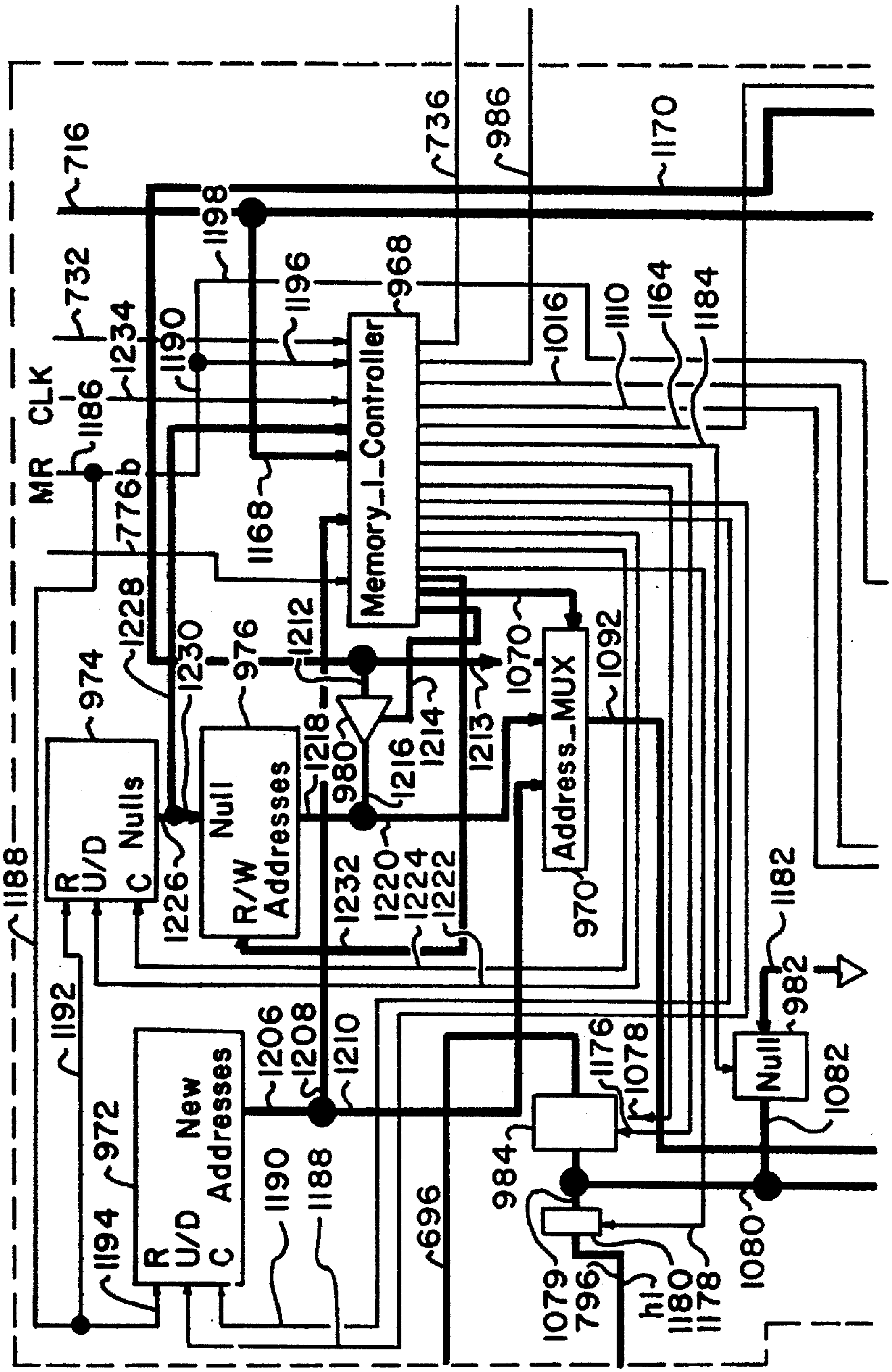
FIG. 31 is the top section of the memory circuit.
Figure 32:
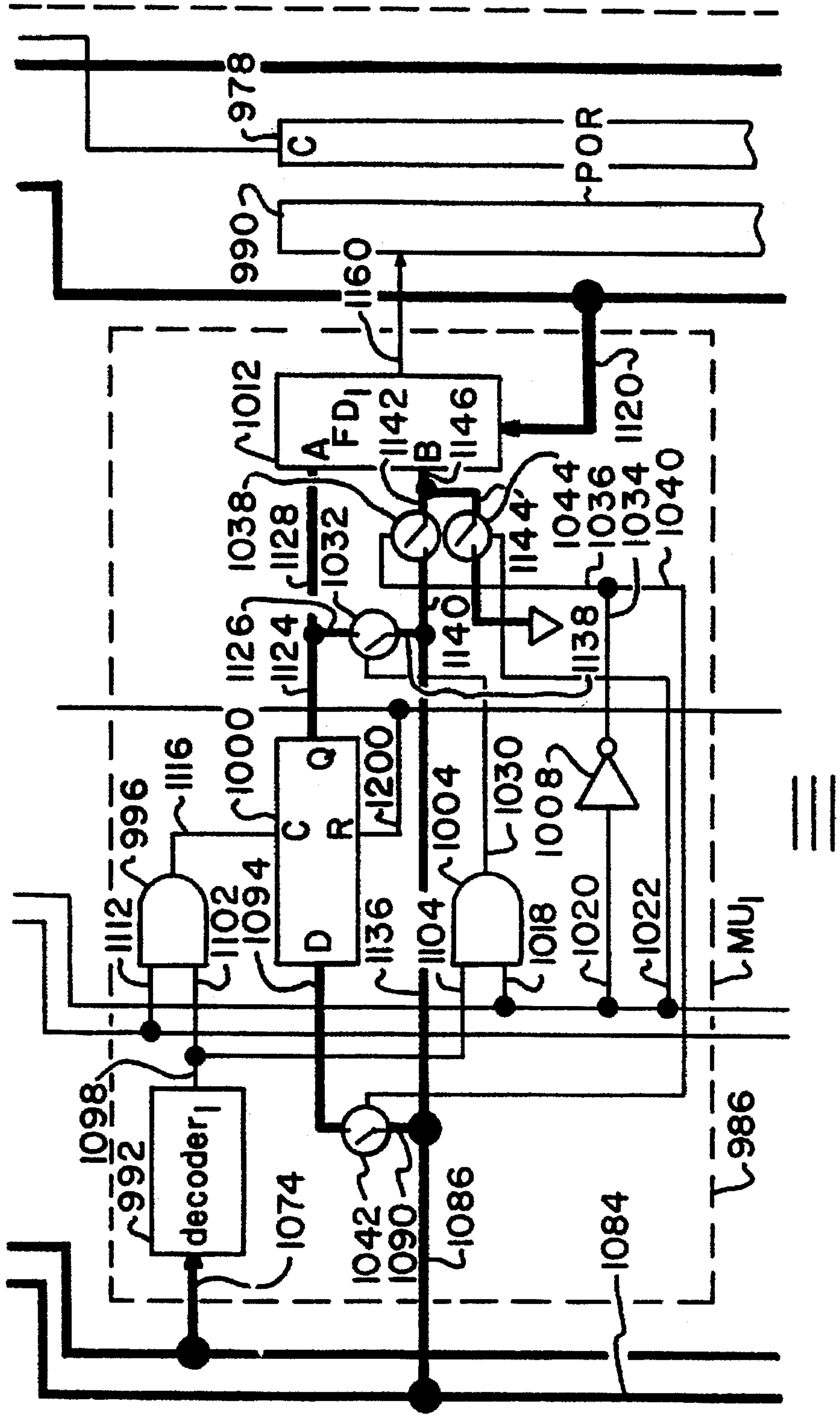
FIG. 32 is the middle section of a memory circuit.
Figure 33:
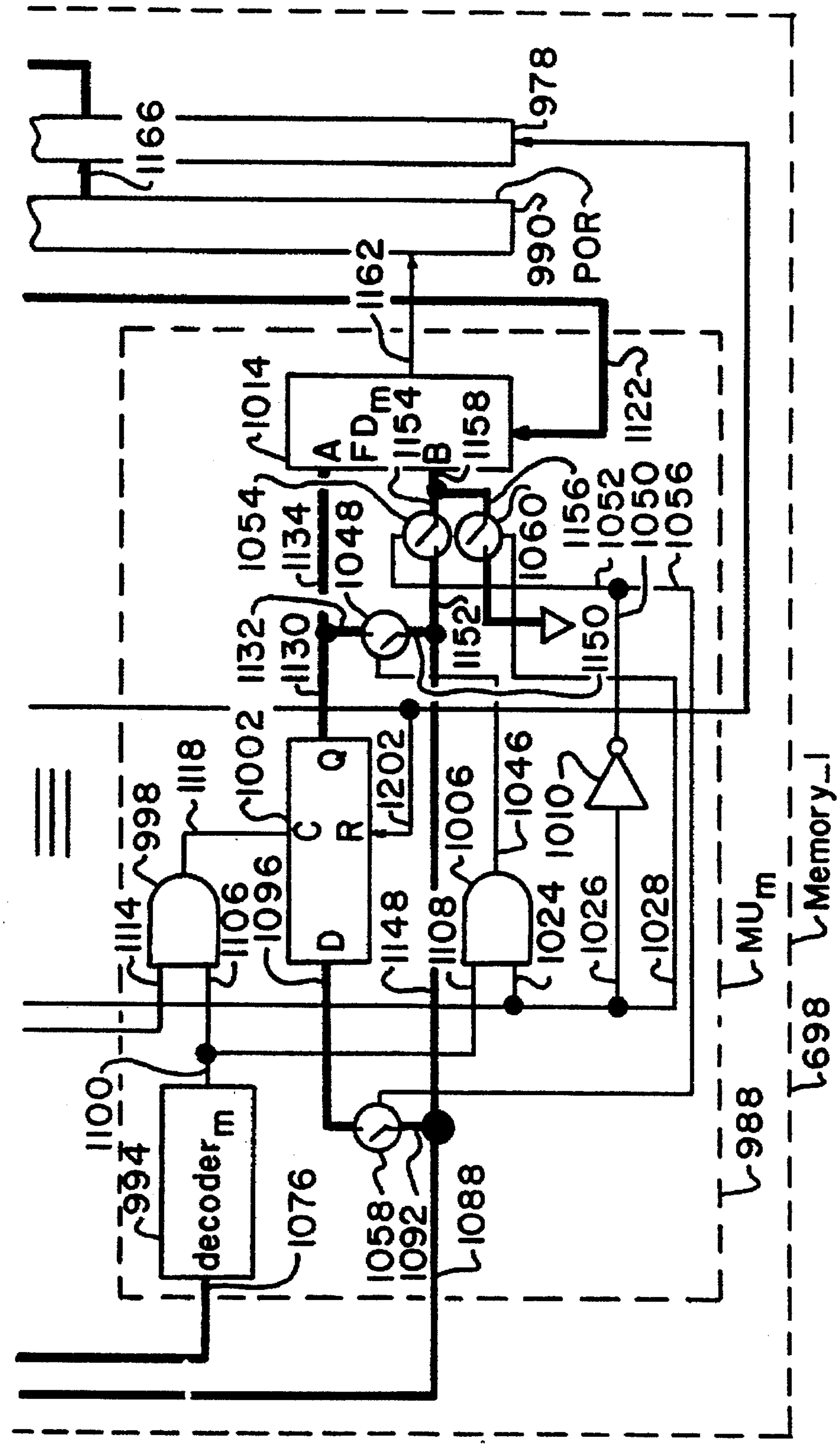
FIG. 33 is the bottom section of a memory circuit.

Note: The memory_i 698 is shown separated in FIGS. 31, 32 and 33, where FIG. 31 is the top section of memory_1 698, FIG. 32 is the middle section of memory_1 698, and FIG. 33 is the bottom section of memory_1 698. As shown in FIGS. 31, 32 and 33, the memory_1 698, denoted with dotted lines, is shown to basically consist of:

(1) a memory_1_controller 968,
(2) a memory 1 address MUX 970, denoted with symbol Address MUX,
(3) a memory 1 new address up/down counter 972, denoted with symbol New Address,
(4) a memory 1 null address up/down counter 974, denoted with symbol Nulls,
(5) a memory 1 null address RAM 976, denoted with symbol Null Addresses,
(6) a POR memory 1 function register 978,
(7) a memory 1 tristate address witch 980 to send detected null addresses to the memory 1 null address RAM 976, denoted with symbol Null Addresses,
(8) a 2N line null cube gate 982, denoted with symbol Null, to put null cubes in 2N line data locations after specific cube operations,
(9) memory 1 2N line bidirectional tristate data switch 984 as a I/O gate,
(10) a 'm' number of memory units, such as memory unit 1 986, denoted in dotted lines and denoted with symbol $MU_1$, to range to memory unit m 988, denoted in dotted lines and denoted with symbol $MU_m$, and
(11) a memory 1 POR 990 to primarily identify the address of cubes to be operated upon.

Within the memory units, such as memory unit 1 986, denoted in dotted lines and denoted with symbol $MU_1$, to range to memory unit m 988, denoted in dotted lines and denoted with symbol $MU_m$, is:

(1) a memory 1 POR 990 to primarily identify the address of cubes to be operated upon,
(2) an address decoder, such as memory unit 1 address decoder 992, denoted with symbol $decoder_1$, to range to memory unit m address decoder 994, denoted with symbol $decoder_m$,
(3) a memory unit 1 cube load preset 2 input AND gate AD 996 to range to a memory unit m cube load preset 2 input AND gate AE 998,
(4) a 2N bit memory unit 1 cube register 1000 to range to a 2N bit memory unit m cube register 1002,
(5) a memory unit 1 cube tristate m output drive enable 2 input AND gate AF 1004, to range to a memory unit 1 cube tristate m output drive enable 2 input AND gate AG 1006,
(6) a memory unit 1 cube tristate output drive inverter gate 1 1008, to range to memory unit 1 cube tristate output drive inverter gate J 1010,
(7) a memory unit 1 functional detector 1012, denoted with symbol $FD_1$, to range to memory unit m functional detector 1014, denoted with symbol $FD_m$ to perform four cube detection functions:
(a) detect if the cube stored in a 2N bit register is a null,
(b) detect if any cube stored in a 2N bit register covers a 2N bit wide cube on the 2N line memory 1 bus 696,
(c) detect if any cube stored in a 2N bit register can AND with a 2N bit wide cube on the 2N line memory 1 bus 696, and
(d) detect if any cube stored in a 2N bit register can merge with a 2N bit wide cube on the 2N line memory 1 bus 696.

Normal Write and Functional Detect

The memory 1, in the normal write or load and functional detection mode, will be with a 0 or false voltage on memory 1 cube output drive line 1016 connected from the memory_1_controller 968 and connected to:

(1) 2 input AND gate AE input A line 1018 of the memory unit 1 cube tristate output drive enable AND gate AE 1004,
(2) connected to memory unit 1 cube tristate output drive inverter gate I input line 1020 of the memory unit 1 cube tristate output drive inverter gate I 1008, and
(3) connected to memory unit 1 ground bus switch drive line 1022 to range to:
(1) 2 input AND gate AF input A line 1024 of the memory unit m cube tristate output drive enable 2 input AND gate AF 1006,
(2) connected to memory unit m cube tristate output drive inverter gate J input line 1026 of the memory unit m cube tristate output drive inverter gate J 1010, and
(3) connected to memory unit m ground bus switch drive line 1028 of the memory unit m cube tristate output drive enable 2 input AND gate AG 1006.

In the memory unit 1 986, denoted with dotted lines and denoted with symbol $MU_1$, a 0 or false voltage will conditionally appear on: (1) 2 input AND gate AE :output line 1030 to open 2N line memory unit 1 Q output switch 1032 for a non addressed memory unit 1. With a 0 or false voltage on the memory 1 cube output drive line 1016 and connected to the memory unit 1 inverter gate I input line 1020, a 1 or true voltage will exist on memory unit 1 cube tristate output drive inverter gate I output 1034 and on connected IA line 1036 to close 2N line memory unit 1 functional detector B input bus switch 1038 and on connected IB line 1040 to close 2N line memory unit 1 write bus switch 1042. With a 0 or false voltage on the memory 1 cube output drive line 1016, connected the memory unit 1 ground bus switch drive line 1022 will close 2N line memory unit 1 functional detector B input ground bus switch 1044.

All the other memory units behave the same as the memory unit 1 986, denoted in dotted lines and denoted with symbol $MU_1$, such as ranging to memory unit m 988, denoted in dotted lines and denoted with symbol $MU_m$.

In the memory unit m 988, denoted in dotted lines and denoted with symbol $MU_m$, a 0 or false voltage will conditionally appear on: (1) 2 input AND gate AF output line 1046 to open 2N line memory unit m Q output switch 1048 for a non addressed memory unit 1. With a 0 or false voltage on the memory 1 cube output drive line 1016 and connected to the memory unit m inverter gate J input line 1026, a 1 or true voltage will exist on memory unit m cube tristate output drive inverter gate J output 1050 and on connected JA line 1052 to close 2N line memory unit m functional detector B input bus switch 1052 and on connected JB line 1056 to close 2N line memory unit m write bus switch 1058. With a 0 or false voltage on the memory 1 cube output drive line 1016, connected the memory unit m ground bus switch drive line 1028 will close 2N line memory unit m functional detector B input ground bus switch 1060.

Writing a Cube to a Memory Unit Register

MU Address Path

A memory unit address is selected by internal software programmed into the memory_1_controller 968 to have an address source based on a priority of: (1) null addresses first if the memory 1 null address up/down counter 974, denoted with symbol Nulls, is not zero or 0 . . . 0, or (2) with no nulls stored in the memory 1 null address RAM 976, new addresses will come from the memory 1 new address up/down counter 972, denoted with symbol New Address. The memory_1_controller 968, puts a controller word on the memory 1 address MUX control bus 1070 to switch the memory 1 address MUX 970, denoted with symbol Address Mux, to pass the selected MUX input address onto memory 1 address MUX output bus 1072 to connect with memory unit 1 address decoder bus 1074 to range to connected memory unit m address decoder bus 1076.

Cube Path to 2N Bit Register

A 2N bit cube, to be written into the memory 1 698, existing on the 2N line memory 1 bus 696, is passed thru the memory 1 2N line bidirectional tristate data switch 984 by a proper logic voltage on memory 1 input tristate control line 1078 from the memory_1_controller 968, onto 2N line h1 output bus 1079, and onto 2N line memory 1 cube bus A 1080, connecting to:

(1) 2N line memory 1 null cube gate output bus line memory 1 cube bus B 1084, (2) 2N line memory 1 memory unit 1 cube bus 1086 to range to (3) 2N line memory 1 memory unit m cube bus 1088.

Within each memory unit j, such as the memory unit 1 986, denoted with dotted lines and denoted with symbol $MU_1$, the 2N line memory 1 memory unit j cube bus, such as the 2N line memory 1 memory unit 1 cube bus 1086 to range to the 2N line memory 1 memory unit m cube bus 1088, is connected to a 2N line memory unit j write switch input bus, such as 2N line memory unit 1 write switch input bus 1090 to range to 2N line memory unit m write switch input bus 1092, to pass thru all closed 2N line memory unit j write bus switches, such as the 2N line memory unit 1 write bus switch 1044, to range to the 2N line memory unit m write bus switch 1068, onto 2N line memory unit j cube register D input bus, such as 2N bit memory unit 1 cube register D input bus 1094 to range to 2N bit memory unit m cube register D input bus 1096.

Decoder

MU Address

The decoder j output line, such as $decoder_1$ output line 1098 to range to $decoder_m$ output line 1100, electronically drive two AND gates, such as connected 2 input AND gate AC input A line 1102 and connected 2 input AND gate AE input B line 1104 to range to connected 2 input AND gate AD input A line 1106 and connected 2 input AND gate ACF input B line 1108.

Write Operation

A 1 or true voltage pulse is generated by the memory_1_controller 968, and is put on write pulse line 1110, connecting to 2 input AND gate AC input B line 1112 to range to 2 input AND gate AD input B line 1114. In turn, a 1 or true voltage pulse conditionally appears on: (1) 2N bit memory unit 1 cube register C input line 1116 to conditionally preset the 2N bit memory unit 1 cube register 1000 to range to (2) 2N bit memory unit m cube register C input line 1118 to conditionally preset the 2N bit memory unit m cube register 1002. The condition is dependent on the addressed memory unit j address decoder, such as if the memory unit 1 address decoder 992, denoted with symbol $decoder_1$, is addressed, the 2N bit memory unit 1 cube register 1000 will store the 2N bit cube on the 2N bit memory unit 1 cube register D input cube on the 2N bit memory unit 1 cube register D input bus.

Functional Detection

A functional detection control word is put on the memory 1 control bus 716 to drive all functional detector buses, such as connected memory unit 1 functional detection control bus 1120 to range to connected memory unit m functional detection control bus 1122. The four functions of a functional detector, such as the memory unit 1 functional detector 1012, denoted with symbol $FD_1$, are described in Table 33. The circuitry of a functional detector, such as the memory unit 1 functional detector 1012,

TABLE 33

Present Invention

Title: Functions Per Control Word For Functional Detector

| Control Word | Function Detection With True Output Voltage |
|---|---|
| 00 | Null detection if cube register contains all 0's or zero. |
| 01 | Cover detect if cube register covers cube on |

TABLE 33-continued

Present Invention

Title: Functions Per Control Word For Functional Detector

Figure 34:
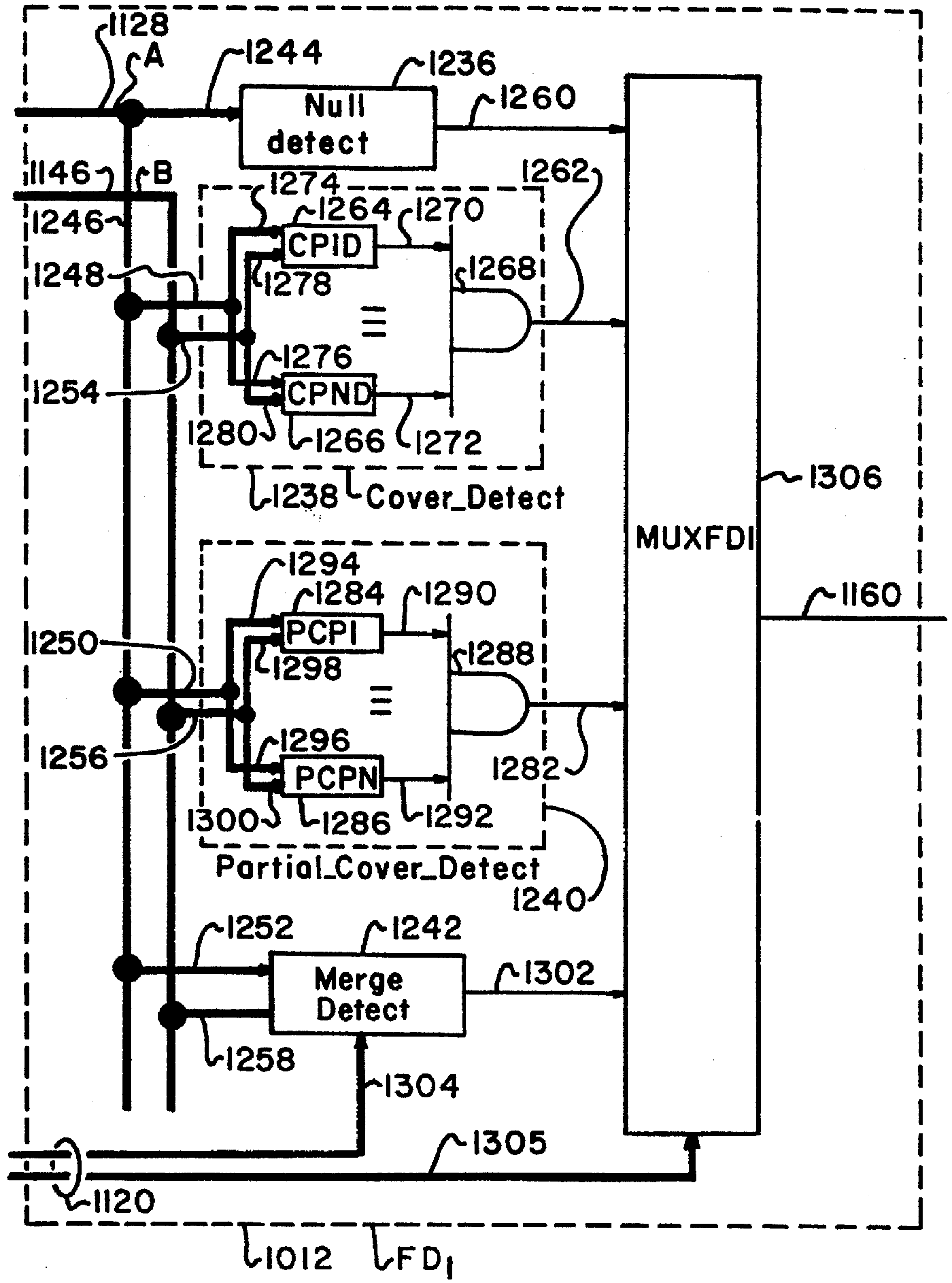
FIG. 34 shows a four functional detector located in a memory circuit, located in a CINV circuit.

| Control Word | Function Detection With True Output Voltage |
| --- | --- |
| | data bus or A covers B, with A as cube in cube register, and B as cube on data bus. |
| 10 | AND detect if one or more states in cube register intersect with one or more states in cube on data bus or A.AND.B |
| 11 | Merge detect if any cube in cube register can merge or thus has same complementary part, being a 1 in one cube and a 0 in the other cube or A.OR.B |

denoted with symbol $FD_1$, is shown in FIG. 34. Since the merge detection circuitry is quite complicated, the merge and/or other function can be removed from the functional detector.

In FIG. 34 will be described fully after the present description of FIGS. 31, 32 and 33 is completed.

A Input of FD of Memory Unit 1

As shown in FIGS. 31, 32 and 33, a stored cube exists on memory unit j Q output bus and connects to both an output drive bus switch and the A input line of the memory unit j functional detector, such as existing on the 2N line memory unit 1 Q output bus 1124, connecting to both 2N line memory unit 1 Q A switch bus 1126, and 2N line memory unit 1 functional detector A input bus 128.

A Input of FD of Memory Unit m

As shown in FIGS. 31, 32 and 33, a stored cube exists on memory unit j Q output bus and connects to both an output drive bus switch and the A input line of the memory unit j functional detector, such as existing on the 2N line memory unit m Q output bus 1130, connecting to both 2N line memory unit m Q A switch bus 1132, and 2N line memory unit m functional detector A input bus 1134.

B Input FD of Memory Unit 1

A cube, existing on the 2N line memory unit 1 cube bus 1086, will connect to: (1) the 2N line $MU_1$ write switch input bus 1090, (2) 2N line $MU_1$ cube A bus 1136, (3) the 2N line $MU_1$ Q B switch bus 1138, and (4) 2N line $MU_1$ functional detector B input bus switch bus A 1140. With the 2N line $MU_1$ functional detector B input bus switch 1038 closed, the cube will pass onto connected: (1) 2N line $MU_1$ functional detector B input bus switch B 1142, (2) 2N line $MU_1$ functional detector ground switch bus A 1144, and (3) 2N line $MU_1$ functional detector B input bus switch bus C 1146.

All the other memory units, such as the memory 1 698, to behave the same range to the memory N 702.

B Input FD of Memory Unit m

A cube, existing on the 2N line memory 1 memory unit m cube bus 1088, will connect to:

(1) the 2N line $MU_m$ write switch input bus 1092,
(2) 2N line $MU_m$ cube A bus 1148,
(3) 2N line $MU_m$ Q B switch bus 1150, and
(4) 2N line $MU_m$ functional detector B input bus switch bus A 1152.

With the 2N line $MU_m$ functional detector B input bus switch 1054 closed, the cube will pass onto connected:

(1) 2N line $MU_m$ functional detector B input bus switch B 1154,
(1) 2N line $MU_m$ functional detector ground switch bus A 1156, and
(3) 2N line $MU_m$ functional detector B input bus switch bus C 1158.

If any selected operations are true, then functional detector output line j, such as $MU_1$ functional detector output 1160 to range to $MU_m$ functional detector output 1162, will exist with a 1 or true voltage, inputting the memory 1 POR 990. With a 1 or true voltage pulse sent on memory 1 POR function register C input line 1164 to the POR memory 1 function register 978, the address of at least one location with true functional detection will be: (1) automatically selected in the memory 1 POR 990, (2) sent on memory 1 POR address bus 1166 to the D input of and stored within the POR memory 1 function register 978.

Function Dependent Operations Upon Functional Detection (1) Null: The null detection is used in the event that:
(a) the CINV controller 708, is searching for a to be used memory j, such as the memory 1 698, with at least one available cube register, such as the 2N bit memory unit 1 cube register 1000,
(b) the memory 1 null address RAM 976 is not operating, or
(c) the memory 1 null address up/down counter 974 is not operating.
(2) Cover: The cover detection is used to find a stored cube, called cube A, which contains at least all the states in the data bus cube, called cube B. Upon rue cover detection, the memory 1 controller 968, will put a 1 or true voltage on the functional detector output 1 line 736. As shown in FIGS. 24, 25 and 26, in turn, upon a preset true voltage pulse in the function detector register control bus 742, the N input function detector register 740, will store the cover detection signals from any memory j circuits, such as the memory 1 698. In turn, the CINV POR 748, will generate the address for at least one memory j, such as memory 1 698, recording a function detection, and send the address to the CINV controller 708. The CINV controller 708, will first put a control word on the I/O gate control bus 720 to open the I/O tristate gate 678 to remove cube B from existing on the I/O CINV side bus 680, and second will put a control word on the memory array control bus 714, connecting with m other buses, such as the memory 1 control bus 716, and put an address on the memory address bus 722 to address a memory j, such as memory 1 698, to instruct a memory j controller 968, denoted with symbol Memory 1 Controller, to send the selected covering cube A eventually to the cube A register 684. The memory 1 control bus 716 is connected with memory 1 controller input bus 1168.

Operation: Cube A in Memory 1 is Sent to I/O Bus

Assumption: The selected cube A is stored in the memory unit 1 986, denoted with dotted lines and denoted with symbol $MU_1$, in the 2N line memory unit 1 cube register 1000. The memory 1 controller 968, switches the memory 1 address MUX 970, denoted with symbol Address MUX, to pass the POR generated address on memory 1 POR address bus 1170 to the memory 1 address MUX output bus 1072 to the memory unit 1 address decoder bus 1074 to activate the memory unit 1 address decoder 992, denoted with symbol $decoder_1$. A 1 or true voltage will appear on the $decoder_1$ output line 1098 connecting to the 2 input AND gate AE input B line 1104. A 1 or true voltage sent from the memory 1 controller 968, will open all write bus switches, such as the 2N line memory unit 1 write bus switch 1042, and open all functional detector B input switches, such as the 2N line memory unit 1 functional detector B input bus switch 1038, and close all functional detector B input ground bus switches, such as the 2N line memory unit 1 functional detector B input ground bus switch 1044, and the 2N line memory unit 1 Q output switch will close to put cube A onto the 2N line memory 1 cube bus A. A 1 or true voltage will be put on memory 1 bidirectional tristate data switch output line 1176 to pass cube A onto the 2N line memory 1 bus 696 onto the 2N line input register bus 682. With a 1 or true voltage pulse sent on the cube A preset line 754, cube A is stored in the cube A register 684, for the disjoint sharp operation with cube B, controlled by the CINV controller 708.

After cube A is sent to and stored in the cube A register 684, one of the disjoint sharp generated cubes will exist on memory j input bus, such as the memory 1 input bus 796, denoted with symbol h1, the CINV controller 708, will either:

(1) send a control word to connected the memory 1 controller input bus 1168 to instruct the memory 1 controller 968, to store the cube existing on the memory 1 input bus 796, denoted with symbol $h_1$, or (2) send a conditional control word to connected the memory 1 controller input bus 1168 to instruct the memory 1 controller 968, to store the cube existing on the memory 1 input bus 796, denoted with symbol $h_1$, only if:

(a) a designated logic voltage or signal exists on the valid 1*b* line **776*b*, or (b) the memory 1 698**, is not connected to the valid 1*b* line **776*b*, and the memory 1 698**, must perform a functional detection with the next clock period to examine if the stored cube at the present selected address is a null cube. If the stored is a null cube, the next cube to be stored will be written into the same register. If the stored cube is not a null cube, the next cube to be stored will be written into another register. Without a means to examine or know a cube is valid, such as:

(1) having the valid 1*b* line **776*b* provide the designated valid signal, or (2) having a valid circuit examine the cube to be stored, the memory 1 698**, will need a clock period just to examine if the stored cube is either a valid cube or a null cube.

To store a cube existing on the memory 1 input bus 796, denoted with symbol $h_1$, the memory 1 controller 968, will put a 1 or true voltage on $h_1$ tristate gate enable line 1178 connecting to h1 tristate gate 1180 to put the cube onto the 2N line $h_1$ output bus 1079, connecting with the 2N line memory 1 cube bus A 1080, and eventually into 2N bit memory unit j cube register, such as the 2N bit memory unit 1 cube register 1000. The memory 1 controller 968, will also send the correct control words and enable logic voltages to make sure only one tristate circuit is driving a bus.

(3) AND: Cube A is sent out in a similar manner as in (2) cover above, except cube A is sent to the cube AND register A 584, as shown in the FIG. 21, to be ANDed with cube B in the cube AND circuit 596.

(4) Merge: Since the merge detection circuitry is quite complicated, merge circuitry is put into each functional detector as a costly option. Probably the lowest cost method is:

(1) to use the merge detection internal of every function detector, such as memory unit 1 functional detector 1012, denoted with symbol $FD_1$, to perform the merge, and (2) send out of cube A input of each function detector, such as memory unit 1 functional detector 1012, denoted with symbol $FD_1$, with the Q output tristated in the high impedance state of 2N bit $MU_1$ cube register 986, denoted with symbol $MU_1$, as shown in FIG. 32.

Merge can also be performed by just storing the cube with the other related cubes in the RAM 322; however, this cube storage can be very wasteful of memory. If this merge is performed, the list of cubes will need to be minimized reasonably often by performing a disjoint sharp operation twice on the list for the purpose of minimizing memory storage.

As shown in FIG. 32, a null cube is provide on a grounded 2N line null bus 1182, which is the input bus to the 2N line null cube gate 982, to be switched onto the 2N line memory 1 null cube gate output bus 1082 upon a 1 or true logic voltage put on null cube gate control line 1184.

As shown in FIG. 32, a master reset true logic voltage pulse would need to be at least started on MR line 1186, connecting with counter pair reset line 1188 and controller memory unit reset line 1190. The counter pair reset line 1188 connects to both:

(1) null counter reset line 1192 at the R input of the memory 1 null address up/down counter 974, denoted with symbol Nulls, and (2) new address counter reset line 1194 at the R input to the memory 1 new address up/down counter 972, denoted with symbol New Address.

The controller memory unit reset line 1190 connects to both:

(1) controller memory reset line 1196 and (2) memory unit reset line 1198.

The memory unit reset line 1198 connects to a range of memory unit j reset lines, such as memory unit 1 reset line 1200 at the R input of the 2N bit memory unit 1 cube register 1000 to range to memory unit m reset line 1202 at the R input of the 2N bit memory unit m cube register 1002, and (m+1) POR memory 1 function register reset line 1204 at the R input to the POR memory 1 function register 978.

Memory Circuit Operation

Step 1—Each cube in A list is preset into a cube register of one or more memory units. In memory unit 1, an example of MU or memory unit is the MU 1986.

Using the FIG. 32, each cube in a list of cubes to be stored in the memory 1 698, denoted with dotted lines, is (a) first passed or gated thru the memory 1 2N line bidirectional tristate data switch 984 from the 2N line memory 1 bus 696 to the 2N line memory 1 cube bus A 1080 with a 1 or true voltage on the memory 1 bidirectional tristate data switch input line 1078 from the memory 1 controller 968, (b) second passed onto connected the 2N line memory 1 cube bus B 1084, (c) third passed onto connected the 2N line memory unit 1 cube bus 1086, (d) fourth passed onto connected the 2N line memory unit 1 write switch input bus 1090, (e) fifth passed thru the 2N line memory unit 1 write bus switch 1042, (f) sixth passed onto connected the 2N bit memory unit 1 cube register D input bus 1094, (g) seventh latched into the 2N bit memory unit 1 cube register 1000 by the generation of a 1 or true voltage pulse on the 2N bit memory unit 1 cube register C input line 1116.

Step 2—Memory Unit Address Selection Criteria

As shown in FIG. 32, after the first cube is stored within the memory unit addressed by address [0 . . . 0] of the memory 1 new address up/down counter 972, denoted with symbol New Address, the memory 1 new address up/down counter 972 will be incremented per inputted cube by a 1 or up command logic voltage on new address counter U/D line 1188 and a 1 or true voltage pulse put on new address counter clock line 1190 from the memory 1 controller 968. The address code, created by the memory 1 new address up/down counter 972, denoted with symbol New Address, originated on memory 1 new address output bus 1192, which connects to new address to controller input bus 1194 and connects to address MUX A input bus 1196. The new address to controller input bus 1194 is inputted to the memory 1 controller 968, to allow monitoring by connected the memory 1 controller 968, to determine if the address code exceeds the number of memory units in the memory 1 698, denoted with dotted lines.

As shown in FIG. 32, during the function mode of the memory_1 698, denoted with dotted lines, such as when list A of stored cubes in memory covers cube B on the 2N line memory 1 bus 696, the memory address of each cube register, such as the 2N bit memory unit 1 cube register 1000 of the covering cubes of list A will become null addresses. After a copy of cube A, which covers cube B, is sent to the cube A register 684, via the described process 'cube to I/O', a null cube of all zero bits is replaced in the register of cube A. The address of cube A becomes a null address and is sent to the memory 1 null address RAM 976, denoted with symbol Null:

(a) originating from the memory 1 POR 990, onto the memory 1 POR address bus 1166,
(b) latched into the POR memory 1 function register 978,
(c) onto the memory 1 POR address bus 1170,
(d) onto both connected POR address tristate address switch input bus 1212,
(e) gated thru the memory 1 tristate address switch 980 with a 1 or true voltage on memory 1 tristate address switch enable line 1214 from connected memory 1 controller 968,
(f) passed onto memory 1 tristate address switch output bus 1216,
(g) passed onto both connected Null RAM I/O bus 1218 and connected memory 1 address MUX input bus B 1220.

Cube A address is written into the null address RAM 976 by first incrementing the memory 1 null address up/down counter 974 by putting a 1 or true voltage on null address counter U/D input line 1222 and putting a 1 or true voltage pulse on null address counter clock input line 1224. The null counter value of the memory 1 null address up/down counter 974, denoted with symbol Nulls, exists on null address up/down counter output bus 1226 and passes onto both null counter controller input bus 1228 to connected the null address RAM address bus 1230. At the location in the memory 1 null address RAM 976, the null address of cube A on the null RAM I/O bus 1218 is written into the memory 1 null address RAM 976, denoted with symbol Null Addresses, by putting a 0 or false voltage for the R/W signal and putting a 1 or true voltage pulse for the chip enable or CE signal in RAM control bus 1232 from the memory 1 controller 968.

The cubes, generated in the disjoint sharp operation, are to be stored in the memory 1 698, denoted with dotted lines, at location addressed with first exhausting addresses from the memory 1 null address RAM 976, denoted with symbol Null Addresses, and then second from the memory 1 new address up/down counter 972. The memory 1 controller 968, monitors that the counter value of the memory 1 null address up/down counter 974, denoted with symbol Nulls, does not exceed the number of null addresses left in the memory 1 null address RAM 976, denoted with symbol Null Addresses, by looking at the null counter controller input bus 1228 and monitors that the counter value of the memory 1 new address up/down counter 972 does not exceed the number of memory units in the memory 1 598, denoted with dotted lines and denoted with symbol Memory 1.

When no null addresses exist in the memory 1 null address RAM 976, denoted with symbol Null Addresses, the memory 1 controller 968, will put a control instruction on the memory 1 address MUX control bus 1070 to switch the memory 1 address MUX 970, denoted with symbol Address MUX, to pass only the address on the address MUX A input bus 1210. If null addresses exist in the memory 1 null address RAM 976, denoted with symbol Null Addresses, the memory 1 controller 968, will put a control instruction on the memory 1 address MUX control bus 1070 to switch the memory 1 address MUX 970, denoted with symbol Address MUX, to pass only the address on the memory 1 address MUX input bus B 1220. A cube A address existing on the address MUX input bus C 1213, for the first generated cube to be stored, can be switched thru the memory 1 address MUX 970, denoted with symbol Address MUX, onto the memory 1 address MUX output bus 1072 to address a memory unit.

The clock for the memory 1 controller 968 is on memory 1 controller clock input line 1234.

Any function detector, such as the function detector 1012, denoted with symbol $FD_1$, as first shown in FIG. 32 is shown broken into blocks in FIG. 34. The four functional blocks in FIG. 34 in any function detector, such as the function detector 1012, are:

(1) null detector block 1236,
(2) cover detector block 1238, denoted with dotted lines,
(3) AND detector block 1240, denoted with dotted lines, and
(4) merge detector block 1242, denoted with dotted lines.

The 2N bit memory unit 1 functional detector A input bus 1128, denoted with symbol A, connected to null detect A bus 1244 and connects to $FD_1$ interconnect A bus 1246, which connects to:

(a) cover A bus 1248,
(b) AND A bus 1250, and
(c) Merge A bus 1252.

The 2N line $MU_1$ functional detector B input bus switch bus C 1146, denoted with symbol B, is a interconnect bus, which connects to:

(a) cover B bus 1254,
(b) AND B bus 1256, and
(c) Merge B bus 1258.

The purpose of the null detector block 1236, denoted with symbol Null Detect, is to generate a 1 or true voltage on null detector block output line 1260, which a stored cube existing on the null detect A bus 1244 is a null cube.

Review of a null cube: a null cube consists of N parts with 2 bits per part, where both bits per part are 0 or at the false logic voltage.

The null detector block 1236, denoted with symbol Null Detect, could be a 2N input NOR gate or equivalent. A memory j controller, such as the memory 1 controller 968, may need to know cube registers containing nothing or null cubes. A null cube contains no information or nothing. A cube register with nothing can be used to store a valid cube. Using a null detector at the output bus of each cube register can replace the need of the memory 1 new address up/down counter 972, denoted with symbol New Address, the memory 1 null address up/down counter 974, denoted with symbol Nulls, and the memory 1 null address RAM 976, denoted with symbol Null Addresses.

The purpose of the cover detector block 1238, denoted with dotted lines, is to generate a 1 or true voltage on cover detector block output line 1262, when a cube on the cover A bus 1248 covers each and every part of a cube on the cover B bus 1254. The cover detector block 1238, can consist of N cover part blocks, such as cover part_1 block 1264, denoted with symbol $CP_1$ to range to cover part_N block 1266, denoted with symbol $CP_N$ with a N input cover detect AND gate 1268 to AND cover part_1 block output line 1270 to range to cover part_N block output line 1272. Within the cover detector block 1238 the cover A bus 1248 connects to cover A part_1 bit pair bus 1274 to range to cover A part_N bit pair bus 1276, and the cover B bus 1254 connects to cover B part_1 bit pair bus 1278 to range to cover B part_N bit pair bus 1280.

The logical operation of each cover part j block, such as the cover part_1 block 1264, denoted with symbol $CP_1$, is described in equation (68) below, with $a_{1j}$ being the 0 bit and $a_{2j}$ being the 1 bit of part_j of the cube on the cover A bus 1248 with j=1, with $b_{1j}$ being the 0 bit and $b_{2j}$ being the 1 bit of part_j of the cube on the cover B bus 1254 with j=1, and symbol $d_{j1}$ being the logical voltage on the cover part_1 block output line 1270 with j=1. The logical operation of symbol $dc_1$ being the $$dc_{1j}=(a_{1j}a_{2j}b_{1j}b_{2j}\vee a_{2j}b_{1j}b_{2j}\vee a_{1j}a_{2j}b_{1j}) \quad (68)$$

logical voltage on the cover detector block 1238, denoted with dotted lines, is described in basically equation (70) and detailed in equation (72).

$$dc_1=\underset{j=1}{\overset{N}{\text{AND}}}\ (d_{1j}) \quad (70)$$

$$dc_1=\underset{j=1}{\overset{N}{\text{AND}}}\ (a_{1j}a_{2j}b_{1j}b_{2j}\vee a_{2j}b_{1j}b_{2j}\vee a_{1j}a_{2j}b_{1j}) \quad (72)$$

Cover Review: Cube A covers cube B only if each part of cube A covers respectively each part of cube B.

The purpose of the partial cover detector block 1240, denoted with dotted lines, is to generate a 1 or true voltage on partial cover detector block output line 1282, when a cube on the partial cover A bus 1250 contains one or more 0-cubes or states with a cube on the AND B bus 1256.

Partial Cover Review: Cube A, such as cube [01X1], partially covers cube B, such as cube [011X], if one or more 0-cubes or states in cube A exist in cube B.

In this example, the 0-cube [0111] is created by ANDing each part of cube A with each respective part of cube B; thus, cube A partly covers cube B is the ANDing of each part of cube A with each respective part of cube B is logically true for each and all AND operations. The partial cover detector block 1240, can consist of N partial cover part blocks, such as partial cover part_1 block 1284, denoted with symbol $PCP_1$ to range to partial cover part_N block 1286, denoted with symbol $PCP_1$ to range to partial cover part_N block 1286, denoted with symbol $PCP_N$, with a N input partial cover detect AND gate 1288 to AND partial cover part_1 block output line 1290 to range to partial cover part_N block output line 1292. Beside the partial cover detector block 1240, the externally located partial cover A bus 1250 connects to internally located cover A part_1 bit pair bus 1294 to range to cover A part_N bit pair bus 1296, and the externally located cover B bus 1256 connects to internally located cover B part_1 bit pair bus 1298 to range to cover B part_N bit pair bus 1300.

The logical operation of each partial cover part j block, such as the partial cover part_1 block 1284, denoted with symbol $PCP_1$, is described in equation (74) below, with $a_{1j}$ being the 0 bit and $a_{2j}$ being the 1 bit of part_j of the cube on the partial cover A bus 1250 with j=1, with $b_{1j}$ being the 0 bit and $b_{2j}$ being the 1 bit of part_j of the cube on the partial cover B bus 1256 with j=1, and symbol $d_{j1}$ being the logical voltage on the cover part_1 block output line 1290 with j=1. The logical operation of $$dpc_{1j}=(a_{1j}b_{1j}\vee a_{2j}b_{2j}) \quad (74)$$

symbol $dpc_1$, being the logical voltage on the partial cover detector block 1240, denoted with dotted lines, is described in basically equation (76) and detailed in equation (78).

$$dpc_1=\underset{j=1}{\overset{N}{\text{AND}}}\ (d_{pc1j}) \quad (76)$$

$$dpc_1=\underset{j=1}{\overset{N}{\text{AND}}}\ (a_{1j}b_{1j}\vee a_{2j}b_{2j}) \quad (78)$$

The purpose of the merge detector block 1242, denoted with dotted lines, is to generate a 1 or true voltage on merge detector bock output line 1302 when a cube on the merge A bus 1252 can combine or thus merge with a cube on the merge B bus 1258 into a single cube. To perform this merge detection, the merge detector block 1242, performs N parallel cube merges with a valid detector to analyze each merge output cube. A merge output signal word on enable bus 1304 within the memory unit 1 functional detection control bus 1120 will send the valid merged cube out on the merge B bus 1258. A merge detector, such as the merge detector block 1242, is not necessary for logic code generator operation and is a fairly complicated circuit to have in each and every function detector, such as the function detector 1012, denoted with symbol $FD_1$; thus, the merge detector, such as the merge detector block 1242, is optional, costly, and unnecessary.

Figure 35:
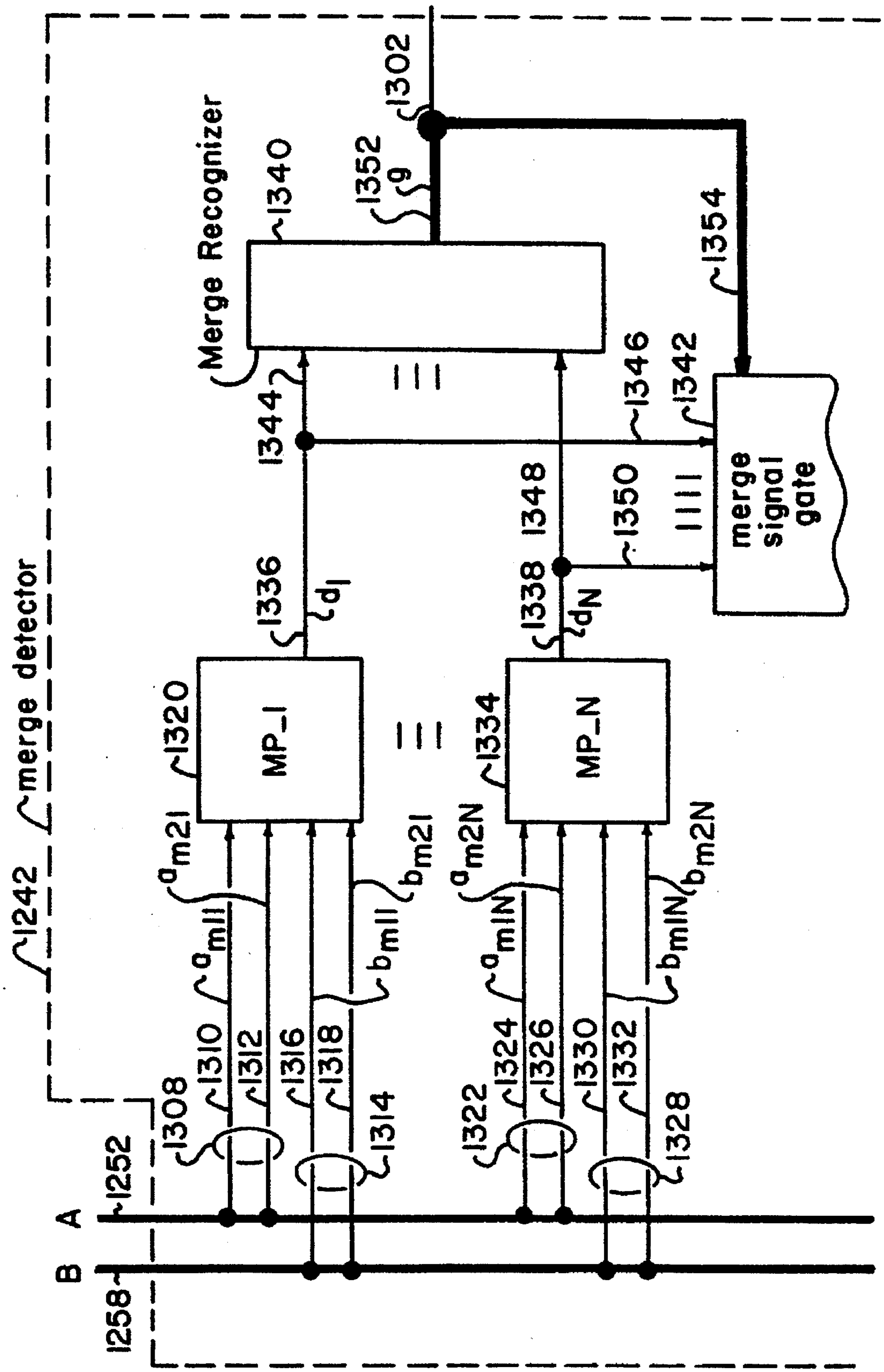
FIG. 35 is the top section of the merge mechanism.
Figure 36:
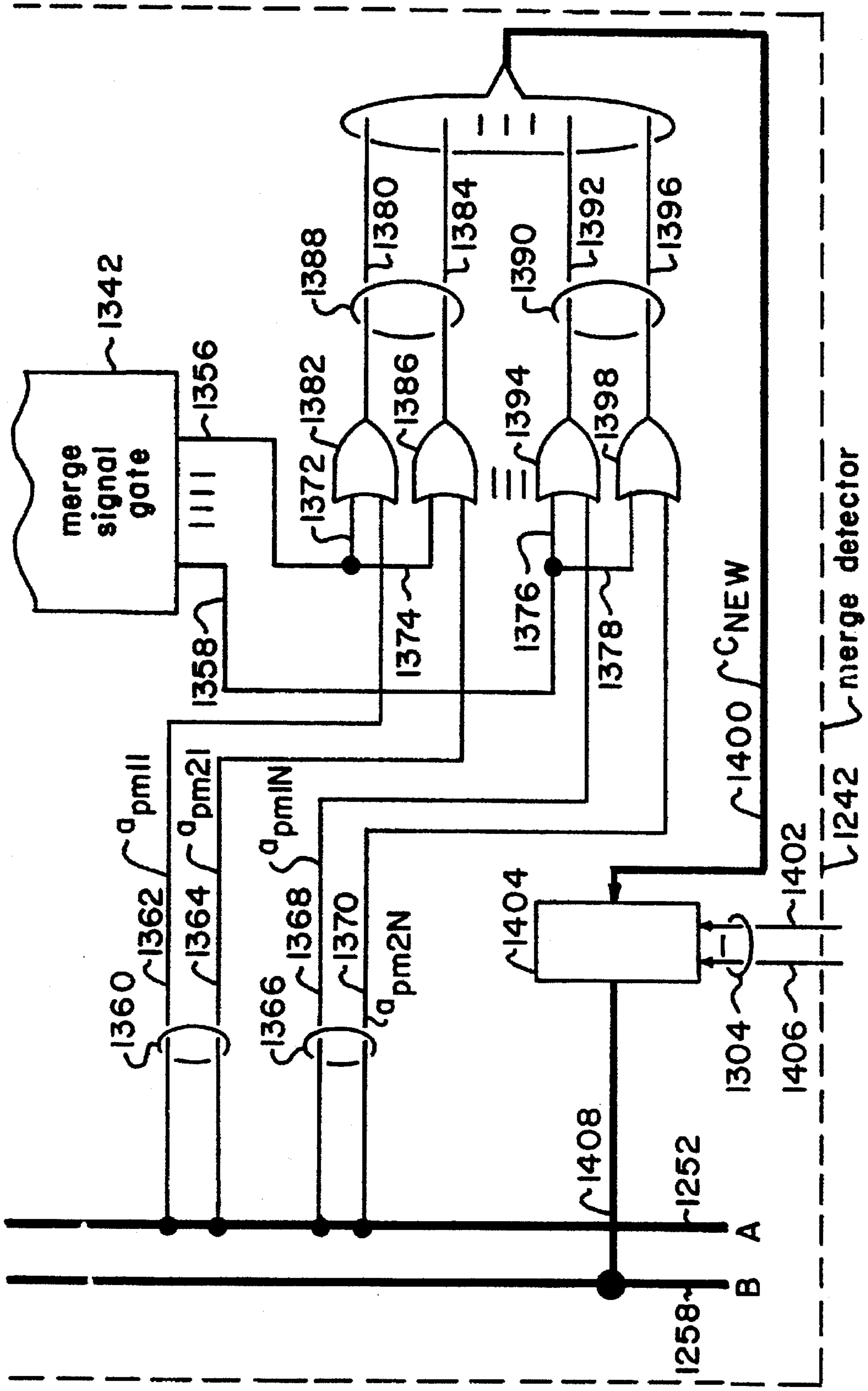
FIG. 36 is the bottom section of the merge mechanism.
Figure 37:
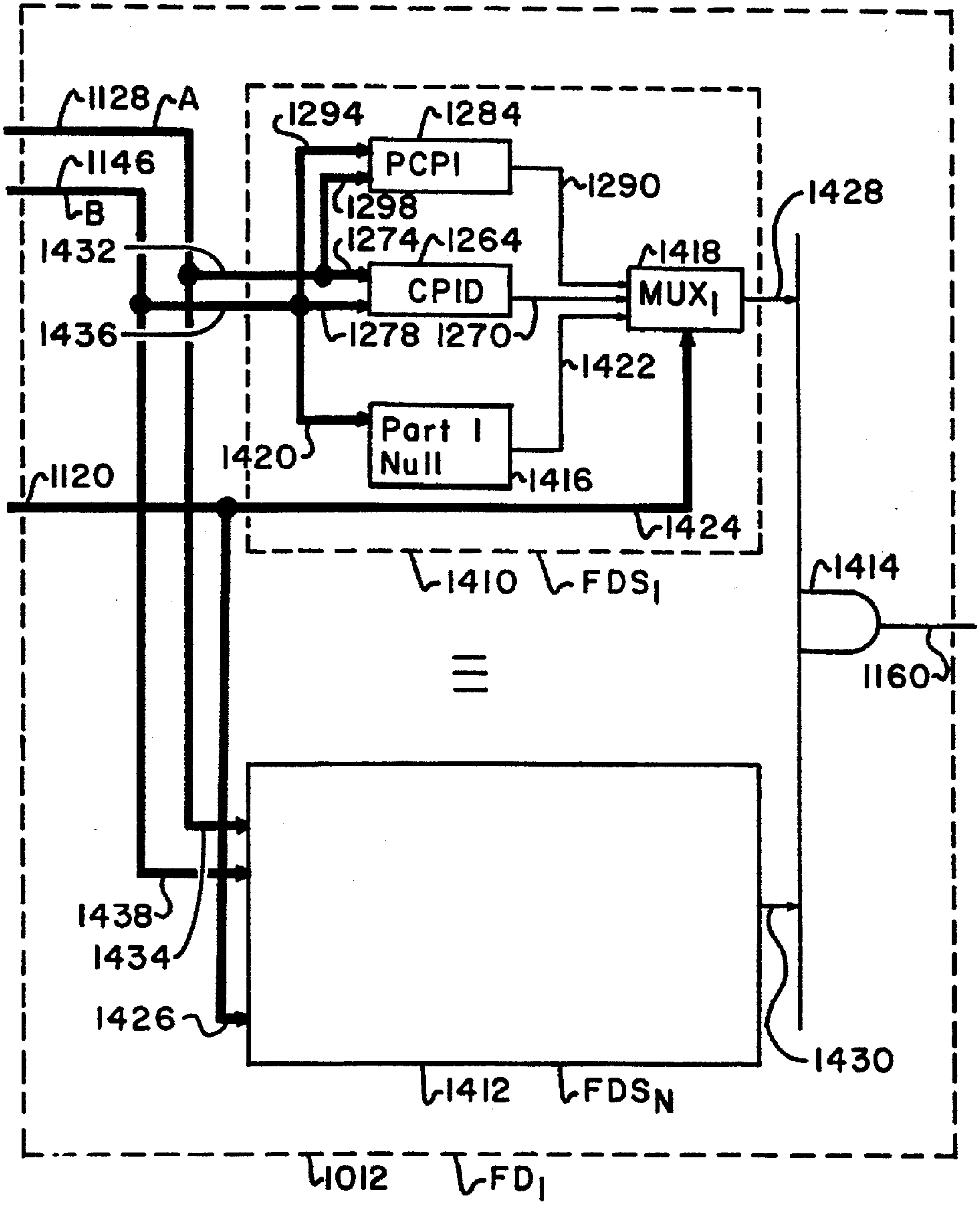
FIG. 37 shows a three function detector located in a memory circuit, located in a CINV circuit.

Note: The merge detector block 1242 is shown separated in FIGS. 35 and 36, where FIG. 35 is the top section of the merge detector block 1242, and FIG. 36 is the bottom section of the merge detector block 1242.

Cube Merge Review: Any 2 cubes can merge if 'N−1' respective parts are the same in both cubes. The part of different values in both cubes becomes a X in the resultant output merged cube with X being a 1 and a 0.

Logical signals on MUXFD1 control bus 1305 within the memory unit 1 functional detection control bus 1120 switch a 4 input functional detection MUX 1306, denoted with symbol MUXFD1, receiving inputs:

(1) the null detector block output line 1260,
(2) the cover detector block output line 1262,
(3) the partial cover detector block output line 1282, and
(4) the merge detector block output line 1302.

The $MU_1$ functional detector output 1160 is the output of the memory unit 1 functional detector 1012, denoted with dotted lines and denoted with symbol $FD_1$, and is the output of the 4 input functional detection MUX 1306, denoted with symbol MUXFD1, as shown in FIG. 34.

As shown in FIGS. 35 and 36, the merge detector block 1242 is shown detailed in dotted lines. Each part, such as part 1 to range to part N, of the merge A bus 1252, denoted with symbol A, is examined with each same pair of the merge A bus 1258, denoted with symbol B. A part_1 merge A bus 1308, connected to and branching off the the merge A bus 1252, denoted with symbol A, consists of part_1 merge B bus 1314, consisting of m_A_part_1_bit_1 1310, denoted with symbol $a_{m11}$, and m_A bus part_1_bit_2 1312, denoted with symbol $a_{m21}$, and m_B_part_1_bit_1 1316, denoted with symbol $b_{m11}$, and m_B bus part_1_ bit_2 1318, denoted with symbol $_{bm21}$, are inputs to part_1 merge detector 1320, denoted with symbol MP_1.

A part_N merge A bus 1322 consists of m A bus part_N_bit_1 1324, denoted with symbol $a_{m1N}$, and m A bus part_N_bit_2 1326, denoted with symbol $a_{m2N}$, and part_1 merge B bus 1328, consisting of m_B bus part_N_bit_1 1330, denoted with symbol $b_{m1N}$, and mB bus part_N_bit_2 1332, denoted with symbol $_{bm2N}$, are inputs to part_N merge detector 1334, denoted with symbol MP_N. N part_j merge detectors, such as the part_N merge detector 1334, symbol MP_N, exist in the merge detector 1242, denoted in dotted lines. Each part_j merge detector output, such as part_1 merge detector output line 1336, denoted with symbol $d_1$, to range to part_N merge detector output line 1338, denoted with symbol $d_N$, is connected to merge recognizer 1340, denoted with symbol, and merge signal gate 1342. For example: the part_1 merge detector output line 1336, denoted with symbol $d_1$, connects to part_1 merge recognizer input 1344, and connects to part_1 merge signal gate input 1346, to range to the part_N merge detector output line 1338, denoted with symbol $d_N$, connected to part_N merge recognizer input 1348, and connects to part_N merge signal gate input 1350. Merge recognizer output line 1352, denoted with symbol g, connects to the merge detector block output line 1302 and merge signal gate enable line 1354.

The merge signal gate enable bus 1354 selectably switches a logical signal on one wire, such as part_1 merge recognizer input 1344, into a pair of OR gates, such as 2 input OR gate F 1382 and 2 input OR gate G 1386, to generate a new cube on new cube $C_{New}$ bus 1400, denoted as CNEW.

The logical operation of the merge recognizer 1340, is shown in Table 34.

TABLE 34

Present Invention

Title: Merge Operation Truth Table

Legend: 0 - Same; 1 - Different

| Conditions: | Inputs $d_1$ | | $d_N$ | Output g |
|---|---|---|---|---|
| 1 | 0 . . . | . . . 0 | 1 | 1 |
| 2 | 0 . . . | . . . 0 1 | 0 | 1 |
| — | — | — | — | — |
| — | — | — | — | — |
| — | — | — | — | — |
| N-1 | 0 1 0 . . . | . . . 0 | 0 | 1 |
| N | 1 0 . . . | . . . 0 | 0 | 1 |

The logical operation of each part_j merge detector, such as the part_N merge detector 1334, is shown in Table 35.

TABLE 35

Present Invention

Title: Logical Operation Of Part_N Merge Detector

| Inputs Part Bits: $a_{m1N}$ | $a_{m2N}$ | $b_{m1N}$ | $b_{m2N}$ | Output Part: $d_N$ |
|---|---|---|---|---|
| 0 | 1 | 0 | 1 | 0 |
| 1 | 0 | 1 | 0 | 0 |
| 1 | 1 | 1 | 1 | 0 |

Signals on the part_1 merge signal gate input 1346 to range to the part_N merge signal gate input 1350 exist on respectively part_1 merge signal gate output 1356 to range to the part_N merge signal gate input 1358, when a 1 or true voltage exists on the merge signal gate enable line 1354. If a 0 or false voltage exists on the merge signal gate enable line 1354, then the logic voltage signals on each part_1 merge signal gate output 1356 to range to the part_N merge signal gate output 1358 would be 0 or a false voltage.

A part_1 pre_merge bus 1360, connected to and branching off the merge A bus 1252, denoted with symbol A, consists of p_m_A bus part_1_bit_1 1362, denoted with symbol $a_{pm11}$, and p_m_A_bus part_1_bit_2 1364, denoted with symbol $a_{pm21}$. 'N-1' other part_j pre_merge buses exist, similar to the part_1 pre_merge bus 1360, such as part_N pre_merge bus 1366, which connects to and branches off the merge A bus 1252, denoted with symbol A, and consists of p_m_A bus part_N_bit_1 1368, denoted with symbol $a_{pm1}$N, and p_m_A bus part_N_bit_2 1370, denoted with symbol $a_{pm2N}$. Note: these N part buses, consisting of the part_1 pre_merge bus 1360 to range to the part_N pre_merge bus 1366, could just as well be connected to the merge B bus 1258 as being presently shown and described as connected to the merge A bus 1252.

The part_1 merge signal gate output 1356 connects to part_1_bit_1 new cube 2_input_OR gate F input A 1372 and connects to part_1_bit_2 new cube 2_input_OR gate G input A 1374. 'N-1' other part_j merge signal gate outputs exist, similar to the part_1 merge signal gate output 1356, such as the part_N merge signal gate 1358, which connects to part_N_bit_1 new cube 2_input_OR gate H input A 1376 and connects to part_N_bit_2 new cube 2_input_OR gate I input A 1378.

Operation of Merge Detection

If part 1 of the cube on the merge A bus 1252 and part 1 of the cube on the merge b bus 1258 are different and all the other 'N-1' parts of the cube on the merge A bus 1252 and all the other 'N-1' parts of the cube on the merge B bus 1258 are the same, then a 1 or true voltage will appear no the part_1 merge detector output line 1336, denoted with symbol $d_1$, on connected part_1 merge recognizer input 1344, on connected the part_1 merge signal gate input 1346, on connected the merge recognizer output line 1352, denoted with symbol g, on connected the merge detector block output line 1302, on connected the merge signal gate enable line 1354, on connected the part_1 merge signal gate output 1356, on connected the part_1_bit_1 new cube OR gate W input A 1372, on connected the part_1_bit_2 new cube OR gate X input A 1374, on connected 2_input_OR gate F output 1380 of 2 input OR gate F 1382, and on connected 2_input_OR gate G output 1384 of 2 input OR gate G 1386. The new cube part_1_bus 1388 consisting of a 1 or true voltage on both bit lines, such as the OR gate W output 1380 and the OR gate X output 1384, contains an X, A 0 or a false voltage on all the other 'N-1' part_j merge signal gate outputs, such as the part_N merge signal gate output 1358, with connected the part_N_bit_1 new cube OR gate Y input A 1376 and the part_N_bit_2 new cube OR gate Z input A 1388, does not create a new part on new cube part_j bus, such as new cube part_N bus 1390. The new cube part_N bus 1390 consists of 2_input_OR gate H output 1392 of 2 input OR gate H 1394 for bit 1 and 2_input_OR gate I output 1396 of 2 input OR gate I 1398 for bit 2. All the part buses, such as the new cube part_1 bus 1388 to range to the new cube part_N bus 1390, comprise new cube $C_{New}$ bus 1400, denoted with symbol C.

Signals on the merge output enable bus 1304 consist of a latch signal on new cube latch line 1402 of new cube latch register 1404 and a signal on new cube tristate line enable 1406 to put cube $C_{New}$ on new cube output bus 1408, which connects to the merge B bus 1258.

Figure 38:
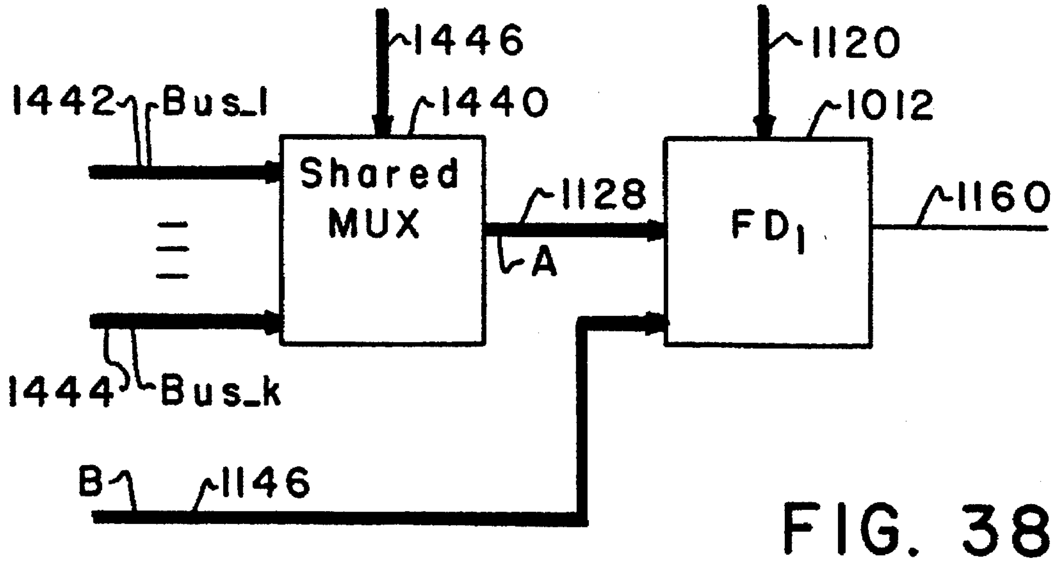
FIG. 38 shows a shared functional detector for k cube registers located in a memory circuit, located in a CINV circuit.

The functional detector in FIG. 38 may operate at a faster speed due to less gate delay with less input gates than the functional detector in FIG. 34.

As shown in FIG. 38, a functional detector, such as the memory unit 1 functional detector 1012, denoted with dotted lines and denoted with symbol $FD_1$, not having a merge mechanism, can consist of N part_j sub_functional circuits, such as part_1 sub functional circuit 1410, denoted with dotted lines and denoted with symbol $FDS_1$, to range to part_N sub functional circuit 1412, denoted with symbol $FDS_N$, and a N input AND gate B 1414.

Each part_j sub_functional circuit, such as part_1 sub functional circuit 1410, denoted with dotted lines and denoted with symbol $FDS_1$, contains:

(1) a partial cover part_j block, such as the partial cover part_1 block 1284, denoted with symbol $PCP_1$, (2) a cover part_j block, such as the part_1 block 1264, denoted with symbol $CP_1$, (3) a part_j null detector, such as the part_1 null detector 1416, denoted with symbol Part_1 Null, and (4) a 3 input part_j MUX, such as 3 input part_1 MUX 1418, denoted with symbol $MUX_1$.

Each part_j null detector, such as the part_1 null detector 1416 denoted with symbol Part_1 Null, could be a 2 input NOR gate, since part_j null detector input bus, such as the part_1 null detector input bus 1420, consists of both part_j_bit_1 and part_j_bit_2 of the 2N memory unit 1 functional detector A input bus 1128.

The 3 inputs to each 3 input part_j MUX, such as the 3 input part_1 MUX 1418, denoted with symbol $MUX_1$, are:

(1) a partial cover part_j block output line, such as the partial cover part_1 block output line 1290, (2) a cover part_j block output line, such as the cover part_1 block output line 1270, (3) a part_j null detector output line, such as the part_1 null detector output line 1422.

Each 3 input part_j MUX, such as the 3 input part_1 MUX 1418, denoted with symbol $MUX_1$, is connected to a part_j sub functional circuit control bus, such as part_1 sub functional circuit control bus 1424 to range to part_N sub functional circuit control bus 1426, which is connected to the 2N bit memory unit 1 functional detection control bus 1120. Each 3 input part_j MUX, such as the 3 input part_1 MUX 1418, denoted with symbol $MUX_1$, has an output called part_j sub functional circuit control output line, such as part_1 sub functional circuit output line 1428 to range to part_N sub functional circuit output line 1430. Each part_j sub functional circuit output line, such as the part_1 sub functional circuit output line 1428 to range to part_N sub functional circuit output line 1430, are also inputs to the N input AND gate B 1414.

The 2N bit memory unit 1 functional detector A input bus 1128, denoted with symbol A, connects to each part_j sub functional circuit input bus, such as part_1 sub functional circuit input A bus 1432 to range to part_N sub functional circuit input A bus 1434.

The 2N bit memory unit 1 functional detector A input bus 1146, denoted with symbol B, connects to each part_j sub functional circuit input bus, such as part_1 sub functional circuit input B bus 1436 to range to part_N sub functional circuit input B bus 1438. For example, the part_N sub functional circuit input A bus 1434 consists of two lines of $a_{1N}$ for bit 1 and $a_{2N}$ for bit 2 of part N. For example, the part_N sub functional circuit input B bus 1438 consists of two lines of $b_{1N}$ for bit 1 and $b_{2N}$ for bit 2 of part N.

Internal of each part_j sub functional circuit, such as the part_1 sub functional circuit 1410, denoted with symbol $FDS_1$, to range to the part_N sub functional circuit 1412, denoted with symbol $FDS_N$, is a connection of 2 wire buses, such as the part_1 sub functional circuit input B bus 1432 to range to part_N sub functional circuit input B bus 1436, is connected: (1) to the partial cover A part_1 bit pair bus 1294, (2) to the cover A part_1 bit pair bus 1294, (3) to the part_1 null detector input bus 1420.

Internal of each part_j sub functional circuit, such as the part_1 sub functional circuit 1410, denoted with symbol $FDS_1$, to range of the part_N sub functional circuit 1412, denoted with symbol $FDS_N$, is a connection of 2 wire buses, such a the part_1 sub functional circuit input B bus 1432 to range to part_N sub functional circuit input B bus 1436, is connected: (1) to the partial cover B part_1 bit pair bus 1294, and (2) to the cover B part_1 bit pair bus 1274.

The functional detector in FIG. 38 is shared with k number of cube registers, such as the 2N bit memory unit 1 cube register 1000, to save space with reduced speed due to one functional detector being clocked to work with k cubes instead of one cube, as shown in FIGS. 31, 32 and 33.

As shown in FIG. 38, a shared MUX 1440, denoted with symbol Shared MUX, with register_j_2N bit_cube_input_buses, such as register_1_2N_bit_cube_input_bus 1442, denoted with symbol Bus_1, to range to register_k_2N_bit_cube_input_bus 1444, denoted with symbol Bus_k, is stepped thru k positions to switch an input cube onto the 2N line memory unit 1 functional detector A input bus 1128, denoted with symbol A. A shared MUX control bus 1446 switches the shared MUX 1440. As shown in FIG. 38, the memory unit 1 functional detector 1012, denoted with symbol $FD_1$, could be replaced with any other functional detector, such as the memory unit N functional detector 1014, denoted with symbol $FD_N$ In the storage of cubes, the controller 294, as shown in FIG. 16, will:

(1) first communicate with the CINV controller 708, as shown in FIG. 24, and (2) second with memory_j controllers, such as the memory 1 controller 968, as shown in FIG. 31 in order to send the cubes to the memory with the least number of cubes. This decision logic could be either in controller software of the CINV controller 708 or in prior art hardware, such as a programmable logic array or PLA, now shown.

Disjoint Sharp Partition Method or DSPM

To perform a NOT of a list to be called list B, cubes of list B are inputted one at a time on the CINV ABC bus 676, to the CINV 580 from data bus 296. The CINV 580 rapidly performs the disjoint sharp operation on list B beginning with list A. The controller 294, in FIG. 21, determines when the CINV 580 is ready to receive more cubes or is finished and ready to send the list NOT B to the RAM 322, by instructing the controller 294, as shown in FIG. 16.

The disjoint sharp partition method or DSPM, derived by separating the disjoint sharp operation into four sections per partition and believed to be originated in this patent, is very useful in performing a close boolean minimization, consisting of one disjoint sharp operation followed by another disjoint sharp operation with cubes wider than the cube bus of the disjoint sharp or the CINV ABC bus 676, of the CINV 580. A use of the DSPM would be in the list operations to generate a set of close boolean minimizations to process a twelve floating point variable arbitrary mathematical flowchart function of 32 bits per variable with constraints in a total processing time of about 70 nanoseconds at 10 ns per gate delay.

Figure 39:
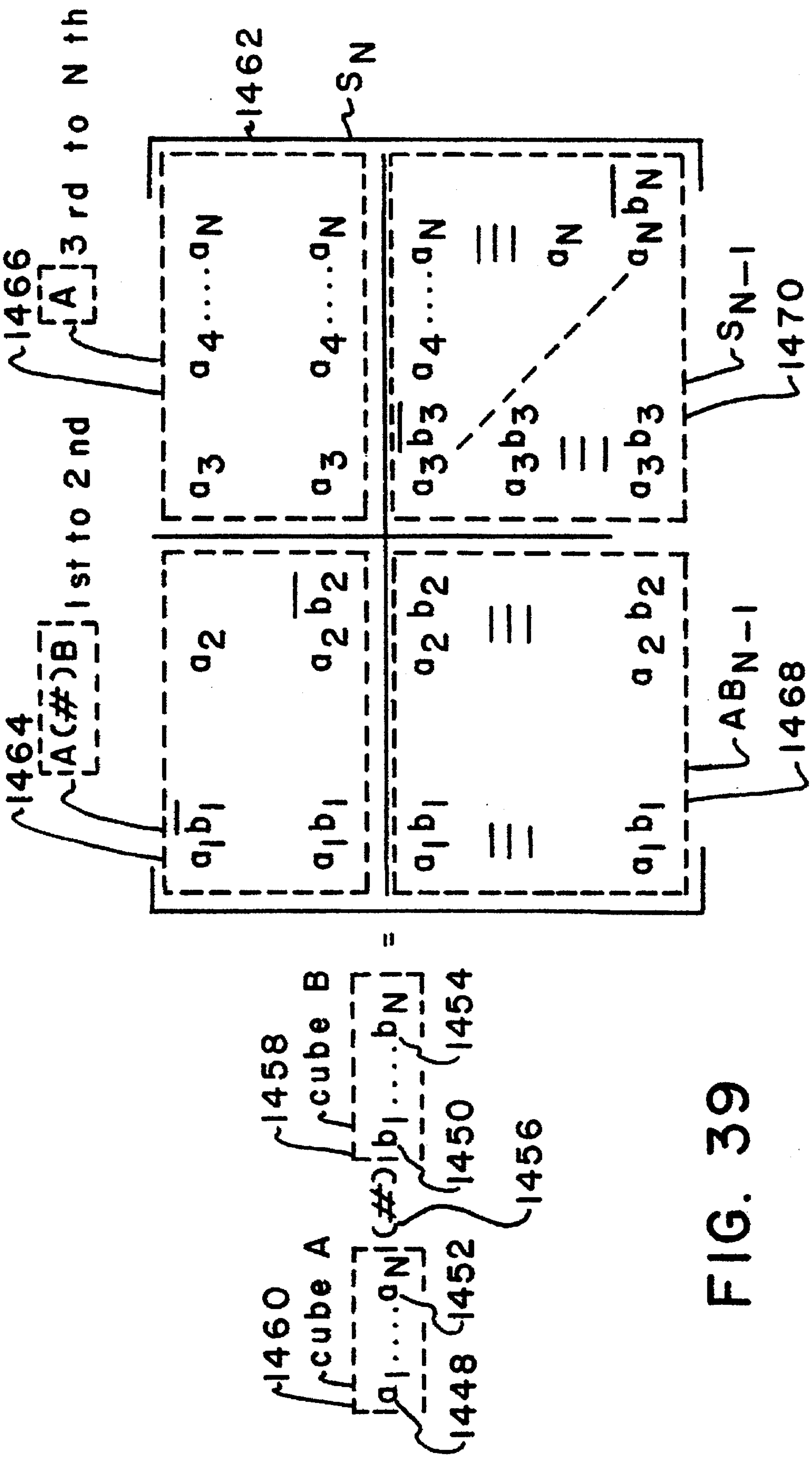
FIG. 39 shows a disjoint sharp chart-equation process.
Figure 41:
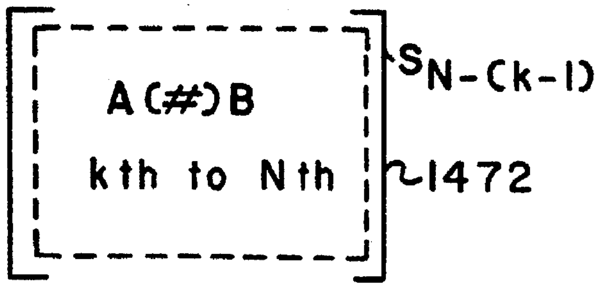
FIG. 41 shows a next to maximum generalized disjoint sharp chart process.

As shown in FIG. 39, the disjoint sharp of two cubes of A and B or 'A (#) B' is shown in a joint chart_equation format with cube B, as defined in equation (80), being removed in a disjoint sharp process from cube A, as defined in equation (82) equalling or=the disjoint sharp process result on the right side of the joint chart_equation.

$$B{=}b_1\,b_2\ldots b_N \tag{80}$$

$$A{=}a_1\,a_2\ldots a_N \tag{82}$$

Table 36 shows the empirical relationship of N, J, j, and the assumed width of p parts of the data bus 296, of the logic code generator 2.

TABLE 36

Present Invention

Title: Relationship Of 'N,P,J,j'
Legend: N is parts of total parts of all variables in function.
P is parts in cube bus.
J is ratio of variable parts/bus parts or N/P.
j is number of partitions in the DSPM.

| Variables: | | | |
|---|---|---|---|
| N | P | J | j |
| 16 | 32 | 0.5 | 1 |
| 32 | 32 | 1 | 1 |
| 48 | 32 | 1.5 | 2 |
| 64 | 32 | 2 | 2 |
| 70 | 32 | 2.5 | 3 |

From Table 36, equation (84) is derived with j equal to J rounded to the next integer.

$$J{=}N/P \tag{84}$$

As shown in FIG. 39, the parts of cube A and cube B, such as part $a_1$ 1448, and part $b_1$ 1450, are usually the most significant parts, while part $a_N$ 1452, and part $b_N$ 1454, are the least significant parts in cubes A and B, respectfully.

As shown in FIG. 39, the disjoint sharp operator 1456, denoted with symbol (#), removes the state or states of the right side cube, such as cube B 1458, denoted with dotted lines, from the state or states of the left side cube, such as cube A 1460, denoted with dotted lines.

A Nth_chart 1462, denoted with dotted lines and denoted with symbol $S_N$, on the right side of the equation in FIG. 39, is shown as four sections:

(1) section one_chart 1464, denoted with dotted lines and denoted with symbol $[A\ (\#)\ B]_{1st\ to\ 2nd\ Parts}$, shown consisting of j=2 or 2 cubes, which are
cube: $[a_1\bar{b}_1\ a_2]$ and
cube: $[a_1B_1\ a_2\bar{b}_2]$,
(2) section two_chart 1466, denoted with dotted lines and denoted with symbol $[A]_{3rd\ to\ Nth\ Parts}$, shown consisting of 2 copies of one cube, which is cube: $[a_3\ a_4\ a_5\ldots]$,
(3) section three_chart 1468, denoted with dotted lines and denoted with symbol $AB_{N-1}$, shown consisting of (N−(j=2 or 2)) copies of one cube, which is cube: $[a_1b_1\ a_2b_2]$, and
(4) section four_chart 1470, denoted with dotted lines and denoted with symbol $S_{N-j}$, shown consisting of (N−(j=2 or 2)) cubes.

The value j was arbitrarily set at 2. If N or variable parts equalled 64 and the cube width or P in parts of the logic code generator 2 equalled 32, then j, such as in $S_{N-j}$, would be set at 32 and 2 sections would be processed.

Figure 40:
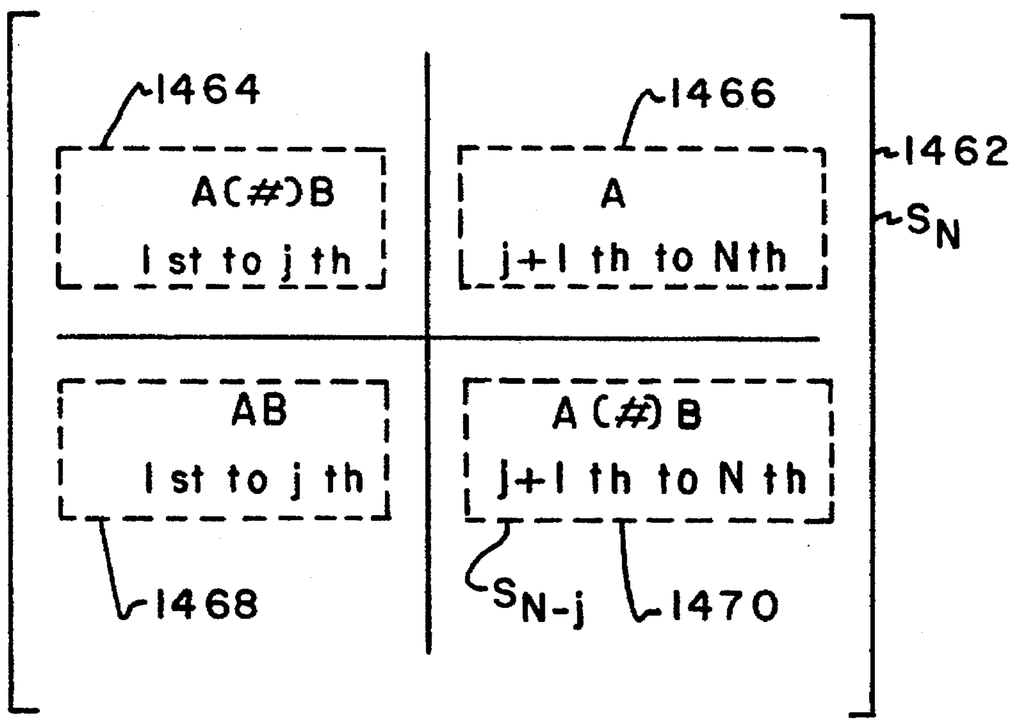
FIG. 40 shows a maximum generalized disjoint sharp chart process.

These 3 sections, as shown in FIG. 40, would be:
(1) the section one_chart 1464,
(2) the section two_chart 1470, and
(3) the section three_chart 1468.

Successively smaller fourth sections of the Nth_chart 1462, denoted with dotted lines and denoted with symbol $S_N$, are shown as derived $S_{N-j}$ sections_charts in FIG. 40, FIG. 41, FIG. 42, and FIG. 43. If the cube part or P width exceeds the cube width or N of the data bus 296, of the logic code generator 2, then the logic code generator 2 can not initially generate the Nth_chart 1462, denoted with dotted lines and denoted with symbol $[S_N]$ for N greater than P.

Figure 42:
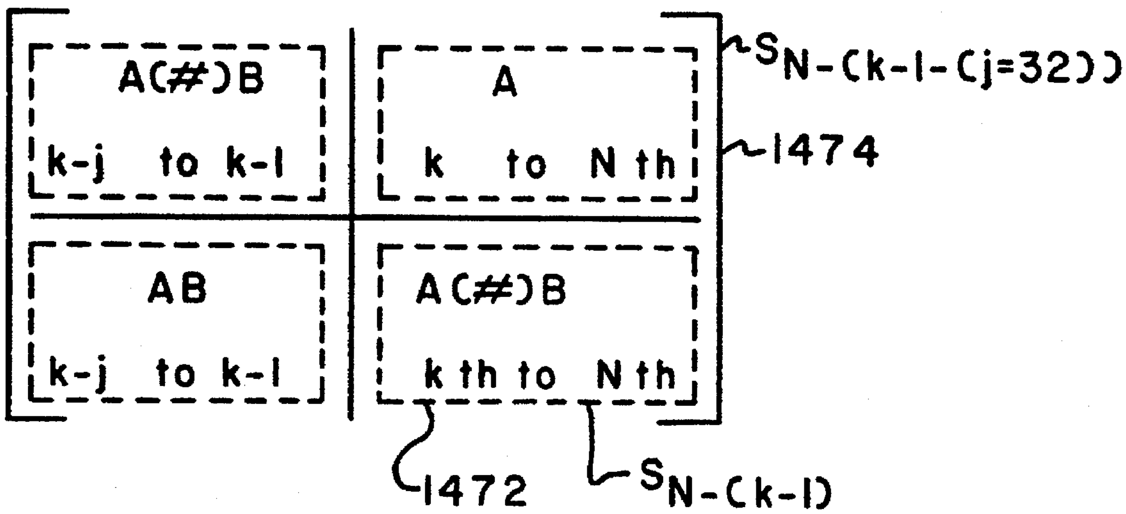
FIG. 42 shows a minimum generalized disjoint sharp chart process.

For Example: if the data bus 296, of the logic code generator 2 were perhaps 32 parts with 2 bits per part for a total of 64 wires, the logic code generator 2 will generate charts, starting:
(1) with chart_$S_{N-(k-1)}$ 1472, as shown in FIG. 44, for parts
(2) then with the next larger chart_$S_{N-(k-1-(j=32))}$ 1474, as shown in FIG. 42, for parts (k−j) to N,
(3) then eventually with chart_$S_{N-(k-1-j)}$ 1476, as shown in FIG. 43,
(4) then finally with the chart_$S_N$ 1462, denoted with symbol $S_N$, as shown in FIG. 40.

Figure 43:
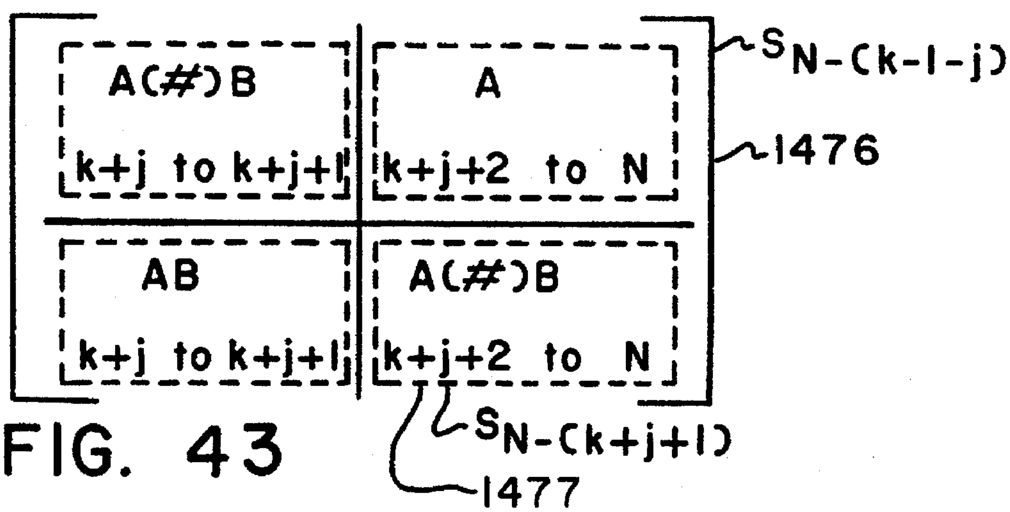
FIG. 43 shows a next to minimum generalized disjoint sharp chart process.
Figure 44:
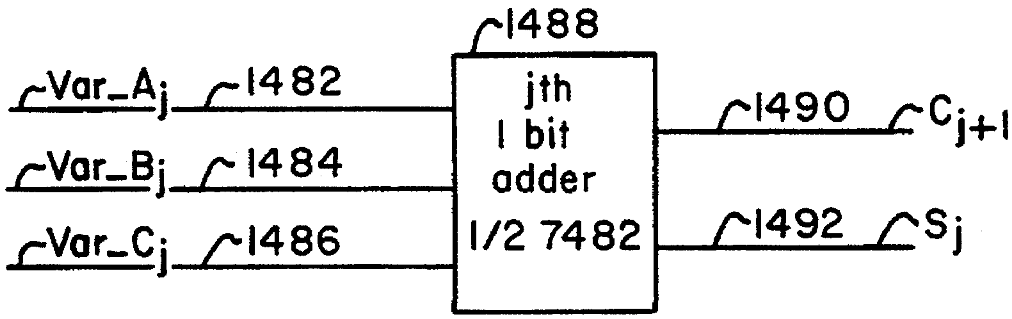
FIG. 44 is located on the drawing sheet with FIG. 60.

In general, as shown in FIG. 43, the first disjoint sharp chart process will be chart_$S_{N-(k+j+1)}$ 1477.

The parts on the left of a chart, such as the section one_chart 1464 in FIG. 40, are 1 to j and the parts on the right of the section one_chart 1464 are j+1 to N.

The configurator, such as a microprocessor or programmable logic array or PLA not shown, to manage two or more logic a controller or conventional microprocessor that directs each different expression in a flowchart to a different logic code generator. An application is to use the logic code generator 2 and the coprocessor 4 as a computer or PC peripheral to speed up sophisticated spreadsheet solutions, as described in application note 5. An expression is any of the following: an equality, an inequality, a logical equation of equalities and/or inequalities as in a condition, a mathematical function, a function MUX address instruction group, a complete flowchart, a logic schematic generation. The configurator mainly just coordinates where to send the various expressions when finished to which logic code generator 2 for assembly to eventually become a set of one or more lists to operate as a mathematical function.

Figure 60:
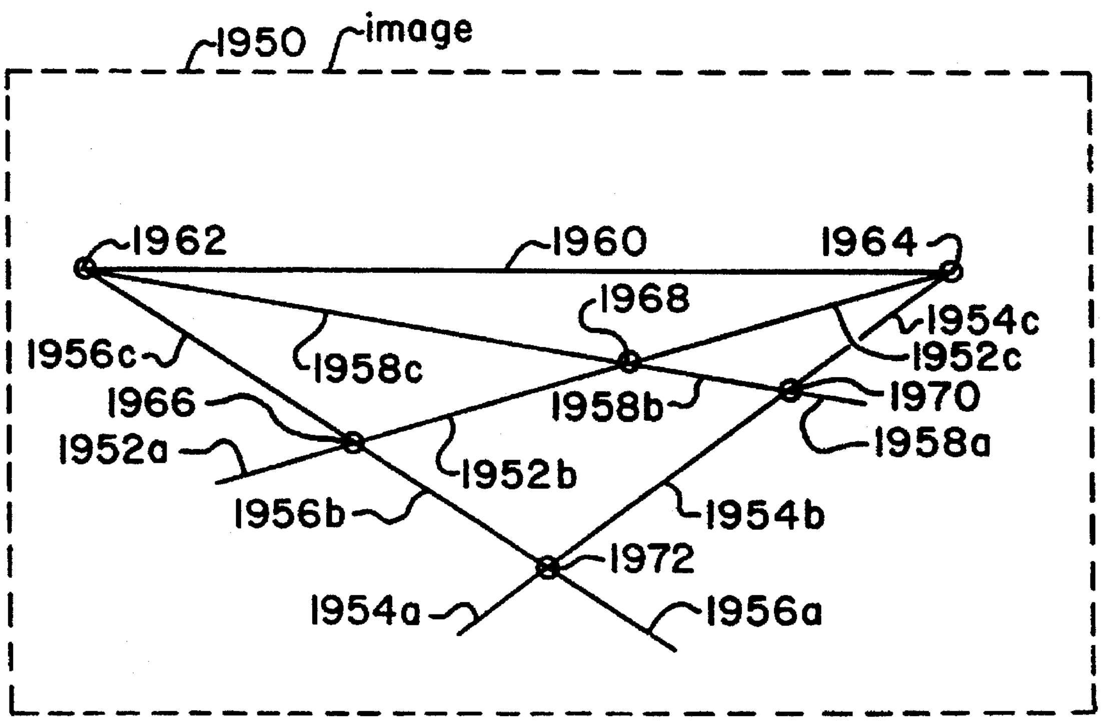
FIG. 60 shows the four point of a rectangle in a perspective image.

The logic code generator 2 can create the set of lists for the integer adder by using the block diagram of FIG. 44, which is on the drawing sheet with FIG. 60, and the prior art logic circuit of 1/2 a 7482, as shown in FIG. 11, and equations (86), (88), (90), (92) for the one bit adder 1478, denoted with the symbol jth 1 bit Adder 1/2 7482.

Odd: j=1, 3, . . .

$$C_{(j+1)}{=}\mathrm{NOT}((A_j\ C_j)\vee(B_j\ \ C_j)\vee(A_j\ \ B_j)) \tag{86}$$

$$S_j{=}(((C_{j+1})(C_j\vee B_j\vee A_j))\vee(A_j\ \ B_j\ C_j)) \tag{88}$$

Even: j=2, 4 . . .

$$C_{(j+1)}{=}\mathrm{NOT}((\{\mathrm{NOT}(A_j)\}C_j)\vee(\{\mathrm{NOT}(B_j)\}C_j)\vee(\{\mathrm{NOT}A_j)\}\{\mathrm{NOT}(B_j)\})) \tag{90}$$

$$S_j{=}(((C_{j+1})(C_j\vee\{\mathrm{NOT}(B_j)\};\vee\{\mathrm{NOT}(A_j)\}))\vee(\{\mathrm{NOT}(A_j)\}\{\mathrm{NOT}(B_j)\}C_j)) \tag{92}$$

Figure 45:
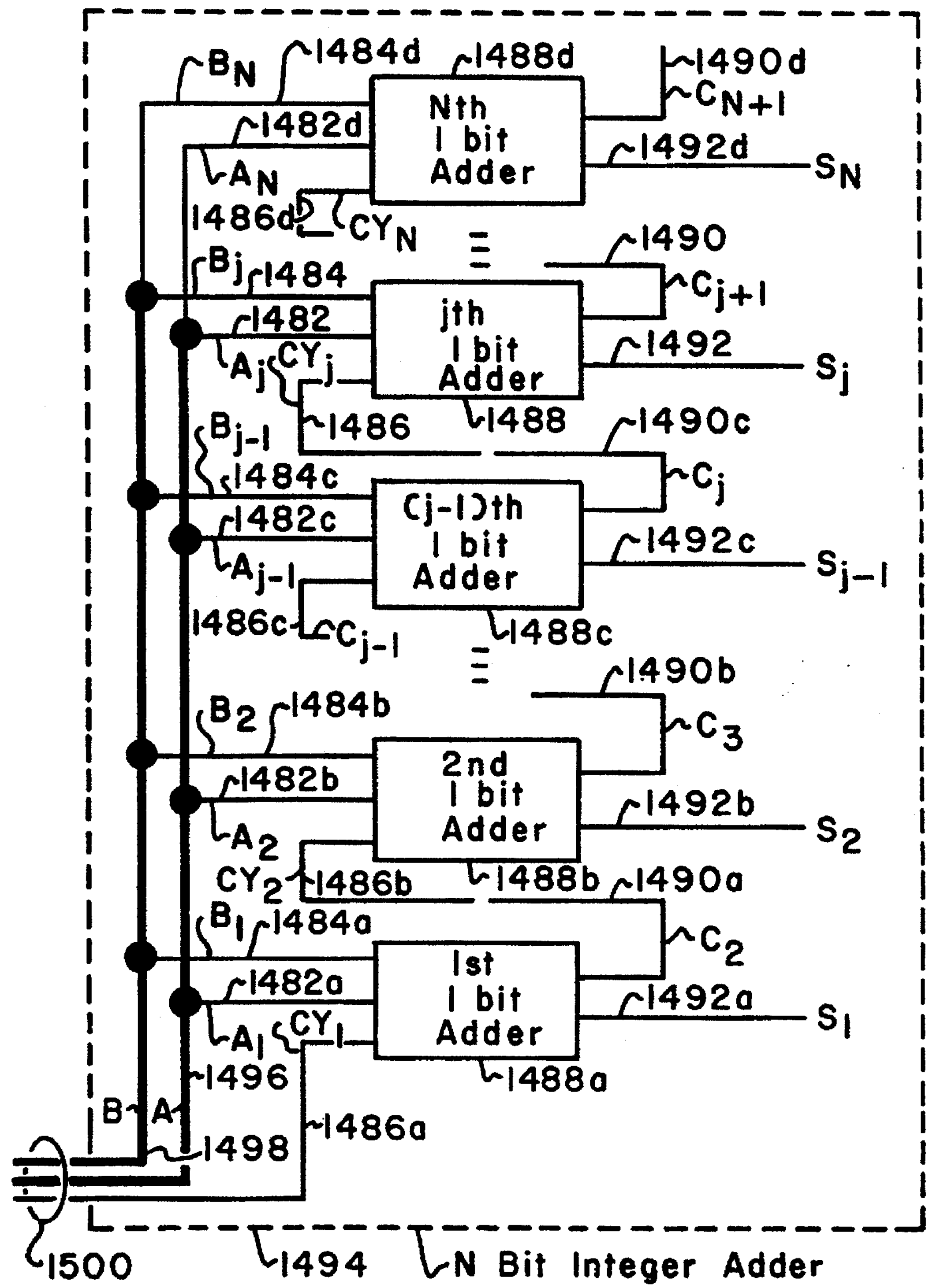
FIG. 45 shows a N bit adder, composed of cascading N 1 bit adders.

The equations (86), (88), (90), and (92), to generate the lists for $C_2$ and $S_1$ for a non cascading adder would be identified as starting algorithm equations. Since a non cascading adder has an on existant carry input, the cubes in the sum list($S_j$) and carry list($C_{j+1}$) will not contain a $C_1$ part, while a cascading adder, such as a 4 bit binary adder used in generated a 64 bit adder, will have a carry part in the cubes in the sum list($S_j$) and carry list($C_{j+1}$). Table 38 and table 39 illustrate the cube parts. Simply setting input carry to zero (false) will not produce correct results. This input carry must be regarded as a input part similar to each of the N parts of the A number bus and the N parts of the b number bus. The boolean list at each output pin of an adder with a carry input is very different than an adder without a carry input. The prior art logic diagram for the above boolean equations (86) to (92) is shown in FIG. 45, as prior art.

As shown in FIG. 44, three variable wires, which are:

(a) variable wire Var_$A_j$ 1482, represented by input list Var_$A_j$, (b) variable wire Var_$B_j$ 1484, represented by input list Var_$B_j$, and (c) carry_$CY_j$_input_wire 1486, represented by input list Var_$C_j$, denoted with symbol $CY_j$, are inputs to a prior art jth 1 bit adder 1488. If j=1 for a 1 bit adder, such as the 1st 1 bit adder 1488*a*, denoted with symbol 1st 1 bit Adder, then the cubes in each of the input lists A, B, Cj are .NOT.A, .NOT.B, and .NOT.C, shown are in Table 37, below.

As shown in FIG. 44, (a) output bus $C_{j+1}$ wire 1490, denoted with symbol Var_$C_{j+1}$, and represented by output list Var_$C_{j+1}$, and (b) output_bus_$S_j$_wire 1492, denoted with symbol Var_$S_j$. and represented by output list Var_$S_j$, are the outputs of the jth 1 bit adder 1488.

The FIG. 15 circuit can be explained further with Table 22 and Table 23 after FIG. 44 with prior art logic circuit 1/2 of a 7482, as shown in FIG. 11, is introduced.

The use of sets: LF, Li, and LNEW will be further utilized for general applications of a logic code generator circuit.

As shown in Table 25 and Table 26, the logic code generator 2 stores the 3 sets: LF, Li, and LNEW in RAM 322.

The logic code generator 2 takes Li1 and puts the first cube(cube 1=0X1X) into the cube instruction register 300 as shown in FIG. 16. The 2 non X parts of cube 1 tell the logic code generator that 2 list operations are to be performed. The 0 of cube 0X1X instructs the controller 294, as shown in FIGS. 16 and 17, to invert LF1 and store as the intermediate LNEW1 in the RAM 322. To invert LF1 means to perform the disjoint sharp or (#) on LF1, in accordance with LNEW1=universe (#) LF1, by sending LF1 to cube inverter in CINV 580. The (#) is performed one cube at a time in CINV 580. Each generated cube is examined for validity using the valid detector 642 as shown in FIG. 23. A valid cube is not a null cube. A valid cube is to be stored in the RAM 322. When the mechanism, as shown in FIGS. 16 and 17, completes the invert list operation, the logic code generator 2 sends the inverted LF1 or NOT of said list LF1 to the RAM 322 as LNEW11. The logic code generator 2 then resets the part 1 register of the the cube instruction register 300. The 1 in cube 1 or 0X1X, which is now XX1X due to part 1 register being reset, instructs the logic code generator 2 to AND the LNEW11 with LF3 in the operation LNEW1=LNEW11 AND. LF3. The logic code generator 2 does this list ANDing in FIG. 22 with each cube from LF3 on cube AND register A output bus 594 ANDed with all cubes in LNEW11, one cube at a time on cube AND register B output bus 598. LNEW1 is stored in the RAM 322 as LNEW11. RAM storage involves storing starting address of list LNEW11, putting the number of cubes at the starting address data, and storing the cubes in the locations after the starting address. Memory management is used. As shown in FIG. 21, the valid cube detector 642 will inform the controller 294 if the resultant cube from the cube AND operation is a non null cube to be stored in the RAM 322. The list of valid cubes will be stored in the RAM 322 as a messy list. Messy means a list is not a close boolean minimization and should be minimized by being sent through the CINV 580 twice to clean up the list into a close boolean minimization. Less cubes means less memory storage. Without using the valid cube detector 642, the logic code generator 2 would very rapidly run out of RAM memory by storing mostly Rule 4 cubes or nonsense cubes.

The process is repeated for cube 2 or LNEW1=(universe (#) LF3).AND.LF1. The resultant list is stored in the RAM 322 as LNEW12.

The logic code generator 2 will OR LNEW11 with LNEW12 by listing LNEW12 after LNEW11. This list will generally by 'messy' and will probably be passed through the disjoint sharp process twice if the number of cubes in the 'just ORed list' 'messy' list exceeds perhaps 20. This close minimized list will be left in the RAM 322 as LNEW1.

The same process is repeated for LNEW2, LNEW3 and LNEW4. Since variable 'z' is defined as having 2 bits of resolution, 'z' will be defined as only LNEW1 for the LSB bit and LNEW2 for the MSB bit. Now LNEW1 and LNEW2 need to be put into the coprocessor, where 'z' will be calculated by the coprocessor with numbers put on the 'x' and 'y' buses. 'z' will be a number.

Figure 46:
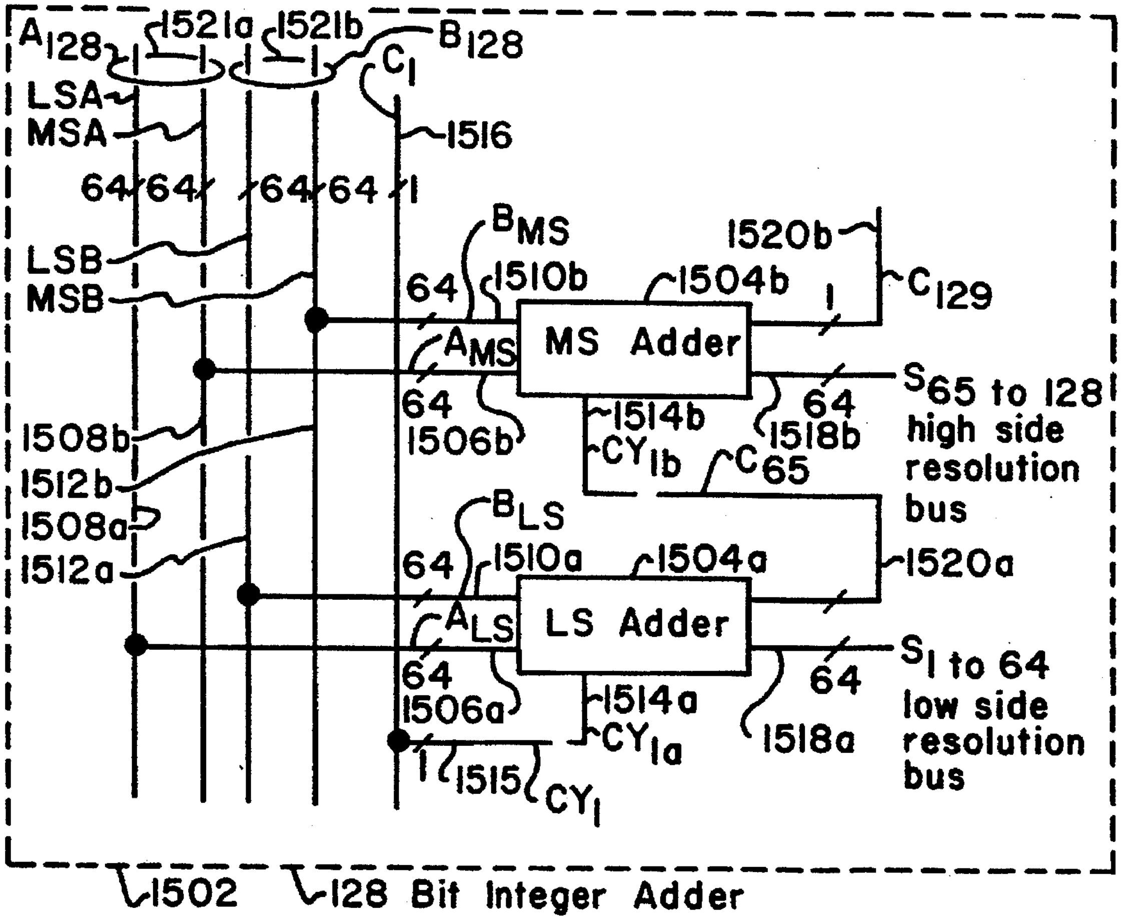
FIG. 46 shows a Li/LF cascading of two 64 bit adders.

Tables 38 and 39 show how cube instructions map the first or LS adder thru the second or MS adder. FIGS. 18 and 46 are also helpful in understanding how the cube width is changed or transformed.

Note: the only carry's to be saved are logic state of the carry input part of the first adder and the list of the carry out of the second adder. The LF_carry_out list of the first 4 bit adder is to be discarded, because the list is used as input to the second 4 bit adder. The full eight sum lists and LNEW-carry-out consist of the lists of LNEW. The carry input of the first adder should always be a part in the cube, regardless of what mathematical expression the adder is mapped into, if the 8 bit adder is to be transformed into other mathematical expressions and functions. The utility of a 4 bit adder with discarded carry input part would be limited and could not be used in Li sets of instruction cubes for mathematical transforms.

One circuit is the instruction register 300, shown detailed in FIG. 20. The instruction register 300 identifies only the 1's and 0's in a cube stored within itself. The purpose of the instruction register 300 can best be provided in the below example 1.

As shown in FIG. 45, output list Var_$C_{j+1}$, representing the output bus Var_$C_{j+1}$ wire 1490, is defined by the equation (86) if j is odd, and the equation (90) if j is even.

As shown in FIG. 45, output list Var_$S_j$, representing the output bus Var_$S_j$ wire 1492, is defined by the equation (88) if j is odd, and the equation (92) if j is even.

The list operations in the equation (86) are performed with input cubes from the Table 37 substituted for the lists $A_1$, .NOT.$A_1$, $B_1$, .NOT.$B_1$, $C_1$, .NOT.$C_1$, with 'j=1' in Table 27.

TABLE 37

Present Invention

Title: Both True And False Input Lists For Binary Integer Adders
Each cube is 2n parts with a representation of 1 character/part.

| | Number of Cubes | B, n Parts | | A, n Parts |
|---|---|---|---|---|
| List | Per List | n | 1 n | 1 |
| $A_1$ | 1 | [X . . . | . . . X X . . . | . . . X1] |
| .NOT.$A_1$ | 1 | [X . . . | . . . X X . . . | . . . X0] |
| $B_1$ | 1 | [X . . . | . . . X1 X . . . | . . . X] |
| .NOT.$B_1$ | 1 | [X . . . | . . . X0 X . . . | . . . X] |
| $C_1$ | 1 | [N . . . | . . . . . . | . . . N] |
| .NOT.$C_1$ | 1 | [X . . . | . . . . . . | . . . X] |

To produce a N part adder, N 1 bit adders, such as the jth 1 bit adder 1488, will be connected together, with five 1 bit adders shown in FIG. 45. N part means that each variable input format is N parts. For example:

(1) a N part, k variable integer function, such as the N bit adder 1494, will have 'N+1' lists of cubes of width '2N+1' parts with k=2. The 'N+1' lists are for a N part variable plus a carry. The cube width of '2N+1' parts is for 2 variables of N parts and a carry input part. If the function is not cascading or following another function, such as $y(x_1,x_2)$ following $x_1(z_1)$ and $x_2(z_2)$, then the carry input bit of 0 can be discarded and the cube width becomes 2N parts from '2N+1' parts.

(2) a N part, k variable floating point function, will have N lists of cubes of width kN parts.

The N parts of each floating point variable will cover:

(a) mantissa sign,
(b) mantissa,
(c) exponent sign, and
(d) exponent.

The carry parts are discarded.

The equations (102) and (110), with j being odd and equal to 1, are for the carry_out_$C_2$_wire 1490*a*, denoted with symbol $C_2$, and sum_out_$S_1$_wire 1492*a*, for the 1st 1 bit adder 1488*a*, of the N bit integer adder 1494, denoted with dotted lines, as shown in FIG. 45.

The first 1 bit adder 1488*a*, denoted with dotted lines, has a resolution part or variable wire Var_$A_1$ 1482*a*, connected to a respective resolution wire in N wires of variable_A_bus 1496 and a variable wire Var_$B_1$ 1484*a*, connected to respective resolution wire in N wires of variable_B_bus 1498. The cube width of any cubes, representing wires, such a the carry_out_$C_2$_wire 1490*a*, denoted with symbol C2, is the number of parts in N bit input bus 1500, consisting of three buses:

(1) the carry_$CY_1$_input_wire 1486*a*, denoted with symbol $CY_1$,
(2) the variable_A_bus 1496, and
(3) the variable_B_bus 1498.

Note: if the N bit integer adder 1494, is non cascadeable, then the input variable bus 1500, consist of:

(1) the variable_A_bus 1496, in accordance with Rule 1 or unconnected,
(2) the variable_B_bus 1498, in accordance with Rule 1 or unconnected, and
(3) the Carry_$CY_1$_input_wire 1486*a*, denoted with symbol $CY_1$, in accordance with Rule 2 or connected to 0 or a false voltage.

'N−1' additional jth 1 bit adders, such as the jth1 bit adder 1488, are connected in a cascaded manner to the 1st 1 bit adder 1488*a*. A 2nd 1 bit adder 1488*b* is connected in cascade to the 1st 1 bit adder 1488*b* by connecting the carry_out_$C_2$_wire 1490*a*, denoted with symbol $C_2$, of the 1st 1 bit adder 1488*a* to carry_$CY_2$_input 1486*b*. The 2nd 1 bit adder 1488*b*, has:

(1) a resolution part or variable wire Var_$A_2$ 1482*b* connected to a 2nd resolution wire in N wires of the variable_A_bus 1496, and
(2) a resolution part or variable wire Var_$B_2$ 1484*b* connected to a 2nd resolution wire in N wires of the variable_B_bus 1498.

Note: the variable_A_bus 1496, and the variable_B_bus 1498, could also carry numbers as well as variable. The 2nd 1 bit adder 1488*b*, has:

(1) a sum_out_$S_2$_wire 1492*b*, and
(2) a carry_out_$C_3$_wire 1490*b*, denoted with symbol $C_3$.

A carry_$CY_1$_input_wire 1486*a*, denoted with symbol $C_1$, is represented by:

(1) a Rule 1 input cube, such as '2N+1' part cube for the N Bit Adder 1494, to be used uncascaded, and
(2) a Rule 2 input cube, such as '2N' part cube for the N Bit Adder 1494, to be used uncascaded, and if just one adder.

The first lists to be created are for:

(a) the carry_out_$C_2$_wire 1490*a*, denoted with symbol $C_2$, and
(b) the sum_out_$S_i$ 1492*a*, for the 1st sum bit of the 1st_1_bit_adder 1488*a*.

The second lists to be created are for:

(a) the carry_out_$C_3$_wire 1490*b*, denoted with symbol $C_3$, and
(b) the sum_out_$S_2$ 1492*b*, for the 2nd sum bit of the 2nd_1_bit_adder 1488*b*.

The (j−1)th lists to be created are for:

(a) the carry_out_$C_j$_wire 1490*c*, denoted with symbol $C_j$, and
(b) the sum_out_$S_{j-1}$ 1492*c*, for the (j−1)th sum bit of the (j−1)th_1_bit adder 1488*c*.

Note: Since the jth_1_bit_adder 1488, with related inputs and outputs was introduced in the description of FIG. 44, the jth_1_bit_adder 1488, as shown in FIG. 45, will have consistance with or the same reference numbers and symbols in both FIG. 44 and FIG. 45.

The jth lists to be created are for:

(a) the carry_out_$C_{j+1}$_wire 1490, denoted with symbol $C_{j+1}$, and
(b) the sum_out_$S_j$ 1492 for the jth sum bit of the jth_1_bit_adder 1488.

The Nth lists to be created are for:

(a) the carry_out_$C_{N+1}$_wire 1490*d*, denoted with symbol $C_{N+1}$, and
(b) the sum_out_$S_N$ 1492*d*, for the Nth sum bit of the Nth_1_bit_adder 1488*d*.

The equations (86) and (88) are used for finding the lists of the carry out and sum, such as carry_out_$C_j$_wire 1490*c*, denoted with symbol $C_j$, and sum_out_$S_{(j-1)}$_wire 1492*c*, respectively, for the jth 1 bit adder with j odd, and the equations (90) and (92) with j even. List generation for the N bit integer adder 1494, denoted with dotted lines, is performed with the Fortran computer program in Computer Program Listing Number 2.

The '(j−1)' 1 bit adder 1488*c*, denoted with dotted lines, has:

inputs of—

(1) a resolution part or variable wire Var_$A_{(j-1)}$ 1482*c*, connected to a respective resolution wire in N wires of the variable_A_bus 1496,
(2) a variable wire Var_$B_{j-1}$ 1484*c*, denoted with symbol $B_{j-1}$, connected to respective resolution wire in N wires of the variable_B_bus 1498, and (3) a carry output wire $C_{j-1}$ 1486*c*, denoted with symbol $C_{j-1}$, and outputs of—

(1) a variable wire Var_$S_{j-1}$ 1492*c*, denoted with symbol $S_{j-1}$, and (2) the carry output wire $C_j$ 1490*c*, denoted with symbol $C_j$.

The jth 1 bit adder 1488, denoted with dotted lines, has:

inputs of—

(1) a resolution part or variable wire Var_$A_j$ 1482, connected to a respective resolution wire in N wires of the variable_A_bus 1496, and (2) a variable wire Var_$B_j$ 1484 connected to respective resolution wire in N wires of the variable_B_bus 1498, denoted with symbol B, of N parts, (3) a carry output wire $C_j$ 1486, denoted with symbol $C_j$, and outputs of—

(1) a variable wire Var_$S_j$ 1492, denoted with symbol $S_j$, and (2) a carry output wire $C_{j+1}$ 1490, denoted with symbol $C_{j+1}$, The Nth 1 bit adder 1488*d*, denoted with dotted lines, has:

(1) a resolution part or variable wire Var_$A_N$ 1482*d* connected to a respective resolution wire in N wires of the variable_A_bus 1496, and (2) a variable wire Var_$B_N$ 1484*d*, connected to respective resolution wire in N wires of the variable_B_bus 1498, (3) a carry output wire $C_N$ 1486*d*, denoted with symbol $C_N$, and outputs of—

(1) and variable wire Var_$S_N$ 1492*d*, denoted with symbol $S_N$, and (2) a carry output wire $C_{N+1}$ 1490*d*, denoted with symbol $C_{N+1}$.

The logic code generator 2 as shown in FIG. 3 will generate all lists for the N bit integer adder 1494, denoted with dotted lines from the computer program written in Fortran, shown in Computer Program Listing Number 2. Note: The .AND. operation is understood for two cubes side by side, such as '(cube 1)(cube 2)' or '[cube 1][cube 2]' means side, such as '(cube 1)(cube 2)' or '[cube 1][cube 2]' means 'cube 1 .AND. cube 2'.

$$C_2 = .NOT.((A_1C_1) \vee (B_1C_1) \vee (A_1B_1)) \tag{94}$$

$$\begin{aligned} C_2 = \; & \cdot NOT \cdot (([X \ldots X1][N \ldots N]) \\ & \vee ([X \ldots X1\_X \ldots X][N \ldots N]) \\ & \vee ([X \ldots X1][X \ldots X1\_X \ldots X])) \end{aligned} \tag{96}$$

Resulting in:

$$C_2 = .NOT.([X \ldots X1\_X \ldots X1]) \tag{98}$$

Resulting in:

$$C_2 = [X \ldots X](\#)[X \ldots X1\_X \ldots X1] \tag{100}$$

Resulting in:

$$C_2 = ([X \ldots X0\_X \ldots XX] \vee [X \ldots X1\_X \ldots X0]) \tag{102}$$

The right side of the equation (102) is the list of two cubes representing the output bus $C_{j+1}$ wire 1490 of the jth 1 bit adder 1488.

The list operations in the equation (88) are performed with input cubes from the Table 37, substituted for the lists $A_1$, .NOT.$A_1$, $B_1$, .NOT.$B_1$, $C_1$, .NOT.$C_1$, with 'j=1' as follows:

$$S_1 = ((C_2)(C_1 \vee B_1 \vee A_1)) \vee (A_1B_1C_1) \tag{104}$$

$$\begin{aligned} S_1 = \; & ((C_2)([N \ldots N\_N \ldots N] \\ & \vee [X \ldots X1\_X \ldots X] \\ & \vee [X \ldots X\_X \ldots X1]) \vee \\ & ([X \ldots X\_X \ldots X1][X \ldots X1\_X \ldots X][N \ldots N]) \end{aligned} \tag{106}$$

Resulting in:

$$\begin{aligned} S_1 = ( \; & [X \ldots X0\_X \ldots XX] \\ & \vee [X \ldots X1\_X \ldots X0]) \cdot AND \cdot ([X \ldots XX\_X \ldots X1] \\ & \qquad \vee [X \ldots X1\_X \ldots XX]) \end{aligned} \tag{108}$$

Resulting in:

$$\begin{aligned} S_1 = ( \; & [X \ldots X0\_X \ldots X1] \\ & \vee [X \ldots X1\_X \ldots X0]) \end{aligned} \tag{110}$$

The right side of the equation (110) is the list of two cubes representing the output bus $S_j$ wire 1492 of the jth 1 bit adder 1488.

Since the time to perform a list operation, such as a close boolean minimization, is dependent on the number of cubes in the lists operated upon, list close boolean minimizations to keep the number of cubes per list at a minimum must be performed fairly regularly after one or a few operations in the logic code generator 2.

The set of lists for the N bit integer adder, denoted with dotted lines, can be generated by cascading p (N/p) bit integer adders together, such as the N bit integer adder 1494, denoted with dotted lines. Other functions can be cascaded also, such as subtraction, multiplication, and division. Other functions, such as y(z(x)) would not be cascaded.

An example of a cascaded function is a 128 bit integer adder 1502, denoted with dotted lines, which is created by cascading two 64 or 2 (128/2) bit integer adders, which are a LS_64_bit_integer_adder 1504*a*, and a MS_64_bit_integer_adder 1504*b*, together as shown in FIG. 46. The LS in LS Adder means low side resolution or least significant bit group, while the MS in MS Adder ;means high side resolution or most significant bit group. The LS_64_bit_integer_adder 1504*a* has:

(1) a LS_64_bit_variable_A_bus 1506*a*, denoted with symbol $A_{LS}$ and denoted with symbol 64 for parts, connected to variable_LSA_bus 1508*a*, denoted with symbol 64 for parts (2) a LS_64_bit_variable_B_bus 1510*a*, denoted with symbol $B_{LS}$ and denoted with symbol 64 for parts, connected to variable_LSB_bus 1512*a*, denoted with symbol 64 for parts, (3) a carry_input_$CY_{1a}$ 1514*a*, denoted with symbol $CY_{1a}$, connected to interconnect_$C_{Y1}$_wire 1515, denoted with symbol $C_{Y1}$, and connected to variable_carry_input_bus_wire 1516, denoted with symbol $C_1$, with outputs:

(1) sum_LS_output_bus 1518*a*, denoted with symbol $S_{1 \text{ to } 64}$ and denoted with symbol low side resolution bus and denoted with symbol 64 for 64 wires, and (2) carry_LS_output_bus_wire 1520*a*, denoted with symbol $C_{65}$ and denoted with symbol 1 for 1 wire.

The MS_64_bit_integer_adder 1504*b* has (1) a MS_64_bit_variable_A_bus 1506*b*, denoted with symbol 64 for parts, connected to variable_MSA_bus 1508*b*denoted with symbol 64 for parts (2) a MS_64_bit_variable_B_bus 1510*b*, denoted with symbol 64 for parts, connected to variable_MSB_bus 1512*b*, denoted with symbol 64 for parts, (3) a carry_input_$CY_{16}$ 1514*b*, denoted with symbol $CY_{1b}$, connected to interconnect_$C_1$_wire 1515, and connected to variable_carry_input_bus_wire 1516, denoted with symbol $CY_1$, with outputs:

(1) sum_MS_output_bus **1518*b*, denoted with symbol $S_{65\ to\ 128}$ and denoted with symbol high side resolution bus and denoted with symbol 64 for 64 wires, and (2) carry_MS_output_bus_wire 1520*b***, denoted with symbol $C_{129}$ and denoted with symbol 1 for 1 wire.

The variable_LSA_bus **1508*a*, denoted with symbol 64 for parts and the variable_MSA_bus 1508*b*, denoted with symbol 64 for parts, combine to form $A_{128}$ bus 1521*a***.

The variable_LSB_bus **1512*a*, denoted with symbol 64 for parts and the variable_MSB_bus 1512*b*, denoted with symbol 64 for parts, combine to form $B_{128}$ bus 1521*b***.

Cascading adders together is similar to the mating of LFj to Lij in FIG. 18 to create LNEWj in FIG. 19. As shown in Table 38, three lists, shown as generalizations for: (a) list $C_{65}$, (b) a LS sum list from any of sixth four LS sum lists, indicated as $S_{j=1-to-64}$, and (c) a MS sum list from any of sixty four MS sum lists, indicated as $S_{j=65-to-128}$ or list $C_{129}$. LS means least significant sums from one to sixth four. MS means most significant sums from sixth five to one hundred twenty eight. The term '.valid.' means a list of cube sections, which are not null cubes and generally are not universe cubes. The width of any cube will be 2n+1 parts in general; even though, the final lists will always contain a 0 for the $C_1$ part location for carry input with $C_1$ fixed at a logic false state or '0'. The variable_carry_input_bus_wire 1516 is set at 0 and electrically at a false state; thus, the resultant lists, such as a MS sum list in a set of lists can be reduced to a width of 2n or two hundred fifty six parts with n equal to 128 parts or 128 significant bits and with the $C_1$ part understood as '0'. If any lists, such as any LS sum list or LS carry out list from Table 38, are to be used as lists of cube instructions for higher order sum lists, such as the MS sum list or the MS carry out list in Table 39, the cube instruction width must include the 0 in the $C_1$ part.

This 0 in the $C_1$ part of a instruction cube means to AND the NOT of the list, representing $C_1$ input of the higher order integer adder, such as the carry_input_$CY_{1b}$_wire **1514*b***, denoted with symbol $CY_{1b}$. This 0 was created by using a null input list, in accordance with Rule 2.

As defined in RULE 1, the input list representing the jth bus line will consist of an X in all part locations except for the jth part, which will always be a 1. The set of lists representing the MS_64_bit_integer_adder **1504*b*, consists of list $S_{65}$ to list $S_{128}$ and list $C_{129}$. The cascading input list is list $C_{65}$, which represents the carry_LS_output_wire 1520*a***, denoted with symbol $C_{65}$. Note: the symbol $A_{128}$ represents the input list at the 128th signal wire of A. According to RULE 1, $A_{128}$ is a cube of 2n or 256 parts and contains a 1 in the 256th part and an X elsewhere. Since variable B contains the second 128 parts, $B_{128}$ would contain a 1 in the 128th part and an X elsewhere from parts 256 to 1. The value n is the variable width; thus cubes in:

(a) a 128 bit adder will be 256 parts wide with the carry input grounded, (b) a 64 bit adder will have 128 parts with the carry input grounded, (c) a k function of p significant bits will have a cube width of kp parts with the carry input grounded, and (d) m k functions cascaded together with m−1 cube instruction sections will have a cube width of mk times the number of significant bits per each variable bus with the carry input grounded.

Basically, a cube instruction is created by shifting the valid parts of a cube by one stage bus in parts.

TABLE 38

Present Invention
Title: Hypothetical Cubes Created Representing Output Pins Of First Adder With Connected Input Bus $ABC_1$ of 3 Buses: A, B, and single wire $C_1$

| One Bus of: | A | B | $c_1$ |
|---|---|---|---|
| 129 Parts<br>Parts: | 64 1 | 64 1 | 1 |
| Cube 1: | [10X . . . X | X . . . X | 0] |
| Cube 2: | [1X . . . X | 0X . . . X | 0] |

Note: Parts 128 to 65 of A and B are each X for cubes 1 and 2.

| One Bus of: | A | B | $c_1$ |
|---|---|---|---|
| 257 Parts<br>Parts: | 128 65 64 1 | 128 65 64 1 | 1 |
| Cube 1: | [X . . . X_10X . . . X | X . . . X_X . . . X | 0] |
| Cube 2: | [X . . . X_1X . . . X | X . . . X_0X . . . X | 0] |

The above cubes, which are cube 1 and cube 2, are typical cubes in a output list for a modular first adder or least significant adder and are not a cube instruction. The $C_1$ part will always be a 0, because the carry in to the first stage of a least significant binary adder is ground or connected to a false logic state. Since $C_1$ is at 0, the input list for part $C_1$ is a null cube.

Review: A null cube represents a wire with a forever 0 logic state or false voltage.

TABLE 39

Present Invention
Refer To FIG. 15
Title: Hypothetical Cube Instructions Created From First Adder By A 64 Part Shifting Of First Adder With Connected Input Bus $ABC_1$ of 3 Buses: A, B, and single wire $C_1$ AND Operations of Cube Instructions Cubes 1 and 2 map into cubes 3 and 4.

| Buses: | A | B | $c_{65}$ | Hypothetical Cube |
|---|---|---|---|---|
| Parts: | 128 65 | 128 65 | $c_{65}$ | Instructions: |
| Cube 3: | 10X . . . X | _X . . . X | 0 | A128.AND.(NOT(A127)) .AND.C65 |
| Cube 4: | 1X . . . X | _0X . . . X | 1 | A128.AND.B128.AND.C65 |

Since $C_{65}$ is the carry out of the least significant modular adder or first 64 bit adder, the list $C_{65}$ will consist of cubes, each of a width of 129 parts, consisting of 64 parts from the connected parts of bus A or $A_{64}$ to $A_1$, 64 parts from the connected parts of bus B or $B_{64}$ to $B_1$, and 1 part from bus carry input $C_1$. This bus wire carry input $C_1$ consists of just one part. As shown in FIG. 46, the logic state of the second stage carry input, which is connected to the carry_LS_output_bus_wire 1520a, dws $C_{65}$ and represented by list $C_{65}$, is generally unknown and dependent on the conditions of list $C_{65}$ of the first stage.
Note: Parts 64 to 1 of A and B are each an X in cubes 3a and 4a, as shown below.

| Buses: | A | B | $c_{65}$ |
|---|---|---|---|
| Parts: | 128 65 64 1 | 128 65 64 1 | $c_{65}$ |
| Cube 3a: | [ 10X . . . X_X . . . X | X . . . X_X . . . X | 0 ] |
| Cube 4a: | [ 1X . . . X_X . . . X | 0X . . . X_X . . . X | 1 ] |

TABLE 39-continued

Present Invention
Refer To FIG. 15
Title: Hypothetical Cube Instructions Created From First Adder By A 64 Part Shifting Of First Adder With Connected Input Bus $ABC_1$ of 3 Buses: A, B, and single wire $C_1$ X for cubes 3a and 4a, as shown above, map into:
Variable Bus Z of 256 Parts and List $^c1$

| Buses: | A | | B | | $^c1$ | |
|---|---|---|---|---|---|---|
| Parts: | 256 | 129 | 128 | 1 | 1 | |
| Cube 3b: | 10X . . . X_X . . . X | | | | 0 | $Z_{256}$.AND. $Z_{255}$.AND.$C_1$ |
| Cube 4b: | 1X . . . X_0X . . . X | | | | 0 | $Z_{256}$.AND. $Z_{128}$.AND.$C_1$ |

Figure 47:
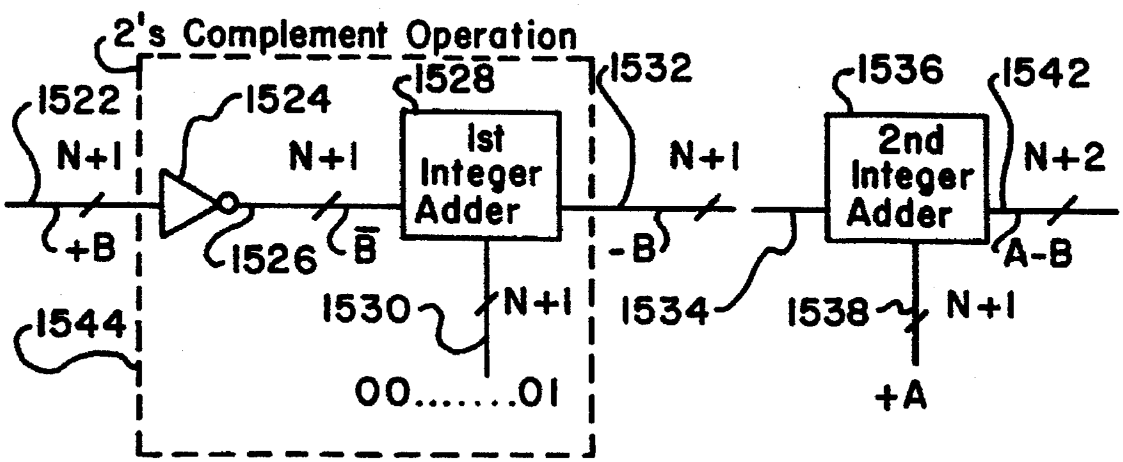
FIG. 47 shows a subtraction block diagram.

To generate the set of lists for integer subtraction requires using the prior art circuitry of FIG. 47, showing how a set of lists, representing the subtrahend_B_input_bus 1522, denoted with symbol +B and denoted with symbol $B_j$ and denoted with symbol N+1 for number of wires, passes thru inverter_array 1524 with inverter_array_output 1526, denoted with symbol B and denoted with symbol N+1 for number of wires, to a first_integer_adder 1528, with the other first_integer_adder_input_variable_bus 1530, denoted with symbol 00 . . . 01 and denoted with symbol N+1 for number of wires, having a fixed number of value of one on a bus of n wires. The first_integer_adder_output_bus 1532, denoted with symbol –B and denoted with symbol N+1 for number of wires, of the first_integer_adder 1528 is the negative of B and connects to second_integer_adder_input 1534 of a second_integer_adder 1536, with the other second_integer_adder_input_variable_bus 1538, denoted with symbol N+1 for number of wires, having an input_variable_A 1540. The second_integer_adder_output_bus 1542, denoted with symbol output bus, of the second_integer_adder 1536 is the dependent variable denoted as +A+[–B] or [A–B]. All the buses have n+1 wires to handle a sign bit of one part and n resolution parts. TABLEs 29 to 36, following, describe how to generate the set of lists in detail for A–B, using the first_integer_adder 1528 and the second_integer_adder 1536 of n+1 parts per each variable, and the inverter_array 1524, composed of n+1 inverters.

The inverter_array 1524 and the first_integer_adder 1528, denoted with symbol 1st Integer Adder, comprise a 2's_complement_operation_box 1544, denoted with dotted lines.

TABLE 40

Present Invention
Title: Set of lists for +B in accordance with to RULE 1.
( Note: $B_i$ or NOT $B_i$ = U (#) $B_i$ )

| Parts n+1 | Input 1 Lists | Parts n+1 | Input 1 Lists |
|---|---|---|---|
| [X . . . | . . . X1] - $B_1$ list | [X . . . | . . . X0] - $B_1$ list |
| [X . . . | . . . X1X] - $B_2$ list | [X . . . | . . . X0X] - $B_2$ list |
| — | — | — | — |
| — | — | — | — |
| — | — | — | — |
| [X1X . . . | . . . X] - $B_n$ list | [X0X . . . | . . . X] - $B_n$ list |
| [1X . . . | . . . X] - $B_{n+1}$ list | [0X . . . | . . . X] - $B_{n+1}$ |

Set of lists for B or NOT B for n+1 part cubes, according to RULE 1, are mapped to the set of lists for B of 2n+2 parts, according to RULE 6, with B as the first variable, as shown below in Table 41, in the N bit integer adder 1502.

TABLE 41

Present Invention
Title: Set of lists for +B in accordance with to RULE 1.

| Parts 2n+2 | n+2 n+1 | Parts 1 Input Lists |
|---|---|---|
| [X . . . | . . . X0 X . . . | . . . X] - $B_1$ list |
| [X . . . | . . . X0X X . . . | . . . X] - $B_2$ list |
| — | — | — |
| — | — | — |
| — | — | — |
| [X0X . . . | . . . X0 X . . . | . . . X] - $B_n$ list |
| [0X . . . | . . . X0 X . . . | . . . X] - $B_{n+1}$ list |

In the Two's Complement Operation, the set of lists for the +1 number of n+1 parts or 00 . . . 01, according to RULEs 2 and 6, is shown in Table 42.

TABLE 42

Present Invention
Title: Set of lists for +B in accordance with to RULE 2.

| Parts 2n+2 | n+2 | Parts n+1 | 1 | Input Lists |
|---|---|---|---|---|
| [X . . . | . . . X | N . . . | . . . N] - | list for any part of 0 |
| The above cube, according to RULE 4, becomes: | | | | |
| [N . . . | . . . N | N . . . | . . . N] - | list for any part of 0 |
| [X . . . | . . . X | X . . . | . . . X] - | list for any part of 1 |

The $[-B]_1$ list of n+1 lists for output [–B] of the integer adder 266 will be, as shown below. Note: Since one input bus contains a number, n+1 part columns in output list [–B] will contain all X's. According to RULE 6, the right most n+1 part columns in $[-B]_1$ list will contain those X's. Each $[-B]_j$ list for j equals 1 to n+1 will look somewhat like this $[-B]_1$ list in Table 43.

TABLE 43

| Present Invention<br>Title: Set of lists for +B in accordance with to RULE 6. | | | | |
|---|---|---|---|---|
| Parts | | Parts | | Ouput List For |
| 2 n + 2 | n + 2 | n + 1 | 1 | First Adder |
| [. . . valid parts. | | X . . . | . . . X] | |
| [. . . valid parts. | | X . . . | . . . X] | |
| [. . . valid parts. | | X . . . | . . . X] | $[-B]_1$ |
| [. . . valid parts. | | X . . . | . . . X] | |
| [. . . valid parts. | | X . . . | . . . X] | |

The valid parts mean the columns contain X's, 1's, or 0's.

Set of lists for +A, according to RULE 1, is in TABLE 44.

TABLE 44

| Present Invention<br>Title: Set of lists for +B in accordance with to RULE 1. | | |
|---|---|---|
| Parts | | |
| n + 1 | 1 | Input Lists |
| [X . . . | . . . X1] - | $A_1$ list |
| [X . . . | . . . X1X] - | $A_2$ list |
| — | | — |
| — | | — |
| [X1X . . . | . . . X1] - | $A_n$ list |
| [1X . . . | . . . X1] - | $A_{n+1}$ list |

TABLE 45

| Present Invention<br>Title: Set of lists for +B in accordance with to RULE 6. | | |
|---|---|---|
| Parts | Parts | Input |
| 2 n + 2 | n + 2 n + 1 | 1 Lists |
| [X . . . | . . . X1 X . . . | . . . X] - $A_1$ list |
| [X . . . | . . . X1X X . . . | . . . X] - $A_2$ list |
| — | — | — |
| — | — | — |
| — | — | — |
| [X1X . . . | . . . X X . . . | . . . X] - $A_n$ list |
| [1X . . . | . . . X X . . . | . . X] - $A_{n+1}$ list |

The $[-B]_j$ lists must be mapped into cubes, according to RULE 6 for input cubes, as shown below in Table 46 for j=1.

TABLE 46

| Present Invention<br>Title: Set of lists for +B in accordance with to RULE 6. | | | | |
|---|---|---|---|---|
| Parts | | Parts | | |
| 2 n + 2 | n + 2 | n + 1 | 1 | Input Lists |
| [X . . . | . . . X | . . . | . . .] | |
| [X . . . | . . . X | . . . | . . .] | |
| — | | | — | |
| — | | | — | $[-B]_j$ |
| — | | | — | |
| [X . . . | . . . X | . . . | . . .] | |
| [X . . . | . . . X | . . . | . . .] | |

The output $[A-B]_1$ list of n+1 lists of the integer adder 274 is in Table 47.

Note: Each $[A-B]_j$ list for j=1 to n+1 will look somewhat like this $[A-B]_1$ list.

TABLE 47

| Present Invention<br>Title: Set of lists for +B, according to RULE 1, is: | | | | |
|---|---|---|---|---|
| Parts | | Parts | | Output List For |
| 2 n + 2 | n + 2 | n + 1 | 1 | Second Adder |
| [. . . | . . . | . . . | . . . ] | |
| [. . . | . . . | . . . | . . . ] | |
| — | | | — | |
| — | | | — | $[A-B]_1$ |
| — | | | — | |
| [. . . | . . . | . . . | . . . ] | |
| [. . . | . . . | . . . | . . . ] | |

Jump Down Two Function Flow Chart or Non Linear z(x,y)

Figure 48:
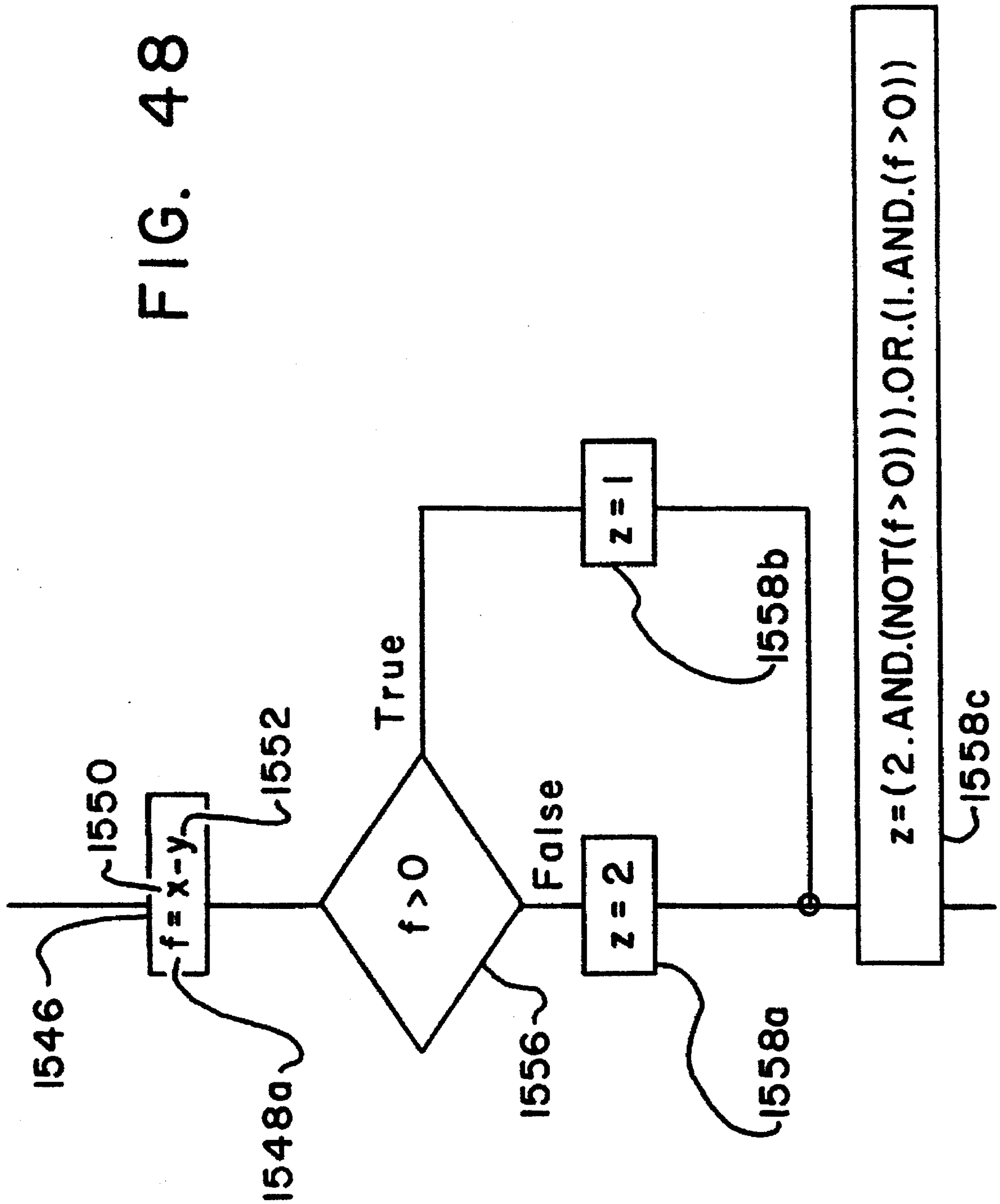
FIG. 48 shows a jump down basic flow chart with a condition 1.

A simplified 'Jump Down' flow chat routine is shown in FIG. 48. As shown in FIG. 48, the flow chart consists of three steps, such as step_1A_instruction 1546, denoted with symbol f=x−y. If the jump_down_decision 1556, denoted with a diamond shaped decision symbol, were true, the output_variable_z_=_2 1558*a*, would be '1'. If the jump_down_decision 1556 were false, the output_variable_z_=_2 1558*a* would be '2'. The jump_down_decision 1556 and the two numerical values of the output_variable_z_=_2 1558*a* and the output_variable_z_=_1 1558*b* can be combined in equation (112). All variables, such as the output_variable_z_=right side of equation (112) 1558*c*, denoted with $$z=(2.AND.(.NOT.(f>0))).OR.(1.AND.(f>0)) \qquad (112)$$

symbol of the equation (112), is represented as a set of lists, while conditions, such as 'f>0' in the jump_down_decision 1556 are represented with only one list of cubes. The output_variable_z_=right side of equation (112) 1558*c* equals 2 if NOT(f>0) is met or else 1 if (f>0) is met. To generate the set of lists for the output_variable_z_=right side of equation (112) 1558*c*, the single list representing the jump_down_decision 1556 must be generated first.

List construction for conditions is shown in Table 48.

TABLE 48

| Present Invention<br>Title: Resolution Lists for f as a signed integer: $f_n$ $f_{n-1}$ . . . . . . $f_2$ $f_1$ | | | | | | |
|---|---|---|---|---|---|---|
| | Cube Instructions: Parts | | | | | |
| Regions for f | $f_n$ | $f_{n-1}$ | . . . | . . . | $f_2$ | $f_1$ |
| 'f > 0' | 0 | 1 . . . | | 1 | 1 | 1 |
| 'f > 0' | 0 | 1 . . . | | 1 | 1 | 0 |
| 'f > 0' | 0 | 1 . . . | | 1 | 0 | 1 |
| 'f > 0' | | | — | | | |
| 'f > 0' | | | — | | | |
| 'f > 0' | | | — | | | |
| 'f > 0' | 0 | 0 . . . | | 0 | 1 | 0 |
| 'f > 0' | 0 | 0 . . . | | 0 | 0 | 1 |
| 'f > 0' | 0 | 0 . . . | | 0 | 0 | 1 |
| 'f = 0' | 0 | 0 . . . | | | 0 | 0 |
| 'f < 0' | 1 | 0 . . . | | 0 | 0 | 1 |
| 'f < 0' | 1 | 0 . . . | | 0 | 1 | 0 |
| 'f < 0' | 1 | 0 . . . | | 0 | 1 | 1 |
| 'f < 0' | | | — | | | |
| 'f < 0' | | | — | | | |

TABLE 48-continued

Present Invention
Title: Resolution Lists for f as a signed integer: $f_n\ f_{n-1} \ldots \ldots f_2\ f_1$

| Regions for f | Cube Instructions: Parts | | | | | |
|---|---|---|---|---|---|---|
| | $f_n$ | $f_{n-1}$ | . . . | . . . | $f_2$ | $f_1$ |
| 'f < 0' | | | — | | | |
| 'f < 0' | 1 | 1 . . . | | 1 | 0 | 1 |
| 'f < 0' | 1 | 1 . . . | | 1 | 1 | 0 |
| 'f < 0' | 1 | 1 . . . | | 1 | 1 | 1 |

The list of cube instructions for (f<0) is just equation (114).

$$\text{List for } (f<0)=(f_n.\text{AND}.U) \text{ or just } f_n \quad (114)$$

$f_n$ is a list of cubes containing z representing a variable bus of wires $z_m\ z_{m-1} \ldots z_2\ z_1$. The list of cube instructions for just (f>0) is obtained from equations (116) and (118), below.

$$\text{List for } (f>0)=[\text{List for } f\geqq 0](\#)[\text{List for } f=0] \quad (116)$$

$$\text{List for } (f>0)=[f_n.\text{AND}.U](\#)[f_n f_{n-1} \ldots f_2 f_1] \quad (118)$$

$f_n$ is the NOT of list $f_n$. The equation (118) can be rewritten as equation (120), below.

$$\text{List for } (f>0) = f_n\ (\#) \left[ \underset{j=1}{\overset{n}{\text{AND}}}\ f_j \right] \quad (120)$$

The Five Condition Lists of Cubes

The variable f is defined as floating point. The floating point format in parts are sign, mantissa, exponent sign, exponent. The exponent section of the floating point format can be ignored or cancelled out, because the variable f is compared to zero in five conditions and the exponent or magnitude is unrelated to the comparison.

The lists of cubes for the five conditions are instruction lists of instruction cubes to operate upon N list($f_j$)s, where f is defined in a condition inequality or equation, such as in a 'if(condition of f(x,y,z)>0, then, else if, else, endif' flow chart.

Signed integers in the conditions represent signed mantissas.

Condition 1. Construction of list for 'f>0':

'f>0' means ((sign part is true).AND.(mantissa is not zero)).

List for sign part, if true, is: [0X . . . X], where the 0 is the sign part and the range of X's is the mantissa.

List for mantissa, being not zero, is: U (#) (mantissa zero), where U is [X . . . X].

List for mantissa, being not zero, is: U (#) (X0 . . . 0)

List of n−1 of cubes

List for mantissa not zero = ( [X1X . . . . . . . . . . X] (122)
[X01X . . . . . . . . . X]
[X001X . . . . . . . . X]
[X0001X . . . . . . . X]
—
—
—
[X0 . . . . . . . . 01XX]
[X0 . . . . . . . . . 01X]
[X0 . . . . . . . . . . 01] )

List for 'f>0' is : (sign list for 'f>0').AND.(mantissa list for 'f>0').

List for sign list for (f>0) is: [0X . . . X].

List for mantissa list for (f>0) is: U (#) [mantissa list for (f=0)] or the equation (122).

List of 1 cube · List of n−1 cubes (124)

List for 'f>0' = ([0X. . . . . X]) ·AND·( [X1X. . . . . . . . . X]
[X01X . . . . . . . X]
[X001X . . . . . . X]
[X0001X . . . . . X]
—
—
—
[X0 . . . . . . 01XX]
[X0 . . . . . . . 01X]
[X0 . . . . . . . . 01])

List of n−1 number of cubes (126)

List for 'f>0' =( [01X . . . . . . . . . . X]
[001X . . . . . . . . . X]
[0001X . . . . . . . . X]
[00001X . . . . . . . X]
—
—
—
[0 . . . . . . . . . . . 01X]
[0 . . . . . . . . . . . 01])

Number of cubes for 'f>0' is n−1 cubes.

Note: Applications for 'f>0 list' are in Application Note 1.

Condition 2. Construction of list for 'f=0'

'f=0' means the mantissa is zero.

List for mantissa, being zero, is (X0 . . . 0).

$$\text{list}(f=0) = \underset{j=1}{\overset{N}{\cdot\text{AND}\cdot}}\ (\text{NOT}(Lf_j))$$

Number of cubes for 'f=0' is 1 cube.

Condition 3. Construction of list for 'f<0'

'f<0' means ((sign part is false).AND.(mantissa is not zero))

List for (sign part is false) is: (1X . . . X).

List for (mantissa is not zero) is: U (#) (mantissa is zero).

List for (mantissa is not zero) is: [X . . . X] (#) [X0 . . . 0]

List of 1 Cube ANDed with List of n−1 cubes (128)

List for 'f<0' = ([1X . . . . . . X])·AND· ([X1X . . . . . . . . . . X]
[X01X . . . . . . . . . X]
[X001X . . . . . . . . X]
[X0001X . . . . . . . X]
—
—
—
[X0 . . . . . . . 01XX]
[X0 . . . . . . . . 01X]
[X0 . . . . . . . . . 01]

List of n−1 cubes (130)

List for 'f<0' = ([11X . . . . . . . . . . X]
[101X . . . . . . . . . X]
[1001X . . . . . . . . X]
[10001X . . . . . . . X]
—
—
—
[10 . . . . . . . . . 01X]
[10 . . . . . . . . . . 01]

The resultant list for 'f<0' has n−1 number of cubes.

Number of cubes for 'f<0' is n−1 cubes.

Condition 4. Construction of list for 'f≧0'

'f≧0' means ((f>0).OR.(f=0)).

'f≧0' means condition 1 or condition 2.

'f≧0' means (sign part is positive and mantissa is not zero) or (mantissa is zero).

List of n−1 cubes for '(sign part is positive and mantissa is not zero)' or condition 1 is:

List of n−1 cubes (132)

List for 'f>0' = ([1X . . . . . . X]
[001X . . . . . X]
[0001X . . . . . . X]
—
—
—
[0 . . . . . . . . 01X]
[0 . . . . . . . . . 01])

List for '(mantissa is zero)' is: (X0 . . . 0).

List for '(mantissa is zero)' is list for condition 1 ORed with list for condition 2.

The list calculation for 'f≧0' or (sign part is positive and mantissa is not zero) or (mantissa is zero) is:

List of n−1 cubes·OR·List of 1 cube (134)

List for 'f≧0' = ([01X . . . . . X]
[001X . . . . . X]
[0001X . . . . . . X]
— ·OR·([X0 . . . . . . 0])
—
—
[0 . . . . . . . . 01X]
[0 . . . . . . . . . 01])

List of n cubes (136)

List for 'f≧0' =( [01X . . . . . . X]
[001X . . . . . . X]
[0001X . . . . . . X]
—
—
—
[0 . . . . . . . . 01X]
[0 . . . . . . . . . 01])
[X0 . . . . . . . . 0])

Number of cubes for 'f≧0' is n cubes.

Equation (136) can be rewritten as equation (137), below.

'f≧0'=[X0 . . . 0].OR.{[0X . . . X].AND.(NOT[0 . . . 0])} (137)

Condition 5. Construction of list for 'f≦0'

'f≦0' means ((f<0).OR.(f=0))

'f≦0' means condition 3 or condition 2.

'f≦0' means (sign part is negative and mantissa is not zero) or (mantissa is zero).

List of n−1 cubes for '(sign part is negative and mantissa is not zero)' is:

List of n−1 cubes (138)

List for 'f<0' = ([11X. . . . . .X]
[101X. . . . . .X]
[1001X. . . . . .X]
—
—
—
[10. . . . . . .01X]
[10. . . . . . . .01])

List for '(mantissa is zero)' is: (X0 . . . 0).

The list calculation for 'f<0' is list for condition 3 ORed with list for condition 2.

The list calculation for 'f<0' or (sign part is negative and mantissa is not zero) or (mantissa is zero) is:

List of n−1 cubes·OR·List of 1 cube (140)

List for 'f≦0' = ([11X. . . . . .X]
[101X. . . . . .X]
[1001X. . . . . .X]
— ·OR·([X0 . . . . . . 0])
—
—
[10. . . . . . .01X]
[10. . . . . . . .01])

List of n cubes (142)

List for 'f≦0' = ([11X. . . . . .X]
[101X. . . . . .X]
[1001X. . . . . .X]
—
—
—
[10. . . . . . .01X]
[10. . . . . . . .01]
[X0. . . . . . . . .0])

Number of cubes for 'f<0' is n cubes.

Note: the above conditions of 1 to 5 are set for a 0-cube or number, which is defined as sign bit on left followed by a binary integer.

The equation (144) is for condition (f≦0), below. The equation (144) can be rewritten List for (*f*≦0)=[List for *f*<0].OR.[List for *f*=0] (144)

as equation (146), below.

$$\text{List for } (f \leqq 0) = f_n \cdot OR \cdot [\, \underset{j=1}{\overset{n}{AND}}\ f_j \,] \tag{146}$$

The time to process the equation (112) using the logic code generator 2 can be expected to be close to the same time with condition pair for (f<0) and (f≦0) or NOT(f<0) as with condition pair (f>0) and (f≦0) or NOT(f>0), because the number of cubes is 2n−1 with either condition pair and the list operation process time with the logic code generator 2 is directly dependent upon the number of cubes in the lists. From the equation (130) for condition 3 or (f<0), the number of cubes is n−1. From the equation (136) for condition 4 or (f≧0) or NOT(f<0), the number of cubes is n. From the equation (126) for condition 1 or (f>0), the number of cubes is n−1. From the equation (142) for condition 5 or (f≦0) or NOT(f>0), the number of cubes is n.

Since f is defined as 'f=x−y', the set of subtraction lists must be generated or obtained. The Fortran program in Computer Program Listing Number 3 can generate a set of lists for a low order integer subtraction. A higher order of perhaps greater than 32 significant bits will require cascading LF and Li stages, such as shown in FIG. 46. The subtraction lists of $Lf_1$ and $Lf_2$, are shown generated manually for the below simple example from the truth tables in Table 49.

Simple Example: f=x−y

Manual Creation of Lists $Lf_1$ and $Lf_2$

Table 49 shows the truth table for 'f=x−y' with f, x, and y as 2 bit integer resolution variables.

Table 50 shows the manual creation of the close boolean minimization of the list for the first bit or least significant bit of LSB for variable f.

Table 51 shows the manual creation of the close boolean minimization of the list for the second bit or most significant bit or MSB for variable f.

TABLE 52 shows the manual creation of the close boolean minimization of the list for the third bit or sign bit or list LSign for variable f.

TABLE 53 shows the manual creation of the close boolean minimization of the list for NOT Lf2 list for the most significant bit or MSB for variable f.

TABLE 54 shows the manual creation of the close boolean minimization of the list for NOT Lf1 list for the least significant bit or LSB for variable f.

TABLE 55 shows the manual creation of the close boolean minimization of the list(f=00) for variable f.

TABLE 56 shows the manual creation of the close boolean minimization of the list for NOT(list(f=00)).

TABLE 57 shows the manual creation of the close boolean minimization of the list(f>00).

TABLE 58 shows the manual creation of the close boolean minimization of the list for NOT(list(f>00)).

The lists and list operations on Tables 49 thru 50 are only shown as simple illustrations. Variables, such as 'f=x−y', with probably 8, 16, 32, and 64 resolution bits will never be represented in truth tables, but the logic code generator 2 will apply RULEs 1 thru 6, together with, the Li/LF techniques of this patent to generate list(f>0) and list(NOT(f>0) ).

TABLE 49

Present Invention
Title: Truth Table for 'f = x − y'

| | Step 1. | | | f = | | | |
|---|---|---|---|---|---|---|---|
| Variables: | x | y | | x − y | | | |
| Variable | | | | bits | | Sign | Sign |
| Representation | Decimal:Binary | | Number | $f_2$ | $f_1$ | Of f | Bit |
| | 0:00 | 0:00 | 0 | 0 | 0 | + | 1 |
| | 0:00 | 1:01 | 1 | 0 | 1 | − | 0 |
| | 0:00 | 2:10 | 2 | 1 | 0 | − | 0 |
| | 0:00 | 3:11 | 3 | 1 | 1 | − | 0 |
| | 1:01 | 0:00 | 1 | 0 | 1 | + | 1 |
| | 1:01 | 1:01 | 0 | 0 | 0 | + | 1 |
| | 1:01 | 2:10 | 1 | 0 | 1 | − | 0 |
| | 1:01 | 3:11 | 2 | 1 | 0 | − | 0 |
| | 2:10 | 0:00 | 2 | 1 | 0 | + | 1 |
| | 2:10 | 1:01 | 1 | 0 | 1 | + | 1 |

TABLE 49-continued

Present Invention
Title: Truth Table for 'f = x − y'

| | | | | | | |
|---|---|---|---|---|---|---|
| 2:10 | 2:10 | 0 | 0 | 0 | + | 1 |
| 2:10 | 3:11 | 1 | 0 | 1 | − | 0 |
| 3:11 | 0:00 | 3 | 1 | 1 | + | 1 |
| 3:11 | 1:01 | 2 | 1 | 0 | + | 1 |
| 3:11 | 2:10 | 1 | 0 | 1 | + | 1 |
| 3:11 | 3:11 | 0 | 0 | 0 | + | 1 |

TABLE 50

Present Invention
Title: Close Boolean Minimization For List For $f_1$ or $Lf_1$ Step 2. - Organize 0-Cubes Per f/Sign Binary Only

| Variables: | x MSB LSB | y MSB LSB | f = x − y |
|---|---|---|---|
| List For $f_1$ | 0 0 | 0 1 | |
| or Lf1 | 0 0 | 1 1 | = [00_X1] = 1-cube A1 |
| | 0 1 | 0 0 | |
| | 0 1 | 1 0 | = [01_X0] = 1-cube B1 |
| | 1 0 | 0 1 | |
| | 1 0 | 1 1 | = [10_X1] = 1-cube C1 |
| | 1 1 | 0 0 | |
| | 1 1 | 1 0 | = [11_X0] = 1-cube D1 |
| | 1-cubes A1 and C1 generate 2-cube: [X0_X1] | | |
| | 1-cubes B1 and D1 generate 2-cube: [X1_X0] | | |
| Lf1 is: | [X0_X1] | | |
| | [X1_X0] | | |

TABLE 51

Present Invention
Title: Close Boolean Minimization For List For $f_2$ or $Lf_2$

| Variables: | x MSB LSB | y MSB LSB | |
|---|---|---|---|
| List For $f_2$ or Lf2 | 0 0 | 1 0 | = 0-cube A2 |
| | 0 0 | 1 1 | = 0-cube B2 |
| | 0 1 | 1 1 | = 0-cube C2 |
| | 1 0 | 0 0 | = 0-cube D2 |
| | 1 1 | 0 0 | = 0-cube E2 |
| | 1 1 | 0 1 | = 0-cube F2 |
| | 0-cubes A2 and B2 generate 1-cube: [00_1X] | | |
| | 0-cubes E2 and F2 generate 1-cube: [11_0X] | | |
| Lf2 is: | [00_1X] | | |
| | [11_0X] | | |
| | [01_11] | | |
| | [10_00] | | |

TABLE 52

Present Invention
Title: Close Boolean Minimization For List For LSign

| Variables: | x MSB LSB | y MSB LSB | |
|---|---|---|---|
| List For Sign | 0 0 | 0 1 | = 0-cube A3 |
| or LSign | 0 0 | 1 0 | = 0-cube B3 |
| | 0 0 | 1 1 | = 0-cube C3 |
| | 0 1 | 1 0 | = 0-cube D3 |
| | 0 1 | 1 1 | = 0-cube E3 |
| | 1 0 | 1 1 | = 0-cube F3 |
| | 0-cubes B3 and C3 generate 1-cube G3: [00_1X] | | |
| | 0-cubes D3 and E3 generate 1-cube H3: [01_1X] | | |
| | 1-cubes G3 and H3 generate 2-cube H3: [0X_1X] | | |
| LSign is: | [0X_1X] | | |

TABLE 52-continued

Present Invention
Title: Close Boolean Minimization For List For LSign

[00_01]
[10_11]

TABLE 53

Present Invention
Title: Manual Calculation Of A Close Boolean Minimization For List For NOT($Lf_2$)

| Variables: | | x MSB LSB | y MSB LSB |
|---|---|---|---|
| List $Lf_2$ | | 0 0 | 1 X |
| | | 1 1 | 0 X |
| | | 0 1 | 1 1 |
| | | 1 0 | 0 0 |
| Step 1 | NOT($Lf_2$) = | [XX_XX] (#) | ($Lf_2$) |
| Step 2 | NOT($Lf_2$) = | [XX_XX] (#) | ([00_1X] |
| | | | [11_0X] |
| | | | [01_11] |
| | | | [10_00] |
| Step 3 | NOT($Lf_2$) = | ([1X_XX] | ([11_0X] |
| | | [01_XX] | [01_11] |
| | | [00_0X]) (#) | [10_00]) |
| Step 4 | NOT($Lf_2$) = | ([10_XX] | |
| | | [11_1X] | |
| | | [01_XX] | ([01_11] |
| | | [00_0X]) (#) | [10_00]) |
| Step 5 | NOT($Lf_2$) = | ([10_XX] | |
| | | [11_1X] | |
| | | [01_0X] | |
| | | [01_10]) (#) | [10_]00) |
| Step 6 | NOT($Lf_2$) = | ([10_1X] or | ([10_1X] |
| | | [10_01] | [01_0X] |
| | | [11_1X] | [11_1X] |
| | | [01_0X] | [00_0X] |
| | | [01_10] | [10_10] |
| | | [00_0X] | [01_10]) |

TABLE 54

Present Invention
Title: Manual Calculation Of An Close Boolean Minimization For List For NOT($Lf_1$)

| Variables: | | x MSB LSB | y MSB LSB |
|---|---|---|---|
| List $Lf_1$ | | X 0 | X 1 |
| | | X 1 | X 0 |
| Step 1 | NOT($Lf_1$) = | [XX_XX] (#) | ($Lf_1$) |
| Step 2 | NOT($Lf_1$) = | [XX_XX] (#) | ([X0_X1] |
| | | | [X1_X0] |
| Step 3 | NOT($Lf_1$) = | ([X1_XX] | |
| | | [X0_X0]) (#) | ([X1_X0]) |
| Step 4 | NOT($Lf_1$) = | ([X0_X0] | |
| | | [X1_X1]) | |

TABLE 55

Present Invention
Title: Manual Creation Of A Close Boolean Minimization For List(f = 00), where (f = 00) means (f = zero).

| Variables: | x MSB LSB | y MSB LSB |
|---|---|---|

TABLE 55-continued

Present Invention
Title: Manual Creation Of A Close Boolean Minimization For List(f = 00), where (f = 00) means (f = zero).

| | | |
|---|---|---|
| NOT($Lf_1$) | X 0 | X 0 |
| | X 1 | X 1 |
| NOT($Lf_2$) | 1 0 | 1 X |
| | 0 1 | 0 X |
| | 1 1 | 1 X |
| | 0 0 | 0 X |
| | 1 0 | 0 1 |
| | 0 1 | 1 0 |
| Step 1 List( f = 00 ) = | NOT($Lf_1$).AND.NOT($Lf_2$) | |
| Step 2 List(f = 00) = | ([X1_X1]<br>[X0_X0]).AND. | ([10_1X]<br>[01_0X]<br>[11_1X]<br>[00_0X]<br>[10_01]<br>[01_10] |
| Step 3 List(f = 00) = | ([01_01]<br>[11_11]<br>[10_10]<br>[00_00]) | |

TABLE 56

Present Invention
Title: Manual Creation Of A Close Boolean Minimization For List(f = 00), where (f = 00) means (f = zero).
Note: NOT (f=00) = List(NOT(f=00))

| Variables: | x<br>MSB LSB | y<br>MSB LSB | |
|---|---|---|---|
| List (f = 00) = | 0 1<br>1 0<br>1 1<br>0 0 | 0 1<br>1 0<br>1 1<br>0 0 | |
| Step 1 NOT(f = 00) = | [XX_XX] (#) | List(f = 00) | |
| Step 2 NOT(f = 00) = | [XX_XX] (#) | ([01_01]<br>[10_10]<br>[11_11]<br>[00_00] | |
| Step 3 NOT(f = 00) = | ([1X_XX]<br>[00_XX]<br>[01_1X]<br>[01_00]) (#) | ([10_10]<br>[11_11]<br>[00_00]) | |
| Step 4 NOT(f = 00) = | ([11_XX]<br>[10_0X]<br>[10_11]<br>[00_XX])<br>[01_1X]<br>[01_00] (#) | ([11_11]<br>[00_00]) | |
| Step 5 NOT(f = 00) = | ([11_0X]<br>[11_10]<br>[10_0X]<br>[10_11]<br>[00_XX]<br>[01_1X]<br>[01_00]) (#) | ([00_00]) | |
| Step 6 NOT(f = 00) = | ([11_0X] or<br>[11_10]<br>[10_0X]<br>[10_11]<br>[00_1X]<br>[00_01]<br>[01_1X]<br>[01_00] | ([11_0X] or<br>[10_0X]<br>[00_1X]<br>[01_1X]<br>[11_10]<br>[10_11]<br>[00_01]<br>[01_00]) | ([1X_0X]<br>[0X_1X]<br>[11_10]<br>[10_11]<br>[00_10]<br>[01_00]) |

TABLE 57

Present Invention
Title: Manual Creation Of A Close Boolean Minimization For List(f > 00), where (f > 00) means (f > zero). Note: '00' is the binary representation of the decimal representation of 0.

| Variables: | | x<br>MSB LSB | y<br>MSB LSB |
|---|---|---|---|
| NOT(f = 00) = | | 1 X<br>0 X<br>1 1<br>1 0<br>0 0<br>0 1 | 0 X<br>1 X<br>1 0<br>1 1<br>0 1<br>0 0 |
| LSign = | | 0 X<br>0 0<br>1 0 | 1 X<br>0 1<br>1 1 |
| | List (f > 00) = | List(NOT(f = 00)).AND.LSign | |
| Step 1 | List(f > 00) = | ([1X_0X]<br>[0X_1X]<br>[11_10]<br>[10_11] .AND.<br>[00_01]<br>[01_00]) | ([0X_01X]<br>[00_01]<br>[10_11]) |
| Step 2 | List(f > 00) = | ([0X_1X]<br>[00_01]<br>[10_11]) | |

TBLE 58

Present Invention
Title: Close Boolean Minimization For List(NOT(f > 00))

| Variables: | | x<br>MSB LSB | y<br>MSB LSB |
|---|---|---|---|
| List(f > 00) = | | 0 X<br>0 0<br>1 0 | 1 X<br>0 1<br>1 1 |
| Step 1 | NOT(f > 00) = | [XX_XX] (#) | ([0X_1X]<br>[00_01]<br>[10_11]) |
| Step 2 | NOT(f > 00) = | ([1X_XX]<br>[0X_0X]) (#) | ([00_01]<br>[10_11]) |
| Step 3 | NOT(f > 00) = | ([1X_XX]<br>[01_0X]<br>[00_00]) (#) | [10_11]) |
| Step 4 | NOT(f > 00) = | ([11_XX] or<br>[10_0X]<br>[10_10]<br>[01_0X]<br>[00_00]) | ([11_XX]<br>[10_0X]<br>[01_0X]<br>[10_10]<br>[00_00]) |

Figure 49:
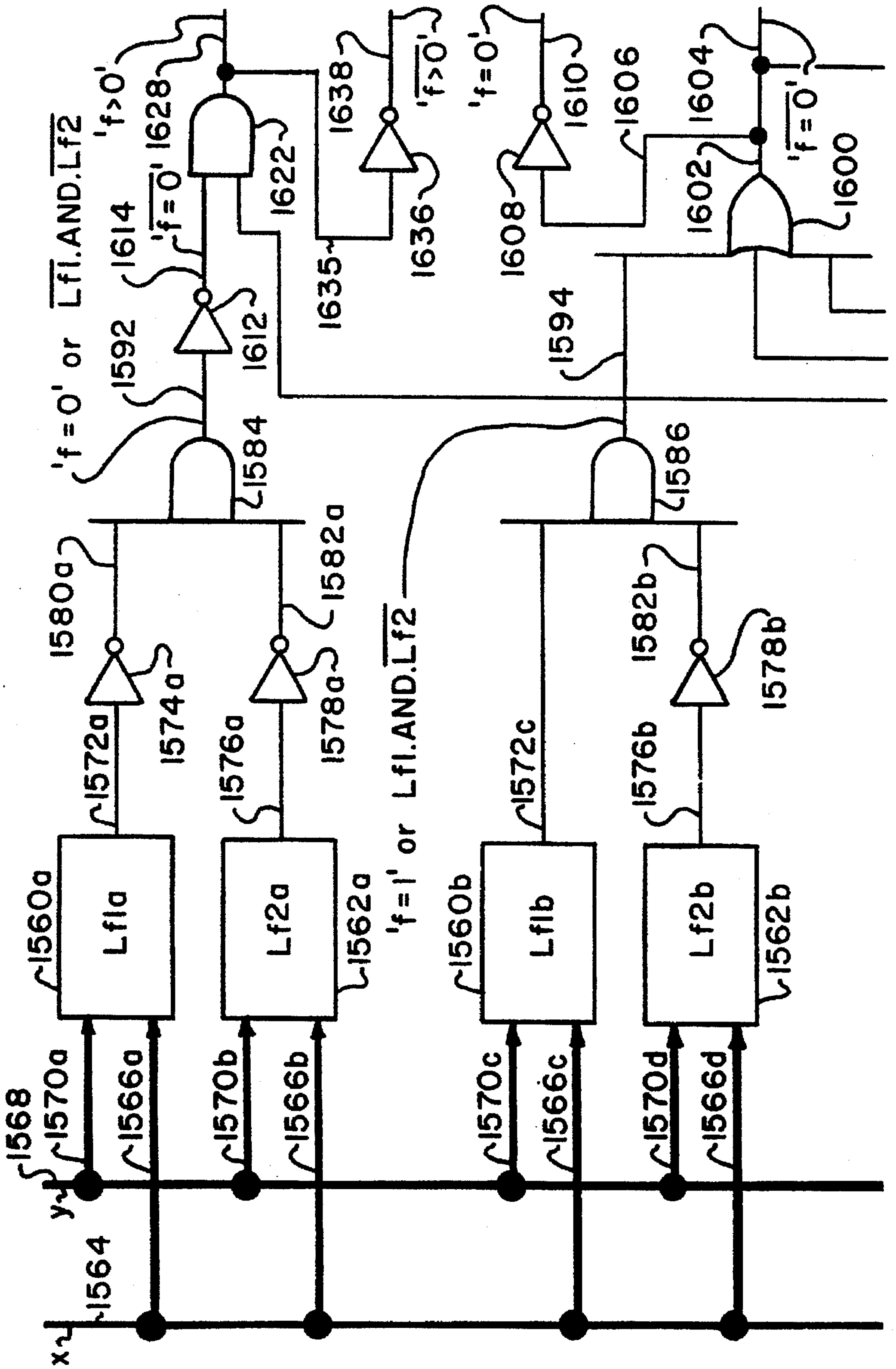
FIG. 49 is the top section of the detailed logic circuit.
Figure 50:
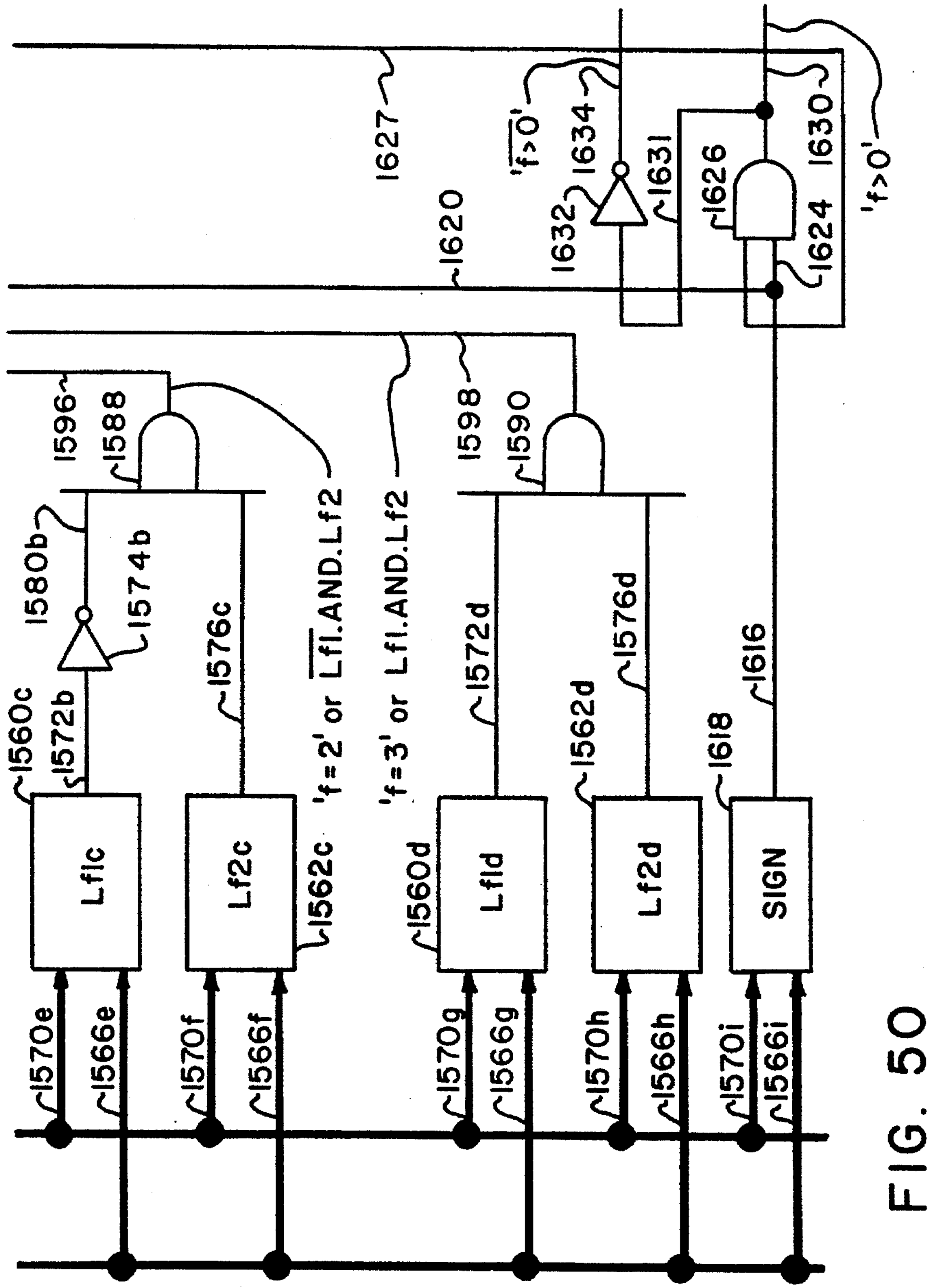
FIG. 50 is the bottom section of the detailed logic circuit.

Note:
The logic circuit is shown seperated in FIG.'s 49 and 50, where FIG. 49 is the top section and FIG. 50 is the bottom section.

The purpose of FIG.'s 49 and 50 is to show a logic circuit that generates a logic true for the conditions of 'f=0' and 'f>0', and to show for clarity why a condition of an equation, such as 'f=0', and an inequality, such as 'f>0', are represented by a single list.

As shown in FIG.'s: 49 and 50, the condition lists for 'f=0' and 'f>0', consisting of 'f=1', 'f=2', 'f=3', and 'sign=true', can be represented with digital logic circuitry. The logic code generator 2, as shown in FIG.'s: 16 and 17, will use this logic to manipulate the lists, such as list **Lf1*a* and list Lf2*a*, respectively representing Lf1*a*_circuit 1560*a* and Lf2*b*_circuit 1562*a*, as shown in FIG.'s: 49 and 50**, to form a single list for 'f=0' and a single list for 'f>0'.

The list **Lf1*a*, representing the Lf1*a*_circuit 1560*a*, and list Lf2*a*, representing the list Lf2*a*_circuit 1562*a* are the MSB and the LSB, respectively, of the decision_variable_f 1548***a*, as shown in FIG. 48, which is the subtraction of the input_variable_x 1550 minus input_variable_y 1552.

As shown in FIG. 49, variable_x_bus 1564, consisting of 2 wires, is connected to nine 2 wire buses, which are:

(1) x_LF1*a*_input_bus 1566*a,*

(2) x_Lf2*a*_input_bus 1566*b,*

(3) x_Lf1*b*_input_bus 1566*c,*

(4) x_Lf2*b*_input_bus 1566*d, and*

(5) x_Lf1*c*_input_bus 1566*e,*

(6) x_Lf2*c*_input_bus 1566*f,*

(7) x_Lf1*d*_input_bus 1566*g,*

(8) x_Lf2*d*_input_bus 1566*h,*

(9) x_sign_input_bus 1566*i.*

Variable y bus 1568, consisting of 2 wires, is connected to nine 2 wire buses, which are:

(1) y_Lf1*a*_input_bus 1570*a,*

(2) y_Lf2*a*_input_bus 1570*b,*

(3) y_Lf1*b*_input_bus 1570*c,*

(4) y_Lf2*b*_input_bus 1570*d, and*

(5) y_Lf1*c*_input_bus 1570*e,*

(6) y_Lf2*c*_input_bus 1570*f,*

(7) y_Lf1*d*_input_bus 1570*g,*

(8) y_Lf2*d*_input_bus 1570*h,*

(9) y_sign_input_bus 1570*i.*

Lf1*a*_output_wire 1572*a* inputs invert_K 1574*a* in a similar manner as Lf1*c*_output_wire 1572*b* inputs inverter_L 1574*b*.

Lf2*a*_output_wire 1576*a* inputs inverter_M 1578*a* in a similar manner as Lf2*b*_output_wire 1576*d* inputs inverter_N 1578*b*.

Inverter_K_output_wire 1580*a* and inverter_M_output_wire 1582*a* are inputs to 2_input_AND_gate_ZA_part_AA 1584.

Lf1*b*_output_wire 1572*c* and inverter_N_output_wire 1582*b* are inputs to 2_input_AND_gate_ZB_part_AI 1586.

Lf2*c*_output_wire 1576*c* and inverter_L_output_wire 1580*b* input are inputs to 2_input_AND_gate_ZC_part_AJ 1588.

Lf1*d*_output_wire 1572*d* and Lf2*d*_output_wire 1576*d* are inputs to 2_input_AND_gate_ZD_part_AK 1590.

As shown in FIG. 49, 2_input_AND_gate_ZA_part_AH_output_wire 1592, denoted with symbol 'f=0' and denoted with symbol Lf1.AND.Lf2, is represented by the single list for 'f=0' or effectively in binary number theory: f=00, as defined in equation (148).

$$\text{List}(f\text{=0 or binary 00})\text{=}(\text{NOT}(Lf2)).\text{AND}.(\text{NOT}(Lf1)) \tag{148}$$

2_input_AND_gate_ZB_Part_AI_output_wire 1594, denoted with symbol 'f=1' and denoted with symbol Lf2.AND.Lf1, is represented by the single list for 'f=1' or effectively in binary number theory: f=01, as defined in equation (150).

$$\text{List}(f\text{=1 or binary 01})\text{=}(\text{NOT}(Lf2)).\text{AND}.Lf1 \tag{150}$$

As shown in FIG.'s: 49 and 50, 2_input_AND_gate_ZC_Part_AJ_output_wire 1596, denoted with symbol 'f=2' and denoted with symbol Lf1.AND.Lf2, is represented by the single list for 'f=2' or effectively in binary number theory: f=10, as defined in equation (152)

$$\text{List}(f\text{=2 or binary 10})\text{=}Lf2.\text{AND}.(\text{NOT}(Lf1)) \tag{152}$$

2_input_AND_gate_ZD_Part_AK_output_wire 1598, denoted with symbol l'f=3' and denoted with symbol Lf2.AND.Lf1, is represented by the single list for 'f=3' or effectively in binary number theory: f=11, as defined in equation (154)

$$\text{List}(f\text{=3 or binary 11})\text{=}Lf2.\text{AND}.Lf1 \tag{154}$$

The 2_input_AND_gate_ZB_output_wire 1594 and 2_input_AND_gate_ZC_output_wire 1596 and 2_input_AND_gate_ZD_output_wire 1598 are the three inputs to OR_gate_ZA 1600.

OR_gate_ZA_output_wire 1602 of the OR_gate_ZA 1600 is represented by NOTed(list 'f=0') and connects to:

(a) NOTed(list 'f=0')_circuit_output_wire 1604 and (b) inverter_O_input_wire 1606 of inverter_O 1608.

Inverter_0_output_wire 1610 of the inverter_AC 1608 is represented by the .NOT. oflist NOTed(f=0) or list 'f=0'.

The 2_input_AND_gate_ZA_output_wire 1592 is an input to inverter_P 1612. Inverter_P_output_wire 1614, denoted with symbol 'NOT(f=0)' and denoted with symbol XX(#)(Lf1.AND.Lf2), of the inverter_AD_input_wire 1612 is represented by list NOTed(f=0) or list(NOTed(list 'f=0')).

Figure 51:
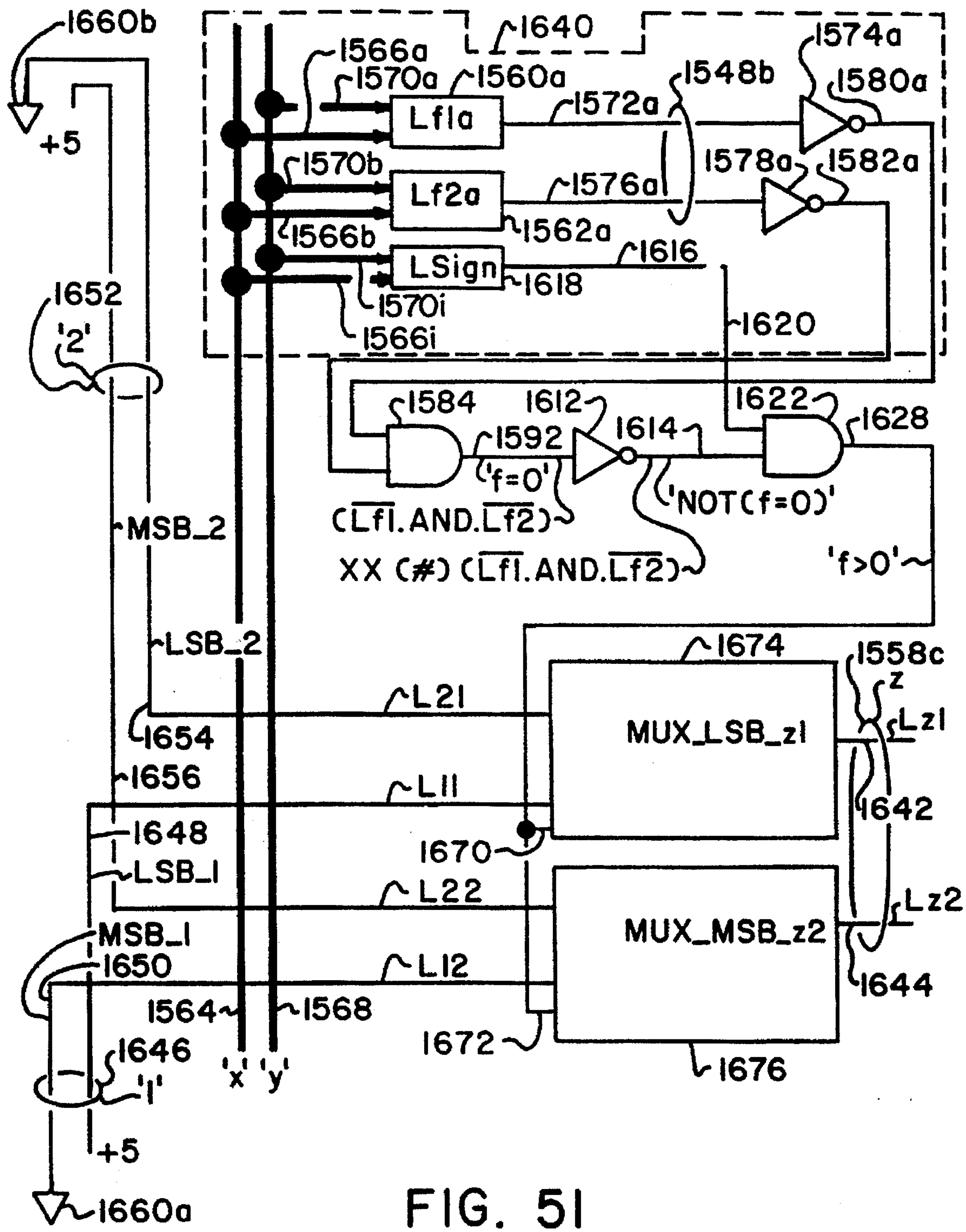
FIG. 51 shows a circuit to process a flow chart.

Sign_output_wire 1616 of sign_circuit 1618, represented by list LSign as shown in Table 59 and FIG. 51, connects to 2_input_AND_gate_AL_input_wire 1620 of 2_input_AND_gate_AL 1622 and to 2_input_AND_gate_AM_input_wire 1624 of 2_input_AND_gate_AM 1626. Note: the 2_input_AND_gate_AM_input_wire 1624 of the 2_input_AND_gate_AM 1626 is not in FIG. 51.

The 2_input_AND_gate_AM 1626 ANDs both the 2_input_AND_gate_AM_input_wire_A 1624 and 2_input_AND_gate_AM_input_wire_B 1627. The 2_input_AND_gate_AM_input_wire 1627 connects to the NOTed(list'f=0')_circuit_output_wire 1604.

List'f=0' represents:

(a) 2_input_AND_gate_AL_output_wire 1628, denoted with symbol 'f>0' and represented by list 'f>0', of the 2_input_AND_gate_Al 1622, as well as (b) 2_input_AND_gate_AM_output_wire 1630 of the 2_input_AND_gate_AM 1626.

inverter_gate_Q_input_wire 1631, connecting to the 2_input_AND_gate_AM_output_wire 1630, is the input to inverter_gate_Q 1632.

List 'Note(f>0)' represents inverter_gate_Q_output_wire 1634 of the inverter gate_gate_Q 1632.

Inverter_gate_R_input_wire 1635, connecting to the 2_input_AND_gate_AL_output_wire 1628 is the input to inverter_gate_R 1636.

List 'NOT(f>0)' also represents inverter_gate_R_output_wire 1638 of the inverter_R 1636.

The logic to produce a true output for NOT(f=0) can be produced by two different circuits. The first circuit is to use the inverter_gate_R_output_wire 1638, denoted with symbol NOT(f>0).

The second circuit to produce a true output for NOT(f>0) on the inverter_gate_Q_output_wire 1634 is:

(a) find the true outputlogic of any of all the non zero values of f, such as 'f=1', 'f=2', and 'f=3', and (b) OR the outputs for 'f>0' at the OR_gate_ZA_output_wire 1602, and (c) invert the output of 'f>0' at the 2_input_AND_gate_AM_output_wire 1630 to get NOT(f>0) at the inverter_gate_Q_output_wire 1634. This second circuit to produce a true output for NOT(f>0) is shown using the inverter_gate_Q 1632. If the logic state on the inverter_gate_Q_output_wire 1634 is true, the NOT(f>0) is true; otherwise, f>0 is true.

The best or simpliest ways to generate 'f=0' and 'f>0' is to use the logic as shown in Table 59. 'f=0' is used to find 'f>0', since 'f>0' means NOT(f=0).AND.Sign. Sign=1 means f>0.

TABLE 59

Present Invention

Title: Lists of Signed Integer Variable 'f(x,y)', Where 'f(x,y) = y-x'

All variables for FIG. 47 are 2 bit. Variable f(x,y) is represented by lists: Lf2 for MSB of f and Lf1 for LSB of f, and LSign for the sign of f, with sign equal to 1 for f > 0. List LSign would be true to represent the sign bit or wire equal to 1 or the true logic state.

Given: list Lf1 as least significant list of variable f or LSB of f, where f equals f(x,y).

List Lf1 consists of two cubes, shown directly below.

| | variables | |
|---|---|---|
| | x<br>MSB LSD | y<br>MSB LSD |
| Cube 1 | X 0 | X 1 |
| Cube 2 | X 1 | X 0 |

Given: list Lf2 as least significant list of variable f or LSB of f, where f equals f(x,y).

List Lf2 consists of four cubes, shown directly below.

| | variables | |
|---|---|---|
| | x<br>MSB LSB | y<br>MSB LSB |
| Cube 1 | 0 0 | 1 X |
| Cube 2 | 1 1 | 0 X |
| Cube 3 | 0 1 | 1 1 |
| Cube 4 | 1 0 | 0 0 |

Given: list LSign as the integer sign list of variable f or LSB of f, where f equals f(x,y).

with LSign true if f > 0

List LSign consists of three cubes, shown directly below.

| | variables | |
|---|---|---|
| | x<br>MSB LSB | y<br>MSB LSB |
| Cube 1 | 0 X | 1 X |
| Cube 2 | 0 0 | 0 1 |
| Cube 3 | 1 0 | 1 1 |

TABLE 60

Present Invention

Title: Simple Flow Chart Application And Operations Of The Logic code generator To Create The Set Of Lists Of The FIG. 46 Flowchart List Construction For Conditions

| | |
|---|---|
| Set of lists for the number 1: | List L11 is a universe cube, in accordance with Rule 2. |
| ( 2 Part/Number ) | List L12 is a null cube, in accordance with Rule 2. |
| Set of lists for the number 2: | List L21 is a null cube, in accordance with Rule 2. |
| ( 2 Part/Number ) | List L22 is a universe cube, in accordance with Rule 2. |
| List for Condition ( f = 0 ): | List for (f = 0 ) |

TABLE 60-continued

Present Invention

| | |
|---|---|
| | (NOT(Lf1)).AND.(NOT(Lf2)) |
| List for Condition (f > 0) | List for (f > 0)<br>universe cube (#) (list for (f = 0) .AND.( LSign )). XX (#) ((NOT(Lf1)).AND.(NOT(Lf2)) ).AND.(LSign) |

Note:
The universe consists of only (f < 0), (f > 0), and (f = 0) lists, with Sign = true. for 'f>0' and Sign = false for 'f < 0'.

List Construction for 'z'

$$z=(2.AND.(f=0)).OR.(1.AND.(f>0)) \quad (156)$$

List for LSB list for z is Lz1, and the MSB list or z is Lz2. Lists Lz1 and Lz2 are defined as show in equations (158) and (160).

$$Lz1=((L21.AND.(Lf1.AND.Lf2))OR.((L11.AND.(XX(\#)(Lf1.AND.Lf2))).AND.LSign) \quad (158)$$

$$Lz2=((L22.AND.(Lf1.AND.Lf2)OR.(L12.AND.(XX(\#)(Lf1.AND.Lf2))).AND.LSign) \quad (160)$$

The logic code generator 2 performs the Lzj list operations of equation (158) and equation (160).

The logical equations for Lzj, such as the equations (158) and (160), will be stored in the prelogic solving apparatus microcomputer. In preparing to generate the list Lzj, such as list Lz1, defined in the equation (158), the logic code generator 2 needs to first either generate or obtain the set of lists Lf1 to LfN, which represent an integer subtraction circuit. The set will be provided for in perhaps 4 bit, 8 bit, and 16 bit sets with a carry list, although the logic code generator 2 can take two 4 bit subtractors and transform or generate an 8 bit set of lists, utilizing FIG. 18 and FIG. 46.

To generate the resultant list for list (NOT(Lf1)).AND.(NOT(Lf2)), the logic code generator 2 will send list Lf1 to the CINV 580. The output of the CINV 580 is NOT(Lf1), which the logic code generator 2 puts into RAM 322. The logic code generator 2 sends list Lf2 the CINV 5480, and puts the output list NOT(Lf2) into the RAM 322. The logic code generator 2 will then send each cube of NOT(Lf2) to be ANDed with all the cubes of NOT(Lf1). The resultant list, stored in the RAM 322, will be sent to the CINV 580 twice, to become a close boolean minimization. The resultant list (NOT(Lf1).AND.NOT(Lf2)), in a close boolean minimization, will be stored in the RAM 322 for future use. The logic code generator 2 will then take a copy of list (NOT(Lf1).AND.NOT(Lf2)) and put into the CINV 580. THe output or list (XX (#)(NOT(Lf1).AND.NOT(Lf2))) will be a close boolean minimization and will be sent to the RAM 322 by the the logic code generator 2.

The logic circuitry, as shown in FIG. 51, is represented by the flowchart of FIG. 48. As shown in FIG. 51, a logic_circuit 1640, is both (a) denoted in dotted lines, contains some circuitry of FIG.'s: 49 and 50, and (b) denoted with item numbers from 1564 to 1638. The output_variable_z_=right side of equation (112) 1558*c*, as shown in FIG. 51, came from FIG. 48, and is the z bus and consists of:

(a) Lz1_wire 1642, represented by list Lz1, and (b) Lz2_wire 1644, represented by list Lz2.

Number buses consist of:

(1) the number 1 in a binary representation on bus_1 1646, denoted with symbol '1' and consisting of:

(a) bus_1_LSB_wire 1648, denoted with symbol LSB_1, and (b) bus_1_MSB_wire 1650, denoted with symbol MSB_1, and (2) the number 2 in a binary representation on bus_2 1652, denoted with symbol '2' and consisting of:

(a) bus_2_LSB_wire 1654, denoted with symbol LSB_2, and (b) bus_2_MSB_wire 1656, denoted with symbol MSB_2.

In order for the bus_1 1646 to contain the binary number of 1, both (a) and (b) conditions must be true, such as:

(a) the bus_1_LSB_wire 1648 must be connected to +5 volts, and (b) the bus_1_MSB_wire 1650 must be connected to GND_terminal_bus_1_A 1660*a*, denoted with inverter arrow GND symbol.

List symbol L11, representing the bus_1_LSB_wire 1648, must consist of a universe cube or [XX] in order for the logic voltage to forever be +5 volts.

List symbol L12, representing the bus_1_MSB_wire 1650, must consist of a null cube in order for the logic voltage to never be +5 bolts.

In order for the bus_2 1652 to contain the binary number of 2, (a)the bus_2_LSB_wire 1654 must be connected to GND_terminal_bus_1_B 1660*b*, denoted with inverted arrow GND symbol, and (b) the bus_2_MSB_wire 1656 must be connected to +5 volts.

List symbol L21, representing the bus_2_LSB_wire 1654 must consist of a null cube in order for the logic voltage to never be +5 volts.

List symbol L22, representing the bus_2_MSB_wire 1656 must consist of a universe cube or [XX] in order for the logic voltage to forever be +5 volts.

The 2_input_AND_gate_ZE_output_wire 1628 connects to both MUX_LSB_z1_control_wire 1670 and MUX_MSB_z2_control_wire 1672.

A true logic voltage on the MUX_LSB_z1_control_wire 1670 will switch MUX_LSB_z1 1674 to connect the bus_1_LSB_wire 1648, represented with list L11, to the Lz1_wire 1642, represented with list Lz1.

A false logic voltage on the MUX_LSB_z1_control_wire 1670 will switch the MUX_LSB_z1 1674 to connect the bus_2_LSB_wire 1654, represented with list L21, to the Lz1_wire 1642, represented with list Lz1.

A true logic voltage on the MUX_MSB_z2_control_wire 1672 will switch the MUX_MSB_z2 1676, to connect the bus_1_MSB_wire 1560, represented with list L12, to the Lz2_wire 1644, represented with list Lz2.

A false logic voltage on the MUX_MSB_z2_control_wire 1672 will switch the MUX_MSB_z2 1676 to connect the bus_2_MSB_wire 1656, represented with list L22, to the Lz2_wire 1644, represented with list Lz2.

As presented in FIG. 48, the output_variable_z_=right side of equation (112) 1558*c* is equal to 1 if the condition of 'f>0' is true or else equal to 2 if 'f>0' is false.

As shown in FIG. 51, the output_variable_z_=right side of equation (112) 1558*c* will contain:

a binary value of 1 if the 2_input_AND_gate_ZE_output_wire 1628 contains +5 volts or a true logic state, which switches both:

(a) the MUX_LSB_z1 1674 to connect the bus_1_LSB_wire 1648, represented with list L11, to the Lz1_wire 1642, represented with list Lz1, and (b) MUX_MSB_z2 1676 to connect the bus_2_MSB_wire 1656, represented with list L22, to the z2_wire 1644, represented with list Lz2, or a binary value of 2 if the 2_input_AND_gate_ZE_output_wire 1628, represented by list 'f>0', contains 0 volts or a false logic stae, which switches both:

(a) the MUX_LSB_z1 1674 to connect the bus_2_LSB_wire 1654, represented with list L21, to the Lz1_wire 1642, represented with list Lz1, (b) the MUX_MSB_z2 1676 to connect the bus_1_MSB_wire 1650, represented with list L12, to the Lz2_wire 1644, represented with list Lz2.

The logic code generator 2 performs all list operations, accordingt to flowcharts, such as the FIG. 48 flowchart, arbitrary mathematical functions and equations with or without constraints and logical operations, such as the logic circuitry in FIG. 48. The output list or set of lists from the logic code generator 2 could be programmed into generalized programmable logic arrays or PLAs for fast processing or writeable circuits to be described in FIG.'s 53 to 56.

The logic code generator 2 will store a single null cube representing a part of the output_variable_z_=right side of equation (112) 1558*c*, in the RAM 322 and perhaps call this output list LA. Then the logic code generator will send list L11, which is a universe cube of XX, to the FIG. 22 circuit to be ANDed with each cube of list (XX(#)(NOT(Lf1)).AND.(NOT(Lf2)))). The resultant list is sent to the RAM 322, as perhaps output list LB. The logic code generator will OR both lists LA with LB by putting the result Lz1 as list LA followed by list LB in the RAM 322. If the number of cubes in list Lz1 is large or if the number of the number of cubes in list LB is greater than perhaps 10, the logic code generator will send list Lz1 thru the CINV 580 twice to become a close boolean minimization. List Lz2 is next found in a similar method.

Note: if the FIG. 22 AND circuit had both universe cube and null cube detectors connected to the inputs of the FIG. 22, the logic code generator could save processing time.

Note: the integratoin of forming the logic equations to represent the 'z' bus of FIG. 51, such as list Lz1=A.OR.B or (L21.AND.(Lf1.AND.Lf2).OR.(L11.OR.(XX(#)(Lf1.AND.Lf2)))) will require a little development of a PLA controller.

- Jump Down One Function Flow Chart Or Non Linear z(x) -

Figure 52:
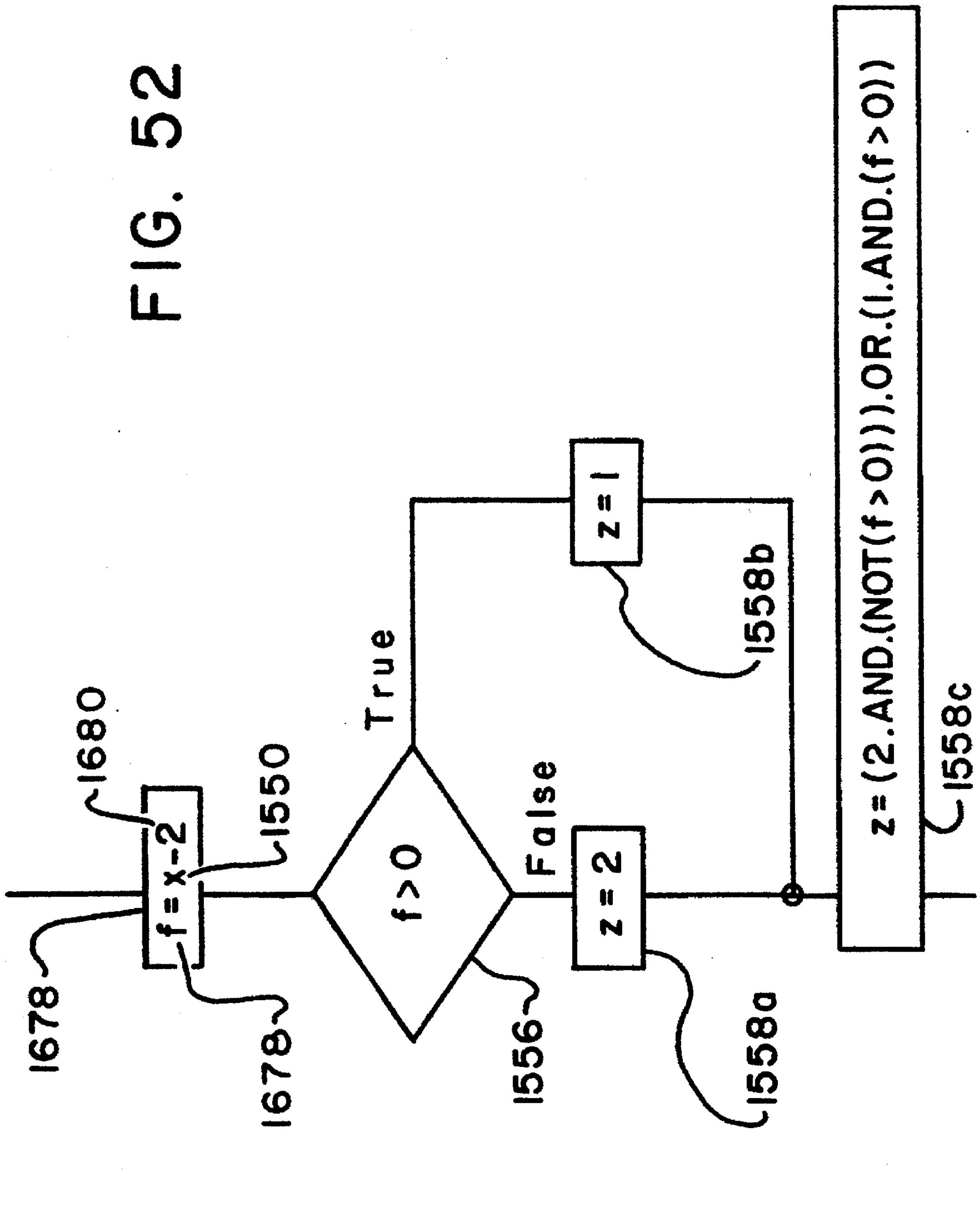
FIG. 52 shows a flow chart.

A simplified 'Jump Down' flow chart routine is shown in FIG. 52. The difference between the function handled in FIG.'s 48 thru 51 and the function handled in FIG. 52 is: FIG.'s 48 thru 51 handle a function of two variables or x & y, while FIG. 52 handles a function of one variable or x. As shown in FIG. 52, the flow chart consists of three steps, such as step_1B_instruction 1678, denoted with symbol f=x−2. As in FIG. 48 and FIG. 52, f is decision_variable_f 1548*a*, x is input_variable_y 1550, and 2 as limit_varaible 1680 replaces y as input_variable_y 1552. If the jump_down_decision 1556, denoted with a diamond shaped decision symbol and denoted with symbol Step 2, were true, the output_variable_z_=2 1558*a*, denoted with symbol Step 3, would be '1'. If the jump_down_decisoin 1556, denoted with a diamond shaped decision symbol, were false, the output_variable_z_=2 1558*a* would be '2'. The jump_down_decision 1556, denoted with a diamond shaped decison symbol, and the two numerical values of the output_variable_z_=2 1558*a* and the output_variable_z_=_1

**1558*b* can be combined in equation (162). All variables, such as the output_variable_z_=right side of equation (112) 1558*c*** is represented as a set of lists, while $$z=(2.AND.(.NOT.(f>0))).OR.(1.AND.(f>0)) \quad (162)$$

conditions, such as 'f>0' in the jump_down_decision 1556, denoted with a diamond shaped decision symbol, are represented with only one list of cubes. The output_variable_z_=right side of equation (112) **1558*c***, denoted with symbol of the equation (162), equals 2 if NOT(f>0) is met or else 1 if (f>0) is met.

To generate the set of lists for the output_variable_z_=right side of equation (112) **1558*c*, the single list representing the jump_down_decision 1556**, denoted with a diamond shaped decision symbol, must be generated first.

List construction for conditions has been shown in Table 48.

Since f is defined as 'f=x–2', the set of subtraction lists must be generated or obtained. The Fortran program in Computer Program Listing Number 3 can generate a set of lists for a low order integer subtraction. A higher order of perhaps greater than 32 significant bits will require cascading LF and Li stages, such as shown in FIG. 46. The subtraction lists of $Lf_1$ and $Lf_2$, are shown generated manually for the below simple example from the truth tables in Table 61.

Simple Example:

$$f=x-2 \quad (164)$$

- Manual Creation Of $f_j$ lists -

Table 61 shows the truth table for 'f=x–y' with f, x, and y as 2 bit integer resolution variables.

TABLE 62 shows the manual creation of the close boolean minimization of the list for the first bit or least significatn bit or LSB for variable f.

TABLE 63 shows the manula creation of the close boolean minimization of the list for the second bit or more significant bit or MSB for variable f.

TABLE 64 lshows the manual creation of the close boolean minimization of the list for the third bit or sign bit or list LSign for variable f.

TABLE 65 shows the manual creation of the close boolean minimization of the list for the list(NOT($Lf_2$)) list for the most significatn bit or MSB for variable f.

TABLE 66 shows the manual creation of the close boolean minimization of the list for the list(NOT($Lf_1$)) list for the least significant bit or LSB for variable f.

TABLE 67 shows the manual creation of the close boolean minimization of the list(f=00) for variable f.

TABLE 68 shows the manual creation of the close boolean minimization of the list for NOT(list(f=00)).

TABLE 69 shows the manual creation of the close boolean minimization of the list(f>00).

TABLE 70 shows the manual creation of the close boolean minimization of the list for NOT(list(f>0)).

The lists and list operations on Tables 61 thru 70 are only shown as simple illustrations. Variables, such as 'f=x–y', with probably 8, 16, 32, and 64 resolution bits will never be represented in truth tables, but the logic code generator 2 will apply RULEs 1 thru 6, to gether with ,the Li/LF techniques of this patent to generate list(f>0) and list(NOT (f>0)).

TABLE 61

Present Invention
Title: Truth Table for 'f=x–(y=2)'

| Step 1. Variables: | x | y=2 | f = x – (y = 2) | | | | |
|---|---|---|---|---|---|---|---|
| Variable Representation Decimal:Binary | | | Number | 2 Bits $f_2$ | $f_1$ | Sign | Sign Bit |
| | 0:00 | 2:10 | 2 | 1 | 0 | – | 0 |
| | 1:01 | 2:10 | 1 | 0 | 1 | – | 0 |
| | 2:10 | 2:10 | 0 | 0 | 0 | + | 1 |
| | 3:11 | 2:10 | 1 | 0 | 1 | + | 1 |

TABLE 62

Presetn Invention
Title: Manual Creation Of A Close Boolean Minimazation For List For $f_1$ or $Lf_1$ Step 2. - Organize 0-Cubes Per $f_j$/Sign Binary Only

| Variables: | x | y = 2 | f = x – (y = 2) |
|---|---|---|---|
| | MSB LSB | MSB LSB | |
| List For $f_1$ or Lf1 | 0 1 | 1 0 | = 0-cube A4 |
| | 1 1 | 1 0 | = 0-cube B4 |
| | 0-cubes A4 and B4 generate 1-cube: [X1_10] | | |
| Lf1 is: | [x1_10] | | |

TABLE 63

Present Invention
Title: Manual Creation Of A Close Boolean Minimization For List For $f_2$ or $Lf_2$

| Variables: | x | y = 2 | |
|---|---|---|---|
| | MSB LSB | MSB LSB | |
| List For $f_2$ or Lf2 | 0 0 | 1 0 | = 0-cube A5 |
| Lf2 is: | [00_10] | | |

TABLE 64

Present Invention
Title: Manual Creation Of A Close Boolean Minimization For List For LSign

| Variables: | x | y = 2 | |
|---|---|---|---|
| | MSB LSB | MSB LSB | |
| List For Sign or LSign | 1 0 | 1 0 | = 0-cube A6 |
| | 1 1 | 1 0 | = 0-cube B6 |
| | 0-cubes A6 and B6 generate 1-cube:[1X_10] | | |
| LSign is: | [1X_10] | | |

TABLE 65

Present Invention
Title: Manual Calculation Of A Close Boolean Minimization For List For NOT($Lf_2$)

| Variables: | x | y = 2 |
|---|---|---|
| | MSB LSB | MSB LSB |
| List $Lf_2$ | 0 0 | 1 0 |

| | | |
|---|---|---|
| Step 1 | NOT($Lf_2$) = | [XX_XX] (#) ($Lf_2$) |
| Step 2 | NOT($Lf_2$) = | [XX_XX] (#) ([00_10] |
| Step 3 | NOT($Lf_2$) = | ([1X_XX] |
| | | [01_XX] |

TABLE 65-continued

| Present Invention<br>Title: Manual Calculation Of A Close Boolean Minimization For List For NOT($Lf_2$) |
|---|
| [00_0X]<br>[00_11]) |

TABLE 66

| Present Invention<br>Title: Manual Calculation Of A Close Boolean Minimization For List For NOT($Lf_1$) | | | |
|---|---|---|---|
| Variables: | | x<br>MSB LSB | y = 2<br>MSB LSB |
| List $Lf_1$ | | X 1 | 1 0 |
| Step 1 | NOT($Lf_1$) = | [XX_XX] (#) ($Lf_1$) | |
| Step 2 | NOT($Lf_1$) = | [XX_XX] (#) ([X1_10]) | |
| Step 3 | NOT($Lf_1$) = | ([X0_XX]<br>[X1_0X]<br>[X1_11]) | |

TABLE 67

| Present Invention<br>Title: Close Boolean Minimization For List(f = 00) | | | |
|---|---|---|---|
| | Variables: | x<br>MSB LSB | y = 2<br>MSB LSB |
| | NOT($Lf_1$) = | X 0<br>X 1<br>X 1 | X X<br>0 X<br>1 1 |
| | NOT($Lf_2$) = | 1 X<br>0 1<br>0 0 | X X<br>X X<br>0 X |
| Step 1 | List(f = 00) = | NOT($Lf_1$).AND.NOT($Lf_2$) | |
| Step 2 | LIST(f = 00) = | ([X0_XX]<br>[X1_0X]<br>[X1_11]).AND. | ([1X_XX]<br>[01_XX]<br>[00_0x] |
| Step 3 | List(f = 00) = | ([10_XX]<br>[00_0X]<br>[11_0X]<br>[01_0X]<br>[11_11]<br>[01_11]) | |
| Step 4 | List(f = 00) = | ([10_XX]<br>[00_0X]<br>[X1_0X]<br>[X1_11]) or | ([10_XX]<br>[X1_0X]<br>[00_0X]<br>[X1_11]) |

TABLE 68

| Present Invention | | | | | |
|---|---|---|---|---|---|
| Title: | Close Boolean Minimization For List (NOT(f=00)) | | | | |
| Variables: | | x | | y=2 | |
| | | MSB | LSB | MSB | LSB |
| | List(f=00) = | 1 | 0 | X | X |
| | | X | 1 | 0 | X |
| | | 0 | 0 | 0 | X |
| | | X | 1 | 1 | 1 |
| Step 1 | NOT(f=00) = | [XX_XX](#)List(f=00) | | | |
| Step 2 | NOT(f=00) = | [XX_XX](#) | ([10_XX]<br>[X1_0X]<br>[00_0X]<br>[X1_11]) | | |
| Step 3 | NOT(f=00) = | ([0X_XX]<br>[11_XX])(#) | ([X1_0X]<br>[00_0X] | | |

TABLE 68-continued

| | | |
|---|---|---|
| | [X1_11]) | |
| Step 4 NOT(f=00) = | ([00_XX]<br>[01_1X]<br>[11_1X])(#) | ([00_0X]<br>[X1_11]) |
| Step 5 NOT(f=00) = | ([00_1X]<br>[X1_1X])(#) | [X1_11]) |
| Step 6 NOT(f=00) = | ([00_1X]<br>[X1_10]) | or ([X1_10]<br>[00_1X]) |

TABLE 69

| Present Invention | | | | | | |
|---|---|---|---|---|---|---|
| Title: | | Close Boolean Minimization For List (f>00) | | | | |
| Variables: | | | x | | y=2 | |
| | | | MSB | LSB | MSB | LSB |
| | | NOT(f=00) = | X | 1 | 1 | 0 |
| | | | 0 | 0 | 1 | X |
| | | LSign = | 1 | X | 1 | 0 |
| | | List(f>00) = | List(NOT(f=00).AND.LSign | | | |
| | Step 1 | List(f>00) = | ([X1_10]<br>[00_1X]).AND.([1X_10]) | | | |
| | Step 2 | List(f>00) = | ([11_10]) | | | |

TABLE 70

| Present Invention | | | | | | |
|---|---|---|---|---|---|---|
| Title: | | Close Boolean Minimization For List (NOT(f>00)) | | | | |
| Variables: | | | x | | y | |
| | | | MSB | LSB | MSB | LSB |
| | | List(f>00) = | 1 | 1 | 1 | 0 |
| | Step 1 | NOT(f>00) = | [XX_XX](#)([11_10]) | | | |
| | Step 2 | NOT(f>00) = | ([0X_XX]<br>[10_XX]<br>[11_0X]<br>[11_11]) | | | |

According to RULE 2, the set of lists for the binary representation of the number 2 or 10 is ∪N, where ∪ is is a universe list and N is a null list. ∪N means a null list is the list for part 1 or least significant part and a universe list for part 2 or most significant part. If the number of significant bits is 2, then the ∪ is a universe cube or [XX] and the N is a null cube or [null null] or [NN] or in a 2 bits per part representation: [00_00].

Basic Application Of Logic code generator And Coprocessor As A Peripheral To An End User's Computer Or Personal/ Professional Computer.

A computer system, consisting of a resident computer with a terminal and a key board and connected to a computer bus or local area network (LAN) with connected logic solving apparatuss, such as the logic code generator 2, with LAN communication circuitry, will process the FIG. 52 flowchart as described below.

As shown in FIG. 52 upon receiving the step_1B_ instruction 1678, the resident computer will give a logic code generator comand to instruct the next available logic code generator to generate a set of lists of 2n+2 parts for the f 1548 with the x 1550 being an input variable on a n+1 parts variable bus and with the limit_number 1680, being a fixed number on the other n+1 parts variable bus. The resultant output set of lists can be cube integers or cube floating point variables. The designated logic code generator will proceed with the task until completed, independent of tasks being performed by other utiliized logic solving apparatuss.

Upon receiving the function of equation (165) with $z=f_1(x)$, such as $$z=2 \tag{165}$$

the resident computer will give a logic code generator command to instruct
the next available logic code generator to generate a set of lists of n+1 parts for the output_variable_z_=_2 **1558*a* with z=2, with the x 1550** being an input variable on a n+1 variable bus. The resultant output set of lists can be integer or floating point cubes.

Upon receiving the function of equation (166) with $y=f_2(z)$, $$y=f_2(z) \tag{166}$$

the resident computer will give a logic code generator command to instruct the next available logic code generator to generate a set of list of n+1 parts for the $f_2(z)$ **283*b* with the z 280** being an input variable on a n+1 variable bus. The resultant output set of lists can be integer or floating point cubes.

Upon receiving the set of lists for the f 282 from the first utilized logic code generator, the resident computer will give a logic code generator command to instruct the next available logic code generator to generate a single list for the first of two conditions being equation (167).

$$f<0 \tag{167}$$

The resultant single list will contain either integer or floating point cubes.

Upon receiving the set of lists for the f 282 and having given the command to generate the single list for the equation (167), the resident computer will give a logic code generator command to instruct the next available logic code generator to generate a single list for the second of two conditions being equation (168). The resultant $$f\geqq 0 \tag{168}$$

single list will be either integer or floating point cubes.

Upon receiving the single list for the equation (167) and set of lists for the function in the equation (164), the resident computer will give a logic code generator command to instruct the next available logic code generator to generate the set of lists for equation (170).

$$y=f_1(z).AND.[f<0] \tag{170}$$

Upon receiving the single list for the equation (168) and set of lists for the function in the equation (166), the resident computer will give a logic code generator command to instruct the next available logic code generator to generate the set of lists for equation (172)

$$y=f_2(z).AND.[f\geqq 0] \tag{172}$$

Upon receiving the set of lists for the function of the equation (170) and the set of lists for the function of the equation (172), the resident computer will give a logic code generator command to instruct the next available logic code generator to generate the set of lists for the function of the equation in the output_variable_z_=right side of equation (112) **1558*c*, in FIG. 52**. The resultant set of lists of n+1 parts will be either integer or floating point cubes.

To understand one and two variable input cubes to generate sets of lists for the equations (164), and (166), TABLE 82 is provided to illustrate cubes in list(z).

TABLE 71

| Present Invention | | |
|---|---|---|
| Title: | Comparison Of Input Lists For One And Two Variable Functions. | |
| | Function of One Variable | Function of Two Variables |
| | Function = $f_q(z)$ | Function = $f_r(z, 100)$ |
| | Example: z | Example: z ± 100 |
| | | Variable ± Number |
| | Cubes for $f_q(z)$ are created according to: | Cubes for $f_r(z, 100)$ are created according to: |
| | Rule 1 for Input Cubes | Rule 1 for Input Cubes |
| | --------- z --------- | ----- z ----- ----100--- |
| Variable | Part Position | Part Position |
| Bus | 0 5 1 | 2n n+5 n+1 n 1 |
| Least Significant Part or Part 1: | | |
| | X....................X1 | X..........X1 X........X |
| Part 5: | X.........X1X.........X | X.....X1X..X X........X |
| Most Significant Part or Part n: | | |
| | 1X....................X | 1X..........X X........X |
| | Rule 2 for Input Cubes: | Rule 2 for Input Cubes: |
| Any Wire or Part With a 0: | | |
| | N....................N | X...........X N........N |
| These above cubes, in accordance with RULE 4, become: | | |
| | N....................N | N.......................N |
| Any Wire or Part With a 1: | | |
| | X....................X | X..........X X........X |

TABLE 72

| Present Invention | | |
|---|---|---|
| Title: | Comparison Of Input Lists For One And Two Variable Functions. | |
| | Function of One Variable | Function of Two Variables |
| | Function = $f_q(z)$ | Function = $f_r(z, 100)$ |
| | Example: z | Example: 100 ± z |
| | | Number minus Variable |
| | Cubes for $f_q(z)$ are created according to: | Cubes for $f_r(z, 100)$ are created according to: |
| | Rule 1 for Input Cubes | Rule 1 for Input Cubes |
| Bus: | --------- z --------- | ---- 100 ----- ---- z ---- |
| Variable | Part Position | Part Position |
| Bus | 0 5 1 | 2n n+5 n+1 n 5 1 |
| Least Significant Part or Part 1: | | |
| | X....................X1 | X...........X X.......X1 |
| Part 5: | X.........X1X.........X | X...........X X...X1X..X |
| Most Significant Part or n: | | |
| | 1X....................X | X...........X 1X.......X |
| | Rule 2 for Input Cubes: | Rule 2 for Input Cubes: |
| Any Wire or Part With a 0: | | |
| | N....................N | N...........N X........X |
| These above cubes, in accordance with RULE 4, become: | | |
| | N....................N | N.......................N |
| Any Wire or Part With a 1: | | |
| | X....................X | X...........X X........X |

TABLE 73

| Present Invention | | | | | |
|---|---|---|---|---|---|
| Title: | Lists For Five Variable Function<br>Parts Used Per $s_j$ Set Of List Cube Instructions | | | | |
| Input Variables: | w | a0 | a1 | a2 | a3 |
| Bus Wires or | $w_n \ldots w_1$ | $a_{0n} \ldots a_{01}$ | $a_{1n} \ldots a_{11}$ | $a_{2n} \ldots a_{21}$ | $a_{3n} \ldots a_{31}$ |

TABLE 73-continued

| List Width | | | | | | |
|---|---|---|---|---|---|---|
| $s_0$ | | X.....X | $a_{0n}...a_{01}$ | X...........................X | | |
| $s_1$ | | $w_n.....w_1$ | X.......X | $a_{1n}...a_{11}$ | X.................X | |
| $s_2$ | | $w_n.....w_1$ | X.................X | | $a_{2n}...a_{21}$ | X.......X |
| | — | | | | | |
| | — | | | | | |
| | — | | | | | |
| y | | $w_n.....w_1$ | $a_{0n}...a_{01}$ | $a_{1n}...a_{11}$ | $a_{2n}...a_{21}$ | $a_{3n}...a_{31}$ |

The integer multiplication, integer division, and the four floating point functions use prior art circuitry for generating the set of lists per function, such as the add and subtract operations, described in this patent.

A power series example, using the logic code generator 2, upon receiving coefficients of the required resolution, such as 32 bits floating point for the resolution of the output variable y, can generate the set of lists of the output variable y in $$y=a_o+a_1w+a_2w^2+a_3w^3+a_4w^4+ \qquad (174)$$

equation (174). Both the output variable y and the input variable w can be considered 32 bit floating point variables with the coefficients $a_o$, $a_1$, $a_2$, . . . being each 32 bit floating point constants. A list of cubes in terms of n parts is generated fo reach resolution bit of y. If w is a 32 bit floating point variable, a cube of w has 32 parts. The equation (174) can be separated into section equations, denoted as $s_j$, called equation (176), below.

$$s_j=a_jw^j,\ \text{for } j=0, 1, 2, \qquad (176)$$

A set of lists for the equation (178) must be generated before a set of lists for the equation (176) can be created. When the set of lists per each $s_j$ is generated, the cube instruction of the non X parts to be operated on remains constant in width and the width of the y cube instructions are vey wide unless the $a_j$ constants are fixed numbers, as shown in Table 73, below. If $a_o$ is a variable bus, the only cube in the list for $a_{oj}$ will have a 1 in the jth part and a X in all the other parts, according to RULE 1. If $a_o$ is a fixed value of 1X . . . X, then the only cube in the list for $a_{on}$ will be a universe cube or X . . . X, according to RULE 2.

Mathematical knowledge that a logic code generator in the above computer system must know if the $f_1(z)$ 283*a*, in FIG. 23, were $z^{3.54}$ is provided below.

Since the function $z^{3.54}$ can be described as a $a^x$ power series, as in equation (178), below, and the $\log_e a$ can be described as another power series, as in equation (180), $$a^x=1+x\log_e a+(x\log_e a)^{+2}/2!+\ldots+(x\log_e a)^j/j!.+.. \qquad (178)$$

$$\log_e a= 2\,(((a-1)/(a+1))^2+ \qquad (180)$$
$$+(1/3)(((a-1)/(a+1))^3$$
$$+(1/5)(((a-1)/(a+1))^5+\ldots)$$

with a=z and x=3.54. The steps for the logic code generator to use to eventually generate the set of lists for $z^{3.54}$ to send to the resident computer are below:

1. generate set of lists for a−1, subtration required,
2. generate set of lists for a+1, addition required,
3. generate set of lists for [(a−1)/(a+1)], division required,
4. generate set of lists for the power series equation (180), multiplication and addition required, and
5. generate set of lists for the power series equation (178), multiplication and . addition required.

The set of lists for $a^x$ and sets for many other general type functions can be used by every logic code generator to rapidly generate sets of lists for non general applications for resident computers rather than having the utilized logic code generator regenerate the sets from scratch every time.

Why Use The Programmable ICs In The Coprocessor Or The Coprocessor 4

- Test Time Advantage -

The programmable IC is tested with a list of cubes in a close boolean minimization. This list for testing is the exact list of cubes stored in the programmable IC. An estimated time for the test of a programmable IC with a list containing $2^{(2\times 32)}$ or about ten billion billion numbers could be on average $10^{-9}$ seconds for 100 cubes. PLAS, ROMs, and RAMs can only be tested with 0-cubes, which are numbers, in a time of 300+ years at a clock of 1 GHz. Calculation $2^{(2\times 32)}\times$(1 second/$10^{+9}$ ns)×(1 hour/3600 seconds)×1 day/24 hours)×(1 year/365 days)=300 + years. Since no company will manufacture a product that it can not fully test, only the programmable IC will be manufactured.

The set of lists, created by the logic code geneartor 2, are:

(1) written into, (2) stored into, and (3) processed at look up table speed in programmable ICs, which are only described in this present invention.

Figure 53:
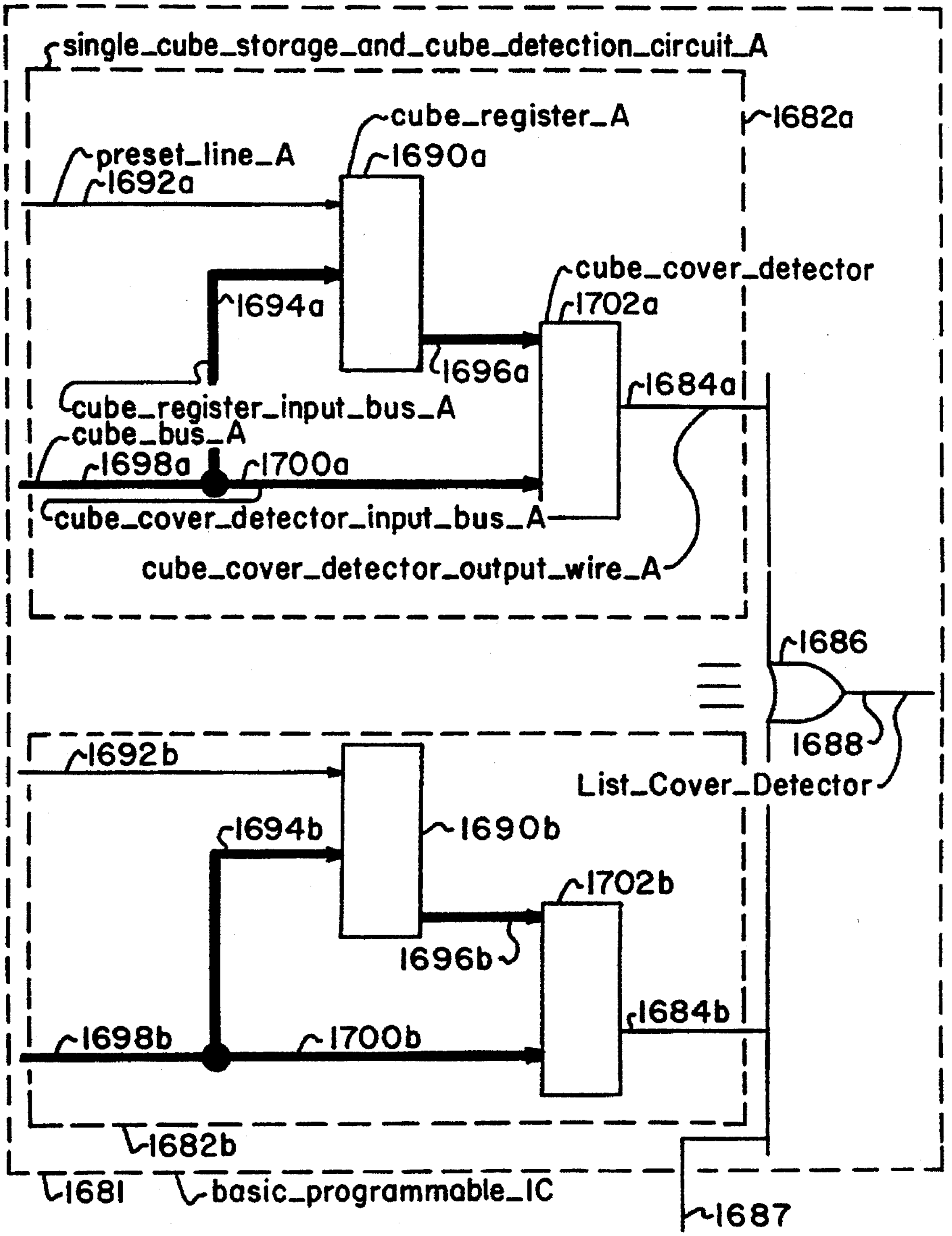
FIG. 53 shows a basic programmable IC.

The basic sketch of the programmable IC structure is shown in FIG. 53. A basic_programmable_IC 1681, denoted with dotted lines, consists of one or more single_cube_storage_and_cube_detection_circuits, such as single_cube_storage_and_cube_detection_circuit_A 1682*a*, to range to single_cube_storage_and_cube_detection_circuit_B 1682*b*, which are terminated with outputs, such as cube_cover_detector_output_line_A 1684*a*, to range to cube_cover_detector_output_line_B 1684*b*, which inputs to many input OR gate 1686 with many input OR gate output line 1688.

An expansion input 1687 to said many input OR gate 1686 provides the benefit of having the boolean list stored within said basic_progammable_IC 1681 cover additional boolean 0-cubes.

Each single_cube_storage_and_cube_detection_circuits, such as the single_cube_storage_and_cube_detection_circuit_A 1682*a* to range to the single_cube_storage_and_cube_detection_circuit_B 1682*b* consists of a cube register, such as a cube register, such as cube_register_A 1690*a*, to range to cube_register_B 1690*b*, with two inputs, which are:

(a) a preset line, such as preset_line_A 1692*a*, (b) a cube register input bus, such as cube_register_input_bus_A 16994*a*, with output cube bus, such as cube_register_output_bus_A 1696*a*.

Each cube_register_input_bus_A, such as the cube_register_input_bus_A 1694*a* connects to:

(a) a cube_bus, such as cube_bus_A 1698*a*, (b) a cube_cover_detector_input_bus, such as cube_cover_detector_input_bus_A 1700*a*.

A cube cover detector, such as cube_cover_detector_A 1702*a*, has inputs, which are:

(a) a cube_register_output_bus, such as the cube_register_output_bus_A 1696*a*, and (b) a cube_input_bus, such as the cube_input_bus A 1700*a*, with an output wire, such as the output_wire_A 1684*a*.

- Basic Operation Of Programmable IC -

A cube on a cube_bus, such as the cube_bus_A 1698*a*, and on a connected cube_register_input_bus, such as the cube_register_input_bus_A 1694*a*, is latched into a cube register, such as the cube_register_A 1690*a*, by pulsing a preset line, such as the preset_line_A 1692*a*. A cube_cover_detector_output_wire, such as the cube_cover_detector_output_wire_A 1684*a* generates a 1 or true voltage logic state if the cube stored in a cube_register, such as the cube_register_A 1690*a*, and existing on cube_register_output_bus, such as the cube_register_output_bus_A 1696*a*, covers or contains the cube on both;

(a) cube_cover_detector_input_bus, such as the cube_cover_detector_input_bus_A 1700*a* and connected with (b) cube_bus, such as the cube_bus_A 1698*a*. In turn, the many input OR gate output line 1688 will generate a 1 or true voltage Since a close boolean minimization contains usually many cubes, the cube_cover_detector_output_wire, such as the cube_cover_detector_output_wire_A 1684*a* to range to cube_cover_detector_output_wire_B 1684*b* will be one of many inputs to the many input OR gte 1686 with the OR gate output line 1688. The number of inputs to the many input OR gate 1686 must be greater than or equal to the number of cubes in the close boolean minimization for the FIG. 53 mechanism. The OR gate output line 1688 is an output of the programmable IC and is a output resolution bit of the coprocessor, such as the least significatn bit of the dependent variable y=mx+b, with y as the arbitrary mathematical function. The cube width equals the number of resolution bits of x with two constraints of m and b.

Figure 54:
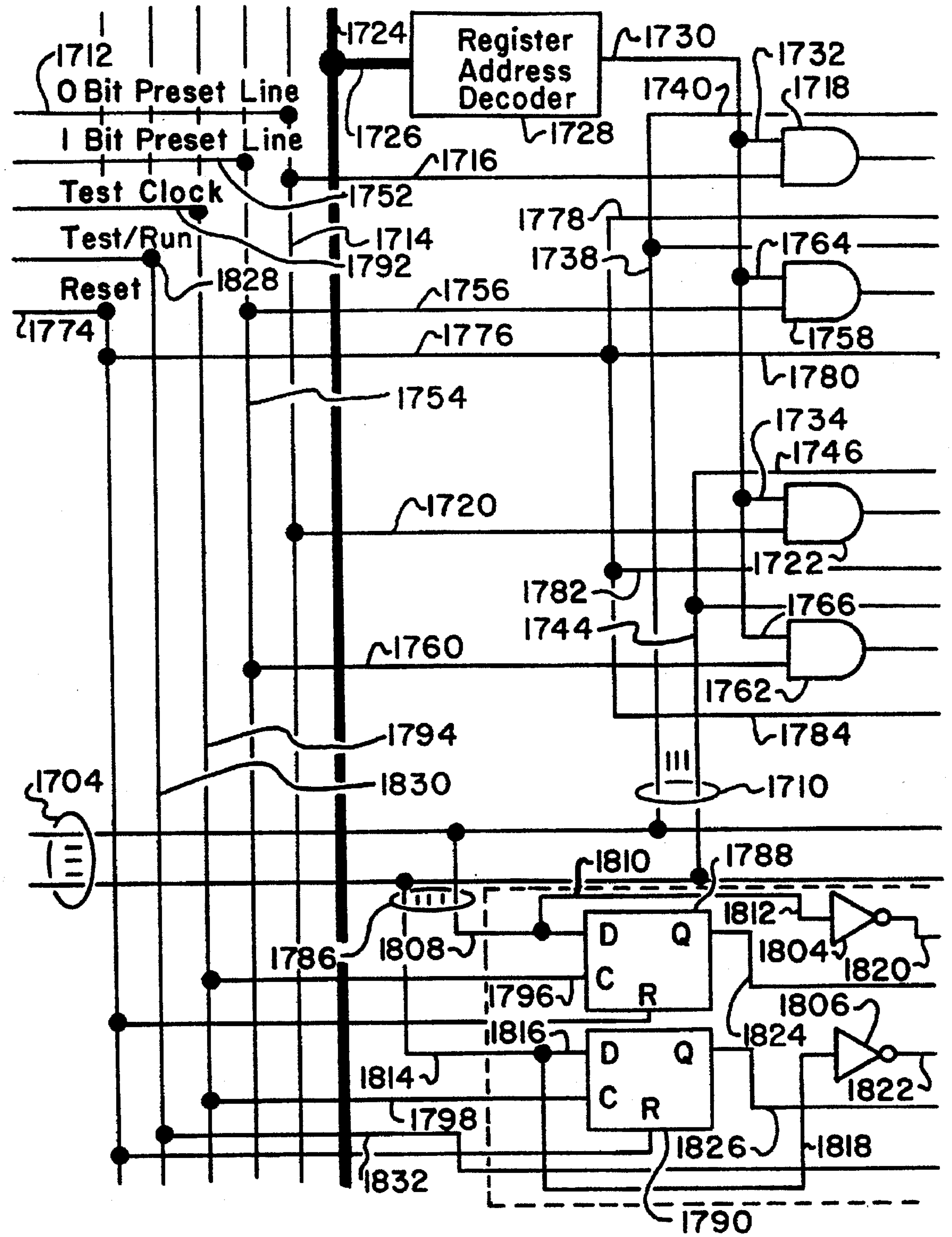
FIG. 54 is the left section of the programmable IC.
Figure 55:
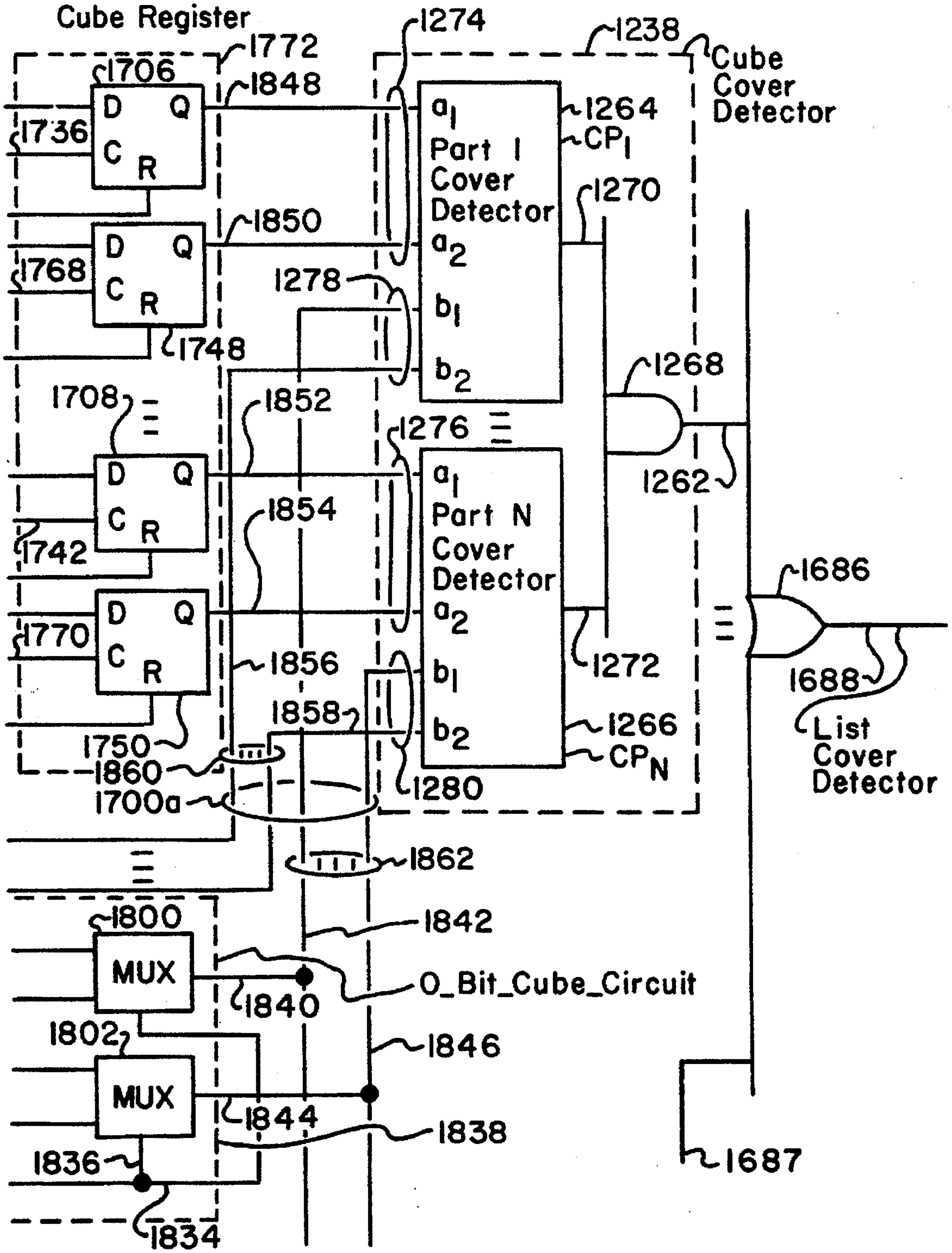
FIG. 55 is the right section of the detailed programmable IC.

Note: The basic_programmable IC 1681 is shown separated in FIG.'s: 54 and 55, where FIG. 54 is the left section of the basic_programmable IC 1681 and FIG. 55 is the right section of the basic_programmable IC 1681.

The basic_programmable IC 1681 stores any order cube, provides write speed test circuitry for any order cubes, and in a read mode will determine if 0-cubes are covered by at least one of the any order stored cubes. Definition: a p-order-cube contains $2^P$ numbers. This basic_programmable IC 1681 is writeable like a RAM and readable like a ROM; however, this mechanism or group of mechanisms can not be used as a RAM. In another application this basic_programmable IC 1681 can be operated as a content addressabel memory or CAM, by generating a 1 or true voltage logic state if the list of stored cubes cover or contain the 0-cube representation of a number presentatoin to the CAM.

- Operation Of The Programmable IC -

Each cube to be stored is put on the cube_bus 1704, containing n wires, in two cube halves, which are the half with the 1st bit of a part or $a_1$ or bit 0 and the other half cube with the 2nd bit of a part or $a_2$ or bit 1. The 0 bit cube half, usually called the $a_1$ half, is sent to a n part cube register, such as 0_bit_part_1_D_register 1706 to range to 0_bit_part_n_D_register 1708, from a cube input bus 1710 of n wires and similar to the cube_register_bus 1694*a* with 2n wires in FIG. 53, by pulsing 0_bit_preset_line 1712, which connects to:

(a) 0 bit preset_bus_line 1714, and connecto to (b) 0 bit cube register 2 input_AND gate AN input line A 1716 of 0 bit cube register 2 input_AND gate AN 1718, to range to connected (c) 0 bit cube register 2 input_AND gate AO input_line A 1720 of the 0 bit cube register 2 input_AND gate AO 1722.

A cube register address input is sent on register_address_bus 1724 to a connectee register_address_decoder_bus 1726 of a cube_register_address_decoder, such as cube_register_decoder 1728, denoted with symbol Register Address Decode. In turn, a 1 or true voltage logic state will exist on a register address decoder output line 1730 connecting also to:

(a) 0_bit_cube register 2 input_AND gate AN input line B 1632 of the 0_bit_cube_register_2_input_AND_gate 1718, to range to connected (b) 0_bit_cube_register_2_input_AND_gate AOinput_line_B 1734 of the 0 bit 2 input_AND gate cube register 1718.

In turn, a pulse will exist on 0 bit 2 input AND gate AN output line 1736 of the 0 bit 2 input AND gate 1718 and this pulse will latch the 0 bit of part 1 of the cube on the cube_register_input_bus 1710 from part 1 wire 1738 to connected part_1_register_D_input_line 1740 into the part_1_register 1706, and this pulse will range to 0_bit_2_input_AND_gate_AO_output_line 1742 of the 0_bit_2_input_AND_gate 1722 to latch the 0 bit of part n of the cube on the cube_register_input_bus 1710 from part n wire 1744 to connected part_n_register_D_input_line 1746 into the 0_bit_part_n_D_register 1708.

Each cube to be stored is put on the cube_bus 1704, containing n wires, in two cube halves, which are the half with the 1st bit of a part or a, or bit 0 and the other half cube with the 2nd bit of a part or $a_2$ or bit 1. The 1 bit cube half, usually called the $a_1$ half, is sent to a n part cube register, such as 1_bit_part_1_D_register 1748 to range to 1_bit_part_n_D_register 1750, from the cube register input bus 1710 of n wires and similar to the cube_register_bus 1694*a* with 2n wires in FIG. 53, by pulsing 1 bit preset line 1752, denoted with symbol 1 bit preset line, which connects to:

(a) 1 bit preset_bus_line 1754, and connected to (b) 1 bit cube register 2 input_AND gate AP input line A 1756 of 1 bit cube register 2 input_AND gate AP 1758, to range to connected (c) 1 bit cube register 2 input_AND gate AQ input_line B 1760 of 1_bit_cube_register_2_input_AND_gate AQ 1762. A cube register address input is sent on the register_address_bus 1724 to connected the register_address_decoder_bus 1726 of a cube register, such as the cube_register_decoder 1728. In turn, a 1 or true voltage logic state will exist on the register address decoder output line 1730 connecting also to:

(a) 1_bit_cube register 2 input_AND gate AP input line B 1764 of the 1_bit_cube_register_2_input_AND_gate 1758, to range to connected (b) 1_bit_cube_register_2_input_AND_gate AQ input_line_B 1766 of the 1_bit_cube_register_2_input_AND_gate 1762.

In turn, a pulse will exist on 1 bit 2 input AND gate AP output line 1768 of the 1 bit 2 input AND gate 1758 and this pulse will latch the 1 bit of part 1 of the cube on the cube_register_input_bus 1710 from the part 1 wire 1738 to connected the part_1_register_D_input_line 1740 into the part_1_register 1748, and this pulse will range to 1_bit_cube_register_2_input_AND_gate_AQ_output_line 1770 of the 1_bit_2_input_AND_gate 1762 to latch the 1 bit of part n of the cube on the cube_register_input_bus 1710 from the part n wire 1744 to connected the part_n_register_D_input_line 1746 into the part_n_register 1750.

A cube_register 1772, denoted with dotted lines, contains n pairs of registers, such as the 0 bit part 1 D register 1706 and 1 bit D register 1748 to range to the 0 bit part 1 D register 1708 and the 1 bit D register 1750.

A null cube, containing a 0 in both bits of every part can be put into any cube register, such as the cube register 1772 by two methods:

(method a) pulsing reset input 1774, connecting to cube reset connect wire 1776, connecting to register reset input lines, such as 0 bit D register reset line 1778 of the 0 bit D register 1706 and connected to 1 bit D register reset line 1780 of the 1 bit D register 1748 to range to connected 0 bit D register reset line 1782 of the part_n_register 1708 of the 0 bit part n D register 1708 and connected to 1 bit D register reset line 1784 of the 1 bit D register 1750, and (method b) storing two half cubes put on the cube_register_input_bus 1710 of n parts each consisting of 0's in each part for every part.

Testing the basic_probrammable IC 1681 to determine if all cubes in a list are stored in cube registers, such as the cube register 1772 consisting of a pair of registers per part for n parts, such as the 0 bit part 1 D register 1706 and the part 1 $a_2$ register 1748 to range to the 0 bit part n D register 1708 and the 1 bit part n D register 1750, is performed by sending a test cube to the cube cover detector 1238 as shown in FIG. 34 mechanism. The cube cover detector 1238 consists of the part 1 cover detector 1264 to range to part n cover detector 1266 and monitoring if the OR gate output wire 1688, of the many input OR gate 1686, also shown in FIG. 53, goes to a true logic state for one or more cube cover detectors goingin true, such as the cover detection block output line 1262. If the many input cover OR gate cover detector output wire 1688 is true, then the test cube is covered by the list of cube stored. One half of the test cube is inputted to the basic_programmable IC 1681 by sending the 0 bit half, usually called the $b_1$ bit half cube, from the cube_bus 1704 onto cube test bus 1786 to a test register array, such as part 1 test register 1788 to range to part n test register 1790, by pulsing test clock line 1792, connecting to test clock bus 1794, that is inputted to the clock inputs of part j test registers, such as part 1 clock input 1796 of the part 1 test D register 1788 to range to part n clock input 1798 of the part n test register 1790. The $b_1$ half or 0 bit half of the test cube on the cube test bus 1786 and the $b_2$ half of 1 bit half as generated by NOTing the 0 bit half, such as 1 bit part j equals NOT(0 bit part j), which is the complemented_per_part_run_time_0-cube are switched thru an array of part j MUXes, such as part_1_MUX 1800 to range to part_n_MUX 1802. For run time use with 0-cubes, the $b_1$ bit or 0 bit half cube or complemented_per_part_run_time$_{-b}$ 0-cube on the cube test bus 1786 is complemented per bit by an inverter gate, such as part_1_inverter_gate S 1804 to range to part_n_inverter gate T 1806, in order for the cube_cover_detector 1238 to operate correctly.

In complementing the $b_1$ bit half cube, a bit for part 1 on part_1_cube_test_bus_wire 1808 in the cube_test_bus 1786 exists on connected part_1_test_register_D_input_line 1810 of the part_1_test_register 1788 and on connected inverter_gate_S_input_line 1812 to range to a bit for part n on part_n_cube_test_bus_wire 1814 in the cube_test_bus 1786 exists on connected part_n_test_register_D_input_line 1816 of the part_n_test_register 1790 and on connected inverter_gate_T_input_line 1818.

The complemented $b_1$ bit half cube existing on part wires, such as part_1_inverter_gate_S_output 1820 to range to part_n_inverter_gate_T_output 1822, are switched thru a group of MUXes, such as the part_1_MUX 1792 to range to the part_n_MUX 1794 with the other MUX inputs, such as part_1_test_register_Q_output_wire 1824 to range to part_n_test_register_Q_output_wire 1826 by a signal on test_run_wire 1828, connected to test_run_bus_wire 1830, in turn connected to test_run_MUX_array_wire 1832, in turn connected to a part j test_run_MUX_control_wire, such as part_1_test_run_MUX_control_wire 1834 to range to part_n_test_run_MUX_control_wire 1836.

The test_register_array 1838, denoted with dotted lines and denoted with symbol 0_bit_cube_circuit, consists of:

(1) a part_j_D_register, such as:

(a) the part_1_test_register 1788 to range to (b) the part_n_test_register 1790, (2) an inverter, such as:

(a) the part_1_inverter 1804, to range to (b) the part_n_inverter 1806, (3) a MUX, such as:

(a) the part_1_MUX 1800, to range to (b) the part_n_MUX 1802.

The MUX output lines, such as:

(a) part_1_MUX_output_line 1840, connecting to part_1_$b_1$_bus_line 1842, to range to (b) part_n_MUX_output_line 1844, connecting to part_n_$b_1$_bus_line 1846.

The cube_register$_{13}$ array_Q_output_wires, such as:

(a) part_1_$a_1$_cube_register_Q_output_line 1848, and (b) part_1_$a_2$_cube_register_Q_output_line 1850, compare: the cover _A_part_1_bit_pair_bus 1274 to range to:

(a) part_n_$a_2$_cube_register_Q_output_line 1852, and (b) part_n_$a_2$_cube_register_Q_output_line 1854 compare the cover_A_part_N_bit_pair_bus 1276.

The part_j_b_cube_cover_detector_input_bus, such as the cover_B_part_1_bit_pair_bus 1278, consisting of:

(a) the part_1_$b_1$_input 1842 and (b) part_1_$b_2$_input 1856, to range to the part_1_b_cube_cover_detector_input_pair 1280, consisting of:

(a) the part_n_$b_1$_input 1846 and (b) part_n_$b_2$_input 1858 comprises the cube_cover_detector_input_bus_A 1700*a*, as shown in FIG. 53, FIG. 54 and FIG. 55.

When the $b_2$ cube exists on the cube bus 1704, connecting to the $b_2$_half_cube_cover_detector_input_bus 1860, and the MUX array output bus 1862, consisting:

(a) the part_1_$b_1$_bus_line 1842 to range to (b) the part_n_$b_1$_bus_line 1846, contain the $b_1$ half cube, then the cube_cover_detector 1238 will generate a 1 or true voltage logic state on the cover detector block output line 1262, if the stored cube in a cube register, such as the cube register 1772 cover the $b_1$ half cube and $b_2$ half cube on cube cover detector input bus pairs, such as the cover_B_part_1_bit_pair_bus 1278, consisting of:

(a) the part_1$_{-b1}$_input 1842 and (b) the part_1_$b_2$_input 1856, to range to the cover_B_part_N_bit_pair_bus 1280, consisting of:

(a) part_n_bl$_1$_input 1846 and (b) part_n_$b_2$_input 1858.

Definition: a stored cube A covers a cube B only if every part of the stored cube A covers the respective part of cube B.

To read the programmable IC, only 1 bit or $b_2$ half of a 0 cube, usually called a binary number, is put on the cube_bus 1704.

- Cube Storage Definition Review -

If the many input OR gate output line 1688 of the many input OR gate 1686 is true, then the binary number or 0 cube to be read on the cube_bus 1704 is covered by at least one cube_cover_detector, such as the cube_cover_detector 1238. A group of programmable ICs or basic_programmable IC 1681's can be: a CAM or content addressable memory or a EEROM or a FPLA, if the binary number inputted is covered by a list in at least one of the programmable ICs with the covering programmable IC generating a true output for either the address of the contents inputted as with CAM operation or data as with EEROM or FPLA operation.

The programmable IC could have a fuse means or IC mask means to replace the $a_1$ $a_2$ registers, such as the 0 bit part 1 D register 1706 and the 0 bit part N D register 1748, respectively.

The programmable IC, with stored cubes of order higher than 0, such as a 0-cube or a single state, can not be used as a RAM. A RAM could only be constructed from circuitry that contains the disjoint sharp circuitry, such as circuitry in the logic code generator 2.

The number of gates estimate for a processor logic code generator, such as shown in FIG. 24, to handle 16 parts with a 32 wire data bus, as shown in FIG.'s: 16 and 17, is about 3,100 gates. Thus, for a 64 lpart data bus or 128 wire data bus might be '3,100×(64/16)' gates or about 12,000 gates. The memory ICs, such as the Memory_1 698, as shown in FIG.'s 24, 25 and 26 and FIGS. 31, 32 and 33, might be 90,000 gates for 64 cubes for 16 parts; thus a memory, such as shown in FIG. 26, might be '90,000×(64/16)×64 gates' or more than 23 million plus gates for 64 cubes for 64 parts for 64 output bits.

Figure 56:
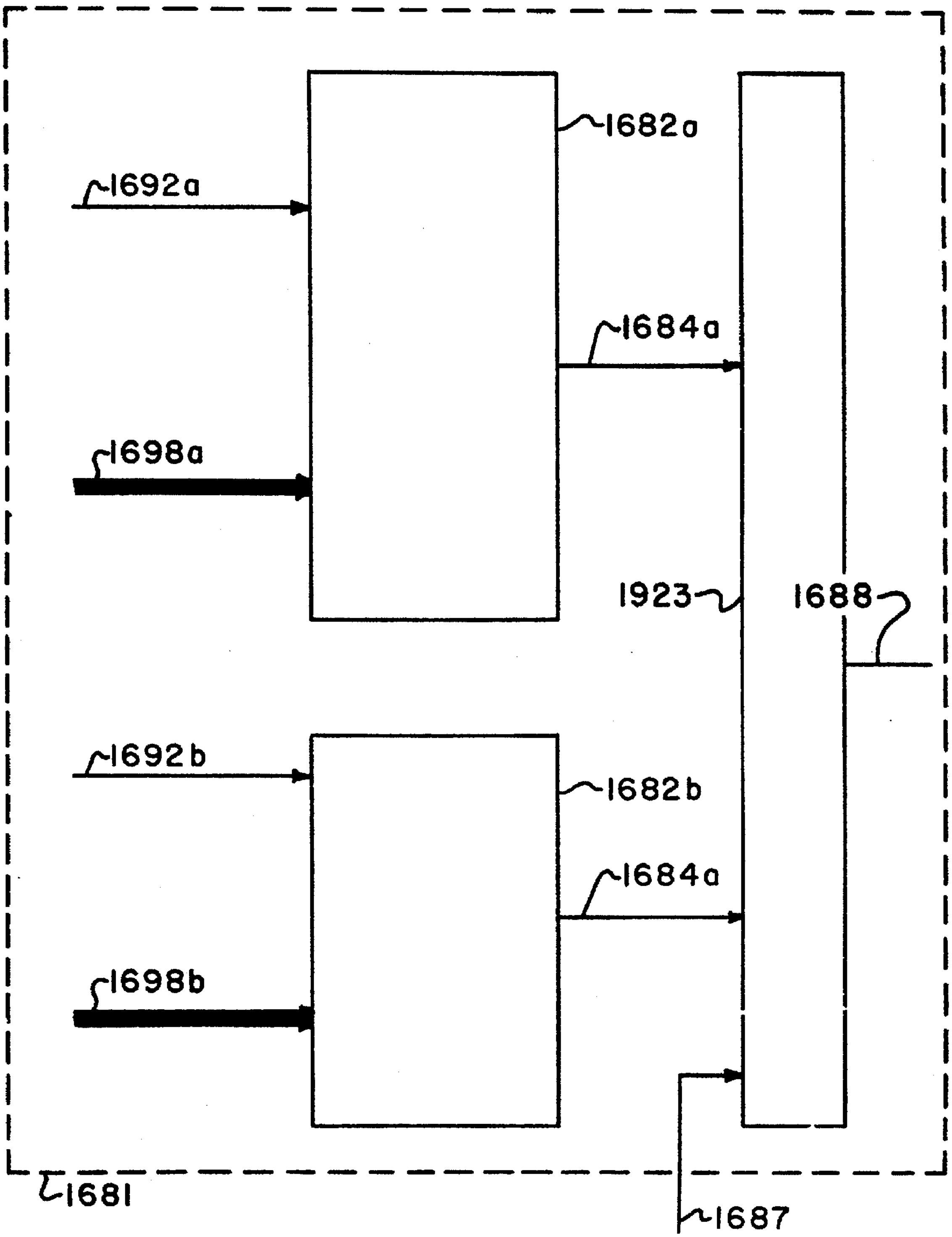
FIG. 56 shows an array of cover detector circuits which are each the storage circuits of the programmable ICs, with each output connected to the input of a logic circuit.

As shown in FIG. 56, each programmable IC output, such as cube_cover_detector_output_wire_A **1684*a* to range to cube_cover_detector_output_wire_B 1684*b*, is connected to the input of logic_circuit_A 1923. The use of logic_circuit_A 1923 is to fit into a programmable IC a huge list of cubes, which would normally not fit into the programmable IC 1681**.

Table Of Application Notes

| Application Notes | Description of Notes | Page |
|---|---|---|
| Application Note 1: | Set Generation For A Non Linear Mathematical Function | 296 |
| Application Note 2: | Finding The Roots Of Both A Linear And A Non Linear Mathematical Function | 341 |
| Application Note 3: | Finding The Intersection Of Any Two Mathematical Equations | 356 |
| Application Note 4: | Factoring A 160 Digit Number Into All Possible Three Numbers Sets | 359 |
| Application Note 5: | Spread Sheet Speedup Using A Coprocessor | 383 |
| Application Note 6: | Recognition Of A Long Sequence Of Samples Using A Short Sequence Of Samples In A Short Time | 394 |
| Application Note 7: | Image Storage And Retrieval For A Museum Of Paintings | 406 |
| Application Note 8: | Image Storage And Retrieval For A Library Of Movies | 412 |
| Application Note 9: | Computer With Logic solving aparatus Generates Digital Logic While A Neural Network Learns Digital Logic | 421 |
| Application Note 10: | Set Generation For A Perspective Computer Vision Navigation System Applied To An Aerial Velocity Measurement System | 424 |
| Application Note 11: | Finding the volume between a surface and a plane by: (1) generating a list of cubes, (2) counting all the 0-cubes with a preprogrammed X part counting coprocessor, and (3) multiplying the count number of 0-cubes times a unit volume to obtain the volume between the surface and the plane | 431 |
| Application Note 12: | Inverse Transform Of Any Function | 440 |

End of Table Of Application Notes

- Application Note 1 -

Purpose: To illustrate application of condition 1 and 2 For Both Condition 1 Or (f>0) And Condition 2 Or (f=0) in the generation of a set of lists to represent a non linear mathematical function is expressed in a flow chart with constraints.

A non linear mathematical function is expressed in a flow chart, with constraints per variables.

Purpose: Find 'w' to satisfy the below flow chart.

The variables w, g and f are N part signed integers.

Flow Chart Constraints are in equations (212) thru (224).

$$\text{(a)}\quad g/w > 20 \tag{212}$$
$$g > 20w \tag{214}$$
$$g - 20w > 0 \tag{216}$$
$$\text{Let } c = g - 20w \tag{218}$$
$$\text{Therefore } c > 0 \tag{220}$$
$$\text{(b)}\quad w > 0 \tag{222}$$
$$\text{(c)}\quad g > 0 \tag{224}$$

The variable f is defined in equation (226).

$$f = g - w - 10 \tag{226}$$

A flow chart with equations (228) and 230) is shown below.

```
Flow Chart
IF(f>0), then
    Output = gw          (228)
Else
    Output = 17          (230)
Endif
```

The set of lists for f(w,g) or the equation (226) is in Table 85.

TABLE 85

| Present Invention | | | |
|---|---|---|---|
| Title: Instruction Lists of f(w,g) for N Resolution Bits Of f(w,g) | Instruction Cubes | | / List |
| Instructions | | | |
| Cube Width: | $f_N$ $f_{N-1}$ $f_2$ | $f_1$ | /Are Cube |
| Equations | | | |
| Parts: | N | 1 | / Below Table |
| row 1 cube: | 0 1 X............X | X | / (232) for row 1 |
| row 2 cube: | 0 0 1 X..........X | X | / (232) for row 2 |
| — | — | | |
| — | — | | |
| — | — | | |
| row N−1 cube: | 0................0 1 | X | / (232) for row N−1 |
| row N cube: | 0...................0 | 1 | / (232) for row N |

Table 85 can be rewritten as equation (232).

$$\text{list}(f>0) = \underset{row=1}{\overset{N}{\text{OR}}} \left( Lf_{N-row} \cdot \text{AND} \cdot \left( \underset{j=N+1-row}{\overset{N}{\text{NOT}}}(Lf_j) \right) \right) \quad (232)$$

The list for 'else' condition is list(NOT(f>0)), as described in equation (233), where $$\text{list}(\text{NOT}(f>0)) = \cup(\#)\ \text{list}(f>0) \quad (233)$$

(a) Use Rule 1 input cubes and Rule 6 for set of lists for variable g and call this set of N lists as set LF. Set LF is to be transformed by set Li, which is, in this problem, a 2 variable multiplier set of close boolean minimizations, as shown in Table 86.

TABLE 86

| Present Invention | | | | |
|---|---|---|---|---|
| Title: A 2 variable multiplier set of close boolean minimizations | | | | |
| Note: A list per row | | | | |
| Cube Width | g | | | w |
| Parts | 2N | N+1 | N | 1 |
| list $LF_{2N}$ or $Lg_N$ | [1X... | ...X | X... | ...X] |
| list $LF_{2N-1}$ or $Lg_{N-1}$ | [X1X.. | ...X | X... | ...X] |
| | | | — | |
| | | | — | |
| | | | — | |
| list $LF_{N+2}$ or $Lg_2$ | [X... | .X1X | X... | ...X] |
| list $LF_{N+1}$ or $Lg_1$ | [X... | ..X1 | X... | ...X] |
| Note: list $LF_j$ = list $Lg_{j-N}$ | | | | |

(b) Use Rule 1 input cubes and Rule 6 for set of lists for variable w and call this set of N lists as set LF, as described in Table 87.

TABLE 87

| Present Invention | | | | |
|---|---|---|---|---|
| Title: Set LF | | | | |
| Cube Width | g | | | w |
| Parts | 2N | N+1 | N | 1 |
| list $LF_N$ or $Lw_N$ | [X.... | ...X | 1X.. | ...X] |
| list $LF_{N-1}$ or $Lw_{N-1}$ | [X.... | ...X | X1X. | ...X] |
| | | — | | |
| | | — | | |
| | | — | | |

TABLE 87-continued

| | | | | |
|---|---|---|---|---|
| list $LF_2$ or $Lw_2$ | [X.... | ...X | X... | .X1X] |
| list $LF_1$ or $Lw_1$ | [X.... | ...X | X... | ..X1] |
| Note: list $LF_j$ = list $Lw_j$ | | | | |

(c) Obtain the set of N lists for a 2 variable multiplier as the generated list from the Computer Program Listing Number 4 and call this set Li or instruction set of lists. Note: the 2 input variables are defined and shown as non signed variables, but the variables could be floating point format.

(d) Apply Li/LF knowledge to generate set of lists for variable gw. Any list($gw_j$) in the set of N lists for variable gw will appear in the below Table 88 list format.

TABLE 88

| Present Invention | | | | |
|---|---|---|---|---|
| Title: One Of N Lists for Variable gw | | | | |
| Cube Width | g | | | w |
| Parts | 2N | N+1 | N | 1 |
| 1st Cube | [----valid--- | | | ---valid---] |
| | | — | | |
| | | — | | |
| | | — | | |
| last Cube | [----valid--- | | | ---valid---] |

Let $Lgw_j$=list($gw_j$)

The logic equation (234) of lists of the above flow chart is:

$$\text{Output=list}(gw).\text{AND}.(f>0)).\text{OR}.(\text{list}(17).\text{AND}.(\text{NOT}(f>0))) \quad (234)$$

(a) Use Rule 1 input cubes and Rule 6 for set of lists for variable g and call this set of N lists as set LF. Set LF is to be transformed by set Li, which is, in this problem, a 2 variable multiplier set of close boolean minimizations, as shown in Table 89.

TABLE 89

| Present Invention | | | | |
|---|---|---|---|---|
| Title: A 2 variable multiplier set of close boolean minimizations | | | | |
| Cube Width | g | | | w |
| Parts | 2N | N+1 | N | 1 |
| list $LF_{2N}$ | [1X... | ...X | X... | ...X] |
| list $LF_{2N-1}$ | [X1X.. | ...X | X... | ...X] |
| | | — | | |
| | | — | | |
| | | — | | |
| list $LF_{N+2}$ | [X.... | .X1X | X... | ...X] |
| list $LF_{N+1}$ | [X.... | ..X1 | X... | ...X] |
| Note: list $LF_j$ = list $Lg_{j-N}$ or list $LF_j$ = list($g_{j-N}$) | | | | |

(b) Use Rule 1 input cubes and Rule 6 for set of lists for variable w and call this set of N lists as set LF, as shown in Table 90.

TABLE 90

| Present Invention | | | | |
|---|---|---|---|---|
| Title: Set LF | | | | |
| Cube Width | g | | w | |
| Parts | 2N | N+1 | N | 1 |
| list $LF_N$ | [X.... | ..X | 1X.. | ..X] |
| list $LF_{N-1}$ | [X.... | ..X | X1X. | ..X] |
| | | — | | |
| list $LF_2$ | [X.... | ..X | X... | .X1X] |
| list $LF_1$ | [X.... | ..X | X... | ..X1] |
| Note: list $LF_j$ = list $Lw_j$ or list $LF_j$ = list($w_{j-N}$) | | | | |

(c) Obtain the set of N lists for a 2 variable multiplier as the generated list from the Computer Program Listing Number 4 and call this set Li or instruction set of lists. Note: the 2 input variables are defined and shown as non signed variables, but the variables could be floating point format.

(d) Apply Li/LF knowledge to generate set of lists for variable gw. Any list($gw_j$) in the set of N lists for variable gw will appear in the below Table 91 list format.

TABLE 91

| Present Invention | | | |
|---|---|---|---|
| Title: One Of N Lists for Variable gw | | | |
| Cube Width | g | | w |
| Parts | 2N | N+1 N | 1 |
| 1st Cube | [----valid-- | | --valid--] |
| | — | | |
| last Cube | [----valid-- | | --valid--] |

(e) Obtain set of lists for division set.

(f) Obtain set of lists for output_1

(g) List LA is described in equation (236).

list LA=list(output_1).AND.list(f>0) (236)

(h) Use Rule 2 input cubes and Rule 6 for set of lists for number 17 or binary number 0 . . . 010001 and call this set of N lists as set $LF_{N+1}$ to $LF_{2N}$, as shown in Table 92.

TABLE 92

| Present Invention | | | | |
|---|---|---|---|---|
| Title: Set $LF_{N+1}$ to $LF_{2N}$ For Set Of Lists For Number 17 Or Binary Number 0... ...010001 | | | | |
| Cube Width | g | | w | |
| Parts | 2N | N+1 | N | 1 |
| list $L17_1$ | [X... | ..X | X... | ..X] |
| list $L17_2$ | [N... | ..N | N... | ..N] |
| list $L17_3$ | [N... | ..N | N... | ..N] |
| list $L17_4$ | [N... | ..N | N... | ..N] |
| list $L17_5$ | [X... | ..X | X... | ..X] |

TABLE 92-continued

| | | | | |
|---|---|---|---|---|
| list $L17_6$ | [N... | ..N | N... | ..N] |
| | | — | | |
| list $L17_N$ | [N... | ..N | N... | ..N] |

(i) List LB is described in equation (238).

list LB=list(17).AND.list(NOT(f>0)) (238)

(j) List LB is described in equation (240).

list $L_{output\_1}$=LA.AND.LB (240)

The list for $LA_j$ is, as shown below in Table 93.

TABLE 93

| Present Invention | | | |
|---|---|---|---|
| Title: The List For $LA_j$ | | | |
| Cube Width | w | | g |
| Parts | 2N | N+1 N | 1 |
| List $LA_1$ | [----valid-- | | --valid--] |
| | | — | |
| List $LA_N$ | [----valid-- | | --valid--] |

The lists for the resolution bits of the output or output(g, w) have cubes of 2N parts, as shown below Table 94 in a list format.

TABLE 94

| Present Invention | | | |
|---|---|---|---|
| Title: One Of The Lists for the resolution bits of the output or OutPut (g, w) with cubes of 2N parts | | | |
| Cube Width | w | | g |
| Parts | 2N | N+1 N | 1 |
| 1st Cube | [----valid-- | | --valid--] |
| | | — | |
| Last Cube | [----valid-- | | --valid--] |

Cube Width=N parts, where N=2×number of variable×32 resolution bits or parts per variable.

The logic code generator 2 will probably have either a 32 or 64 part bus or either 64 or 128 bus wires per data bus, as shown in FIG.'s 16 and 17.

From the above flow chart, which defines outpu(g,w) per condition and constraints, equation (228) is written again.

output=gw (228)

Step 1 Generation Of Lists For 'gw':

(a) Use Rule 1 input cubes and Rule 6 for set of lists for variable g and call this set of N lists as set LF. Set LF is to be transformed by set Li, which is, in this problem, a 2 variable multiplier set of close boolean minimizations, as described in Table 95.

TABLE 95

| Present Invention | | | | |
|---|---|---|---|---|
| Title: A 2 variable multiplier set of close boolean minimizations | | | | |
| Cube Width | | g | | w |
| Parts | 2N | N+1 | N | 1 |
| list $LF_{2N}$ | [1X... | ...X | X... | ...X] |
| list $LF_{2N-1}$ | [X1X.. | ...X | X... | ...X] |
| | | — | | |
| | | — | | |
| | | — | | |
| list $LF_{N+2}$ | [X.... | .X1X | X... | ...X] |
| list $LF_{N+1}$ | [X.... | ..X1 | X... | ...X] |

Note: list $LF_j$ = list $Lg_{j-N}$ (b) Use Rule 1 input cubes and Rule 6 for set of lists for variable w and call this set of N lists as set LF, as describeed in Table 96.

TABLE 96

| Present Invention | | | | |
|---|---|---|---|---|
| Title: Set Of The Lists for variable w and call this set of N lists as set LF | | | | |
| Cube Width | | g | | w |
| Parts | 2N | N+1 | N | 1 |
| list $LF_N$ | [X.... | ...X | 1X.. | ...X] |
| list $LF_{N-1}$ | [X.... | ...X | X1X. | ...X] |
| | | — | | |
| | | — | | |
| | | — | | |
| list $LF_2$ | [X.... | ...X | X... | .X1X] |
| list $LF_1$ | [X.... | ...X | X... | ..X1] |

Note: list $LF_j$ = list $Lw_j$ (c) Obtain the set of N lists for a 2 variable multiplier as the generated list from the Computer Program Listing Number 4 and call this set Li or instruction set of lists. Note: the 2 input variables are defined and shown as non signed variables, but the variables could be floating point format.

(d) Apply Li/LF knowledge to generate set of lists for variable gw. Any list($Lgw_j$) in the set of N lists for variable gw will appear in the below Table 97 list format.

TABLE 97

| Present Invention | | | | |
|---|---|---|---|---|
| Title: One Of The N lists for variable gw | | | | |
| Cube Width | | g | | w |
| Parts | 2N | N+1 | N | 1 |
| 1st Cube | | [----valid--- | | ---void---] |
| | | — | | |
| | | — | | |
| | | — | | |
| last Cube | | [----valid--- | | ---valid---] |

(Step 2): The generation of the set of 2N lists for 'c', where 'c=g−20w'. The equation 'c=g−20w' was derived from 'g/w>20', as follows, in equations: (212), (214), (216), (218), and (220).

$$g/w > 20 \tag{212}$$

$$g > 20w \tag{214}$$

$$g-20w>0 \tag{216}$$

$$\text{let } c = g-20w \tag{218}$$

$$c > 0 \tag{220}$$

Generation Of Lists For Step 2 is in equation (246).

$$c=g-20w \tag{246}$$

(a) Use Rule 2 input cubes and Rule 6 for set of lists for number 20 or binary number 0 . . . 010100 and call this set of N lists as set $LF_{N+1}$ to $LF_{2N}$, as described in Table 98.

TABLE 98

| Present Invention | | | | |
|---|---|---|---|---|
| Title: Set Of The N lists as set $LF_{N+1}$ to $LF_{2N}$ For Number 20 Or Binary Number 0... ...010100 | | | | |
| Cube Width | | g | | w |
| Parts | 2N | N+1 | N | 1 |
| list $L20_1$ | [N... | ...N | N... | ..N] |
| list $L20_2$ | [N... | ...N | N... | ..N] |
| list $L20_3$ | [X... | ...X | X... | ..X] |
| list $L20_4$ | [N... | ...N | N... | ..N] |
| list $L20_5$ | [X... | ...X | X... | ..X] |
| list $L20_6$ | [N... | ...N | N... | ..N] |
| | | — | | |
| | | — | | |
| | | — | | |
| list $L20_N$ | [N... | ...N | N... | ..N] |

(b) Use Rule 1 input cubes an Rule 6 for set of lists for variable w and call this set of N lists as set $LF_1$ to $LF_N$, as described in Table 99.

TABLE 99

| Present Invention | | | | |
|---|---|---|---|---|
| Title: Set Of N lists as set $LF_1$ to $LF_N$ | | | | |
| Cube Width | | 20 | | w |
| Parts | 2N | N+1 | N | 1 |
| list $Lw_N$ | [X.... | ...X | 1X.. | ...X] |
| list $Lw_{N-1}$ | [X.... | ...X | X1X. | ...X] |
| | | — | | |
| | | — | | |
| | | — | | |
| list $Lw_2$ | [X.... | ...X | X... | .X1X] |
| list $Lw_1$ | [X.... | ...X | X... | ..X1] |

Note: list $LF_j$ = list $Lw_j$ (c) Obtain the set of N lists for a 2 variable multiplier and call this set Li or instruction setof lists. The output is '20w−g'.

(d) Apply Li/LF knowledge to generate set of lists for variable w. Any list $L20w_j$ in the set of N lists for variable 20w will appear in the below Table 100 list format.

TABLE 100

| Present Invention | | | | | |
|---|---|---|---|---|---|
| Title: One Of N lists for variable 20w | | | | | |
| Cube Width | 20 | | | w | |
| Parts | 2N | N+1 | N | | 1 |
| 1st Cube | [X.... | ..X | | —valid—] | |
| | | — | | | |
| | | — | | | |
| | | — | | | |
| last Cube | [X.... | ..X | | —valid—] | |

(e) The set of lists above in part (d) can be relieved of the don't care bus, to be converted to a set with any list, as shown below, in Table 101.

TABLE 101

| Present Invention | | | | | |
|---|---|---|---|---|---|
| Title: List, described in Table 100, Without Don't Care Parts 2N to N+1 | | | | | |
| Cube Width | | g | | w | |
| Parts | 2N | N+1 | N | | 1 |
| 1st Cube | | | | —valid—] | |
| | | | | — | |
| | | | | — | |
| | | | | — | |
| last Cube | | | | [—valid—] | |

Note: list $LF_j$ = list $Lg_j$ (f) Use Rule 1 input cubes and Rule 6 for set of lists for variable g and call this set of N lists as set $LF_1$ to $LF_N$, as described in Table 102.

TABLE 102

| Present Invention | | | | | |
|---|---|---|---|---|---|
| Title: Set of N lists as set $LF_1$ to $LF_N$ | | | | | |
| Cube Width | | g | | w | |
| Parts | 2N | N+1 | N | | 1 |
| list $LF_{2N}$ | [1X... | ..X | X... | ..X] | |
| list $LF_{2N-1}$ | [X1X.. | ..X | X... | ..X] | |
| | | — | | | |
| | | — | | | |
| | | — | | | |
| list $LF_{N+2}$ | [X.... | .X1X | X... | ..X] | |
| list $LF_{N+1}$ | [X.... | ..X1 | X... | ..X] | |

Note: list $LF_j$ = list $Lg_{j-N}$ (g) the list in parts (e) and (f) are called LF. Obtain the set of N lists for a 2 variable subtraction and call this set Li or instruction set of lists. The output is 'g–20w'.

(h) Apply Li/LF knowledge to generate set of lists for varialbe w. ANy list($Lc_j$) in the set of N lists for variable c will appear in the below list format.

TABLE 103

| Present Invention | | | | | |
|---|---|---|---|---|---|
| Title: One Of N lists for variable c | | | | | |
| Cube Width | g | | | w | |
| Parts | 2N | N+1 | N | | 1 |
| 1st Cube | [—valid— | | | —valid—] | |
| | | — | | | |
| | | — | | | |
| | | — | | | |
| Last Cube | [—valid— | | | —valid—] | |

(i) 'c>0' is for condition 1.

From condition 1 for 'f>0', instruction cubes are provided in Table 104.

TABLE 104

| Present Invention | | | | |
|---|---|---|---|---|
| Title: Instruction List of f(w,g) For N Resolution Bits Of f(w,g) Instruction Cubes / List | | | | |
| Instructions | | | | |
| Cube Width | $f_N$ $f_{N-1}$ $f_2$ | | $f_1$ | /Are Cube Equations |
| Parts | N | | 1 | / Below Table |
| row 1 | 0 1 X............X | | X | / (248) for row 1 |
| row 2 | 0 0 1 X.........X | | X | / (248) for row 2 |
| | — | | | |
| | — | | | |
| | — | | | |
| row N–1 | 0................0 1 | | X | / (248) for row N–1 |
| row N | 0...................0 | | 1 | / (248) for row N |

Table 104 can be described in equation (248).

$$\text{list}(f>0)=\underset{row=1}{\overset{N}{\text{OR}}}\left(Lf_{N-row}\ \underset{j=N+1-row}{\overset{N}{\cdot\text{AND}\cdot}}\ (\text{NOT}(Lf_j))\right)\tag{248}$$

To a redefined 'c>0' format in Table 105 from 'f>0' in Table 104.

TABLE 105

| Present Invention | | | | |
|---|---|---|---|---|
| Title: Instruction List of c(w,g) For N Resolution Bits Of c(w,g) Instruction Cubes / List Instructions | | | | |
| Cube Width | $C_N$ $C_{N-1}$ | $C_2$ | $C_1$ | /Are Cube Equations |
| Parts | N | | 1 | / Below Table |
| row 1 | 0 1 X............X | | X | / (249) for row 1 |
| row 2 | 0 0 1 X.........X | | X | / (249) for row 2 |
| | — | | | |
| | — | | | |
| | — | | | |
| row N–1 | 0...............0 1 | | X | / (249) for row N–1 |
| row N | 0..................0 | | 1 | / (249) for row N |

Table 105 can be described in equation (249).

$$\text{list}(c>0)=\underset{row=1}{\overset{N}{\text{OR}}}\left(Lc_{N-row}\ \underset{j=N+1-row}{\overset{N}{\cdot\text{AND}\cdot}}\ (\text{NOT}(Lc_j))\right)\tag{249}$$

(j) The single resultant list resulting from (i) above operation is the list of 'g,w' pairs to satisfy the constraint 'g/w>20' or 'w/g<(1/20)'.

(k) Constraint (b) is 'w>0'. List for 'w>0' is shown in Table 100.

TABLE 106

| Present Invention | | | | |
|---|---|---|---|---|
| Title: Instruction List of c(w,g) For N Resolution Bits Of c(w,g) | | | | |
| Cube Width | g | | | w |
| Parts | 2N | N+1 | N | 1 |
| Only Cube | [X... | ..X | 1X.. | ..X] |

Note: 'Sign bit for variable w = 1' means positive.

(l) Constraint (c) is 'g>0'. List for 'g>0' is in Table 107

TABLE 107

| Present Invention | | | | |
|---|---|---|---|---|
| Title: Instruction Lists of c(w,g) for N Resolution Bits Of c(w,g) | | | | |
| Cube Width | g | | | w |
| Parts | 2N | N+1 | N | 1 |
| Only Cube | [1X.. | ..X | X... | ..X] |

Note: 'Sign bit for variable g = 1' means positive.

(m) AND of lists for constraints results in the below logic equation (250).

$$Constraint\_list=list(c>0).AND.list(w>0).AND.list(g>0) \quad (250)$$

The resultant list of the ANDing of the three constraints is shown in Table 108.

TABLE 108

| Present Invention | | | | |
|---|---|---|---|---|
| Title: The resultant list of the ANDing of the three constraints Flow Chart Constraints are redefined, below. (1) g−20w>0 (2) w>0 (3) g>0 | | | | |
| Cube Width | g | | | w |
| Parts | 2N | N+1 | N | 1 |
| 1st Cube | [---valid--- | | | ---valid---] |
| | | — | | |
| | | — | | |
| | | — | | |
| 1st Cube | [---valid--- | | | ---valid---] |

(Step 3): third genenrating the set of lists for 'f',

Generaton Of Lists For Step 3 are in equation (251), (252), and (254).:

$$f=g-w-10 \quad (251)$$

$$fA=g-w \quad (252)$$

$$f=fA-10 \quad (254)$$

(a) Use Rule 1 input cubes and Rule 6 for set of lists for variable g and call this set of N lists as set $LF_{N+1}$ to $LF_{2N}$, as described in Table 109.

TABLE 109

| Present Invention | | | | |
|---|---|---|---|---|
| Title: Set Of N lists as set $LF_{N+1}$ to $LF_{2N}$ | | | | |
| Cube Width | g | | | w |
| Parts | 2N | N+1 | N | 1 |
| list $LF_{2N}$ | [1X... | ..X | X... | ..X] |
| list $LF_{2N-1}$ | [X1X.. | ..X | X... | ..X] |
| | | — | | |
| | | — | | |
| | | — | | |
| list $LF_{N+2}$ | [X.... | .X1X | X... | ..X] |
| list $LF_{N+1}$ | [X.... | ..X1 | X... | ..X] |

Note: list $LF_{j+N}$ = list $Lg_j$ (b) Use Rule 1 input cubes and Rule 6 for set of lists for variable w and call this set of N lists as set $LF_1$ to $LF_N$, as shown in Table 110.

TABLE 110

| Present Invention | | | | |
|---|---|---|---|---|
| Title: Set Of N lists as set $LF_1$ to $LF_N$ | | | | |
| Cube Width | g | | | w |
| Parts | 2N | N+1 | N | 1 |
| list $Lw_N$ | [X.... | ..X | 1X.. | ..X] |
| list $Lw_{N-1}$ | [X.... | ..X | X1X. | ..X] |
| | | — | | |
| | | — | | |
| | | — | | |
| list $Lw_2$ | [X.... | ..X | X... | .X1X] |
| list $Lw_1$ | [X.... | ..X | X... | ..X1] |

Note: list $LF_j$ = list $Lw_j$ (c) Obtain the set of N lists for a 2 variable subtraction and call set Li or instruction set of lists.

(d) Apply Li/LF knowledge to generate set of lists for variable fA. Any list($LfA_j$) in the set of N lists for variable fA will appear in the below Table 111 list format.

TABLE 111

| Title: One of N lists for variable fA | | | | |
|---|---|---|---|---|
| Cube Width | g | | | w |
| Parts | 2N | N+1 | N | 1 |
| 1st Cube | [----valid--- | | | ---valid---] |
| | | — | | |
| | | — | | |
| | | — | | |
| last Cube | [----valid--- | | | ---valid---] |

(Step 4): fourth use the condition 1 instruction list for 'f'.

(a) Use Rule 2 input cubes and Rule 6 for set of lists for number 10 or binary number 0 . . . 01010 and call this set of N lists as set $LF_1$ to $LF_N$, as shown in Table 112.

TABLE 112

| Present Invention | | | | |
|---|---|---|---|---|
| Title: Set Of N lists as set $LF_1$ to $LF_N$ For Set Of Lists For Number 10 Or Binary Number 0. . . . . .01010 | | | | |
| Cube Width | g | | | w |
| Parts | 2N | N+1 | N | 1 |
| list $L10_1$ | [N. . . | . . N | N. . . | . N] |
| list $L10_2$ | [X. . . | . . X | X. . . | . X] |

TABLE 112-continued

| | | | | |
|---|---|---|---|---|
| list $L10_3$ | [N. . . | . . N | N. . . | . N] |
| list $L10_4$ | [X. . . | . . X | X. . . | . X] |
| list $L10_5$ | [N. . . | . . N | N. . . | . N] |
| | | — | | |
| | | — | | |
| | | — | | |
| list $L10_N$ | [N. . . | . . N | N. . . | . N] |

(b) Use Rule 6 for set of lists for variable fA and call this set of N lists as set $LF_{N+1}$ to $LF_{2N}$. Since the resultant list set for variable f will be 2N parts, the fA cube width need not be widened to 3N parts, as shown in Table 113.

TABLE 113

| Present Invention | | | | |
|---|---|---|---|---|
| Title: The resultant list set for variable f will be 2N parts | | | | |
| Cube Width | g | | w | |
| Parts | 2N | N+1 | N | 1 |
| 1st Cube | [----valid--- | | ---valid---] | |
| | | — | | |
| | | — | | |
| | | — | | |
| last Cube | [----valid--- | | ---valid---] | |

(c) Obtain the set of N lists for a 2 variable subtraction and call set Li or instruction set of lists.

(d) Appply Li/LF knowledge to generate set of lists for variable f. Any list ($Lf_j$) in the set of N lists for variable f will appear in the below Table 114 list format.

TABLE 114

| Present Invention | | | | |
|---|---|---|---|---|
| Title: One Of N lists for variable f | | | | |
| Cube Width | g | | w | |
| Parts | 2N | N+1 | N | 1 |
| 1st Cube | [----valid--- | | ---valid---] | |
| | | — | | |
| | | — | | |
| | | — | | |
| last Cube | [----valid--- | | ---valid---] | |

The instruction cubes for the N resolution bits of f(w,g=2) are in Table 115.

TABLE 115

| Title: Instruction Lists For N Resolution Bits Of f(w,g=2) | | |
|---|---|---|
| | Instruction Cubes For Condition 1 Of (f>0) | |
| | Instruction Cubes | / List Instructions |
| Cube Width | $f_N$ $f_{N-1}$ ... $f_2$ $f_1$ | /Are Cube Equations |
| Parts | N ... 1 | / Below Table |
| row 1 | 0 1 X. . . . . . . . . . . .X X | / (256) for row 1 |
| row 2 | 0 0 1 X. . . . . . . . .X X | / (258) for row 2 |
| | — | |
| | — | |
| | — | |
| row N−1 | 0. . . . . . . . . . . . . . . .0 1 X | / (260) for row N−1 |
| row N | 0. . . . . . . . . . . . . . . . . . .0 1 | / (262) for row N |

Table 115 can be written as equations (256) thru (262).

List Of Cube Equations Per Row_j In Table 115

$$\text{row\_1\_list } (NOT(Lf_{2N})\cdot AND\cdot Lf_{2N-1}) \tag{256}$$

$$\text{row\_2\_list } (NOT(Lf_{2N})\cdot AND\cdot (NOT(Lf_{2N-1}))\cdot AND\cdot Lf_{2N-2})) \tag{258}$$

—
—
—

$$\text{row\_N-1\_list } Lf_2 \cdot \underset{j=3}{\overset{N}{AND}} \cdot (NOT(Lf_j)) \tag{260}$$

$$\text{row\_N\_list } Lf_1 \cdot \underset{j=2}{\overset{N}{AND}} \cdot (NOT(Lf_j)) \tag{262}$$

The equation (264) below is an example to show how list(f>0) is derived, afte rthe first instruction cube or row=1, $$List(f>0) = (NOT(Lf_{2N})\cdot AND\cdot Lf_{2N-1}) \cdot OR\cdot \left( \underset{row=2}{\overset{2N}{OR}} \left( Lf_{N+1-row} \underset{j=N+2-row}{\overset{N}{\cdot AND\cdot}} (NOT(Lf_j)) \right) \right) \tag{264}$$

The equation (268) below is an example to show how list(f>0) is derived, after the second instruction cube or row=2, $$\begin{aligned} List(f>0) &= ((NOT(Lf_{2N}))\cdot AND\cdot (NOT(Lf_{2N-1})).AND.Lf_{2N-2}) \\ &\cdot OR\cdot (NOT(Lf_{2N})\cdot AND\cdot Lf_{2N-1}) \\ &\cdot OR\cdot \left( \underset{row=3}{\overset{2N}{}} \; Lf_{N+1-row} \underset{j=N+2-row}{\overset{N}{\cdot AND\cdot}} ( NOT(Lf_j) ) \right) \end{aligned} \tag{268}$$

List(NOT)(f>0)) is defined in equation (270).

$$list(NOT(f>0)) = \cup(\#) \text{ list } (f>0) \tag{270}$$

The three constrainst (a,b,c) need to limit both list (f>0) and list (NOT(f>0)).

Flow Chart Constrainst are redefined, below.

$$(1)\ g-20w>0 \tag{216}$$

$$(2)\ w>0 \tag{222}$$

$$(3)\ g>0 \tag{224}$$

The below logic equations (271) and (272) include these three constrainst in a list.

$$List_{NEW}(f>0) = list((f>0).AND.(\text{list of the 3 constrainst})) \tag{271}$$

TABLE 116

| Present Invention | | | | |
|---|---|---|---|---|
| Title: Resultant List Format Of First Cube Of Function In Equation (271), or $List_{NEW}$(f(w,g)>0). | | | | |
| Cube Width | g | | w | |
| Parts | 2N | N+1 | N | 1 |
| 1st Cube | [1 --valid--- | | 1 --valid--] | |

$$List_{NEW}(NOT(f>0)) = list((NOT(f>0)).AND.(\text{list of the 3 constraints})) \tag{272}$$

TABLE 117

| Present Invention | | | | |
|---|---|---|---|---|
| Title: $List_{NEW}$(NOT(f(w,g)>0)) | | | | |
| Cube Width | g | | w | |
| Parts | 2N | N+1 | N | 1 |
| 1st Cube | [1 --valid--- | | 1 --valid--] | |

Single list for f(w,g)>0 and single list for NOT(f(w,g)>0) are generated so far.

```
FlowChart
  f=g-w-10                                  (226)
IF(f>0) then                                (274)
    z = gw
Else
    z = 17                                  (276)
Endif
```

The logic equation (278) of lists of the above flow chart is:

List(z) = list(gw)·AND·(list(f>0)·AND·(3 Constraints)) ·OR·(list(17)·AND·(list(NOT(f>0))·AND·(3 Constraints)), (278)
where the 3 constraints are a, b, c of step 4.

Step 1 Generator Of Lists for 'gw':

(a) Use Rule 1 input cubes and Rule 6 for set of lists for variable g and call this set of N lists as set LF. Set LF is to be transformed by set Li, which is, in this problem, a 2 variable multiplier set of close boolean minimizations, as shown in Table 118.

TABLE 118

| Present Invention | | | | |
|---|---|---|---|---|
| Title: A Set Of 2 variable multiplier set of close boolean minimizations | | | | |
| Cube Width | g | | w | |
| Parts | 2N | N+1 | N | 1 |
| List $LF_{2N}$ | [1X. . . | . . X | X. . . | . . X] |
| list $LF_{2N-1}$ | [X1X. . | . . X | X. . . | . . X] |
| | | — | | |
| | | — | | |
| | | — | | |
| list $LF_{N+2}$ | [X. . . . | .X1X | X. . . | . . X] |
| list $LF_{N+1}$ | [X. . . . | . X1 | X. . . | . . X] |
| Note: list $LF_j$ = list $Lg_{j-N}$ | | | | |

(b) Use Rule 1 input cubes and Rule 6 for set of lists for variable w and call this set of N lists as set LF, as shown in Table 119.

TABLE 119

| Present Invention | | | | |
|---|---|---|---|---|
| Title: Set Of N lists as set LF | | | | |
| Cube Width | g | | w | |
| Parts | 2N | N+1 | N | 1 |
| list $LF_N$ | [X. . . . | . . X | 1X. . | . . X] |
| list $LF_{N-1}$ | [X. . . . | . . X | X1X. | . . X] |
| | | — | | |
| | | — | | |
| | | — | | |
| list $LF_2$ | [X. . . . | . . X | X. . . | .X1X] |
| list $LF_1$ | [X. . . . | . . X | X. . . | . X1] |
| Note: list $LF_j$ = list $Lw_j$ | | | | |

(c) Obtain the set of N lists for a 2 variable multiplier as the generated list from the Computer Program Listing Number 4 and call this set Li or instruction set of lists. Note: the 2 input variables are defined and shown as non signed variables, but the variables could be floating point format.

(d) Apply Li/LF knowledge to generate set of lists for variable gw. Any list($Lgw_j$) in the set of N lists for variable gw will appear in the below Table 120 list format.

TABLE 120

| Present Invention | | | | |
|---|---|---|---|---|
| Title: One of N lists for variable gw | | | | |
| Cube Width | g | | w | |
| Parts | 2N | N+1 | N | 1 |
| 1st Cube | [----valid--- | | ---valid---] | |
| | | — | | |
| | | — | | |
| | | — | | |
| last Cube | [----valid--- | | ---valid---] | |

The set of lists for variable z are in equations (280) and (282).

List($z_1$)=list($gw_1$).AND.(list(f>0).AND.(3 Constraints)).OR.list(17).AND.(list(NOT(f>0)).AND.(3 Constraints)) (280)

List($z_N$)=list($gw_N$).AND.(list(f>0).AND.(3 Constraints)).OR.(list(17).AND.(list(NOT(f>0)).AND.(3 Constraints)) (282)

The lists for the resolution bits of zA or zA(g,w) have cubes of 2N parts, as shown below in a list format for list($zA_j$), as shown in Table 121.

TABLE 121

| Present Invention | | | | |
|---|---|---|---|---|
| Title: List format for List($zA_j$) | | | | |
| Cube Width | q | | w | |
| Parts | 2N | N+1 | N | 1 |
| 1st Cube | [----valid--- | | ---valid---] | |
| | | — | | |
| | | — | | |
| | | — | | |
| last Cube | [----valid--- | | ---valid---] | |

This above list represents a zA list in a set of lists for variable zA, as described in equation (284), where $$zA=gw. \quad (284)$$

List(zB) consists of Rule 2 cubes for the number 17 or a binary 0 . . . 010001 in 562 parts, where list($zB_j$) is a universe cube for $zB_j$, when part j equals 1 and 5 and list($zB_j$) is a null cube for $zB_j$, when part j equals 2, 3, 4, and greater than 5.

(a) Use Rule 2 input cubes and Rule 6 for set of lists for number 20 or binary number 0 . . . 010100 and call this set of N lists as set $LF_{n+1}$ to $LF_{2N}$, as shown in Table 122.

TABLE 122

| Present Invention | | | | |
|---|---|---|---|---|
| Title: Set Of N lists as set $LF_{N+1}$ to $LF_{2N}$ For The Number 17 Or A Binary 0. . . . . .010001 | | | | |
| Cube Width Parts | 2N | g N+1 | N | w 1 |
| list $L20_1$ | [N. . . | . . N | N. . . | . N] |
| list $L20_2$ | [N. . . | . . N | N. . . | . N] |
| list $L20_3$ | [X. . . | . . X | X. . . | . X] |
| list $L20_4$ | [N. . . | . . N | N. . . | . N] |
| list $L20_5$ | [X. . . | . . X | X. . . | . X] |
| list $L20_6$ | [N. . . | . . N | N. . . | . N] |
| | | — | | |
| | | — | | |
| | | — | | |
| list $L20_N$ | [N. . . | . . N | N. . . | . N] |

A list equation for variable zC is described in equation (286).

$$\text{Let } zC=zA.\text{AND}.(f>0) \tag{286}$$

List LzCj will have cubes of 2N parts, as shown below in a list format in Table 123 for list($zC_j$).

TABLE 123

| Present Invention | | |
|---|---|---|
| Title: List format for list($zC_j$) | | |
| Cube Width Parts | 2N q N+1 | N w 1 |
| 1st Cube | [----valid--- | ---valid---] |
| | — | |
| | — | |
| | — | |
| last Cube | [----valid--- | ---valid---] |

A list equation for variable zD is described in equation (288).

$$\text{Let } zD=zB.\text{AND}.(\text{NOT}(f>0)) \tag{288}$$

List zD will have cubes of 2N parts, as shown below in a list format in Table 124 for list($zD_j$).

TABLE 124

| Present Invention | | |
|---|---|---|
| Title: List format for list($zD_j$) | | |
| Cube Width Parts | 2N q N+1 | N w 1 |
| 1st Cube | [----valid--- | ---valid---] |
| | — | |
| | — | |
| | — | |
| last Cube | [----valid--- | ---valid---] |

Generate set of lists for zC, in equation (290), where $$zC=zA.\text{AND}.(f>0), \tag{290}$$

List(zD) consists of Rule 2 cubes for the number 17 or a binary 0 . . . 010001, where list ($z_{Dj}$) is a universe cube for $zD_j$, when part j equals 1 and 5 and list($zB_j$) is a null cube for $zD_j$, when part j equals 2, 3, 4, and greater than 5.

List($z_j$) for variable z is defined in equations (292) to (296).

$$\text{List}(z_j)=(\text{list}(zC_j)).\text{OR}.(\text{list}(zDC_j)) \tag{292}$$

Definition Of List($z_j$):

$$\text{List}(z_1) = (\text{list}(zC_1)).\text{OR}.(\text{list}(zD_1)) \tag{294}$$

—

—

—

$$\text{List}(z_{562}) = (\text{list}(zC_{562})).\text{OR}.(\text{list}(zD_{562})) \tag{296}$$

Set of lists for variable z are generated so far.

End Of Application Note 1

- Applicatoin Note 2 -

Application Note 2: Finding The Roots Of Both A Linear And A Non Linear Mathematical Function Purpose: The real roots of variable 'y' of a linear equation (298) with variable 'z' set to zero are in list $L_{z=0}$, where $L_{z=0}$ is defined in equation (300).

$$z = y^2 + y - 2 \tag{298}$$

$$L_{z=0} = \underset{j=1}{\overset{N}{\text{AND}}} \left( \text{NOT}(Lz_j) \right) \tag{300}$$

The list $L_{x=0}$ is shown in Table 125

TABLE 125

| Present Invention | | | |
|---|---|---|---|
| Title: Listing Of Real 'y' values or format, the list $L_{z=0}$ Sign is either 0 for + or positive, or else 1 for − or negative. | | | |
| Sign Bit | MSB | LSB | Sign Decimal |
| 0 | 0 0 ... | ...0 1 0 | +2 |
| 1 | 0 0 ... | ...0 0 1 | −1 |

The instruction lists for N resolution bits of f(w,g=2), from Condition 1, are in Table 126.

TABLE 126

| Present Invention | | |
|---|---|---|
| Title: An Instruction List For N Resolution Bits Of f(w,g=2), From Condition 1 | | |
| | Instruction Cubes For Condition 1 Of (f>0) Instruction Cubes | / List Instructions |
| Cube Width Parts | $f_N$ $F_{N-1}$ N . . . $f_2$ $f_1$ 1 | /Are Cube Equations /Below Table 116 |
| row 1 cube | 0 1 X. . . . . . . . . . . .X X | / (302) for row 1 |
| row 2 cube | 0 0 1 X. . . . . . . . .X X | / (304) for row 2 |
| | — | |
| | — | |
| | — | |
| row N−1 cube | 0. . . . . . . . . . . . . . . .0 1 X | / (306) for row N−1 |
| row N cube | 0. . . . . . . . . . . . . . . . . . .0 1 | / (308) for row N |

Table 126 can be written as equations (302) thru (308).

List of Cube Equations $$(\text{NOT}(Lf_{2N})\cdot\text{AND}\cdot Lf_{2N-1}) \tag{302}$$

$$(\text{NOT}(Lf_{2N})\cdot\text{AND}\cdot(\text{NOT}(Lf_{2N-1}))\cdot\text{AND}\cdot Lf_{2N-2})) \tag{304}$$

-continued

—
—
—

$$Lf_2 \cdot AND \cdot \mathop{AND}_{j=3}^{N} (\,NOT(Lf_j)\,) \quad (306)$$

$$Lf_1 \cdot AND \cdot \mathop{AND}_{j=2}^{N} (\,NOT(Lf_j)\,) \quad (308)$$

The equation (310) below is an example to show how list(f>0) is derived, after the first instruction cube or row=1, $$List(f>0) = (NOT(Lf_{2N}) \cdot AND \cdot Lf_{2N-1}) \cdot OR \cdot \left( \mathop{OR}_{row=2}^{2N} Lf_{N+1-row} \cdot AND \cdot \left( \mathop{AND}_{j=N+2-row}^{N} NOT(Lf_j) \right) \right) \quad (310)$$

The equation (312) below is an example to show how list(f>0) is derived, after ths econd instruction cube or row=2, $$List(f>0) = ((NOT(Lf_{2N})) \cdot AND \cdot (NOT(Lf_{2N-1})) \cdot AND \cdot Lf_{2N-2}) \cdot OR \cdot (NOT(Lf_{2N}) \cdot AND \cdot Lf_{2N-1}) \cdot OR \cdot \left( \mathop{OR}_{row=3}^{2N} Lf_{N+1-row} \cdot AND \cdot \left( \mathop{AND}_{j=N+2-row}^{N} NOT(Lf_j) \right) \right) \quad (312)$$

List(NOT($f$>0)) is defined in equation (314)

$$list(NOT(f>0)) = \cup(\#)\ list\ (f>0) \quad (314)$$

Single list for f>0 and single list for NOT(f>0) are generated so far.

Flow Chart For A Non Linear Function

The constraint of 'f>0' belonging to variable z when $z=y_1y_2y_3$ makes the below flowchart for variable z non linear.

$$f = y_2 - y_3 \quad (315)$$

```
IF(f>0) then                                        (316)
    z = y1y2y3 , three number multiplication
Else
    z = 17                                          (276)
Endif
```

The logic equation (318) of lists of the above flow chart is:

$$List(z)=list(y_1y_2y_3).AND.(f>0)).OR.(list(17).AND.(NOT(f>0)))(318)$$

$z_j$=list$_j$ of groups of the three variables $y_1$, $y_2$, and $y_3$, and are typically one list as shown in Table 127.

TABLE 127

| Present Invention | | | | | | |
|---|---|---|---|---|---|---|
| Title: List$_j$ of group of the three variables $y_1$, $y_2$, and $y_3$ | | | | | | |
| Cube Width | $y_1$ | | $y_2$ | | $y_3$ | |
| Parts | 3N | 2N+1 | 2N | N+1 | N | 1 |
| 1st Cube | [----valid--- | | ---valid--- | | ---valid---] | |
| | | | — | | | |
| | | | — | | | |
| | | | — | | | |
| last Cube | [----valid--- | | ---valid--- | | ---valid---] | |

The jth resolution bit of z, having N resolution bits, is 1 or the true voltage logic state, for the lists in Table 127.

The list for 'f>0' can be described in equation (320).

$$list(f>0) = \mathop{\cdot OR \cdot}_{row=1}^{N} \left( Lf_{N+1-row} \mathop{\cdot AND \cdot}_{j=N+2-row}^{N} (\,NOT(Lf_j)\,) \right), \quad (320)$$

where row is the number of the instruction cube in the below list, and $Lf_1$ is the list for the ith resolution bit of variable $f(y_2,y_3)$.

Generation Of Lists For Step 1:

(a) Use Rule 1 input cubes and Rule 6 for set of lists for variable $y_1$ and call this set of 2N lists as set LF.

(b) Use Rule 1 input cubes and Rule 6 for set of lists for variable $y_2$ and call this set of 2N lists as set LF.

(c) Obtain the set of N lists for a 2 variable multiplier and call set Li or instruction set of lists, (d) Apply Li/LF knowledge to generate set of lists for variable w.

The lists for the resolution bits of w or $w(y_1,y_2)$ have cubes of 2N parts, as shown below in Table 128 in a list format.

TABLE 128

| Present Invention | | | | |
|---|---|---|---|---|
| Title: One Of The Lists for the resolution bits of w or $w(y_1,y_2)$ | | | | |
| Cube Width | $y_1$ | | $y_2$ | |
| Parts | 2N | N+1 | N | 1 |
| 1st Cube | [----valid--- | | ---valid---] | |
| | | — | | |
| | | — | | |
| | | — | | |
| last Cube | [----valid--- | | ---valid---] | |

Generation Of Lists For Step 2:

(a) Use Rule 1 input cubes and Rule 6 for set of lists for each variable $y_1$ and call these 2N lists as set LF.

(b) Use Rule 1 input cubes and Rule 6 for set of lists for each variable $y_1$ and call these 2N lists as set LF.

(c) Obtain the set of N lists for a 2 variable multiplier and tall set Li or instruction set of lists, (d) Apply Li/LF knowledge to generate set of lists for variable w.

$$zE = wy_3 \quad (322)$$

Generation Of Lists For Step 1:

(a) Use Rule 1 input cubes and Rule 6 for set of lists for variable $y_1$ and call this set of 2N lists as set LF.

(b) Use Rule 1 input cubes and Rule 6 for set of lists for variable $y_2$ and call this set of 2N lists as set LF.

(c) Obtain the set of N lists for a 2 variable multiplier and call set Li or instruction set of lists, (d) Apply Li/LF knowledge to generate set of lists for variable w.

The lists for the resolution bits of variable zE or variable $zE(w,y_3)$ in equation (322) hae cubes of 2N parts, as shown in Table 129 below in a list format for list($zA_j$).

TABLE 129

| Present Invention | | | | |
|---|---|---|---|---|
| Title: The List format for list($zA_j$) | | | | |
| Cube Width | w | | $y_3$ | |
| Parts | 2N | N+1 | N | 1 |
| 1st Cube | [----valid--- | | ---valid---] | |
| | | — | | |
| | | — | | |
| | | — | | |
| last Cube | [---valid--- | | ---valid---] | |

Generation Of Lists For Step 1:

(a) Use Rule 1 input cubes and Rule 6 for set of lists for variable $y_1$ and call this set of 2N lists as set LF.

(b) Use Rule 1 input cubes and Rule 6 for set of lists for variable $y_2$ and call this set of 2N lists as set LF.

(c) Obtain the set of N lists for a 2 variable multiplier and call set Li or instruction set of lists, (d) Apply Li/LF knowledge to generate set of lists for variable w.

The lists for the resolution bits of zA or $zA(y_1,y_2,y_3)$ have cubes of 3N parts, as shown in Table 130 below in a list format for list($zA_3$).

TABLE 130

| Present Invention | | | | | | |
|---|---|---|---|---|---|---|
| Title: One Of Lists for the resolution bits of zA or $zA(y_1,y_2,y_3)$ | | | | | | |
| Cube Width | $y_1$ | | $y_2$ | | $y_3$ | |
| Parts | 3N | 2N+1 | 2N | N+1 | N | 1 |
| 1st Cube | [----valid--- | | ---valid--- | | ---valid---] | |
| | | | — | | | |
| | | | — | | | |
| | | | — | | | |
| last Cube | [---valid--- | | ---valid--- | | ---valid---] | |

This above list represents a zA list in a set of lists for variable zA, in equation (324) where $$zA=y_1y_2y_3. \tag{324}$$

List(zB) consists of Rule 2 cubes for the number 17 or a binary 0 . . . 010001 in 562 parts, where list($zB_j$) is a universe cube for $zB_j$, when part j equals 1 and 5 and list($zB_j$) is a null cube for $zB_j$, when part j equals 2, 3, 4, and greater than 5. Variables zC and zD are defined in list equations (326) and (328).

$$\text{Let } zC=zA.\text{AND}.(f>0) \tag{326}$$

$$\text{Let } zD=zB.\text{AND}.(\text{NOT}(f>0)) \tag{328}$$

Generate set of lists for zC, where zC=zA.AND.(f>0),

List(zD) consists of Rule 2 cubes for the number 17 or a binary 0 . . . 010001, where list($z_{Dj}$) is a universe cube for $zD_j$, when part j equals 1 and 5 and list($zB_j$) is a null cube for $zD_j$, when part j equals 2, 3, 4, and greater than 5. List($z_j$) for variable z is defined in list equations (330) and (334).

$$\text{List}(z_j)=(\text{list}(zC_j)).\text{OR}.(\text{list}(zDC_j)) \tag{330}$$

Definition Of List($z_j$):

$$\text{List}(z_1) = (\text{list}(zC_1)).\text{OR}.(\text{list}(zD_1)) \tag{332}$$

—

—

—

$$\text{List}(z_{562}) = (\text{list}(zC_{562})).\text{OR}.(\text{list}(zD_{562})) \tag{334}$$

Set of lists for variable z are generated so far.

3 Number Factoring Flow Chart

Variable C is defined in equation 336).

(1)

$$C=D-z \tag{336}$$

(2) set of lists for variable z have been generated.

(3) Since D is a given number of '17', the set of lists for D will consist of Rule 2 cubes.

(4) Factoring with C=0 requires the utilization of condition 2 or cube instruction [X0 . . . 0], see (6) below.

(5) Generation of the set of lists for variable C will require the set of lists for subtraction to be the Li instruction set of lists. LF set of lists has been generated prior to this step. Li/LF knowledge will generate the set of lists for C.

(6) The only list(Output) will be list(C=0), as shown in Table 131.

List(c=0) or thus list(output=0) was derived by equation (338).

$$\text{List(Output)}=(\text{List}(f>0)).\text{AND}.(\text{List}Lz_j)) \tag{338}$$

TABLE 131

| Present Invention | | |
|---|---|---|
| Title: List(Output) | | |
| Cube Instruction | | List Instruction C |
| Parts | N | 1 |
| Only Cube | [X0... | ...0] |

Table 131 can be described in equation (340).

$$\text{list}(C=0) = \underset{j=1}{\overset{N-1}{\text{AND}}} \left( \text{NOT}(LC_j) \right) \tag{340}$$

(7) The resultant list, which is called list(C=0), contains cubes of 3N parts and is of the same format as a list($zA_j$). This resultant list shows the group of 3 binary numbers to satisfy the constraint and when multiplied together equal the number D.

End of Application note 2

- Application Note 3 -

APplication Note 3: The Intersection Of Any Two Mathematicla Functions

Purpose: The real roots or $x_j$ values of the intersection of equation (342) and equation (344) are generated in a close boolean minimization.

$$y=f_1(x_1, \ldots, x_k) \tag{342}$$

$$z=f_2(x_2, \ldots, x_k) \tag{344}$$

$$w=y-z \tag{346}$$

The functions in equations (342) and (344) can be linear as well as non linear, such as flow chart for a nonlinear function.

The intersection of equations (342) and (344) is achieved, when equation (346) is set to zero by ANDing the NOTed lists $L_{wj}$ in equation (348). List $L_{w=0}$ will contain the real values of the k $$L_{w=0} = \underset{j=1}{\overset{N}{\text{AND}}} \; (\text{NOT}(Lw_j)) \tag{348}$$

variables: $x_1, x_2, \ldots x_k$, where the equation (346) is set to zero. Equation (348) can be described in Table 132.

TABLE 132

| Present Invention | | | |
|---|---|---|---|
| Title: Listing Of Real 'x' values in the cube format | | | |
| Note: list(w=0) looks similar to list($w_j$) | | | |
| | Cubes In List(w=0) Or $L_{w=0}$ | | |
| Buses: | $x_1$ | $x_2$ | $x_R$ |
| Parts: | MSB. . . . . LSB | MSB. . . . . LSB | MSB. . . LSB |
| cube_1 | [ - valid - | - valid - | - valid - ] |
| | — | — | — |
| | — | — | — |
| | — | — | — |
| cube_m | [ - valid - | - valid - | - valid - ] |

Non Linear Function

'w' is redefined in equation (350), which is a typical non linear equation resulting from a flow chart.

$$w=((y-x).\text{AND}.(\text{Condition\_true}\geqq 0).\text{OR}.(y.\text{AND}.(\text{NOT}(\text{Condition\_true}\geqq 0))) \tag{350}$$

List $L_{w=0}$ for equation (350) is generated by these six steps:

(1) generating each list in the set of lists for L(y−x), (2) generating each list in the set of lists for L(y), (3) obtaining the known condition 1 list of f≧0 with f is equal to condition_true, as illustrated in the equation (350), (4) obtaining the known condition 2 list of NOT(f≧0) with f equal to condition_true, as illustrated in the equation (350), (5) list operation for $Lw_j$ is in equation (352).

$$Lw_j=(Lw_{(y-x)}.\text{AND}.L_{f\geqq 0}).\text{OR}.(Lw_y.\text{AND}.(\text{NOT}(L_{f\geqq 0}))) \tag{352}$$

(6) use the equation (348) for $L_{w=0}$.

End of Application Note 3

- Application Note 4 -

For Both Condition 1 Or (f>0) And Condition 2 Or (f=0). Purpose: Factor a 160 digit number into 3 digit numbers, and with a constraint, which is one number must be greater than another number, and one number is independent of the constraint.

Let D be the 160 digit number and let C be the binary representation of D or the 160 digit number. Let $y_1$, $y_2$, and $y_3$ be binary numbers, which are to be determined. Find the '$(y_1,y_2,y_3)$' groups, where when the variables: $y_1$, $y_2$, and $y_3$ are multiplied together, equal the binary representation of this 160 digit number, identiied as ⊂.

Critical aspects of this factoring are defined in equations (354) thru (368).

$$\text{Cube Width}=N \text{ parts, where } N=(160/\log_{10}2). \tag{354}$$

$$\text{Note: } 2^N=10^{160} \tag{356}$$

$$N\log_{10}2=160\log_{10}10 \tag{358}$$

$$\log_{10}2=0.3010 \tag{360}$$

$$\log_{10}10=1 \tag{362}$$

$$N=(160/\log_{10}2). \tag{364}$$

$$N=532 \text{ parts or resolution bits} \tag{366}$$

The logic code generator 2 should probably have 64 part buses or 128 bus wires per data bus, as shown in FIG.'s 16 and 17. A variable zA is defined in equation (368).

$$zA=y_1y_2y_3 \tag{368}$$

Steps required to generate a set of lists for the variable zA. (Step 1): first generating the set of N lists for 'w', defined in equation 369), where $$\text{'}w=y_1y_2\text{'}, \tag{369}$$

Generatio Of Lists For Step 1:

(a) Use Rule 1 input cubes and Rule 6 for set of lists for variable $y_1$ and call this set of 2N lists as set $LF_{n+1}$ to $LF_N$, as shown in Table 133.

TABLE 133

| Present Invention | | | | | |
|---|---|---|---|---|---|
| Title: Set Of 2N lists as set $LF_{N+1}$ to $LF_N$ | | | | | |
| Cube Width | | $y_1$ | | $y_2$ | |
| Parts | | 2N | N+1 | N | 1 |
| list $LF_{2N}$ | or $Ly_{1N}$ | [1X. . . | . . X | X. . . | . . X] |
| list $LF_{2N-1}$ | or $Ly_{1N-1}$ | [X1X. . . | . . X | X. . . | . . X] |
| | | | | — | |
| | | | | — | |
| list $LF_{N+2}$ | or $Ly_{12}$ | [1X. . . | . . X1X | X. . . | . . X] |
| list $LF_{N+1}$ | or $Ly_{11}$ | [X1X. . . | . . X1 | X. . . | . . X] |
| Note: list $LF_j$ = list $Ly_{1(j+N)}$ | | | | | |

(b) Use Rule 1 input cubes and Rule 6 for set of lists for variable $y_2$ and call this set of 2N lists as set $LF_1$ to $LF_N$, as shown in Table 134.

TABLE 134

| Present Invention | | | | | |
|---|---|---|---|---|---|
| Title: Set Of Lists $LF_1$ to $LF_N$ | | | | | |
| Cube Width | | $y_1$ | | $y_2$ | |
| Parts | | 2N | N+1 | N | 1 |
| list $LF_N$ | or $Ly_{2(N)}$ | [X. . . . | . . X | 1X. . . | . . X] |
| list $LF_{N-1}$ | or $Ly_{2(N-1)}$ | [X. . . . . | . . X | X1X. . | . . X] |
| | | | — | | |
| | | | — | | |
| list $LF_2$ | or $Ly_{2(2)}$ | [X. . . | . . . X | X. . . | . X1X] |
| list $LF_1$ | or $Ly_{2(1)}$ | [X. . . | . . . X | X. . . | . X1] |

(c) Obtain the set of N $Ly_{2(j)}$ lists for a 2 variable multiplier as the generated list from the Computer Program Listing Number 4 and call this set Li or instruction set of lists. Note: the 2 input variables are defined and shown as non signed variables, but the variables could be floating point format.

(d) Apply Li/LF knowledge to generate set of lists for variable w. Any list($w_j$) in the set of N lists for variable gw will appear in the below list format.

The lists for the resolution bits of w or $w(y_1,y_2)$ have cubes of 2N parts, as shown below in a list format. Each list($w_j$) or $Lw_j$ will look like the list, as shown below in Table 135.

TABLE 135

Present Invention

Title: One Of The lists for the resolution bits of w or $w(y_1,y_2)$

| Cube Width | $y_1$ | | $y_2$ | |
|---|---|---|---|---|
| Parts | 2N | N+1 | N | 1 |
| 1st Cube | [----valid--- | | ---valid---] | |
| | | — | | |
| | | — | | |
| | | — | | |
| last Cube | [----valid--- | | ---valid---] | |

(Step 2): second generating the set of N lists for 'zA', defined in equation (370), where $$'zA=wy_3', \quad (370)$$

Generation Of Lists For Step 1:

(a) Use Rule 6 for set of lists for variable w and call this set of N lists as set $LF_{N+1}$ to $LF_{2N}$, as shown in Table 136.

TABLE 136

Present Invention

Title: Set Of N lists as set $LP_{N+1}$ to $LF_{2N}$

| Cube Width | $y_1$ | | $y_2$ | | $y_3$ | |
|---|---|---|---|---|---|---|
| Parts | 3N | 2N+1 | 2N | N+1 | N | 1 |
| list $LF_{N+1}$ | [----valid--- | | ---valid--- | | X. . . | . . .X] |
| | | | — | | | |
| | | | — | | | |
| | | | — | | | |
| list $LF_{2N}$ | [----valid--- | | ---valid--- | | X. . . | . . .X] |

Note: list $LF_{N+j}$ = list $Lw_j$ (b) Use Rule 1 input cubes and Rule 6 for set of lists for variable $y_3$ and call this set of N lists as set $LF_1$ to $LF_N$, as shown in Table 137.

TABLE 137

Present Invention

Title: Set Of N lists as set $LF_1$ to $LF_N$

| Cube Width | $y_1$ | | $y_2$ | | $y_3$ | |
|---|---|---|---|---|---|---|
| Parts | 3N | 2N+1 | 2N | N+1 | N | 1 |
| list $LF_N$ | [X. . . | . .X | X. . . | . . .X | 1X. . . | . . .X] |
| list $LF_{N-1}$ | [X. . . | . .X | X. . . | . . .X | X1X. . | . . .X] |
| | | | | — | | |
| | | | | — | | |
| list $LF_2$ | [X. . . | . .X | X. . . | . . .X | X. . . | . .X1X] |
| list $LF_1$ | [X. . . | . .X | X. . . | . . .X | X. . . | . . .X1] |

Note: list $LF_j$ = list $Ly_{3j}$ (c) Obtain the set of N lists for a 2 variable multiplier as the generated list from the Computer Program Listing Number 4 and call this set Li or instruction set of lists. Note: the 2 input variables could be floating point format.

(d) Apply Li/LF knowledge to generate set of lists for variable zA. Any list($zA_j$) in the set of N lists for variable zA will appear in the below list format.

The lists for the resolution bits of zA or $zA(y_1,y_2, y_3)$ have cubes of 3N parts, as shown below in a list format. Each list($L_{zAj}$) or $L_{zAj}$ will look like the list, as shown below in Table 138.

TABLE 138

Present Invention

Title One OF The lists for the resolution bits of zA or $zA(y_1,y_2,y_3)$

| Cube Width | $y_1$ | | $y_2$ | | $y_3$ | |
|---|---|---|---|---|---|---|
| Parts | 3N | 2N+1 | 2N | N+1 | N | 1 |
| 1st Cube | [----valid--- | | ---valid--- | | ---valid---] | |
| | | | — | | | |
| | | | — | | | |
| | | | — | | | |
| last Cube | [----valid--- | | ---valid--- | | ---valid---] | |

Constraint: One number is greater than another.

One constraint condition is defined in equation (372), (374), and (376).

Constraint:

$$y_2>y_3 \quad (372)$$

or $$(y_2-y_3)>0 \quad (374)$$

or $$f=(y_2-y_3)>0 \quad (376)$$

The list for 'f>0' will be generated with condition instruction cubes.

(Step 3): third generating the set of lists for 'f',

Generation of Lists for Step 1:

(a) Use Rule 1 input cubes and Rule 6 for set of lists for variable $y_2$ and call this set of lists as set $LF_{N+1}$ to $LF_{2N}$, as shown in Table 139.

TABLE 139

Present Invention

Title: Set Of Lists as set $LF_{N+1}$ to $LF_{2N}$

| Cube Width | $y_2$ | | $y_3$ | |
|---|---|---|---|---|
| Parts | 2N | N+1 | N | 1 |
| list $LF_{2N}$ | [1X. . . | . . X | X. . . | . . X] |
| list $LF_{2N-1}$ | [X1X. . . | . . X | X. . . | . . X] |
| | | — | | |
| | | — | | |
| list $LF_{N+2}$ | [1X. . . | . . X1X | X. . . | . . X] |
| list $LF_{N+1}$ | [X1X. . . | . X1 | X. . . | . . X] |

Note: list $LF_{N+j}$ = list $Ly2_j$ (b) Use Rule 1 input cubes and Rule 6 for set of lists for variable $y_3$ and call this set of N lists as set $LF_1$ to $LF_N$, as shown in Table 140.

TABLE 140

Present Invention

Title: Set Of N lists as set $LF_1$ to $LF_N$

| Cube Width | $y_2$ | | $y_3$ | |
|---|---|---|---|---|
| Parts | 2N | N+1 | N | 1 |
| list $Ly3_N$ | [X. . . . | . . X | 1X. . . | . X] |
| list $Ly3_{N-1}$ | [X. . . . . | . . X | X1X. . | . . X] |
| | | — | | |
| | | — | | |

TABLE 140-continued

| | | | | |
|---|---|---|---|---|
| list $Ly3_2$ | [X. . . | . . . X | X. . . | . X1X] |
| list $Ly3_1$ | [X. . . | . . . X | X. . . | . X1] |

Note: list $LF_j$ = list $Ly3_j$ (c) Obtain the set of N lists for a 2 variable subtraction as the generated list from the Computer Program Listing Number 4 and call this set Li or instruction set of lists. Note: the 2 input variables are defined and shown as non signed variables, but the variables could be floating point format.

(d) Apply Li/LF knowledge to generate set of lists for variable f. Any list $Lf_j$ in the set of N lists for variable f will appear in the below list format.

The lists for the resolution bits of f or $f(y_2,y_3)$ have cubes of 2N parts, as shown below in a list format. Each list($f_j$) or $Lf_j$ will look like the list, as shown below in Table 141.

TABLE 141

Present Invention

Title: The list for the resolution bits of f or $f(y_2,y_3)$

| Cube Width Parts | $y_2$ 2N N+1 | $y_3$ N 1 |
|---|---|---|
| 1st Cube | [----valid--- | ---valid---] |
| | — | |
| | — | |
| | — | |
| last Cube | [----valid--- | ---valid---] |

The instruction lists of f(w,g) for N resolution bits of f(w,g) are shown in Table 142.

TABLE 142

Present Invention

Title: Instruction Lists For N Resolution Bits Of $f(y_2,y_3)>0$.
Instruction Cubes for Condition 1 Of (f>0)

| Cube Width Parts: | Instruction Cubes $f_N$ $f_{N-1}$ N ... $f_2$ $f_1$ 1 | / List Instructions /Are Cube Equations / Below Table |
|---|---|---|
| row 1 cube: | 0 1 X. . . . . . . . . . . .X X | / (378) for row 1 |
| row 2 cube | 0 0 1 X. . . . . . . . .X X | / (380) for row 2 |
| | — | |
| | — | |
| | — | |
| row N−1 cube | 0. . . . . . . . . . . . . . . .0 1 X | / (382) for row N−1 |
| row N cube | 0. . . . . . . . . . . . . . . . . . .0 1 | / (384) for row N |

Table 142 can be written as equation (378) thru (382).

List of Cube Equations $$(NOT(Lf_{2N})\cdot AND\cdot Lf_{2N-1}) \quad (378)$$

$$(NOT(Lf_{2N})\cdot AND\cdot (NOT(Lf_{2n-1}))\cdot AND\cdot Lf_{2N-}2)) \quad (380)$$

—

—

—

$$Lf_2\cdot AND\cdot \left( \mathop{}_{j=3}^{N} NOT(Lf_j) \right) \quad (382)$$

$$Lf_1\cdot AND\cdot \left( \mathop{}_{j=2}^{N} NOT(Lf_j) \right) \quad (384)$$

The equation (386) below is an example to show how list(f>0) is derived, after the first instruction cube or row=1, $$List(f>0) = (NOT(Lf_{2N})\cdot AND\cdot Lf_{2N-1}) \cdot OR\cdot \left( \mathop{OR}_{row=2}^{2N} Lf_{N+1-row}\cdot AND\cdot \left( \mathop{}_{j=N+2-row}^{N} NOT(Lf_j) \right) \right) \quad (386)$$

The equation (388) below is an example to show how list(f>0) is derived, after the second instruction cube or row=2, $$\begin{aligned} List(f>0) = & ((NOT(Lf_{2N}))\cdot AND\cdot (NOT(Lf_{2N-1}))\cdot AND\cdot Lf_{2N-2}) \\ & \cdot OR\cdot (NOT(Lf_{2N})\cdot AND\cdot Lf_{2N-1}) \\ & \mathop{\cdot OR\cdot}_{row=3}^{2N} \left( Lf_{N+1-row} \mathop{\cdot AND\cdot}_{j=N+2-row}^{N} (NOT(Lf_j)) \right) \end{aligned} \quad (388)$$

List(NOT(f>0)) is defined in equation (389).

$$list(NOT(f>0)) = U\ (\#)\ list(f>0) \quad (389)$$

Single list for f>0 and single list for NOT(f>0) are generated so far and each list for 'f>0' and 'NOT(f>0)' will look like the below list in Table 143.

TABLE 143

Present Invention

Title: List for 'f>0' or 'NOT(f>0)'

| Cube Width Parts | $y_1$ 3N | 2N+1 | $y_2$ 2N | N+1 | $y_3$ N | 1 |
|---|---|---|---|---|---|---|
| 1st Cube | [X... | ....X | ---valid--- | | ---valid---] | |
| | | | — | | | |
| | | | — | | | |
| | | | — | | | |
| last Cube | [X... | ....X | ---valid--- | | ---valid---] | |

The below flow chart is described in equation (390) to (398).

Flow Chart $f = y_2 - y_3$ (390)

IF(f>0) then $z = y_1 y_2 y_3$ , three number multiplication (392)

$zA = y_1 y_2 y_3$ , three number multiplication (394)

Else z = 17 or a binary integer of 0 . . . . . . 010001 (396)

zB = 17 (398)

Endif

The set of lists for variable zB or equation (398)is shown in Table 144.

TABLE 144

Present Invention

Title: Set Of Lists $LzB_j$ For A Binary Integer Of 0... ...010001
Note: List(17) = list(zB)

Rule 2 Lists

| Cube Width Parts | $y_1$ 3N | 2N+1 | $y_2$ 2N | N+1 | $y_3$ N | 1 |
|---|---|---|---|---|---|---|
| List($zB_1$) | [X... | ...X | X.. | ...X | X... | ...X] |
| List($zB_2$) | [N... | ...N | N.. | ...N | N... | ...N] |
| List($zB_3$) | [N... | ...N | N.. | ...N | N... | ...N] |

TABLE 144-continued

| | | | | | | |
|---|---|---|---|---|---|---|
| $List(zB_4)$ | [N... | ...N | N.. | ...N | N... | ...N] |
| $List(zB_5)$ | [X... | ...X | X.. | ...X | X... | ...X] |
| $List(zB_6)$ | [N... | ...N | N.. | ...N | N... | ...N] |
| | | | — | | | |
| | | | — | | | |
| | | | — | | | |
| $List(zB_{562})$ | [N... | ...N | N.. | ...N | N... | ...N] |

The logic equations (400) thru (406) of lists of the above flow chart are:

$$List(z)=list(zA(y_1y_2y_3)).AND.(f>0)) .OR.(list(17).AND.(NOT(f>0))) \quad (400)$$

$$List(z_1)=list(zA(y_1y_2y_3)_1).AND.(f>0)) .OR.(list(zB_1).AND.(NOT(f>0))) \quad (402)$$

$$List(z_j)=list(zA(y_1y_2y_3)_j).AND.(f>0)) .OR.(list(zB_j).AND.(NOT(f>0))) \quad (404)$$

$$List(z_{562})=list(zA(y_1y_2y_3)_{562}).AND.(f>0)) .OR.(list(zB_{562}).AND.(NOT(f>0))) \quad (406)$$

$z_j$=$list_j$ of groups of the three variables $y_1$, $y_2$, and $y_3$ are in Table 145.

TABLE 145

Present Invention

Title: One Of The $List_j$ of groups of the three variables $y_1$, $y_2$, and $y_3$ Any $List(z_j)$ Illustration

| Cube Width Parts | $y_1$ 3N | 2N+1 | $y_2$ 2N | N+1 | $y_3$ N | 1 |
|---|---|---|---|---|---|---|
| 1st Cube | [----valid--- | | ---valid--- | | ---valid---] | |
| | | | — | | | |
| | | | — | | | |
| | | | — | | | |
| last Cube | [----valid--- | | ---valid--- | | ---valid---] | |

The jth resolution bit of z, which consists of N resolution bits, is 1 or the true voltage logic state and is in equation (408).

$$list(f>0)=\underset{row=1}{\overset{N}{\cdot OR\cdot}}\left(Lf_{N+1-row}\underset{j=N+2-row}{\overset{N}{\cdot AND\cdot}}(NOT(Lf_j))\right), \quad (408)$$

where row is the number of the instruction cube in the below list, and $Lf_j$ is the list for the ith resolution bit of variable $f(y_2,y_3)$.

The lists for the resolution bits of zA or $zA(y_1,y_2,y_3)$ have cubes of 3N parts, as shown below in Table 146 in a list format for $list(zA_j)$.

TABLE 146

Present Invention

Title: One Of The lists for the resolution bits of zA or $zA(y_1, y_2, y_3)$

| Cube Width Parts | $y_1$ 3N | 2N+1 | $y_2$ 2N | N+1 | $y_3$ N | 1 |
|---|---|---|---|---|---|---|
| 1st Cube | [----valid--- | | ---valid--- | | ---valid---] | |
| | | | — | | | |
| | | | — | | | |
| | | | — | | | |
| last Cube | [----valid--- | | ---valid--- | | ---valid---] | |

TABLE 146-continued

This above list represents a zA list in a set of lists for variable zA, described in equation (409), where $$zA=y_1y_2y_3. \quad (409)$$

List(zB) consists of Rule 2 cubes for the number 17 or a binary 0 . . . 010001 in 562 parts, where list $(zB_j)$ is a universe cube for $zB_j$, when part j equals 1 and 5 and $list(zB_j)$ is a null cube for $zB_j$, when part j equals 2, 3, 4, and greater than 5. Variables zC and zD are defined in list equations (410) and (412).

$$Let\ zC=zA.AND.(f>0) \quad (410)$$

$$Let\ zD=zB.AND.(NOT(f>0)) \quad (412)$$

Generate set of lists for zC, where zC=zA.AND.(f>0) in equation (410),

List(zD) consists of Rule 2 cubes for the number 17 or a binary 0 . . . 010001, where $list(z_{Dj})$ is a universe cube or [X . . . X] for $zD_j$, when part j equals 1 and 5 and $list(zB_j)$ is a null cube or [N . . . N] for $zD_j$, when part j equals 2, 3, 4, and greater than 5.

$List(z_j)$ for variable z is defined in equations (414) to (418).

| | |
|---|---|
| $List(z_j) = (list(zC_j)).OR.(list(zDC_j))$ Definition Of $List(z_j)$: | (414) |
| $List(z_1) = (list(zC_1)).OR.(list(zD_1))$ | (416) |
| — | |
| — | |
| — | |
| $List(z_{562}) = (list(zC_{562})).OR.(list(zD_{562}))$ | (418) |

Set of lists, which is list(z) or Lz, for variable z are generated so far. $List(z_j)$ or $Lz_j$ is the jth list in the set of lists. Variable z is defined in equation (420).

3 Number Factoring Flow Chart $$z=D \quad (420)$$

, where D is the number to be factored Variable C is defined in equation (422).

(1) C=D−z, (422)

(2) set of lists for variable z have been generated.

(3) Since D is a given number of 160 digits, the set of lists for D will consist of Rule 2 cubes.

(a) Use Rule 2 input cubes and Rule 6 for set of lists for number D of 160 digits in a binary number representation, such as 0 . . . 010100 for '20' and call this set of N lists as set $LF_{N+1}$ to $LF_{2N}$, as shown in Table 147.

TABLE 147

Present Invention

Title: Set of N lists as set $LF_{N+1}$ to $LF_{2N}$ For Set of Lists For Number D Of 160 Digits In A Binary Number Representation, Such As 0... ...010100 For '20'
Example For '20'

| Cube Width Parts | 2N | D N+1 | N | z 1 |
|---|---|---|---|---|
| list $L20_1$ | [N... | ...N | N... | ..N] |
| list $L20_2$ | [N... | ...N | N... | ..N] |
| list $L20_3$ | [X... | ...X | X... | ..X] |
| list $L20_4$ | [N... | ...N | N... | ..N] |
| list $L20_5$ | [X... | ...X | X... | ..X] |
| list $L20_6$ | [N... | ...N | N... | ..N] |
| | | — | | |
| | | — | | |
| | | — | | |
| list $L20_N$ | [N... | ...N | N... | ..N] |

A list $Lz_j$ looks like the list below in Table 148.

TABLE 148

Present Invention

Title: Format Of List $Lz_j$

| Cube Width Parts | 2N | D N+1 | N | z 1 |
|---|---|---|---|---|
| 1st Cube | [X... | ...X | 1X... | ..X] |
| 2nd Cube | [X... | ...X | X1X.. | ..X] |
| | | — | | |
| | | — | | |
| | | — | | |
| | [X... | ...X | X.. | ..X1X] |
| last Cube | [X... | ...X | X.. | .X1] |

(d) Apply LF/Li knowledge to generate set of lists for variable z. Any list $Lz_j$ in the set of N lists for variable z will appear in the below list format.

(e) output list set is set $C_1$ to $C_N$ (4) With C=0 requires the utilization of condition 2 or cube instruction [X0 . . . 0], see (6) below. This operation is similar to the instruction list of instruction cubes for 'f>0'.

(5) Generation of the set of lists for variable C will require the set of lists for subtraction to be the Li instruction set of lists. LF set of lists has been generated prior to this step. Li/LF knowledge will generate the set of lists for C.

(6) The only list(Output) will be list(C=0), as described in Table 149.

TABLE 149

Present Invention

| Title: List(C=0) Cube Instruction | $LC_j$ List Instruction C |
|---|---|
| List Names | $C_N$........$C_1$ |
| Parts | N 1 |
| | [X0... ...0] |

Table 149 can be described in equation (424).

$$list(C=0) = \underset{j=1}{\overset{N-1}{AND}} \, (NOT(LC_j)) \tag{424}$$

(7) The resultant list, which is called list(C=0), contains cubes of 3N parts and is of the same format as a list($zA_j$). This resultant list shows the group of 3 binary numbers to satisfy the constraint and when multiplied together equal the number D. List(output) is generated in equation (426).

$$List(Output)=(List(f>0)).AND.(List\ Lz_j) \tag{426}$$

End Of Application Note 4

Application Note 5:Spread Sheet Speedup Using a Coprocessor

Benefit: Total process time is expected to be less than ten gate delays or perhaps the total process time is expected to be $10^{-7}$ seconds.

Load Time: The programmable IC, which each coprocessor will have at least one of, must be reloaded with a new list of cubes per arbitrary mathematical process; thus, for a spread sheet application with perhaps 20 row block_processes by 60 column block_processes and with an average of 100 cubes to be loaded per load_time_10_MHz_clock_period per process, the total spread sheet load time would be '20 rows×60 columns×100 cubes×$10^{-7}$ load_time_10_MHz_clock_periods' or 12 milliseconds with a total spread sheet process time of 0.12 milliseconds or 101×$10^{-7}$ second for 'load and process' time per block_process.

If the end user were only interested in one block_number, such as proforma profit after five years in a financial spread sheet, then the total load time and the total process time would be perhaps '(100+1)×$10^{-7}$ seconds' or about 10 microseconds.

Methods to Minimize Load Time:

(1) A computer processing b block_processes with m coprocessors will have a load time of (b−m+1)×load time.

(2) Each coprocessor should have one programmable IC to exist per output bit of resolution.

An end-user would submit each spreadsheet equation to a logic code generator, such as the logic code generator 2, to have each spread sheet equation or block_process be compiled into a set of lists. For example, a block equation might be equation (428). Block_B3 would be in column 2. Both block_A6 and block_A7 would be in column 1.

$$block\_B3=(2\times block\_A7)+block\_A6 \tag{428}$$

The logic code generator 2 would:

(1) generate the set of lists for variable B3, and then (2) send this B3 set to memory, such as the RAM 322 in the logic coder generator 2.

Figure 57:
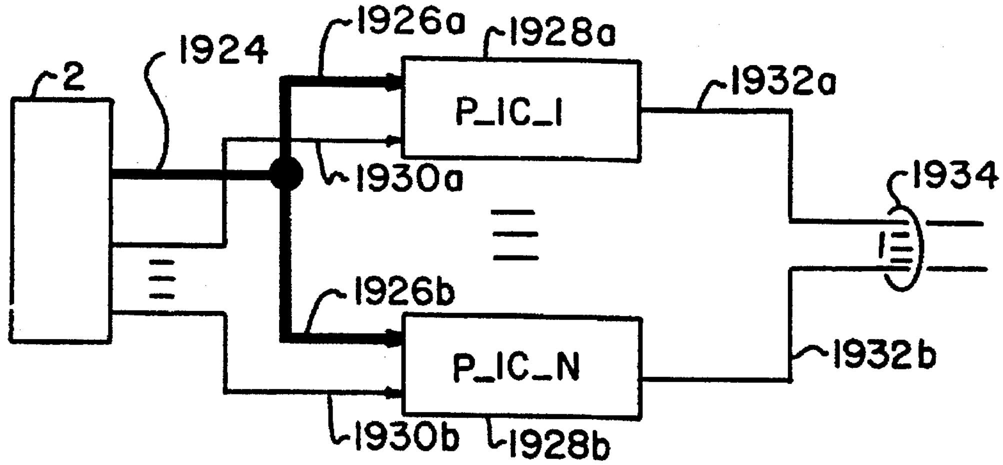
FIG. 57 shows a standard coprocessor circuit for maximum speed operation.

During the execution time of the spreadsheet, just after block_B2 or the block for column 2 and row 2 was processed, the end-user's computer would:

(1) send to the cube register, such as the cube_register_A **1690*a* or the cube_register 1772, and load by cube register writing the cubes of each list into perhaps 32 coprocessors, such as the coprocessor 4 as shown in FIG. 57, for a variable_block_B3 resolution of 32 bits, and (2) send the lists to the cube register, such as the cube_register_A 1690*a* or the cube_register 1772** input argument variables, such as variable A7 and variable A6 in accordance to the equation (428).

In the present clock time of perhaps 100 nanoseconds or $10^{-7}$ seconds in preparation for the next clock, the perhaps 32 coprocessors, such as the coprocessor 4 would generate the number to be put into block_B3. Cube load time will increase the effective execution time for the spreadsheet on the set of perhaps 32 coprocessors, such as the coprocessor 4; because cube load time equals the number of cubes in all lists multiplied times the clock period. Per clock period, only one cube can be sent to and latched or loaded into a coprocessor.

The set of 32 'needed' lists could be reduced to a single list with a cube width of 5 parts added to the normal k parts per cube in the k lists, as shown i Table 150 prior to a close boolean minimization of list $L_j$. The '5' parts, identified as parts 5,4,3,2,1, are for any list binary number in $2^5$ or 32 list numbers, starting with 00000 for list $L_1$. If the variable block_B3 resolution were $2^r$ the r parts would need to be added to the cube width or each cube in list $L_j$. Generally, the number of cubes in a resultant single list, identified as $L_j$, would be significantly less than the number of total cubes in all 32 lists without using a serial to parallel converter; thus, the effective overall spreadsheet processing time with one coprocessor, such as the coprocessor 4, would be less than the time with 32 coprocessors, such as the coprocessor 4, one coprocessor per list in the set of 32 lists.

An arbitrary mathematical expression, defined as a power series expansion of perhaps 10 terms using an Intel 8087, which is a conventional math floating point coprocessor to perform basic addition, subtraction, multiplication, and division expressions, would take 54 multiplies plus 10 additions or at least 64 times longer than using the coprocessor 4.

TABLE 150

Present Invention

Title: Cube Width Increase From k Parts Per Set Of Lists $L_j$ To A Cube Width Of (k+5) Parts Per Single List $L_5$. $L_5$ is illustrated in Table 151.

Note 1: The single list $L_5$ contains the same information as the set of lists $L_j$.

Note 2: Under parts 5 4 3 2 1 , the 00000 represents list 1<br>the 00001 represents list 2<br>—<br>—<br>the 11110 represents list 31<br>the 11111 represents list 32

| List Numbers<br>Cube Width<br>In Parts:<br>Decimal | Cube in Any List<br><br>5 4 3 2 1 k k−1 k−2<br>Binary | <br><br>3 2 1 |
|---|---|---|
| List 1 1st Cube | [0 0 0 0 0 . . . | ..- valid -...... . .] |
| — | — | — |
| — | — | — |
| List 1 last Cube | [0 0 0 0 0 . . . | ..- valid -...... . .] |
| List 2 1st Cube | [0 0 0 0 1 . . . | ..- valid -...... . .] |
| — | — | — |
| — | — | — |
| List 2 last Cube | [0 0 0 0 1 . . . | ..- valid -...... . .] |
| | — | — |
| | — | — |
| List 31 1st Cube | [1 1 1 1 0 . . . | . .- valid -...... . .] |
| — | — | — |
| — | — | — |
| List 31 last Cube | [1 1 1 1 0 . . . | ..- valid -...... . .] |
| List 32 1st Cube | [1 1 1 1 1 . . . | ..- valid -...... . .] |
| — | — | — |
| — | — | — |
| List 32 last Cube | [1 1 1 1 1 . . . | ..- valid -...... . .] |

A coprocessor, such as the coprocessor 4, for maximum processing speed per spread_sheet_block_process is described in FIG. 57.

As shown in FIG. 57, a cube_bus_A 1924, which is connected to the logic code generator 2 and is connected to a programmable_IC_input_bus_1 1926*a* of programmable_IC_1 1928*a*, denoted with symbol P_IC_1, to range to programmable_IC_input_bus_N 1926*b* of programmable_IC_N 1928*b*, denoted with symbol P_IC_N, carries cubes from the logic code generator 2 to each programmable_IC_1 1928*a* to range to the prgrammable_IC_N 1928*b*.

Figure 58:
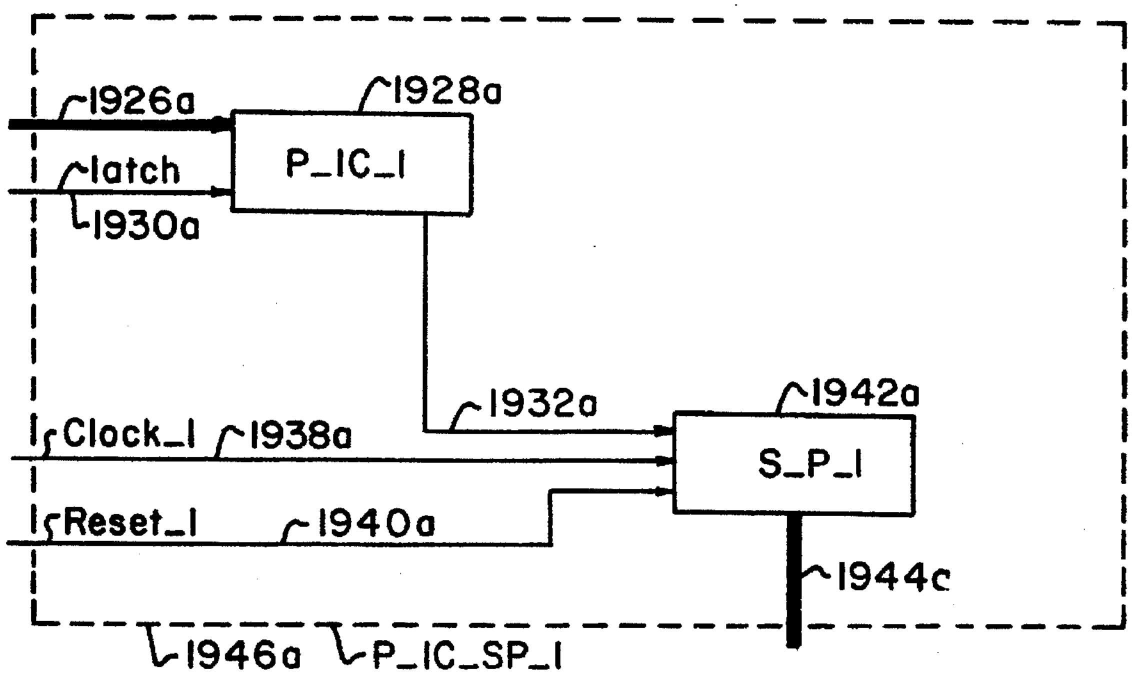
FIG. 58 shows a coprocessor for minimum chip area with slower speed due to increased number of gate delays.

As shown in FIG. 57 and FIG. 58, a cube on a programmable_IC_input_bus, such as the programmable_IC_input_bus_1 1926*a*, is latched into a programmable_IC, such as the programmable_IC_1 1928*a* by pulsing a latch_line, such as latch_line_1 1930*a* to range to latch_line_N 1930*b*.

After these three successive conditions are met:

(1) first, after one or more cubes are latched into one or more programmable_ICs, such as the programmable_IC_1 1928*a*, (2) second, after a 0-cube is placed on a programmable_IC_input_bus, such as the programmable_IC_input_bus_1 1926*a*, to range to the programmable_IC_input_bus_N 1926*b*, and (3) third, after a stored list covers the 0-cube, on the programmable_IC_input_bus, such as the programmable_IC_input_bus_1 1926*a*, to range to the programmable_IC_input_bus_N 1926*b*, then: a true logic voltage will exist on at least one programmable_IC_cover_detector_output_line, such as programmable_IC_cover_detector_output_line_1 1932*a* to range to programmable_IC_cover_detector_output_line_N 1932*b*.

If the stored lists are disjoint, then only one programmable_IC_cover_detector_output_line, such as the programmable_IC_cover_detector_output_line_1 1932*a*, will have a true logic voltage.

All the programmable_IC_cover_detector_output_lines, such as the programmable_IC_cover_detector_output_line_1 1932*a* to range to the progammable_IC_cover_detector_output_line_N 1932*b*, comprise a coprocessor_output_bus 1934 of N bit resolution.

A 0-cube, which contains only one number or value would consist of one or more numbers side by side and a function selection code on the cube_bus_A 1924. As shown in FIG. 57, for the function in the equation (428), 2 numbers would exist on the cube_bus_A 1924 in the form of a cube of 2 0-cubes, side by side. These 2 numbers would be the number in block_A6 and the number in block_A7. The function selection code would represent the equation (428). A number of N bit resolution, representing block_B3, exists on the coprocessor_output_bus 1934.

The FIG. 57 circuit is a standard coprocessor circuit for maximum speed operation, after lists are loaded.

The FIG. 58 is coprocessor, such as the coprocessor 4, for minimum chip area with slower speed due to increased number of gate delays.

As shown in FIG. 58, the coprocessor 4 is loaded with cubes from the cube_bus_A 1924 onto programmable_IC_input_bus_1 1926*a* with a true logic pulse on the latch_line_1 1930*a*. Each cube will consist of a list_selection section and a variable section. If the single list stored in the coprocessor 4 contains 1 to $2^5$ or 32 lists in a close boolean minimization, then the list_selection section part would be 5 parts wide. If the output function were dependent on 4 variables of 32 significant bits per each variable, then the variable part would contain '4 times 32' or 128 parts.

Table 151 illustrates cube width of 5 additional parts of list $L_5$.

TABLE 151

| Present Invention | | |
|---|---|---|
| Title: Cube Width Of (k+5) Parts Per Single List $L_5$ | | |
| Note: The single list $L_j$ contains the same information as the list $L_5$. | | |
| List Number | Cube in Any List | |
| Cube_Width_ In_Parts: | k+5 k+4 k+3 k+2 k+1 k k−1 k−2 | 3 2 1 |
| Decimal | Binary | |
| List $L_j$ | [.........................- | valid -........ . .] |
| | — | — |
| | — | — |
| List $L_j$ | [.........................- | valid -........ . .] |

When processing the arbitrary mathematical expression in a programmable_IC, such as the programmable_IC_1 1928*a*, as shown in FIG. 58, a new list_selection section code per new list is placed on the list_selection section of the programmable_IC_input_bus_1 1926*a*, after each clock pulses is put on clock_line_1 1938*a*.

A true logic pulse on reset_line_1 1940*a* is used to reset a serial_to_parallel_converter_1 1942*a*, denoted with symbol S_P_1, to put all 0's on cover_detector_bus_1 1944*a*.

The programmable_IC_cover_detector_output_line_1 1932*a* will provide a true logic voltage per each list_selection_code in every 0-cube on the programmable_IC_input_bus_1 1926*a* to the serial_to_parallel_converter_1 1942*a*.

The FIG. 58 circuit comprises a serial_parallel_coprocessor_1 1946*a*, denoted with dotted lines and denoted with symbol P_IC_SP_1, encloses the programmable_IC_1 1928*a* and the serial_to_parallel_converter_1 1942*a*. The serial_parallel_coprocessor_1 1946*a* contains only one list of cubes with m addition parts per cube and a serial to parallel converter, such as the serial_to_parallel_converter_1 1942*a* for $2^m$ bits.

Figure 59:
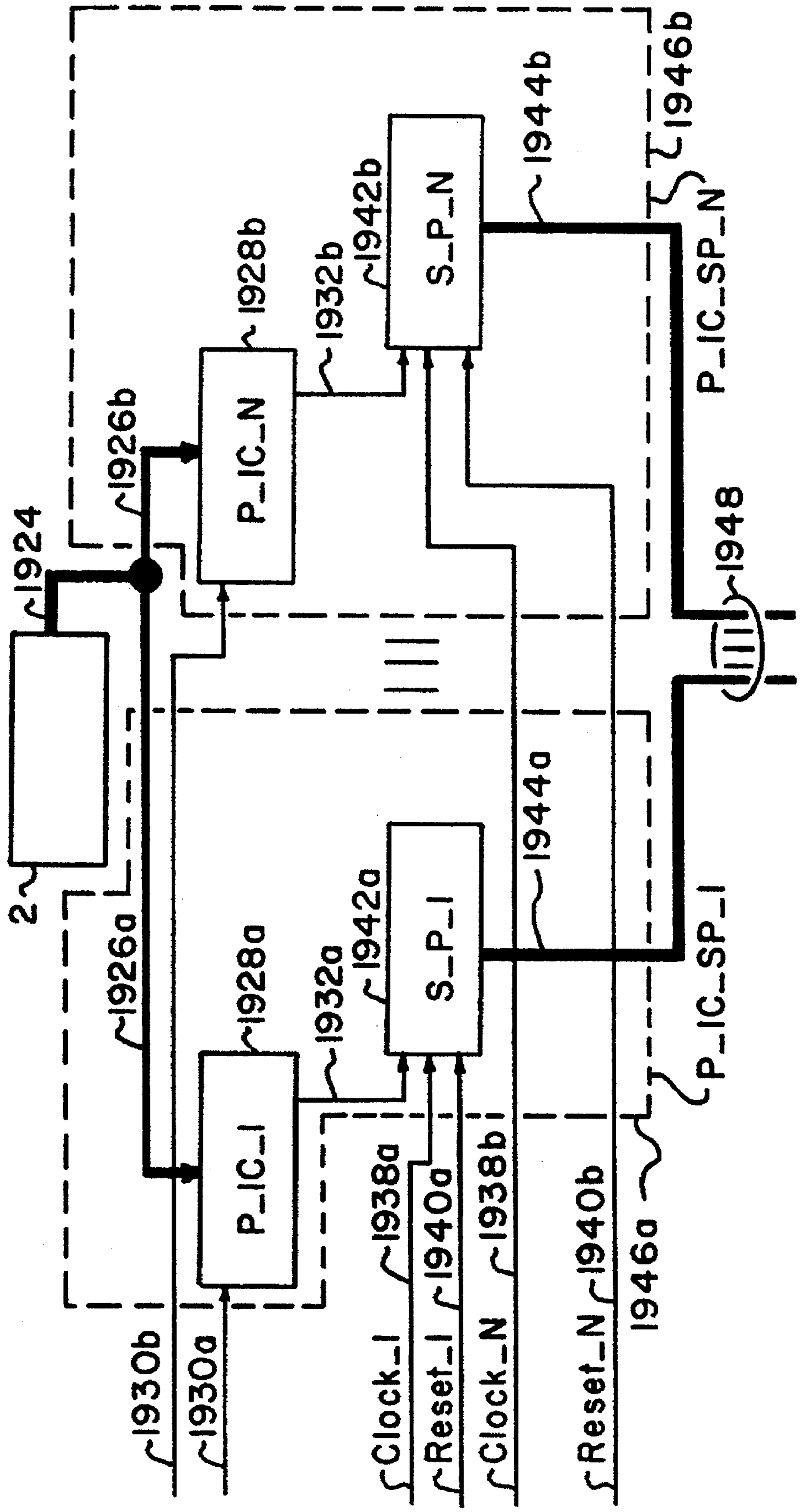
FIG. 59 shows an array of coprocessors of minimum chip area coprocessors.

The FIG. 59 circuit shows more than one serial_parallel_coprocessor, such as the serial_parallel_coprocessor_1 1946*a* to range to serial_parallel_coprocessor_N 1946*b*, denoted with dotted lines and denoted with symbol P_IC_SP_N, as shown in the FIG. 58 circuit for the purpose to illustrate a very wide output bus application.

As shown in FIG. 59, the cube_bus_A 1924, which is connected to the logic code generator 2 and is connected to the programmable_IC_input_bus_1 1926*a* of the programmable_IC_1 1928*a* to range to the programmable_IC_input_bus_N 1926*b* of the programmable_IC_N 1928*b* carries cubes from the logic code generator 2 to each programmable_IC_1 1928*a* to range to the programmable_IC_N 1928*b*. A cube on a programmable_IC_input_bus, such as the programmable_IC_input_bus_1 1926*a*, is latched into a programmable_IC, such as the programmable_IC_1 1928*a* to range to the programmable_IC_N 1928*b*, by pulsing a latch_line, such as the latch_line_1 1930*a* to range to the latch_line_N 1930*b*.

After these three successive conditions are met:

(1) first, after one ore more cubes are latched into one or more programmable_ICs, such as the programmable_IC_1 1928*a*, (2) second, after a 0-cube is placed on a programmable_IC_input_bus, such as the programmable_IC_input_bus_1 1926*a*, and (3) third, after a stored list covers the 0-cube, programmable_IC_input_bus_1 1926*a*.

then: a true logic voltage will exist on at least one programmable_IC_cover_detector_output_line, such as programmable_IC_cover_detector_output_line_1 1932*a* to range to the programmable_IC_cover_detector_output_line_N 1932*b*.

When processing the arbitrary mathematical expression in a programmable_IC, such as the programmable_IC_1 1928*a*, as shown in FIG. 59, a new list_selection section code per new list is placed on the list_selection section of the programmable_IC_input_bus_1 1926*a*, to range to the programmable_IC_input_bus_N 1926*b*, after each clock pulse is put on the clock_line_1 1938*a*, to range to clock_line_N 1938*b*.

A true logic pulse on the reset_line_1 1940*a* to range to reset_line_N 1940*b* is used to reset a the serial_to_parallel_converter_1 1942*a* to put all 0's on the cover_detector_bus_1 1944*a* to range to cover_detector_bus_N 1944*b*.

Per each list_selection_code in every 0-curve on the programmable_IC_input_bus_1 1926*a* to range to programmable_IC_input_bus_N 1926*b* the programmable_IC_cover_detector_output_line_1 1932*a* to range to the programmable_IC_cover_detector_output_line_N 1932*b* will provide a true logic voltage to the serial_to_parallel_converter_1 1942*a* to range to serial_to_parallel_converter_N 1942*b*, denoted with symbol S_P_N.

The FIG. 59 circuit could be compressed into a FIG. 58 circuit. As shown in FIG. 59, a coprocessor, such as the coprocessor 2, could consist of more than one serial_parallel_coprocessor, such as the serial_parallel_coprocessor_1 1946*a* to range to the serial_parallel_coprocessor_N 1946*b* with a wide_output_bus 1948. The wide_output_bus 1948 consists of more than one cover_detector_bus, such as the cover_detector_bus_1 1944*a* to range to the cover_detector_bus_N 1944*b*.

End of Application Note 5

Application Note 6

Application Note 6: Recognition Of A Long Sequence Of Samples Using A Short Sequence Of Samples In A Short Time Used For Recognition With Partial Information Purpose: A short continuous sequence of samples or numbers is used to identify a single larger continuous sequence of samples or numbers.

Typical use:

(1) a tune or two tunes to recognize a song.

(2) speech recognition with middle of word sounds with or without blurred word starts and blurred word ends, (3) computer vision 2D and 3D pattern recognition, and (4) recognition using partial information.

Three sequences are stored in three lists, as shown in Table 152.

TABLE 152

| Present Invention | | | | |
|---|---|---|---|---|
| Title: Sequence_Number Lists Per Pair_j<br>Sequence 1: 3, 5, 7, 1, 8<br>Sequence 2: 3, 5, 8, 7, 1<br>Sequence 3: 3, 5, 5, 7, 1 | | | | |
| Pair_# | Sample | Next Sample | List ( ) | Sequence_Number |
| 1 | 3 | 5 | L(pair_1): | sequence 1<br>sequence 2<br>sequence 3 |
| 2 | 5 | 7 | L(pair_2): | sequence 1<br>sequence 3 |
| 3 | 5 | 8 | L(pair_3): | sequence 1 |
| 4 | 5 | 5 | L(pair_4): | sequence 1 |
| 5 | 7 | 1 | L(pair_5): | sequence 1<br>sequence 2<br>sequence 3 |
| 6 | 8 | 7 | L(pair_6): | sequence 1 |
| 7 | 1 | 8 | L(pair_7): | sequence 1 |

Each jth list or L(pair_j) will be compressed into a close boolean minimization by sending each sequence_number as a 0-cube into the logic code generator 2 to become a close boolean minimization.

Typically, the sample_next_sample bus will be two 32 bit floating point buses or '2×32' or 64 parts or 128 wires at 2 bits per part. For 2D images, this 64 part bus would contain all the pixel samples with a preselected image scan path thru all the columns and rows. The number of lists, such as L(pair_j), will be $2^{bus\_number\_parts}$ or $2^{64}$. The number of parts is assumed to be 64 parts. These $2^{64}$ lists could be combined into one list with 64 parts added for address; thus, the new cube width would become '64+64' or 128 parts.

Procedure To Combine $2^{64}$ L(pair_j) Lists Into A Single L(system) List

The address in the form of pairs of samples and the respective list L(pair_j), as shown in Table 153, is sent to a logic code generator, such as the logic code generator 2, to be compressed into a single list L(system). All values will be binary.

TABLE 153

| Present Invention | | |
|---|---|---|
| Title: System Cubes As O-Cubes | | |
| | Pair | |
| Sample | Next_Sample | Sequences |
| Examples From Table 152 | | |
| [ 0... ...011 - | - 0... ...0101 - | - 0... ...01 ] |
| [ 0... ...011 - | - 0... ...0101 - | - 0... ..010 ] |
| [ 0... ...011 - | - 0... ....0101 - | - 0... ..011 ] |

After the first pair list is compressed, the L(system) will be as shown in Table 154.

TABLE 154

| Present Invention | | |
|---|---|---|
| Title: Typical System Cubes | | |
| | Pair | |
| Sample | Next_Sample | Sequences |
| [ 0... ...011 - | - 0... ...0101 - | - 0... ..0X1 ] |
| [ 0... ...011 - | - 0... ...0101 - | - 0... ..010 ] |

L(pair_j) Memory Size

The size of the memory, which could be RAM or EEROM, or EROM, with $2^{64}$ separate lists of 64 parts per cube at perhaps 100 cubes on average per list sequence could be:

'$2^{64}$ lists×2 bit/IC×64 ICs×100 cubes×2 bit/part' or 12,800×$2^{64}$ bits.

L(system) Memory Size

The size of the memory, which could be RAM or EEROM, or EROM, with a single list of '64+64' or 128 parts per cube at perhaps 1,000 cubes on average per list L(system) could be:

'1 list×'64+64' parts×1 IC/part×1,000 cubes×2 bit/part' or 256,800 bits.

The typical list L(system) would exist as shown in Table 155.

TABLE 155

| Present Invention | | | |
|---|---|---|---|
| Title: System Cube Format | | | |
| | Pair | | |
| | Sample | Next_Sample | Sequence |
| Parts: | 32 | 32 | 64 |
| Wires: | 64 | 64 | 128 |
| Any Cube: | [ - valid - | - valid - | - valid - ] |

Note: Total width is 128 parts or 256 wires.

Sequence Recognition Process

Procedure To Acquire L(pair_j) From L(system)

Each list L(pair_j) can be acquired from list L(system) with the use of equation (430), where pair_j is the first 64 parts and the universe section or U is the second 64 parts.

$$L(pair\_j)=[-pair\_j\ ---\ U-]\ .AND.\ L(system) \quad (430)$$

Example Condition 1:

Assume a memory of one list L(system) contains $2^{64}$ L(pair_j) type lists.

A sequence of samples is received at one sample as a 32 bit floating point number per unit time.

The recognition process is to AND lists until a resultant list contains only on 0-cube in the sequence number section.

The list ANDing is shown in equation (432) for the purpose to find a single 0-cube sequence cube, with list $LResult_o$ equal to a universe cube of [X . . . X].

$$LResult_j=L(pair\_j)\ .AND.\ LResult_{j-1} \quad (432)$$

Examples with $2^{64}$ L(pair_j) type lists:

Example A:

Using lists stored in memory, a received sequence of the first 3 samples in sequence 1 in Table 152 will be used with equation (432), below.

Pair_1: '3,5' is used to address L(pair_1) list in memory in equation (434) from equation (432), where $LResult_{j-1}$ at j=1 is already given as [X . . . X].

$$LResult_1=L(pair\_1)\ .AND.\ [X\ .\ .\ .\ X] \quad (434)$$

Pair_2: '5, 7' is used to address L(pair_2) in equation (436).

$$LResult_2 = L(pair\_2) \cdot AND \cdot LResult_1 \quad (436)$$

$$LResult_2 = L(pair\_2) \cdot AND \cdot L(pair\_1) \quad (436)$$

$$LResult_2 = \left(\begin{matrix}[sequence\ 1]\\ [sequence\ 3]\end{matrix}\right) \cdot AND \cdot \left(\begin{matrix}[sequence\ 1]\\ [sequence\ 2]\\ [sequence\ 3]\end{matrix}\right) \quad (438)$$

$$LResult_2 = \left(\begin{matrix}[sequence\ 1]\\ [sequence\ 3]\end{matrix}\right) \text{ or } L(pair\_2) \quad (440)$$

$$LResult_2 = L(pair\_2) \quad (441)$$

$$LResult_3 = L(pair\_3) \cdot AND \cdot LResult_2 \quad (442)$$

$$LResult_3 = L(pair\_3) \cdot AND \cdot L(pair\_2) \quad (444)$$

$$LResult_3 = ([sequence\ 1] \cdot AND \cdot \left(\begin{matrix}[sequence\ 1]\\ [sequence\ 3]\end{matrix}\right) \quad (446)$$

$$LResult_3 = sequence\ 1 \quad (448)$$

From equation (448), single 0-cube sequence in $LResult_3$ is sequence 1.

Example B

Second pair or '5,7' in sequence 1 from Table 152 is used to address L(pair_5) in memory.

$$LResult_1 = L(pair\_5) \cdot AND \cdot LResult_o \quad (450)$$

$$LResult_1 = L(pair\_5) \cdot AND \cdot [X \ldots \ldots X] \quad (452)$$

$$LResult_1 = \left(\begin{matrix}[sequence\ 1]\\ [sequence\ 2]\\ [sequence\ 3]\end{matrix}\right) \cdot AND \cdot [X \ldots \ldots X] \quad (454)$$

Second Pair: '1, 8' is used to address L(pair_7) in memory in equation (452).

$$LResult_2 = L(pair\_7)\ .AND.\ LResult_1 \quad (456)$$

From Table 152:

$$LResult_2 = L(pair\_2)\ .AND.\ L(pair\_1) \quad (458)$$

$$LResult_2 = ([sequence\ 1]) \cdot AND \cdot \left(\begin{matrix}[sequence\ 1]\\ [sequence\ 2]\\ [sequence\ 3]\end{matrix}\right) \quad (460)$$

From equation (460), single 0-cube sequences in $LResult_2$ is sequence 1.

Procedures To Generate Sequence Of Samples

Upon being given the sequence_number_j, the sequence will be acquired from memory, as follows:

A set of lists, called L_number for one group of lists and L_first_address for another group of lists, is created with each cube in any of the lists as a various-order cube of sequence_number states.

As shown in Table 156, the set of lists is formatted in a truth table. L_number will be set with a maximum of 10,000 or set at $2^{13}$. A don't care list will exist. L_number_j is the number of cubes or number of addresses started at L_address_j in sequence_number_j.

TABLE 156

| Present Invention | | | |
|---|---|---|---|
| Title: Set of Lists Of L_Number_j & L_Address_j | | | |
| | -----Inputs------ | ------------Outputs-------------- | |
| | Sequence_Number_k | L_Number_j | Set L_first_address_j |
| Parts: | 64..............1 | 13.......1 | 64................1 |
| Total Parts: | 64..............1 | 76...............................1 | |

Note: Total width is 128 parts or 256 wires.

A circuit to process Table 156 could contain 76 programmable_ICs, such as the programmable_IC_1 1928*a*, as shown in FIG. 57, with the input bus, such as the programmable_IC_input_bus_1 1926*a*, in the form of half-cubes or normally known as binary numbers.

Each IC would carry each of the 76 lists in Table 156 in a circuit with 64 inputs and 76 outputs. The 64 outputs of each IC, such as the programmable_IC_1 1928*a*, would be used to address a 64 bit memory location containing the first system cube, while the other 13 outputs of the programmable IC, such as the programmable_IC_1 1928*a*, would preset a presetable_down_counter to down count to zero as the cubes in memory were being addressed. These system cubes will be sent to and stored in a coprocessor, such as the coprocessor 4, to be used to generate a m_bit_sample, when three or more stored lists cover the count from a 64 bit resetable up counter. The end of the sequence of samples, such as a specific up counter value address, will be identified.

Another way to generate a sequence_j would be to use a circuit, as shown in Table 157, to contain 64 programmable_ICs, such as

TABLE 157

| Present Invention | | |
|---|---|---|
| Title: Set Of Lists Of L_Address_j | | |
| | -----Inputs------ | ------------Outputs-------------- |
| | Sequence_Number_k | Set L_first_address_j |
| Parts: | 64..............1 | 64................1 |
| Total Parts: | 64..............1 | 64...............................1 |

Note: Total width is 128 parts or 256 wires.

the programmable_IC_1 1928*a*, as shown in FIG. 57, with the input bus, such as the programmable_IC_input_bus_1 1926*a*, in the form of half-cubes or normally known as binary numbers.

Each IC would carry each of the 64 lists in Table 157 in a circuit with 64 inputs and 64 outputs. The 64 outputs of each IC, such as the programmable_IC_1 1928*a*, would be used to address a 64 bit memory location containing both:

(a) memory address of the first system cube, and (b) the number of system cubes starting at that memory location.

The number of cubes would be preset into a presetable_down_counter to down count to zero as the cubes in memory were being addressed. These system cubes will be sent to and stored in a coprocessor, such as the coprocessor 4, to be used to generate a m_bit_sample, when three or more stored lists cover the count from a 64 bit resetable up counter. The end of the sequence of samples, such as a specific up counter value address, will be identified.

End of Application Note 6

Application Note 7: Image Storage And Retrieval For A Museum Of Paintings

Specification Analysis Of Image Stored And Retrieval:

If a museum of fine arts has ten million paintings, the painting address bus to address any painting would need to consist of at least 24 wires. Reason: $2^{23}$ is less than 10 million, while $2^{24}$ is greater than ten million.

If each painting consisted of 10,000 pixels by 10,000 pixels or 100 million pixels in area, then the pixel address bus would need to consist of at least 27 wires. Reason: $2^{26}$ is less than 10 million, while $2^{27}$ is greater than ten million.

If each pixel consisted of three basic_colors with an 8 bit resolution per basic_color, the pixel color bus would need to be 24 wires and address one specific color of more than $2^{24}$ or more than 16 million colors. Reason: 3 basic_colors×8 bit bus per basic_color equals a 24 bit bus.

Coprocessor Circuit To Display Stored Museum Paintings

A coprocessor circuit to provide $2^{24}$ colors with a 24 pin out for 100 million pixels per painting in a museum of 10 million paintings would have an input bus of '24+27' or 51 pins. This input bus would consist of two buses:

(1) a painting bus of 24 wires, and (2) a pixel bus of 27 wires.

A cube, representing the true and false logic states on the input bus of 51 wires, would consist of 51 parts. The set of lists, to represent the output bus of 24 pins, would consist of 24 lists, one list per output pin. The coprocessor circuit could consist of 24 separate coprocessor ICs mounted on one or more printed circuit boards.

Reduction Of Number Of Lists

The number of lists or color_lists could be reduced to a single list if the effective storage clock and coprocessor read clock were increased to 24 times. The pixel clock would need to be divided by 24 to allow the single output bit to be switched to the correct wire in a 24 wire color bus via a serial to parallel converter. To keep the list per output pin separate, k parts could be added per cube for $2^k$ lists. For example, reducing 24 lists to 1 list, would require 5 parts added per cube. Also, a significant 'don't care' group of cubes would exist of 32 minus 24 or 8 lists. An example of a significant don't care group of cubes is: a list of 34 parts per cube to cover $10^{10}$ or about $2^{34}$ states would also contain or cover $2^{34}$ minus $10^{10}$ or 7,179,869,184 states or 0-cubes. These '$2^{34}$ minus $10^{10}$' 0-cubes comprise a don't care list. This clock speed up with serial to parallel converter is prior art.

List Storage

The list to be stored per each painting would consist of pixel bus parts only or 27 parts plus 5 parts or 32 parts to represent each of the 32 basic lists. The painting bus parts or 24 parts as a 0-cube would be added after each painting list storage operation, resulting in cubes of 56 parts for: the painting bus of 24 parts, a pixel bus of 27 parts, and the last bus of 5 parts.

Coprocessor Operation

A painting number is placed on the painting bus of 24 wires. A 27 bit counter, connected to the 27 input pins on the coprocessor pixel bus, will address all 100 million pixels per image upon being enabled and upon being clocked or stepped thru all the 100 million pixels.

Storage Of Image Or Painting

Each image is stored by scanning each painting, according to the painting truth table in Table 158.

TABLE 158

Present Invention

Title: Truth Table For Image Or Painting

| Coprocessor Input Parts: Painting Bus MSB 24 | LSB 1 | Pixel Bus MSB 27 … LSB 1 | Output List Color Bus MSB 24 … LSB 1 |
|---|---|---|---|
| [ 0 | 0 1 | - valid - ] | [ - valid - ] |
| [ 0 | 0 1 0 | — ] | [ — ] |
| [ 0 | 0 1 1 | — ] | [ — ] |
| [ 0 | 0 1 0 0 | — ] | [ — ] |
| | — | | — |
| | — | | — |
| [ code for 100 million | | - valid - ] | [ - valid - ] |
| Don't Care List | | | |
| [ code for 100 million + 1 | | - valid - ] Don't Care states | [ - valid - ] — — |
| [1... | ...1 | - valid - ] | [ - valid - ] |

Note: The above 1... ...1 is the code for $2^{51}$ and 0... ...0 is the code for 1.

Using one the logic code generator 2 per bit of the color bus, each 51 part 0-cube for the 51 wire coprocessor input bus is processed into a list of cubes. The list per color bit of 24 bits can be either a true list of L, or else a false list or NOT(L). L is generated if all the 51 part 0-cubes per '0' are removed from the universe in a disjoint sharp operation. Conversely, NOT(L) is generated if all the 51 part 0-cubes per '1' are removed from the universe in a disjoint sharp operation. Within the logic code generator 2, L or NOT(L) could also be calculated in a double disjoint sharp operation, where one disjoint sharp for all 51 parts is followed by another disjoint sharp operation.

The storage system will have an effective j input buffer, such as a first_in_first_out or FIFO buffer memory. This FIFO will receive and temporarily store cubes, while a logic code generator, such as the logic code generator 2, will perform a list operation, such the disjoint sharp operation. In the event the 0-cubes to be processed thru the logic code generator 2 are fill up the FIFO to memory capacity, another FIFO or the logic code generator 2 could be used to handle the temporary 0-cube input excess. If k logic solving apparatuss, such as the logic code generator 2, were used, then the list operation to combine the k lists with one list from each logic code generator, such as the logic code generator 2, is in equation (462). The time to process the equation (462)

$$\text{Combination} = \underset{j=1}{\overset{k}{\text{AND}}} \left(\text{NOT}(L_j)\right) \qquad (462)$$

would probably be during the time that the physical document to be electronically scanned was being changed to another document.

The 'don't care' part of the list in Table 158 usually is used to reduce the number of cubes in the coprocessor. For example, if a 'needed' list consisted of cubes: 1X0 and 101, then the cube 111 from a 'don't care' list would reduce the 'needed' list to just one cube or 1XX. Notice: since the cube 111 is outside the range of the 'needed' list, then the list operation of the coprocessor is not affected.

End Of Application Note 7

Application Note 8: Image Storage And Retrieval For A Library Of Movies

Specification Analysis Of Image Storage And Retrieval: Movie Bus Width

If a library has ten million movies, the address bus to address any movie would need to consist of at least 24 wires. Reason: $2^{23}$ is less than 10 million, while $2^{24}$ is greater than ten million.

Image Bus Width

If each movie lasted for 2 hours and consisted of images taken at the TV standard rate of 30 images per second or 2 hours×3600 seconds per hour×30 images per second or 216,000 images, then the image address bus would need to consist of at least 18 wires. Reason: $2^{17}$ is less than 216,000, while $2^{18}$, being equal to 262,144, is greater than 216,000. The 'don't care' list would consist of 46,144 0-cubes in a close boolean minimization of various_order_cubes.

Pixel Bus Width

If each image consisted of 10,000 pixels by 10,000 pixels or 100 million pixels in area, then the pixel address bus would need to consist of at least 27 wires. Reason: $2^{26}$ is less than 10 million, while $2^{27}$ is greater than ten million.

Audio Bus Width

The audio sample rate is calculated at 2,670 samples per image or less than $2^{12}$ samples per image. Reason: $2^{11}$ is less than 2,670, while $2^{12}$, being equal to 4,096, is greater than 2,670. The 'don't care' list would consist of '4,096–2,670' or 1,420 0-cubes in a close boolean minimization of various_order-cubes. Since the above pixel bus width is 27 wires or parts, the first 12 wires would contain logic voltages switching at $2^{12}$ Hz per image. The first 12 parts are part 27 to part 16. The remaining 15 parts or wires are don't care parts.

TABLE 159

Present Invention

Title: Truth Table For Audio In A Movie

| | Coprocessor Input Parts | | | | | | | Output List | |
|---|---|---|---|---|---|---|---|---|---|
| | Movie | | Image Bus | | Pixel Bus | | | Audio | Bus |
| | MSB | LSB | MSB | LSB | MSB | LSB | | MSB | LSB |
| | 24 | 1 | 18 | 1 | 27 | 16 | | 14 | 1 |
| [ | 0 | 0 1 | - valid - | | - valid - | | ] | [- valid - ] | |
| [ | 0..0 1 0 | | — | | | | ] | [ — ] | |
| [ | 0..0 1 1 | | — | | | | ] | [ — ] | |
| [ | 0..1 0 0 | | - valid - | | - valid - | | ] | [ — ] | |
| | | | — | | | | | — | |
| | | | — | | | | | — | |
| [ | ( code for 10 million) | | - valid - | | - valid - | | ] | [ - valid - ] | |
| | Don't Care List | | | | | | | | |
| [ | ( code for 10 milion + 1) | | - valid - | | - valid - | | ] | [ - valid - ] | |
| | | | | | Don't Care states | | | — — | |
| | [1... | ...1 | - valid - | | - valid - | | ] | [ - valid - ] | |

Note: The above 1... ...1 is the code for $2^{51}$ and 0... ...0 is the code for 1.

TABLE 160

Present Invention

Title: Truth Table For Color In A Movie

| | Coprocessor Input Parts | | | | | | Output List | |
|---|---|---|---|---|---|---|---|---|
| | Movie | | Image Bus | | Pixel Bus | | Color Bus | |
| | MSB | LSB | MSB | LSB | MSB | LSB | MSB | LSB |
| | 24 | 1 | 18 | 1 | 27 | 1 | 24 | 1 |
| [ | 0 | 0 1 | - valid - | | - valid - ] | | [ - valid - ] | |
| [ | 0..0 | 1 0 | — | | ] | | [—] | |
| [ | 0..0 | 1 1 | — | | ] | | [—] | |
| [ | 0..1 | 0 0 | - valid - | | - valid - ] | | [—] | |
| | | | — | | | | — | |
| | | | — | | | | — | |
| [ | ( code for 10 million ) | | - valid - | | - valid - ] | | [ - valid - ] | |
| | Don't Care List | | | | | | | |
| [ | ( code for 10 million + 1 ) | | - valid - | | - valid - ] | | [ - valid - ] | |
| | | | | Don't Care states | | | — — | |
| | [1... | ...1 | - valid - | | - valid - ] | | [ - valid - ] | |

Note: The above 1... ...1 is the code for $2^{51}$ and 0... ...0 is the code for 1.

The coprocessor input bus would consist of 3 basic buses:

(bus_1) 24 pins to address any movie in 10 million movies, (bus_2) 18 pins to address any image in 262,144 images of a 2 hour movie, (bus_3) 27 pins to address any pixel in 100 million pixels, and (bus_4) 12 pins to address any audio sample in '4×20 kHz/30 images per second' or 2,670 Hz per image.

Note: Each audio sample can be shifted to any 4 time_positions in a 4 time_position box, independently of the other samples without causing a significant audio distortion; thus, the audio lists of cubes can be compressed considerably. The 4 in '4×20 kHz/30' comes from 4 times the bandwidth for the sampling rate.

At '4×20 kHz/30' images per second or 2,670 Hz per image, and a 30 images per second, the audio sample rate is:

'4×20 kHz/30×30' or

'4×20 kHz' or

'80 kHz'.

The basic truth table for input cubes with:

audio samples at 14 bit resolution is in Table 159, and image samples at 24 bit color output or '3 colors×8 bit resolution per color is in Table 160.

The last 2 buses, which are the image bus, the pixel bus, would usually each be driven by a presetable counter, usually starting at zero or 0 . . . 0.

If each pixel consisted of three basic_colors with an 8 bit resolution per basic_color, the pixel color bus would need to be 24 wires and address one specific color of more than $2^{24}$ or more than 16 million colors.

Coprocessor Circuit To Display The Movie And Provide Audio

A coprocessor circuit to provide $2^{24}$ colors with a 24 pin out for 100 million pixels per image in a 2 hour movie would have an input bus of 51 pins.

This input bus would consist of three buses:

(1) a movie bus of 24 wires, and (2) a image bus of 18 wires, and (3) a pixel bus of 27 wires, and (4) an audio bus of 12 wires of the 27 pixel bus wires.

Table 161 shows a truth table with audio and color with the above bus.

TABLE 161

| | | | | | |
|---|---|---|---|---|---|
| Present Invention | | | | | |
| Title: Truth Table for Audio And Color In A Movie | | | | | |
| Coprocessor Input Parts | | | | | Output Lists |
| | Movie MSB LSB 24.........1 | | Image Bus MSB LSB 18.........1 | Pixel Bus MSB LSB 27.........1 | Audio - Color MSB/LSB MSB/LSB 14.....1 24......1 |
| [ | 0 | 0 1 | - valid - | - valid - ] | [ - valid - ] |
| [ | 0..0 | 1 0 | — | ] | [—] |
| [ | 0..0 | 1 1 | — | ] | [—] |
| [ | 0..1 | 0 0 | - valid - | - valid - ] | [—] |
| | | | — | | — |
| | | | — | | — |
| [ | ( code for 10 million ) | | - valid - | - valid - ] | [ - valid - ] |
| Don't Care List | | | | | |
| [ | ( code for 10 million + 1 ) | | - valid - | - valid - ] | [ - valid - ] |
| | | | Don't Care | | — |
| | | | states | | — |
| [ | 1... | ...1 | - valid - | - valid - ] | [ - valid - ] |

Note: The above 1... ...1 is the code for $2^{51}$ and 0... ...0 is the code for 1.

A cube, representing the true and false logic states on the input bus of 81 wires, would consist of '24+18+27' or 81 parts. The set of lists, to represent the output bus of 24 pins, and maybe 14 bit resolution of audio, would consist of 24 plus 14 or 38 lists, one list per output pin. The coprocessor circuit could consist of 38 separate coprocessor ICs mounted on one or more printed circuit boards.

Coprocessor Operation

A movie number is placed on the movie bus of 24 wires. A 27 bit counter, connected to the 27 input pins on the coprocessor pixel bus, will address all 100 million pixels per image upon being enabled and upon being clocked or stepped thru all the 100 million pixels.

Storage Of Image

Each image is stored by scanning each image, according to the movie truth tables in Tables 159 and 160.

Using one the logic code generator 2 per bit of the output bus, each 69 part 0-cube for the 51 wire coprocessor input bus is processed into a list of cubes. The list per color bit of 24 bits and the list per audio bit of 16 bits can be either a true list or L, or else a false list or NOT(L). L is generated if all the 69 part 0-cubes per '0' are removed from the universe in a disjoint sharp operation. Conversely, NOT(L) is generated if all the 69 part 0-cubes per '1' are removed from the universe in a disjoint sharp operation. Within the logic code generator 2, L or NOT(L) could also be calculated in a double disjoint sharp operation, where one disjoint sharp for all 69 parts is followed by another disjoint sharp operation.

The 'don't care' part of the list in Tables 158 thru 160 usually is used to reduce the number of cubes in the coprocessor. For example, if a 'needed' list consisted of cubes: 1X0 and 101, then the cube 111 from a 'don't care' list would reduce the 'needed' list to one cube of 1XX. Notice: since the cube 111 is outside the range of the 'needed' list, then the list operation of the coprocessor is not affected.

End Of Application Note 8

Application Note 9: Logic code generator Computer Calculates Digital Logic While A Neural Network Learns Digital Logic The computer system 5, as shown in FIG 1, with both the logic code generator 2 and the coprocessor 4, can perform the same function of a neural network. A digital neural network function generates the digital logic to perform the function 'output(input,time)', such as speech output per code word input. For example, a neural network, by a learning set of rules, learns over time the best internal digital logic to use in order to pronounce words correctly.

In similar fashion, a computer with the logic code generator 2 generates the logic as a set of lists to perform the function 'output(input,time)', where the time input can be the output of another logic circuit with register and feedback.

A coprocessor, such as the coprocessor 4, with registers on

Logic code generator Advantage Over Present Neural Network Technology

The logic code generator 2 can generate digital logic for arbitrary mathematical expressions without stepping through all truth table states, called 0-cubes, while neural networks learn by a set of rules including stepping thru only and all truth table states. For a mathematical function of two input variables with 32 bit resolution per input variable, the number of states in the truth table is $2^{64}$ states.

A truth table with 64 address bits would have $2^{+64}$ or about $10^{+19.2}$ data locations. Calculation: $2^{+64}$ equals $10^{+log}10^{2\times64}$ or $10^{+0.3010\times64}$ or $10^{+19.2}$. These $10^{+19.2}$ data locations would require 300+ years to test with a 1 GHz clock rate. Calculation for the 300+ years is: $2^{64}$ nanoseconds×(1 second/$10^{+9}$ ns)×(1 hour/3600 seconds)×(1 day/24 hours)×(1 year/365 days)=300 + years. This 300+ year test time is unreasonable.

The programmable IC and also the coprocessor in this invention can be tested in less than a second with any number of address locations.

The logic code generator 2 could probably easily be converted into a neural network, since the inventor of this present invention has perfected software to convert any lists of cubes to logic schematic form with 2 in to k in: ANDs, NANDs, ORs, NORs and inverters. This schematic generation is presently in Fortran, but should probably be easy to be converted to run on the logic code generator 2. One of the reasons that the logic code generation 2 is designed is due to this Fortran schematic generation computer program took 66 cpu or computer processing unit hours to run on a main frame Vax computer.

Any computer with the logic code generator 2 connected will be:

(a) expected to race through this same schematic process if a schematic is desired at more than thousands of times faster than a conventional Vax, since the internal logic code generator circuits perform the same basic subroutines of this Fortran schematic generation computer program; and (b) expected to be a poor person's super computer.

This technology of list generation in this present invention and list to schematic generation software should probably be easy to convert arbitrary mathematical expressions to neural networks, and mapping neural networks back to generalized arbitrary mathematical expressions. For example, upon given a neural network without capacitors and pulse firing neurons, find the mathematical general processes that the neural network can process.

The advantage of a logic code generator neural network is that the learning process would be considerably faster by not stepping thru all truth table states.

End Of Application Note 9

Application Note 10: Set Generation For A Perspective Computer Vision Navigation System Applied To An aerial Velocity Measurement System The measurement system would probably consist of:

(1) a color CCD scan camera to scan an image at at least 30 images per second, (2) a coprocessor, such as the coprocessor 4, to operate during the CCD image scanning to identify thousands of straight lines, which are stored as groups of straight lines, (3) a logic code generator, such as the logic code generator 2, to:

(a) collect and store straight line slopes or $m_j$'s and 'y-axis intersection or $b_j$' parameters in a set of 24 lists, one list per color bit, (b) find groups of 4 straight lines, which form the edges of a perspective image of a rectangle, (c) use a coprocessor, such as the coprocessor 4, to calculate in one clock pulse the 'x, y, z' image scanner location as the coprocessor output with an input bus of 4 row_column_number_pairs, representing 4 intersections, and (d) calculate the vector velocity of the image scanner location, at least two image periods, such as 2×30 milliseconds or ms, are required.

Table 162 shows one of the lists in the set of 30 lists to generate the 'x, y, z' image_scanner_location at 10 integer bits per variable. The 30 lists comprise three coordinates of x, y, and z at 10 bit resolution; thus, 3 coordinate times 10 bit resolution per coordinate equals 30 bits. At one list per output, 30 lists are required to be generated. However, more lists are required to provide scanner orientation within a vehicle, relative to a group of straight lines, such as a rectangular air strip. At 10 integer bits per row and 10 integer bits per column for the 4 input straight line intersection points, the number of parts per cube will '4 points×2 variables/point×10 parts/variable' or 80 parts.

TABLE 162

Present Invention

Title: The List Format For One Of 30 output bits.

Note: The output of the coprocessor 4, as a scanner position circuit, is $f_{output}$(input rows, input columns)

Each coordinate, such as x, y, z, is a 10 bit integer.

i_direction x(4 image rows, 4 image columns)

j_direction y(4 image rows, 4 image columns)

k_direction z(4 image rows, 4 image columns)

Since each row is 10 integer bits and each column is 10 integer bits, total number of coprocessor input wires is 4 rows times 10 bits per row plus 4 columns times 10 bits per column or 40 plus 40 or 80 wires.

80 Coprocessor Input Parts

| | [80... | | | 1] |
|---|---|---|---|---|
| | Point_1 | | ... ... | Point_4 |
| | Row_Point_1 | Column_Point_1 | ... | ... |
| | MSB LSB | MSB LSB | ... ... | |
| | 10 1 | 10 1 | ... ... | |
| 1st Cube | [ - valid - | - valid - | | ] |
| | | — | | |
| | | — | | |
| last Cube | [ - valid - | - valid - | | ] |

The 'x, y, z' equations as a function of 4 points in a perspective image can be derived by any engineering college freshman/woman having drafting knowledge.

An 'x, y, z' scanning location point will be generated in about $10^{-7}$ seconds after each image scan.

Another coprocessor, such as the coprocessor 4, will calculate a vector velocity per image_scan_time, as shown in equation (464) and and of change in direction magnitude per image_scan_time, as shown in equation (466).

$$\text{change in vector magnitude}=([x(t_{j+1})-x(t_j)]^2+[y(t_{j+1})-y(t_j)]^2+[z(t_{j+1})-z(t_j)]^2)^{1/2} \quad (464)$$

$$\text{change in vector directions}=[x(t_{j+1})-x(t_j)]i+[y(t_{j+1})-y(t_j)]j+[z(t_{j+1})-z(t_j))]k \quad (466)$$

As shown in FIG. 60, a perspective image 1950, denoted with dotted lines, contains twelve line segments:

image_line_segment_1*a* **1952*a***
image_line_segment_1*b* **1952*b***
image_line_segment_1*c* **1952*c***
image_line_segment_2*a* **1954*a***
image_line_segment_2*b* **1954*b***
image_line_segment_2*c* **1954*c***
image_line_segment_3*a* **1956*a***
image_line_segment_3*b* **1956*b***
image_line_segment_3*c* **1956*c***
image_line_segment_4*a* **1958*a***
image_line_segment_4*b* **1958*b***
image_line_segment_4*c* **1958*c***

A horizontal_line 1960 exists between two intersections: intersection_A 1962 and intersection_B 1964. The intersection_A 1962 is the intersection of the image_line_segment_3*c* **1956*c*** and the image_line_segment_4*c* **1958*c*. The intersection _B 1964** is the intersection of the image_line_segment_1*c* **1952*c*** and the image_line_segment_2*c* **1954*c***.

A four sided perspective object, which might be rectangular, is formed by the four points:

point_A 1966
point_B 1968
point_C 1970
point_D 1972.

The point_A 1966 is formed by the intersection of four image_line_segments, which are:

the image_line_segment_1*a* **1952*a***,
the image_line_segment_1*b* **1952*b***,
the image_line_segment_3*b* **1956*b***,
the image_line_segment_3*c* **1956*c*, The point_B 1968** is formed by the intersection of four image_line_segments, which are:

the image_line_segment_1*b* **1952*b***,
the image_line_segment_1*c* **1952*c***,
the image_line_segment_4*b* **1958*b***,
the image_line_segment_4*c* **1958*c*, The point_C 1970** is formed by the intersection of four image_line_segments, which are:

the image_line_segment_2*b* **1954*b***,
the image_line_segment_2*c* **1954*c***,
the image_line_segment_4*a* **1958*a***,
the image_line_segment_4*b* **1958*b*, The point_D 1972** is formed by the intersection of four image_line_segments, which are:

the image_line_segment_2*a* **1954*a***,
the image_line_segment_2*b* **1954*b***,
the image_line_segment_3*a* **1956*a***,
the image_line_segment_3*b* **1956*b***.

A coprocessor, such as the coprocessor 4, could determine in less than a clock period of about $10^{-7}$ seconds if these four points, such as the point_A 1966, :

(a) enclose a rectangle, (b) the location of the horizontal_line 1960 in three dimensions.

(c) the best vector_surface_steering_coordinates to land an aircraft along a selectable glide path in 3 dimensions or to land an aircraft onto the rectangle heading toward either the intersection_A 1962 or the right vanishing point or the intersection_B 1964 or the left vanishing point, (d) the present 3 dimensional or 3 D location of the image scanner above the rectangle, and (e) the 3 D engine and 3 D air surface control vectors to land or reposition the vehicle carrying the image scanner.

End Of Application Note 10

Application Note 11: Finding the volume between a surface and a plane by:

(1) generating a list of cubes, (2) counting all the 0-cubes with a preprogrammed X part counting coprocessor, and (3) multiplying the count number of 0-cubes times a unit volume to obtain the volume between the surface and the plane Use of jump down flowcharts to solve a problem normally solved with nested do loops or jump up flowcharts is explained below.

Although the logic code generator can not generate a set of lists for a feedback flow chart, such as the DO loop in the Fortran computer flow chart, the logic code generator can perform the equivalent in equation solving capability faster than a conventional computer and with significantly greater accuracy.

The purpose of the nested DO loop is to find the volume under the surface '$\log_{xy}(5+y^x)$' and above the 'z=0' plane and bounded by the planes on the x and y limits. The logic code generator will count the number group of states or effectively the number groups of (x,y,z)'s in the list, where each number group represents the minimized unit volume element in the universe of states. This number of states is the number of unit volumes under the bounded surface '$\log_{xy}(5+y^x)$' and above the plane 'z=0', and is the most precise solution achieveable. A conventional computer might take more than $(300+)^2$ or 90,000+ years to loop through this volume, using a nested DO loop, with a 1 GHz clock or 1 nanosecond or 1 ns ($10^{-9}$ seconds) per loop with the variables 'x', 'y', and 'z' at 64 bit floating point resolution. Calculation for the 300+ year is: $2^{64}\times$(1 second/$10^{+9}$ ns)$\times$(1 hour/3600 seconds)$\times$(1 day/24 hours)$\times$(1 year/365 days)= 300+ years. The logic code generator counts the states or numbers by counting the X's in each cube. For example: if the first cube of 3×64 or 192 parts had 150 X's, the number of states or unit volumes in this cube would be $2^{+150}$ or about $10^{+45}$. This $2^{+150}$ number would be converted to floating point by a coprocessor with about ten nanoseconds or about $10^{-9}$ seconds, and be added to the other floating point numbers of the other cubes, and then be multiplied by the floating point unit volume, utilizing a coprocessor, in the time of the number of cubes in the list times the clock period in probably less than a millisecond.

For example: if the logic code generator 2 received a nest of two DO loops with an arbitrary algebraic equation inside the DO loop nest of '$V=\log_{xy}(5+y^x)+V$' and 'V' was defined before the nest at probably 'V=0', the logic code generator 2 would generate a group of instruction expressions, to be directed to the logic code generator controller 294, looking somewhat like logic expressions in equation (468), below.

$$\begin{aligned} \text{volume} = \; & (\text{minimum } x \leqq x \leqq \text{maximum } x)\cdot\text{AND}\cdot \\ & (\text{minimum } y \leqq y \leqq \text{maximum } y)\cdot\text{AND}\cdot \\ & (0 \leqq z \leqq \log_{xy}(5+y^x)) \end{aligned} \tag{468}$$

For clarity, equation (468) can be rewritten as equation (470).

$$\begin{aligned} \text{volume} = \; & (\text{minimum } x - x \leqq 0)\cdot\text{AND}\cdot \\ & (0 \leqq \text{maximum } x - x)\cdot\text{AND}\cdot \\ & (\text{minimum } y - y \leqq 0)\cdot\text{AND}\cdot \\ & (0 \leqq \text{maximum } y - y)\cdot\text{AND}\cdot \\ & (0 \leqq z)\cdot\text{AND}\cdot \\ & (0 \leqq \log_{xy}(5+y^x) - z) \end{aligned} \tag{470}$$

The logic code generator 2 will then create the single list for this condition equation, called the volume list. A cube in this 3 variable list will be three times the width of one variable in parts, in accordance with RULE 6.

'(min x - x≦0)' means '(f≦0)' and

'(0≦max x - x)' means '(g≧0)', where:

$$f=\text{min } x - x \tag{472}$$

$$g=\text{max } x - x \tag{474}$$

'f' or 'f(x,min x)' is condition 5 for '(f≦0)' or equation (142) and 'g' or (g(x,max x)' is condition 4 for '(g≧0)' or equation (136).

For simplicity, equation (468) can be rewritten into equation (476)

$$\begin{aligned} \text{volume} = \; & (0 \leqq x - \text{minimum } x)\cdot\text{AND}\cdot \\ & (0 \leqq \text{maximum } x - x)\cdot\text{AND}\cdot \\ & (0 \leqq y - \text{minimum } y)\cdot\text{AND}\cdot \\ & (0 \leqq \text{maximum } y - y)\cdot\text{AND}\cdot \\ & (0 \leqq z)\cdot\text{AND}\cdot \\ & (0 \leqq \log_{xy}(5+y^x) - z) \end{aligned} \tag{476}$$

In a similar manner for generating the set of lists for $L_{maximum\_x - x}$, the logic code generator 2 will first create the Rule 1 and Rule 2 input lists and then use a floating point subtraction routine to generate all the other lists of set $Lg_k$, where '$Lg_k$' is defined as:

(a) $Lg_1=L_{x\text{ - }minimum\_x}$ (b) $Lg_2=L_{maximum\_x}$ (c) $Lg_3=L_{y\text{ - }maximum\_y}$ (d) $Lg_4=L_{maximum\_y\text{ - }y}$ (e) $Lg_5=L_z$ (f) $Lg_6=L_{\log_{xy}(5+y^x)}$ Equation (137) is to be used, since it is easier to use than equation (136). Equation (137) is rewritten as equation (478).

$$\begin{aligned} L(g_k \geqq 0) = & \left( \underset{j=2}{\overset{N}{\cdot\text{AND}\cdot}} \{\text{NOT}(Lg_{kj})\} \right) \cdot\text{OR}\cdot \\ & (\text{NOT}\{L_{gk1}\})\cdot\text{AND}\cdot \left\{ \text{NOT}\left( \underset{j=1}{\overset{N}{\cdot\text{AND}\cdot}} \{\text{NOT}(L_{gkj})\} \right) \right\} \end{aligned} \tag{478}$$

Before equation (476) can be used, list '$g_k \geqq 0$' with '$g_1$= maximum x - x' is generated in the following steps:

(Step 1a) if 'maximum x' is a number, then set $L_{maximum\_x}$ will be defined as a Rule 2 set of lists, as shown in Table 163.

TABLE 163

| Present Invention | | | | |
|---|---|---|---|---|
| Title: Example of lists if all limits, such as maximum and minimum are known numbers. | | | | |
| Variables | x | y | z | |
| Parts | 1 | N_N+1 | 2N_2N+1 | 3N |
| Rule 2 lists: | | | | |
| $L_{maximum\_x\_bit\_1}$ if maximum_x_bit_1 is 0. | [N......... | N_N............. | N_N...........N] | |
| $L_{maximum\_x\_bit\_2}$ if maximum_x_bit_2 is 1. | [X......... | X_X.............. | X_X...........X] | |

(Step 1b) if 'maximum_x' is to be defined later as a number, then 'maximum_x' is to be considered a variable. Set $L_{maximum\_x}$ will be defined as a Rule 1 set of lists with cube width increased by N in accordance with Rule 6, as shown in Table 164.

TABLE 164

| Present Invention |
|---|
| Title: Example of lists if all limits, such as maximum and minimum are undefined variables, which use Rule 1 input lists.. |
| Variables: |
| max_ x min_x max_y min_y x y z |
| Parts: |
| 1 N_N+1 2N_2N+1 3N_3N+1 4N_4N+1 5N_5N+1 6N_6N+1 7N |
| Rule 1 lists: |
| $L_{maximum\_x\_bit\_1}$: |
| [1X.X_X......X_X.......X_X.......X_X.......X_X....X] |
| — |
| — |
| — |
| $L_{maximum\_x\_bit\_1}$: |
| [X.X1_X......X_X.......X_X.......X_X.......X_X....X] |
| — |
| — |
| Rule 1 lists: |
| $L_{minimum\_y\_bit\_1}$: |
| [X..X_X......X_X.......X_1X.......X_X.......X_X.....X] |
| — |
| — |
| — |
| $L_{minimum\_y\_bit\_1}$: |
| [X..X_......X_X.......X_X......X1_X......X_X.......X_X.....X] |
| Rule 1 lists: |
| $L_{x\_bit\_1}$: |
| [X..X_X......X_X.......X_X.......X_1X......X_X.......X_X...X] |
| — |
| — |
| — |
| $L_{x\_bit\_1}$: |
| [X..X_X......X_X.......X_X.......X_X.....X1_X........X_X....X] |
| — |
| — |
| — |
| Rule 1 lists: |
| $L_{z\_bit\_1}$: |
| [X..X_X......X_X.......X_X.......X_X......X_X.......X_1X...X] |
| — |
| — |
| — |
| $L_{z\_bit\_1}$: |
| [X..X_X......X_X.......X_X.......X_X......X_X.......X_X...X1] |

For simplicity to keep cube width down to 3N parts, the limits maximum and minimum will be assumed to be known numbers; thus Rule 2 input lists will be used. Normally, maximum limits and minimum limits will be known, since all calculations are to be performed by the logic code generator 2.

The '(0≦z)' with 'g=z' results in a simple list of all unit areas satisfied by the equation (480).

$$Lg_5 \geqq 0 = \left\{ \underset{j=2}{\overset{N}{AND}} (Lg_{5j}) \right\} \cdot OR \cdot \left\{ Lg_{51} \cdot AND \cdot \left\{ NOT \left( \underset{j=1}{\overset{N}{AND}} (Lg_{5j}) \right) \right\} \right\} \qquad (480)$$

The '(0≦$\log_{xy}(5+y^x)-z$)' with 'g=$\log_{xy}(5+y^x)-z$' results in a simple list satisfied by the equation (482).

$$Lg_6 \geqq 0 = \tag{482}$$

$$\left\{ \underset{j=2}{\overset{N}{\text{AND}}} (Lg_{6j}) \right\} \cdot\text{OR}\cdot \left\{ Lg_{61}\cdot\text{AND}\cdot \left\{ \text{NOT}\left( \underset{j=1}{\overset{N}{\text{AND}}} (Lg_{6j}) \right) \right\} \right.$$

'$\{w=(\log_{xy}(5+y^x)-z)\}\geqq 0$' is condition 4 or equation (134). Cube width is defined as [x y z] or 3N. Each variable has N parts of resolution. The set of lists for variable w is: $L_{w1}, L_{w2}, \ldots, L_{w(n-1)}, L_{wn}$.

$$L_{w\geqq o} = \tag{484}$$

$$\left\{ \underset{j=2}{\overset{N}{\text{AND}}} (L_{wj}) \right\} \cdot\text{OR}\cdot \left\{ L_{w1}\cdot\text{AND}\cdot \left\{ \text{NOT}\left( \underset{j=1}{\overset{N}{\text{AND}}} (L_{wj}) \right) \right\} \right\}$$

The resultant equation (486) is the final list for counting states with the coprocessor 4.

$$\text{volume} = \underset{k=1}{\overset{6}{\text{AND}}} (Lg_k) \tag{486}$$

End Of Application Note 11

Application Note 12: Inverse Transforms Of Any Function

Assume a set of equations are defined in equation (488) to range to equation (490), such as:

$$x_{43} = a_1(x_1,x_2, \ldots \ldots,x_{42},x_{44}, \ldots \ldots,x_k) \tag{488}$$

$$\vdots$$

$$x_{43} = a_k(x_1,x_2, \ldots \ldots,x_{42},x_{44}, \ldots \ldots,x_k) \tag{490}$$

The set of equation (488) to (490) can be put into $f_j(x_1,x_2, \ldots,x_k)$ equations, as equations (492) thru (494). where $f_j=f_j(x_1,x_2, \ldots,x_k)$, such as:

$$f_1 = x_{43} - a_1(x_1,x_2, \ldots \ldots,x_{42},x_{44}, \ldots \ldots,x_k) \tag{492}$$

$$\vdots$$

$$f_k = x_{43} - a_k(x_1,x_2, \ldots \ldots,x_{42},x_{44}, \ldots \ldots,x_k) \tag{494}$$

Since each $f_j(x_1,x_2, \ldots,x_k)$ equals zero, the equation (424) is used and rewritten as equation (496), in accordance with condition 2, $Lf_{ij}$ is a list for resolution bit i.

The width of any cube in $Lf_{ij}$ is k times the resolution bits in $x_j$, thus the width is kN parts wide.

$$\text{List}(f_j=0) = \underset{i=1}{\overset{N-1}{\text{AND}}} \{\text{NOT}(Lf_{ij})\} \tag{496}$$

The symbol '$g_j(x_1,x_2, \ldots,x_k)\geqq 0$' is defined as an arbitrary condition, as an example. Since each $g_j(x_1,x_2, \ldots,x_k)$ is equal to or greater than zero, the equation (478) is used and rewritten as equation (498), in accordance with equation (137) in condition 4. $Lg_{ij}$ is a list for resolution bit i.

$$\text{List}(g_j\geqq 0) = \left( \underset{i=2}{\overset{N}{\text{AND}}} \{\text{NOT}(Lg_{ij})\} \right) \cdot\text{OR}\cdot \tag{498}$$

$$(\text{NOT}\{Lg_{j1}\})\cdot\text{AND}\cdot \left\{ \text{NOT}\left( \underset{i=1}{\overset{N}{\text{AND}}} \{\text{NOT}(Lg_{ij})\} \right) \right\}$$

The equation (496) and (498) can be combined into equation (499), equation (500) or equation (502) for clarity. Lw is the entire exact truth table without extra or 'don't care' states. In general, Lw can not be generated by listing separate states or 0-cubes, due to the astronomical number of 0-cubes.

$$Lw = \left\{ \underset{j=1}{\overset{k}{\text{AND}}} (\text{List}\{f_j(x_1,x_2, \ldots \ldots,x_k)=0\}) \right\} \cdot\text{AND}\cdot \tag{499}$$

$$\left\{ \underset{j=1}{\overset{k}{\text{AND}}} (\text{List}\{g_j(x_1,x_2, \ldots \ldots,x_k)\geqq 0\}) \right\}$$

$$Lw = \left\{ \underset{j=1}{\overset{k}{\text{AND}}} (\ldots\text{right side of equation (496)}\ldots) \right\} \cdot\text{AND}\cdot \tag{500}$$

$$\left\{ \underset{j=1}{\overset{k}{\text{AND}}} (\ldots\text{right side of equation (498)}\ldots) \right\}$$

$$Lw = \left\{ \underset{j=1}{\overset{k}{\text{AND}}} \left\{ \underset{i=1}{\overset{N-1}{\text{AND}}} (\text{NOT}\{Lf_{ij}(x_1,x_2, \ldots \ldots,x_k)\}) \right\} \right\} \cdot\text{AND}\cdot \tag{500}$$

$$\left\{ \underset{j=1}{\overset{k}{\text{AND}}} \left( \underset{i=2}{\overset{N}{\text{AND}}} \{\text{NOT}(Lg_{ij})\} \right) \right\} \cdot\text{OR}\cdot$$

$$\left\{ \underset{j=1}{\overset{k}{\text{AND}}} (\text{NOT}\{Lg_{j1}\})\cdot\text{AND}\cdot \left\{ \text{NOT}\left( \underset{i=1}{\overset{N}{\text{AND}}} \{\text{NOT}(Lg_{ij})\} \right) \right\} \right\},$$

where N is the number of resolution bits (502)
and gij equals $g_{ij}(x_1,x_2, \ldots \ldots,x_k)$.

Assume the goal is to find a vector $\{x_{45}\ x_{46}\ x_{47}\}$ as defined in equations: (504), (506), (508).

$$x_{45}=b_1(x_1,x_{44},x_{48}) \tag{504}$$

$$x_{46}=b_2(x_1,x_{44},x_{48}) \tag{506}$$

$$x_{47}=b_3(x_1,x_{44},x_{48}) \tag{508}$$

List $Lx_{45\_bit\_1}$ is the first list in set $Lx_{45}$ as shown in Table 165.

Only 6N part wide cubes are shown in Table 165 for simplicity. The real width is kN parts wide. Each cube in Lw is kN parts wide.

TABLE 165

| Present Invention | | | | | | |
|---|---|---|---|---|---|---|
| Title: | Set $Lx_{45}$ Equations | | | | | |
| Variables | in | in | out | out | out | in |
| | $x_1$ | $x_{44}$ | $x_{45}$ | $x_{46}$ | $x_{47}$ | $x_{48}$ |
| Set $Lx_{45}$ of N lists | | | | | | |
| List $x_{45\_bit\_1}$ | [X..X_X..X_1X..X_X.X_X..X_X..X].AND.Lw | | | | | |
| List $x_{45\_bit\_2}$ | [X..X_X..X_X1X..X_X.X_X..X_X.X].AND.Lw | | | | | |

TABLE 165-continued

| | |
|---|---|
| | — |
| | — |
| | — |
| List $x_{45}$_bit—N–1 | [X..X_X..X_X..X1X_X..X_X..X_X..X].AND.Lw |
| List $x_{45\_bit\_N}$ | [X..X_X..X_X..X1_X..X_X..X_X..X].AND.Lw |

In a similar method as in application note 11, a single list is generated for the equations (500) or (502) referred to as Lw.

TABLE 166

| Present Invention | | | | | | |
|---|---|---|---|---|---|---|
| Title: | Single List Lw | | | | | |
| Note: | List Lw is a close boolean minimization of the truth table of all inputs and outputs. | | | | | |
| Variables | in | in | out | out | out | in |
| | $x_1$ | $x_{44}$ | $x_{45}$ | $x_{46}$ | $x_{47}$ | $x_{48}$ |
| Parts | 1..N_N+1..2N_2N+1..3N_3N+1..4N_4N+1..5N_5N+1..6N | | | | | |
| | [————— valid —————] | | | | | |
| | — | | | | | |
| | — | | | | | |
| | [————— valid —————] | | | | | |

Since the output variables of $x_{45}$, $x_{46}$, $x_{47}$ are three in number, then each cube, such as in list $Lx_{45\_bit\_1}$, will be (k–3)N parts wide, and will not include the output variables as shown in Table 167.

The answer to application note 12 is 3N lists or 3 sets of lists, where each list looks like the list in Table 167.

TABLE 167

| Present Invention | |
|---|---|
| Title: Any List In Set $Lx_{45}$ Or Set $Lx_{46}$ Or Set $Lx_{47}$ | |
| Note: A set is a set of lists. | |
| | N Parts Per Variable |
| Input Variables | $x_1$ $x_{44}$ $x_{48}$ Others |
| Parts | 1.....N_N+1..2N_2N+1..3N_3N+1.. ..(k–3)N |
| | [————— valid —————] |
| | — |
| | — |
| | [————— valid —————] |

Variable $b_j(x_1,x_{44},x_{48})$ will be represented as a set of lists, where each list of $b_j$ is designated $x_{45\_bit\_j}$.

In general, a inverse transform will not be easy to generate per mathematical function, such as finding the inverse of y(x), where x and y lie within a donut or ring that satisy the below equation (512).

$$Lf_A=\{List(x^2+y^2<6^2)\}.AND.\{List(x^2+y^2>5^2)\} \quad (510)$$

Ideally, the inverse function 'x' will have one value per one value of 'y', with the given function as y(x).

Since the inverse has two values of y per one value of x in the ring region of equation (510), the inverse function will need to have specified the regions of interest or conditions, such as below condition equation (512).

$$Lg_A=\{List(y-3>0)\}.AND.\{List(x>0)\} \quad (512)$$

A single list, similar to list Lw, would exist to satisfy the AND of equation (510) & equation (512) or $Lw_A$ in equation (514).

$$Lw_A=Lf_A.AND.Lg_A \quad (514)$$

Using Rule 1 input lists as in Table 165, the set of lists to represent the equation (514) would be generated in a similar manner as in Table 165.

End Of Application Note 12

APPENDIX

Computer Program Listings [ Total Of Four]

Computer Program Listing Number 1 Pages 1-41

Computer Program Listing Number 1 shows a Fortran computer program, labelled M.FOR, for generating a set of output bit resolution close boolean minimizations for a prior art integer array multiplier circuit.

Computer Program Listing Number 2 Pages 42-75

Computer Program Listing Number 2 shows a Fortran computer program, labelled A.FOR, for generating a set of output bit resolution close boolean minimizations for a k bit cascading integer binary adder.

Computer Program Listing Number 3 Pages 76-112

Computer Program Listing Number 3 shows a Fortran computer program, labelled S.FOR, for generating a set of output bit resolution boolean minimizations for a k bit integer binary signed subtraction.

Computer Program Listing Number 4 Pages 113-182

Computer Program Listing Number 4 shows a Fortran computer program, labelled MF.FOR, for generating a set of output bit resolution close boolean minimizations for a k bit floating point multiplier, undebugged at present.

```
C          *** Computer Program Listing Number 1 ***

C     Fixed Point Multiply - Working,     M.FOR
C     Null cubes and universe cubes are accepted as
C     inputs.The main application is to have all programs
C     accept these two special cubes for converting object
C     files ( a compliation of any program in any language )
C     to boolean lists for fast and compact processing.
C     ------------------------------------------------------
C     /B23/ Common Block will have these two terms removed:
C     SUBTR and F so that W.FOR will run on Wang.
C     F Code,Fixed Point
C     F=1:Addition
C     F=2:Subtraction
C     F=3:Multiplication
C     F=4:Division
C     ----------------------------------------
C     NOTE: In #6 & #7.I have Ced those ifs and put in
C     limited ifs below them.

      COMMON /B01/ JCUBE(20,2,8)
      COMMON /B02/ CUBE(20,2,8),CUBERP(20,2,8)
      COMMON /B04/ CHART(3),SPACE(20,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ A8,B8
      COMMON /B18/ AN,CN,JTOL,NMAX,IBFF,KCDA,KMAX,W(20),C(20),
     1     CD(20),A,CM(20)
      COMMON /B19/ NEW,SUM,JNUM,NMAXX,IA2,ISHQ,Q
     1     MODE,IA,TC,NMAXTW,CUBENUM
      COMMON /B20/ IAX(8),IR,ITO,TOTAL,JNUMS
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KS,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
```

```
      COMMON /B38/ CUBRP1(8,20,8)

      LOGICAL*2 JCUBE
      LOGICAL*2 CUBE,CUBERP
      CHARACTER CHART,SPACE
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      C(20)=1
      IR=1
      LTD=20
C     F=3
      AN=1
      CN=1
      CUBENUM=1
      IR=4
      IBPP=2
      SUBTR=0
      NMAX=2
      NMAXTW=2*NMAX
      NMAXP=NMAX+1
      NMAXZ=NMAX-1
C     AT(NMAX),BT(NMAX)
      DO 29 J11=1,NMAX
           AT(J11)=1
           BT(J11)=1
```

```
 29   CONTINUE
      READ(7,30)(CHART(IA1),IA1=1,3)
 30   FORMAT(3A1)
      WRITE(16,*)'Multiply Run'
C     CPL(1) is defined,below.  ----------------------------------------

C     Normally,arrays A1.A2,B1,B2 will each contain many
cubes;but for
C     now will contain only one cube.
C     CPL(1)=A(1).AND.B(1)
C     ------------------START UP CONDITIONS--------------------------
C     Note:CARRY IN is '0' ( grounded ).
C     In the event of using the carry input,the arrays need to be
enlarged!
      DO 143 J3=1,NMAX
            AN=AT(J3)
            CN=BT(J3)
            JN=J3+NMAX
            DO 31 K=1,NMAXTW
                  A1(J3,AN,K)=.TRUE.
                  A2(J3,AN,K)=.TRUE.
                  B1(J3,CN,K)=.TRUE.
                  B2(J3,CN,K)=.TRUE.
C     Bit Redefinition.
                  IF(K.EQ.J3) THEN
C     ---------------------------------- A(J3)=1
                        A1(J3,AN,K)=.FALSE.
                        A2(J3,AN,K)=.TRUE.
                  ELSE IF(K.EQ.JN) THEN
C     ---------------------------------- B(J3)=1
                        B1(J3,CN,K)=.FALSE.
                        B2(J3,CN,K)=.TRUE.
                  ENDIF
 31         CONTINUE
 143  CONTINUE
C     WRITE(16,*)'CUBE A INPUT'
            DO 310 KG=1,NMAX
                  AN=AT(KG)
                  DO 311 K=1,NMAXTW
      IF(A1(KG,1,K).AND.A2(KG,1,K)) THEN
            SPACE(KG,K)=CHART(3)
      ELSE IF(A1(KG,1,K).AND.(.NOT.A2(KG,1,K))) THEN
            SPACE(KG,K)=CHART(1)
      ELSE IF((.NOT.A1(KG,1,K)).AND.A2(KG,1,K)) THEN
            SPACE(KG,K)=CHART(2)
      ELSE
C           WRITE(16,*)'    **** ERROR in CUBE A INPUT ****'
      ENDIF
 311              CONTINUE
```

```
C               WRITE(16,314)KG,(SPACE(KG,IG),IG=1,NMAXTW)
 314            FORMAT(1X,I4,2X,2(2A1,5X))
 310        CONTINUE
C           WRITE(16,*)'    '
C           WRITE(16,*)'CUBE B INPUT'
            DO 312 KG=1,NMAX
                  CN=BT(KG)
                  DO 313 K=1,NMAXTW
      IF(B1(KG,1,K).AND.B2(KG,1,K)) THEN
            SPACE(KG,K)=CHART(3)
      ELSE IF(B1(KG,1,K).AND.(.NOT.B2(KG,1,K))) THEN
            SPACE(KG,K)=CHART(1)
      ELSE IF((.NOT.B1(KG,1,K)).AND.B2(KG,1,K)) THEN
            SPACE(KG,K)=CHART(2)
      ELSE
C           WRITE(16,*)'    **** ERROR in CUBE B INPUT ****'
      ENDIF
 313              CONTINUE
C                 WRITE(16,314)KG,(SPACE(KG,IG),IG=1,NMAXTW)
 315              FORMAT(1X,I4,2X,2(2A1,5X))
 312        CONTINUE
      AN=AT(1)
C     WRITE(16,*)'CUBMAIN1AA AN&CN=',AN,CN
      DO 110 I=1,AN
            DO 111 K=1,NMAXTW
                  ACUBE(I,1,K)=A1(1,I,K)
                  ACUBE(I,2,K)=A2(1,I,K)
 111        CONTINUE
 110  CONTINUE
      CN=BT(1)
C     WRITE(16,*)'CUBMAIN1AAA AN&CN=',AN,CN
      DO 113 I1=1,CN
            DO 112 K=1,NMAXTW
                  CUBE(I1,1,K)=B1(1,I1,K)
                  CUBE(I1,2,K)=B2(1,I1,K)
 112        CONTINUE
 113  CONTINUE
      JCOVER=1
      TD=5
      CALL DJR
C     CPL(i) list is now defined.See DJR(TD=5).
C     ------------------------------------------------------------------------
C     PVA1(1)=A(2).AND.B(1)
C     PVA1(J)=A(J1).AND.B(J2).Output Pin lists are:CPL(KZ).
C     CPL(KZ) is generated.
      DO 115 J2=2,NMAX
C     DO 115 J2=2.2
C         (J2-1) is number of Adders.where J2=2 is 1st Adder.
            IF(J2.EQ.2) THEN
```

```
C      ---------------- 1ST Adder
                 DO 116 J=1,NMAXZ
                      JCOVER=J
                      J1=J+1
C      1ST Add.
C      PVA(J)=A(J1).AND.B(1)
                      AN=AT(J1)
                      DO 117 I2=1,AN
                           DO 118 K=1,NMAXTW
                                ACUBE(I2,1,K)=A1(J1,I2,K)
                                ACUBE(I2,2,K)=A2(J1,I2,K)
 118                       CONTINUE
 117                  CONTINUE
                      CN=BT(1)
                      DO 119 I3=1,CN
                           DO 120 K=1,NMAXTW
                                CUBE(I3,1,K)=B1(1,I3,K)
                                CUBE(I3,2,K)=B2(1,I3,K)
 120                       CONTINUE
 119                  CONTINUE
                 TD=3
                 CALL DJR
 116             CONTINUE
                 CYLT(1)=1
C                PVAJ(NMAX)=0
C                DO 129 IU1=1,AT(NMAX)
C                     DO 130 IU2=1,NMAXTW
C                          PVA1(NMAX,IU1,IU2)=.TRUE.
C                          PVA2(NMAX,IU1,IU2)=.FALSE.
C130                  CONTINUE
C129             CONTINUE
C                PVA2(NMAX,1,NMAX)=.FALSE.
C                PVAT(NMAX)=AT(NMAX)
                 PVAT(NMAX)=0
            ELSE
C      -------------------------------------Not 1st Adder
                 DO 809 J=1,NMAXZ
                      J1=J+1
       PVAT(J)=CACT(J1)
       DO 131 IU1=1,PVAT(J)
            DO 132 IU2=1,NMAXTW
                 PVA1(J,IU1,IU2)=CACUB1(J1,IU1,IU2)
                 PVA2(J,IU1,IU2)=CACUB2(J1,IU1,IU2)
 132        CONTINUE
 131   CONTINUE
 809             CONTINUE
       PVAT(NMAX)=CYLT(NMAXP)
       DO 134 IU1=1,PVAT(NMAX)
            DO 136 IU2=1,NMAXTW
```

```
                PVA1(NMAX,IU1,IU2)=CYL1(NMAXP,IU1,IU2)
                PVA2(NMAX,IU1,IU2)=CYL2(NMAXP,IU1,IU2)
 136        CONTINUE
 134 CONTINUE
            ENDIF
C     PVA(J)=A(J).AND.B(J2 is below:
                DO 144 J=1,NMAX
                      JCOVER=J
                AN=AT(J)
                DO 176 I2=1,AN
                      DO 177 K=1,NMAXTW
                            ACUBE(I2,1,K)=A1(J,I2,K)
                            ACUBE(I2,2,K)=A2(J,I2,K)
 177                  CONTINUE
 176            CONTINUE
                CN=BT(J)
                DO 179 I3=1,CN
                      DO 180 K=1,NMAXTW
                            CUBE(I3,1,K)=B1(J2,I3,K)
                            CUBE(I3,2,K)=B2(J2,I3,K)
 180                  CONTINUE
 179            CONTINUE
                TD=4
                CALL DJR
C           WRITE(16,*)J,' PVBT(JCOVER)=',PVBT(JCOVER)
 144            CONTINUE
                CALL ADCUBE
C               IF(J2.EQ.2) THEN
C                     WRITE(16,*)' '
C                     WRITE(16,*)'  Adder Output Lists - LSB 1st'
C                     WRITE(16,*)' '
C                     DO 834 K=1,NMAX
C                           WRITE(16,*)'  K=',K
C                           WRITE(16,*)'  CACT(K)=',CACT(K)
C                           DO 836 IU1=1,CACT(K)
C                                 DO 837 IU2=1,NMAXTW
C     WRITE(16,835)IU1,(CACUB1(K,IU1,IU2),CACUB2(K,IU1,IU2),
C     1     IU2=1,NMAXTW)
C835 FORMAT(1X,I4,2X,4(2L1,1X))
C837                             CONTINUE
C836                       CONTINUE
C                           WRITE(16,*)' '
C                           WRITE(16,*)' '
C834                  CONTINUE
C               ENDIF
C               CPLj(J2)=CACUBj(1)=S(1)
                CPLT(J2)=CACT(1)
                DO 137 IU1=1,CPLT(J2)
                      DO 139 IU2=1,NMAXTW
```

```
                    CPL1(J2,IU1,IU2)=CACUB1(1,IU1,IU2)
                    CPL2(J2,IU1,IU2)=CACUB2(1,IU1,IU2)
 139            CONTINUE
 137          CONTINUE
              IF(J2.EQ.NMAX) THEN
                DO 843 JX=2,NMAX
                    J=JX+NMAXZ
                    CPLT(J)=CACT(JX)
                    DO 844 IU1=1,CPLT(J)
                      DO 845 IU2=1,NMAXTW
                    CPL1(J,IU1,IU2)=CACUB1(JX,IU1,IU2)
                    CPL2(J,IU1,IU2)=CACUB2(JX,IU1,IU2)
 845                  CONTINUE
 844                CONTINUE
 843            CONTINUE
                CPLT(NMAXTW)=CYLT(NMAXP)
                DO 846 IU1=1,CPLT(NMAXTW)
                    DO 847 IU2=1,NMAXTW
                CPL1(NMAXTW,IU1,IU2)=CYL1(NMAXP,IU1,IU2)
                CPL2(NMAXTW,IU1,IU2)=CYL2(NMAXP,IU1,IU2)
 847                CONTINUE
 846            CONTINUE
              ENDIF
 115        CONTINUE
C     OUTPUT/////////////////////////////////////////////////////////////
C     AQ=.FALSE.
C     DO 62 KAB=1,NMAX
C           BQ=.FALSE.
C           ILTD=LTD+1
C     IF((.NOT.(PVAT(KAB).LT.ILTD)).AND.(.NOT.(PVBT(KAB).LT.ILTD)
).AND.
C     1     (.NOT.(CYLT(KAB).LT.ILTD)).AND.(.NOT.(CACT(KAB).LT.ILT
D)).AND.
C     2     (.NOT.(CPLT(KAB).LT.ILTD))) THEN
C           BQ=.TRUE.
C     ENDIF
C           AQ=BQ.OR.AQ
C62   CONTINUE
C     IF(.NOT.AQ) THEN
C     DO 63 IW=1,NMAX
C     TOTAL=PVAT(IW)+PVBT(IW)+CYLT(IW)+CACT(IW)+CPLT(IW)
C     WRITE(16,70)IW,IW,PVAT(IW),IW,PVBT(IW),IW,CYLT(IW),IW,CACT(
IW),
C     1     IW,CPLT(IW),TOTAL
C70   FORMAT(//1X,3HIR=,I4,2X,5HPVAT(,I4,2H)=,I4,2X,5HPVBT(,I4,2H
)=,
C     1     I4,2X,5HCYLT(,I4,2H)=,I4,2X,5HCACT(,I4,2H)=,I4,2X,5HCP
LT(,I4,2H)=,
C     2     I4,2X,6HTOTAL=,I4)
```

```
C63   CONTINUE
C     ENDIF
      WRITE(16,*)'*** NMAXTW OUTPUT PIN BOOLEAN LISTS ***'
      DO 66 I49=1,NMAXTW
           WRITE(16,64)I49,I49
 64   FORMAT(//1X,21H Below is List Number,I4,4H Pin,I4,I4//)
           WRITE(16,65)
 65   FORMAT(4X,3HLSB,5X,3HMSB,1X)
           IF(CPLT(I49).GT.LTD) THEN
                CPLT(I49)=LTD
                WRITE(16,*)' CPLT/PRINT.GT.LTD'
           ENDIF
           DO 68 KG=1,CPLT(I49)
                DO 67 K=1,NMAXTW
      IF(CPL1(I49,KG,K).AND.CPL2(I49,KG,K)) THEN
           SPACE(KG,K)=CHART(3)
      ELSE IF(CPL1(I49,KG,K).AND.(.NOT.CPL2(I49,KG,K))) THEN
           SPACE(KG,K)=CHART(1)
      ELSE IF((.NOT.CPL1(I49,KG,K)).AND.CPL2(I49,KG,K)) THEN
           SPACE(KG,K)=CHART(2)
      ELSE
           WRITE(16,*)'    **** ERROR in Bit Cover ****'
      ENDIF
 67                CONTINUE
                WRITE(16,69)KG,(SPACE(KG,IG),IG=1,NMAXTW)
 69             FORMAT(1X,I4,2X,2(2A1,1X))
 68        CONTINUE
 66   CONTINUE
C     STOP
      END
C     No. 1 Relabel
C     ------------------------------------------
      SUBROUTINE RLABEL
      COMMON /B02/ CUBE(20,2,8),CUBERP(20,2,8)
      COMMON /B19/ NEW,SUM,JNUM,NMAXX,IA2,ISHQ,Q
      1     MODE,TA,TC,NMAXTW,CUBENUM
      LOGICAL*2 CUBE,CUBERP
      INTEGER NEW,SUM,JNUM,NMAXX,IA2,ISHQ,Q
      1     MODE,TA,TC,NMAXTW,CUBENUM
C     Relabel Cubes in List.
C     Define as L1 List
      IF(CUBENUM.GT.0) THEN
C     ------------------------------------------------------------
      DO 2 JA=1,CUBENUM
           DO 4 IA=1,NMAXTW
                CUBE(JA,1,IA)=CUBERP(JA,1,IA)
                CUBE(JA,2,IA)=CUBERP(JA,2,IA)
 4         CONTINUE
 2    CONTINUE
```

```
C     -----------------------------------------------
      ENDIF
      RETURN
      END
C     No. 2 List AND
C     -----------------------------------------------
      SUBROUTINE LISAND
      COMMON /B02/ CUBE(20,2,8),CUBERP(20,2,8)
      COMMON /B09/ LCUBE(20,2,8),ACUBE(20,2,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 CUBE,CUBERP
      LOGICAL*2 LCUBE,ACUBE
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
      LOGICAL*2 CQ,DQ
C     L(NEW)=L(AA).AND.L(CA)
C     L(AN) has AN cubes.
C     L(CN) has CN cubes.
C     L(j)=L(jn1),L(jn2),....
C     L(k)=L(kn1),L(kn2),....
C     Generation of RP cubes,where RP=(AN+CN).
      IF((AN.GT.0).AND.(CN.GT.0)) THEN
C     -----------------------------------------------------
      IF(CN.EQ.1) THEN
C       Investigate to see if cube is null.
          CQ=.FALSE.
          DO IG=1,NMAXTW
                DQ=.FALSE.
                IF((.NOT.CUBE(1,1,IG)).AND.(.NOT.CUBE(1,2,IG)))
THEN
                      DQ=.TRUE.
                ENDIF
                CQ=CQ.OR.DQ
          ENDDO
          IF(CQ) THEN
C         Null cube input!
                IF(TA.EQ.0) THEN
C               Universe cube is created.
```

```
                    DO IG=1,NMAXTW
                          CUBE(1,1,IG)=.TRUE.
                          CUBE(1,2,IG)=.TRUE.
                    ENDDO
              ENDIF
C             GO TO 22 at end
        ENDIF
      ENDIF
      IF(AN.EQ.1) THEN
C       Investigate to see if cube is null.
        CQ=.FALSE.
        DO IG=1,NMAXTW
              DQ=.FALSE.
              IF((.NOT.ACUBE(1,1,IG)).AND.(.NOT.ACUBE(1,2,IG)))
THEN
                    DQ=.TRUE.
              ENDIF
              CQ=CQ.OR.DQ
        ENDDO
        IF(CQ) THEN
C       Null cube input!
              IF(TA.EQ.0) THEN
C             Universe cube is created.
                    DO IG=1,NMAXTW
                          ACUBE(1,1,IG)=.TRUE.
                          ACUBE(1,2,IG)=.TRUE.
                    ENDDO
              ENDIF
              GO TO 22 at end
        ENDIF
      ENDIF
      JNUM=0
      DO 8 KB=1,CN
        DO 10 JB=1,AN
              JNUM=JNUM+1
              DO 12 IPART=1,NMAXTW
                    DO 14 IT=1,IBPP
      CUBERP(JNUM,IT,IPART)=ACUBE(JB,IT,IPART).AND.CUBE(KB,IT,IPA
RT)
 14                 CONTINUE
 12           CONTINUE
              CALL NULL
 10     CONTINUE
 8    CONTINUE
C     Determination of cubes that contain a FF and remove from
the list.
      CUBENUM=JNUM
C     IF(JNUM.EQ.0) THEN
C           WRITE(16,*)'2 AN&CN=',AN,CN
```

```
C     WRITE(16,722)(ACUBE(1,1,K1),ACUBE(1,2,K1),K1=1,NMAXTW)
C722 FORMAT(1X,4(2L1,1X))
C     WRITE(16,838)(CUBE(1,1,K1),CUBE(1,2,K1),K1=1,NMAXTW)
C838 FORMAT(1X,4(2L1,1X))
C     ENDIF
      CALL RLABEL
C     WRITE(16,*)'CUBLISA2=',CUBENUM
      IF(CUBENUM.GT.1) THEN
            CALL NWD
            CALL DJOINT
      ENDIF
C     WRITE(16,*)'CUBLISA3=',CUBENUM
C     WRITE(16,140)
C     FORMAT(///3X,4HKMAX,3X,7HW(KMAX)///)
C     DO 141 IT1=1,KMAX
C           WRITE(16,142)IT1,W(IT1)
C142        FORMAT(2(3X,I4),1X)
C     CONTINUE
C     IF(CUBENUM.EQ.0) THEN
C           WRITE(16,*)'ERROR in number 2'
C           CUBENUM=1
C           DO 317 I6=1,NMAXTW
C                 CUBE(1,1,I6)=.FALSE.
C                 CUBE(1,1,I6)=.FALSE.
C317        CONTINUE
C     ENDIF
C     ----------------------------------------------
      ENDIF
      RETURN
      END
C     No. 3 LISOR
C     ----------------------------------------------
      SUBROUTINE LISOR
C     2 List OR capability
C     IACT is number of cubes in ACUBE list.
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 JCUBE
      LOGICAL*2 CUBE,CUBERP
```

```
      LOGICAL*2 LCUBE.ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
      LOGICAL*2 CQ,DQ
      IF((AN.GT.0).AND.(CN.GT.0)) THEN
C     ------------------------------------------------------------------
      IF(CN.EQ.1) THEN
C       Investigate to see if cube is null.
          CQ=.FALSE.
          DO IG=1,NMAXTW
                DQ=.FALSE.
                IF((.NOT.CUBE(1,1,IG)).AND.(.NOT.CUBE(1,2,IG)))
THEN
                      DQ=.TRUE.
                ENDIF
                CQ=CQ.OR.DQ
          ENDDO
          IF(CQ) THEN
C         Null cube input!
                IF(TA.EQ.0) THEN
C               Universe cube is created.
                      DO IG=1,NMAXTW
                            CUBE(1,1,IG)=.TRUE.
                            CUBE(1,2,IG)=.TRUE.
                      ENDDO
                ENDIF
                GO TO 22 at end
          ENDIF
      ENDIF
      IF(AN.EQ.1) THEN
C       Investigate to see if cube is null.
          CQ=.FALSE.
          DO IG=1,NMAXTW
                DQ=.FALSE.
                IF((.NOT.ACUBE(1,1,IG)).AND.(.NOT.ACUBE(1,2,IG)))
THEN
                      DQ=.TRUE.
                ENDIF
                CQ=CQ.OR.DQ

          IF(CQ) THEN
C         Null cube input!
```

```
                IF(TA.EQ.0) THEN
C               Universe cube is created.
                      DO IG=1,NMAXTW
                            ACUBE(1,1,IG)=.TRUE.
                            ACUBE(1,2,IG)=.TRUE.
                      ENDDO
                ENDIF
C               GO TO 22 at end
          ENDIF
      ENDIF
      DO 99 I20=1,AN
          I21=I20+CN
          DO 172 K=1,NMAXTW
                DO 173 IB=1,IBPP
      CUBE(I21,IB,K)=ACUBE(I20,IB,K)
 173            CONTINUE
 172      CONTINUE
 99   CONTINUE
      CUBENUM=AN+CN
      IF(CUBENUM.GT.1) THEN
          CALL NWD
          CALL DJOINT
      ENDIF
C     ------------------------------------------------------------
      ENDIF
      RETURN
      END
C     No. 4 NEGLIS
C     ---------------------------------------------------------------
      SUBROUTINE NEGLIS
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
```

```
      INTEGER IAX,IR,LTD,TOTAL,JNUM3
      INTEGER CUBEN,V,WX,M
      LOGICAL*2 CUBRP1
      LOGICAL A11,A12,A13,A14,CQ,DQ
C     To .NOT. a list
C     TC=number of cubes in list,which is in descending order by
weight.
C     TC is in common block.
C          L(1)=A(#)C(1)
C     Cubes in L should be weighted and put in descending &
disjoint order.
      IF(CUBENUM.GT.0) THEN
C     ------------------------------------------------------------
      IF(CUBENUM.EQ.1) THEN
C       Investigate to see if cube is null.
          CQ=.FALSE.
          DO IG=1,NMAXTW
                DQ=.FALSE.
                IF((.NOT.CUBE(1,1,IG)).AND.(.NOT.CUBE(1,2,IG)))
THEN
                      DQ=.TRUE.
                ENDIF
                CQ=CQ.OR.DQ
          ENDDO
          IF(CQ) THEN
C         Null cube input!
                IF(TA.EQ.0) THEN
C               Universe cube is created.
                      DO IG=1,NMAXTW
                            CUBE(1,1,IG)=.TRUE.
                            CUBE(1,2,IG)=.TRUE.
                      ENDDO
                ENDIF
C               GO TO 22 at end
          ENDIF
      IF(TA.EQ.0) THEN
C         Universe cube is created.
          IUNIV=1
          DO 36 IA=1,NMAXTW
                DO 37 IT=1,IBPP
                      ACUBE(IUNIV,IT,IA)=.TRUE.
 37             CONTINUE
 36       CONTINUE
          DO 236 JA=1,CUBENUM
                DO 237 JH=1,NMAXTW
                      DO 238 JP=1,IBPP
                            JCUBE(JA,JP,JH)=CUBE(JA,JP,JH)
 238                  CONTINUE
 237            CONTINUE
```

```
 236       CONTINUE
      ELSE IF(TA.NE.0) THEN
           DO 38 IQ=1,TA
                DO 39 IA=1,NMAXTW
                     DO 40 IT=1,IBPP
                          ACUBE(IQ,IT,IA)=CUBE(IQ,IT,IA)
 40                  CONTINUE
 39             CONTINUE
 38        CONTINUE
      ENDIF
C     IF(MODE.NE.1) THEN
C          LCUBE(JNUM,J,K)=ACUBE(1A,J,K)(#)JCUBE(IC,J,K)
C     Negating a cube.Generation of JTO number of cubes.
      IAA=1
      JLCUB=CUBENUM
      DO 41 JLIST=1,JLCUB
           JNUM=0
           JGT=0
           JG=0
           DO 126 IA=1,IAA
C     If A at least partially covers J,then proceed TEST.
                CQ=.FALSE.
                DO 819 IS=1,NMAXTW
      A11=((.NOT.ACUBE(IA,1,IS)).AND.ACUBE(IA,2,IS).AND.
     1     JCUBE(JLIST,1,IS).AND.(.NOT.JCUBE(JLIST,2,IS)))
      A12=(ACUBE(IA,1,IS).AND.(.NOT.ACUBE(IA,2,IS)).AND.
     1     (.NOT.JCUBE(JLIST,1,IS)).AND.JCUBE(JLIST,2,IS))
                     DQ=.FALSE.
      IF(A11.OR.A12) THEN
                     DQ=.TRUE.
      ENDIF
                     CQ=CQ.OR.DQ
 819            CONTINUE
           IF(.NOT.CQ) THEN
C     If A at least partially covers J,then proceed.
                DO 42 IS=1,NMAXTW
                     JNUM=JNUM+1
                     DO 43 KA=1,NMAXTW
                          DO 44 IT=1,IBPP
                          IF(KA.EQ.IS) THEN
      CUBERP(JNUM,IT,KA)=ACUBE(IA,IT,KA).AND.(.NOT.JCUBE(JLIST,IT
,KA))
                          ELSE IF(KA.LT.IS) THEN
      CUBERP(JNUM,IT,KA)=ACUBE(IA,IT,KA).AND.JCUBE(JLIST,IT,KA)
                          ELSE IF(KA.GT.IS) THEN
      CUBERP(JNUM,IT,KA)=ACUBE(IA,IT,KA)
                          ENDIF
 44                       CONTINUE
 43                  CONTINUE
```

```
                 CALL NULL
 42           CONTINUE
        ELSE
C     Storage of A cubes that do not cover J cubes.
              JG=JG+1
              DO 814 KB=1,NMAXTW
                 CUBRP1(JG,1,KB)=ACUBE(IA,1,KB)
                 CUBRP1(JG,2,KB)=ACUBE(IA,2,KB)
 814          CONTINUE
              JGT=JG
        ENDIF
 126    CONTINUE
                 IAA=JNUM
                 DO 234 JH=1,IAA
                    JG=JG+1
                    DO 235 KB=1,NMAXTW
                 ACUBE(JG,1,KB)=CUBERP(JH,1,KB)
                 ACUBE(JG,2,KB)=CUBERP(JH,2,KB)
 235                CONTINUE
 234             CONTINUE
                 IAA=JGT
                 JG=0
                 DO 815 JH=1,IAA
                    JG=JG+1
                    DO 816 KB=1,NMAXTW
                 ACUBE(JG,1,KB)=CUBRP1(JH,1,KB)
                 ACUBE(JG,2,KB)=CUBRP1(JH,2,KB)
 816                CONTINUE
 815             CONTINUE
                 IAA=JNUM+JGT
 41     CONTINUE
        CUBENUM=IAA
C     Relabel Cubes in list.
C     Define as L1 List.
      DO 811 JG=1,CUBENUM
        DO 812 KB=1,NMAXTW
           CUBE(JG,1,KB)=ACUBE(JG,1,KB)
           CUBE(JG,2,KB)=ACUBE(JG,2,KB)
 812    CONTINUE
 811 CONTINUE
        IF((CUBENUM.EQ.0).OR.(CUBENUM.GT.LTD)) THEN
           GO TO 242
        ENDIF
        IF(CUBENUM.GT.1) THEN
           CALL NWD
           CALL DJOINT
        ENDIF
      IF((CUBENUM.EQ.0).OR.(CUBENUM.GT.LTD)) THEN
        GO TO 191
```

```
      ENDIF
C     ENDIF
C     Next weigh,remove null cubes,and order in descending
disjoint cubes.
 191  IV=0
 242  IV=0
C     IF((CUBENUM.EQ.0).OR.(CUBENUM.GT.LTD)) THEN
C          CUBENUM=5
C          WRITE(16,*)'   END OF NEGLIS =5 ERROR'
C     ELSE IF(CUBENUM.EQ.0) THEN
C          WRITE(16,*)'  ERROR in number 4'
C     ENDIF
 320  IV=0
 22   IV=0
C     ------------------------------------------------------------
      ENDIF
      RETURN
      END
C     No. 5 Add two Cubes.
C     ------------------------------------------------------------
      SUBROUTINE ADCUBE
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
```

```
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
      1     CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      INTEGER N
C     Addition ( 2 (O-Cube))
      IVX=0
C     C(1)=0
C     Each input N(J) cube=U.
      IF(CUBENUM.GT.0) THEN
C     -----------------------------------------------------
      DO 57 J=1,NMAX
            JPV=J
            JPVP=JPV+1
            JN=NMAX+J
            J1=J+1
            IF(IVX.EQ.0) THEN
C     ----------------- Odd Adder Stage--------------------
                  CALL CARRY
                  CALL SJ
                  IVX=1
            ELSE
C     -----------------Even Adder Stage---------------------
C                 A(J)=.NOT.A(J)
C                 B(J)=.NOT.B(J)
```

```
CC    IF(SUBTR.EQ.0) THEN
C     ..........Multiply Only( W.FOR )...........
C           - if even -
CC          IF(.NOT.((IVX.EQ.1).AND.(SUBTR.EQ.0).AND.(JPV.EQ.
CC    1                 NMAX).AND.(J2.EQ.2))) THEN
            IF(.NOT.((J2.EQ.2).AND.(JPV.EQ.NMAX))) THEN
                  CUBENUM=PVAT(J)
                  DO 161 IU1=1,CUBENUM
                        DO 162 IU2=1,NMAXTW
                  CUBE(IU1,1,IU2)=PVA1(J,IU1,IU2)
                  CUBE(IU1,2,IU2)=PVA2(J,IU1,IU2)
 162                    CONTINUE
 161              CONTINUE
                  TA=0
                  CALL NEGLIS
                  PVAT(J)=CUBENUM
                  DO 163 IU1=1,PVAT(J)
                        DO 164 IU2=1,NMAXTW
                  PVA1(J,IU1,IU2)=CUBE(IU1,1,IU2)
                  PVA2(J,IU1,IU2)=CUBE(IU1,2,IU2)
 164                    CONTINUE
 163              CONTINUE
CC          ELSE IF((IVX.EQ.1).AND.(SUBTR.EQ.0).AND.(JPV.EQ.
CC    1                 NMAX).AND.(J2.EQ.2)) THEN
            ELSE IF((IVX.EQ.1).AND.(JPV.EQ.NMAX).AND.
      1                 (J2.EQ.2)) THEN
                    PVAT(JPV)=1
                    DO 306 IT=1,PVAT(JPV)
                        DO 307 K=1.NMAXTW
                              PVA1(JPV,IT,K)=.TRUE.
                              PVA2(JPV,IT,K)=.TRUE.
 307                    CONTINUE
 306              CONTINUE
            ENDIF
CC    ELSE IF(SUBTR.EQ.1) THEN
C                 PVAT(J)=1
C                 DO 828 IU1=1,PVAT(J)
C                       DO 829 IU2=1,NMAXTW
C                             PVA1(J,IU1,IU2)=.TRUE.
C                             PVA2(J,IU1,IU2)=.TRUE.
C     COMPLETELY WRONG                 IF(IU2.LT.J) THEN
C         "       "                          PVA2(J,IU1,IU2)=.FALSE.
C         "       "                    ELSE IF(IU2.EQ.J) THEN
C         "       "                          PVA1(J,IU1,IU2)=.FALSE.
C         "       "                    ENDIF
C829                    CONTINUE
C828              CONTINUE
C     ENDIF
                  CUBENUM=PVBT(J)
```

```
              DO 165 IU1=1,CUBENUM
                   DO 166 IU2=1,NMAXTW
              CUBE(IU1,1,IU2)=PVB1(J,IU1,IU2)
              CUBE(IU1,2,IU2)=PVB2(J,IU1,IU2)
 166               CONTINUE
 165          CONTINUE
              TA=0
              CALL NEGLIS
              PVBT(J)=CUBENUM
              DO 167 IU1=1,PVBT(J)
                   DO 168 IU2=1,NMAXTW
              PVB1(J,IU1,IU2)=CUBE(IU1,1,IU2)
              PVB2(J,IU1,IU2)=CUBE(IU1,2,IU2)
 168               CONTINUE
 167          CONTINUE
              CALL CARRY
              CALL SJ
C             S(J)=.NOT.S(J)
              CUBENUM=CACT(J)
              DO 826 IU1=1,CUBENUM
                   DO 827 K=1,NMAXTW
              CUBE(IU1,1,K)=CACUB1(J,IU1,K)
              CUBE(IU1,2,K)=CACUB2(J,IU1,K)
 827               CONTINUE
 826          CONTINUE
              TA=0
              CALL NEGLIS
              CACT(J)=CUBENUM
              DO 303 IU1=1,CACT(J)
                   DO 304 K=1,NMAXTW
              CACUB1(J,IU1,K)=CUBE(IU1,1,K)
              CACUB2(J,IU1,K)=CUBE(IU1,2,K)
 304               CONTINUE
 303          CONTINUE
              IVX=0
          ENDIF

 57   CONTINUE
C305  IV=0
C22   IV=0
C     IF(CUBENUM.EQ.0) THEN
C          WRITE(16,*)' Error in 5'
C     ENDIF
C     -----------------------------------------------------
      ENDIF
      RETURN
      END
C     No. 6 CARRY
C     -----------------------------------------------------
```

```
      SUBROUTINE CARRY
C     C(J1) Binary Routine
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
```

```
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      IF(CUBENUM.GT.0) THEN
C     ---------------------------------------------------------
      IR=6
      JPVP=JPV+1
C     ------------------------------------------------G01 below:
C     IF(((F.EQ.2).AND.(((IVX.EQ.1).AND.(SUBTR.EQ.1)).OR.
C     1     (SUBTR.EQ.0))).OR.(F.EQ.1).OR.((F.EQ.3).AND.(((IVX.EQ.
C     2     1).AND.(JPV.EQ.NMAX)).OR.(JPV.NE.NMAX)))) THEN
C     IF(((IVX.EQ.1).AND.(JPV.EQ.NMAX).AND.(J2.EQ.2)).OR.
C     1     (.NOT.(J2.EQ.2))) THEN
      AN=PVAT(JPV)
      DO 97 IT=1,AN
            DO 98 K=1,NMAXTW
                  ACUBE(IT,1,K)=PVA1(JPV,IT,K)
                  ACUBE(IT,2,K)=PVA2(JPV,IT,K)
 98         CONTINUE
 97   CONTINUE
      CN=CYLT(JPV)
      DO 60 IT=1,CN
            DO 61 K=1,NMAXTW
                  CUBE(IT,1,K)=CYL1(JPV,IT,K)
                  CUBE(IT,2,K)=CYL2(JPV,IT,K)
 61         CONTINUE
 60   CONTINUE
C     WRITE(16,*)'JPV=',JPV,'  before LISAND1 in CARRY'
      CALL LISAND
C     WRITE(16,*)'JPV=',JPV,'  after LISAND1 in CARRY'
      CYLT(JPVP)=CUBENUM
      DO 32 IT=1,CYLT(JPVP)
            DO 34 K=1,NMAXTW
      CYL1(JPVP,IT,K)=CUBE(IT,1,K)
      CYL2(JPVP,IT,K)=CUBE(IT,2,K)
 34         CONTINUE
 32   CONTINUE
C     ------------------------------------------------G02 below:
      AN=PVBT(JPV)
      DO 117 IT=1,AN
            DO 169 K=1,NMAXTW
      ACUBE(IT,1,K)=PVB1(JPV,IT,K)
      ACUBE(IT,2,K)=PVB2(JPV,IT,K)
```

```
 169        CONTINUE
 117 CONTINUE
     CN=PVAT(JPV)
     DO 100 IT=1,CN
            DO 118 K=1,NMAXTW
     CUBE(IT,1,K)=PVA1(JPV,IT,K)
     CUBE(IT,2,K)=PVA2(JPV,IT,K)
 118        CONTINUE
 100 CONTINUE
C    WRITE(16,*)'JPV=',JPV,'   before LISAND2 in CARRY'
     CALL LISAND
C    WRITE(16,*)'JPV=',JPV,'   after LISAND2 in CARRY'
C    IF(CUBENUM.EQ.0) THEN
C           WRITE(16,*)'ERROR above 119 SIX'
C    ENDIF
     AN=CYLT(JPVP)
     DO 119 IT=1,AN
            DO 120 K=1,NMAXTW
     ACUBE(IT,1,K)=CYL1(JPVP,IT,K)
     ACUBE(IT,2,K)=CYL2(JPVP,IT,K)
 120        CONTINUE
 119 CONTINUE
     CN=CUBENUM
     CALL LISUN
C    IF(CUBENUM.EQ.0) THEN
C           WRITE(16,*)'ERROR above 121 SIX'
C    ENDIF
     CYLT(JPVP)=CUBENUM
     DO 121 IT=1,CYLT(JPVP)
            DO 122 K=1,NMAXTW
     CYL1(JPVP,IT,K)=CUBE(IT,1,K)
     CYL2(JPVP,IT,K)=CUBE(IT,2,K)
 122        CONTINUE
 121 CONTINUE
     ENDIF
C    ------------------------------------------------------------BCG below
     AN=CYLT(JPV)
     DO 149 IT=1,AN
            DO 150 K=1,NMAXTW
                   ACUBE(IT,1,K)=CYL1(JPV,IT,K)
                   ACUBE(IT,2,K)=CYL2(JPV,IT,K)
 150        CONTINUE
 149 CONTINUE
     CN=PVBT(JPV)
     DO 240 IT=1,CN
            DO 123 K=1,NMAXTW
                   CUBE(IT,1,K)=PVB1(JPV,IT,K)
                   CUBE(IT,2,K)=PVB2(JPV,IT,K)
 123        CONTINUE
```

```
 240 CONTINUE
C     WRITE(16,*)'JPV=',JPV,'  before LISAND3 in CARRY'
      CALL LISAND
C     WRITE(16,*)'JPV=',JPV,'  after LISAND3 in CARRY'
C     IF(((F.EQ.2).AND.(((IVX.EQ.1).AND.(SUBTR.EQ.1)).OR.
C     1     (SUBTR.EQ.0))).OR.(F.EQ.1).OR.((F.EQ.3).AND.(((IVX.EQ.
C     2     1).AND.(JPV.EQ.NMAX)).OR.(JPV.NE.NMAX)))) THEN
C     IF(((IVX.EQ.1).AND.(JPV.EQ.NMAX).AND.(J2.EQ.2)).OR.
C     1     (.NOT.(J2.EQ.2))) THEN
      AN=CYLT(JPVP)
      DO 170 IT=1,AN
            DO 171 K=1,NMAXTW
      ACUBE(IT,1,K)=CYL1(JPVP,IT,K)
      ACUBE(IT,2,K)=CYL2(JPVP,IT,K)
 171        CONTINUE
 170  CONTINUE
      CN=CUBENUM
      CALL LISOR
      ENDIF
C     IF(CUBENUM.EQ.0) THEN
C           WRITE(16,*)'ERROR above 124 SIX'
C     ENDIF
      TA=0
      CALL NEGLIS
      CYLT(JPVP)=CUBENUM
      DO 124 IT=1,CYLT(JPVP)
            DO 125 K=1,NMAXTW
      CYL1(JPVP,IT,K)=CUBE(IT,1,K)
      CYL2(JPVP,IT,K)=CUBE(IT,2,K)
 125        CONTINUE
 124  CONTINUE
C     CYL(J1)=CYLj(JPVP) is defined.
C     IF(CUBENUM.EQ.0) THEN
C           WRITE(16,*)'ERROR IN NUMBER SIX'
C     ENDIF
C     ------------------------------------------------------------
      ENDIF
      RETURN
      END
C     No. 7 SJ
C     ------------------------------------------------------------
      SUBROUTINE SJ
C     SJ=CACUB
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
```

```
COMMON /B18/ AN,CN,JTOL,NMAX,IBPP,KCDA,KMAX,W(20),C(20),
1     CD(20),A,CM(20)
COMMON /B19/ NEW,SUM,JNUM,NMAXX,IA2,ISHQ,Q
1     MODE,TA,TC,NMAXTW,CUBENUM
COMMON /B20/ IAX(8),IR,LTD,TOTAL,JNUM3
COMMON /B21/ CUBEN(20),V,WX(20),M(20)
COMMON /B22/ AT(20),BT(20),PVAT(20),PVBT(20),CYLT(20),
1     CACT(20),CPLT(20)
COMMON /B23/ TD,KZ,KG,NP,JCOVER,JPV,J2,IVX
COMMON /B24/ PVA1(8,20,8)
COMMON /B25/ PVA2(8,20,8)
COMMON /B26/ PVB1(8,20,8)
COMMON /B27/ PVB2(8,20,8)
COMMON /B28/ CPL1(8,20,8)
COMMON /B29/ CPL2(8,20,8)
COMMON /B32/ CACUB1(8,20,8)
COMMON /B33/ CACUB2(8,20,8)
COMMON /B34/ A1(8,1,8)
COMMON /B35/ A2(8,1,8)
COMMON /B36/ B1(8,1,8)
COMMON /B37/ B2(8,1,8)
COMMON /B38/ CUBRP1(8,20,8)
LOGICAL*2 JCUBE
LOGICAL*2 CUBE,CUBERP
LOGICAL*2 LCUBE,ACUBE
LOGICAL*2 CYL1
LOGICAL*2 CYL2
LOGICAL*2 AQ,BQ
INTEGER AN,CN,JTOL,NMAX,IBPP,KCDA,KMAX,W,C,
1     CD,A,CM
INTEGER NEW,SUM,JNUM,NMAXX,IA2,ISHQ,Q
1     MODE,TA,TC,NMAXTW,CUBENUM
INTEGER IAX,IR,LTD,TOTAL,JNUM3
INTEGER CUBEN,V,WX,M
INTEGER AT,BT,PVAT,PVBT,CYLT,
1     CACT,CPLT
INTEGER TD,KZ,KG,NP,JCOVER,JPV,J2,IVX
LOGICAL*2 PVA1
LOGICAL*2 PVA2
LOGICAL*2 PVB1
LOGICAL*2 PVB2
LOGICAL*2 CPL1
LOGICAL*2 CPL2
LOGICAL*2 CACUB1
LOGICAL*2 CACUB2
LOGICAL*2 A1
LOGICAL*2 A2
LOGICAL*2 B1
LOGICAL*2 B2
```

```
      LOGICAL*2 CUBRP1
      IF(CUBENUM.GT.0) THEN
C     ----------------------------------------------------------
      IR=7
      JPVP=JPV+1
C     2nd term of S(J)
C     IF(((F.EQ.2).AND.(((IVX.EQ.1).AND.(SUBTR.EQ.1)).OR.
C     1     (SUBTR.EQ.0))).OR.(F.EQ.1).OR.((F.EQ.3).AND.(((IVX.EQ.
C     2     1).AND.(JPV.EQ.NMAX)).OR.(JPV.NE.NMAX)))) THEN
C     IF(((IVX.EQ.1).AND.(JPV.EQ.NMAX).AND.(J2.EQ.2)).OR.
C     1     (.NOT.((J2.EQ.2).AND.(JPV.EQ.NMAX)))) THEN
C     IF(.NOT.((IVX.EQ.0).AND.(JPV.EQ.NMAX).AND.(J2.EQ.
C     1     2))) THEN
      AN=PVAT(JPV)
      DO 127 IT=1,AN
            DO 175 K=1,NMAXTW
      ACUBE(IT,1,K)=PVA1(JPV,IT,K)
      ACUBE(IT,2,K)=PVA2(JPV,IT,K)
 175        CONTINUE
 127  CONTINUE
      CN=PVBT(JPV)
      DO 133 IT=1,CN
            DO 135 K=1,NMAXTW
      CUBE(IT,1,K)=PVB1(JPV,IT,K)
      CUBE(IT,2,K)=PVB2(JPV,IT,K)
 135        CONTINUE
 133  CONTINUE
      CALL LISOR
C     ELSE IF(((F.EQ.2).AND.(((IVX.EQ.0).AND.(SUBTR.EQ.
C     1     1)).OR.(SUBTR.EQ.0))).OR.((F.EQ.3).AND.
C     2     (IVX.EQ.0).AND.(JPV.EQ.NMAX))) THEN
C     ELSE IF((IVX.EQ.0).AND.(JPV.EQ.NMAX).AND.(J2.EQ.
C     1     2)) THEN
C           CN=PVBT(JPV)
C           DO 830 IT=1,CN
C                 DO 831 K=1,NMAXTW
C           CUBE(IT,1,K)=PVB1(JPV,IT,K)
C           CUBE(IT,2,K)=PVB2(JPV,IT,K)
C831              CONTINUE
C830        CONTINUE
C     ENDIF
      AN=CYLT(JPV)
      DO 145 IT=1,CYLT(JPV)
            DO 146 K=1,NMAXTW
      ACUBE(IT,1,K)=CYL1(JPV,IT,K)
      ACUBE(IT,2,K)=CYL2(JPV,IT,K)
 146        CONTINUE
 145  CONTINUE
      CN=CUBENUM
```

```
      CALL LISOP
C     ------------------------------including 1st term of S(J)
      AN=CYLT(JPVP)
      DO 71 IT=1,AN
            DO 74 K=1,NMAXTW
      ACUBE(IT,1,K)=CYL1(JPVP,IT,K)
      ACUBE(IT,2,K)=CYL2(JPVP,IT,K)
 74         CONTINUE
 71   CONTINUE
      CN=CUBENUM
      CALL LISAND
      CACT(JPV)=CUBENUM
      DO 147 IT=1,CACT(JPV)
            DO 148 K=1,NMAXTW
      CACUB1(JPV,IT,K)=CUBE(IT,1,K)
      CACUB2(JPV,IT,K)=CUBE(IT,2,K)
 148        CONTINUE
 147  CONTINUE
C     -------------------3rd term
C     IF(((F.EQ.2).AND.(((IVX.EQ.1).AND.(SUBTR.EQ.1)).OR.
C     1     (SUBTR.EQ.0)))).OR.(F.EQ.1).OR.((F.EQ.3).AND.(((IVX.EQ.
C     2     1).AND.(JPV.EQ.NMAX)).OR.(JPV.NE.NMAX)))) THEN
C     IF(((IVX.EQ.1).AND.(JPV.EQ.NMAX).AND.(J2.EQ.2)).OR.
C     1     (.NOT.((J2.EQ.2).AND.(JPV.EQ.NMAX)))) THEN
C     IF(.NOT.((IVX.EQ.0).AND.(JPV.EQ.NMAX).AND.(J2.EQ.
C     1     2))) THEN
      AN=PVAT(JPV)
      DO 75 IT=1,AN
            DO 152 K=1,NMAXTW
      ACUBE(IT,1,K)=PVA1(JPV,IT,K)
      ACUBE(IT,2,K)=PVA2(JPV,IT,K)
 152        CONTINUE
 75   CONTINUE
      CN=PVBT(JPV)
      DO 76 IT=1,CN
            DO 153 K=1,NMAXTW
      CUBE(IT,1,K)=PVB1(JPV,IT,K)
      CUBE(IT,2,K)=PVB2(JPV,IT,K)
 153        CONTINUF
 76   CONTINUE
      CALL LISAND
      AN=CYLT(JPV)
      DO 154 IT=1,AN
            DO 155 K=1,NMAXTW
      ACUBE(IT,1,K)=CYL1(JPV,IT,K)
      ACUBE(IT,2,K)=CYL2(JPV,IT,K)
 155        CONTINBE
 154  CONTINUE
      CN=CUBENUM
```

```
      CALL LISAND
C     ------------------------Combine ALL
      AN=CACT(JPV)
      DO 156 IT=1,CACT(JPV)
           DO 157 K=1,NMAXTW
      ACUBE(IT,1,K)=CACUB1(JPV,IT,K)
      ACUBE(IT,2,K)=CACUB2(JPV,IT,K)
 157       CONTINUE
 156  CONTINUE
      CN=CUBENUM
      CALL LISOR
      CACT(JPV)=CUBENUM
      DO 159 IT=1,CACT(JPV)
           DO 160 K=1,NMAXTW
      CACUB1(JPV,IT,K)=CUBE(IT,1,K)
      CACUB2(JPV,IT,K)=CUBE(IT,2,K)
 160       CONTINUE
 159  CONTINUE
      ENDIF
C     ------------------------------------------------
      ENDIF
      RETURN
      END
C     No. 8 NWD means null,weight,and descend.
C     ------------------------------------------------
      SUBROUTINE NWD
      COMMON /B02/ CUBE(20,2,8),CUBERP(20,2,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      LOGICAL*2 CUBE,CUBERP
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      IF(CUBENUM.GT.0) THEN
C     ------------------------------------------------------
C     Remove null cube routine.
C     If any part is FF then remove cube from list.
      JNUM=0
      DO 53 IM=1,CUBENUM
           JNUM=JNUM+1
           DO 55 KB=1,NMAXTW
                CUBERP(JNUM,1,KB)=CUBE(IM,1,KB)
                CUBERP(JNUM,2,KB)=CUBE(IM,2,KB)
 55        CONTINUE
```

```
          CALL NULL
 53   CONTINUE
      CUBENUM=JNUM
C     SUBROUTINE WEIGHT
      DO 710 I8=1,CUBENUM
          SUM=0
          DO 72 K8=1,NMAXTW
              DO 73 J8=1,IBPP
                  IF(CUBERP(I8,J8,K8)) THEN
                      SUM=SUM+1
                  ENDIF
 73           CONTINUE
 72       CONTINUE
          C(I8)=SUM
 710  CONTINUE
C     SUBROUTINE DESCEN
      DO 77 I8=1,CUBENUM
          CM(I8)=C(I8)
 77   CONTINUE
      KMAX=0
      KCD=0
      DO 78 K8=1,CUBENUM
          KAA=0
          DO 79 J8=1,CUBENUM
              IF(KAA.LT.CM(J8)) THEN
                  KAA=CM(J8)
              ENDIF
 79       CONTINUE
C         W(K8)=maximum value of the heaviest cube.
          W(K8)=KAA
          KCDA=0
          DO 80 J8=1,CUBENUM
              IF(KCDA.EQ.0) THEN
                  IF(W(K8).EQ.CM(J8)) THEN
                      CM(J8)=0
                      KMAX=KMAX+1
                      KCD=KCD+1
                      KCDA=1
              IF((KCD.EQ.CUBENUM).OR.(KCD.LT.CUBENUM)) THEN
                  CD(KCD)=C(J8)
                  DO 81 L38=1,NMAXTW
                      DO 82 L28=1,IBPP
              CUBE(KCD,L28,L38)=CUBERP(J8,L28,L38)
 82                   CONTINUE
 81               CONTINUE
              ENDIF
                  ENDIF
              ENDIF
 80       CONTINUE
```

```
 78  CONTINUE
C    ------------------------------------------------------------
     ENDIF
     RETURN
     END
C    No. 9 NULL,To be called immediately after a cube is
created.
C    ------------------------------------------------------------------------

     SUBROUTINE NULL
     COMMON /B02/ CUBE(20.2.8),CUBERP(20,2,8)
     COMMON /B16/ AQ,BQ
     COMMON /B19/ NEW,SUM,JNUM,NMAXX,IA2,ISHQ,Q
     1     MODE,TA,TC,NMAXTW,CUBENUM
     LOGICAL*2 CUBE,CUBERP
     LOGICAL*2 AQ,BQ
     INTEGER NEW,SUM,JNUM,NMAXX,IA2,ISHQ,Q
     1     MODE,TA,TC,NMAXTW,CUBENUM
C    Remove null cube routine.
C    If any part is FF,then remove cube from list.
     IF(CUBENUM.GT.0) THEN
C    ------------------------------------------------------------
     AQ=.FALSE.
     DO 28 KAJ=1,NMAXTW
          BQ=.FALSE.
C         AQ is true if PART is FF.
          JW=JNUM
     IF(.NOT.CUBERP(JW,1,KAJ).AND.(.NOT.CUBERP(JW,2,KAJ))) THEN
          BQ=.TRUE.
     ENDIF
          AQ=BQ.OR.AQ
 28  CONTINUE
     IF(AQ) THEN
          JNUM=JNUM-1
     ENDIF
C    ------------------------------------------------------------
     ENDIF
     RETURN
     END
C    No. 10 DJOINT
C    ------------------------------------------------------------------------

     SUBROUTINE DJOINT
     COMMON /B02/ CUBE(20,2,8),CUBERP(20,2,8)
     COMMON /B16/ AQ,BQ
     COMMON /B18/ AN,CN,JTOL,NMAX,IBPP,KCDA,KMAX,W(20),C(20),
     1     CD(20),A,CM(20)
     COMMON /B19/ NEW,SUM,JNUM,NMAXX,IA2,ISHQ,Q
     1     MODE,TA,TC,NMAXTW,CUBENUM
```

```
      COMMON /B20/ IAX(8),IR,LTD,TOTAL,JNUM3
      COMMON /B21/ CUBEN(20),V,WX(20),M(20)
      LOGICAL*2 CUBE,CUBERP
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,LTD,TOTAL,JNUM3
      INTEGER CUBEN,V,WX,M

      LOGICAL*2 S,NS,AL,B,E,F,CK,DK,A11,A12,A13,A14,A15,A16,A17
      INTEGER VUSE,M1,QMA,LTD1
      IF(CUBENUM.GT.1) THEN
C     ------------------------------------------------------------------------
      DO 215 JAMT=1.1000
           LTD1=CUBENUM
      DO 193 I50=1,LTD1
           WX(I50)=0
 193  CONTINUE
      V=NMAXTW+1
      VUSE=0
      DO 194 I51=1,LTD1
           CUBEN(I51)=5
 194  CONTINUE
C     WRITE(16,195)
C195 FORMAT(///3X,7HWeight ,8HIA :IB  ,22HDisjoint Merging
Parts//)
      IST=0
      IF(LTD1.GT.0) THEN
      DO 196 IA=1,LTD1
      IF((IA.NE.LTD1).AND.(.NOT.(IST.GT.LTD1))) THEN
           WX(LTD1)=0
           IF(IST.NE.0) THEN
                DO 197 IQ=1,IST
                     IF(CUBEN(IQ).EQ.IA) THEN
                          WX(LTD1)=1
                     ENDIF
 197            CONTINUE
           ENDIF
           IF(WX(LTD1).NE.1) THEN
C     "DO LOOP" is to prevent IA from being equal to previous
IB's.
           DO 198 IB=1,LTD1
      IF((WX(5).EQ.0).AND.(.NOT.(IST.GT.LTD1)).AND.
     1     (IB.GT.IA)) THEN
C     Generally,IB will always be greater than IA!
                KF=LTD1+1
                WX(KF)=0
```

```
C     "DO LOOP" is to prevent IB from being equal to previous
IB's.
               IF(IST.NE.0) THEN
                    DO 199 IQ=1,IST
                         IF(CUBEN(IQ).EQ.IB) THEN
                              WX(KF)=1
                         ENDIF
 199                CONTINUE
               ENDIF
               IF(WX(KF).NE.1) THEN
C              WRITE(16,*)'CD(IA)=',CD(IA),'CD(IB)=',CD(IB)
C     COVER ROUTINE ( Weights can be greater than 1.)
               IF(IA.NE.IB) THEN
                    A16=.TRUE.
                    A17=.TRUE.
                    DO 151 KZ=1,NMAXTW
      A11=CUBE(IA,1,KZ).AND.CUBE(IA,2,KZ).AND.CUBE(IB,1,KZ).AND.
      1    CUBE(IB,2,KZ)
      A12=(.NOT.CUBE(IA,1,KZ)).AND.CUBE(IA,2,KZ).AND.(.NOT.
      1    CUBE(IB,1,KZ)).AND.CUBE(IB,2,KZ)
      A13=CUBE(IA,1,KZ).AND.(.NOT.CUBE(IA,2,KZ)).AND.
      1    CUBE(IB,1,KZ).AND.(.NOT.CUBE(IB,2,KZ))
      A14=CUBE(IA,1,KZ).AND.CUBE(IA,2,KZ)
      A15=CUBE(IB,1,KZ).AND.CUBE(IB,2,KZ)
      A16=(A11.OR.A12.OR.A13.OR.A14).AND.A16
      A17=(A11.OR.A12.OR.A13.OR.A15).AND.A17
 151                CONTINUE
C              IF(A16.OR.A17) THEN
C          WRITE(16,*)'- - - Reduction - - -'
C     WRITE(16,220)IA,((CUBE(IA,IGJ,IGK),IGJ=1,IBPP),IGK=1,NMAXTW
)
C220 FORMAT(I4,2X,4(2L1,1X))
C     WRITE(16,221)IA,((CUBE(IA,IGJ,IGK),IGJ=1,IBPP),IGK=1,NMAXTW
)
C221 FORMAT(I4,2X,4(2L1,1X))
C          WRITE(16,*)'- - - End of Reduction - - -'
C              ENDIF
               IF(A16) THEN
C     A16=T,means A covers B;Set all parts of B to FF.
C     CUBE(J,BOTH,K)=F
C     WRITE(16,*)'    REDUCT,IB=0',IA,IB
                    DO 158 JX=1,IBPP
                         DO 217 KY=1,NMAXTW
                    CUBE(IB,JX,KY)=.FALSE.
 217                     CONTINUE
 158                CONTINUE
                    IST=IST+1
                    CUBEN(IST)=IB
                    CD(IB)=0
```

```
                    GO TO 226
               ELSE IF(A17) THEN
C     A17=T,means B covers A:Set all parts of A to FF.
C     CUBE(I,BOTH,K)=F
C     WRITE(16,*)'   REDUCT,IA=0',IA,IB
                    DO 218 JX=1,IBPP
                         DO 225 KY=1,NMAXTW
                    CUBE(IA,JX,KY)=.FALSE.
 225                     CONTINUE
 218                CONTINUE
                    IST=IST+1
                    CUBEN(IST)=IA
                    CD(IA)=0
                    GO TO 239
               ENDIF
               ENDIF
C              Same Weight Cubes
C              Adjacent Cubes;Weight differs by 1
               QMA=CD(IA)-CD(IB)
          IF((QMA+1.EQ.0).OR.(QMA-1.EQ.0).OR.(QMA.EQ.0)) THEN
               VUSE=0
               DO 200 V=NMAXTW,1,-1
                    IF(VUSE.EQ.0) THEN
                         K=NMAXTW
                         DO 201 JV=1,NMAXTW
                              K=NMAXTW+1-JV
                              IF(K.NE.V) THEN
C     Compare Conditions
C     ------------------
C     "DO LOOP" is to generate every part number except part v
C     (K avoids V) between original statement numbers 842-846.
C     If all parts of both cubes are the same,except part K
C     (where K=V),then a 'replacement' of these cubes will take
C     place.Thus these 2 cubes will merge into a single cube.
C     WRITE(16,202)K,V,IA,IB,IST
C202  FORMAT(1X,10HCOMPARE K=,I4,3H V=,I4,4H IA=,I4,4H IB=,I4
C     1     5H IST=,I4)
C     Compare cubes;CUBE(IA,1,K),CUBE(IA,2,K) and
C     CUBE(IB,1,K),CUBE(IB,2,K) as follows below.
C     CUBE(i,j,k) is defined in DESCEN(No. 9).
      AL=(.NOT.CUBE(IA,1,K)).AND.CUBE(IA,2,K).AND.(.NOT.
      1     CUBE(IB,1,K)).AND.CUBE(IB,2,K)
      E=CUBE(IA,1,K).AND.(.NOT.CUBE(IA,2,K))
      F=CUBE(IB,1,K).AND.(.NOT.CUBE(IB,2,K))
      B=E.AND.F
      CK=CUBE(IA,1,K).AND.CUBE(IA,2,K).AND.
      1     CUBE(IB,1,K).AND.CUBE(IB,2,K)
      DK=(.NOT.CUBE(IA,1,K)).AND.(.NOT.CUBE(IA,2,K)).OR.(.NOT.
      1     CUBE(IB,1,K)).AND.(.NOT.CUBE(IB,2,K))
```

```
C     S=Same
      S=(AL.OR.B.OR.CK).AND.(.NOT.DK)
C     WRITE(16,*)'S=SAME'
C     WRITE(16,203)WX(4),(CUBE(IA,JB,K),JB=1,2),(CUBE(IB,JB,
C     1     K),JB=1,2)
C     FORMAT(//1X,8H WX(4)=,I4,2(4X,9HCUBE(IA)=,L1),8X,2(4X,
C     1     9HCUBE(IB)=,L1))
                                    IF(S) THEN
                              WX(4)=WX(4)+1
                                    ENDIF
                              ENDIF
 201                         CONTINUE
           IF(WX(4).EQ.(NMAXTW-1)) THEN
                VUSE=V
C     WRITE(16,*)'VUSE=V'
C     WRITE(16,204)VUSE,AL,B,CK,WX(4)
C204 FORMAT(//1X,5HVUSE=,I4,2X,2HA=,L1,2X,2HB=,L1,
C     1     2X,3HCK=,L1,2X,6HWX(4)=,I4)
                IGH=IA
                DO 210 IGF=1.2
C     WRITE(16,209)IGH,((CUBE(IGH,IGJ,IGK),IGJ=1,IBPP),IGK=1,NMAX
TW)
C209 FORMAT(//1X,I4,2X,4(2L1,1X))
                     IGH=IB
 210            CONTINUE
           ENDIF
           WX(4)=0
           ENDIF.
 200 CONTINUE
      ENDIF
C     GO TO IB
      IF(VUSE.NE.0) THEN
C          WRITE(16,*)'- - - Replacement - - -'
C     WRITE(16,219)IA,((CUBE(IA,IGJ,IGK),IGJ=1,IBPP),IGK=1,NMAXTW
)
C219 FORMAT(I4,2X,4(2L1,1X))
C     WRITE(16,321)IB,((CUBE(IB,IGJ,IGK),IGJ=1,IBPP),IGK=1,NMAXTW
)
C321 FORMAT(I4,2X,4(2L1,1X))
C          WRITE(16,*)'- - - End of Replacement - - -'
C          Replacement Routine
           DO 206 IKK=1,IBPP
      CUBE(IA,IKK,VUSE)=CUBE(IA,IKK,VUSE).OR.CUBE(IB,IKK,VUSE)
C          ENDDO
 206       CONTINUE
C     CD(IA),during replacement,will ALWAYS increase by 1.
           CD(IA)=CD(IA)+1
C     Cube IB is set to a weight of 0.
           DO 207 JX=1,IBPP
```

```
                DO 208 KY=1,NMAXTW
                      CUBE(IB,JX,KY)=.FALSE.
 208            CONTINUE
 207      CONTINUE
          CD(IB)=0
C     For Disjointness.Also,CUBEN(cube number)
          M1=CD(IA)
          IST=IST+1
          CUBEN(IST)=IA
          IST=IST+1
          CUBEN(IST)=IB
          WX(5)=1
      ENDIF
 226  IV=0
 239  IV=0
      ENDIF
      ENDIF
C     Following ENDDO is for IB loop.
 198            CONTINUE
                WX(4)=0
                ENDIF
          ENDIF
          WX(5)=0
C     Following ENDDO is for IA loop.
 196            CONTINUE
          ENDIF
C     Remove from original list the redundant cubes that
C     have been merged.
C     DO 135 IU=1,LTD1
C     WRITE(16,138)IU,IU,((CUBE(IU,JE2,KE2),JE2=1,IBPP),KE2=1,NMA
XTW)
C138 FORMAT(//1X,I4,2X,5HCUBE(,I4,3H)= ,4(2L1,1X),1X)
C135 CONTINUE
          JNUM=0
          DO 54 IA=1,LTD1
                JNUM=JNUM+1
                DO 56 IB=1,NMAXTW
                      CUBERP(JNUM,1,IB)=CUBE(IA,1,IB)
                      CUBERP(JNUM,2,IB)=CUBE(IA,2,IB)
 56             CONTINUE
                CALL NULL
 54       CONTINUE
          CUBENUM=JNUM
          CALL RLABEL
          CALL NWD
C     DO 232 IU=1,CUBENUM
C     WRITE(16,233)IU,IU,((CUBE(IU,JE2,KE2),JE2=1,IBPP),KE2=1,NMA
XTW)
C233 FORMAT(//1X,I4,2X,5HCUBE(,I4,3H)= ,4(2L1,1X),1X)
```

```
C232 CONTINUE
C         WRITE(16,*)'   Djoint Cubes Follow '
C     DO 228 I52=1,CUBENUM
C         WRITE(16,229)I52,I52,((CUBE(I52,J,K),J=1,IBPP),K=1,NMA
XTW)
C     FORMAT(//1X,I4,7H  CUBE(,I4,3H)= ,4(2L1,1X))
C     ENDDO
C228 CONTINUE
      IF(LTD1.EQ.CUBENUM) THEN
          GO TO 224
      ELSE
C         WRITE(16,*)' LTD1=    ',LTD1,'  JAMT=',JAMT
C         WRITE(16,*)' CUBENUM=',CUBENUM,'    JAMT=',JAMT
      ENDIF
 215 CONTINUE
 224 IV=0
C     ---------------------------------------------------
      ENDIF
      RETURN
      END
C     No. 11 DJCA
C     ---------------------------------------------------
      SUBROUTINE DJCA
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1    CD(20),A,CM(20)
      COMMON /B19/ NEW,SUM,JNUM,NMAXX,IA2,ISHQ,Q
     1    MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1    CACT(20),CPLT(20)
      COMMON /B23/ TD,KZ,KG,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
```

```
      COMMON /B37/ B2(8,L,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBFF,KCDA,KMAX,W,C,
     1       CD,A,CM
      INTEGER NEW,SUM,JNUM,NMAXX,IA2,ISHQ,Q
     1       MODE,TA,TC,NMAXTW,CUBENUM
      INTEGER IAX,IR,LTD,TOTAL,JNUMS
      INTEGER CUBEN,V,WX,M
      INTEGER AT,BT,PVAT,PVBT,CYLT,
     $       CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      IF(CUBENUM.GT.0) THEN
C     ------------------------------------------------------------
      IR=11
      CUBENUM=JNUMS
      DO 101 I53=1,CUBENUM
            DO 102 K=1,NMAXTW
                  IF(TD.EQ.0) THEN
                        CUBE(I53,1,K)=CACUB1(1,I53,K)
                        CUBE(I53,2,K)=CACUB2(1,I53,K)
                  ELSE IF((TD.EQ.1).OR.(TD.EQ.2)) THEN
                        CUBE(I53,1,K)=CYL1(1,I53,K)
                        CUBE(I53,2,K)=CYL2(1,I53,K)
                  ELSE IF(TD.EQ.3) THEN
                        CUBE(I53,1,K)=PVA1(1,I53,K)
                        CUBE(I53,2,K)=PVA2(1,I53,K)
                  ELSE IF(TD.EQ.4) THEN
                        CUBE(I53,1,K)=PVB1(1,I53,K)
                        CUBE(I53,2,K)=PVB2(1,I53,K)
                  ELSE IF(TD.EQ.5) THEN
```

```
                    CUBE(I53,1,K)=CPL1(1,I53,K)
                    CUBE(I53,2,K)=CPL2(1,I53,K)
                 ENDIF
102        CONTINUE
101  CONTINUE
      IF(CUBENUM.GT.1) THEN
           CALL DJOINT
      ENDIF
      JNUM3=CUBENUM
      DO 25 I54=1,CUBENUM
           DO 26 K=1,NMAXTW
                 IF(TD.EQ.0) THEN
                    CACUB1(1,I54,K)=CUBE(I54,1,K)
                    CACUB2(1,I54,K)=CUBE(I54,2,K)
                 ELSE IF((TD.EQ.1).OR.(TD.EQ.2)) THEN
                    CYL1(1,I54,K)=CUBE(I54,1,K)
                    CYL2(1,I54,K)=CUBE(I54,2,K)
                 ELSE IF(TD.EQ.3) THEN
                    PVA1(1,I54,K)=CUBE(I54,1,K)
                    PVA2(1,I54,K)=CUBE(I54,2,K)
                 ELSE IF(TD.EQ.4) THEN
                    PVB1(1,I54,K)=CUBE(I54,1,K)
                    PVB2(1,I54,K)=CUBE(I54,2,K)
                 ELSE IF(TD.EQ.5) THEN
                    CPL1(1,I54,K)=CUBE(I54,1,K)
                    CPL2(1,I54,K)=CUBE(I54,2,K)
                 ENDIF
 26        CONTINUE
 25   CONTINUE
C     IF(CUBENUM.EQ.0) THEN
C          WRITE(16,*)'ERROR in number 11'
C     ENDIF
C     ------------------------------------------------------------
      ENDIF
      RETURN
      END
C     No. 12 DJR
C     ----------------------------
      SUBROUTINE DJR
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
```

```
      COMMON /B20/ IAX(8),IR,LTD.TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      INTEGER CT
      IF(CUBENUM.GT.0) THEN
C     ------------------------------------------------------------
```

```
      IR=12
      CALL LISAND
      CT=CUBENUM
      DO 101 I55=1,CT
            DO 102 K=1,NMAXTW
                  DO 103 JX=1,IBPP
      CUBRP1(I55,JX,K)=CUBE(I55,JX,K)
103               CONTINUE
102         CONTINUE
101   CONTINUE
      JNUM3=0
      DO 23 I56=1,CT
            JNUM3=JNUM3+1
            DO 24 K=1,NMAXTW
                  IF(TD.EQ.0) THEN
                        CACUB1(JCOVER,JNUM3,K)=CUBRP1(I56,1,K)
                        CACUB2(JCOVER,JNUM3,K)=CUBRP1(I56,2,K)
                        CACT(JCOVER)=JNUM3
                  ELSE IF(TD.EQ.1) THEN
                        CYL1(JCOVER,JNUM3,K)=CUBRP1(I56,1,K)
                        CYL2(JCOVER,JNUM3,K)=CUBRP1(I56,2,K)
                        CYLT(JCOVER)=JNUM3
                  ELSE IF(TD.EQ.2) THEN
                        IX=NMAX+1
                        CYL1(IX,JNUM3,K)=CUBRP1(I56,1,K)
                        CYL2(IX,JNUM3,K)=CUBRP1(I56,2,K)
                        CYLT(JCOVER)=JNUM3
                  ELSE IF(TD.EQ.3) THEN
                        PVA1(JCOVER,JNUM3,K)=CUBRP1(I56,1,K)
                        PVA2(JCOVER,JNUM3,K)=CUBRP1(I56,2,K)
                        PVAT(JCOVER)=JNUM3
                  ELSE IF(TD.EQ.4) THEN
                        PVB1(JCOVER,JNUM3,K)=CUBRP1(I56,1,K)
                        PVB2(JCOVER,JNUM3,K)=CUBRP1(I56,2,K)
                        PVBT(JCOVER)=JNUM3
                  ELSE IF(TD.EQ.5) THEN
                        CPL1(JCOVER,JNUM3,K)=CUBRP1(I56,1,K)
                        CPL2(JCOVER,JNUM3,K)=CUBRP1(I56,2,K)
                        CPLT(JCOVER)=JNUM3
                  ENDIF
 24         CONTINUE
            CALL DJCA
 23   CONTINUE
C     IF(CUBENUM.EQ.0) THEN
C           WRITE(16,*)'ERROR in number 12'
C     ENDIF
C     ------------------------------------------------------------------
      ENDIF
      RETURN
```

END

```
C          *** Computer Program Listing Number 2 ***
C     Addition Program - Working     A.FOR
C     .........................................
      COMMON /B01/ JCUBE(20,2,8)
      COMMON /B02/ CUBE(20,2,8),CUBERP(20,2,8)
      COMMON /B04/ CHART(3),SPACE(20,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1      CD(20),A,CM(20)
      COMMON /B19/ NEW,SUM,JNUM,NMAXX,IA2,ISHQ,Q
     1      MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1      CACT(20),CPLT(20)
      COMMON /B23/ TD,KZ,KG,NP,JCOVER,JPV,J2
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)

      LOGICAL*2 JCUBE
      LOGICAL*2 CUBE,CUBERP
      CHARACTER CHART,SPACE
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1      CD,A,CM
      INTEGER NEW,SUM,JNUM,NMAXX,IA2,ISHQ,Q
     1      MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1      CACT,CPLT
```

```
      INTEGER TD,KZ,KG,NP,JCOVER,JPV,J2
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      IR=1
      LTD=20
      AN=1
      CN=1
C     WRITE(16.*)'CUBMAIN1A AN&CN=',AN,CN
      CUBENUM=1
      IR=4
      IBPP=2
      NMAX=2
      NMAXTW=2*NMAX
      NMAXP=NMAX+1
      NMAXZ=NMAX-1
C     AT(NMAX),BT(NMAX)
      DO 29 J11=1,NMAX
            AT(J11)=1
            BT(J11)=1
 29   CONTINUE
      READ(7,30)(CHART(IA1),IA1=1,3)
 30   FORMAT(3A1)
C     CPL(1) is defined,below. -----------------------------------

C     Normally,arrays A1,A2,B1,B2 will each contain many
cubes;but for
C     now will contain only one cube.
C     CPL(1)=A(1).AND.B(1)
C     ---------------START UP CONDITIONS--------------------------
C     Note:CARRY IN is '0' ( grounded ).
C     In the event of using the carry input,the arrays need to be
enlarged!
      DO 143 J3=1,NMAX
            AN=AT(J3)
            CN=BT(J3)
            JN=J3+NMAX
            DO 31 K=1,NMAXTW
                  A1(J3,AN,K)=.TRUE.
```

```
                   A2(J3,AN,K)=.TRUE.
                   B1(J3.CN,K)=.TRUE.
                   B2(J3,CN,K)=.TRUE.
C     Bit Redefinition.
                   IF(K.EQ.J3) THEN
C     ------------------------- A(J3)=1
                         A1(J3,AN,K)=.FALSE.
                         A2(J3,AN,K)=.TRUE.
                   ELSE IF(K.EQ.JN) THEN
C     ------------------------- B(J3)=1
                         B1(J3,CN.K)=.FALSE.
                         B2(J3,CN,K)=.TRUE.
                   ENDIF
 31          CONTINUE
 143  CONTINUE
C     WRITE(16,*)'CUBE A INPUT'
            DO 310 KG=1,NMAX
                   AN=AT(KG)
                   DO 311 K=1,NMAXTW
      IF(A1(KG,1,K).AND.A2(KG,1,K)) THEN
            SPACE(KG,K)=CHART(3)
      ELSE IF(A1(KG,1,K).AND.(.NOT.A2(KG,1,K))) THEN
            SPACE(KG,K)=CHART(1)
      ELSE IF((.NOT.A1(KG,1,K)).AND.A2(KG,1,K)) THEN
            SPACE(KG,K)=CHART(2)
      ELSE
C           WRITE(16,*)'    **** ERROR in CUBE A INPUT ****'
      ENDIF
 311               CONTINUE
C                  WRITE(16.314)KG,(SPACE(KG,IG),IG=1,NMAXTW)
 314               FORMAT(1X,I4,2X,2(2A1,5X))
 310        CONTINUE
C           WRITE(16,*)'    '
C           WRITE(16,*)'CUBE B INPUT'
            DO 312 KG=1,NMAX
                   CN=BT(KG)
                   DO 313 K=1,NMAXTW
      IF(B1(KG,1,K).AND.B2(KG,1,K)) THEN
            SPACE(KG,K)=CHART(3)
      ELSE IF(B1(KG,1,K).AND.(.NOT.B2(KG,1,K))) THEN
            SPACE(KG,K)=CHART(1)
      ELSE IF((.NOT.B1(KG,1,K)).AND.B2(KG,1,K)) THEN
            SPACE(KG,K)=CHART(2)
      ELSE
C           WRITE(16,*)'    **** ERROR in CUBE B INPUT ****'
      ENDIF
 313               CONTINUE
C                  WRITE(16.314)KG,(SPACE(KG,IG),IG=1,NMAXTW)
 315               FORMAT(1X,I4,2X,2(2A1,5X))
```

```
 312        CONTINUE
C      For Adder Only.
C      ------------------------------
       AN=AT(1)
       DO 115 K=1,NMAX
             DO 116 KG=1,NMAXTW
                   PVA1(K,AN,KG)=A1(K,AN,KG)
                   PVA2(K,AN,KG)=A2(K,AN,KG)
                   PVB1(K,AN,KG)=B1(K,AN,KG)
                   PVB2(K,AN,KG)=B2(K,AN,KG)
 116         CONTINUE
             PVAT(K)=AT(1)
             PVBT(K)=AT(1)
 115   CONTINUE
       J2=2
C      (J2-1) is number of Adders,where J2=2 is 1st Adder.
       CALL ADCUBE
                         WRITE(16,*)' '
                         WRITE(16,*)'  Adder Output Lists - LSB 1st'
                         WRITE(16,*)' '
                         DO 834 K=1,NMAX
                               WRITE(16,*)'  K=',K
                               DO 836 IU1=1,CACT(K)
                                     DO 837 IU2=1,NMAXTW
       WRITE(16,835)IU1,(CACUB1(K,IU1,IU2),CACUB2(K,IU1,IU2),
       1     IU2=1,NMAXTW)
 835   FORMAT(1X,I4,2X,4(2L1,1X))
 837                                 CONTINUE
 836                           CONTINUE
                               WRITE(16,*)' '
                               WRITE(16,*)' '
 834                     CONTINUE
                         DO 843 J=1,NMAX
                               CPLT(J)=CACT(J)
                               DO 844 IU1=1,CPLT(J)
                                     DO 845 IU2=1,NMAXTW
                               CPL1(J,IU1,IU2)=CACUB1(J,IU1,IU2)
                               CPL2(J,IU1,IU2)=CACUB2(J,IU1,IU2)
 845                                 CONTINUE
 844                           CONTINUE
 843                     CONTINUE
                         CPLT(NMAXP)=CYLT(NMAXP)
                         DO 846 IU1=1,CPLT(NMAXP)
                               DO 847 IU2=1,NMAXTW
                         CPL1(NMAXP,IU1,IU2)=CYL1(NMAXP,IU1,IU2)
                         CPL2(NMAXP,IU1,IU2)=CYL2(NMAXP,IU1,IU2)
 847                           CONTINUE
 846                     CONTINUE
```

```
C     GO TO 22
C     OUTPUT////////////////////////////////////////////////////////////////
C     AQ=.FALSE.
C     DO 62 KAB=1,NMAX
C           BQ=.FALSE.
C           ILTD=LTD+1
C     IF((.NOT.(PVAT(KAB).LT.ILTD)).AND.(.NOT.(PVBT(KAB).LT.ILTD)
).AND.
C     1        (.NOT.(CYLT(KAB).LT.ILTD)).AND.(.NOT.(CACT(KAB).LT.ILT
D)).AND.
C     2        (.NOT.(CPLT(KAB).LT.ILTD))) THEN
C           BQ=.TRUE.
C     ENDIF
C           AQ=BQ.OR.AQ
C62   CONTINUE
C     IF(.NOT.AQ) THEN
C     DO 63 IW=1,NMAX
C     TOTAL=PVAT(IW)+PVBT(IW)+CYLT(IW)+CACT(IW)+CPLT(IW)
C     WRITE(16,70)IW,IW,PVAT(IW),IW,PVBT(IW),IW,CYLT(IW),IW,CACT(
IW),
C     1     IW,CPLT(IW),TOTAL
C70   FORMAT(//1X,3HIR=,I4,2X,5HPVAT(,I4,2H)=,I4,2X,5HPVBT(,I4,2H
)=,
C     1     I4,2X,5HCYLT(,I4,2H)=,I4,2X,5HCACT(,I4,2H)=,I4,2X,5HCP
LT(,I4,2H)=,
C     2     I4,2X,6HTOTAL=,I4)
C63   CONTINUE
C     ENDIF
      WRITE(16,*)'*** NMAX+1 OUTPUT PIN BOOLEAN LISTS ***'
      DO 66 I49=1,NMAXP
           WRITE(16,64)I49,I49
 64   FORMAT(//1X,21H Below is List Number,I4,4H Pin,I4,14//)
           WRITE(16,65)
 65   FORMAT(4X,3HLSB,5X,3HMSB,1X)
           IF(CPLT(I49).GT.LTD) THEN
                 CPLT(I49)=LTD
                 WRITE(16,*)' CPLT/PRINT.GT.LTD'
           ENDIF
           DO 68 KG=1,CPLT(I49)
                 DO 67 K=1,NMAXTW
      IF(CPL1(I49,KG,K).AND.CPL2(I49,KG,K)) THEN
           SPACE(KG,K)=CHART(3)
      ELSE IF(CPL1(I49,KG,K).AND.(.NOT.CPL2(I49,KG,K))) THEN
           SPACE(KG,K)=CHART(1)
      ELSE IF((.NOT.CPL1(I49,KG,K)).AND.CPL2(I49,KG,K)) THEN
           SPACE(KG,K)=CHART(2)
      ELSE
           WRITE(16,*)'    **** ERROR in Bit Cover ****'
```

```
      ENDIF
 67               CONTINUE
              WRITE(16,69)KG,(SPACE(KG,IG),IG=1,NMAXTW)
 69           FORMAT(1X,I4,2X,2(2A1,1X))
 68       CONTINUE
 66   CONTINUE
C22   IJKL=0
C     STOP
      END
C     No. 1 Relabel
C     -----------------------------------------------
      SUBROUTINE RLABEL
      COMMON /B02/ CUBE(20.2,8),CUBERP(20,2,8)
      COMMON /B19/ NEW,SUM,JNUM,NMAXX,IA2,ISHQ,Q
      1      MODE,TA,TC,NMAXTW,CUBENUM
      LOGICAL*2 CUBE,CUBERP
      INTEGER NEW,SUM,JNUM,NMAXX,IA2,ISHQ,Q
      1      MODE,TA,TC,NMAXTW,CUBENUM
C     Relabel Cubes in List.
C     Define as L1 List
      IF(CUBENUM.GT.0) THEN
C     ------------------------------------------------------------
      DO 2 JA=1,CUBENUM
          DO 4 IA=1,NMAXTW
              CUBE(JA,1,IA)=CUBERP(JA,1,IA)
              CUBE(JA,2,IA)=CUBERP(JA,2,IA)
 4        CONTINUE
 2    CONTINUE
C     -------------------------------------------------------
      ENDIF
      RETURN
      END
C     No. 2 List AND
C     -------------------------------------------------------
      SUBROUTINE LISAND
      COMMON /B02/ CUBE(20,2,8),CUBERP(20,2,8)
      COMMON /B09/ LCUBE(20,2,8),ACUBE(20,2,8)
      COMMON /B16/ AQ,BQ
      COMMON /B18/ AN,CN,JTOL,NMAX,IBPP,KCDA,KMAX,W(20),C(20),
      1      CD(20),A,CM(20)
      COMMON /B19/ NEW,SUM,JNUM,NMAXX,IA2,ISHQ,Q
      1      MODE,TA,TC.NMAXTW,CUBENUM
      COMMON /B20/ IAX(8),IR,LTD,TOTAL,JNUM3
      COMMON /B21/ CUBEN(20),V,WX(20),M(20)
      LOGICAL*2 CUBE,CUBERP
      LOGICAL*2 LCUBE,ACUBE
      LOGICAL*2 AQ,BQ
      INTEGER AN,CN,JTOL,NMAX,IBPP,KCDA,KMAX,W,C,
      1      CD,A,CM
```

```
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
C     L(NEW)=L(AA).AND.L(CA)
C     L(AN) has AN cubes.
C     L(CN) has CN cubes.
C     L(j)=L(jn1),L(jn2),....
C     L(k)=L(kn1),L(kn2),....
C     Generation of RF cubes,where RF=(AN+CN).
      IF(CUBENUM.EQ.0) THEN
C           WRITE(16,*)'ERROR in before number 2'
      ENDIF
      IF(CUBENUM.GT.0) THEN
C     ------------------------------------------------------------------
      IF((AN.EQ.0).OR.(CN.EQ.0)) THEN
C           WRITE(16,*)'ERROR of AN&CN',AN,CN
C           GO TO end of 2!
C     WRITE(16,*)'AN&CN in LISAND=',AN,CN
      ENDIF
C     WRITE(16,*)'CN&AN',CN,AN
      JNUM=0
      DO 8 KB=1,CN
            DO 10 JB=1,AN
                  JNUM=JNUM+1
                  DO 12 IPART=1,NMAXTW
                        DO 14 IT=1,IBPF
      CUBERF(JNUM,IT,IPART)=ACUBE(JB,IT,IPART).AND.CUBE(KB,IT,IPA
RT)
 14                     CONTINUE
 12               CONTINUE
                  CALL NULL
C     WRITE(16,*)'JNUM=',JNUM
 10         CONTINUE
 8    CONTINUE
C     Determination of cubes that contain a FF and remove from
the list.
      CUBENUM=JNUM
      IF(JNUM.EQ.0) THEN
            WRITE(16,*)'2 AN&CN=',AN,CN
      WRITE(16,722)(ACUBE(1,1,K1),ACUBE(1,2,K1),K1=1,NMAXTW)
 722  FORMAT(1X,4(2L1,1X))
      WRITE(16,838)(CUBE(1,1,K1),CUBE(1,2,K1),K1=1,NMAXTW)
 838  FORMAT(1X,4(2L1,1X))
      ENDIF
      CALL RLABEL
C     WRITE(16,*)'CUBLISA2=',CUBENUM
      IF(CUBENUM.GT.1) THEN
            CALL DJOINT
```

```
      ENDIF
C     WRITE(16,*)'CUBLISA3=',CUBENUM
C     WRITE(16,140)
C     FORMAT(///3X,4HKMAX,3X,7HW(KMAX)///)
C     DO 141 IT1=1,KMAX
C           WRITE(16,142)IT1,W(IT1)
C142        FORMAT(2(3X,I4),1X)
C     CONTINUE
      IF(CUBENUM.EQ.0) THEN
            WRITE(16,*)'ERROR in number 2'
C           CUBENUM=1
C           DO 317 I6=1,NMAXTW
C                 CUBE(1,1,I6)=.FALSE.
C                 CUBE(1,1,I6)=.FALSE.
C317        CONTINUE
      ENDIF
C     ----------------------------------------------
      ENDIF
      RETURN
      END
C     No. 3 LISOR
C     ----------------------------------------------
      SUBROUTINE LISOR
C     2 List OR capability
C     IACT is number of cubes in ACUBE list.
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
```

```
      IF(CUBENUM.EQ.0) THEN
C           WRITE(16,*)'ERROR before number 3'
      ENDIF
      IF(CUBENUM.GT.0) THEN
C     ----------------------------------------------------------
      IF((AN.EQ.0).OR.(CN.EQ.0)) THEN
            WRITE(16,*)'ERROR in OR AN&CN=',AN,CN
C           GO TO end of 3!
      ENDIF
C     WRITE(16,*)'AN&CN in LISOR=',AN,CN
      DO 99 I20=1,AN
            I21=I20+CN
            DO 172 K=1,NMAXTW
                  DO 173 IB=1,IBPP
      CUBE(I21,IB,K)=ACUBE(I20,IB,K)
 173              CONTINUE
 172        CONTINUE
 99   CONTINUE
      CUBENUM=AN+CN
      IF(CUBENUM.GT.1) THEN
            CALL NWD
            CALL DJOINT
      ENDIF
      IF(CUBENUM.EQ.0) THEN
C           WRITE(16,*)'ERROR IN NUMBER THREE'
      ENDIF
C     ------------------------------------------------------
      ENDIF
      RETURN
      END
C     No. 4 NEGLIS
C     ---------------------------------------------------------
      SUBROUTINE NEGLIS
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
C     COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 AQ,BQ
      INTEGER AN,CN,JTOL,NMAX,IBPP,KCDA,KMAX,W,C,
```

```
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
      LOGICAL CUBRP1(8,20,8)
      LOGICAL A11,A12,A13,A14,CQ,DQ
C     To .NOT. a list
C     TC=number of cubes in list,which is in descending order by
weight.
C     TC is in common block.
C           L(1)=A(#)C(1)
C     Cubes in L should be weighted and put in descending &
disjoint order.
      IF(CUBENUM.GT.0) THEN
C     -----------------------------------------------------------
      IF(TA.EQ.0) THEN
C           Universe cube is created.
            IUNIV=1
            DO 36 IA=1,NMAXTW
                  DO 37 IT=1,IBPP
                        ACUBE(IUNIV,IT,IA)=.TRUE.
 37               CONTINUE
 36         CONTINUE
            DO 236 JA=1,CUBENUM
                  DO 237 JH=1,NMAXTW
                        DO 238 JP=1,IBPP
                              JCUBE(JA,JP,JH)=CUBE(JA,JP,JH)
 238                    CONTINUE
 237              CONTINUE
 236        CONTINUE
      ELSE IF(TA.NE.0) THEN
            DO 38 IQ=1,TA
                  DO 39 IA=1,NMAXTW
                        DO 40 IT=1,IBPP
                              ACUBE(IQ,IT,IA)=CUBE(IQ,IT,IA)
 40                     CONTINUE
 39               CONTINUE
 38         CONTINUE
      ENDIF
C     IF(MODE.NE.1) THEN
C           LCUBE(JNUM,J,K)=ACUBE(IA,J,K)(#)JCUBE(IC,J,K)
C     Negating a cube.Generation of JTO number of cubes.
C     WRITE(16,*)' '
C     WRITE(16,*)'  cubes at start of No. 4'
C     DO 809 IT=1,CUBENUM
C     WRITE(16,808)IT,(CUBE(IT,1,K),CUBE(IT,2,K),K=1,NMAXTW)
C808 FORMAT(1X,I4,2X,4(2L1,1X))
C809 CONTINUE
```

```
C     WRITE(16,*)' '
      IAA=1
      JLCUB=CUBENUM
      DO 41 JLIST=1,JLCUB
            JNUM=0
            JGT=0
            JG=0
            DO 126 IA=1,IAA
C     If A at least partially covers J,then proceed TEST.
                  CQ=.FALSE.
                  DO 819 IS=1,NMAXTW
      A11=((.NOT.ACUBE(IA,1,IS)).AND.ACUBE(IA,2,IS).AND.
     1      JCUBE(JLIST,1,IS).AND.(.NOT.JCUBE(JLIST,2,IS)))
      A12=(ACUBE(IA,1,IS).AND.(.NOT.ACUBE(IA,2,IS)).AND.
     1      (.NOT.JCUBE(JLIST,1,IS)).AND.JCUBE(JLIST,2,IS))
                        DQ=.FALSE.
      IF(A11.OR.A12) THEN
                        DQ=.TRUE.
      ENDIF
                        CQ=CQ.OR.DQ
 819              CONTINUE
            IF(.NOT.CQ) THEN
C     If A at least partially covers J,then proceed.
                  DO 42 IS=1,NMAXTW
                        JNUM=JNUM+1
                        DO 43 KA=1,NMAXTW
                              DO 44 IT=1,IBPP
                              IF(KA.EQ.IS) THEN
      CUBERP(JNUM,IT,KA)=ACUBE(IA,IT,KA).AND.(.NOT.JCUBE(JLIST,IT
,KA))
                              ELSE IF(KA.LT.IS) THEN
      CUBERP(JNUM,IT,KA)=ACUBE(IA,IT,KA).AND.JCUBE(JLIST,IT,KA)
                              ELSE IF(KA.GT.IS) THEN
      CUBERP(JNUM,IT,KA)=ACUBE(IA,IT,KA)
                              ENDIF
 44                           CONTINUE
 43                     CONTINUE
                        CALL NULL
 42               CONTINUE
C           IF(JLCUB.EQ.6) THEN
C     WRITE(16,*)'      CUBENUM =',CUBENUM
C     WRITE(16,*)'   JLIST above =',JLIST
C     WRITE(16,*)'    JNUM above =',JNUM
C     WRITE(16,*)'            IA =',IA
C           ENDIF
            ELSE
C           IF(JLCUB.EQ.6) THEN
C     WRITE(16,*)'   JLIST below =',JLIST
C     WRITE(16,*)'            IA =',IA
```

```
C          ENDIF
C               Storage of A cubes that do not cover J cubes.
                JG=JG+1
                DO 814 KB=1,NMAXTW
                       CUBRP1(JG,1,KB)=ACUBE(IA,1,KB)
                       CUBRP1(JG,2,KB)=ACUBE(IA,2,KB)
 814            CONTINUE
                JGT=JG
           ENDIF
 126       CONTINUE
                       IAA=JNUM
                       DO 234 JH=1,IAA
                              JG=JG+1
                              DO 235 KB=1,NMAXTW
                       ACUBE(JG,1,KB)=CUBERP(JH,1,KB)
                       ACUBE(JG,2,KB)=CUBERP(JH,2,KB)
 235                          CONTINUE
 234                   CONTINUE
                       IAA=JGT
                       JG=0
                       DO 815 JH=1,IAA
                              JG=JG+1
                              DO 816 KB=1,NMAXTW
                       ACUBE(JG,1,KB)=CUBRP1(JH,1,KB)
                       ACUBE(JG,2,KB)=CUBRP1(JH,2,KB)
 816                          CONTINUE
 815                   CONTINUE
                       IAA=JNUM+JGT
C          IF(JLCUB.EQ.6) THEN
C     WRITE(16,*)'  IAA =',IAA
C     WRITE(16,*)'  JLIST at 41 =',JLIST
C          ENDIF
 41        CONTINUE
           CUBENUM=IAA
C     Relabel Cubes in list.
C     Define as L1 List.
      DO 811 JG=1,CUBENUM
           DO 812 KB=1,NMAXTW
                  CUBE(JG,1,KB)=ACUBE(JG,1,KB)
                  CUBE(JG,2,KB)=ACUBE(JG,2,KB)
 812       CONTINUE
 811  CONTINUE
C     WRITE(16,*)' '
C     WRITE(16,*)'  cube after 811 '
C     DO 817 IT=1,CUBENUM
C     WRITE(16,818)IT,(CUBE(IT,1,K),CUBE(IT,2,K),K=1,NMAXTW)
C818  FORMAT(1X,I4,2X,4(2L1,1X))
C817  CONTINUE
C     WRITE(16,*)' '
```

```
          IF((CUBENUM.EQ.0).OR.(CUBENUM.GT.LTD)) THEN
               GO TO 242
          ENDIF
          IF(CUBENUM.GT.1) THEN
               CALL NWD
               CALL DJOINT
          ENDIF
      IF((CUBENUM.EQ.0).OR.(CUBENUM.GT.LTD)) THEN
          GO TO 191
      ENDIF
C     ENDIF
C     Next weigh,remove null cubes,and order in descending
disjoint cubes.
C     IF(CUBENUM.GT.1) THEN
C          CALL NWD
C          CALL DJOINT
C     ENDIF
 191  IV=0
 242  IV=0
      IF((CUBENUM.EQ.0).OR.(CUBENUM.GT.LTD)) THEN
          CUBENUM=5
C         WRITE(16,*)'    END OF NEGL1S =5 ERROR'
      ELSE IF(CUBENUM.EQ.0) THEN
C         WRITE(16,*)'  ERROR in number 4'
      ENDIF
 320  IV=0
C     ----------------------------------------------------------
      ENDIF
      RETURN
      END
C     No. 5 Add two Cubes.
C     ----------------------------------------------------------
      SUBROUTINE ADCUBE
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX.IA2,ISHQ,Q
      1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
      1     CACT(20),CPLT(20)
      COMMON /B23/ TD,KZ,KG,NP,JCOVER,JPV,J2
      COMMON /B24/ PVA1(8,20,8)
```

```
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCOA,KMAX,W,C,
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
      1     CACT,CPLT
      INTEGER TD,KZ,KG,NP,JCOVER,JPV,J2
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      INTEGER N
C     Addition ( 2 (O-Cube))
      IVX=0
C     C(1)=0
C     Each input N(J) cube=U.
      IF(CUBENUM.GT.0) THEN
C     ------------------------------------------------------------
      DO 57 J=1,NMAX
           JPV=J
```

```
          JPVP=JPV+1
          JN=NMAX+J
          J1=J+1
C308
C307
          IF(IVX.EQ.0) THEN
C     ------------------ Odd Adder Stage--------------------
               IF(J.EQ.1) THEN
C     ----------------------------CYLj(in)=0-----------------------------
C              C(J1)=.NOT.(PVA(J).AND.PVB(J))
C              ----------------------------------
                    AN=PVAT(J)
                    DO 45 J7=1,AN
                         DO 46 K=1,NMAXTW
                    ACUBE(J7,1,K)=PVA1(J,J7,K)
                    ACUBE(J7,2,K)=PVA2(J,J7,K)
 46                      CONTINUE
 45                 CONTINUE
                    CN=PVBT(J)
C                   IF((J2.EQ.2).AND.(J.EQ.1)) THEN
C                        WRITE(16,*)'   PVBT(1)=',PVBT(J)
C                   ENDIF
                    DO 47 J7=1,CN
                         DO 48 K=1,NMAXTW
                    CUBE(J7,1,K)=PVB1(J,J7,K)
                    CUBE(J7,2,K)=PVB2(J,J7,K)
 48                      CONTINUE
C                   IF((J2.EQ.2).AND.(JPV.EQ.1)) THEN
C                   ENDIF
 47                 CONTINUE

C     WRITE(16,723)(ACUBE(1,1,K1),ACUBE(1,2,K1),K1=1,NMAXTW)
C723 FORMAT(1X,4(2L1,1X))
                    CALL LISAND
C     IF(CUBENUM.EQ.0) THEN
C          WRITE(16,*)'ERROR AN&CN=',AN,CN
C     ENDIF
                    TA=0
                    CALL NEGLIS
                    CYLT(J1)=CUBENUM
                    DO 49 J7=1,CYLT(J1)
                         DO 50 K=1,NMAXTW
                    CYL1(JPVP,J7,K)=CUBE(J7,1,K)
                    CYL2(JPVP,J7,K)=CUBE(J7,2,K)
 50                      CONTINUE
 49                 CONTINUE
C              S(J)=(PVA(J).OR.PVB(J)).AND.C(J1))
C              ------------------------------------------
                    AN=PVAT(J)
```

```
C                       IF((J2.EQ.2).AND.(J.EQ.1)) THEN
C                             WRITE(16,*)'  PVAT(1)=',PVAT(J)
C                       ENDIF
                        DO 51 J7=1,AN
                              DO 76 K=1.NMAXTW
                        ACUBE(J7,1,K)=PVA1(J,J7,K)
                        ACUBE(J7,2,K)=PVA2(J,J7,K)
 76                           CONTINUE
C                       IF((J2.EQ.2).AND.(JPV.EQ.1)) THEN
C     WRITE(16,840)J7,(PVA1(J,J7,K),PVA2(J,J7,K),
C     1     K=1,NMAXTW)
C840 FORMAT(1X,I4,2X,4(2L1,1X))
C                       ENDIF
 51                     CONTINUE
                        CN=PVBT(J)
C                       IF((J2.EQ.2).AND.(J.EQ.1)) THEN
C                             WRITE(16,*)'  PVBT(1)=',PVBT(J)
C                       ENDIF
                        DO 83 J7=1,CN
                              DO 84 K=1,NMAXTW
                        CUBE(J7,1,K)=PVB1(J,J7,K)
                        CUBE(J7,2,K)=PVB2(J,J7,K)
 84                           CONTINUE
C                       IF((J2.EQ.2).AND.(JPV.EQ.1)) THEN
C     WRITE(16,841)J7,(PVB1(J,J7,K),PVB2(J,J7,K),
C     1     K=1,NMAXTW)
C841 FORMAT(1X,I4,2X,4(2L1,1X))
C                       ENDIF
 83                     CONTINUE
                        CALL LISOR
                        AN=CYLT(JPVP)
                        DO 85 J7=1,AN
                              DO 86 K=1,NMAXTW
                        ACUBE(J7,1,K)=CYL1(JPVP,J7,K)
                        ACUBE(J7,2,K)=CYL2(JPVP,J7,K)
 86                           CONTINUE
 85                     CONTINUE
                        CN=CUBENUM
                        CALL LISAND
                        CACT(J)=CUBENUM
C                       IF((J2.EQ.2).AND.(J.EQ.1)) THEN
C                             WRITE(16,*)'  CACT(1)=',CACT(J)
C                       ENDIF
                        DO 87 J7=1,CACT(J)
                              DO 88 K=1,NMAXTW
                        CACUB1(JPV,J7,K)=CUBE(J7,1,K)
                        CACUB2(JPV,J7,K)=CUBE(J7,2,K)
 88                           CONTINUE
 87                     CONTINUE
```

```
                ELSE
C     IF((JPV.EQ.NMAX).AND.(J2.EQ.2)) THEN
C           PVAT(J)=1
C           DO 18 IU1=1,PVAT(J)
C                 DO 58 IU2=1,NMAXTW
C           PVA1(J,IU1,IU2)=.TRUE.
C           PVA2(J,IU1,IU2)=.TRUE.
C58                  CONTINUE
C18             CONTINUE
C     ENDIF
C                       GO TO
                        CALL CARRY
                        CALL SJ
                  ENDIF
                  IVX=1
            ELSE
C     ----------------Even Adder Stage----------------------
C                 A(J)=.NOT.A(J)
C                 B(J)=.NOT.B(J)
C     IF(((JPV.NE.NMAX).AND.(J2.EQ.2)).OR.(J2.NE.2)) THEN
                  CUBENUM=PVAT(J)
                  DO 161 IU1=1,CUBENUM
                        DO 162 IU2=1,NMAXTW
                  CUBE(IU1,1,IU2)=PVA1(J,IU1,IU2)
                  CUBE(IU1,2,IU2)=PVA2(J,IU1,IU2)
 162                    CONTINUE
 161              CONTINUE
                  TA=0
                  CALL NEGLIS
                  PVAT(J)=CUBENUM
                  DO 163 IU1=1,PVAT(J)
                        DO 164 IU2=1,NMAXTW
                  PVA1(J,IU1,IU2)=CUBE(IU1,1,IU2)
                  PVA2(J,IU1,IU2)=CUBE(IU1,2,IU2)
 164                    CONTINUE
 163              CONTINUE
C     ELSE IF((JPV.EQ.NMAX).AND.(J2.EQ.2)) THEN
C                 PVAT(J)=1
C                 DO 828 IU1=1,PVAT(J)
C                       DO 829 IU2=1,NMAXTW
C                 PVA1(J,IU1,IU2)=.TRUE.
C                 PVA2(J,IU1,IU2)=.TRUE.
C829                    CONTINUE
C828              CONTINUE
C     ENDIF
                  CUBENUM=PVBT(J)
                  DO 165 IU1=1,CUBENUM
                        DO 166 IU2=1,NMAXTW
                  CUBE(IU1,1,IU2)=PVB1(J,IU1,IU2)
```

```
                CUBE(IU1,2,IU2)=PVB2(J,IU1,IU2)
 166                  CONTINUE
 165            CONTINUE
                TA=0
                CALL NEGLIS
                PVBT(J)=CUBENUM
                DO 167 IU1=1,PVBT(J)
                      DO 168 IU2=1,NMAXTW
                PVB1(J,IU1,IU2)=CUBE(IU1,1,IU2)
                PVB2(J,IU1,IU2)=CUBE(IU1,2,IU2)
 168                  CONTINUE
 167            CONTINUE
                CALL CARRY
                CALL SJ
C               S(J)=.NOT.S(J)
                CUBENUM=CACT(J)
                DO 826 IU1=1,CUBENUM
                      DO 827 K=1,NMAXTW
                CUBE(IU1,1,K)=CACUB1(J,IU1,K)
                CUBE(IU1,2,K)=CACUB2(J,IU1,K)
 827                  CONTINUE
 826            CONTINUE
                TA=0
                CALL NEGLIS
                CACT(J)=CUBENUM
                DO 303 IU1=1,CACT(J)
                      DO 304 K=1,NMAXTW
                CACUB1(J,IU1,K)=CUBE(IU1,1,K)
                CACUB2(J,IU1,K)=CUBE(IU1,2,K)
 304                  CONTINUE
 303            CONTINUE
                IVX=0
          ENDIF
C     ENDDO
 57   CONTINUE
C305  IV=0
C22   IV=0
      IF(CUBENUM.EQ.0) THEN
            WRITE(16,*)' Error in 5'
      ENDIF
C     ----------------------------------------------------------
      ENDIF
      RETURN
      END
C     No. 6 CARRY
C     ----------------------------------------------------------
      SUBROUTINE CARRY
C     C(J1) Binary Routine
      COMMON /B01/ JCUBE(20,2,8)
```

```
COMMON /B02/ CUBE(20,2,8),CUBERP(20,2,8)
COMMON /B09/ LCUBE(20,2,8),ACUBE(20,2,8)
COMMON /B14/ CYL1(16,20,8)
COMMON /B15/ CYL2(16,20,8)
COMMON /B16/ AQ,BQ
COMMON /B18/ AN,CN,JTOL,NMAX,IBPP,KCDA,KMAX,W(20),C(20),
1     CD(20),A,CM(20)
COMMON /B19/ NEW,SUM,JNUM,NMAXX,IA2,ISHQ,Q
1     MODE,TA,TC,NMAXTW,CUBENUM
COMMON /B20/ IAX(8),IR,LTD,TOTAL,JNUM3
COMMON /B21/ CUBEN(20),V,WX(20),M(20)
COMMON /B22/ AT(20),BT(20),PVAT(20),PVBT(20),CYLT(20),
1     CACT(20),CPLT(20)
COMMON /B23/ TD,KZ,KG,NP,JCOVER,JPV,J2
COMMON /B24/ PVA1(8,20,8)
COMMON /B25/ PVA2(8,20,8)
COMMON /B26/ PVB1(8,20,8)
COMMON /B27/ PVB2(8,20,8)
COMMON /B28/ CPL1(8,20,8)
COMMON /B29/ CPL2(8,20,8)
COMMON /B32/ CACUB1(8,20,8)
COMMON /B33/ CACUB2(8,20,8)
COMMON /B34/ A1(8,1,8)
COMMON /B35/ A2(8,1,8)
COMMON /B36/ B1(8,1,8)
COMMON /B37/ B2(8,1,8)
COMMON /B38/ CUBRP1(8,20,8)
LOGICAL*2 JCUBE
LOGICAL*2 CUBE,CUBERP
LOGICAL*2 LCUBE,ACUBE
LOGICAL*2 CYL1
LOGICAL*2 CYL2
LOGICAL*2 AQ,BQ
INTEGER AN,CN,JTOL,NMAX,IBPP,KCDA,KMAX,W,C,
1     CD,A,CM
INTEGER NEW,SUM,JNUM,NMAXX,IA2,ISHQ,Q
1     MODE,TA,TC,NMAXTW,CUBENUM
INTEGER IAX,IR,LTD,TOTAL,JNUM3
INTEGER CUBEN,V,WX,M
INTEGER AT,BT,PVAT,PVBT,CYLT,
1     CACT,CPLT
INTEGER TD,KZ,KG,NP,JCOVER,JPV,J2
LOGICAL*2 PVA1
LOGICAL*2 PVA2
LOGICAL*2 PVB1
LOGICAL*2 PVB2
LOGICAL*2 CPL1
LOGICAL*2 CPL2
LOGICAL*2 CACUB1
```

```
      LOGICAL*2 CACUB2
      LOGICAL*2 A1
      LOGICAL*2 A2
      LOGICAL*2 B1
      LOGICAL*2 B2
      LOGICAL*2 CUBRP1
      IF(CUBENUM.GT.0) THEN
C     ----------------------------------------------------------------
      IR=6
      JPVP=JPV+1
C     -------------------------------------------------------G01 below:
C     IF(((JPV.NE.NMAX).AND.(J2.EQ.2)).OR.(J2.NE.2)) THEN
      AN=PVAT(JPV)
      DO 97 IT=1,AN
            DO 98 K=1,NMAXTW
                  ACUBE(IT,1,K)=PVA1(JPV,IT,K)
                  ACUBE(IT,2,K)=PVA2(JPV,IT,K)
 98         CONTINUE
 97   CONTINUE
      CN=CYLT(JPV)
      DO 60 IT=1,CN
            DO 61 K=1,NMAXTW
                  CUBE(IT,1,K)=CYL1(JPV,IT,K)
                  CUBE(IT,2,K)=CYL2(JPV,IT,K)
 61         CONTINUE
 60   CONTINUE
C     WRITE(16,*)'JPV=',JPV,'  before LISAND1 in CARRY'
      CALL LISAND
C     WRITE(16,*)'JPV=',JPV,'  after LISAND1 in CARRY'
      CYLT(JPVP)=CUBENUM
      DO 32 IT=1,CYLT(JPVP)
            DO 34 K=1,NMAXTW
      CYL1(JPVP,IT,K)=CUBE(IT,1,K)
      CYL2(JPVP,IT,K)=CUBE(IT,2,K)
 34         CONTINUE
 32   CONTINUE
C     -------------------------------------------------------G02 below:
      AN=PVBT(JPV)
      DO 117 IT=1,AN
            DO 169 K=1,NMAXTW
      ACUBE(IT,1,K)=PVB1(JPV,IT,K)
      ACUBE(IT,2,K)=PVB2(JPV,IT,K)
 169        CONTINUE
 117  CONTINUE
      CN=PVAT(JPV)
      DO 100 IT=1,CN
            DO 118 K=1,NMAXTW
      CUBE(IT,1,K)=PVA1(JPV,IT,K)
      CUBE(IT,2,K)=PVA2(JPV,IT,K)
```

```
 118       CONTINUE
 100 CONTINUE
C     WRITE(16,*)'JPV=',JPV,'  before LISAND2 in CARRY'
      CALL LISAND
C     WRITE(16,*)'JPV=',JPV,'  after LISAND2 in CARRY'
      IF(CUBENUM.EQ.0) THEN
C           WRITE(16,*)'ERROR above 119 SIX'
      ENDIF
      AN=CYLT(JPVP)
      DO 119 IT=1,AN
            DO 120 K=1,NMAXTW
      ACUBE(IT,1,K)=CYL1(JPVP,IT,K)
      ACUBE(IT,2,K)=CYL2(JPVP,IT,K)
 120       CONTINUE
 119 CONTINUE
      CN=CUBENUM
      CALL LISOR
      IF(CUBENUM.EQ.0) THEN
C           WRITE(16,*)'ERROR above 121 SIX'
      ENDIF
      CYLT(JPVP)=CUBENUM
      DO 121 IT=1,CYLT(JPVP)
            DO 122 K=1,NMAXTW
      CYL1(JPVP,IT,K)=CUBE(IT,1,K)
      CYL2(JPVP,IT,K)=CUBE(IT,2,K)
 122       CONTINUE
 121 CONTINUE
C     ENDIF
C     ----------------------------------------------------603 below:
      AN=CYLT(JPV)
      DO 149 IT=1,AN
            DO 150 K=1,NMAXTW
                  ACUBE(IT,1,K)=CYL1(JPV,IT,K)
                  ACUBE(IT,2,K)=CYL2(JPV,IT,K)
 150       CONTINUE
 149 CONTINUE
      CN=PVBT(JPV)
      DO 240 IT=1,CN
            DO 123 K=1,NMAXTW
                  CUBE(IT,1,K)=PVB1(JPV,IT,K)
                  CUBE(IT,2,K)=PVB2(JPV,IT,K)
 123       CONTINUE
 240 CONTINUE
C     WRITE(16,*)'JPV=',JPV,'  before LISAND3 in CARRY'
      CALL LISAND
C     WRITE(16,*)'JPV=',JPV,'  after LISAND3 in CARRY'
C     IF(((JPV.NE.NMAX).AND.(J2.EQ.2)).OR.(J2.NE.2)) THEN
      AN=CYLT(JPVP)
      DO 170 IT=1,AN
```

```
      DO 171 K=1,NMAXTW
      ACUBE(IT,1,K)=CYL1(JPVP,IT,K)
      ACUBE(IT,2,K)=CYL2(JPVP,IT,K)
 171        CONTINUE
 170  CONTINUE
      CN=CUBENUM
      CALL LISOR
      WRITE(16,*)' '
      WRITE(16,*)'  Carry Before calling .NOT.'
      DO 824 IT=1,CUBENUM
      WRITE(16,842)IT,(CUBE(IT,1,K),CUBE(IT,2,K),K=1,NMAXTW)
 842  FORMAT(1X,I4,2X,4(2L1,1X))
 824  CONTINUE
      WRITE(16,*)' '
      WRITE(16,*)' '
C     ENDIF
      TA=0
      CALL NEGLIS
      WRITE(16,*)' '
      WRITE(16,*)'  Carry After NOT - JPV=',JPV
      CYLT(JPVP)=CUBENUM
      DO 124 IT=1,CYLT(JPVP)
            DO 125 K=1,NMAXTW
      CYL1(JPVP,IT,K)=CUBE(IT,1,K)
      CYL2(JPVP,IT,K)=CUBE(IT,2,K)
 125        CONTINUE
                        IF(JPV.EQ.2) THEN
      WRITE(16,833)IT,(CYL1(JPVP,IT,K),CYL2(JPVP,IT,K),
     1     K=1,NMAXTW)
 833  FORMAT(1X,I4,2X,4(2L1,1X))
                        ENDIF
 124  CONTINUE
      WRITE(16,*)' '
      WRITE(16,*)' '
C     CYL(J1)=CYLj(JPVP) is defined.
      IF(CUBENUM.EQ.0) THEN
C           WRITE(16,*)'ERROR IN NUMBER SIX'
      ENDIF
C     ------------------------------------------------------------
      ENDIF
      RETURN
      END
C     No. 7 SJ
C     ------------------------------------------------------------
      SUBROUTINE SJ
C     SJ=CACUB
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
```

```
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW.SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
```

```
      LOGICAL*2 A2
      LOGICAL*2 B1
      LOGICAL*2 B2
      LOGICAL*2 CUBRP1
      IF(CUBENUM.GT.0) THEN
C     --------------------------------------------------------------
      IR=7
      JPVP=JPV+1
C     2nd term of S(J)
C     IF(((JPV.NE.NMAX).AND.(J2.EQ.2)).OR.(J2.NE.2)) THEN
      AN=PVAT(JPV)
      DO 127 IT=1,AN
            DO 175 K=1,NMAXTW
      ACUBE(IT,1,K)=PVA1(JPV,IT,K)
      ACUBE(IT,2,K)=PVA2(JPV,IT,K)
 175        CONTINUE
 127  CONTINUE
      CN=PVBT(JPV)
      DO 133 IT=1,CN
            DO 135 K=1,NMAXTW
      CUBE(IT,1,K)=PVB1(JPV,IT,K)
      CUBE(IT,2,K)=PVB2(JPV,IT,K)
 135        CONTINUE
 133  CONTINUE
      CALL LISOR
C     ELSE IF((JPV.EQ.NMAX).AND.(J2.EQ.2)) THEN
C           CN=PVBT(JPV)
C           DO 830 IT=1,CN
C                 DO 831 K=1,NMAXTW
C           CUBE(IT,1,K)=PVB1(JPV,IT,K)
C           CUBE(IT,2,K)=PVB2(JPV,IT,K)
C831              CONTINUE
C830        CONTINUE
C     ENDIF
      AN=CYLT(JPV)
      DO 145 IT=1,CYLT(JPV)
            DO 146 K=1,NMAXTW
      ACUBE(IT,1,K)=CYL1(JPV,IT,K)
      ACUBE(IT,2,K)=CYL2(JPV,IT,K)
 146        CONTINUE
 145  CONTINUE
      CN=CUBENUM
      CALL LISOR
C     --------------------Including 1st term of S(J)
      AN=CYLT(JPVP)
      DO 71 IT=1,AN
            DO 74 K=1,NMAXTW
      ACUBE(IT,1,K)=CYL1(JPVP,IT,K)
      ACUBE(IT,2,K)=CYL2(JPVP,IT,K)
```

```
 74        CONTINUE
 71   CONTINUE
      CN=CUBENUM
      CALL LISAND
      CACT(JPV)=CUBENUM
      DO 147 IT=1,CACT(JPV)
           DO 148 K=1,NMAXTW
      CACUB1(JPV,IT,K)=CUBE(IT,1,K)
      CACUB2(JPV,IT,K)=CUBE(IT,2,K)
 148       CONTINUE
 147  CONTINUE
C     ---------------3rd term
C     IF(((JPV.NE.NMAX).AND.(J2.EQ.2)).OR.(J2.NE.2)) THEN
      AN=PVAT(JPV)
      DO 75 IT=1,AN
           DO 152 K=1,NMAXTW
      ACUBE(IT,1,K)=PVA1(JPV,IT,K)
      ACUBE(IT,2,K)=PVA2(JPV,IT,K)
 152       CONTINUE
 75   CONTINUE
      CN=PVBT(JPV)
      DO 76 IT=1,CN
           DO 153 K=1,NMAXTW
      CUBE(IT,1,K)=PVB1(JPV,IT,K)
      CUBE(IT,2,K)=PVB2(JPV,IT,K)
 153       CONTINUE
 76   CONTINUE
      CALL LISAND
C     GO TO 22
      AN=CYLT(JPV)
      DO 154 IT=1,AN
           DO 155 K=1,NMAXTW
      ACUBE(IT,1,K)=CYL1(JPV,IT,K)
      ACUBE(IT,2,K)=CYL2(JPV,IT,K)
 155       CONTINUE
 154  CONTINUE
      CN=CUBENUM
      CALL LISAND
C     ------------------------------------Combine ALL
      AN=CACT(JPV)
      DO 156 IT=1,CACT(JPV)
           DO 157 K=1,NMAXTW
      ACUBE(IT,1,K)=CACUB1(JPV,IT,K)
      ACUBE(IT,2,K)=CACUB2(JPV,IT,K)
 157       CONTINUE
 156  CONTINUE
      CN=CUBENUM
      CALL LISOR
      CACT(JPV)=CUBENUM
```

```
      DO 159 IT=1,CACT(JPV)
            DO 160 K=1,NMAXTW
      CACUB1(JPV,IT,K)=CUBE(IT,1,K)
      CACUB2(JPV,IT,K)=CUBE(IT,2,K)
 160        CONTINUE
 159  CONTINUE
C     ENDIF
      IF(CUBENUM.EQ.0) THEN
            WRITE(16,*)'ERROR IN NUMBER SEVEN'
      ENDIF
C22   IJKL=0
C     --------------------------------------------------------
      ENDIF
      RETURN
      END
C     No. 8 NWD means null,weight,and descend.
C     --------------------------------------------------------
      SUBROUTINE NWD
      COMMON /B02/ CUBE(20,2,8),CUBERP(20,2,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      LOGICAL*2 CUBE,CUBERP
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      IF(CUBENUM.GT.0) THEN
C     ------------------------------------------------------------
C     Remove null cube routine.
C     If any part is FF then remove cube from list.
      JNUM=0
      DO 53 IM=1,CUBENUM
            JNUM=JNUM+1
            DO 55 KB=1,NMAXTW
                  CUBERP(JNUM,1,KB)=CUBE(IM,1,KB)
                  CUBERP(JNUM,2,KB)=CUBE(IM,2,KB)
 55         CONTINUE
            CALL NULL
 53   CONTINUE
      CUBENUM=JNUM
C     SUBROUTINE WEIGHT
      DO 710 I8=1,CUBENUM
            SUM=0
            DO 72 K8=1,NMAXTW
                  DO 73 J8=1,IBPP
```

```
                     IF(CUBERP(I8,J8,K8)) THEN
                          SUM=SUM+1
                     ENDIF
 73              CONTINUE
 72         CONTINUE
            C(I8)=SUM
 710 CONTINUE
C     SUBROUTINE DESCEN
      DO 77 I8=1,CUBENUM
            CM(I8)=C(I8)
 77   CONTINUE
      KMAX=0
      KCD=0
      DO 78 K8=1,CUBENUM
            KAA=0
            DO 79 J8=1,CUBENUM
                 IF(KAA.LT.CM(J8)) THEN
                      KAA=CM(J8)
                 ENDIF
 79         CONTINUE
C           W(K8)=maximum value of the heaviest cube.
            W(K8)=KAA
            KCDA=0
            DO 80 J8=1,CUBENUM
                 IF(KCDA.EQ.0) THEN
                      IF(W(K8).EQ.CM(J8)) THEN
                           CM(J8)=0
                           KMAX=KMAX+1
                           KCD=KCD+1
                           KCDA=1
                 IF((KCD.EQ.CUBENUM).OR.(KCD.LT.CUBENUM)) THEN
                      CD(KCD)=C(J8)
                      DO 81 L38=1,NMAXTW
                           DO 82 L28=1,IBPP
                 CUBE(KCD,L28,L38)=CUBERP(J8,L28,L38)
 82                        CONTINUE
 81                   CONTINUE
                 ENDIF
                      ENDIF
                 ENDIF
 80         CONTINUE
 78   CONTINUE
C     ----------------------------------------------------------
      ENDIF
      RETURN
      END
C     No. 9 NULL,To be called immediately after a cube is
created.
C     ----------------------------------------------------------------
```

```
      SUBROUTINE NULL
      COMMON /B02/ CUBE(20,2,8),CUBERP(20,2,8)
      COMMON /B16/ AQ,BQ
      COMMON /B19/ NEW,SUM,JNUM,NMAXX,IA2,ISHQ,Q
      1     MODE,TA,TC,NMAXTW,CUBENUM
      LOGICAL*2 CUBE,CUBERP
      LOGICAL*2 AQ,BQ
      INTEGER NEW,SUM,JNUM,NMAXX,IA2,ISHQ,Q
      1     MODE,TA,TC,NMAXTW,CUBENUM
C     Remove null cube routine.
C     If any part is FF,then remove cube from list.
      IF(CUBENUM.GT.0) THEN
C     ------------------------------------------------------------
      AQ=.FALSE.
      DO 28 KAJ=1,NMAXTW
            BQ=.FALSE.
C           AQ is true if PART is FF.
            JW=JNUM
      IF(.NOT.CUBERP(JW,1,KAJ).AND.(.NOT.CUBERP(JW,2,KAJ))) THEN
            BQ=.TRUE.
      ENDIF
            AQ=BQ.OR.AQ
 28   CONTINUE
      IF(AQ) THEN
            JNUM=JNUM-1
      ENDIF
C     ------------------------------------------------------------
      ENDIF
      RETURN
      END
C     No. 10 DJOINT
C     ---------------------------------------------------------------------

      SUBROUTINE DJOINT
      COMMON /B02/ CUBE(20,2,8),CUBERP(20,2,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 CUBE,CUBERP
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
```

```
      INTEGER IAX,LTD,TOTAL,JNUM3
      INTEGER CUBEN,V,WX,M

      LOGICAL*2 S,NS,AL,B,E,F,CK,DK,A11,A12,A13,A14,A15,A16,A17
      INTEGER VUSE,M1,QMA,LTD1
      IF(CUBENUM.GT.1) THEN
C     ----------------------------------------------------------------
      DO 215 JAMT=1,1000
           LTD1=CUBENUM
      DO 193 I50=1,LTD1
           WX(I50)=0
 193  CONTINUE
      V=NMAXTW+1
      VUSE=0
      DO 194 I51=1,LTD1
           CUBEN(I51)=5
 194  CONTINUE
C     WRITE(16,195)
C195  FORMAT(///3X,7HWeight ,8HIA :IB  ,22HDisjoint Merging
Parts//)
      IST=0
      IF(LTD1.GT.0) THEN
      DO 196 IA=1,LTD1
      IF((IA.NE.LTD1).AND.(.NOT.(IST.GT.LTD1))) THEN
           WX(LTD1)=0
           IF(IST.NE.0) THEN
                DO 197 IQ=1,IST
                     IF(CUBEN(IQ).EQ.IA) THEN
                          WX(LTD1)=1
                     ENDIF
 197            CONTINUE
           ENDIF
           IF(WX(LTD1).NE.1) THEN
C     "DO LOOP" is to prevent IA from being equal to previous
IB's.
           DO 198 IB=1,LTD1
      IF((WX(5).EQ.0).AND.(.NOT.(IST.GT.LTD1)).AND.
      1     (IB.GT.IA)) THEN
C     Generally,IB will always be greater than IA!
                KF=LTD1+1
                WX(KF)=0
C     "DO LOOP" is to prevent IB from being equal to previous
IB's.
                IF(IST.NE.0) THEN
                     DO 199 IQ=1.IST
                          IF(CUBEN(IQ).EQ.IB) THEN
                               WX(KF)=1
                          ENDIF
 199                 CONTINUE
```

```
              ENDIF
              IF(WX(KF).NE.1) THEN
C             WRITE(16,*)'CD(IA)=',CD(IA),'CD(IB)=',CD(IB)
C     COVER ROUTINE ( Weights can be greater than 1.)
              IF(IA.NE.IB) THEN
                    A16=.TRUE.
                    A17=.TRUE.
                    DO 151 KZ=1,NMAXTW
      A11=CUBE(IA,1,KZ).AND.CUBE(IA,2,KZ).AND.CUBE(IB,1,KZ).AND.
      1     CUBE(IB,2,KZ)
      A12=(.NOT.CUBE(IA,1,KZ)).AND.CUBE(IA,2,KZ).AND.(.NOT.
      1     CUBE(IB,1,KZ)).AND.CUBE(IB,2,KZ)
      A13=CUBE(IA,1,KZ).AND.(.NOT.CUBE(IA,2,KZ)).AND.
      1     CUBE(IB,1,KZ).AND.(.NOT.CUBE(IB,2,KZ))
      A14=CUBE(IA,1,KZ).AND.CUBE(IA,2,KZ)
      A15=CUBE(IB,1,KZ).AND.CUBE(IB,2,KZ)
      A16=(A11.OR.A12.OR.A13.OR.A14).AND.A16
      A17=(A11.OR.A12.OR.A13.OR.A15).AND.A17
 151                CONTINUE
C             IF(A16.OR.A17) THEN
C           WRITE(16,*)'- - - Reduction - - -'
C     WRITE(16,220)IA,((CUBE(IA,IGJ,IGK),IGJ=1,IBPP),IGK=1,NMAXTW
)
C220 FORMAT(I4,2X,4(2L1,1X))
C     WRITE(16,221)IA,((CUBE(IA,IGJ,IGK),IGJ=1,IBPP),IGK=1,NMAXTW
)
C221 FORMAT(I4,2X,4(2L1,1X))
C           WRITE(16,*)'- - - End of Reduction - - -'
C             ENDIF
              IF(A16) THEN
C     A16=T,means A covers B;Set all parts of B to FF.
C     CUBE(J,BOTH,K)=F
C     WRITE(16,*)'    REDUCT,IB=0',IA,IB
                    DO 158 JX=1,IBPP
                          DO 217 KY=1,NMAXTW
                    CUBE(IB,JX,KY)=.FALSE.
 217                      CONTINUE
 158                CONTINUE
                    IST=IST+1
                    CUBEN(IST)=IB
                    CD(IB)=0
                    GO TO 226
              ELSE IF(A17) THEN
C     A17=T,means B covers A;Set all parts of A to FF.
C     CUBE(I,BOTH,K)=F
C     WRITE(16,*)'  REDUCT,IA=0',IA,IB
                    DO 218 JX=1,IBPP
                          DO 225 KY=1,NMAXTW
                    CUBE(IA,JX,KY)=.FALSE.
```

```
 225                        CONTINUE
 218                   CONTINUE
                       IST=IST+1
                       CUBEN(IST)=IA
                       CD(IA)=0
                       GO TO 239
                  ENDIF
                  ENDIF
C                 Same Weight Cubes
C                 Adjacent Cubes;Weight differs by 1
                  QMA=CD(IA)-CD(IB)
             IF((QMA+1.EQ.0).OR.(QMA-1.EQ.0).OR.(QMA.EQ.0)) THEN
                  VUSE=0
                  DO 200 V=NMAXTW,1,-1
                       IF(VUSE.EQ.0) THEN
                            K=NMAXTW
                            DO 201 JV=1,NMAXTW
                                 K=NMAXTW+1-JV
                                 IF(K.NE.V) THEN
C       Compare Conditions
C       ----------------------
C       "DO LOOP" is to generate every part number except part v
C       (K avoids V) between original statement numbers 842-846.
C       If all parts of both cubes are the same,except part K
C       (where K=V),then a 'replacement' of these cubes will take
C       place.Thus these 2 cubes will merge into a single cube.
C       WRITE(16,202)K,V,IA,IB,IST
C202    FORMAT(1X,10HCOMPARE K=,I4,3H V=,I4,4H IA=,I4,4H IB=,I4
C       1     5H IST=,I4)
C       Compare cubes;CUBE(IA,1,K),CUBE(IA,2,K) and
C       CUBE(IB,1,K),CUBE(IB,2,K) as follows below.
C       CUBE(i,j,k) is defined in DESCEN(No. 9).
        AL=(.NOT.CUBE(IA,1,K)).AND.CUBE(IA,2,K).AND.(.NOT.
        1     CUBE(IB,1,K)).AND.CUBE(IB,2,K)
        E=CUBE(IA,1,K).AND.(.NOT.CUBE(IA,2,K))
        F=CUBE(IB,1,K).AND.(.NOT.CUBE(IB,2,K))
        B=E.AND.F
        CK=CUBE(IA,1,K).AND.CUBE(IA,2,K).AND.
        1     CUBE(IB,1,K).AND.CUBE(IB,2,K)
        DK=(.NOT.CUBE(IA,1,K)).AND.(.NOT.CUBE(IA,2,K)).OR.(.NOT.
        1     CUBE(IB,1,K)).AND.(.NOT.CUBE(IB,2,K))
C       S=Same
        S=(AL.OR.B.OR.CK).AND.(.NOT.DK)
C       WRITE(16,*)'S=SAME'
C       WRITE(16,203)WX(4),(CUBE(IA,JB,K),JB=1,2),(CUBE(IB,JB,
C       1     K),JB=1,2)
C       FORMAT(//1X,6H WX(4)=,I4,2(4X,9HCUBE(IA)=,L1),8X,2(4X,
C       1     9HCUBE(IB)=,L1))
                                      IF(S) THEN
```

```
                                WX(4)=WX(4)+1
                                      ENDIF
                                ENDIF
 201                      CONTINUE
               IF(WX(4).EQ.(NMAXTW-1)) THEN
                     VUSE=V
C      WRITE(16,*)'VUSE=V'
C      WRITE(16,204)VUSE,AL,B,CK,WX(4)
C204  FORMAT(//1X,5HVUSE=,I4,2X,2HA=,L1,2X,2HB=,L1,
C      1      2X,3HCK=,L1,2X,6HWX(4)=,I4)
                     IGH=IA
                     DO 210 IGF=1,2
C      WRITE(16,209)IGH,((CUBE(IGH,IGJ,IGK),IGJ=1,IBPP),IGK=1,NMAX
TW)
C209  FORMAT(//1X,I4,2X,4(2L1,1X))
                           IGH=IB
 210                 CONTINUE
               ENDIF
               WX(4)=0
               ENDIF
 200  CONTINUE
      ENDIF
C      GO TO IB
      IF(VUSE.NE.0) THEN
C            WRITE(16,*)'- - - Replacement - - -'
C      WRITE(16,219)IA,((CUBE(IA,IGJ,IGK),IGJ=1,IBPP),IGK=1,NMAXTW
)
C219  FORMAT(I4,2X,4(2L1,1X))
C      WRITE(16,321)IB,((CUBE(IB,IGJ,IGK),IGJ=1,IBPP),IGK=1,NMAXTW
)
C321  FORMAT(I4,2X,4(2L1,1X))
C            WRITE(16,*)'- - - End of Replacement - - -'
C            Replacement Routine
             DO 206 IKK=1,IBPP
      CUBE(IA,IKK,VUSE)=CUBE(IA,IKK,VUSE).OR.CUBE(IB,IKK,VUSE)
C            ENDDO
 206         CONTINUE
C      CD(IA),during replacement,will ALWAYS increase by 1.
             CD(IA)=CD(IA)+1
C      Cube IB is set to a weight of 0.
             DO 207 JX=1,IBPP
                   DO 208 KY=1,NMAXTW
                         CUBE(IB,JX,KY)=.FALSE.
 208               CONTINUE
 207         CONTINUE
             CD(IB)=0
C      For Disjointness.Also,CUBEN(cube number)
             M1=CD(IA)
             IST=IST+1
```

```
          CUBEN(IST)=IA
          IST=IST+1
          CUBEN(IST)=IB
          WX(5)=1
      ENDIF
 226  IV=0
 239  IV=0
      ENDIF
      ENDIF
C     Following ENDDO is for IB loop.
 198             CONTINUE
                 WX(4)=0
                 ENDIF
          ENDIF
          WX(5)=0
C     Following ENDDO is for IA loop.
 196             CONTINUE
          ENDIF
C     Remove from original list the redundant cubes that
C     have been merged.
C     DO 135 IU=1,LTD1
C     WRITE(16,138)IU,IU,((CUBE(IU,JE2,KE2),JE2=1,IBPP),KE2=1,NMA
XTW)
C138 FORMAT(//1X,I4,2X,5HCUBE(,I4,3H)= ,4(2L1,1X),1X)
C135 CONTINUE
          JNUM=0
          DO 54 IA=1,LTD1
                JNUM=JNUM+1
                DO 56 IB=1,NMAXTW
                      CUBERP(JNUM,1,IB)=CUBE(IA,1,IB)
                      CUBERP(JNUM,2,IB)=CUBE(IA,2,IB)
 56             CONTINUE
                CALL NULL
 54       CONTINUE
          CUBENUM=JNUM
          CALL RLABEL
          CALL NWD
C     DO 232 IU=1,CUBENUM
C     WRITE(16,233)IU,IU,((CUBE(IU,JE2,KE2),JE2=1,IBPP),KE2=1,NMA
XTW)
C233 FORMAT(//1X,I4,2X,5HCUBE(,I4,3H)= ,4(2L1,1X),1X)
C232 CONTINUE
C         WRITE(16,*)'    Djoint Cubes Follow '
C     DO 228 I52=1,CUBENUM
C         WRITE(16,229)I52,I52,((CUBE(I52,J,K),J=1,IBPP),K=1,NMA
XTW)
C     FORMAT(//1X,I4,7H  CUBE(,I4,3H)= ,4(2L1,1X))
C     ENDDO
C228 CONTINUE
```

```
      IF(LTD1.EQ.CUBENUM) THEN
           GO TO 224
      ELSE
C          WRITE(16,*)' LTD1=    ',LTD1,'   JAMT=',JAMT
C          WRITE(16,*)' CUBENUM=',CUBENUM,'     JAMT=',JAMT
      ENDIF
  215 CONTINUE
  224 IV=0
C     ------------------------------------------------------------
      ENDIF
      RETURN
      END
```

```
C          *** Computer Program Listing Number 3 ***
C     Subtraction Program - Working       S.FOR
C     ...................................
      COMMON /B01/ JCUBE(20,2,8)
      COMMON /B02/ CUBE(20,2,8),CUBERP(20,2,8)
      COMMON /B04/ CHART(3),SPACE(20,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2,SUBTR,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      COMMON /B39/ C1(8,1,8)
      COMMON /B40/ C2(8,1,8)

      LOGICAL*2 JCUBE
      LOGICAL*2 CUBE,CUBERP
      CHARACTER CHART,SPACE
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
```

```
      INTEGER AT,BT,PVAT,PVBT,CYLT,
      1     CACT,CPLT
      INTEGER TD,KZ,KG,NP,JCOVER,JPV,J2,SUBTR,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      LOGICAL*2 C1
      LOGICAL*2 C2
      INTEGER CT(20),BN
      IR=1
      LTD=20
      IR=4
      IVX=0
      IBPP=2
C     The bit-width of the positive part of each of 2 numbers is
two.
C     The sign part is 2 bits additional on the MSB side of each
number.
      NM=2
      NMAX=NM+2
      NMAXTW=2*NMAX
      NMP=NM+1
      NMAXZ=NMAX-1
      JNP=1+(2*NMP)
      JNT=NMAXTW
C     AT(NMAX),BT(NMAX)
      DO 29 J11=1,NMAX
            AT(J11)=1
            CT(J11)=1
 29   CONTINUE
      READ(7,30)(CHART(IA1),IA1=1,3)
 30   FORMAT(3A1)
C     CPL(i) is defined,below.  ------------------------------------------

C     Normally,arrays A1,A2,B1,B2 will each contain many
cubes;but for
C     now will contain only one cube.
C     CPL(1)=A(1).AND.B(1)
C     ---------------START UP CONDITIONS-----------------------------
```

```
C     Note:CARRY IN is '0' ( grounded ).
C     In the event of using the carry input,the arrays need to be
enlarged!
      DO 143 J3=1,NMAX
            AN=AT(J3)
            CN=CT(J3)
            JN1=J3+NMAX
            JN2=NM+NMAX
            DO 31 K=1,NMAXTW
                  A1(J3,AN,K)=.TRUE.
                  A2(J3,AN,K)=.TRUE.
                  C1(J3,CN,K)=.TRUE.
                  C2(J3,CN,K)=.TRUE.
C     Bit Redefinition.
                  IF(K.EQ.J3) THEN
C     --------------------------- A(J3)=1
C                       IF(K.GT.NM) THEN
C                             A1(J3,AN,K)=.TRUE.
C                             A2(J3,AN,K)=.FALSE.
C                       ELSE
                              A1(J3,AN,K)=.FALSE.
                              A2(J3,AN,K)=.TRUE.
C                       ENDIF
                  ELSE IF(K.EQ.JN1) THEN
C     --------------------------- C(J3)=1
C                       IF(K.GT.JN2) THEN
                              C1(J3,CN,K)=.TRUE.
                              C2(J3,CN,K)=.FALSE.
C                       ELSE
C                             C1(J3,CN,K)=.FALSE.
C                             C2(J3,CN,K)=.TRUE.
C                       ENDIF
                  ENDIF
 31         CONTINUE
C           A1(J3,AN,NMP)=.TRUE.
C           A2(J3,AN,NMP)=.FALSE.
C           A1(J3,AN,NMAX)=.TRUE.
C           A2(J3,AN,NMAX)=.FALSE.
C           C1(J3,CN,JNP)=.TRUE.
C           C2(J3,CN,JNP)=.FALSE.
C           C1(J3,CN,JNT)=.TRUE.
C           C2(J3,CN,JNT)=.FALSE.
 143  CONTINUE
      WRITE(16,*)'CUBE A INPUT'
            DO 310 KG=1,NMAX
                  AN=AT(KG)
                  DO 311 K=1,NMAXTW
      IF(A1(KG,AN,K).AND.A2(KG,AN,K)) THEN
            SPACE(KG,K)=CHART(3)
```

```
     ELSE IF(A1(KG,AN,K).AND.(.NOT.A2(KG,AN,K))) THEN
          SPACE(KG,K)=CHART(1)
     ELSE IF((.NOT.A1(KG,AN,K)).AND.A2(KG,AN,K)) THEN
          SPACE(KG,K)=CHART(2)
     ELSE
          WRITE(16,*)'    **** ERROR in CUBE A INPUT ****'
     ENDIF
 311           CONTINUE
               WRITE(16,314)KG,(SPACE(KG,IG),IG=1,NMAXTW)
 314           FORMAT(1X,I4,2X,2(4A1,2X))
 310      CONTINUE
          WRITE(16,*)'    '
          WRITE(16,*)'CUBE C INPUT'
          DO 312 KG=1,NMAX
               CN=CT(KG)
               DO 313 K=1,NMAXTW
     IF(C1(KG,CN,K).AND.C2(KG,CN,K)) THEN
          SPACE(KG,K)=CHART(3)
     ELSE IF(C1(KG,CN,K).AND.(.NOT.C2(KG,CN,K))) THEN
          SPACE(KG,K)=CHART(1)
     ELSE IF((.NOT.C1(KG,CN,K)).AND.C2(KG,CN,K)) THEN
          SPACE(KG,K)=CHART(2)
     ELSE
          WRITE(16,*)'    **** ERROR in CUBE B INPUT ****'
     ENDIF
 313           CONTINUE
               WRITE(16,314)KG,(SPACE(KG,IG),IG=1,NMAXTW)
 315           FORMAT(1X,I4,2X,2(4A1,5X))
 312      CONTINUE
C    For Subtraction Only.
C    ----------------------------------
     J2=2
     DO 134 JC=1,NMAX
     CN=CT(JC)
     PVBT(JC)=CT(JC)
     DO 300 K=1,PVBT(JC)
          DO 301 KG=1,NMAXTW
               PVB1(JC,K,KG)=C1(JC,CN,KG)
               PVB2(JC,K,KG)=C2(JC,CN,KG)
 301      CONTINUE
 300 CONTINUE
     CUBENUM=PVBT(JC)
     DO 425 K=1,CUBENUM
          DO 426 KG=1,NMAXTW
               CUBE(K,1,KG)=PVB1(JC,K,KG)
               CUBE(K,2,KG)=PVB2(JC,K,KG)
 426      CONTINUE
 425 CONTINUE
     TA=0
```

```
      CALL NEGLIS
      PVBT(JC)=CUBENUM
      DO 427 K=1,PVBT(JC)
            DO 428 KG=1,NMAXTW
                  PVB1(JC,K,KG)=CUBE(K,1,KG)
                  PVB2(JC,K,KG)=CUBE(K,2,KG)
 428        CONTINUE
 427  CONTINUE
 134  CONTINUE
C     DO 136 JC=NMP,NMAX
C           JC1=JC+NMAX
C           PVBT(JC)=1
C           DO 137 K=1,PVBT(JC)
C                 DO 139 KG=1,NMAXTW
C                       PVB1(JC,K,KG)=.TRUE.
C                       PVB2(JC,K,KG)=.TRUE.
C                       IF(KG.EQ.(JC1) THEN
C                             PVB1(JC,K,KG)=.FALSE.
C                       ENDIF
C139              CONTINUE
C137        CONTINUE
C136  CONTINUE
C     Definition of LSB
C     PVAT(1)=AT(1)
C     DO 429 K=1,PVAT(JC)
C           DO 431 KG=1,NMAXTW
C                 IF(KG.EQ.1) THEN
C                       PVA1(JC,K,1)=.FALSE.
C                       PVA2(JC,K,1)=.TRUE.
C                 ELSE IF((KG.GT.1).AND.(KG.LT.(NMAX+1))) THEN
C                       PVA1(JC,K,KG)=.TRUE.
C                       PVA2(JC,K,KG)=.FALSE.
C                 ELSE
C                       PVA1(JC,K,KG)=.TRUE.
C                       PVA2(JC,K,KG)=.TRUE.
C                 ENDIF
C431        CONTINUE
C429  CONTINUE
C     For 1st adder in subtraction,SUBTR equals 1.
      SUBTR=1
      CALL ADCUBE
C     GO TO 22
      DO 430 JC=1,NMAX
      PVBT(JC)=CACT(JC)
      DO 432 K=1,PVBT(JC)
            DO 433 KG=1,NMAXTW
                  PVB1(JC,K,KG)=CACUB1(JC,K,KG)
                  PVB2(JC,K,KG)=CACUB2(JC,K,KG)
 433        CONTINUE
```

```
 432 CONTINUE
     PVAT(JC)=AT(JC)
     DO 115 K=1,PVAT(JC)
           DO 116 KG=1,NMAXTW
                 PVA1(JC,K,KG)=A1(JC,K,KG)
                 PVA2(JC,K,KG)=A2(JC,K,KG)
 116       CONTINUE
 115 CONTINUE
 430 CONTINUE
C     For 1st adder in subtraction,SUBTR equals 1.
C     For 2nd adder in subtraction,SUBTR equals 0.
     SUBTR=0
     CALL ADCUBE
C     To find positive numbers: CACUBj=CACUBj.AND.CACUBj(1)
C     ie, CACUBj=(list of CACUBj).AND.(list of CACUBj(4) )
C     DO 434 J1=1,NMAX
C           CUBENUM=CACT(J1)
C           DO 441 K=1,CUBENUM
C                 DO 442 KG=1,NMAXTW
C                       CUBE(K,1,KG)=CACUB1(J1,K,KG)
C                       CUBE(K,2,KG)=CACUB2(J1,K,KG)
C442              CONTINUE
C441        CONTINUE
C           TA=0
C           CALL NEGLIS
C           CACT(J1)=CUBENUM
C           DO 435 K=1,CACT(J1)
C                 DO 436 KG=1,NMAXTW
C                       CACUB1(J1,K,KG)=CUBE(K,1,KG)
C                       CACUB2(J1,K,KG)=CUBE(K,2,KG)
C436              CONTINUE
C435        CONTINUE
C434 CONTINUE
                       DO 843 J1=1,NMAX
                             CPLT(J1)=CACT(J1)
                             DO 844 IU1=1,CPLT(J1)
                                   DO 845 IU2=1,NMAXTW
                             CPL1(J1,IU1,IU2)=CACUB1(J1,IU1,IU2)
                             CPL2(J1,IU1,IU2)=CACUB2(J1,IU1,IU2)
 845                               CONTINUE
 844                         CONTINUE
     WRITE(16,*)'   NMAX=',NMAX
           DO 836 IU1=1,CPLT(J1)
     WRITE(16,835)J1,(CPL1(J1,IU1,IU2),CPL2(J1,IU1,
     1      IU2),IU2=1,NMAXTW)
 835 FORMAT(1X,I4,2X,8(2L1,1X))
 836       CONTINUE
           WRITE(16,*)' '
 843                   CONTINUE
```

```
C     OUTPUT//////////////////////////////////////////////////////////////
C     AQ=.FALSE.
C     DO 62 KAB=1,NMAX
C           BQ=.FALSE.
C           ILTD=LTD+1
C     IF((.NOT.(PVAT(KAB).LT.ILTD)).AND.(.NOT.(PVBT(KAB).LT.ILTD)
).AND.
C     1     (.NOT.(CYLT(KAB).LT.ILTD)).AND.(.NOT.(CACT(KAB).LT.ILT
D)).AND.
C     2     (.NOT.(CPLT(KAB).LT.ILTD))) THEN
C           BQ=.TRUE.
C     ENDIF
C           AQ=BQ.OR.AQ
C62   CONTINUE
C     IF(.NOT.AQ) THEN
C     DO 63 IW=1,NMAX
C     TOTAL=PVAT(IW)+PVBT(IW)+CYLT(IW)+CACT(IW)+CPLT(IW)
C     WRITE(16,70)IW,IW,PVAT(IW),IW,PVBT(IW),IW,CYLT(IW),IW,CACT(
IW),
C     1     IW,CPLT(IW),TOTAL
C70   FORMAT(//1X,3HIR=,I4,2X,5HPVAT(,I4,2H)=,I4,2X,5HPVBT(,I4,2H
)=,
C     1     I4,2X,5HCYLT(,I4,2H)=,I4,2X,5HCACT(,I4,2H)=,I4,2X,5HCP
LT(,I4,2H)=,
C     2     I4,2X,6HTOTAL=,I4)
C63   CONTINUE
C     ENDIF
      WRITE(16,*)'*** NM+2 OUTPUT PIN BOOLEAN LISTS ***'
      DO 66 I49=1,NMAX
            IF(I49.EQ.4) THEN
                  WRITE(16,*)'  Sign List is below'
            ENDIF
            WRITE(16,64)I49,I49
 64   FORMAT(//1X,21H Below is List Number,I4,4H Pin,I4,I4//)
            WRITE(16,65)
 65   FORMAT(4X,3HLSB,5X,3HMSB,1X)
            IF(CPLT(I49).GT.LTD) THEN
                  CPLT(I49)=LTD
                  WRITE(16,*)' CPLT/PRINT.GT.LTD'
            ENDIF
            WRITE(16,*)'  CPLT()=',CPLT(I49)
            DO 68 KG=1,CPLT(I49)
                  DO 67 K=1,NMAXTW
      IF(CPL1(I49,KG,K).AND.CPL2(I49,KG,K)) THEN
            SPACE(KG,K)=CHART(3)
      ELSE IF(CPL1(I49,KG,K).AND.(.NOT.CPL2(I49,KG,K))) THEN
            SPACE(KG,K)=CHART(1)
      ELSE IF((.NOT.CPL1(I49,KG,K)).AND.CPL2(I49,KG,K)) THEN
```

```
           SPACE(KG,K)=CHART(2)
      ELSE
           WRITE(16,*)'    **** ERROR in Bit Cover ****'
      ENDIF
 67                  CONTINUE
                WRITE(16,69)KG,(SPACE(KG,IG),IG=1,NMAXTW)
 69             FORMAT(1X,I4,2X,2(4A1,1X))
 68        CONTINUE
 66   CONTINUE
C22   IJKL=0
C     STOP
      END
C     No. 1 Relabel
C     ------------------------------------------
      SUBROUTINE RLABEL
      COMMON /B02/ CUBE(20,2,8),CUBERP(20,2,8)
      COMMON /B19/ NEW,SUM,JNUM,NMAXX,IA2,ISHQ,Q
     1     MODE,TA,TC,NMAXTW,CUBENUM
      LOGICAL*2 CUBE,CUBERP
      INTEGER NEW,SUM,JNUM,NMAXX,IA2,ISHQ,Q
     1     MODE,TA,TC,NMAXTW,CUBENUM
C     Relabel Cubes in List.
C     Define as L1 List
      IF(CUBENUM.GT.0) THEN
C     ------------------------------------------------------------
      DO 2 JA=1,CUBENUM
           DO 4 IA=1,NMAXTW
                CUBE(JA,1,IA)=CUBERP(JA,1,IA)
                CUBE(JA,2,IA)=CUBERP(JA,2,IA)
  4        CONTINUE
  2   CONTINUE
C     ---------------------------------------------------------
      ENDIF
      RETURN
      END
C     No. 2 List AND
C     ---------------------------------------------------------
      SUBROUTINE LISAND
      COMMON /B02/ CUBE(20,2,8),CUBERP(20,2,8)
      COMMON /B09/ LCUBE(20,2,8),ACUBE(20,2,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 CUBE,CUBERP
      LOGICAL*2 LCUBE,ACUBE
```

```
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1      MODE,TA,TC,NMAXTW,CUBENUM
      INTEGER IAX,IR,LTD,TOTAL,JNUM3
      INTEGER CUBEN,V,WX,M
C     L(NEW)=L(AA).AND.L(CA)
C     L(AN) has AN cubes.
C     L(CN) has CN cubes.
C     L(j)=L(jn1),L(jn2),....
C     L(k)=L(kn1),L(kn2),....
C     Generation of RP cubes,where RP=(AN+CN).
      IF(CUBENUM.EQ.0) THEN
C           WRITE(16,*)'ERROR in before number 2'
      ENDIF
      IF(CUBENUM.GT.0) THEN
C     ------------------------------------------------------
      IF((AN.EQ.0).OR.(CN.EQ.0)) THEN
C           WRITE(16,*)'ERROR of AN&CN',AN,CN
C           GO TO end of 2!
C     WRITE(16,*)'AN&CN in LISAND=',AN,CN
      ENDIF
C     WRITE(16,*)'CN&AN',CN,AN
      JNUM=0
      DO 8 KB=1,CN
            DO 10 JB=1,AN
                  JNUM=JNUM+1
                  DO 12 IPART=1,NMAXTW
                        DO 14 IT=1,IBPP
      CUBERP(JNUM,IT,IPART)=ACUBE(JB,IT,IPART).AND.CUBE(KB,IT,IPA
RT)
 14                     CONTINUE
 12               CONTINUE
                  CALL NULL
C     WRITE(16,*)'JNUM=',JNUM
 10         CONTINUE
 8    CONTINUE
C     Determination of cubes that contain a FF and remove from
the list.
      CUBENUM=JNUM
      IF(JNUM.EQ.0) THEN
            WRITE(16,*)'2 AN&CN=',AN,CN
            DO 443 IR=1,AN
      WRITE(16,722)(ACUBE(IR,1,K1),ACUBE(IR,2,K1),K1=1,NMAXTW)
 722  FORMAT(//1X,8(2L1,1X))
 443        CONTINUE
            DO 444 IR=1,CN
      WRITE(16,838)(CUBE(IR,1,K1),CUBE(IR,2,K1),K1=1,NMAXTW)
```

```
 838 FORMAT(//1X,8(2L1,1X))
 444       CONTINUE
      ENDIF
      CALL RLABEL
C     WRITE(16,*)'CUBLISA2=',CUBENUM
      IF(CUBENUM.GT.1) THEN
           CALL DJOINT
      ENDIF
C     WRITE(16,*)'CUBLISA3=',CUBENUM
C     WRITE(16,140)
C     FORMAT(///3X,4HKMAX,3X,7HW(KMAX)///)
C     DO 141 IT1=1,KMAX
C          WRITE(16,142)IT1,W(IT1)
C142       FORMAT(2(3X,I4),1X)
C     CONTINUE
      IF(CUBENUM.EQ.0) THEN
           WRITE(16,*)'ERROR in number 2'
C          CUBENUM=1
C          DO 317 I6=1,NMAXTW
C                CUBE(1,1,I6)=.FALSE.
C                CUBE(1,1,I6)=.FALSE.
C317       CONTINUE
      ENDIF
C     ----------------------------------------------------------------
      ENDIF
      RETURN
      END
C     No. 3 LISOR
C     ----------------------------------------------------------------
      SUBROUTINE LISOR
C     2 List OR capability
C     IACT is number of cubes in ACUBE list.
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
```

```
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
      IF(CUBENUM.EQ.0) THEN
C           WRITE(16,*)'ERROR before number 3'
      ENDIF
      IF(CUBENUM.GT.0) THEN
C     ----------------------------------------------------
      IF((AN.EQ.0).OR.(CN.EQ.0)) THEN
            WRITE(16,*)'ERROR in OR AN&CN=',AN,CN
C           GO TO end of 3!
      ENDIF
C     WRITE(16,*)'AN&CN in LISOR=',AN,CN
      DO 99 I20=1,AN
            I21=I20+CN
            DO 172 K=1,NMAXTW
                  DO 173 IB=1,IBPP
      CUBE(I21,IB,K)=ACUBE(I20,IB,K)
 173              CONTINUE
 172        CONTINUE
 99   CONTINUE
      CUBENUM=AN+CN
      IF(CUBENUM.GT.1) THEN
            CALL NWD
            CALL DJOINT
      ENDIF
      IF(CUBENUM.EQ.0) THEN
C           WRITE(16,*)'ERROR IN NUMBER THREE'
      ENDIF
C     ----------------------------------------------------
      ENDIF
      RETURN
      END
C     No. 4 NEGLIS
C     ----------------------------------------------------
      SUBROUTINE NEGLIS
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      COMMON /B20/ IAX(8),IR,LTD,TOTAL,JNUM3
```

```
      COMMON /B21/ CUBEN(20),V,WX(20),M(20)
C     COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
      LOGICAL CUBRP1(8,20,8)
      LOGICAL A11,A12,A13,A14,CQ,DQ
C     To .NOT. a list
C     TC=number of cubes in list,which is in descending order by
weight.
C     TC is in common block.
C           L(1)=A(#)C(1)
C     Cubes in L should be weighted and put in descending &
disjoint order.
      IF(CUBENUM.GT.0) THEN
C     ------------------------------------------------------------
      IF(TA.EQ.0) THEN
                  JKL1=1
                  JKL2=1
C           Universe cube is created.
            IUNIV=1
            DO 36 IA=1,NMAXTW
                  DO 37 IT=1,IBPP
                        ACUBE(IUNIV,IT,IA)=.TRUE.
 37               CONTINUE
      IF((.NOT.ACUBE(1,1,IA)).AND.(.NOT.ACUBE(1,2,
      1     IA))) THEN
            WRITE(16,*)'  ACUBE is in error after 37 in #4.'
      ENDIF
 36         CONTINUE
            DO 236 JA=1,CUBENUM
                  DO 237 JH=1,NMAXTW
                        DO 238 JP=1,IBPP
                              JCUBE(JA,JP,JH)=CUBE(JA,JP,JH)
 238                    CONTINUE
 237              CONTINUE
 236        CONTINUE
      ELSE IF(TA.NE.0) THEN
            DO 38 IQ=1,TA
                  DO 39 IA=1,NMAXTW
                        DO 40 IT=1,IBPP
                              ACUBE(IQ,IT,IA)=CUBE(IQ,IT,IA)
```

```
 40                 CONTINUE
 39             CONTINUE
 38         CONTINUE
      ENDIF
C     IF(MODE.NE.1) THEN
C         LCUBE(JNUM,J,K)=ACUBE(IA,J,K)(#)JCUBE(IC,J,K)
C     Negating a cube.Generation of JTO number of cubes.
C     WRITE(16,*)' '
C     WRITE(16,*)'  cubes at start of No. 4'
C     DO 809 IT=1,CUBENUM
C     WRITE(16,808)IT,(CUBE(IT,1,K),CUBE(IT,2,K),K=1,NMAXTW)
C808  FORMAT(1X,I4,2X,8(2L1,1X))
C809  CONTINUE
C     WRITE(16,*)' '
      IAA=1
      JLCUB=CUBENUM
      DO 41 JLIST=1,JLCUB
          JNUM=0
          JGT=0
          JG=0
          DO 126 IA=1,IAA
C     If A at least partially covers J,then proceed TEST.
              CQ=.FALSE.
              DO 819 IS=1,NMAXTW
      IF((.NOT.ACUBE(IA,1,IS)).AND.(.NOT.ACUBE(IA,2,
     1    IS))) THEN
          JKL1=1+JKL1
          WRITE(16,*)'  ACUBE is in error after 819 in #4.'
          WRITE(16,*)'  JKL1=',JKL1
          WRITE(16,*)'  JKL2=',JKL2
          WRITE(16,*)'    IA=',IA
          WRITE(16,*)'    IAA=',IAA
      ENDIF
      A11=((.NOT.ACUBE(IA,1,IS)).AND.ACUBE(IA,2,IS).AND.
     1    JCUBE(JLIST,1,IS).AND.(.NOT.JCUBE(JLIST,2,IS)))
      A12=(ACUBE(IA,1,IS).AND.(.NOT.ACUBE(IA,2,IS)).AND.
     1    (.NOT.JCUBE(JLIST,1,IS)).AND.JCUBE(JLIST,2,IS))
                  DQ=.FALSE.
      IF(A11.OR.A12) THEN
                  DQ=.TRUE.
      ENDIF
                  CQ=CQ.OR.DQ
 819          CONTINUE
          IF(.NOT.CQ) THEN
C     If A at least partially covers J,then proceed.
              DO 42 IS=1,NMAXTW
                  JNUM=JNUM+1
                  DO 43 KA=1,NMAXTW
                      DO 44 IT=1,IBPP
```

```
                        IF(KA.EQ.IS) THEN
    CUBERP(JNUM,IT,KA)=ACUBE(IA,IT,KA).AND.(.NOT.JCUBE(JLIST,IT
,KA))
                        ELSE IF(KA.LT.IS) THEN
    CUBERP(JNUM,IT,KA)=ACUBE(IA,IT,KA).AND.JCUBE(JLIST,IT,KA)
                        ELSE IF(KA.GT.IS) THEN
    CUBERP(JNUM,IT,KA)=ACUBE(IA,IT,KA)
                        ENDIF
 44                     CONTINUE
 43                 CONTINUE
                    JGN=JNUM
                    CALL NULL
C           DO 447 KB=1,NMAXTW
C     IF(((.NOT.CUBERP(JNUM,1,KB)).AND.(.NOT.CUBERP(JNUM,2,
C     1     KB))).AND.(JNUM.GT.0)) THEN
C           JKL2=1+JKL2
C           WRITE(16,*)'  CUBERP is ff. in #4 at NULL'
C           WRITE(16,*)'  JKL1=',JKL1
C           WRITE(16,*)'  JKL2=',JKL2
C           WRITE(16,*)'  JNUM',JNUM
C           WRITE(16,*)'  JGN',JGN
C           WRITE(16,*)'  CUBENUM =',CUBENUM
C           WRITE(16,*)'  JLIST=',JLIST
C           WRITE(16,*)'    IA =',IA
C     ENDIF
C447        CONTINUE
 42              CONTINUE
C           IF(JLCUB.EQ.6) THEN
C     WRITE(16,*)'      CUBENUM =',CUBENUM
C     WRITE(16,*)'   JLIST above =',JLIST
C     WRITE(16,*)'    JNUM above =',JNUM
C     WRITE(16,*)'              IA =',IA
C           ENDIF
            ELSE
C           IF(JLCUB.EQ.6) THEN
C     WRITE(16,*)'   JLIST below =',JLIST
C     WRITE(16,*)'              IA =',IA
C           ENDIF
C                 Storage of A cubes that do not cover J cubes.
                  JG=JG+1
                  DO 814 KB=1,NMAXTW
                        CUBRP1(JG,1,KB)=ACUBE(IA,1,KB)
                        CUBRP1(JG,2,KB)=ACUBE(IA,2,KB)
      IF((.NOT.ACUBE(IA,1,KB)).AND.(.NOT.ACUBE(IA,2,
      1     KB))) THEN
            WRITE(16,*)'  ACUBE is in error after 814 in #4.'
            IF(JG.GT.20) THEN
                  WRITE(16,*)'  JG=',JG
            ENDIF
```

```
      ENDIF
 814              CONTINUE
                  JGT=JG
         ENDIF
 126     CONTINUE
                    IAA=JNUM
                    DO 234 JH=1,IAA
                          JG=JG+1
                          DO 235 KB=1,NMAXTW
                    ACUBE(JG,1,KB)=CUBERP(JH,1,KB)
                    ACUBE(JG,2,KB)=CUBERP(JH,2,KB)
      IF((.NOT.ACUBE(JG,1,KB)).AND.(.NOT.ACUBE(JG,2,
      1     KB))) THEN
            WRITE(16,*)'  ACUBE is in error after 235 in #4.'
            WRITE(16,*)'  JNUM=',JNUM
            WRITE(16,*)'   JG=',JG
      ENDIF
 235                      CONTINUE
 234                CONTINUE
                    IAA=JGT
                    JG=0
                    DO 815 JH=1,IAA
                          JG=JG+1
                          DO 816 KB=1,NMAXTW
                    ACUBE(JG,1,KB)=CUBRP1(JH,1,KB)
                    ACUBE(JG,2,KB)=CUBRP1(JH,2,KB)
C     The error of ACUBE being ff first appears here - why?
C     IAA=JGT=9, JG=1
C     May be common block problems.

      IF((.NOT.ACUBE(JG,1,KB)).AND.(.NOT.ACUBE(JG,2,
      1     KB))) THEN
            WRITE(16,*)'  ACUBE is in error after 816 in #4.'
            WRITE(16,*)'   JGT=',JGT
            WRITE(16,*)'   JG=',JG
      ENDIF
 816                      CONTINUE
 815                CONTINUE
                    IAA=JNUM+JGT
C     DO 446 JG=1,IAA
C              CUBE(JG,1,KB)=ACUBE(JG,1,KB)
C              CUBE(JG,2,KB)=ACUBE(JG,2,KB)
C     IF((.NOT.CUBE(JG,1,KB)).AND.(.NOT.CUBE(JG,2,KB))) THEN
C           WRITE(16,*)'  CACUBj is ff. in #4'
C           WRITE(16,*)'  JG=',JG
C           WRITE(16,*)'  JLIST=',JLIST
C           WRITE(16,*)'  JNUM=',JNUM
C           WRITE(16,*)'  JGT=',JGT
C     ENDIF
```

```
C446 CONTINUE
C          IF(JLCUB.EQ.6) THEN
C     WRITE(16,*)'   IAA =',IAA
C     WRITE(16,*)'   JLIST at 41 =',JLIST
C          ENDIF
 41        CONTINUE
           CUBENUM=IAA
C     Relabel Cubes in list.
C     Define as L1 List.
      DO 811 JG=1,CUBENUM
           DO 812 KB=1,NMAXTW
                CUBE(JG,1,KB)=ACUBE(JG,1,KB)
                CUBE(JG,2,KB)=ACUBE(JG,2,KB)
 812       CONTINUE
 811  CONTINUE
C     WRITE(16,*)' '
C     WRITE(16,*)'  cube after 811 '
C     DO 817 IT=1,CUBENUM
C     WRITE(16,818)IT,(CUBE(IT,1,K),CUBE(IT,2,K),K=1,NMAXTW)
C818  FORMAT(1X,I4,2X,8(2L1,1X))
C817  CONTINUE
C     WRITE(16,*)' '
           IF((CUBENUM.EQ.0).OR.(CUBENUM.GT.LTD)) THEN
                GO TO 242
           ENDIF
           IF(CUBENUM.GT.1) THEN
                CALL NWD
                CALL DJOINT
           ENDIF
      IF((CUBENUM.EQ.0).OR.(CUBENUM.GT.LTD)) THEN
           GO TO 191
      ENDIF
C     ENDIF
C     Next weigh,remove null cubes,and order in descending
disjoint cubes.
C     IF(CUBENUM.GT.1) THEN
C          CALL NWD
C          CALL DJOINT
C     ENDIF
 191  IV=0
 242  IV=0
      IF((CUBENUM.EQ.0).OR.(CUBENUM.GT.LTD)) THEN
           CUBENUM=5
C          WRITE(16,*)'   END OF NEGLIS =5 ERROR'
      ELSE IF(CUBENUM.EQ.0) THEN
C          WRITE(16,*)'  ERROR in number 4'
      ENDIF
C     ----------------------------------------------------------------
      ENDIF
```

```
      RETURN
      END
C     No. 5 Add two Cubes.
C     ----------------------------------------------------------
      SUBROUTINE ADCUBE
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
      1     CACT(20),CPLT(20)
      COMMON /B23/ TD,KZ,KG,NP,JCOVER,JPV,J2,SUBTR,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
      1     CACT,CPLT
      INTEGER TD,KZ,KG,NP,JCOVER,JPV,J2,SUBTR,IVX
      LOGICAL*2 PVA1
```

```
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      INTEGER N
C     Addition ( 2 (O-Cube))
      IVX=0
C     C(1)=0
C     Each input N(J) cube=U.
      IF(CUBENUM.GT.0) THEN
C     ----------------------------------------------------------------
      DO 57 J=1,NMAX
           JPV=J
           JPVP=JPV+1
           JN=NMAX+J
           J1=J+1
           IF(IVX.EQ.0) THEN
C     ------------------- Odd Adder Stage--------------------
                IF(J.EQ.1) THEN
                     IF(SUBTR.EQ.1) THEN
                          PVAT(J)=1
                          DO 18 IU1=1,PVAT(J)
                               DO 58 IU2=1,NMAXTW
                                    PVA1(J,IU1,IU2)=.FALSE.
                                    PVA2(J,IU1,IU2)=.TRUE.
 58                            CONTINUE
 18                       CONTINUE
                     ENDIF
C     ---------------------------------CYLj(in)=0-----------------------------
C              . C(J1)=.NOT.(PVA(J).AND.PVB(J))
C                ------------------------------------------
                     AN=PVAT(J)
                     DO 45 J7=1,AN
                          DO 46 K=1,NMAXTW
                     ACUBE(J7,1,K)=PVA1(J,J7,<)
                     ACUBE(J7,2,K)=PVA2(J,J7,<)
 46                       CONTINUE
 45                  CONTINUE
                     CN=PVBT(J)
C                    IF((J2.EQ.2).AND.(J.EQ.1)) THEN
C                         WRITE(16,*)'  PVBT(1)=',PVBT(J)
```

```
C                    ENDIF
                     DO 47 J7=1,CN
                          DO 48 K=1,NMAXTW
                     CUBE(J7,1,K)=PVB1(J,J7,K)
                     CUBE(J7,2,K)=PVB2(J,J7,K)
 48                       CONTINUE
C                    IF((J2.EQ.2).AND.(JPV.EQ.1)) THEN
C                    ENDIF
 47                  CONTINUE

C     WRITE(16,723)(ACUBE(1,1,K1),ACUBE(1,2,K1),K1=1,NMAXTW)
C723  FORMAT(1X,8(2L1,1X))
                     CALL LISAND
C     IF(CUBENUM.EQ.0) THEN
C          WRITE(16,*)'ERROR AN&CN=',AN,CN
C     ENDIF
                     TA=0
                     CALL NEGLIS
                     CYLT(J1)=CUBENUM
                     DO 49 J7=1,CYLT(J1)
                          DO 50 K=1,NMAXTW
                     CYL1(JPVP,J7,K)=CUBE(J7,1,K)
                     CYL2(JPVP,J7,K)=CUBE(J7,2,K)
 50                       CONTINUE
 49                  CONTINUE
C               S(J)=(PVA(J).OR.PVB(J)).AND.C(J1))
C               ------------------------------------------
                     AN=PVAT(J)
C                    IF((J2.EQ.2).AND.(J.EQ.1)) THEN
C                         WRITE(16,*)'  PVAT(1)=',PVAT(J)
C                    ENDIF
                     DO 51 J7=1,AN
                          DO 76 K=1,NMAXTW
                     ACUBE(J7,1,K)=PVA1(J,J7,K)
                     ACUBE(J7,2,K)=PVA2(J,J7,K)
 76                       CONTINUE
C                    IF((J2.EQ.2).AND.(JPV.EQ.1)) THEN
C     WRITE(16,840)J7,(PVA1(J,J7,K),PVA2(J,J7,K),
C     1    K=1,NMAXTW)
C840  FORMAT(1X,I4,2X,8(2L1,1X))
C                    ENDIF
 51                  CONTINUE
                     CN=PVBT(J)
C                    IF((J2.EQ.2).AND.(J.EQ.1)) THEN
C                         WRITE(16,*)'  PVBT(1)=',PVBT(J)
C                    ENDIF
                     DO 83 J7=1,CN
                          DO 84 K=1,NMAXTW
                     CUBE(J7,1,K)=PVB1(J,J7,K)
```

```
                    CUBE(J7,2,K)=PVB2(J,J7,K)
 84                      CONTINUE
C                   IF((J2.EQ.2).AND.(JPV.EQ.1)) THEN
C     WRITE(16,841)J7,(PVB1(J,J7,K),PVB2(J,J7,K),
C     1     K=1,NMAXTW)
C841  FORMAT(1X,I4,2X,8(2L1,1X))
C                   ENDIF
 83                 CONTINUE
                    CALL LISOR
                    AN=CYLT(JPVP)
                    DO 85 J7=1,AN
                         DO 86 K=1,NMAXTW
                    ACUBE(J7,1,K)=CYL1(JPVP,J7,K)
                    ACUBE(J7,2,K)=CYL2(JPVP,J7,K)
 86                      CONTINUE
 85                 CONTINUE
                    CN=CUBENUM
                    CALL LISAND
                    CACT(J)=CUBENUM
C                   IF((J2.EQ.2).AND.(J.EQ.1)) THEN
C                        WRITE(16,*)'   CACT(1)=',CACT(J)
C                   ENDIF
                    DO 87 J7=1,CACT(J)
                         DO 88 K=1,NMAXTW
                    CACUB1(JPV,J7,K)=CUBE(J7,1,K)
                    CACUB2(JPV,J7,K)=CUBE(J7,2,K)
 88                      CONTINUE
 87                 CONTINUE
               ELSE
                    CALL CARRY
                    CALL SJ
               ENDIF
               IVX=1
          ELSE
C     -------------------Even Adder Stage-------------------------
C              A(J)=.NOT.A(J)
C              B(J)=.NOT.B(J)
      IF(SUBTR.EQ.0) THEN
               CUBENUM=PVAT(J)
               DO 161 IU1=1,CUBENUM
                    DO 162 IU2=1,NMAXTW
               CUBE(IU1,1,IU2)=PVA1(J,IU1,IU2)
               CUBE(IU1,2,IU2)=PVA2(J,IU1,IU2)
 162                CONTINUE
 161           CONTINUE
               TA=0
               CALL NEGLIS
               PVAT(J)=CUBENUM
               DO 163 IU1=1,PVAT(J)
```

```
                DO 164 IU2=1,NMAXTW
            PVA1(J,IU1,IU2)=CUBE(IU1,1,IU2)
            PVA2(J,IU1,IU2)=CUBE(IU1,2,IU2)
 164            CONTINUE
 163        CONTINUE
       ELSE IF(SUBTR.EQ.1) THEN
            PVAT(J)=1
            DO 828 IU1=1,PVAT(J)
                DO 829 IU2=1,NMAXTW
                      PVA1(J,IU1,IU2)=.TRUE.
                      PVA2(J,IU1,IU2)=.TRUE.
                      IF(IU2.LT.J) THEN
                           PVA2(J,IU1,IU2)=.FALSE.
                      ELSE IF(IU2.EQ.J) THEN
                           PVA1(J,IU1,IU2)=.FALSE.
                      ENDIF
 829            CONTINUE
 828        CONTINUE
       ENDIF
            CUBENUM=PVBT(J)
            DO 165 IU1=1,CUBENUM
                DO 166 IU2=1,NMAXTW
            CUBE(IU1,1,IU2)=PVB1(J,IU1,IU2)
            CUBE(IU1,2,IU2)=PVB2(J,IU1,IU2)
 166            CONTINUE
 165        CONTINUE
            TA=0
            CALL NEGLIS
            PVBT(J)=CUBENUM
            DO 167 IU1=1,PVBT(J)
                DO 168 IU2=1,NMAXTW
            PVB1(J,IU1,IU2)=CUBE(IU1,1,IU2)
            PVB2(J,IU1,IU2)=CUBE(IU1,2,IU2)
 168            CONTINUE
 167        CONTINUE
            CALL CARRY
            CALL SJ
C           S(J)=.NOT.S(J)
            CUBENUM=CACT(J)
            DO 826 IU1=1,CUBENUM
                DO 827 K=1,NMAXTW
            CUBE(IU1,1,K)=CACUB1(J,IU1,K)
            CUBE(IU1,2,K)=CACUB2(J,IU1,K)
 827            CONTINUE
 826        CONTINUE
            TA=0
            CALL NEGLIS
            CACT(J)=CUBENUM
            DO 303 IU1=1,CACT(J)
```

```
                DO 304 K=1.NMAXTW
            CACUB1(J,IU1,K)=CUBE(IU1,1,K)
            CACUB2(J,IU1,K)=CUBE(IU1,2,K)
 304            CONTINUE
 303        CONTINUE
            IVX=0
        ENDIF

 57   CONTINUE
C305  IV=0
C22   IV=0
      IF(CUBENUM.EQ.0) THEN
           WRITE(16,*)' Error in 5'
      ENDIF
C     ------------------------------------------------------------
      ENDIF
C     IF(J.GT.2) THEN
C     WRITE(16,*)'  J=',J
C     WRITE(16,*)'  GO TO 21'
C          GO TO 21
C     ENDIF
C21   IJKL=0
      RETURN
      END
C     No. 6 CARRY
C     ------------------------------------------------------------
      SUBROUTINE CARRY
C     C(J1) Binary Routine
      COMMON /B01/ JCUBE(20,2,8)
      COMMON /B02/ CUBE(20,2,8),CUBERP(20,2,8)
      COMMON /B09/ LCUBE(20,2,8).ACUBE(20,2,8)
      COMMON /B14/ CYL1(16,20,8)
      COMMON /B15/ CYL2(16,20,8)
      COMMON /B16/ AQ.BQ
      COMMON /B18/ AN,CN,JTOL,NMAX,IBPP,KCDA,KMAX,W(20),C(20),
     1     CD(20),A.CM(20)
      COMMON /B19/ NEW,SUM,JNUM,NMAXX,IA2,ISHQ,Q
     1     MODE,TA,TC,NMAXTW.CUBENUM
      COMMON /B20/ 1AX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2,SUBTR,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
```

```
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2,SUBTR,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      IF(CUBENUM.GT.0) THEN
C     ----------------------------------------------------------------
      IR=6
      JPVP=JPV+1
C     ------------------------------------------------------801 below:
      IF(((IVX.EQ.1).AND.(SUBTR.EQ.1)).OR.(SUBTR.EQ.0)) THEN
      AN=PVAT(JPV)
      DO 97 IT=1,AN
           DO 98 K=1,NMAXTW
                ACUBE(IT,1,K)=PVA1(JPV,IT,K)
                ACUBE(IT,2,K)=PVA2(JPV,IT,K)
 98        CONTINUE
 97   CONTINUE
      CN=CYLT(JPV)
```

```
      DO 60 IT=1,CN
            DO 61 K=1,NMAXTW
                  CUBE(IT,1,K)=CYL1(JPV,IT,K)
                  CUBE(IT,2,K)=CYL2(JPV,IT,K)
 61         CONTINUE
 60   CONTINUE
C     WRITE(16,*)'JPV=',JPV,'  before LISAND1 in CARRY'
      CALL LISAND
C     WRITE(16,*)'JPV=',JPV,'  after LISAND1 in CARRY'
      CYLT(JPVP)=CUBENUM
      DO 32 IT=1,CYLT(JPVP)
            DO 34 K=1,NMAXTW
      CYL1(JPVP,IT,K)=CUBE(IT,1,K)
      CYL2(JPVP,IT,K)=CUBE(IT,2,K)
 34         CONTINUE
 32   CONTINUE
C     ---------------------------------------------------602 below:
      AN=PVBT(JPV)
      DO 117 IT=1,AN
            DO 169 K=1,NMAXTW
      ACUBE(IT,1,K)=PVB1(JPV,IT,K)
      ACUBE(IT,2,K)=PVB2(JPV,IT,K)
 169        CONTINUE
 117  CONTINUE
      CN=PVAT(JPV)
      DO 100 IT=1,CN
            DO 118 K=1,NMAXTW
      CUBE(IT,1,K)=PVA1(JPV,IT,K)
      CUBE(IT,2,K)=PVA2(JPV,IT,K)
 118        CONTINUE
 100  CONTINUE
C     WRITE(16,*)'JPV=',JPV,'  before LISAND2 in CARRY'
      CALL LISAND
C     WRITE(16,*)'JPV=',JPV,'  after LISAND2 in CARRY'
      IF(CUBENUM.EQ.0) THEN
C           WRITE(16,*)'ERROR above 119 SIX'
      ENDIF
      AN=CYLT(JPVP)
      DO 119 IT=1,AN
            DO 120 K=1,NMAXTW
      ACUBE(IT,1,K)=CYL1(JPVP,IT,K)
      ACUBE(IT,2,K)=CYL2(JPVP,IT,K)
 120        CONTINUE
 119  CONTINUE
      CN=CUBENUM
      CALL LISOR
      IF(CUBENUM.EQ.0) THEN
C           WRITE(16,*)'ERROR above 121 SIX'
      ENDIF
```

```
      CYLT(JPVP)=CUBENUM
      DO 121 IT=1,CYLT(JPVP)
            DO 122 K=1,NMAXTW
      CYL1(JPVP,IT,K)=CUBE(IT,1,K)
      CYL2(JPVP,IT,K)=CUBE(IT,2,K)
 122        CONTINUE
 121  CONTINUE
      ENDIF
C     ---------------------------------------------G03 below:
      AN=CYLT(JPV)
      DO 149 IT=1,AN
            DO 150 K=1,NMAXTW
                  ACUBE(IT,1,K)=CYL1(JPV,IT,K)
                  ACUBE(IT,2,K)=CYL2(JPV,IT,K)
 150        CONTINUE
 149  CONTINUE
      CN=PVBT(JPV)
      DO 240 IT=1,CN
            DO 123 K=1,NMAXTW
                  CUBE(IT,1,K)=PVB1(JPV,IT,K)
                  CUBE(IT,2,K)=PVB2(JPV,IT,K)
 123        CONTINUE
 240  CONTINUE
C     WRITE(16,*)'JPV=',JPV,'  before LISAND3 in CARRY'
      CALL LISAND
C     WRITE(16,*)'JPV=',JPV,'  after LISAND3 in CARRY'
      IF(((IVX.EQ.1).AND.(SUBTR.EQ.1)).OR.(SUBTR.EQ.0)) THEN
      AN=CYLT(JPVP)
      DO 170 IT=1,AN
            DO 171 K=1,NMAXTW
      ACUBE(IT,1,K)=CYL1(JPVP,IT,K)
      ACUBE(IT,2,K)=CYL2(JPVP,IT,K)
 171        CONTINUE
 170  CONTINUE
      CN=CUBENUM
      CALL LISOR
C     WRITE(16,*)' '
C     WRITE(16,*)'  Carry Before calling .NOT.'
C     DO 824 IT=1,CUBENUM
C     WRITE(16,842)IT,(CUBE(IT,1,K),CUBE(IT,2,K),K=1,NMAXTW)
C842  FORMAT(1X,I4,2X,8(2L1,1X))
C824  CONTINUE
C     WRITE(16,*)' '
C     WRITE(16,*)' '
      ENDIF
      TA=0
      CALL NEGLIS
C     WRITE(16,*)' '
C     WRITE(16,*)'  Carry After NOT - JPV=',JPV
```

```
      CYLT(JPVP)=CUBENUM
      DO 124 IT=1,CYLT(JPVP)
            DO 125 K=1,NMAXTW
      CYL1(JPVP,IT,K)=CUBE(IT,1,K)
      CYL2(JPVP,IT,K)=CUBE(IT,2,K)
 125        CONTINUE
C                          IF(JPV.EQ.2) THEN
C     WRITE(16,833)IT,(CYL1(JPVP,IT,K),CYL2(JPVP,IT,K),
C     1     K=1,NMAXTW)
C833 FORMAT(1X,I4,2X,8(2L1,1X))
C                          ENDIF
 124 CONTINUE
C     WRITE(16,*)' '
C     WRITE(16,*)' '
C     CYL(J1)=CYLj(JPVP) is defined.
      IF(CUBENUM.EQ.0) THEN
C           WRITE(16,*)'ERROR IN NUMBER SIX'
      ENDIF
C     ----------------------------------------------------------
      ENDIF
      RETURN
      END
C     No. 7 SJ
C     ----------------------------------------------------------
      SUBROUTINE SJ
C     SJ=CACUB
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
      1     CACT(20),CPLT(20)
      COMMON /B23/ TD,KZ,KG,NP,JCOVER,JPV,J2,SUBTR,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
```

```
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
      1     CACT,CPLT
      INTEGER TD,KZ,KG,NP,JCOVER,JPV,J2,SUBTR,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      IF(CUBENUM.GT.0) THEN
C     -----------------------------------------------------------
      IR=7
      JPVP=JPV+1
C     2nd term of S(J)
      IF(((IVX.EQ.1).AND.(SUBTR.EQ.1)).OR.(SUBTR.EQ.0)) THEN
      AN=PVAT(JPV)
      DO 127 IT=1,AN
           DO 175 K=1,NMAXTW
      ACUBE(IT,1,K)=PVA1(JPV,IT,K)
      ACUBE(IT,2,K)=PVA2(JPV,IT,K)
 175       CONTINUE
 127  CONTINUE
      CN=PVBT(JPV)
      DO 133 IT=1,CN
           DO 135 K=1,NMAXTW
```

```
      CUBE(IT,1,K)=PVB1(JPV,IT,K)
      CUBE(IT,2,K)=PVB2(JPV,IT,K)
 135        CONTINUE
 133  CONTINUE
      CALL LISOR
      ELSE IF((IVX.EQ.0).AND.(SUBTR.EQ.1)) THEN
            CN=PVBT(JPV)
            DO 830 IT=1,CN
                  DO 831 K=1,NMAXTW
            CUBE(IT,1,K)=PVB1(JPV,IT,K)
            CUBE(IT,2,K)=PVB2(JPV,IT,K)
 831              CONTINUE
 830        CONTINUE
      ENDIF
      AN=CYLT(JPV)
      DO 145 IT=1,CYLT(JPV)
            DO 146 K=1,NMAXTW
      ACUBE(IT,1,K)=CYL1(JPV,IT,K)
      ACUBE(IT,2,K)=CYL2(JPV,IT,K)
 146        CONTINUE
 145  CONTINUE
      CN=CUBENUM
      CALL LISOR
C     ----------------------Including 1st term of S(J)
      AN=CYLT(JPVP)
      DO 71 IT=1,AN
            DO 74 K=1,NMAXTW
      ACUBE(IT,1,K)=CYL1(JPVP,IT,K)
      ACUBE(IT,2,K)=CYL2(JPVP,IT,K)
 74         CONTINUE
 71   CONTINUE
      CN=CUBENUM
      CALL LISAND
      CACT(JPV)=CUBENUM
      DO 147 IT=1,CACT(JPV)
            DO 148 K=1,NMAXTW
      CACUB1(JPV,IT,K)=CUBE(IT,1,K)
      CACUB2(JPV,IT,K)=CUBE(IT,2,K)
 148        CONTINUE
 147  CONTINUE
C     ---------------3rd term
      IF(((IVX.EQ.1).AND.(SUBTR.EQ.1)).OR.(SUBTR.EQ.0)) THEN
      AN=PVAT(JPV)
      DO 75 IT=1,AN
            DO 152 K=1,NMAXTW
      ACUBE(IT,1,K)=PVA1(JPV,IT,K)
      ACUBE(IT,2,K)=PVA2(JPV,IT,K)
 152        CONTINUE
 75   CONTINUE
```

```
      CN=PVBT(JPV)
      DO 76 IT=1,CN
            DO 153 K=1,NMAXTW
      CUBE(IT,1,K)=PVB1(JPV,IT,K)
      CUBE(IT,2,K)=PVB2(JPV,IT,K)
 153        CONTINUE
 76   CONTINUE
      CALL LISAND
      AN=CYLT(JPV)
      DO 154 IT=1,AN
            DO 155 K=1,NMAXTW
      ACUBE(IT,1,K)=CYL1(JPV,IT,K)
      ACUBE(IT,2,K)=CYL2(JPV,IT,K)
 155        CONTINUE
 154  CONTINUE
      CN=CUBENUM
      CALL LISAND
C     ----------------------------------Combine ALL
      AN=CACT(JPV)
      DO 156 IT=1,CACT(JPV)
            DO 157 K=1,NMAXTW
      ACUBE(IT,1,K)=CACUB1(JPV,IT,K)
      ACUBE(IT,2,K)=CACUB2(JPV,IT,K)
 157        CONTINUE
 156  CONTINUE
      CN=CUBENUM
      CALL LISOR
      CACT(JPV)=CUBENUM
      DO 159 IT=1,CACT(JPV)
            DO 160 K=1,NMAXTW
      CACUB1(JPV,IT,K)=CUBE(IT,1,K)
      CACUB2(JPV,IT,K)=CUBE(IT,2,K)
 160        CONTINUE
 159  CONTINUE
      ENDIF
      IF(CUBENUM.EQ.0) THEN
            WRITE(16,*)'ERROR IN NUMBER SEVEN'
      ENDIF
C22   IJKL=0
C     -------------------------------------------------------------
      ENDIF
C     GO TO 23
C23   IJKL=0
      RETURN
      END
C     No. 8 NWD means null,weight,and descend.
C     -------------------------------------------------------------
      SUBROUTINE NWD
      COMMON /B02/ CUBE(20,2,8),CUBERP(20,2,8)
```

```
      COMMON /B16/ AQ,BQ
      COMMON /B18/ AN,CN,JTOL,NMAX,IBPP,KCDA,KMAX,W(20),C(20),
      1     CD(20),A,CM(20)
      COMMON /B19/ NEW,SUM,JNUM,NMAXX,IA2,ISHQ,Q
      1     MODE,TA,TC,NMAXTW,CUBENUM
      LOGICAL*2 CUBE,CUBERP
      LOGICAL*2 AQ,BQ
      INTEGER AN,CN,JTOL,NMAX,IBPP,KCDA,KMAX,W,C,
      1     CD,A,CM
      INTEGER NEW,SUM,JNUM,NMAXX,IA2,ISHQ,Q
      1     MODE,TA,TC,NMAXTW,CUBENUM
      IF(CUBENUM.GT.0) THEN
C     ------------------------------------------------------------
C     Remove null cube routine.
C     If any part is FF then remove cube from list.
      JNUM=0
      DO 53 IM=1,CUBENUM
            JNUM=JNUM+1
            DO 55 KB=1,NMAXTW
                  CUBERP(JNUM,1,KB)=CUBE(IM,1,KB)
                  CUBERP(JNUM,2,KB)=CUBE(IM,2,KB)
 55         CONTINUE
            CALL NULL
 53   CONTINUE
      CUBENUM=JNUM
C     SUBROUTINE WEIGHT
      DO 710 I8=1,CUBENUM
            SUM=0
            DO 72 K8=1,NMAXTW
                  DO 73 J8=1,IBPP
                        IF(CUBERP(I8,J8,K8)) THEN
                              SUM=SUM+1
                        ENDIF
 73               CONTINUE
 72         CONTINUE
            C(I8)=SUM
 710  CONTINUE
C     SUBROUTINE DESCEN
      DO 77 I8=1,CUBENUM
            CM(I8)=C(I8)
 77   CONTINUE
      KMAX=0
      KCD=0
      DO 78 K8=1,CUBENUM
            KAA=0
            DO 79 J8=1,CUBENUM
                  IF(KAA.LT.CM(J8)) THEN
                        KAA=CM(J8)
                  ENDIF
```

```
 79         CONTINUE
C           W(K8)=maximum value of the heaviest cube.
            W(K8)=KAA
            KCDA=0
            DO 80 J8=1,CUBENUM
                  IF(KCDA.EQ.0) THEN
                        IF(W(K8).EQ.CM(J8)) THEN
                              CM(J8)=0
                              KMAX=KMAX+1
                              KCD=KCD+1
                              KCDA=1
                  IF((KCD.EQ.CUBENUM).OR.(KCD.LT.CUBENUM)) THEN
                        CD(KCD)=C(J8)
                        DO 81 L38=1,NMAXTW
                              DO 82 L28=1,IBPP
                  CUBE(KCD,L28,L38)=CUBERP(J8,L28,L38)
 82                           CONTINUE
 81                     CONTINUE
                  ENDIF
                        ENDIF
                  ENDIF
 80         CONTINUE
 78   CONTINUE
C     ----------------------------------------------------------------
      ENDIF
      RETURN
      END
C     No. 9 NULL.To be called immediately after a cube is
created.
C     ----------------------------------------------------------------------

      SUBROUTINE NULL
      COMMON /B02/ CUBE(20,2,8),CUBERP(20,2,8)
      COMMON /B16/ AQ,BQ
      COMMON /B19/ NEW,SUM,JNUM,NMAXX,IA2,ISHQ,Q
      1     MODE,TA,TC,NMAXTW,CUBENUM
      LOGICAL*2 CUBE,CUBERP
      LOGICAL*2 AQ,BQ
      INTEGER NEW,SUM,JNUM,NMAXX,IA2,ISHQ,Q
      1     MODE,TA,TC,NMAXTW,CUBENUM
C     Remove null cube routine.
C     If any part is FF,then remove cube from list.
      IF(CUBENUM.GT.0) THEN
C     ----------------------------------------------------------------
      AQ=.FALSE.
      DO 28 KAJ=1,NMAXTW
            BQ=.FALSE.
C           AQ is true if PART is FF.
            JW=JNUM
```

```
      IF(.NOT.CUBERP(JW,1,KAJ).AND.(.NOT.CUBERP(JW,2,
     1     KAJ))) THEN
           BQ=.TRUE.
      ENDIF
           AQ=BQ.OR.AQ
   28 CONTINUE
      IF(AQ) THEN
           JNUM=JNUM-1
      ENDIF
C     ------------------------------------------------------------------
      ENDIF
      RETURN
      END
C     No. 10 DJOINT
C     ----------------------------------------------------------------------------

      SUBROUTINE DJOINT
      COMMON /B02/ CUBE(20,2,8),CUBERP(20,2,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 CUBE,CUBERP
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,LTD,TOTAL,JNUM3
      INTEGER CUBEN,V,WX,M

      LOGICAL*2 S,NS,AL,B,E,F,CK,DK,A11,A12,A13,A14,A15,A16,A17
      INTEGER VUSE,M1,QMA,LTD1
      IF(CUBENUM.GT.1) THEN
C     ----------------------------------------------------------------------------
      DO 215 JAMT=1,1000
           LTD1=CUBENUM
      DO 193 I50=1,LTD1
           WX(I50)=0
  193 CONTINUE
      V=NMAXTW+1
      VUSE=0
      DO 194 I51=1,LTD1
           CUBEN(I51)=5
  194 CONTINUE
C     WRITE(16,195)
```

```
C195 FORMAT(///3X,7HWeight ,8HIA :IB  ,22HDisjoint Merging
Parts//)
      IST=0
      IF(LTD1.GT.0) THEN
      DO 196 IA=1,LTD1
      IF((IA.NE.LTD1).AND.(.NOT.(IST.GT.LTD1))) THEN
            WX(LTD1)=0
            IF(IST.NE.0) THEN
                  DO 197 IQ=1,IST
                        IF(CUBEN(IQ).EQ.IA) THEN
                              WX(LTD1)=1
                        ENDIF
 197              CONTINUE
            ENDIF
            IF(WX(LTD1).NE.1) THEN
C     "DO LOOP" is to prevent IA from being equal to previous
IB's.
            DO 198 IB=1,LTD1
      IF((WX(5).EQ.0).AND.(.NOT.(IST.GT.LTD1)).AND.
      1     (IB.GT.IA)) THEN
C     Generally,IB will always be greater than IA!
                  KF=LTD1+1
                  WX(KF)=0
C     "DO LOOP" is to prevent IB from being equal to previous
IB's.
                  IF(IST.NE.0) THEN
                        DO 199 IQ=1,IST
                              IF(CUBEN(IQ).EQ.IB) THEN
                                    WX(KF)=1
                              ENDIF
 199                    CONTINUE
                  ENDIF
                  IF(WX(KF).NE.1) THEN
C                 WRITE(16,*)'CD(IA)=',CD(IA),'CD(IB)=',CD(IB)
C     COVER ROUTINE ( Weights can be greater than 1.)
                  IF(IA.NE.IB) THEN
                        A16=.TRUE.
                        A17=.TRUE.
                        DO 151 KZ=1,NMAXTW
     A11=CUBE(IA,1,KZ).AND.CUBE(IA,2,KZ).AND.CUBE(IB,1,KZ).AND.
     1     CUBE(IB,2,KZ)
     A12=(.NOT.CUBE(IA,1,KZ)).AND.CUBE(IA,2,KZ).AND.(.NOT.
     1     CUBE(IB,1,KZ)).AND.CUBE(IB,2,KZ)
     A13=CUBE(IA,1,KZ).AND.(.NOT.CUBE(IA,2,KZ)).AND.
     1     CUBE(IB,1,KZ).AND.(.NOT.CUBE(IB,2,KZ))
     A14=CUBE(IA,1,KZ).AND.CUBE(IA,2,KZ)
     A15=CUBE(IB,1,KZ).AND.CUBE(IB,2,KZ)
     A16=(A11.OR.A12.OR.A13.OR.A14).AND.A16
     A17=(A11.OR.A12.OR.A13.OR.A15).AND.A17
```

```
 151                   CONTINUE
C               IF(A16.OR.A17) THEN
C          WRITE(16,*)'- - - Reduction - - -'
C     WRITE(16,220)IA,((CUBE(IA,IGJ,IGK),IGJ=1,IBPP),IGK=1,NMAXTW
)
C220 FORMAT(I4,2X,8(2L1,1X))
C     WRITE(16,221)IA,((CUBE(IA,IGJ,IGK),IGJ=1,IBPP),IGK=1,NMAXTW
)
C221 FORMAT(I4,2X,8(2L1,1X))
C          WRITE(16,*)'- - - End of Reduction - - -'
C               ENDIF
                IF(A16) THEN
C     A16=T,means A covers B;Set all parts of B to FF.
C     CUBE(J,BOTH,K)=F
C     WRITE(16,*)'    REDUCT,IB=0',IA,IB
                   DO 158 JX=1,IBPP
                          DO 217 KY=1,NMAXTW
                   CUBE(IB,JX,KY)=.FALSE.
 217                      CONTINUE
 158               CONTINUE
                   IST=IST+1
                   CUBEN(IST)=IB
                   CD(IB)=0
                   GO TO 226
                ELSE IF(A17) THEN
C     A17=T,means B covers A;Set all parts of A to FF.
C     CUBE(I,BOTH,K)=F
C     WRITE(16,*)'  REDUCT,IA=0',IA,IB
                   DO 218 JX=1,IBPP
                          DO 225 KY=1,NMAXTW
                   CUBE(IA,JX,KY)=.FALSE.
 225                      CONTINUE
 218               CONTINUE
                   IST=IST+1
                   CUBEN(IST)=IA
                   CD(IA)=0
                   GO TO 239
                ENDIF
                ENDIF
C               Same Weight Cubes
C               Adjacent Cubes;Weight differs by 1
                QMA=CD(IA)-CD(IB)
         IF((QMA+1.EQ.0).OR.(QMA-1.EQ.0).OR.(QMA.EQ.0)) THEN
                VUSE=0
                DO 200 V=NMAXTW,1,-1
                       IF(VUSE.EQ.0) THEN
                              K=NMAXTW
                              DO 201 JV=1,NMAXTW
                                     K=NMAXTW+1-JV
```

```
                                IF(K.NE.V) THEN
C     Compare Conditions
C     ------------------
C     "DO LOOP" is to generate every part number except part v
C     (K avoids V) between original statement numbers 842-846.
C     If all parts of both cubes are the same,except part K
C     (where K=V),then a 'replacement' of these cubes will take
C     place.Thus these 2 cubes will merge into a single cube.
C     WRITE(16,202)K,V,IA,IB,IST
C202 FORMAT(1X,10HCOMPARE K=,I4,3H V=,I4,4H IA=,I4,4H IB=,I4
C     1     5H IST=,I4)
C     Compare cubes;CUBE(IA,1,K),CUBE(IA,2,K) and
C     CUBE(IB,1,K),CUBE(IB,2,K) as follows below.
C     CUBE(i,j,k) is defined in DESCEN(No. 9).
      AL=(.NOT.CUBE(IA,1,K)).AND.CUBE(IA,2,K).AND.(.NOT.
      1     CUBE(IB,1,K)).AND.CUBE(IB,2,K)
      E=CUBE(IA,1,K).AND.(.NOT.CUBE(IA,2,K))
      F=CUBE(IB,1,K).AND.(.NOT.CUBE(IB,2,K))
      B=E.AND.F
      CK=CUBE(IA,1,K).AND.CUBE(IA,2,K).AND.
      1     CUBE(IB,1,K).AND.CUBE(IB,2,K)
      DK=(.NOT.CUBE(IA,1,K)).AND.(.NOT.CUBE(IA,2,K)).OR.(.NOT.
      1     CUBE(IB,1,K)).AND.(.NOT.CUBE(IB,2,K))
C     S=Same
      S=(AL.OR.B.OR.CK).AND.(.NOT.DK)
C     WRITE(16,*)'S=SAME'
C     WRITE(16,203)WX(4),(CUBE(IA,JB,K),JB=1,2),(CUBE(IB,JB,
C     1     K),JB=1,2)
C     FORMAT(//1X,8H WX(4)=,I4,2(4X,9HCUBE(IA)=,L1),8X,2(4X,
C     1     9HCUBE(IB)=,L1))
                                     IF(S) THEN
                                WX(4)=WX(4)+1
                                     ENDIF
                                ENDIF
 201                       CONTINUE
          IF(WX(4).EQ.(NMAXTW-1)) THEN
              VUSE=V
C     WRITE(16,*)'VUSE=V'
C     WRITE(16,204)VUSE,AL,B,CK,WX(4)
C204 FORMAT(//1X,5HVUSE=,I4,2X,2HA=,L1,2X,2HB=,L1,
C     1     2X,3HCK=,L1,2X,6HWX(4)=,I4)
              IGH=IA
              DO 210 IGF=1.2
C     WRITE(16,209)IGH,((CUBE(IGH,IGJ,IGK),IGJ=1,IBFP),IGK=1,NMAX
TW)
C209 FORMAT(//1X,I4,2X,8(2L1,1X))
                  IGH=IB
 210          CONTINUE
          ENDIF
```

```
          WX(4)=0
          ENDIF
 200 CONTINUE
     ENDIF
C    GO TO IB
     IF(VUSE.NE.0) THEN
C         WRITE(16,*)'- - - Replacement - - -'
C    WRITE(16,219)IA,((CUBE(IA,IGJ,IGK),IGJ=1,IBPP),IGK=1,NMAXTW
)
C219 FORMAT(I4,2X,8(2L1,1X))
C    WRITE(16,321)IB,((CUBE(IB,IGJ,IGK),IGJ=1,IBPP),IGK=1,NMAXTW
)
C321 FORMAT(I4,2X,8(2L1,1X))
C         WRITE(16,*)'- - - End of Replacement - - -'
C         Replacement Routine
          DO 206 IKK=1,IBPP
     CUBE(IA,IKK,VUSE)=CUBE(IA,IKK,VUSE).OR.CUBE(IB,IKK,VUSE)
C         ENDDO
 206      CONTINUE
C    CD(IA),during replacement,will ALWAYS increase by 1.
          CD(IA)=CD(IA)+1
C    Cube IB is set to a weight of 0.
          DO 207 JX=1,IBPP
               DO 208 KY=1,NMAXTW
                    CUBE(IB,JX,KY)=.FALSE.
 208           CONTINUE
 207      CONTINUE
          CD(IB)=0
C    For Disjointness.Also,CUBEN(cube number)
          M1=CD(IA)
          IST=IST+1
          CUBEN(IST)=IA
          IST=IST+1
          CUBEN(IST)=IB
          WX(5)=1
     ENDIF
 226 IV=0
 239 IV=0
     ENDIF
     ENDIF
C    Following ENDDO is for IB loop.
 198           CONTINUE
               WX(4)=0
               ENDIF
          ENDIF
          WX(5)=0
C    Following ENDDO is for IA loop.
 196           CONTINUE
          ENDIF
```

```
C     Remove from original list the redundant cubes that
C     have been merged.
C     DO 135 IU=1,LTD1
C     WRITE(16,138)IU,IU,((CUBE(IU,JE2,KE2),JE2=1,IBPP),KE2=1,NMA
XTW)
C138 FORMAT(//1X,I4,2X,5HCUBE(,I4,3H)= ,8(2L1,1X),1X)
C135 CONTINUE
        JNUM=0
        DO 54 IA=1,LTD1
           JNUM=JNUM+1
           DO 56 IB=1,NMAXTW
              CUBERP(JNUM,1,IB)=CUBE(IA,1,IB)
              CUBERP(JNUM,2,IB)=CUBE(IA,2,IB)
 56        CONTINUE
           CALL NULL
 54     CONTINUE
        CUBENUM=JNUM
        CALL RLABEL
        CALL NWD
C     DO 232 IU=1,CUBENUM
C     WRITE(16,233)IU,IU,((CUBE(IU,JE2,KE2),JE2=1,IBPP),KE2=1,NMA
XTW)
C233 FORMAT(//1X,I4,2X,5HCUBE(,I4,3H)= ,8(2L1,1X),1X)
C232 CONTINUE
C       WRITE(16,*)'   Djoint Cubes Follow '
C     DO 228 I52=1,CUBENUM
C       WRITE(16,229)I52,I52,((CUBE(I52,J,K),J=1,IBPP),K=1,NMA
XTW)
C     FORMAT(//1X,I4,7H  CUBE(,I4,3H)= ,8(2L1,1X))
C     ENDDO .
C228 CONTINUE
      IF(LTD1.EQ.CUBENUM) THEN
        GO TO 224
      ELSE
C       WRITE(16,*)' LTD1=    ',LTD1,'   JAMT=',JAMT
C       WRITE(16,*)' CUBENUM=',CUBENUM,'     JAMT=',JAMT
      ENDIF
 215 CONTINUE
 224 IV=0
C     -----------------------------------------------
      ENDIF
      RETURN
      END
```

```
C        *** Computer Program Listing Number 4 ***

C     Floating Point Multiply - ? Working,     MF.FOR
C     Null cubes and universe cubes are accepted as
C     inputs. The main application is to have all programs
C     accept these two special cubes for converting object
C     files ( a compliation of any program in any language )
C     to boolean lists for fast and compact processing.
C     ..................................................
C     /B23/ Common block will have these two terms removed:
C     SUBTR and F so that W.FOR will run on Wang.
C     F Code,Fixed Point
C     ------------------
C     F=1:Addition
C     F=2:Subtraction
C     F=3:Multiplication
C     F=4:Division
C     ........................................
C     NOTE: In #6 & #7,I have Ced those ifs and put in
C     limited ifs below them.

      COMMON /B01/ JCUBE(20,2,8)
      COMMON /B02/ CUBE(20,2,8),CUBERP(20,2,8)
      COMMON /B04/ CHART(3),SPACE(20,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
```

```
COMMON /B38/ CUBRP1(8,20,8)

LOGICAL*2 JCUBE
LOGICAL*2 CUBE,CUBERP
CHARACTER CHART,SPACE
LOGICAL*2 LCUBE,ACUBE
LOGICAL*2 CYL1
LOGICAL*2 CYL2
LOGICAL*2 AQ,BQ
INTEGER AN,CN,JTOL,NMAX,IBPP,KCDA,KMAX,W,C,
1     CD,A,CM
INTEGER NEW,SUM,JNUM,NMAXX,IA2,ISHQ,Q
1     MODE,TA,TC,NMAXTW,CUBENUM
INTEGER IAX,IR,LTD,TOTAL,JNUM3
INTEGER CUBEN,V,WX,M
INTEGER AT,BT,PVAT,PVBT,CYLT,
1     CACT,CPLT
INTEGER TD,KZ,KG,NP,JCOVER,JPV,J2,IVX
LOGICAL*2 PVA1
LOGICAL*2 PVA2
LOGICAL*2 PVB1
LOGICAL*2 PVB2
LOGICAL*2 CPL1
LOGICAL*2 CPL2
LOGICAL*2 CACUB1
LOGICAL*2 CACUB2
LOGICAL*2 A1
LOGICAL*2 A2
LOGICAL*2 B1
LOGICAL*2 B2
LOGICAL*2 CUBRP1


LOGICAL*2 IMANR1(16,100,16)
LOGICAL*2 IMANR2(16,100,16)
LOGICAL*2 YA1(12,20,8)
LOGICAL*2 YA2(12,20,8)
LOGICAL*2 YB1(12,20,8)
LOGICAL*2 YB1(12,20,8)
LOGICAL*2 SMA1(100,16)
LOGICAL*2 SMA2(100,16)
LOGICAL*2 SMB1(100,16)
LOGICAL*2 SMB2(100,16)
LOGICAL*2 SMR1(100,16)
LOGICAL*2 SMR2(100,16)
LOGICAL*2 IMANA1(16,100,16)
LOGICAL*2 IMANA2(16,100,16)
LOGICAL*2 IMANB1(16,100,16)
LOGICAL*2 IMANB2(16,100,16)
```

```
      LOGICAL*2 EA1(16,100,16)
      LOGICAL*2 EA2(16,100,16)
      LOGICAL*2 EB1(16,100,16)
      LOGICAL*2 EB2(16,100,16)
      LOGICAL*2 ER1(16,100,16)
      LOGICAL*2 ER2(16,100,16)
      LOGICAL*2 SEA1(100,16)
      LOGICAL*2 SEA2(100,16)
      LOGICAL*2 SEB1(100,16)
      LOGICAL*2 SEB2(100,16)
      LOGICAL*2 SER1(100,16)
      LOGICAL*2 SER2(100,16)
      LOGICAL*2 XC1(2,20,8)
      LOGICAL*2 XC2(2,20,8)
      LOGICAL*2 ISIGN1(100,16)
      LOGICAL*2 ISIGN2(100,16)
      LOGICAL*2 MXCUB1(16,100,16)
      LOGICAL*2 MXCUB2(16,100,16)

      INTEGER YAT(12),YBT(12)
      INTEGER NEX,SMAT,SMBT,SMRT,SEAT,SEBT,EAT(8),EBT(8)
      INTEGER IMANRT(8),ERT(8),SERT(8),ISIGNT,MXCT(8)
      INTEGER IMANAT(8),IMANBT(8),XCT(2)

C     Input Format:[ SM ][ NM-1 ][ SE ][ NEX ]

C     SM is sign of the mantissa.
C     NM-1 is mantissa part with MSB equal to '1' as understood.
C     NEX is exponent part

      NJUMP=0
      NM=4
      NEX=4
      IPTN=0

      C(20)=1
      IR=1
      LTD=20
C     F=3
      AN=1
      CN=1
      CUBENUM=1
      IR=4
      IBPP=2
      SUBTR=0
      NMAX=2
      NMAXTW=2*NMAX
      NMAXP=NMAX+1
      NMAXZ=NMAX-1
```

```
C     AT(NMAX),BT(NMAX)
      DO 29 J11=1,NMAX
            AT(J11)=1
            BT(J11)=1
 29   CONTINUE
      READ(7,30)(CHART(IA1),IA1=1,3)
 30   FORMAT(3A1)
      WRITE(16,*)'Multiply Run'
C     CPL(1) is defined.below. ------------------------------------

C     Normally,arrays A1,A2,B1,B2 will each contain many
cubes;but for
C     now will contain only one cube.
C     CPL(1)=A(1).AND.B(1)
C     ----------------START UP CONDITIONS--------------------------
C     Note:CARRY IN is '0' ( grounded ).
C     In the event of using the carry input,the arrays need to be
enlarged!
      DO 143 J3=1,NMAX
            AN=AT(J3)
            CN=BT(J3)
            JN=J3+NMAX
            DO 31 K=1,NMAXTW
                  A1(J3,AN,K)=.TRUE.
                  A2(J3,AN,K)=.TRUE.
                  B1(J3,CN,K)=.TRUE.
                  B2(J3,CN,K)=.TRUE.
C     Bit Redefinition.
                  IF(K.EQ.J3) THEN
C     ---------------------------- A(J3)=1
                        A1(J3,AN,K)=.FALSE.
                        A2(J3,AN,K)=.TRUE.
                  ELSE IF(K.EQ.JN) THEN
C     ---------------------------- B(J3)=1
                        B1(J3,CN,K)=.FALSE.
                        B2(J3,CN,K)=.TRUE.
                  ENDIF
 31         CONTINUE
 143  CONTINUE

C     -------------------------------------------------------

C     Arbitrary set input:U111 per A & B

      WRITE(10,*)'   NMAX=NOW',NMAX
            DO JC=1,NMAX
                  IF(JC.EQ.NM) THEN
                        AT(NMAX)=1
                        BT(NMAX)=1
```

```
      DO I1=1,1
         DO I2=1,NMAXTW
            IF(I2.LT.(NMAX+1)) THEN
               A1(JC,I1,I2)=.TRUE.
               A2(JC,I1,I2)=.TRUE.
            ELSE
C              Always
               A1(JC,I1,I2)=.TRUE.
               A2(JC,I1,I2)=.TRUE.
            ENDIF
            IF(I2.LT.(NMAX+1)) THEN
C              Always
               B1(JC,I1,I2)=.TRUE.
               B2(JC,I1,I2)=.TRUE.
            ELSE
               B1(JC,I1,I2)=.TRUE.
               B2(JC,I1,I2)=.TRUE.
            ENDIF
         ENDDO
      ENDDO
   ELSE IF(JC.LT.NM) THEN
      AT(JC)=1
      BT(JC)=1
      DO I1=1,1
         DO I2=1,NMAXTW
            IF(I2.LT.(NMAX+1)) THEN
               A1(JC,I1,I2)=.TRUE.
               A2(JC,I1,I2)=.TRUE.
            ELSE
C              Always
               A1(JC,I1,I2)=.TRUE.
               A2(JC,I1,I2)=.TRUE.
            ENDIF
            IF(I2.LT.(NMAX+1)) THEN
C              Always
               B1(JC,I1,I2)=.TRUE.
               B2(JC,I1,I2)=.TRUE.
            ELSE
               B1(JC,I1,I2)=.TRUE.
               B2(JC,I1,I2)=.TRUE.
            ENDIF
         ENDDO
      ENDDO
   ELSE IF(JC.GT.NM) THEN
      AT(JC)=1
      BT(JC)=1
      DO I1=1,1
         DO I2=1,NMAXTW
            IF(I2.LT.(NMAX+1)) THEN
```

```
                                A1(JC,I1,I2)=.FALSE.
                                A2(JC,I1,I2)=.FALSE.
                          ELSE
                                A1(JC,I1,I2)=.FALSE.
                                A2(JC,I1,I2)=.FALSE.
                          ENDIF
                          IF(I2.LT.(NMAX+1)) THEN
                                B1(JC,I1,I2)=.FALSE.
                                B2(JC,I1,I2)=.FALSE.
                          ELSE
                                B1(JC,I1,I2)=.FALSE.
                                B2(JC,I1,I2)=.FALSE.
                          ENDIF
                    ENDDO
              ENDDO
        ENDIF
     ENDDO
C    ------------------------------------------------------------

C    WRITE(16,*)'CUBE A INPUT'
         DO 310 KG=1,NMAX
            AN=AT(KG)
            DO 311 K=1,NMAXTW
      IF(A1(KG,1,K).AND.A2(KG,1,K)) THEN
         SPACE(KG,K)=CHART(3)
      ELSE IF(A1(KG,1,K).AND.(.NOT.A2(KG,1,K))) THEN
         SPACE(KG,K)=CHART(1)
      ELSE IF((.NOT.A1(KG,1,K)).AND.A2(KG,1,K)) THEN
         SPACE(KG,K)=CHART(2)
      ELSE
C        WRITE(16,*)'    **** ERROR in CUBE A INPUT ****'
      ENDIF
 311        CONTINUE
C           WRITE(16,314)KG,(SPACE(KG,IG),IG=1,NMAXTW)
 314        FORMAT(1X,I4,2X,2(2A1.5X))
 310     CONTINUE
C        WRITE(16,*)'    '
C        WRITE(16,*)'CUBE B INPUT'
         DO 312 KG=1.NMAX
            CN=BT(KG)
            DO 313 K=1,NMAXTW
      IF(B1(KG,1,K).AND.B2(KG,1,K)) THEN
         SPACE(KG,K)=CHART(3)
      ELSE IF(B1(KG,1,K).AND.(.NOT.B2(KG,1,K))) THEN
         SPACE(KG,K)=CHART(1)
      ELSE IF((.NOT.B1(KG,1,K)).AND.B2(KG,1,K)) THEN
         SPACE(KG,K)=CHART(2)
      ELSE
C        WRITE(16,*)'    **** ERROR in CUBE B INPUT ****'
```

```
      ENDIF
 313            CONTINUE
C               WRITE(16,314)KG,(SPACE(KG,IG),IG=1,NMAXTW)
 315            FORMAT(1X,I4,2X,2(2A1,5X))
 312        CONTINUE

C     Input Cube Condition and Format to fixed bit
C     multiplier is: NMAX and [ U ][ NM-1 ], respectively.

      NMAX=NM
      NMAXP=NM+1
      NMAXZ=NM-1
      NMAX1=2*NM

C     NMAX=2
C     NMAXP=3
C     NMAXZ=1
C     NMAX1=4

      AN=AT(1)
C     WRITE(16,*)'CUBMAIN1AA AN&CN=',AN,CN
      DO 110 I=1,AN
          DO 111 K=1,NMAXTW
                ACUBE(I,1,K)=A1(1,I,K)
                ACUBE(I,2,K)=A2(1,I,K)
 111      CONTINUE
 110  CONTINUE
      CN=BT(1)
C     WRITE(16,*)'CUBMAIN1AAA AN&CN=',AN,CN
      DO 113 I1=1,CN
          DO 112 K=1,NMAXTW
                CUBE(I1,1,K)=B1(1,I1,K)
                CUBE(I1,2,K)=B2(1,I1,K)
 112      CONTINUE
 113  CONTINUE
      JCOVER=1
      TD=5
      CALL DJR
C     CPL(1) list is now defined.See DJR(TD=5).
C     ------------------------------------------------------------------
C     PVA1(1)=A(2).AND.B(1)
C     PVA1(J)=A(J1).AND.B(J2),Output Pin lists are:CPL(KZ).
C     CPL(KZ) is generated.
      DO 115 J2=2,NMAX
C     DO 115 J2=2,2
C        (J2-1) is number of Adders,where J2=2 is 1st Adder.
           IF(J2.EQ.2) THEN
C     ---------------- 1ST Adder
                DO 116 J=1,NMAXZ
```

```
                     JCOVER=J
                     J1=J+1
C     1ST Add.
C     PVA(J)=A(J1).AND.B(1)
                     AN=AT(J1)
                     DO 117 I2=1,AN
                           DO 118 K=1,NMAXTW
                                 ACUBE(I2,1,K)=A1(J1,I2,K)
                                 ACUBE(I2,2,K)=A2(J1,I2,K)
 118                       CONTINUE
 117                 CONTINUE
                     CN=BT(1)
                     DO 119 I3=1,CN
                           DO 120 K=1,NMAXTW
                                 CUBE(I3,1,K)=B1(1,I3,K)
                                 CUBE(I3,2,K)=B2(1,I3,K)
 120                       CONTINUE
 119                 CONTINUE
               TO=3
               CALL DJR
 116           CONTINUE
               CYLT(1)=1
C              PVAJ(NMAX)=0
C              DO 129 IU1=1,AT(NMAX)
C                    DO 130 IU2=1,NMAXTW
C                          PVA1(NMAX,IU1,IU2)=.TRUE.
C                          PVA2(NMAX,IU1,IU2)=.FALSE.
C130                 CONTINUE
C129           CONTINUE
C              PVA2(NMAX,1,NMAX)=.FALSE.
C              PVAT(NMAX)=AT(NMAX)
               PVAT(NMAX)=0
         ELSE
C     ------------------------------------------Not 1st Adder
               DO 809 J=1,NMAXZ
                     J1=J+1
      PVAT(J)=CACT(J1)
      DO 131 IU1=1,PVAT(J)
            DO 132 IU2=1,NMAXTW
                  PVA1(J,IU1,IU2)=CACUB1(J1,IU1,IU2)
                  PVA2(J,IU1,IU2)=CACUB2(J1,IU1,IU2)
 132        CONTINUE
 131  CONTINUE
 809           CONTINUE
      PVAT(NMAX)=CYLT(NMAXP)
      DO 134 IU1=1,PVAT(NMAX)
            DO 136 IU2=1,NMAXTW
                  PVA1(NMAX,IU1,IU2)=CYL1(NMAXP,IU1,IU2)
                  PVA2(NMAX,IU1,IU2)=CYL2(NMAXP,IU1,IU2)
```

```
 136        CONTINUE
 134 CONTINUE
        ENDIF
C     PVA(J)=A(J).AND.B(J2 is below:
              DO 144 J=1,NMAX
                   JCOVER=J
              AN=AT(J)
              DO 176 I2=1,AN
                   DO 177 K=1,NMAXTW
                        ACUBE(I2,1,K)=A1(J,I2,K)
                        ACUBE(I2,2,K)=A2(J,I2,K)
 177               CONTINUE
 176          CONTINUE
              CN=BT(J)
              DO 179 I3=1,CN
                   DO 180 K=1,NMAXTW
                        CUBE(I3,1,K)=B1(J2,I3,K)
                        CUBE(I3,2,K)=B2(J2,I3,K)
 180               CONTINUE
 179          CONTINUE
              TD=4
              CALL DJR
C          WRITE(16,*)J,' PVBT(JCOVER)=',PVBT(JCOVER)
 144          CONTINUE
              CALL ADCUBE
C             IF(J2.EQ.2) THEN
C                  WRITE(16,*)' '
C                  WRITE(16,*)'  Adder Output Lists - LSB 1st'
C                  WRITE(16,*)' '
C                  DO 834 K=1,NMAX
C                       WRITE(16,*)'  K=',K
C                       WRITE(16,*)'  CACT(K)=',CACT(K)
C                       DO 836 IU1=1,CACT(K)
C                            DO 837 IU2=1,NMAXTW
C     WRITE(16,835)IU1,(CACUB1(K,IU1,IU2),CACUB2(K,IU1,IU2),
C     1     IU2=1,NMAXTW)
C835  FORMAT(1X,I4,2X,4(2L1,1X))
C837                        CONTINUE
C836                   CONTINUE
C                       WRITE(16,*)' '
C                       WRITE(16,*)' '
C834               CONTINUE
C             ENDIF
C             CPLj(J2)=CACUBj(1)=S(1)
              CPLT(J2)=CACT(1)
              DO 137 IU1=1,CPLT(J2)
                   DO 139 IU2=1,NMAXTW
                        CPL1(J2,IU1,IU2)=CACUB1(1,IU1,IU2)
                        CPL2(J2,IU1,IU2)=CACUB2(1,IU1,IU2)
```

```
 139                  CONTINUE
 137              CONTINUE
                  IF(J2.EQ.NMAX) THEN
                        DO 843 JX=2,NMAX
                              J=JX+NMAXZ
                              CPLT(J)=CACT(JX)
                              DO 844 IU1=1,CPLT(J)
                                    DO 845 IU2=1,NMAXTW
                              CPL1(J,IU1,IU2)=CACUB1(JX,IU1,IU2)
                              CPL2(J,IU1,IU2)=CACUB2(JX,IU1,IU2)
 845                                CONTINUE
 844                          CONTINUE
 843                    CONTINUE
                        CPLT(NMAXTW)=CYLT(NMAXP)
                        DO 846 IU1=1,CPLT(NMAXTW)
                              DO 847 IU2=1,NMAXTW
                        CPL1(NMAXTW,IU1,IU2)=CYL1(NMAXP,IU1,IU2)
                        CPL2(NMAXTW,IU1,IU2)=CYL2(NMAXP,IU1,IU2)
 847                          CONTINUE
 846                    CONTINUE
                  ENDIF
 115        CONTINUE

C     OUTPUT of Fixed point multiply to signed mantissa

C     ****       Ok to here '10 June 86'      ****
C     ------------------------------------------------

C     NMAX=NM+2

      XCT(1)=CPLT(NMAXTW)
      DO I1=1,XCT(1)
            DO I2=1,NMAXTW
                  XC1(1,I1,I2)=CPL1(NMAXTW,I1,I2)
                  XC2(1,I1,I2)=CPL2(NMAXTW,I1,I2)
            ENDDO
      ENDDO

      AN=CPLT(NMAXTW)
      DO I1=1,AN
            DO I2=1,NMAXTW
                  ACUBE(I1,1,I2)=CPL1(NMAXCTW,I1,I2)
                  ACUBE(I1,2,I2)=CPL1(NMAXCTW,I1,I2)
            ENDDO
      ENDDO

      DO JC=NMAX,NMAXTW
            CN=CPLT(JC)
            DO I1=1,CN
```

```
          DO I2=1,NMAXTW
      CUBE(I1,1,I2)=CPL1(JC,I1.I2)
      CUBE(I1,2,I2)=CPL2(JC,I1,I2)
          ENDDO
      ENDDO
      CALL ADNUL
      YAT(JC)=CUBENUM
      DO I1=1,YAT(JC)
          DO I2=1,NMAXTW
      YA1(JC,I1,I2)=CUBE(I1,1,I2)
      YA2(JC,I1,I2)=CUBE(I1,2,I2)
          ENDDO
      ENDDO
ENDDO
CUBENUM=CPLT(NMAXTW)
YAT(NMAXTW+3)=CPLT(NMAXTW)
DO I1=1,CUBENUM
      DO I2=1,NMAXTW
CUBE(I1,1,I2)=CPL1(NMAXCTW,I1,I2)
CUBE(I1,2,I2)=CPL2(NMAXCTW,I1,I2)
YA1((NMAXTW+3),I1,I2)=CPL1(NMAXCTW,I1,I2)
YA2((NMAXTW+3),I1,I2)=CPL2(NMAXCTW,I1,I2)
      ENDDO
ENDDO

CALL NEGNUL
AN=CUBENUM
YAT(NMAXTW+4)=CUBENUM
DO I1=1,CUBENUM
      DO I2=1,NMAXTW
ACUBE(I1,1,I2)=CUBE(I1,1,I2)
ACUBE(I1,2,I2)=CUBE(I1,2,I2)
YA1((NMAXTW+4),I1,I2)=CUBE(I1,1,I2)
YA2((NMAXTW+4),I1,I2)=CUBE(I1,2,I2)
      ENDDO
ENDDO

DO JC=NMAX-1,NMAXTW
      CN=CPLT(JC)
      DO I1=1,CN
          DO I2=1,NMAXTW
      CUBE(I1,1,I2)=CPL1(JC,I1,I2)
      CUBE(I1,2,I2)=CPL2(JC,I1,I2)
          ENDDO
      ENDDO
      CALL ANDNUL
      YBT(JC)=CUBENUM
      DO I1=1,YBT(JC)
          DO I2=1,NMAXTW
```

```
      YB1(JC,I1,I2)=CUBE(I1,1,I2)
      YB2(JC,I1,I2)=CUBE(I1,2,I2)
        ENDDO
      ENDDO
    ENDDO

CW  N Bit MUX BELOW

      AN=YAT(NMAX)
      DO I1=1,AN
        DO I2=1,NMAXTW
      ACUBE(I1,1,I2)=YA1(NMAX,I1,I2)
      ACUBE(I1,2,I2)=YA2(NMAX,I1,I2)
        ENDDO
      ENDDO
    DO JC=1,NMAX
C     '1st' AND
        IF(JC.EQ.1) THEN
          CN=1
          DO I1=1,CN
            DO I2=1,NMAXTW
          CUBE(I1,1,I2)=.TRUE.
          CUBE(I1,2,I2)=.TRUE.
            ENDDO
          ENDDO
        ELSE
          CN=1
      DO I1=1,CN
        DO I2=1,NMAXTW
      CUBE(I1,1,I2)=.FALSE.
      CUBE(I1,2,I2)=.FALSE.
        ENDDO
      ENDDO
      CALL ANDNUL
      PVBT(JC)=CUBENUM
      DO I1=1,PVBT(JC)
        DO I2=1,NMAXTW
      PVB1(JC,I1,I2)=CUBE(I1,1,I2)
      PVB2(JC,I1,I2)=CUBE(I1,2,I2)
        ENDDO
      ENDDO
    ENDDO
C        'OTH' AND
      CUBENUM=YAT(NMAX)
      DO I1=1,CUBENUM
        DO I2=1,NMAXTW
      CUBE(I1,1,I2)=YA1(NMAX,I1,I2)
      CUBE(I1,2,I2)=YA2(NMAX,I1,I2)
        ENDDO
```

```
      ENDDO
      TA=0
      CALL NEGNUL
      AN=CUBENUM
      DO I1=1,AN
            DO I2=1,NMAXTW
      ACUBE(I1,1,I2)=CUBE(I1,1,I2)
      ACUBE(I1,2,I2)=CUBE(I1,2,I2)
            ENDDO
      ENDDO
DO JC=1,NMAX
      CN=1
      DO I1=1,CN
            DO I2=1,NMAXTW
      CUBE(I1,1,I2)=.FALSE.
      CUBE(I1,2,I2)=.FALSE.
            ENDDO
      ENDDO
      CALL ANDNUL
      PVAT(JC)=CUBENUM
      DO I1=1,PVAT(JC)
            DO I2=1,NMAXTW
      PVA1(JC,I1,I2)=CUBE(I1,1,I2)
      PVA2(JC,I1,I2)=CUBE(I1,2,I2)
            ENDDO
      ENDDO
ENDDO

C     1st OR

DO JC=1,NMAX
      AN=PVAT(JC)
      DO I1=1,AN
            DO I2=1,NMAXTW
      ACUBE(I1,1,I2)=PVA1(JC,I1,I2)
      ACUBE(I1,2,I2)=PVA2(JC,I1,I2)
            ENDDO
      ENDDO
      CN=PVBT(JC)
      DO I1=1,CN
            DO I2=1,NMAXTW
      CUBE(I1,1,I2)=PVB1(JC,I1,I2)
      CUBE(I1,2,I2)=PVB2(JC,I1,I2)
            ENDDO
      ENDDO
      CALL ORNUL
      PVBT(JC)=CUBENUM
      DO I1=1,PVBT(JC)
            DO I2=1,NMAXTW
```

```
      PVB1(JC,I1,I2)=CUBE(I1,1,I2)
      PVB2(JC,I1,I2)=CUBE(I1,2,I2)
            ENDDO
      ENDDO
ENDDO

CX    PVA1,2 & PVB1,2 ARE GENERATED FOR 1st SUM.

      DO JC=1,NMAX
            JQ=NMAX+JC
            PVAT(JC)=YAT(JQ)
            DO I1=1,PVAT(JC)
                  DO I2=1,NMAXTW
            PVA1(JC,I1,I2)=YA1(JQ,I1,I2)
            PVA2(JC,I1,I2)=YA2(JQ,I1,I2)
                  ENDDO
            ENDDO
      ENDDO
      CALL ADCUBE
      DO JC=1,NMAX-1
            JQ=JC+1
            YAT(JC)=CACT(JQ)
            DO I1=1,YAT(JC)
                  DO I2=1,NMAXTW
            YA1(JC,I1,I2)=CACUB1(JQ,I1,I2)
            YA2(JC,I1,I2)=CACUB2(JQ,I1,I2)
                  ENDDO
            ENDDO

C     Preparation for 2nd adder.

      DO JC=1,NMAX+1
            JQ=NMAX-1+JC
            PVAT(JC)=YBT(JQ)
            DO I1=1,PVAT(JC)
                  DO I2=1,NMAXTW
            PVA1(JC,I1,I2)=YB1(JC,I1,I2)
            PVA2(JC,I1,I2)=YB2(JC,I1,I2)
                  ENDDO
            ENDDO
      ENDDO

C     Rounding MUX: YBT(N-1)
CW    1st Rounder Adder, Preparation for 1ST Adder

      AN=YBT(NMAX-1)
            DO I1=1,AN
                  DO I2=1,NMAXTW
            ACUBE(I1,1,I2)=YB1((NMAX-1),I1,I2)
```

```
      ACUBE(I1,2,I2)=YB2((NMAX-1),I1,I2)
            ENDDO
      ENDDO
DO JC=1,NMAX+1
      '1st' AND
            IF(JC.EQ.1) THEN
                  CN=1
                  DO I1=1,CN
                        DO I2=1,NMAXTW
                  CUBE(I1,1,I2)=.TRUE.
                  CUBE(I1,2,I2)=.TRUE.
                        ENDDO
                  ENDDO
            ELSE
                  CN=1
                  DO I1=1,CN
                        DO I2=1,NMAXTW
                  CUBE(I1,1,I2)=.FALSE.
                  CUBE(I1.2,I2)=.FALSE.
                        ENDDO
                  ENDDO
            ENDIF
            CALL ANDNUL
            PVBT(JC)=CUBENUM
            DO I1=1,PVBT(JC)
                  DO I2=1,NMAXTW
            PVB1(JC,I1,I2)=CUBE(I1,1,I2)
            PVB2(JC,I1,I2)=CUBE(I1,2,I2)
                  ENDDO
            ENDDO
      ENDDO
      CUBENUM=YBT(NMAX-1)
      DO I1=1,CUBENUM
            DO I2=1,NMAXTW
      CUBE(I1,1,I2)=YB1((NMAX-1),I1,I2)
      CUBE(I1,2,I2)=YB2((NMAX-1),I1,I2)
            ENDDO
      ENDDO
      TA=0
      CALL NEGNUL
      AN=CUBENUM
      DO I1=1,CN
            DO I2=1,NMAXTW
      ACUBE(I1,1,I2)=CUBE(I1,1,I2)
      ACUBE(I1,2,I2)=CUBE(I1,2,I2)
            ENDDO
      ENDDO

DO JC=1,NMAX+1
```

```
        'Oth' AND
        CN=1
        DO I1=1,CN
              DO I2=1,NMAXTW
        CUBE(I1,1.I2)=.FALSE.
        CUBE(I1,2,I2)=.FALSE.
              ENDDO
        ENDDO
        CALL ANDNUL
        AT(JC)=CUBENUM
        DO I1=1,AT(JC)
              DO I2=1,NMAXTW
        A1(JC,I1,I2)=CUBE(I1,1,I2)
        A2(JC,I1,I2)=CUBE(I1,2,I2)
              ENDDO
        ENDDO
  ENDDO

C     Preparing for 1st adder.

      DO JC=1,NMAX+1
        AN=AT(JC)
        DO I1=1,AN
              DO I2=1,NMAXTW
        ACUBE(I1,1,I2)=A1(JC,I1,I2)
        ACUBE(I1,2.I2)=A2(JC,I1,I2)
              ENDDO
        ENDDO
        CN=PVBT(JC)
        DO I1=1,CN
              DO I2=1,NMAXTW
        CUBE(I1,1,I2)=PVB1(JC,I1,I2)
        CUBE(I1,2,I2)=PVB2(JC,I1,I2)
              ENDDO
        ENDDO
        CALL ORNUL
        PVBT(JC)=CUBENUM
        DO I1=1,PVBT(JC)
              DO I2=1,NMAXTW
        PVB1(JC,I1,I2)=CUBE(I1,1,)
        PVB2(JC,I1,I2)=CUBE(I1,2,)
              ENDDO
        ENDDO
      ENDDO

CX    PVA1,2 & PVB1,2 ARE GENERATED.

C     YB1,2((N-2),.....)
```

```
C     CALL AD1-MAIN ROUTINE with new subroutines.

      NMAX=NMAX+1

      DO JC=1,NMAX
            YBT(JC)=CACT(JC)
            XCT(2)=YBT(NMAX)
            DO I1=1.YBT(JC)
                  DO I2=1,NMAXTW
            YB1(JC,I1,I2)=CACUB1(JQ,I1,I2)
            YB2(JC,I1,I2)=CACUB2(JQ,I1,I2)
            XC1(1,I1,I2)=YB1(NMAX,I1,I2)
            XC2(1,I1,I2)=YB2(NMAX,I1,I2)
                  ENDDO
            ENDDO
      ENDDO

C     Redefine NMAX for ADCUBE

      NMAX=NMAX+1
      CALL ADCUBE
      NMAX=NMAX-1

C**********************************************************************
C                 *** NEW ***
C**********************************************************************

            AN=CACT(NMAX)
            DO I1=1,AN
                  DO I2=1,NMAXTW
            ACUBE(I1,1,I2)=YB1(JC,I1,I2)
            ACUBE(I1,2,I2)=YB2(JC,I1,I2)
                  ENDDO
            ENDDO
      DO JC=1,NMAX
            JQ=JC-1
            CN=CACT(JC)
            DO I1=1,CN
                  DO I2=1,NMAXTW
            CUBE(I1,1,I2)=CACUB1(JC,I1,I2)
            CUBE(I1,2,I2)=CACUB2(JC,I1,I2)
                  ENDDO
            ENDDO
            CALL ANDNUL
            PVAT(JQ)=CUBENUM
            DO I1=1,PVAT(JQ)
                  DO I2=1,NMAXTW
            PVA1(JQ,I1,I2)=CUBE(I1,1,)
            PVA2(JQ,I1,I2)=CUBE(I1,2,)
```

```
                ENDDO
            ENDDO
      ENDDO

      CUBENUM=CACT(NMAX)
      YAT(NMAXTW+5)=CACT(NMAX)
      DO I1=1,CUBENUM
            DO I2=1,NMAXTW
                  CUBE(I1,1,I2)=CACUB1(NMAX,I1,I2)
                  CUBE(I1,2,I2)=CACUB2(NMAX,I1,I2)
            ENDDO
      ENDDO
      CALL NEGNUL
      AN=CUBENUM
      YAT(NMAXTW+6)=CUBENUM
            DO I1=1,CUBENUM
                  DO I2=1,NMAXTW
            ACUBE(I1,1,I2)=CUBE(I1,1,I2)
            ACUBE(I1,2,I2)=CUBE(I1,2,I2)
                  ENDDO
            ENDDO
      DO JC=1,NMAX-1
            CN=CACT(JC)
            DO I1=1,CN
                  DO I2=1,NMAXTW
            CUBE(I1,1,I2)=CACUB1(JC,I1,I2)
            CUBE(I1,2,I2)=CACUB2(JC,I1,I2)
                  ENDDO
            ENDDO
            CALL ANDNUL
            PVBT(JC)=CUBENUM
            DO I1=1,PVBT(JC)
                  DO I2=1,NMAXTW
            PVA1(JC,I1,I2)=CUBE(I1,1,)
            PVA2(JC,I1,I2)=CUBE(I1,2,)
                  ENDDO
            ENDDO
      ENDDO

C     ***.............................................

      DO JC=1,NMAX-1
            AN=PVAT(JC)
            DO I1=1,AN
                  DO I2=1,NMAXTW
            ACUBE(I1,1,I2)=PVA1(JC,I1,I2)
            ACUBE(I1,2,I2)=PVA2(JC,I1,I2)
                  ENDDO
            ENDDO
```

```
      CN=PVBT(JC)
      DO I1=1,CN
            DO I2=1,NMAXTW
      CUBE(I1,1,I2)=PVB1(JC,I1,I2)
      CUBE(I1,2,I2)=PVB2(JC,I1,I2)
            ENDDO
      ENDDO
      CALL ORNUL
      YBT(JC)=CUBENUM
      DO I1=1,YBT(JC)
            DO I2=1,NMAXTW
      YB1(JC,I1,I2)=CUBE(I1,1,I2)
      YB2(JC,I1,I2)=CUBE(I1,2,I2)
            ENDDO
      ENDDO
ENDDO

C     ***.............................................

DO I1=1,YAT(NMAXTW+3)
      DO I2=1,NMAXTW
ACUBE(I1,1,I2)=YA1((NMAXTW+3),I1,I2)
ACUBE(I1,2,I2)=YA2((NMAXTW+3),I1,I2)
      ENDDO
ENDDO

DO JC=1,NMAX-1
C     YAT(JC)=CUBENUM ?
      YAT(JC)=CUBENUM
      DO I1=1,YAT(JC)
            DO I2=1,NMAXTW
      CUBE(I1,1,I2)=YA1(JC,I1,I2)
      CUBE(I1,2,I2)=YA2(JC,I1,I2)
            ENDDO
      ENDDO
      CALL ANDNUL
      AN=CUBENUM
      DO I1=1,AN
            DO I2=1,NMAXTW
      PV1(JC,I1,I2)=CUBE(I1,1,I2)
      PV2(JC,I1,I2)=CUBE(I1,2,I2)
            ENDDO
      ENDDO
ENDDO

C     ................................

AN=YBT(NMAXTW+4)
```

```
      DO I1=1,YBT(NMAXTW+4)
            DO I2=1,NMAXTW
      ACUBE(I1,1,I2)=YB1((NMAXTW+4),I1,I2)
      ACUBE(I1,2,I2)=YB2((NMAXTW+4),I1,I2)
            ENDDO
      ENDDO

      CN=YBT(JC)
      DO JC=1,NMAX-1
            DO I1=1,YBT(JC)
                  DO I2=1,NMAXTW
            CUBE(I1,1,I2)=YB1(JC,I1,I2)
            CUBE(I1,2,I2)=YB2(JC,I1,I2)
                  ENDDO
            ENDDO
            CALL ANDNUL
            PVBT(JC)=CUBENUM
            DO I1=1,PVBT(JC)
                  DO I2=1,NMAXTW
            PVB1(JC,I1,I2)=CUBE(I1,1,)
            PVB2(JC,I1,I2)=CUBE(I1,2,)
                  ENDDO
            ENDDO
      ENDDO

C     ...............................................

      DO JC=1,NMAX-1
            DO I1=1,PVAT(JC)
                  DO I2=1,NMAXTW
            ACUBE(I1,1,I2)=PVA1(JC,I1,I2)
            ACUBE(I1,2,I2)=PVA2(JC,I1,I2)
                  ENDDO
            ENDDO
            DO I1=1,PVBT(JC)
                  DO I2=1,NMAXTW
            CUBE(I1,1,I2)=PVB1(JC,I1,I2)
            CUBE(I1,2,I2)=PVB2(JC,I1,I2)
                  ENDDO
            ENDDO
            CALL ORNUL
            IMANR(JC)=CUBENUM
            DO I1=1,IMANRT(JC)
                  DO I2=1,NMAXTW
            IMANR1(JC,I1,I2)=CUBE(I1,1,)
            IMANR2(JC,I1,I2)=CUBE(I1,2,)
                  ENDDO
            ENDDO
      ENDDO
```

```
C     ..............................................
C     Start of Mantissa Sign Operation
C     ..............................................

      CUBENUM=SMAT
            DO I1=1,CUBENUM
                  DO I2=1,NMAXTW
            CUBE(I1,1,I2)=SMA1(JC,I1,I2)
            CUBE(I1,2,I2)=SMA2(JC,I1,I2)
                  ENDDO
            ENDDO
            CALL NEGNUL
            CN=CUBENUM
            AN=SMAT
            DO I1=1,AN
                  DO I2=1,NMAXTW
            ACUBE(I1,1,I2)=SMB1(I1,I2)
            ACUBE(I1,2,I2)=SMB2(I1,I2)
                  ENDDO
            ENDDO
            CALL ANDNUL
            YAT(1)=CUBENUM
            DO I1=1,YAT(JC)
                  DO I2=1,NMAXTW
            YA1(1,I1,I2)=CUBE(I1,1,I2)
            YA2(1,I1,I2)=CUBE(I1,2,I2)
                  ENDDO
            ENDDO

C     ....................................................

            CUBENUM=SMBT
            DO I1=1,CUBENUM
                  DO I2=1,NMAXTW
            CUBE(I1,1,I2)=SMB1(I1,I2)
            CUBE(I1,2,I2)=SMB2(I1,I2)
                  ENDDO
            ENDDO
            CALL NEGNUL
            CN=CUBENUM
            AN=SMAT
            DO I1=1,AN
                  DO I2=1,NMAXTW
            ACUBE(I1,1,I2)=SMA1(I1,I2)
            ACUBE(I1,2,I2)=SMA2(I1,I2)
                  ENDDO
            ENDDO
            CALL ANDNUL
```

```
      CN=CUBENUM
      AN=YAT(1)
      DO I1=1,AN
            DO I2=1,NMAXTW
      ACUBE(I1,1,I2)=YA1(1,I1,I2)
      ACUBE(I1,2,I2)=YA2(1,I1,I2)
            ENDDO
      ENDDO
      CALL ORNUL
      SMRT=CUBENUM
      YAT(1)=CUBENUM
      DO I1=1,YAT(1)
            DO I2=1,NMAXTW
      SMR1(I1,I2)=CUBE(I1,1,I2)
      SMR2(I1,I2)=CUBE(I1,2,I2)
            ENDDO
      ENDDO

C     End of mantissa sign operation
C     Signed Exponent Input,here.

      NMAX=NEX+1
      CUBENUM=SEAT
      DO I1=1,CUBENUM
            DO I2=1,NMAXTW
      CUBE(I1,1,I2)=SEA1(I1,I2)
      CUBE(I1,2,I2)=SEA2(I1,I2)
            ENDDO
      ENDDO
      CALL NEGNUL
      CN=CUBENUM
      DO JC=1,NEX+1
            '1st' AND
            IF(JC.GT.2) THEN
                  AN=SEAT
                  DO I1=1,AN
                        DO I2=1,NMAXTW
                  ACUBE(I1,1,I2)=EA1(JC,I1,I2)
                  ACUBE(I1,2,I2)=EA2(JC,I1,I2)
                        ENDDO
                  ENDDO
            ELSE
                  AN=1
                  DO I1=1,AN
                        DO I2=1,NMAXTW
                  ACUBE(I1,1,I2)=.FALSE.
                  ACUBE(I1,2,I2)=.FALSE.
                        ENDDO
                  ENDDO
```

```
      ENDIF
      CALL ANDNUL
      AT(JC)=CUBENUM
      DO I1=1,AT(JC)
            DO I2=1,NMAXTW
      A1(JC,I1,I2)=CUBE(I1,1,I2)
      A2(JC,I1,I2)=CUBE(I1,2,I2)
            ENDDO
      ENDDO
ENDDO
DO JC=1,NEX+1
      '1st' AND
      IF(JC.GT.2) THEN
            CUBENUM=SEAT
            DO I1=1,CUBENUM
                  DO I2=1,NMAXTW
            ACUBE(I1,1,I2)=SEA1(JC,I1,I2)
            ACUBE(I1,2,I2)=SEA2(JC,I1,I2)
                  ENDDO
            ENDDO
            PVBT(JC)=CUBENUM
            DO I1=1,PVBT(JC)
                  DO I2=1,NMAXTW
            PVB1(JC,I1,I2)=CUBE(I1,1,I2)
            PVB2(JC,I1,I2)=CUBE(I1,2,I2)
                  ENDDO
            ENDDO
      ELSE
            PVBT(JC)=1
            DO I1=1,PVBT(JC)
                  DO I2=1,NMAXTW
            PVB1(JC,I1,I2)=.TRUE.
            PVB2(JC,I1,I2)=.TRUE.
                  ENDDO
            ENDDO
      ENDIF

C     'one' IS BELOW.

PVAT(JC)=1
IF(JC.EQ.1) THEN
      DO I1=1,PVAT(JC)
            DO I2=1,NMAXTW
      PVA1(JC,I1,I2)=.TRUE.
      PVA2(JC,I1,I2)=.TRUE.
            ENDDO
      ENDDO
ELSE
      DO I1=1,PVAT(JC)
```

```
                DO I2=1,NMAXTW
            PVA1(JC,I1,I2)=.FALSE.
            PVA2(JC,I1,I2)=.FALSE.
                ENDDO
            ENDDO
        ENDIF
ENDDO
INX=NMAX
NMAX=NEX+1
CALL ADCUBE
NMAX=INX
DO JC=1,NEX+1
        AN=SEAT
        DO I1=1,AN
            DO I2=1,NMAXTW
        ACUBE(I1,1,I2)=SEA1(JC,I1,I2)
        ACUBE(I1,2,I2)=SEA2(JC,I1,I2)
            ENDDO
        ENDDO
        CN=CACT(JC)
        DO I1=1,CN
            DO I2=1,NMAXTW
        CUBE(I1,1,I2)=CACUB1(JC,I1,I2)
        CUBE(I1,2,I2)=CACUB2(JC,I1,I2)
            ENDDO
        ENDDO
        CALL ANDNUL
        BT(JC)=CUBENUM
        DO I1=1,BT(JC)
            DO I2=1,NMAXTW
        B1(JC,I1,I2)=CUBE(I1,1,I2)
        B2(JC,I1,I2)=CUBE(I1,2,I2)
            ENDDO
        ENDDO
ENDDO

DO JC=1,NEX+1
        AN=AT(JC)
        DO I1=1,AN
            DO I2=1,NMAXTW
        ACUBE(I1,1,I2)=A1(JC,I1,I2)
        ACUBE(I1,2,I2)=A2(JC,I1,I2)
            ENDDO
        ENDDO
        CN=BT(JC)
        DO I1=1,CN
            DO I2=1,NMAXTW
        CUBE(I1,1,I2)=B1(JC,I1,I2)
        CUBE(I1,2,I2)=B2(JC,I1,I2)
```

```
                ENDDO
            ENDDO
            CALL ORNUL
            AT(JC)=CUBENUM
            DO I1=1,AT(JC)
                DO I2=1,NMAXTW
            A1(JC,I1,I2)=CUBE(I1,1,I2)
            A2(JC,I1,I2)=CUBE(I1,2,I2)
                ENDDO
            ENDDO
        ENDDO
C       End of Exponent A
C       B1,2 TO BE GENERATED BELOW:
C       Exponent B
C       Signed Exponent Input,here.
        NMAX=NEX+1
        CUBENUM=SEAT
        DO I1=1,CUBENUM
            DO I2=1,NMAXTW
        CUBE(I1,1,I2)=SEB1(I1,I2)
        CUBE(I1,2,I2)=SEB2(I1,I2)
            ENDDO
        ENDDO
        CALL NEGNUL
        CN=CUBENUM
        DO JC=1,NEX+1
            IF(JC.GT.2) THEN
                AN=SEBT
                DO I1=1,AN
                    DO I2=1,NMAXTW
                ACUBE(I1,1,I2)=EB1(JC,I1,I2)
                ACUBE(I1,2,I2)=EB2(JC,I1,I2)
                    ENDDO
                ENDDO
            ELSE
                AN=1
                DO I1=1,AN
                    DO I2=1,NMAXTW
                ACUBE(I1,1,I2)=.FALSE.
                ACUBE(I1,2,I2)=.FALSE.
                    ENDDO
                ENDDO
            ENDIF
            CALL ANDNUL
            AT(JC)=CUBENUM
            DO I1=1,AT(JC)
```

```
                DO I2=1,NMAXTW
          A1(JC,I1,I2)=CUBE(I1,1,I2)
          A2(JC,I1,I2)=CUBE(I1,2,I2)
                ENDDO
          ENDDO
    ENDDO
          IF(JC.EQ.2) THEN
                CUBENUM=SEBT
                DO I1=1,AN
                      DO I2=1,NMAXTW
                CUBE(I1,1,I2)=SEB1(I1,I2)
                CUBE(I1,2,I2)=SEB2(I1,I2)
                      ENDDO
                ENDDO
                PVBT(JC)=CUBENUM
                DO I1=1,PVBT(JC)
                      DO I2=1,NMAXTW
                PVB1(JC,I1,I2)=CUBE(I1,1,I2)
                PVB2(JC,I1,I2)=CUBE(I1,2,I2)
                      ENDDO
                ENDDO
          ELSE
                PVBT(JC)=1
                DO I1=1,AN
                      DO I2=1,NMAXTW
                PVB1(JC,I1,I2)=.TRUE.
                PVB2(JC,I1,I2)=.TRUE.
                      ENDDO
                ENDDO
          ENDIF

C     'ONE' is below.

    PVAT(JC)=1
    IF(JC.EQ.1) THEN
          DO I1=1,PVAT(JC)
                DO I2=1,NMAXTW
          PVA1(JC,I1,I2)=.TRUE.
          PVA2(JC,I1,I2)=.TRUE.
                ENDDO
          ENDDO
    ELSE
          DO I1=1,PVAT(JC)
                DO I2=1,NMAXTW
          PVA1(JC,I1,I2)=.FALSE.
          PVA2(JC,I1,I2)=.FALSE.
                ENDDO
          ENDDO
    ENDIF
```

```
ENDDO

INX=NMAX
NMAX=NEX+1
CALL ADCUBE
NMAX=INX
DO JC=1,NEX+1
      AN=SEBT
      DO I1=1,AN
            DO I2=1,NMAXTW
      ACUBE(I1,1,I2)=SEB1(JC,I1,I2)
      ACUBE(I1,2,I2)=SEB2(JC,I1,I2)
            ENDDO
      ENDDO
      CN=CACT(JC)
      DO I1=1,CN
            DO I2=1,NMAXTW
      CUBE(I1,1,I2)=CACUB1(JC,I1,I2)
      CUBE(I1,2,I2)=CACUB2(JC,I1,I2)
            ENDDO
      ENDDO
      CALL ANDNUL
      BT(JC)=CUBENUM
      DO I1=1,BT(JC)
            DO I2=1,NMAXTW
      B1(JC,I1,I2)=CUBE(I1,1,I2)
      B2(JC,I1,I2)=CUBE(I1,2,I2)
            ENDDO
      ENDDO
ENDDO

DO JC=1,NEX+1
      AN=AT(JC)
      DO I1=1,AN
            DO I2=1,NMAXTW
      ACUBE(I1,1,I2)=A1(JC,I1,I2)
      ACUBE(I1,2,I2)=A2(JC,I1,I2)
            ENDDO
      ENDDO
      CN=BT(JC)
      DO I1=1,CN
            DO I2=1,NMAXTW
      CUBE(I1,1,I2)=B1(JC,I1,I2)
      CUBE(I1,2,I2)=B2(JC,I1,I2)
            ENDDO
      ENDDO
      CALL ORNUL
      AT(JC)=CUBENUM
      DO I1=1,AT(JC)
```

```
          DO I2=1,NMAXTW
      A1(JC,I1,I2)=CUBE(I1,1,I2)
      A2(JC,I1,I2)=CUBE(I1,2,I2)
          ENDDO
      ENDDO
  ENDDO

C End of Exponent 8
C B1,2 TO BE GENERATED BELOW:

  CALL ADCUBE
  CUBENUM=XCT(1)
  DO I1=1,CUBENUM
      DO I2=1,NMAXTW
  CUBE(I1,1,I2)=XC1(1,I1,I2)
  CUBE(I1,2,I2)=XC2(1,I1,I2)
      ENDDO
  ENDDO
  CALL NEGNUL
  AN=CUBENUM
  DO I1=1,AN
      DO I2=1,NMAXTW
  ACUBE(I1,1,I2)=CUBE(I1,1,I2)
  ACUBE(I1,2,I2)=CUBE(I1,2,I2)
      ENDDO
  ENDDO

  CUBENUM=XCT(1)
  DO I1=1,CUBENUM
      DO I2=1,NMAXTW
  CUBE(I1,1,I2)=XC1(JC,I1,I2)
  CUBE(I1,2,I2)=XC2(JC,I1,I2)
      ENDDO
  ENDDO
  CALL NEGNUL
  CN=CUBENUM
  CALL ANDNUL
  AN=CUBENUM
  DO I1=1,AN
      DO I2=1,NMAXTW
  ACUBE(I1,1,I2)=CUBE(I1,1,I2)
  ACUBE(I1,2,I2)=CUBE(I1,2,I2)
      ENDDO
  ENDDO

  IF(JC=1,NEX+1
      CN=1
C cube='one'
```

```
      IF(JC.EQ.1) THEN
            DO I1=1,1
                  DO I2=1,NMAXTW
            CUBE(I1,1,I2)=.TRUE.
            CUBE(I1,2,I2)=.TRUE.
                  ENDDO
            ENDDO
      ELSE
            DO I1=1,1
                  DO I2=1,NMAXTW
            CUBE(I1,1,I2)=.FALSE.
            CUBE(I1,2,I2)=.FALSE.
                  ENDDO
            ENDDO
      ENDIF
      CALL NEGNUL
      AT(JC)=CUBENUM

      DO I1=1,AT(JC)
            DO I2=1,NMAXTW
      A1(JC,I1,I2)=CUBE(I1,1,I2)
      A2(JC,I1,I2)=CUBE(I1,2,I2)
            ENDDO
      ENDDO
      ENDDO
      CUBENUM=AN
      DO I1=1,CUBENUM
            DO I2=1,NMAXTW
      CUBE(I1,1,I2)=ACUBE(I1,1,I2)
      CUBE(I1,2,I2)=ACUBE(I1,2,I2)
            ENDDO
      ENDDO
      CALL NEGNUL

C     a cube='0'

      AN=CUBENUM
      DO I1=1,AN
            DO I2=1,NMAXTW
      ACUBE(I1,1,I2)=CUBE(I1,1,I2)
      ACUBE(I1,2,I2)=CUBE(I1,2,I2)
            ENDDO
      ENDDO
      DO JC=1,NEX+1
            CN=1
            DO I1=1,CN
                  DO I2=1,NMAXTW
            CUBE(I1,1,I2)=.FALSE.
            CUBE(I1,2,I2)=.FALSE.
```

```
            ENDDO
         ENDDO
         CALL NEGNUL
         CN=CUBENUM
         AN=AT(JC)
         DO I1=1,AN
               DO I2=1,NMAXTW
         ACUBE(I1,1,I2)=A1(JC,I1,I2)
         ACUBE(I1,2,I2)=A2(JC,I1,I2)
               ENDDO
         ENDDO
         CALL ORNUL
         PVBT(JC)=CUBENUM
         DO I1=1,PVBT(JC)
               DO I2=1,NMAXTW
         PVB1(JC,I1,I2)=CUBE(I1,1,I2)
         PVB2(JC,I1,I2)=CUBE(I1,2,I2)
               ENDDO
         ENDDO
      ENDDO

      DO JC=1,NEX+1
         PVAT(JC)=CACT(JC)
         DO I1=1,PVAT(JC)
               DO I2=1,NMAXTW
         PVA1(JC,I1,I2)=CACUB1(JC,I1,I2)
         PVA2(JC,I1,I2)=CACUB2(JC,I1,I2)
               ENDDO
         ENDDO
         CALL ADCUBE
      ENDDO

C     Start of 2's Complement to Signed Exponent
C     -----------------------------------------------

      NMAX=NEX+1

C     Step 1:ISIGN=CACUB

         ISIGNT=CACT(NMAX)
         DO I1=1,ISIGNT
               DO I2=1,NMAXTW
         ISIGN1(I,J)=CACUB1(NMAXTW,I,J)
         ISIGN2(I,J)=CACUB2(NMAXTW,I,J)
               ENDDO
         ENDDO

C     Step 2:MXCUBj=CACUBj
```

```
      DO JC=1,NMAX
            MXCT(JC)=CACT(JC)
            DO I2=1,MXCT(JC)
                  DO J=1,NMAXTW
            MXCUB1(JC,I,J)=CACUB1(JC,I,J)
            MXCUB2(JC,I,J)=CACUB2(JC,I,J)
                  ENDDO
            ENDDO
      ENDDO

C     Step 3:PVB=CACUB

      DO JC=1,NMAX
            PVBT(JC)=CACT(JC)
            DO I1=1,PVBT(JC)
                  DO I2=1,NMAXTW
            PVB1(JC,I,J)=CACUB1(JC,I,J)
            PVB2(JC,I,J)=CACUB2(JC,I,J)
                  ENDDO
            ENDDO
      ENDDO

C     Step 4:PVA=1......1

      DO JC=1,NMAX
            PVAT(JC)=CACT(JC)
            DO I1=1,PVBT(JC)
                  DO I2=1,NMAXTW
            PVA1(JC,I,J)=.TRUE.
            PVA2(JC,I,J)=.TRUE.
                  ENDDO
            ENDDO
      ENDDO

C     Step 5:ADD

      CALL ADCUBE

C     Step 6:INVERT

      DO I=1,NMAX
            CUBENUM=CACT(I)
            DO I1=1,CUBENUM
                  DO I2=1,NMAXTW
            CUBE(I1,1,I2)=CACUB1(I,I1,I2)
            CUBE(I1,2,I2)=CACUB2(I,I1,I2)
                  ENDDO
            ENDDO
```

```
          CALL NEGNUL

          CACT(JC)=CUBENUM
          DO I1=1,CACT(JC)
               DO I2=1,NMAXTW
          CACUB1(JC,I,J)=CUBE(I1,1,I2)
          CACUB2(JC,I,J)=CUBE(I1,2,I2)
               ENDDO
          ENDDO
     ENDDO

DO I=1,NMAX
     AN=CACT(I)
     DO I1=1,AN
          DO I2=1,NMAXTW
     ACUBE(I1,1,I2)=CACUB1(I,I1,J)
     ACUBE(I1,2,I2)=CACUB2(I,I1,J)
          ENDDO
     ENDDO
     CN=ISIGNT
     DO I1=1,CUBENUM
          DO I2=1,NMAXTW
     CUBE(I1,1,I2)=ISIGN1(I1,I2)
     CUBE(I1,2,I2)=ISIGN2(I1,I2)
          ENDDO
     ENDDO
     CALL ANDNUL
     CACT(JC)=CUBENUM
     DO I1=1,CUBENUM
          DO I2=1,NMAXTW
     CACUB1(I,I1,I2)=CUBE(I1,1,J)
     CACUB2(I,I1,I2)=CUBE(I1,2,J)
          ENDDO
     ENDDO
ENDDO

C    Step 8:AND2

DO JC1=1,NMAX
     CUBENUM=ISIGNT
     DO I1=1,CUBENUM
          DO I2=1,NMAXTW
     CUBE(I1,1,I2)=ISIGN1(I1,I2)
     CUBE(I1,2,I2)=ISIGN2(I1,I2)
          ENDDO
     ENDDO

     CALL NEGNUL
```

```
          CN=CUBENUM

          AN=MXCT(JC1)
          DO I1=1,AN
                DO I2=1,NMAXTW
C                     OUT1()=?
          ACUBE(I1,1,I2)=MXCUB1(JC,I1,I2)
          ACUBE(I1,2,I2)=MXCUB2(JC,I1,I2)
                ENDDO
          ENDDO

          CALL NEGNUL

          CN=CUBENUM
          AN=MXCT(JC1)
          DO I1=1,AN
                DO I2=1,NMAXTW
C                     OUT()=?
                ACUBE(I1,1,I2)=MXCUB1(JC,I1,I2)
                ACUBE(I1,2,I2)=MXCUB2(JC,I1,I2)
                      ENDDO
                ENDDO
          ENDDO

          CALL ANDNUL

          MXCT(JC1)=CUBENUM
          AN=MXCT(JC1)
          DO I1=1,AN
                DO I2=1,NMAXTW
C                     OUT()=?
                MXCUB1(JC1,I1,I2)=CUBE(I1,1,J)
                MXCUB2(JC1,I1,I2)=CUBE(I1,2,J)
                      ENDDO
                ENDDO
          ENDDO
    ENDDO

C   Step 9:OR

    DO JC1=1,NMAX
          AN=CACT(JC1)
          DO I1=1,AN
                DO I2=1,NMAXTW
          ACUBE(I,1,J)=CACUB1(JC1,I,J)
          ACUBE(I,2,J)=CACUB2(JC1,I,J)
                ENDDO
          ENDDO
```

```
      CN=MXCT(JC1)
      DO I1=1,CN
            DO I2=1,NMAXTW
      CUBE(I,1,J)=MXCUB1(JC1,I,J)
      CUBE(I,2,J)=MXCUB2(JC1,I,J)
            ENDDO
      ENDDO
      CALL ORNUL
      ERT(JC1)=CUBENUM
      DO I1=1,CACT(JC1)
            DO I2=1,NMAXTW
      ER1(JC1,I,J)=CUBE(I,1,J)
      ER2(JC1,I,J)=CUBE(I,2,J)
                  ENDDO
            ENDDO
      ENDDO
ENDDO

C     End of 2's Complement to Signed Mantissa.
C     ------------------------------------------------

      SMRT=CUBENUM
      YAT(1)=CUBENUM
      DO I1=1,YAT(1)
            DO I2=1,NMAXTW
      SMR1(I1,I2)=CUBE(I1,1,I2)
      SMR2(I1,I2)=CUBE(I1,2,I2)
            ENDDO
      ENDDO

C     ..............................................

C     ------------------------------------
C     Postive-to-negative
C     ------------------------------------

      IF(IPTN.EQ.1) THEN

      DO JC=1,NMAX
            CUBENUM=PVBT(JC)
            DO K=1,CUBENUM
                  DO KG=1,NMAXTW
            CUBE(K,1,KG)=PVB1(JC,K,KG)
            CUBE(K,2,KG)=PVB2(JC,K,KG)
                  ENDDO
            ENDDO
            TA=0
            CALL NEGNUL
            PVBT(JC)=CUBENUM
```

```
            DO K=1,PVBT(JC)
                  DO KG=1,NMAXTW
            PVB1(JC,K,KG)=CUBE(K,1,KG)
            PVB2(JC,K,KG)=CUBE(K,2,KG)
                  ENDDO
            ENDDO
      ENDDO
C     ----------------------------------------------------------
C     Definition of LSB
      K=1
      DO JC=1,NMAX
            PVAT(JC)=AT(1)
            DO KG=1,NMAXTW
                  IF(JC.EQ.1) THEN
                        PVA1(JC,K,KG)=.TRUE.
                        PVA2(JC,K,KG)=.TRUE.
                  ELSE IF((JC.LT.(NMAX+1)).AND.(JC.GT.1)) THEN
                        PVA1(JC,K,KG)=.FALSE.
                        PVA2(JC,K,KG)=.FALSE.
                  ENDIF
            ENDDO
      ENDDO

C     For 1st adder in subtraction, SUBTR equals 1.
      SUBTR=1
      CALL ADCUBE

      DO JC=1,NMAX
            PVBT(JC)=CACT(JC)
            DO K=1,PVBT(JC)
                  DO KG=1,NMAXTW
            PVB1(JC,K,KG)=CACUB1(JC,K,KG)
            PVB2(JC,K,KG)=CACUB2(JC,K,KG)
                  ENDDO
            ENDDO
            PVAT(JC)=AT(JC)
            DO K=1,PVAT(JC)
                  DO KG=1,NMAXTW
            PVA1(JC,K,KG)=A1(JC,K,KG)
            PVA2(JC,K,KG)=A2(JC,K,KG)
                  ENDDO
            ENDDO
            PVBT(JC)=1
            DO K=1,PVBT(JC)
                  DO KG=1,NMAXTW
                        IF(JC.EQ.1) THEN
                              PVA1(JC,K,KG)=.TRUE.
                              PVA2(JC,K,KG)=.TRUE.
            ELSE
```

```
                                PVA1(JC,K,KG)=.FALSE.
                                PVA2(JC,K,KG)=.FALSE.
                             ENDIF
                          ENDDO
                       ENDDO
                    ENDDO

C     For 1st adder in subtraction, SUBTR equals 1
C     For 2nd adder in subtraction, SUBTR equals 0

            SUBTR=0
            CALL ADCUBE
C     To find positive numbers: CACUBj=CACUBj.AND.CACUBj(1)
C     ie, CACUBj=(list of CACUBj).AND.(list of CACUBj(4) )

C           DO J1=1,NMAX
C                 CUBENUM=CACT(J1)
C                 DO K=1,CUBENUM
C                       DO KG=1,NMAXTW
C                 CUBE(K,1,KG)=CACUB1(J1,K,KG)
C                 CUBE(K,2,KG)=CACUB2(J1,K,KG)
C                       ENDDO
C                 ENDDO
C                 TA=0
C                 CALL NEGNUL
C                 CACT(J1)=CUBENUM
C                 DO K=1,CACT(J1)
C                       DO KG=1,NMAXTW
C                 CACUB1(J1,K,KG)=CUBE(K,1,KG)
C                 CACUB2(J1,K,KG)=CUBE(K,2,KG)
C                       ENDDO
C                 ENDDO
C           ENDDO

      ENDIF
C     ENDIF for routine if 'IPTN.EQ.1'

C     ************************************************

C     Endif for NJUMP.
      ENDIF

C     OUTPUT////////////////////////////////////////////////
C     AQ=.FALSE.
C     DO 62 KAB=1,NMAX
C           BQ=.FALSE.
C           ILTD=LTD+1
C     IF((.NOT.(PVAT(KAB).LT.ILTD)).AND.(.NOT.(PVBT(KAB).LT.ILTD)
).AND.
```

```
C     1      (.NOT.(CYLT(KAB).LT.ILTD)).AND.(.NOT.(CACT(KAB).LT.ILT
D)).AND.
C     2      (.NOT.(CPLT(KAB).LT.ILTD))) THEN
C            BQ=.TRUE.
C     ENDIF
C            AQ=BQ.OR.AQ
C62   CONTINUE
C     IF(.NOT.AQ) THEN
C     DO 63 IW=1,NMAX
C     TOTAL=PVAT(IW)+PVBT(IW)+CYLT(IW)+CACT(IW)+CPLT(IW)
C     WRITE(16,70)IW,IW,PVAT(IW),IW,PVBT(IW),IW,CYLT(IW),IW,CACT(
IW),
C     1      IW,CPLT(IW),TOTAL
C70   FORMAT(//1X,3HIR=,I4,2X,5HPVAT(,I4,2H)=,I4,2X,5HPVBT(,I4,2H
)=,
C     1      I4,2X,5HCYLT(,I4,2H)=,I4,2X,5HCACT(,I4,2H)=,I4,2X,5HCP
LT(,I4,2H)=,
C     2      I4,2X,6HTOTAL=,I4)
C63   CONTINUE
C     ENDIF
      WRITE(16,*)'*** NMAXTW OUTPUT PIN BOOLEAN LISTS ***'
      DO 66 I49=1,NMAXTW
            WRITE(16,64)I49,I49
 64   FORMAT(//1X,21H Below is List Number,I4,4H Pin,I4,I4//)
            WRITE(16,65)
 65   FORMAT(4X,3HLSB,5X,3HMSB,1X)
            IF(CPLT(I49).GT.LTD) THEN
                  CPLT(I49)=LTD
                  WRITE(16,*)' CPLT/PRINT.GT.LTD'
            ENDIF
            DO 68 KG=1,CPLT(I49)
                  DO 67 K=1,NMAXTW
      IF(CPL1(I49,KG,K).AND.CPL2(I49,KG,K)) THEN
            SPACE(KG,K)=CHART(3)
      ELSE IF(CPL1(I49,KG,K).AND.(.NOT.CPL2(I49,KG,K))) THEN
            SPACE(KG,K)=CHART(1)
      ELSE IF((.NOT.CPL1(I49,KG,K)).AND.CPL2(I49,KG,K)) THEN
            SPACE(KG,K)=CHART(2)
      ELSE
            WRITE(16,*)'    **** ERROR in Bit Cover ****'
      ENDIF
 67                CONTINUE
                WRITE(16,69)KG,(SPACE(KG,IG),IG=1,NMAXTW)
 69             FORMAT(1X,I4,2X,2(2A1,1X))
 68         CONTINUE
 66   CONTINUE
C     STOP
      END
```

```
C     No. 1 Relabel
C     ------------------------------------
      SUBROUTINE RLABEL
      COMMON /B02/ CUBE(20,2,8),CUBERP(20,2,8)
      COMMON /B19/ NEW,SUM,JNUM,NMAXX,IA2,ISHQ,Q
     1     MODE,TA,TC,NMAXTW,CUBENUM
      LOGICAL*2 CUBE,CUBERP
      INTEGER NEW,SUM,JNUM,NMAXX,IA2,ISHQ,Q
     1     MODE,TA,TC,NMAXTW,CUBENUM
C     Relabel Cubes in List.
C     Define as L1 List
      IF(CUBENUM.GT.0) THEN
C     ------------------------------------------------
      DO 2 JA=1,CUBENUM
           DO 4 IA=1,NMAXTW
                CUBE(JA,1,IA)=CUBERP(JA,1,IA)
                CUBE(JA,2,IA)=CUBERP(JA,2,IA)
 4         CONTINUE
 2    CONTINUE
C     ---------------------------------------------
      ENDIF
      RETURN
      END
C     No. 2 List ANDNUL,    formally LISAND
C     ---------------------------------------------
      SUBROUTINE ANDNUL
      COMMON /B02/ CUBE(20,2,8),CUBERP(20,2,8)
      COMMON /B09/ LCUBE(20,2,8),ACUBE(20,2,8)
      COMMON /B16/ AQ,BQ
      COMMON /B18/ AN,CN,JTOL,NMAX,IBPP,KCDA,KMAX,W(20),C(20),
     1   . CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 CUBE,CUBERP
      LOGICAL*2 LCUBE,ACUBE
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      LOGICAL*2 CQ,DQ
C     L(NEW)=L(AA).AND.L(CA)
```

```
C     L(AN) has AN cubes.
C     L(CN) has CN cubes.
C     L(j)=L(jn1),L(jn2),....
C     L(k)=L(kn1),L(kn2),....
C     Generation of RP cubes,where RP=(AN+CN).
      IF((AN.GT.0).AND.(CN.GT.0)) THEN
C     ------------------------------------------------------------------
      IF(CN.EQ.1) THEN
C       Investigate to see if cube is null.
          CQ=.FALSE.
          DO IG=1,NMAXTW
                DQ=.FALSE.
                IF((.NOT.CUBE(1,1,IG)).AND.(.NOT.CUBE(1,2,IG)))
THEN
                      DQ=.TRUE.
                ENDIF
                CQ=CQ.OR.DQ
          ENDDO
          IF(CQ) THEN
C         Null cube input!
                IF(TA.EQ.0) THEN
C               Universe cube is created.
                      DO IG=1,NMAXTW
                            CUBE(1,1,IG)=.TRUE.
                            CUBE(1,2,IG)=.TRUE.
                      ENDDO
                ENDIF
C               GO TO 22 at end
          ENDIF
      ENDIF
      IF(AN.EQ.1) THEN
C       Investigate to see if cube is null.
          CQ=.FALSE.
          DO IG=1,NMAXTW
                DQ=.FALSE.
                IF((.NOT.ACUBE(1,1,IG)).AND.(.NOT.ACUBE(1,2,IG)))
THEN
                      DQ=.TRUE.
                ENDIF
                CQ=CQ.OR.DQ
          ENDDO
          IF(CQ) THEN
C         Null cube input!
                IF(TA.EQ.0) THEN
C               Universe cube is created.
                      DO IG=1,NMAXTW
                            ACUBE(1,1,IG)=.TRUE.
                            ACUBE(1,2,IG)=.TRUE.
                      ENDDO
```

```
                   ENDIF
C                  GO TO 22 at end
              ENDIF
       ENDIF
       JNUM=0
       DO 8 KB=1,CN
             DO 10 JB=1,AN
                   JNUM=JNUM+1
                   DO 12 IPART=1,NMAXTW
                         DO 14 IT=1,IBPP
       CUBERP(JNUM,IT,IPART)=ACUBE(JB,IT,IPART).AND.CUBE(KB,IT,IPA
RT)
 14                      CONTINUE
 12                CONTINUE
                   CALL NULL
 10          CONTINUE
  8    CONTINUE
C      Determination of cubes that contain a FF and remove from
the list.
       CUBENUM=JNUM
C      IF(JNUM.EQ.0) THEN
C            WRITE(16,*)'2 AN&CN=',AN,CN
C      WRITE(16,722)(ACUBE(1,1,K1),ACUBE(1,2,K1),K1=1,NMAXTW)
C722 FORMAT(1X,4(2L1,1X))
C      WRITE(16,838)(CUBE(1,1,K1),CUBE(1,2,K1),K1=1,NMAXTW)
C838 FORMAT(1X,4(2L1,1X))
C      ENDIF
       CALL RLABEL
C      WRITE(16,*)'CUBLISA2=',CUBENUM
       IF(CUBENUM.GT.1) THEN
             CALL NWD
             CALL DJOINT
       ENDIF
C      WRITE(16,*)'CUBLISA3=',CUBENUM
C      WRITE(16,140)
C      FORMAT(///3X,4HKMAX,3X,7HW(KMAX)///)
C      DO 141 IT1=1,KMAX
C            WRITE(16,142)IT1,W(IT1)
C142         FORMAT(2(3X,I4),1X)
C      CONTINUE
C      IF(CUBENUM.EQ.0) THEN
C            WRITE(16,*)'ERROR in number 2'
C            CUBENUM=1
C            DO 317 I6=1,NMAXTW
C                  CUBE(1,1,I6)=.FALSE.
C                  CUBE(1,1,I6)=.FALSE.
C317         CONTINUE
C      ENDIF
C      ----------------------------------------------------------
```

```
      ENDIF
      RETURN
      END.
C     No. 3 NUL        formally LISOR
C     --------------------------------------------------------
      SUBROUTINE ORNUL
C     2 List OR capability
C     IACT is number of cubes in ACUBE list.
      COMMON /B01/ JCUBE(20,2,8)
      COMMON /B02/ CUBE(70,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      LOGICAL*2 CQ,DQ
      IF((AN.GT.0).AND.(CN.GT.0)) THEN
C     --------------------------------------------------------
      IF(CN.EQ.1) THEN
C       Investigate to see if cube is null.
          CQ=.FALSE.
          DO IG=1,NMAXTW
               DQ=.FALSE.
               IF((.NOT.CUBE(1,1,IG)).AND.(.NOT.CUBE(1,2,IG)))
THEN
                    DQ=.TRUE.
               ENDIF
               CQ=CQ.OR.DQ
          ENDDO
          IF(CQ) THEN
C         Null cube input!
               IF(TA.EQ.0) THEN
```

```
C                Universe cube is created.
                       DO IG=1,NMAXTW
                             CUBE(1,1,IG)=.TRUE.
                             CUBE(1,2,IG)=.TRUE.
                       ENDDO
                 ENDIF
C                GO TO 22 at end
           ENDIF
      ENDIF
      IF(AN.EQ.1) THEN
C       Investigate to see if cube is null.
           CQ=.FALSE.
           DO IG=1,NMAXTW
                 DQ=.FALSE.
                 IF((.NOT.ACUBE(1,1,IG)).AND.(.NOT.ACUBE(1,2,IG)))
THEN
                       DQ=.TRUE.
                 ENDIF
                 CQ=CQ.OR.DQ
           ENDDO
           IF(CQ) THEN
C          Null cube input!
                 IF(TA.EQ.0) THEN
C                Universe cube is created.
                       DO IG=1,NMAXTW
                             ACUBE(1,1,IG)=.TRUE.
                             ACUBE(1,2,IG)=.TRUE.
                       ENDDO
                 ENDIF
C                GO TO 22 at end
           ENDIF
      ENDIF
      DO 99 I20=1,AN
           I21=I20+CN
           DO 172 K=1,NMAXTW
                 DO 173 IB=1,IBPP
      CUBE(I21,IB,K)=ACUBE(I20,IB,K)
173              CONTINUE
172        CONTINUE
99    CONTINUE
      CUBENUM=AN+CN
      IF(CUBENUM.GT.1) THEN
           CALL NWD
           CALL DJOINT
      ENDIF
C     ------------------------------------------------------------
      ENDIF
      RETURN
      END
```

```
C     No. 4 NEGNUL.        formaliy NEGLIS
C     ------------------------------------------------------------
      SUBROUTINE NEGNUL
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      LOGICAL*2 CUBRP1
      LOGICAL A11,A12,A13,A14,CQ,DQ
C     To .NOT. a list
C     TC=number of cubes in list,which is in descending order by
weight.
C     TC is in common block.
C          L(1)=A(#)C(1)
C     Cubes in L should be weighted and put in descending &
disjoint order.
      IF(CUBENUM.GT.0) THEN
C     ------------------------------------------------------------
      IF(CUBENUM.EQ.1) THEN
C       Investigate to see if cube is null.
          CQ=.FALSE.
          DO IG=1,NMAXTW
               DQ=.FALSE.
               IF((.NOT.CUBE(1,1,IG)).AND.(.NOT.CUBE(1,2,IG)))
THEN
                    DQ=.TRUE.
               ENDIF
               CQ=CQ.OR.DQ
          ENDDO
          IF(CQ) THEN
C         Null cube input!
               IF(TA.EQ.0) THEN
```

```
C                 Universe cube is created.
                        DO IG=1,NMAXTW
                              CUBE(1,1.IG)=.TRUE.
                              CUBE(1.2,IG)=.TRUE.
                        ENDDO
                  ENDIF
C                 GO TO 22 at end
            ENDIF
      IF(TA.EQ.0) THEN
C           Universe cube is created.
            IUNIV=1
            DO 36 IA=1,NMAXTW
                  DO 37 IT=1.IBPP
                        ACUBE(IUNIV.IT,IA)=.TRUE.
 37               CONTINUE
 36         CONTINUE
            DO 236 JA=1.CUBENUM
                  DO 237 JH=1,NMAXTW
                        DO 238 JP=1,IBPP
                              JCUBE(JA,JP,JH)=CUBE(JA,JP,JH)
 238                    CONTINUE
 237              CONTINUE
 236        CONTINUE
      ELSE IF(TA.NE.0) THEN
            DO 38 IQ=1.TA
                  DO 39 IA=1,NMAXTW
                        DO 40 IT=1.IBPP
                              ACUBE(IQ,IT,IA)=CUBE(IQ,IT,IA)
 40                     CONTINUE
 39               CONTINUE
 38         CONTINUE
      ENDIF
C     IF(MODE.NE.1) THEN
C           LCUBE(JNUM,J,K)=ACUBE(IA,J,K)(#)JCUBE(IC,J,K)
C     Negating a cube.Generation of JTO number of cubes.
      IAA=1
      JLCUB=CUBENUM
      DO 41 JLIST=1,JLCUB
            JNUM=0
            JGT=0
            JG=0
            DO 126 IA=1,IAA
C     If A at least partially covers J,then proceed TEST.
                  CQ=.FALSE.
                  DO 819 IS=1,NMAXTW
      A11=((.NOT.ACUBE(IA,1,IS)).AND.ACUBE(IA,2,IS).AND.
     1      JCUBE(JLIST,1,IS).AND.(.NOT.JCUBE(JLIST,2,IS)))
      A12=(ACUBE(IA,1,IS).AND.(.NOT.ACUBE(IA,2,IS)).AND.
     1      (.NOT.JCUBE(JLIST,1,IS)).AND.JCUBE(JLIST,2,IS))
```

```
                        DQ=.FALSE.
      IF(A11.OR.A12) THEN
                        DQ=.TRUE.
      ENDIF
                        CQ=CQ.OR.DQ
 819              CONTINUE
            IF(.NOT.CQ) THEN
C     If A at least partially covers J,then proceed.
                  DO 42 IS=1,NMAXTW
                        JNUM=JNUM+1
                        DO 43 KA=1,NMAXTW
                              DO 44 IT=1,IBPP
                              IF(KA.EQ.IS) THEN
      CUBERP(JNUM,IT,KA)=ACUBE(IA,IT,KA).AND.(.NOT.JCUBE(JLIST,IT
     .KA))
                              ELSE IF(KA.LT.IS) THEN
      CUBERP(JNUM,IT,KA)=ACUBE(IA,IT,KA).AND.JCUBE(JLIST,IT,KA)
                              ELSE IF(KA.GT.IS) THEN
      CUBERP(JNUM,IT,KA)=ACUBE(IA,IT,KA)
                              ENDIF
 44                           CONTINUE
 43                     CONTINUE
                        CALL NULL
 42               CONTINUE
            ELSE
C     Storage of A cubes that do not cover J cubes.
                  JG=JG+1
                  DO 814 KB=1,NMAXTW
                        CUBRP1(JG,1,KB)=ACUBE(IA,1,KB)
                        CUBRP1(JG,2,KB)=ACUBE(IA,2,KB)
 814              CONTINUE
                  JGT=JG
            ENDIF
 126        CONTINUE
                        IAA=JNUM
                        DO 234 JH=1,IAA
                              JG=JG+1
                              DO 235 KB=1,NMAXTW
                        ACUBE(JG,1,KB)=CUBERP(JH,1,KB)
                        ACUBE(JG,2,KB)=CUBERP(JH,2,KB)
 235                          CONTINUE
 234                    CONTINUE
                        IAA=JGT
                        JG=0
                        DO 815 JH=1,IAA
                              JG=JG+1
                              DO 816 KB=1,NMAXTW
                        ACUBE(JG,1,KB)=CUBRP1(JH,1,KB)
                        ACUBE(JG,2,KB)=CUBRP1(JH,2,KB)
```

```
 816                             CONTINUE
 815                        CONTINUE
                            IAA=JNUM+JGT
 41         CONTINUE
            CUBENUM=IAA
C     Relabel Cubes in list.
C     Define as L1 List.
      DO 811 JG=1,CUBENUM
            DO 812 KB=1,NMAXTW
                  CUBE(JG,1,KB)=ACUBE(JG,1,KB)
                  CUBE(JG,2,KB)=ACUBE(JG,2,KB)
 812        CONTINUE
 811  CONTINUE
            IF((CUBENUM.EQ.0).OR.(CUBENUM.GT.LTD)) THEN
                  GO TO 242
            ENDIF
            IF(CUBENUM.GT.1) THEN
                  CALL NWD
                  CALL DJOINT
            ENDIF
      IF((CUBENUM.EQ.0).OR.(CUBENUM.GT.LTD)) THEN
            GO TO 191
      ENDIF
C     ENDIF
C     Next weigh,remove null cubes,and order in descending
disjoint cubes.
 191  IV=0
 242  IV=0
C     IF((CUBENUM.EQ.0).OR.(CUBENUM.GT.LTD)) THEN
C           CUBENUM=5
C           WRITE(16,*)'   END OF NEGLIS =5 ERROR'
C     ELSE IF(CUBENUM.EQ.0) THEN
C           WRITE(16,*)'  ERROR in number 4'
C     ENDIF
 320  IV=0
 22   IV=0
C     ---------------------------------------------------------
      ENDIF
      RETURN
      END
C     No. 5 Add two Cubes.
C     ---------------------------------------------------------
      SUBROUTINE ADCUBE
      COMMON /B01/ JCUBE(20,2,8)
      COMMON /B02/ CUBE(20,2,8),CUBERP(20,2,8)
      COMMON /B09/ LCUBE(20,2,8),ACUBE(20;2,8)
      COMMON /B14/ CYL1(16,20,8)
      COMMON /B15/ CYL2(16,20,8)
      COMMON /B16/ AQ,BQ
```

```
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
```

```
      LOGICAL*2 CUBRP1
      INTEGER N
C     Addition ( 2 (0-Cube))
      IVX=0
C     C(1)=0
C     Each input N(J) cube=U.
      IF(CUBENUM.GT.0) THEN
C     ---------------------------------------------------------------
      DO 57 J=1,NMAX
           JPV=J
           JPVP=JPV+1
           JN=NMAX+J
           J1=J+1
           IF(IVX.EQ.0) THEN
C     ----------------- Odd Adder Stage--------------------
                CALL CARRY
                CALL SJ
                IVX=1
           ELSE
C     -----------------Even Adder Stage----------------------
C               A(J)=.NOT.A(J)
C               B(J)=.NOT.B(J)
CC    IF(SUBTR.EQ.0) THEN
C     ..........Multiply Only( W.FOR )..........
C          - if even -
CC         IF(.NOT.((IVX.EQ.1).AND.(SUBTR.EQ.0).AND.(JPV.EQ.
CC   1                NMAX).AND.(J2.EQ.2))) THEN
           IF(.NOT.((J2.EQ.2).AND.(JPV.EQ.NMAX))) THEN
                CUBENUM=PVAT(J)
                DO 161 IU1=1,CUBENUM
                     DO 162 IU2=1,NMAXTW
                CUBE(IU1,1,IU2)=PVA1(J,IU1,IU2)
                CUBE(IU1,2,IU2)=PVA2(J,IU1,IU2)
 162                 CONTINUE
 161            CONTINUE
                TA=0
                CALL NEBLIS
                PVAT(J)=CUBENUM
                DO 163 IU1=1,PVAT(J)
                     DO 164 IU2=1,NMAXTW
                PVA1(J,IU1,IU2)=CUBE(IU1,1,IU2)
                PVA2(J,IU1,IU2)=CUBE(IU1,2,IU2)
 164                 CONTINUE
 163            CONTINUE
CC         ELSE IF((IVX.EQ.1).AND.(SUBTR.EQ.0).AND.(JPV.EQ.
CC   1                NMAX).AND.(J2.EQ.2)) THEN
           ELSE IF((IVX.EQ.1).AND.(JPV.EQ.NMAX).AND.
     1                (J2.EQ.2)) THEN
                PVAT(JPV)=1
```

```
            DO 306 IT=1,PVAT(JPV)
               DO 307 K=1,NMAXTW
                     PVA1(JPV,IT,K)=.TRUE.
                     PVA2(JPV,IT,K)=.TRUE.
 307           CONTINUE
 306         CONTINUE
          ENDIF
CC     ELSE IF(SUBTR.EQ.1) THEN
C            PVAT(J)=1
C            DO 828 IU1=1,PVAT(J)
C               DO 829 IU2=1,NMAXTW
C                     PVA1(J,IU1,IU2)=.TRUE.
C                     PVA2(J,IU1,IU2)=.TRUE.
C      COMPLETELY WRONG        IF(IU2.LT.J) THEN
C         "      "                  PVA2(J,IU1,IU2)=.FALSE.
C         "      "             ELSE IF(IU2.EQ.J) THEN
C         "      "                  PVA1(J,IU1,IU2)=.FALSE.
C         "      "             ENDIF
C829            CONTINUE
C828         CONTINUE
C      ENDIF
             CUBENUM=PVBT(J)
             DO 165 IU1=1,CUBENUM
                DO 166 IU2=1,NMAXTW
             CUBE(IU1,1,IU2)=PVB1(J,IU1,IU2)
             CUBE(IU1,2,IU2)=PVB2(J,IU1,IU2)
 166            CONTINUE
 165         CONTINUE
             TA=0
             CALL NEGLIS
             PVBT(J)=CUBENUM
             DO 167 IU1=1,PVBT(J)
                DO 168 IU2=1,NMAXTW
             PVB1(J,IU1,IU2)=CUBE(IU1,1,IU2)
             PVB2(J,IU1,IU2)=CUBE(IU1,2,IU2)
 168            CONTINUE
 167         CONTINUE
             CALL CARRY
             CALL SJ
C            S(J)=.NOT.S(J)
             CUBENUM=CACT(J)
             DO 826 IU1=1,CUBENUM
                DO 827 K=1,NMAXTW
             CUBE(IU1,1,K)=CACUB1(J,IU1,K)
             CUBE(IU1,2,K)=CACUB2(J,IU1,K)
 827            CONTINUE
 826         CONTINUE
             TA=0
             CALL NEGLIS
```

```
                CACT(J)=CUBENUM
                DO 303 IU1=1,CACT(J)
                     DO 304 K=1,NMAXTW
                CACUB1(J,IU1,K)=CUBE(IU1,1,K)
                CACUB2(J,IU1,K)=CUBE(IU1,2,K)
 304                 CONTINUE
 303            CONTINUE
                IVX=0
          ENDIF

 57   CONTINUE
C305  IV=0
C22   IV=0
C     IF(CUBENUM.EQ.0) THEN
C          WRITE(16,*)' Error in 5'
C     ENDIF
C     ----------------------------------------------------------------
      ENDIF
      RETURN
      END
C     No. 6 CARRY
C     ----------------------------------------------------------------
      SUBROUTINE CARRY
C     C(J1) Binary Routine
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KB,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
```

```
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      IF(CUBENUM.GT.0) THEN
C     ------------------------------------------------------------------
      IR=6
      JPVP=JPV+1
C     -------------------------------------------------------G01 below:
C     IF(((F.EQ.2).AND.(((IVX.EQ.1).AND.(SUBTR.EQ.1)).OR.
C     1     (SUBTR.EQ.0))).OR.(F.EQ.1).OR.((F.EQ.3).AND.(((IVX.EQ.
C     2     1).AND.(JPV.EQ.NMAX)).OR.(JPV.NE.NMAX)))) THEN
C     IF(((IVX.EQ.1).AND.(JPV.EQ.NMAX).AND.(J2.EQ.2)).OR.
C     1     (.NOT.(J2.EQ.2))) THEN
      AN=PVAT(JPV)
      DO 97 IT=1,AN
            DO 98 K=1,NMAXTW
                  ACUBE(IT,1,K)=PVA1(JPV,IT,K)
                  ACUBE(IT,2,K)=PVA2(JPV,IT,K)
 98         CONTINUE
 97   CONTINUE
      CN=CYLT(JPV)
```

```
      DO 60 IT=1,CN
           DO 61 K=1,NMAXTW
                CUBE(IT,1,K)=CYL1(JPV,IT,K)
                CUBE(IT,2,K)=CYL2(JPV,IT,K)
 61        CONTINUE
 60   CONTINUE
C     WRITE(16,*)'JPV=',JPV,'  before LISAND1 in CARRY'
      CALL LISAND
C     WRITE(16,*)'JPV=',JPV,'  after LISAND1 in CARRY'
      CYLT(JPVP)=CUBENUM
      DO 32 IT=1,CYLT(JPVP)
           DO 34 K=1,NMAXTW
      CYL1(JPVP,IT,K)=CUBE(IT,1,K)
      CYL2(JPVP,IT,K)=CUBE(IT,2,K)
 34        CONTINUE
 32   CONTINUE
C     -------------------------------------------------GO2 below:
      AN=PVBT(JPV)
      DO 117 IT=1,AN
           DO 169 K=1,NMAXTW
      ACUBE(IT,1,K)=PVB1(JPV,IT,K)
      ACUBE(IT,2,K)=PVB2(JPV,IT,K)
 169       CONTINUE
 117  CONTINUE
      CN=PVAT(JPV)
      DO 100 IT=1,CN
           DO 118 K=1,NMAXTW
      CUBE(IT,1,K)=PVA1(JPV,IT,K)
      CUBE(IT,2,K)=PVA2(JPV,IT,K)
 118       CONTINUE
 100  CONTINUE
C     WRITE(16,*)'JPV=',JPV,'  before LISAND2 in CARRY'
      CALL LISAND
C     WRITE(16,*)'JPV=',JPV,'  after LISAND2 in CARRY'
C     IF(CUBENUM.EQ.0) THEN
C          WRITE(16,*)'ERROR above 119 SIX'
C     ENDIF
      AN=CYLT(JPVP)
      DO 119 IT=1,AN
           DO 120 K=1,NMAXTW
      ACUBE(IT,1,K)=CYL1(JPVP,IT,K)
      ACUBE(IT,2,K)=CYL2(JPVP,IT,K)
 120       CONTINUE
 119  CONTINUE
      CN=CUBENUM
      CALL LISOR
C     IF(CUBENUM.EQ.0) THEN
C          WRITE(16,*)'ERROR above 121 SIX'
C     ENDIF
```

```
      CYLT(JPVP)=CUBENUM
      DO 121 IT=1,CYLT(JPVP)
            DO 122 K=1,NMAXTW
      CYL1(JPVP,IT,K)=CUBE(IT,1,K)
      CYL2(JPVP,IT,K)=CUBE(IT,2,K)
 122        CONTINUE
 121  CONTINUE
      ENDIF
C     ---------------------------------------------------------------603 below:
      AN=CYLT(JPV)
      DO 149 IT=1,AN
            DO 150 K=1,NMAXTW
                  ACUBE(IT,1,K)=CYL1(JPV,IT,K)
                  ACUBE(IT,2,K)=CYL2(JPV,IT,K)
 150        CONTINUE
 149  CONTINUE
      CN=PVBT(JPV)
      DO 240 IT=1,CN
            DO 123 K=1,NMAXTW
                  CUBE(IT,1,K)=PVB1(JPV,IT,K)
                  CUBE(IT,2,K)=PVB2(JPV,IT,K)
 123        CONTINUE
 240  CONTINUE
C     WRITE(16,*)'JPV=',JPV,'  before LISAND3 in CARRY'
      CALL LISAND
C     WRITE(16,*)'JPV=',JPV,'  after LISAND3 in CARRY'
C     IF(((F.EQ.2).AND.(((IVX.EQ.1).AND.(SUBTR.EQ.1)).OR.
C     1     (SUBTR.EQ.0))).OR.(F.EQ.1).OR.((F.EQ.3).AND.(((IVX.EQ.
C     2     1).AND.(JPV.EQ.NMAX)).OR.(JPV.NE.NMAX)))) THEN
C     IF(((IVX.EQ.1).AND.(JPV.EQ.NMAX).AND.(J2.EQ.2)).OR.
C     1     (.NOT.(J2.EQ.2))) THEN
      AN=CYLT(JPVP)
      DO 170 IT=1,AN
            DO 171 K=1,NMAXTW
      ACUBE(IT,1,K)=CYL1(JPVP,IT,K)
      ACUBE(IT,2,K)=CYL2(JPVP,IT,K)
 171        CONTINUE
 170  CONTINUE
      CN=CUBENUM
      CALL LISOR
      ENDIF
C     IF(CUBENUM.EQ.0) THEN
C           WRITE(16,*)'ERROR above 124 SIX'
C     ENDIF
      TA=0
      CALL NEGLIS
      CYLT(JPVP)=CUBENUM
      DO 124 IT=1,CYLT(JPVP)
            DO 125 K=1,NMAXTW
```

```
      CYL1(JPVP,IT,K)=CUBE(IT,1,K)
      CYL2(JPVP,IT,K)=CUBE(IT,2,K)
 125       CONTINUE
 124  CONTINUE
C     CYL(J1)=CYLj(JPVP) is defined.
C     IF(CUBENUM.EQ.0) THEN
C          WRITE(16,*)'ERROR IN NUMBER SIX'
C     ENDIF
C     ----------------------------------------------------------------
      ENDIF
      RETURN
      END
C     No. 7 SJ
C     ----------------------------------------------------------------
      SUBROUTINE SJ
C     SJ=CACUB
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ JAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
```

```
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      IF(CUBENUM.GT.0) THEN
C     ------------------------------------------------------------
      IR=7
      JPVP=JPV+1
C     2nd term of S(J)
C     IF(((F.EQ.2).AND.(((IVX.EQ.1).AND.(SUBTR.EQ.1)).OR.
C    1     (SUBTR.EQ.0))).OR.(F.EQ.1).OR.((F.EQ.3).AND.(((IVX.EQ.
C    2     1).AND.(JPV.EQ.NMAX)).OR.(JPV.NE.NMAX)))) THEN
C     IF(((IVX.EQ.1).AND.(JPV.EQ.NMAX).AND.(J2.EQ.2)).OR.
C    1     (.NOT.((J2.EQ.2).AND.(JPV.EQ.NMAX)))) THEN
C     IF(.NOT.((IVX.EQ.0).AND.(JPV.EQ.NMAX).AND.(J2.EQ.
C    1     2))) THEN
      AN=PVAT(JPV)
      DO 127 IT=1,AN
           DO 175 K=1,NMAXTW
      ACUBE(IT,1,K)=PVA1(JPV,IT,K)
      ACUBE(IT,2,K)=PVA2(JPV,IT,K)
 175       CONTINUE
 127  CONTINUE
      CN=PVBT(JPV)
      DO 133 IT=1,CN
           DO 135 K=1,NMAXTW
      CUBE(IT,1,K)=PVB1(JPV,IT,K)
      CUBE(IT,2,K)=PVB2(JPV,IT,K)
 135       CONTINUE
 133  CONTINUE
```

```
      CALL LISOR
C     ELSE IF(((F.EQ.2).AND.(((IVX.EQ.0).AND.(SUBTR.EQ.
C     1      1)).OR.(SUBTR.EQ.0))).OR.((F.EQ.3).AND.
C     2      (IVX.EQ.0).AND.(JPV.EQ.NMAX))) THEN
C     ELSE IF((IVX.EQ.0).AND.(JPV.EQ.NMAX).AND.(J2.EQ.
C     1      2)) THEN
C            CN=PVBT(JPV)
C            DO 830 IT=1,CN
C                 DO 831 K=1,NMAXTW
C            CUBE(IT,1,K)=PVB1(JPV,IT,K)
C            CUBE(IT,2,K)=PVB2(JPV,IT,K)
C831             CONTINUE
C830         CONTINUE
C     ENDIF
      AN=CYLT(JPV)
      DO 145 IT=1,CYLT(JPV)
           DO 146 K=1,NMAXTW
      ACUBE(IT,1,K)=CYL1(JPV,IT,K)
      ACUBE(IT,2,K)=CYL2(JPV,IT,K)
 146       CONTINUE
 145  CONTINUE
      CN=CUBENUM
      CALL LISOR
C     ---------------------------Including 1st term of S(J)
      AN=CYLT(JPVP)
      DO 71 IT=1,AN
           DO 74 K=1,NMAXTW
      ACUBE(IT,1,K)=CYL1(JPVP,IT,K)
      ACUBE(IT,2,K)=CYL2(JPVP,IT,K)
 74        CONTINUE
 71   CONTINUE
      CN=CUBENUM
      CALL LISAND
      CACT(JPV)=CUBENUM
      DO 147 IT=1,CACT(JPV)
           DO 148 K=1,NMAXTW
      CACUB1(JPV,IT,K)=CUBE(IT,1,K)
      CACUB2(JPV,IT,K)=CUBE(IT,2,K)
 148       CONTINUE
 147  CONTINUE
C     ------------------3rd term
C     IF(((F.EQ.2).AND.(((IVX.EQ.1).AND.(SUBTR.EQ.1)).OR.
C     1      (SUBTR.EQ.0))).OR.(F.EQ.1).OR.((F.EQ.3).AND.(((IVX.EQ.
C     2      1).AND.(JPV.EQ.NMAX)).OR.(JPV.NE.NMAX)))) THEN
C     IF(((IVX.EQ.1).AND.(JPV.EQ.NMAX).AND.(J2.EQ.2)).OR.
C     1      (.NOT.((J2.EQ.2).AND.(JPV.EQ.NMAX)))) THEN
C     IF(.NOT.((IVX.EQ.0).AND.(JPV.EQ.NMAX).AND.(J2.EQ.
C     1      2))) THEN
      AN=PVAT(JPV)
```

```
      DO 75 IT=1,AN
            DO 152 K=1,NMAXTW
      ACUBE(IT,1,K)=PVA1(JPV,IT,K)
      ACUBE(IT,2,K)=PVA2(JPV,IT,K)
 152        CONTINUE
 75   CONTINUE
      CN=PVBT(JPV)
      DO 76 IT=1,CN
            DO 153 K=1,NMAXTW
      CUBE(IT,1,K)=PVB1(JPV,IT,K)
      CUBE(IT,2,K)=PVB2(JPV,IT,K)
 153        CONTINUE
 76   CONTINUE
      CALL LISAND
      AN=CYLT(JPV)
      DO 154 IT=1,AN
            DO 155 K=1,NMAXTW
      ACUBE(IT,1,K)=CYL1(JPV,IT,K)
      ACUBE(IT,2,K)=CYL2(JPV,IT,K)
 155        CONTINUE
 154  CONTINUE
      CN=CUBENUM
      CALL LISAND
C     ------------------------------------Combine ALL
      AN=CACT(JPV)
      DO 156 IT=1,CACT(JPV)
            DO 157 K=1,NMAXTW
      ACUBE(IT,1,K)=CACUB1(JPV,IT,K)
      ACUBE(IT,2,K)=CACUB2(JPV,IT,K)
 157        CONTINUE
 156  CONTINUE
      CN=CUBENUM
      CALL LISOR
      CACT(JPV)=CUBENUM
      DO 159 IT=1,CACT(JPV)
            DO 160 K=1,NMAXTW
      CACUB1(JPV,IT,K)=CUBE(IT,1,K)
      CACUB2(JPV,IT,K)=CUBE(IT,2,K)
 160        CONTINUE
 159  CONTINUE
      ENDIF
C     ----------------------------------------------------------
      ENDIF
      RETURN
      END
C     No. 8 NWD means null,weight,and descend.
C     ----------------------------------------------------------
      SUBROUTINE NWD
      COMMON /B02/ CUBE(20,2,8),CUBERP(20,2,8)
```

```
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      LOGICAL*2 CUBE,CUBERP
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      IF(CUBENUM.GT.0) THEN
C     ------------------------------------------------------------
C     Remove null cube routine.
C     If any part is FF then remove cube from list.
      JNUM=0
      DO 53 IM=1,CUBENUM
           JNUM=JNUM+1
           DO 55 KB=1,NMAXTW
                CUBERP(JNUM,1,KB)=CUBE(IM,1,KB)
                CUBERP(JNUM,2,KB)=CUBE(IM,2,KB)
 55        CONTINUE
           CALL NULL
 53   CONTINUE
      CUBENUM=JNUM
C     SUBROUTINE WEIGHT
      DO 710 I8=1,CUBENUM
           SUM=0
           DO 72 K8=1,NMAXTW
                DO 73 J8=1,IBPP
                     IF(CUBERP(I8,J8,K8)) THEN
                          SUM=SUM+1
                     ENDIF
 73             CONTINUE
 72        CONTINUE
           C(I8)=SUM
 710  CONTINUE
C     SUBROUTINE DESCEN
      DO 77 I8=1,CUBENUM
           CM(I8)=C(I8)
 77   CONTINUE
      KMAX=0
      KCD=0
      DO 78 KB=1,CUBENUM
           KAA=0
           DO 79 J8=1,CUBENUM
                IF(KAA.LT.CM(J8)) THEN
                     KAA=CM(J8)
                ENDIF
```

```
 79       CONTINUE
C         W(K8)=maximum value of the heaviest cube.
          W(K8)=KAA
          KCDA=0
          DO 80 J8=1,CUBENUM
                 IF(KCDA.EQ.0) THEN
                        IF(W(K8).EQ.CM(J8)) THEN
                               CM(J8)=0
                               KMAX=KMAX+1
                               KCD=KCD+1
                               KCDA=1
                 IF((KCD.EQ.CUBENUM).OR.(KCD.LT.CUBENUM)) THEN
                        CD(KCD)=C(J8)
                        DO 81 L38=1,NMAXTW
                               DO 82 L28=1,IBPP
                 CUBE(KCD,L28,L38)=CUBERP(J8,L28,L38)
 82                            CONTINUE
 81                     CONTINUE
                 ENDIF
                        ENDIF
                 ENDIF
 80      CONTINUE
 78  CONTINUE
C    ----------------------------------------------------------------
     ENDIF
     RETURN
     END
C    No. 9 NULL,To be called immediately after a cube is
created.
C    ----------------------------------------------------------------

     SUBROUTINE NULL
     COMMON /B02/ CUBE(20,2,8),CUBERP(20,2,8)
     COMMON /B16/ AQ,BQ
     COMMON /B19/ NEW,SUM,JNUM,NMAXX,IA2,ISHQ,Q
     1     MODE,TA,TC,NMAXTW,CUBENUM
     LOGICAL*2 CUBE,CUBERP
     LOGICAL*2 AQ,BQ
     INTEGER NEW,SUM,JNUM,NMAXX,IA2,ISHQ,Q
     1     MODE,TA,TC,NMAXTW,CUBENUM
C    Remove null cube routine.
C    If any part is FF,then remove cube from list.
     IF(CUBENUM.GT.0) THEN
C    ----------------------------------------------------------------
     AQ=.FALSE.
     DO 28 KAJ=1,NMAXTW
          BQ=.FALSE.
C         AQ is true if PART is FF.
          JW=JNUM
```

```
      IF(.NOT.CUBERP(JW,1,KAJ).AND.(.NOT.CUBERP(JW,2,KAJ))) THEN
           BQ=.TRUE.
      ENDIF
           AQ=BQ.OR.AQ
  28  CONTINUE
      IF(AQ) THEN
           JNUM=JNUM-1
      ENDIF
C     ----------------------------------------------------------------
      ENDIF
      RETURN
      END
C     No. 10 DJOINT
C     ----------------------------------------------------------------------

      SUBROUTINE DJOINT
      COMMON /B02/ CUBE(20.2,8),CUBERP(20,2,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      LOGICAL*2 CUBE,CUBERP
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,LTD,TOTAL,JNUM3
      INTEGER CUBEN,V,WX,M

      LOGICAL*2 S,NS,AL,B,E,F,CK,DK,A11,A12,A13,A14,A15,A16,A17
      INTEGER VUSE,M1,QMA,LTD1
      IF(CUBENUM.GT.1) THEN
C     ----------------------------------------------------------------------
      DO 215 JAMT=1,1000
          LTD1=CUBENUM
      DO 193 I50=1,LTD1
          WX(I50)=0
 193  CONTINUE
      V=NMAXTW+1
      VUSE=0
      DO 194 I51=1,LTD1
          CUBEN(I51)=5
 194  CONTINUE
C     WRITE(16,195)
```

```
C195 FORMAT(///3X,7HWeight ,8HIA :IB  ,22HDisjoint Merging
Parts//)
      IST=0
      IF(LTD1.GT.0) THEN
      DO 196 IA=1,LTD1
      IF((IA.NE.LTD1).AND.(.NOT.(IST.GT.LTD1))) THEN
            WX(LTD1)=0
            IF(IST.NE.0) THEN
                  DO 197 IQ=1,IST
                        IF(CUBEN(IQ).EQ.IA) THEN
                              WX(LTD1)=1
                        ENDIF
 197              CONTINUE
            ENDIF
            IF(WX(LTD1).NE.1) THEN
C     "DO LOOP" is to prevent IA from being equal to previous
IB's.
            DO 198 IB=1,LTD1
      IF((WX(5).EQ.0).AND.(.NOT.(IST.GT.LTD1)).AND.
     1     (IB.GT.IA)) THEN
C     Generally,IB will always be greater than IA!
                  KF=LTD1+1
                  WX(KF)=0
C     "DO LOOP" is to prevent IB from being equal to previous
IB's.
                  IF(IST.NE.0) THEN
                        DO 199 IQ=1,IST
                              IF(CUBEN(IQ).EQ.IB) THEN
                                    WX(KF)=1
                              ENDIF
 199                    CONTINUE
                  ENDIF
                  IF(WX(KF).NE.1) THEN
C                 WRITE(16,*)'CD(IA)=',CD(IA),'CD(IB)=',CD(IB)
C     COVER ROUTINE ( Weights can be greater than 1.)
                  IF(IA.NE.IB) THEN
                        A16=.TRUE.
                        A17=.TRUE.
                        DO 151 KZ=1,NMAXTW
      A11=CUBE(IA,1,KZ).AND.CUBE(IA,2,KZ).AND.CUBE(IB,1,KZ).AND.
     1     CUBE(IB,2,KZ)
      A12=(.NOT.CUBE(IA,1,KZ)).AND.CUBE(IA,2,KZ).AND.(.NOT.
     1     CUBE(IB,1,KZ)).AND.CUBE(IB,2,KZ)
      A13=CUBE(IA,1,KZ).AND.(.NOT.CUBE(IA,2,KZ)).AND.
     1     CUBE(IB,1,KZ).AND.(.NOT.CUBE(IB,2,KZ))
      A14=CUBE(IA,1,KZ).AND.CUBE(IA,2,KZ)
      A15=CUBE(IB,1,KZ).AND.CUBE(IB,2,KZ)
      A16=(A11.OR.A12.OR.A13.OR.A14).AND.A16
      A17=(A11.OR.A12.OR.A13.OR.A15).AND.A17
```

```
 151                    CONTINUE
C                IF(A16.OR.A17) THEN
C           WRITE(16,*)'- - - Reduction - - -'
C     WRITE(16,220)IA,((CUBE(IA,IGJ,IGK),IGJ=1,IBPP),IGK=1,NMAXTW
)
C220 FORMAT(I4,2X,4(2L1,1X))
C     WRITE(16,221)IA,((CUBE(IA,IGJ,IGK),IGJ=1,IBPP),IGK=1,NMAXTW
)
C221 FORMAT(I4,2X,4(2L1,1X))
C           WRITE(16,*)'- - - End of Reduction - - -'
C                ENDIF
                 IF(A16) THEN
C     A16=T,means A covers B;Set all parts of B to FF.
C     CUBE(J,BOTH,K)=F
C     WRITE(16,*)'    REDUCT,IB=0',IA,IB
                     DO 158 JX=1,IBPP
                          DO 217 KY=1,NMAXTW
                     CUBE(IB,JX,KY)=.FALSE.
 217                      CONTINUE
 158                 CONTINUE
                     IST=IST+1
                     CUBEN(IST)=IB
                     CD(IB)=0
                     GO TO 226
                 ELSE IF(A17) THEN
C     A17=T,means B covers A;Set all parts of A to FF.
C     CUBE(I,BOTH,K)=F
C     WRITE(16,*)'  REDUCT,IA=0',IA,IB
                     DO 218 JX=1,IBPP
                          DO 225 KY=1,NMAXTW
                     CUBE(IA,JX,KY)=.FALSE.
 225                      CONTINUE
 218                 CONTINUE
                     IST=IST+1
                     CUBEN(IST)=IA
                     CD(IA)=0
                     GO TO 239
                 ENDIF
                 ENDIF
C                Same Weight Cubes
C                Adjacent Cubes;Weight differs by 1
                 QMA=CD(IA)-CD(IB)
            IF((QMA+1.EQ.0).OR.(QMA-1.EQ.0).OR.(QMA.EQ.0)) THEN
                 VUSE=0
                 DO 200 V=NMAXTW,1,-1
                      IF(VUSE.EQ.0) THEN
                           K=NMAXTW
                           DO 201 JV=1,NMAXTW
                                K=NMAXTW+1-JV
```

```
                                   IF(K.NE.V) THEN
C      Compare Conditions
C      ------------------
C      "DO LOOP" is to generate every part number except part v
C      (K avoids V) between original statement numbers 842-846.
C      If all parts of both cubes are the same,except part K
C      (where K=V).then a 'replacement' of these cubes will take
C      place.Thus these 2 cubes will merge into a single cube.
C      WRITE(16,202)K,V,IA,IB,IST
C202 FORMAT(1X,10HCOMPARE K=,I4,3H V=,I4,4H IA=,I4,4H IB=,I4
C      1     5H IST=,I4)
C      Compare cubes;CUBE(IA,1,K),CUBE(IA,2,K) and
C      CUBE(IB,1,K),CUBE(IB,2,K) as follows below.
C      CUBE(i,j,k) is defined in DESCEN(No. 9).
       AL=(.NOT.CUBE(IA,1,K)).AND.CUBE(IA,2,K).AND.(.NOT.
       1     CUBE(IB,1,K)).AND.CUBE(IB,2,K)
       E=CUBE(IA,1,K).AND.(.NOT.CUBE(IA,2,K))
       F=CUBE(IB,1,K).AND.(.NOT.CUBE(IB,2,K))
       B=E.AND.F
       CK=CUBE(IA,1,K).AND.CUBE(IA,2,K).AND.
       1     CUBE(IB,1,K).AND.CUBE(IB,2,K)
       DK=(.NOT.CUBE(IA,1,K)).AND.(.NOT.CUBE(IA,2,K)).OR.(.NOT.
       1     CUBE(IB,1,K)).AND.(.NOT.CUBE(IB,2,K))
C      S=Same
       S=(AL.OR.B.OR.CK).AND.(.NOT.DK)
C      WRITE(16,*)'S=SAME'
C      WRITE(16,203)WX(4),(CUBE(IA,JB,K),JB=1,2),(CUBE(IB,JB,
C      1     K),JB=1,2)
C      FORMAT(//1X,8H WX(4)=,I4,2(4X,9HCUBE(IA)=,L1),8X,2(4X,
C      1     9HCUBE(IB)=,L1))
                                      IF(S) THEN
                                 WX(4)=WX(4)+1
                                      ENDIF
                                 ENDIF
201                        CONTINUE
         IF(WX(4).EQ.(NMAXTW-1)) THEN
               VUSE=V
C      WRITE(16,*)'VUSE=V'
C      WRITE(16,204)VUSE,AL,B,CK,WX(4)
C204 FORMAT(//1X,5HVUSE=,I4,2X,2HA=,L1,2X,2HB=,L1,
C      1     2X,3HCK=,L1,2X,6HWX(4)=,I4)
               IGH=IA
               DO 210 IGF=1,2
C      WRITE(16,209)IGH,((CUBE(IGH,IGJ,IGK),IGJ=1,IBPP),IGK=1,NMAX
TW)
C209 FORMAT(//1X,I4,2X,4(2L1,1X))
                     IGH=IB
210            CONTINUE
         ENDIF
```

```
          WX(4)=0
          ENDIF
 200 CONTINUE
     ENDIF
C    GO TO IB
     IF(VUSE.NE.0) THEN
C         WRITE(16,*)'- - - Replacement - - -'
C    WRITE(16,219)IA,((CUBE(IA,IGJ,IGK),IGJ=1,IBPP),IGK=1,NMAXTW
)
C219 FORMAT(I4,2X,4(2L1,1X))
C    WRITE(16,321)IB,((CUBE(IB,IGJ,IGK),IGJ=1,IBPP),IGK=1,NMAXTW
)
C321 FORMAT(I4,2X,4(2L1,1X))
C         WRITE(16,*)'- - - End of Replacement - - -'
C         Replacement Routine
          DO 206 IKK=1,IBPP
     CUBE(IA,IKK,VUSE)=CUBE(IA,IKK,VUSE).OR.CUBE(IB,IKK,VUSE)
C         ENDDO
 206      CONTINUE
C    CD(IA),during replacement,will ALWAYS increase by 1.
          CD(IA)=CD(IA)+1
C    Cube IB is set to a weight of 0.
          DO 207 JX=1,IBPP
               DO 208 KY=1,NMAXTW
                    CUBE(IB,JX,KY)=.FALSE.
 208           CONTINUE
 207      CONTINUE
          CD(IB)=0
C    For Disjointness.Also,CUBEN(cube number)
          M1=CD(IA)
          IST=IST+1
          CUBEN(IST)=IA
          IST=IST+1
          CUBEN(IST)=IB
          WX(5)=1
     ENDIF
 226 IV=0
 239 IV=0
     ENDIF
     ENDIF
C    Following ENDDO is for IB loop.
 198            CONTINUE
                WX(4)=0
                ENDIF
          ENDIF
          WX(5)=0
C    Following ENDDO is for IA loop.
 196            CONTINUE
          ENDIF
```

```
C     Remove from original list the redundant cubes that
C     have been merged.
C     DO 135 IU=1,LTD1
C     WRITE(16,138)IU,IU,((CUBE(IU,JE2,KE2),JE2=1,IBPP),KE2=1,NMA
XTW)
C138 FORMAT(//1X,I4,2X,5HCUBE(,I4,3H)= ,4(2L1,1X),1X)
C135 CONTINUE
          JNUM=0
          DO 54 IA=1,LTD1
                JNUM=JNUM+1
                DO 56 IB=1,NMAXTW
                      CUBERP(JNUM,1,IB)=CUBE(IA,1,IB)
                      CUBERP(JNUM,2,IB)=CUBE(IA,2,IB)
 56             CONTINUE
                CALL NULL
 54       CONTINUE
          CUBENUM=JNUM
          CALL RLABEL
          CALL NWD
C     DO 232 IU=1,CUBENUM
C     WRITE(16,233)IU,IU,((CUBE(IU,JE2,KE2),JE2=1,IBPP),KE2=1,NMA
XTW)
C233 FORMAT(//1X,I4,2X,5HCUBE(,I4,3H)= ,4(2L1,1X),1X)
C232 CONTINUE
C         WRITE(16,*)'   Djoint Cubes Follow '
C     DO 228 I52=1,CUBENUM
C         WRITE(16,229)I52,I52,((CUBE(I52,J,K),J=1,IBPP),K=1,NMA
XTW)
C     FORMAT(//1X,I4,7H  CUBE(,I4,3H)= ,4(2L1,1X))
C     ENDDO
C228 CONTINUE
      IF(LTD1.EQ.CUBENUM) THEN
          GO TO 224
      ELSE
C         WRITE(16,*)' LTD1=    ',LTD1,'  JAMT=',JAMT
C         WRITE(16,*)' CUBENUM=',CUBENUM,'    JAMT=',JAMT
      ENDIF
 215 CONTINUE
 224 IV=0
C     ------------------------------------------------------------
      ENDIF
      RETURN
      END
C     No. 11 DJCA
C     ------------------------------------------------------------
      SUBROUTINE DJCA
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
```

```
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
     1     CD(20),A,CM(20)
      COMMON /B19/ NEW,SUM,JNUM,NMAXX,IA2,ISHQ,Q
     1     MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
     1     CACT(20),CPLT(20)
      COMMON /B23/ TD,KZ,KG,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
     1     CD,A,CM
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
```

```
      LOGICAL*2 A2
      LOGICAL*2 B1
      LOGICAL*2 B2
      LOGICAL*2 CUBRF1
      IF(CUBENUM.GT.0) THEN
C     ------------------------------------------------------------------
      IR=11
      CUBENUM=JNUM3
      DO 101 I53=1,CUBENUM
            DO 102 K=1,NMAXTW
                  IF(TD.EQ.0) THEN
                        CUBE(I53,1,K)=CACUB1(1,I53,K)
                        CUBE(I53,2,K)=CACUB2(1,I53,K)
                  ELSE IF((TD.EQ.1).OR.(TD.EQ.2)) THEN
                        CUBE(I53,1,K)=CYL1(1,I53,K)
                        CUBE(I53,2,K)=CYL2(1,I53,K)
                  ELSE IF(TD.EQ.3) THEN
                        CUBE(I53,1,K)=PVA1(1,I53,K)
                        CUBE(I53,2,K)=PVA2(1,I53,K)
                  ELSE IF(TD.EQ.4) THEN
                        CUBE(I53,1,K)=PVB1(1,I53,K)
                        CUBE(I53,2,K)=PVB2(1,I53,K)
                  ELSE IF(TD.EQ.5) THEN
                        CUBE(I53,1,K)=CPL1(1,I53,K)
                        CUBE(I53,2,K)=CPL2(1,I53,K)
                  ENDIF
102         CONTINUE
101   CONTINUE
      IF(CUBENUM.GT.1) THEN
            CALL DJOINT
      ENDIF
      JNUM3=CUBENUM
      DO 25 I54=1,CUBENUM
            DO 26 K=1,NMAXTW
                  IF(TD.EQ.0) THEN
                        CACUB1(1,I54,K)=CUBE(I54,1,K)
                        CACUB2(1,I54,K)=CUBE(I54,2,K)
                  ELSE IF((TD.EQ.1).OR.(TD.EQ.2)) THEN
                        CYL1(1,I54,K)=CUBE(I54,1,K)
                        CYL2(1,I54,K)=CUBE(I54,2,K)
                  ELSE IF(TD.EQ.3) THEN
                        PVA1(1,I54,K)=CUBE(I54,1,K)
                        PVA2(1,I54,K)=CUBE(I54,2,K)
                  ELSE IF(TD.EQ.4) THEN
                        PVB1(1,I54,K)=CUBE(I54,1,K)
                        PVB2(1,I54,K)=CUBE(I54,2,K)
                  ELSE IF(TD.EQ.5) THEN
                        CPL1(1,I54,K)=CUBE(I54,1,K)
                        CPL2(1,I54,K)=CUBE(I54,2,K)
```

```
              ENDIF
 26        CONTINUE
 25   CONTINUE
C     IF(CUBENUM.EQ.0) THEN
C          WRITE(16.*)'ERROR in number 11'
C     ENDIF
C     ------------------------------------------------------------
      ENDIF
      RETURN
      END
C     No. 12 DJR
C     ----------------------------
      SUBROUTINE DJR
      COMMON /B01/ JCUBE(20,2,8)
      COMMON /B02/ CUBE(20,2,8),CUBERP(20,2,8)
      COMMON /B09/ LCUBE(20,2,8),ACUBE(20,2,8)
      COMMON /B14/ CYL1(16,20,8)
      COMMON /B15/ CYL2(16,20,8)
      COMMON /B16/ AQ,BQ
      COMMON /B18/ AN,CN,JTOL,NMAX,IBPP,KCDA,KMAX,W(20),C(20),
      1    CD(20),A,CM(20)
      COMMON /B19/ NEW,SUM,JNUM,NMAXX,YA2,ISHQ,Q
      1    MODE,TA,TC,NMAXTW,CUBENUM
      COMMON /B20/ IAX(8),IR,LTD,TOTAL,JNUM3
      COMMON /B21/ CUBEN(20),V,WX(20),M(20)
      COMMON /B22/ AT(20),BT(20),PVAT(20),PVBT(20),CYLT(20),
      1    CACT(20),CPLT(20)
      COMMON /B23/ TD,KZ,KG,NP,JCOVER,JPV,J2,IVX
      COMMON /B24/ PVA1(8,20,8)
      COMMON /B25/ PVA2(8,20,8)
      COMMON /B26/ PVB1(8,20,8)
      COMMON /B27/ PVB2(8,20,8)
      COMMON /B28/ CPL1(8,20,8)
      COMMON /B29/ CPL2(8,20,8)
      COMMON /B32/ CACUB1(8,20,8)
      COMMON /B33/ CACUB2(8,20,8)
      COMMON /B34/ A1(8,1,8)
      COMMON /B35/ A2(8,1,8)
      COMMON /B36/ B1(8,1,8)
      COMMON /B37/ B2(8,1,8)
      COMMON /B38/ CUBRP1(8,20,8)
      LOGICAL*2 JCUBE
      LOGICAL*2 CUBE,CUBERP
      LOGICAL*2 LCUBE,ACUBE
      LOGICAL*2 CYL1
      LOGICAL*2 CYL2
      LOGICAL*2 AQ,BQ
      INTEGER AN,CN,JTOL,NMAX,IBPP,KCDA,KMAX,W,C,
      1    CD,A,CM
```

```
      INTEGER NEW,SUM,JNUM,NMAXX,IA2,ISHQ,Q
     1     MODE,TA,TC,NMAXTW,CUBENUM
      INTEGER IAX,IR,LTD,TOTAL,JNUM3
      INTEGER CUBEN,V,WX,M
      INTEGER AT,BT,PVAT,PVBT,CYLT,
     1     CACT,CPLT
      INTEGER TD,KZ,KG,NP,JCOVER,JPV,J2,IVX
      LOGICAL*2 PVA1
      LOGICAL*2 PVA2
      LOGICAL*2 PVB1
      LOGICAL*2 PVB2
      LOGICAL*2 CPL1
      LOGICAL*2 CPL2
      LOGICAL*2 CACUB1
      LOGICAL*2 CACUB2
      LOGICAL*2 A1
      LOGICAL*2 A2
      LOGICAL*2 B1
      LOGICAL*2 B2
      LOGICAL*2 CUBRP1
      INTEGER CT
      IF(CUBENUM.GT.0) THEN
C     ------------------------------------------------------------
      IR=12
      CALL LISAND
      CT=CUBENUM
      DO 101 I55=1,CT
            DO 102 K=1,NMAXTW
                  DO 103 JX=1,IBPP
      CUBRP1(I55,JX,K)=CUBE(I55,JX,K)
 103              CONTINUE
 102        CONTINUE
 101  CONTINUE
      JNUM3=0
      DO 23 I56=1,CT
            JNUM3=JNUM3+1
            DO 24 K=1,NMAXTW
                  IF(TD.EQ.0) THEN
                        CACUB1(JCOVER,JNUM3,K)=CUBRP1(I56,1,K)
                        CACUB2(JCOVER,JNUM3,K)=CUBRP1(I56,2,K)
                        CACT(JCOVER)=JNUM3
                  ELSE IF(TD.EQ.1) THEN
                        CYL1(JCOVER,JNUM3,K)=CUBRP1(I56,1,K)
                        CYL2(JCOVER,JNUM3,K)=CUBRP1(I56,2,K)
                        CYLT(JCOVER)=JNUM3
                  ELSE IF(TD.EQ.2) THEN
                        IX=NMAX+1
                        CYL1(IX,JNUM3,K)=CUBRP1(I56,1,K)
                        CYL2(IX,JNUM3,K)=CUBRP1(I56,2,K)
```

```
              CYLT(JCOVER)=JNUM3
          ELSE IF(TD.EQ.3) THEN
              PVA1(JCOVER,JNUM3,K)=CUBRP1(I56,1,K)
              PVA2(JCOVER,JNUM3,K)=CUBRP1(I56,2,K)
              PVAT(JCOVER)=JNUM3
          ELSE IF(TD.EQ.4) THEN
              PVB1(JCOVER,JNUM3,K)=CUBRP1(I56,1,K)
              PVB2(JCOVER,JNUM3,K)=CUBRP1(I56,2,K)
              PVBT(JCOVER)=JNUM3
          ELSE IF(TD.EQ.5) THEN
              CPL1(JCOVER,JNUM3,K)=CUBRP1(I56,1,K)
              CPL2(JCOVER,JNUM3,K)=CUBRP1(I56,2,K)
              CPLT(JCOVER)=JNUM3
          ENDIF
 24       CONTINUE
          CALL DJCA
 23   CONTINUE
C     IF(CUBENUM.EQ.0) THEN
C          WRITE(16,*)'ERROR in number 12'
C     ENDIF
C     ----------------------------------------------------------------

      ENDIF
      RETURN
      END
```

I claim:

1. Apparatus for solving an arbitrary static algebraic mathematical expression which includes conditional terms and has at least one input variable and at least one solution variable, said apparatus generating a solution value from an input value and comprising:

means for receiving a plurality of symbols representing said at least one input variable, said solution variable and a static algebraic_conditional relationship of said solution variable to said at least one input variable from a user;

means responsive to said received plurality of symbols for generating a boolean term list which represents said received symbolic relationship; and means responsive to said boolean terms list and to said input value for generating said solution value.

2. Apparatus for solving an arbitrary mathematical expression according to claim 1 wherein said receiving means comprises computing apparatus including an entry means for entering said plurality of symbols.

3. Apparatus for solving an arbitrary mathematical expression according to claim 2 wherein said computing apparatus comprises means for encoding each of said received symbols.

4. Apparatus for solving an arbitrary mathematical expression according to claim 3 wherein said generating means is responsive to said encoded received symbols for generating at least one list of boolean terms for each encoded symbol.

5. Apparatus for solving an arbitrary mathematical expression according to claim 4 wherein said generating means further includes means for combining said boolean term lists to generate combined boolean term lists representing said solution symbol and means for removing redundant terms in said combined boolean term lists.

6. Apparatus for solving an arbitrary mathematical expression according to claim 1 wherein said means for generating said solution comprises a programmable logic circuit having a plurality of inputs and at least one output.

7. Apparatus for solving an arbitrary mathematical expression according to claim 6 wherein said programmable logic circuit comprises means response to each term in said boolean term list for selectively connecting said logic circuit inputs to said logic circuit outputs in order to configure said logic circuit to represent said mathematical expression.

8. Apparatus for solving an arbitrary mathematical expression according to claim 1 further comprising means for receiving a plurality of numerical inputs and means for applying said received numerical inputs to said means for generating said solution.

9. Apparatus for solving an arbitrary mathematical expression according to claim 1 wherein said generating means comprises a plurality of circuits programmed with boolean term lists which are generated with a set of predefined rules for generating said boolean term list from said received symbols.

10. Apparatus for solving an arbitrary mathematical expression according to claim 1 further comprising means for transferring said boolean term list to said programmable logic circuit.

11. Apparatus for solving an arbitrary static algebraic mathematical expression which includes conditional terms and has at least one input variable and at least one solution variable, said apparatus generating a solution value from an input value and comprising:

means for receiving a plurality of symbols representing said at least one input variable, said solution variable and a static algebraic conditional relationship of said solution variable to said at least one input variable_ from a user;

means responsive to said received plurality of symbols for generating a boolean term list which represents said received symbolic relationship; and means responsive to said boolean terms list and to said at least one input value for generating said at least one solution value, said generating means comprising a plurality of circuits programmed with boolean term lists which are generated with a set of predefined rules for generating said boolean term list from said received symbols wherein said predefined rules comprise:

a input boolean list for the jth bit of an input variable is a single predefined boolean term of an "X" in all non jth bit parts and a "1" in the jth part; and a input boolean list for the jth bit of an input number is a single predefined boolean list of an "X" in all parts if the jth bit in said input number is a "1" and a single predefined boolean list of an "N" or a "null" in all parts if the jth bit in said input number is a "0".

12. Apparatus for solving an arbitrary static algebraic mathematical expression which includes conditional terms and has at least one input variable and at least one solution variable, said apparatus generating a solution value from a plurality of numerical inputs and comprising:

means for receiving a plurality of symbols representing the static algebraic conditional relationship of said at least one solution variable to said at least one input variable from a user;

means for receiving the plurality of numerical inputs;

means responsive to each received symbol for generating a set of control signals;

means responsive to said control signals for generating a plurality of boolean term lists which represent said received symbolic relationship;

a programmable logic circuit having inputs and outputs and a control means to selectively configure said logic circuit by selectively connecting said logic circuit inputs to said logic circuit outputs;

means responsive to said boolean term lists for selectively configuring said logic circuit to represent said mathematical expression; and means for applying received numerical inputs to said logic circuit whereby said solution value is generated at said logic circuit outputs.

13. Apparatus for solving an arbitrary mathematical expression according to claim 12 wherein said receiving means comprises computer apparatus including an entry means for entering said plurality of symbols.

14. Apparatus for solving an arbitrary mathematical expression according to claim 13 wherein said computing apparatus comprises means responsive to each received symbol for generating said set of control signals.

15. Apparatus for solving an arbitrary mathematical expression according to claim 14 wherein said generating means is responsive to said encoded received symbols for generating at least one list of boolean terms for each encoded symbol.

16. Apparatus for solving an arbitrary mathematical expression according to claim 15 wherein said generating means further includes means for combining said boolean term lists to generate combined lists representing said solution symbol and means for removing redundant terms in said combined lists.

17. Apparatus for solving an arbitrary mathematical expression according to claim 16 wherein said programmable logic circuit comprises means responsive to each term in said combined lists for selectively connecting said logic circuit inputs to said logic circuit outputs in order to configure said logic circuit to represent said mathematical expression.

18. Apparatus for solving an arbitrary mathematical expression according to claim 17 further comprising means for applying said received numerical inputs to said configured programmable logic circuit to generate said solution.

19. Apparatus for solving an arbitrary mathematical expression according to claim 12 wherein said receiving means comprises a plurality of circuits programmed with boolean term lists which are generated with a set of predefined rules for generating said boolean term list from said received symbols.

20. Apparatus for solving an arbitrary mathematical expression having at least one input and at least one output, said apparatus comprising:

entry means for receiving a plurality of symbols representing the relationship of said outputs to said inputs in said mathematical expression and a plurality of numerical inputs from a user;

computing means responsive to each received symbol for generating a set of control signals which encode each received symbol in a form suitable for transmission over a data bus;

a logic code generator connected to said data bus and responsive to said control signals for generating a set of boolean term lists for each received symbol which represents said received symbolic relationships;

means for controlling said logic code generator to reduce the number of terms in each of said lists to a close minimum number of terms necessary to represent said mathematical expression by eliminating redundant boolean terms;

a programmable logic circuit connected to said data bus and having inputs and output s and control means to selectively configure said logic circuit by selectively connecting said logic circuit inputs to said logic circuit outputs;

means responsive to said close minimum number of boolean terms for transferring said close minimum number of terms over said data bus to said control means to selectively configure said logic circuit to represent said mathematical expression;

means for applying received numerical inputs to said logic circuit whereby said outputs of said mathematical expression are generated at said logic circuit outputs; and means connected to said data bus for transferring said generated outputs of said mathematical expression from said logic circuit to said computing means.

21. Apparatus for solving an arbitrary mathematical expression according to claim 20 wherein said logic code generator comprises a plurality of integrated circuits programmed with boolean term lists which are generated with a set of predefined rules for generating said boolean term list from said received symbols.

22. Apparatus for solving an arbitrary mathematical expression according to claim 20 wherein said logic code generator comprises a plurality of integrated circuits programmed with boolean term lists which are generated with a set of predefined rules for generating said boolean term list from said received symbols, wherein said predefined rules comprise:

a input boolean list for the jth bit of an input variable is a single predefined boolean term of an "X" in all non jth bit parts and a "1" in the jth part; and a input boolean list for the jth bit of an input number is a single predefined boolean list of an "X" in all parts if the jth bit in said input number is a "1" and a single predefined boolean list of an "N" or a "null" in all parts if the jth bit in said input number is a "0".

23. A logic code generator for generating at least one new list of boolean terms in a new set of lists by performing logical operations on at least one list of boolean terms in a functions et of boolean lists as instructed by non "X" parts in each boolean term in at least one list of an instruction set of lists, said logical operations including:

(1) ANDing at least one new boolean term list with a true ith resolution bit boolean list in said function set if said non "X" part in said boolean term in the jth boolean term list in said instruction set is a "1", and (2) ANDing at least one new boolean term list with a NOTed ith resolution bit boolean list in said function set if said non "X" part in said boolean term in the jth boolean term list in said instruction set is a "0", said NOTed ith resolution bit boolean list being generated by removing said ith resolution bit boolean list from the universe of all states, (3) ANDing at least one boolean term in a first boolean term list with at least one boolean term in a second boolean term list for generating at least a new boolean term in a third boolean term list, (4) ORing at least one first new boolean term list with a second new boolean term list which is generated after all logical AND operations per boolean term in said jth list in said instruction set within said logic code generator are completed, (5) ORing at least one boolean term in a first boolean term list with at least one boolean term in a second boolean term list for generating at lest two boolean terms in a third boolean term list, (6) NOTing a list of at least one boolean term by removing the boolean term list from the universe of all states, and comprising:

a selectable resettable plurality of registers with circuitry to store only a '01' or a '10' in any said non "X" part of each boolean term in said instruction set for instructing said main controller thru a means to detect at least one said non "X" part of said boolean term to perform said logical AND operation on said first new boolean term with said second new boolean term;

a main controller means to control said logic code generator;

a CINV controller means to control a CINV circuit, which is critical to the removal of said second boolean term from a list of boolean terms containing said first boolean term;

a kth memory controller means to control each kth memory containing a plurality of said boolean term storage registers, said control will be to mainly identify: empty boolean term registers, store boolean terms, retrieve copies of boolean terms, inform said main controller of boolean term storage filled capacity per kth memory;

means responsive to output of selectable resettable plurality of registers with circuitry for informing said main controller when to perform said logical operations on another boolean list in said function set;

means responsive to output of selectable resettable plurality of registers with circuitry for informing said main controller when to perform said logical operations per boolean term in another boolean list in said instruction set;

a plurality of means to store a boolean term with an output bus to carry a two bit per part boolean term of a plurality of parts;

a boolean term address selection means in each kth memory receives addresses of null boolean terms which are to be used first and a resettable address generator means to be used secondly, both said receiving boolean term address selection means, and said resettable address generator to provide stored register addresses for valid boolean terms to be stored in each kth memory;

means to identify the boolean term storage address of a first boolean term in a kth memory to logically operate with a second boolean term, said logical operations being to detect if at least one of the following is true:

(1) a boolean term stored is a null boolean term;

(2) a first boolean term stored covers a second boolean term on the input bus, said covers defined as said first boolean term contains all states existing in said second boolean term, (3) said first boolean term stored partially covers the boolean term on the input bus, said partially covers defined as said first boolean term contains at least one state existing in said second boolean term, (4) said first boolean term stored will merge with a second boolean term on the input bus, said merge defined as said first boolean term stored and said second boolean term will fit into a single third boolean term;

means to identify said kth memory in which said first boolean term is stored which first boolean term will logically operate with a said second boolean term, said kth memory containing a plurality of boolean term storage registers;

a functional detector means receiving a boolean term on at least one boolean term storage output bus and receiving a boolean term on the bus containing said second boolean term for generating a logical signal on an output said functional detector performing at least one of the following operations:

(1) null, (2) cover, (3) partial cover, (4) merge;

means responsive to performing a disjoint sharp operation by removing one boolean term from another boolean term with the resultant list being disjoint boolean terms;

a valid detector means receiving the output of a boolean term AND means to provide a logical true if at least one bit of every part of a boolean term contains a 1; and a valid detector means receiving the output of at least one said disjoint boolean term bus to provide a logical true if at least one bit of every part of a boolean term contains a 1;

a boolean term retrieval means receiving a stored boolean term on an output bus from each said plurality of means to store a boolean term in said kth memory for sending a copy of said stored boolean term onto an input bus which is effectively used as an input/output boolean term kth memory data bus.

24. A logic code generator for generating at least one new list of boolean terms in a new set of lists from performing logical operations on at least one list of boolean terms in a function set of boolean lists instructed by non "X" parts in each boolean term in at least one list of an instruction set of lists according to claim 23, said logic code generator including:

a valid detector bus for receiving a logical signal on the output of a jth valid detector which receives a jth boolean term at the output of a disjoint sharp circuit to inform said CINV controller that the jth boolean term is a valid boolean term if said received logical signal is true.

25. A logic code generator for generating at least one new list of boolean terms in a new set of lists from performing logical operations on at least one list of boolean terms in a function set of boolean lists as instructed by non "X" parts in each boolean term in at least one list of an instruction set of lists according to claim 23, said logic code generator including:

a selectable resettable function detector storage register means receiving a logical signal on each output from each receiving functional detector means for generating a logical signal on an output, and a means receiving each said output from each said receiving functional detector storage register for generating a logical signal on an output bus to inform a CINV controller which of a plurality of memories contain at least one boolean term which logically operate with a boolean term on said selectable resettable function detector storage input bus, said selectable resettable function detector storage register receiving means is reset by a code word on a control bus from a CINV controller and said CINV circuit controller controls the CINV which is critical to the removal of one boolean term from a list of boolean terms.

26. A logic code generator for generating at least one new list of boolean terms in a new set of lists from performing logical operations on at least one list of boolean terms in a function set of boolean lists as instructed by non "X" parts in each boolean term in at least one list of an instruction set of lists according to claim 23, said logic code generator including:

a filled kth memory bus for receiving a logical signal from a kth memory controller to inform said CINV controller that the kth memory is entirely filled with valid boolean terms.

27. A logic code generator at least one new list of boolean terms in a new set of lists from performing logical operations on at least one list of boolean terms in a function set of boolean lists as instructed by non "X" parts in each boolean term in at least one list of an instruction set of lists according to claim 23, said logic code generator including:

a selectable cross switch means receiving at least one boolean term at the output of a disjoint sharp circuit on a plurality of input cross switch buses for connecting a ith input cross switch bus to a jth output cross switch bus carrying valid boolean terms to input buses of memories which have boolean term registers with null boolean terms, said boolean term registers with null boolean terms are empty and available to store boolean terms.

28. A logic code generator for generating at least one new list of boolean terms in a new set of lists from performing logical operations on at least one list of boolean terms in a function set of boolean lists as instructed by non "X" parts in each boolean term in at lest one list of an instruction set of lists according to claim 23, said logic code generator including:

a plurality of three bus switches for minimizing the electrical loading for passing a copy of said stored boolean term to the input bus, said three switches consist of memory switches which are:

(1) a first switch to open said input bus for removing the electrical load of said storage register for a first boolean term, (2) a second switch to open said input bus to the electrical load of said functional detector for a second boolean term, and (3) a third switch to switch a boolean term copy means receiving a stored boolean term onto an output bus from each boolean term storage register for sending.

29. A logic code generator for generating at least one new list of boolean terms in a new set of lists from performing logical operations on at least one list of boolean terms in a function set of boolean lists as instructed by non "X" parts in each boolean term in at least one list of an instruction set of lists according to claim 23, said logic code generator including:

a boolean term merge receiving a logical signal on a jth boolean term part comparison circuit which generates a logical true signal if the jth part of said first boolean term stored and the jth part of said second boolean term on said input bus is different and said boolean term merge means further receives a logical signal merge code from a merge recognizer means to selectably put a logical true signal into both bits of the selected part of the new boolean term which is sent thru a switch to the boolean term bus carrying said second boolean term.

30. A logic code generator for generating at least one new list of boolean terms in a new set of lists from performing logical operations on at least one list of boolean terms in a function set of boolean lists as instructed by non "X" parts in each boolean term in at least one list of an instruction set of lists according to claim 23, said logic code generator including:

means responsive to performing a disjoint sharp operation by removing one boolean term from another boolean term with the resultant list of disjoint boolean terms being generated simultaneously onto a plurality of buses.

31. A logic code generator for generating at least one new list of boolean terms in a new set of lists from performing logical operations on at least one list of boolean terms in a function set of boolean lists as instructed by non "X" parts in each boolean term in at least one list of an instruction set of lists according to claim 23, said logic code generator including:

an addressable switch means to switch at least one boolean term storage output bus to a input bus for said first boolean term to the input bus of said functional detector means.

32. A programmable logic circuit comprising:

a first input storage array having addressable plurality of two bits per part storage registers for storing input boolean terms in two half boolean terms with a "1" bit part half boolean term latched in at a different time than a "0" bit part half boolean term for testing and detecting different input signal conditions, said a "1" bit part half boolean term consisting of a two bit per part boolean term with only the "1" bit parts and said "0" bit part half boolean term consisting of a two bit per part boolean term with only the "0" bit parts;

an input half boolean term bus for receiving both said "1" bit part half boolean term and said "0" bit part half boolean terms for testing and for receiving only said "1" bit part half boolean terms for detecting different input signal conditions;

a second input storage array for receiving only said "0" bit part half boolean term from said input half boolean term bus for testing to determine if an exact boolean term is stored in said first input storage array;

a plurality of INVERTER circuits for inverting a plurality of binary input signals in said "1" bit half boolean term on said input half boolean term bus;

a plurality of MUX circuits for switching between said output of said second input storage array with the control line of the MUX circuit in a test state and the output of the INVERTER with the control line of the MUX circuit in a run state for detecting different input signal conditions with the switched plurality of signals connected to the input "0" bit part of a plurality of cover detectors;

an input bus with a plurality of wires for carrying a second boolean term;

a plurality of cover detector circuits for generating a plurality of outputs if a boolean term in at least one first input storage register covers the boolean terms from both the input bus with said "1" bit part boolean term and the output from said MUX circuit with said "0" bit part boolean term; and means for receiving a plurality of outputs from each of said plurality of cover detector circuits.

33. A programmable logic circuit comprising:

a first input storage array having addressable plurality of two bits per part storage registers for storing input boolean terms in two half boolean terms with a "1" bit part half boolean term latched in at a different time than a "0" bit part half boolean term for testing and detecting different input signal conditions, said a "1" bit part half boolean term consisting of a two bit per part boolean term with only the "1" bit parts and said "0" bit part half boolean term consisting of a two bit per part boolean term with only the "0" bit parts;

an input half boolean term bus for receiving both said "1" bit part half boolean terms and said "0" bit part half boolean terms for testing and for receiving only said "1" bit part half booleanterms for detecting different input signal conditions;

a second input storage array for receiving only said "0" bit part half boolean term from said input half boolean term bus for testing to determine if an exact boolean term is stored in said first input storage array;

a plurality of INVERTER circuits for inverting a plurality of binary input signals in said "1" bit half boolean term on said input half boolean term bus;

a plurality of MUX circuit for switching between said output of said second input storage array with the control line of the MUX circuit in a test state and the output of the INVERTER with the control line of the MUX circuit in a run state for detecting different input signal conditions with the switched plurality of signals connected to the input "0" bit part of a plurality of cover detectors;

an input bus with a plurality of wires for carrying a second boolean term;

a plurality of cover detector circuits for generating a plurality of outputs if a boolean term in at least one first input storage register covers the boolean terms from both the input bus with said "1" bit part boolean term and the output from said MUX circuit with said "0" bit part boolean term; and a single OR circuit having a plurality of inputs, each input being connected to one of said plurality of outputs from each of said plurality of cover detector circuits.

34. A programmable logic circuit in accordance with claim 32 further comprising:

a single OR circuit for receiving a plurality of outputs from each said cover detector.

35. A programmable logic circuit in accordance with claim 32 further comprising:

receiving means for also receiving an expansion wire connected to the output of another circuit for further covering additional boolean terms.

36. A programmable logic circuit in accordance with claim 32 wherein said input storage array comprises a fuse array.

37. A programmable logic circuit in accordance with claim 32 wherein said input storage array comprises a mask array.

38. A programmable logic circuit in accordance with claim 32 wherein said input storage array comprises an eraseable array.

39. A programmable logic circuit in accordance with claim 32 further comprising:

a serial to parallel converter which receives a serial output of said receiving means and generates a parallel array of signals representing a binary format of signals.

40. A programmable logic circuit in accordance with claim 32 further comprising:

a plurality of serial to parallel converters wherein each receive said receiving means output and each said serial to parallel converter transmits a plurality of signals representing a binary format of signals.

41. Apparatus for solving an arbitrary mathematical expression according to claim 9, or 18, or 20, wherein said predefined boolean term list comprises:

a input boolean list for the jth bit of an input variable is a single predefined boolean term of an "X" in all non jth bit parts and a "1" in the jth part; and a input boolean list for the jth bit of an input number is a single predefined boolean list of an "X" in all parts if the jth bit in said input number is a "1" and a single predefined boolean list of an "N" or a "null" in all parts if the jth bit in said input number is a "0".

42. In apparatus for solving an arbitrary mathematical expression having at least one input and output, said apparatus having:

means for receiving a plurality of symbols representing said inputs, said outputs and a relationship of said outputs to said inputs in said mathematical expression from a user;

means responsive to said received plurality of symbols for generating a boolean term list which represents said received symbolic relationships; and means responsive to said boolean terms list and to said mathematical expression inputs for generating said mathematical expression outputs, the improvements wherein said responsive means manipulates:

a input boolean list for the jth bit of an input variable is a single predefined boolean term of an "X" in all none jth bit parts and a "1" in the jth part; and said responsive means manipulates:

a input boolean list for the jth bit of an input number is a single predefined boolean list of an "X" in all parts if the jth bit in said input number is a "1" an a single predefined boolean list of an "N" or a "null" in all parts of the jth bit in said input number is "0".

43. A programmable logic circuit in accordance with claim 33 further comprising:

a plurality of serial to parallel converters wherein each receive said receiving means output and each said serial to parallel converter transmits a plurality of signals representing a binary format of signals.

44. Apparatus for computing, in response to a plurality of digital inputs, an inverse transform of an equation set having at least one of a static algebraic equation equal to zero and a static inequality expression relative to zero and generating a plurality of digital outputs, each of the plurality of digital outputs having multiple bits, from a plurality of inputs, said apparatus comprising:

means responsive to the equation set for generating a constraint boolean term list for each static algebraic inequality expression in the equation set;

means for ANDing all generated constraint boolean term lists to generate a final constraint boolean term list;

means responsive to the equation set for generating a non-constraint boolean term list for each static algebraic equation in the equation set;

means for ANDing all generated non-constraint boolean term lists to generate a final non-constraint boolean term list;

means for generating a joint system boolean term list by ANDing the final constraining boolean term list and the final non-constraint boolean term list; and means for generating an output set of boolean term lists by ANDing the joint system boolean term list with each bit of each of the plurality of output variables, and selecting terms so that each boolean term in the output set of boolean term lists contains only the terms corresponding to the plurality of input and output variables.

* * * * *